US012731309B2

(12) United States Patent
Hold-Geoffroy et al.

(10) Patent No.: US 12,731,309 B2
(45) Date of Patent: Sep. 8, 2026

(54) GENERATING SCALE FIELDS INDICATING PIXEL-TO-METRIC DISTANCES RELATIONSHIPS IN DIGITAL IMAGES VIA NEURAL NETWORKS

(71) Applicant: Adobe Inc., San Jose, CA (US)

(72) Inventors: Yannick Hold-Geoffroy, Quebec City (CA); Jianming Zhang, Campbell, CA (US); Byeonguk Lee, Daejeon (KR)

(73) Assignee: Adobe Inc., San Jose, CA (US)

( * ) Notice: Subject to any disclaimer, the term of this patent is extended or adjusted under 35 U.S.C. 154(b) by 575 days.

(21) Appl. No.: 18/304,134

(22) Filed: Apr. 20, 2023

(65) Prior Publication Data

US 2024/0127509 A1 Apr. 18, 2024

Related U.S. Application Data

(63) Continuation-in-part of application No. 18/190,544, filed on Mar. 27, 2023, now Pat. No. 12,260,530, and (Continued)

(51) Int. Cl.

*G06T 11/60* (2026.01)

*G06T 3/4046* (2024.01)

(52) U.S. Cl.

CPC ............ *G06T 11/60* (2013.01); *G06T 3/4046* (2013.01)

(58) Field of Classification Search

CPC ........................................................ G06T 7/80

See application file for complete search history.

(56) References Cited

U.S. PATENT DOCUMENTS 8,289,318 B1 10/2012 Hadap et al.
8,830,237 B2 9/2014 Zimmermann (Continued)

FOREIGN PATENT DOCUMENTS

CN 103578116 A * 2/2014 ............ G06T 7/248
CN 115639718 A * 1/2023

OTHER PUBLICATIONS

U.S. Appl. No. 18/055,590, Apr. 8, 2024, Office Action.

(Continued)

*Primary Examiner* — Di Xiao

(74) *Attorney, Agent, or Firm* — Keller Preece PLLC.

(57) ABSTRACT

The present disclosure relates to systems, methods, and non-transitory computer-readable media that modify two-dimensional images via scene-based editing using three-dimensional representations of the two-dimensional images. For instance, in one or more embodiments, the disclosed systems utilize three-dimensional representations of two-dimensional images to generate and modify shadows in the two-dimensional images according to various shadow maps. Additionally, the disclosed systems utilize three-dimensional representations of two-dimensional images to modify humans in the two-dimensional images. The disclosed systems also utilize three-dimensional representations of two-dimensional images to provide scene scale estimation via scale fields of the two-dimensional images. In some embodiments, the disclosed systems utilizes three-dimensional representations of two-dimensional images to generate and visualize 3D planar surfaces for modifying objects in two-dimensional images. The disclosed systems further use three-dimensional representations of two-dimensional images to customize focal points for the two-dimensional images.

20 Claims, 138 Drawing Sheets

Related U.S. Application Data a continuation-in-part of application No. 18/190,500, filed on Mar. 27, 2023, now Pat. No. 12,333,691, and a continuation-in-part of application No. 18/190,556, filed on Mar. 27, 2023, now Pat. No. 12,347,080, and a continuation-in-part of application No. 18/190,513, filed on Mar. 27, 2023, said application No. 18/190, 500 is a continuation-in-part of application No. 18/058,601, filed on Nov. 23, 2022, now Pat. No. 12,536,625, and a continuation-in-part of application No. 18/058,630, filed on Nov. 23, 2022, now Pat. No. 12,045,963, and a continuation-in-part of application No. 18/058,575, filed on Nov. 23, 2022, now Pat. No. 12,462,519, said application No. 18/190,513 is a continuation-in-part of application No. 18/058,601, filed on Nov. 23, 2022, now Pat. No. 12,536,625, and a continuation-in-part of application No. 18/058,630, filed on Nov. 23, 2022, now Pat. No. 12,045,963, and a continuation-in-part of application No. 18/058,575, filed on Nov. 23, 2022, now Pat. No. 12,462,519, said application No. 18/190,544 is a continuation-in-part of application No. 18/058,538, filed on Nov. 23, 2022, now Pat. No. 12,288,279, said application No. 18/190,556 is a continuation-in-part of application No. 18/058,554, filed on Nov. 23, 2022, now Pat. No. 12,395,722, said application No. 18/190,544 is a continuation-in-part of application No. 18/058,601, filed on Nov. 23, 2022, now Pat. No. 12,536,625, said application No. 18/190,500 is a continuation-in-part of application No. 18/058,622, filed on Nov. 23, 2022, said application No. 18/190,556 is a continuation-in-part of application No. 18/058,538, filed on Nov. 23, 2022, now Pat. No. 12,288,279, said application No. 18/190,500 is a continuation-in-part of application No. 18/058,554, filed on Nov. 23, 2022, now Pat. No. 12,395,722, application No. 18/304,134 is a continuation-in-part of application No. 18/058,538, filed on Nov. 23, 2022, now Pat. No. 12,288,279, said application No. 18/190,500 is a continuation-in-part of application No. 18/058,538, filed on Nov. 23, 2022, now Pat. No. 12,288,279, said application No. 18/190,513 is a continuation-in-part of application No. 18/058,622, filed on Nov. 23, 2022, and a continuation-in-part of application No. 18/058,538, filed on Nov. 23, 2022, now Pat. No. 12,288,279, said application No. 18/190,556 is a continuation-in-part of application No. 18/058,601, filed on Nov. 23, 2022, now Pat. No. 12,536,625, said application No. 18/190,513 is a continuation-in-part of application No. 18/058,554, filed on Nov. 23, 2022, now Pat. No. 12,395,722, said application No. 18/190,544 is a continuation-in-part of application No. 18/058,554, filed on Nov. 23, 2022, now Pat. No. 12,395,722.

(60) Provisional application No. 63/378,616, filed on Oct. 6, 2022, provisional application No. 63/378,212, filed on Oct. 3, 2022.

(56) References Cited

U.S. PATENT DOCUMENTS

| | | | | |
|---|---|---|---|---|
| 9,153,209 | B2 | 10/2015 | Dmitriev | |
| 10,043,279 | B1 | 8/2018 | Eshet | |
| 10,460,214 | B2 | 10/2019 | Lu et al. | |
| 10,679,046 | B1 | 6/2020 | Black et al. | |
| 10,691,286 | B2 | 6/2020 | King et al. | |
| 10,930,075 | B2 | 2/2021 | Costa et al. | |
| 11,094,083 | B2 | 8/2021 | Eisenmann et al. | |
| 11,217,035 | B2 | 1/2022 | El Hajjar | |
| 11,263,823 | B2 | 3/2022 | Gauseback et al. | |
| 11,494,995 | B2 | 11/2022 | Berkebile | |
| 11,514,638 | B2 | 11/2022 | Lafter et al. | |
| 11,694,450 | B1 * | 7/2023 | Spinelli | G06V 20/60 382/103 |
| 11,741,668 | B2 | 8/2023 | Jones et al. | |
| 11,869,152 | B2 | 1/2024 | Koh et al. | |
| 11,881,049 | B1 | 1/2024 | Soltz | |
| 12,026,845 | B2 | 7/2024 | Pardeshi | |
| 12,141,916 | B2 | 11/2024 | Brown et al. | |
| 2011/0018873 | A1 | 1/2011 | Chang et al. | |
| 2011/0298799 | A1 | 12/2011 | Mariani et al. | |
| 2012/0081357 | A1 | 4/2012 | Habbecke et al. | |
| 2013/0135305 | A1 | 5/2013 | Bystrov et al. | |
| 2014/0359536 | A1 | 12/2014 | Cheng et al. | |
| 2016/0035068 | A1 | 2/2016 | Wilensky et al. | |
| 2016/0063669 | A1 | 3/2016 | Wilensky et al. | |
| 2016/0119670 | A1 | 4/2016 | Izutsu et al. | |
| 2018/0158230 | A1 | 6/2018 | Yan et al. | |
| 2018/0218535 | A1 | 8/2018 | Ceylan et al. | |
| 2018/0329485 | A1 | 11/2018 | Carothers et al. | |
| 2019/0026958 | A1 | 1/2019 | Gausebeck et al. | |
| 2019/0065026 | A1 | 2/2019 | Kiemele et al. | |
| 2019/0354699 | A1 | 11/2019 | Pekelny et al. | |
| 2020/0020173 | A1 | 1/2020 | Sharif et al. | |
| 2020/0175756 | A1 | 6/2020 | Crowe et al. | |
| 2020/0234498 | A1 * | 7/2020 | Price | G06T 7/12 |
| 2021/0005026 | A1 | 1/2021 | Lesbordes | |
| 2021/0065440 | A1 | 3/2021 | Sunkavalli et al. | |
| 2021/0074062 | A1 | 3/2021 | Madonna et al. | |
| 2021/0097776 | A1 | 4/2021 | Faulkner et al. | |
| 2021/0335039 | A1 | 10/2021 | Jones et al. | |
| 2021/0343080 | A1 | 11/2021 | Kim et al. | |
| 2021/0398351 | A1 | 12/2021 | Papandreou et al. | |
| 2022/0068007 | A1 | 3/2022 | Lafer et al. | |
| 2022/0068037 | A1 | 3/2022 | Pardeshi | |
| 2022/0222887 | A1 | 7/2022 | Hundal et al. | |
| 2022/0284613 | A1 | 9/2022 | Yin et al. | |
| 2022/0292352 | A1 | 9/2022 | Jourdan et al. | |
| 2022/0375025 | A1 * | 11/2022 | Ardö | G06V 10/20 |
| 2022/0375113 | A1 * | 11/2022 | Sosnovik | G06T 7/60 |
| 2022/0414834 | A1 | 12/2022 | Du et al. | |
| 2023/0033956 | A1 | 2/2023 | Yong et al. | |
| 2023/0080584 | A1 | 3/2023 | Zohar et al. | |
| 2023/0117686 | A1 | 4/2023 | Jain et al. | |
| 2023/0140460 | A1 | 5/2023 | Munkberg et al. | |
| 2023/0141494 | A1 | 5/2023 | Brown et al. | |
| 2023/0143034 | A1 | 5/2023 | Wu et al. | |
| 2023/0230321 | A1 | 7/2023 | Schreckenbert et al. | |
| 2023/0239458 | A1 | 7/2023 | Clares et al. | |
| 2023/0281925 | A1 | 9/2023 | Aigerman et al. | |
| 2023/0290090 | A1 | 9/2023 | Su | |
| 2023/0298269 | A1 | 9/2023 | Genova et al. | |
| 2023/0306686 | A1 | 9/2023 | Zangenehpour et al. | |
| 2023/0326028 | A1 | 10/2023 | Zhang et al. | |
| 2023/0368339 | A1 | 11/2023 | Zheng et al. | |
| 2024/0013462 | A1 | 1/2024 | Seol et al. | |
| 2024/0037717 | A1 | 2/2024 | Amirghodsi et al. | |
| 2024/0095898 | A1 * | 3/2024 | Loyd | G06T 7/60 |
| 2024/0112396 | A1 | 4/2024 | Spencer | |
| 2024/0135572 | A1 | 4/2024 | Singh et al. | |
| 2024/0144520 | A1 | 5/2024 | Gori et al. | |
| 2024/0144586 | A1 | 5/2024 | Hold-Geoffroy et al. | |
| 2024/0144623 | A1 | 5/2024 | Gori et al. | |
| 2024/0161320 | A1 | 5/2024 | Gadelha et al. | |
| 2024/0161366 | A1 | 5/2024 | Mech et al. | |
| 2024/0161405 | A1 | 5/2024 | Mech et al. | |
| 2024/0161406 | A1 | 5/2024 | Mech et al. | |

OTHER PUBLICATIONS

U.S. Appl. No. 18/304,162, Apr. 25, 2024, Notice of Allowance.
U.S. Appl. No. 18/055,584, Jun. 21, 2024, Office Action.

(56) References Cited

OTHER PUBLICATIONS

Iro Armeni, Sasha Sax, Amir R Zamir, and Silvio Savarese. Joint 2d-3d-semantic data for indoor scene understanding. arXiv preprint arXiv:1702.01105, 2017.
Olga Barinova, Victor Lempitsky, Elena Tretiak, and Push-meet Kohli. Geometric image parsing in man-made environments. In European conference on computer vision, pp. 57-70. Springer, 2010.
Shariq Farooq Bhat, Ibraheem Alhashim, and Peter Wonka. Adabins: Depth estimation using adaptive bins. In Proceedings of the IEEE/CVF Conference on Computer Vision and Pattern Recognition, pp. 4009-4018, 2021.
Angel Chang, Angela Dai, Thomas Funkhouser, Maciej Halber, Matthias Niessner, Manolis Savva, Shuran Song, Andy Zeng, and Yinda Zhang. Matterport3d: Learning from rgb-d data in indoor environments. International Conference on 3D Vision (3DV), 2017.
Jia-Ren Chang and Yong-Sheng Chen. Pyramid stereo matching network. In Proceedings of the IEEE conference on computer vision and pattern recognition, pp. 5410-5418, 2018.
Antonio Criminisi, Ian Reid, and Andrew Zisserman. Single view metrology. International Journal of Computer Vision, 40(2):123-148, 2000.
Jia Deng, Wei Dong, Richard Socher, Li-Jia Li, Kai Li, and Li Fei-Fei. Imagenet: A large-scale hierarchical image database. In 2009 IEEE conference on computer vision and pattern recognition, pp. 248-255. Ieee, 2009.
Patrick Denis, James H Elder, and Francisco J Estrada. Efficient edge-based methods for estimating manhattan frames in urban imagery. In European conference on computer vision, pp. 197-210. Springer, 2008.
Jonathan Deutscher, Michael Isard, and John MacCormick. Automatic camera calibration from a single manhattan image. In European Conference on Computer Vision, pp. 175-188. Springer, 2002.
Derek Hoiem, Alexei A Efros, and Martial Hebert. Putting objects in perspective. International Journal of Computer Vision, 80(1):3-15, 2008.
Yannick Hold-Geoffroy, Kalyan Sunkavalli, Jonathan Eisenmann, Matthew Fisher, Emiliano Gambaretto, Sunil Hadap, and Jean-Francois Lalonde. A perceptual measure for deep single image camera calibration. In Proceedings of the IEEE Conference on Computer Vision and Pattern Recognition, pp. 2354-2363, 2018.
Abhishek Kar, Shubham Tulsiani, Joao Carreira, and Jitendra Malik. Amodal completion and size constancy in natural scenes. In Proceedings of the IEEE international conference on computer vision, pp. 127-135, 2015.
Johannes Kopf, Xuejian Rong, and Jia-Bin Huang. Robust consistent video depth estimation. In Proceedings of the IEEE/CVF Conference on Computer Vision and Pattern Recognition, pp. 1611-1621, 2021.
Byeong-Uk Lee, Kyunghyun Lee, and In So Kweon. Depth completion using plane-residual representation. In Proceedings of the IEEE/CVF Conference on Computer Vision and Pattern Recognition, pp. 13916-13925, 2021.
Hyunjoon Lee, Eli Shechtman, Jue Wang, and Seungyong Lee. Automatic upright adjustment of photographs with robust camera calibration. IEEE transactions on pattern analysis and machine intelligence, 36(5):833-844, 2013.
Jin Han Lee, Myung-Kyu Han, Dong Wook Ko, Il Hong Suh. From big to small: Multi-scale local planar guidance for monocular depth estimation. arXiv preprint arXiv:1907.10326, 2019.
Zhengqi Li, Tali Dekel, Forrester Cole, Richard Tucker, Noah Snavely, Ce Liu, and William T Freeman. Learning the depths of moving people by watching frozen people. In Proceedings of the IEEE/CVF conference on computer vision and pattern recognition, pp. 4521-4530, 2019.
Xuan Luo, Jia-Bin Huang, Richard Szeliski, Kevin Matzen, and Johannes Kopf. Consistent video depth estimation. ACM Transactions on Graphics (ToG), 39(4):71-1, 2020.
Fangchang Ma and Sertac Karaman. Sparse-to-dense: Depth prediction from sparse depth samples and a single image. In 2018 IEEE international conference on robotics and automation (ICRA), pp. 4796-4803. IEEE, 2018.
Ricardo Martin-Brualla, Noha Radwan, Mehdi SM Sajjadi, Jonathan T Barron, Alexey Dosovitskiy, and Daniel Duckworth. Nerf in the wild: Neural radiance fields for unconstrained photo collections. In Proceedings of the IEEE/CVF Conference on Computer Vision and Pattern Recognition, pp. 7210-7219, 2021.
Nikolaus Mayer, Eddy Ilg, Philip Hausser, Philipp Fischer, 942 Daniel Cremers, Alexey Dosovitskiy, and Thomas Brox. A large dataset to train convolutional networks for disparity, optical flow, and scene flow estimation. In Proceedings of the IEEE conference on computer vision and pattern recognition, pp. 4040-4048, 2016.
Ben Mildenhall, Pratul P Srinivasan, Matthew Tancik, Jonathan T Barron, Ravi Ramamoorthi, and Ren Ng. Nerf: Representing scenes as neural radiance fields for view synthesis. Communications of the ACM, 65(1):99-106, 2021.
Thomas Müller, Alex Evans, Christoph Schied, and Alexander Keller. Instant neural graphics primitives with a multiresolution hash encoding. arXiv preprint arXiv:2201.05989, 2022.
Jeong Joon Park, Peter Florence, Julian Straub, Richard Newcombe, and Steven Lovegrove. Deepsdf: Learning continuous signed distance functions for shape representation. In Proceedings of the IEEE/CVF conference on computer vision and pattern recognition, pp. 165-174, 2019.
Rene' Ranftl, Katrin Lasinger, David Hafner, Konrad Schindler, and Vladlen Koltun. Towards robust monocular depth estimation: Mixing datasets for zero-shot cross-dataset transfer. IEEE transactions on pattern analysis and machine intelligence, 2020.
Olaf Ronneberger, Philipp Fischer, and Thomas Brox. U-net: Convolutional networks for biomedical image segmentation. In International Conference on Medical image computing and computer-assisted intervention, pp. 234-241.Springer, 2015.
Benjamin Ummenhofer, Huizhong Zhou, Jonas Uhrig, Nikolaus Mayer, Eddy Ilg, Alexey Dosovitskiy, and Thomas Brox. Demon: Depth and motion network for learning monocular stereo. In Proceedings of the IEEE conference on computer vision and pattern recognition, pp. 5038-5047, 2017.
Wenhai Wang, Enze Xie, Xiang Li, Deng-Ping Fan, Kaitao Song, Ding Liang, Tong Lu, Ping Luo, and Ling Shao. Pvt v2: Improved baselines with pyramid vision transformer. Computational Visual Media, 8(3):415-424, 2022.
Scott Workman, Connor Greenwell, Menghua Zhai, Ryan Baltenberger, and Nathan Jacobs. Deepfocal: A method for direct focal length estimation. In 2015 IEEE International Conference on Image Processing (ICIP), pp. 1369-1373. IEEE, 2015.
Scott Workman, Menghua Zhai, and Nathan Jacobs. Horizon lines in the wild. arXiv preprint arXiv:1604.02129, 2016.
Yao Yao, Zixin Luo, Shiwei Li, Tian Fang, and Long Quan. Mvsnet: Depth inference for unstructured multi-view stereo. In Proceedings of the European conference on computer vision (ECCV), pp. 767-783, 2018.
Wei Yin, Jianming Zhang, Oliver Wang, Simon Niklaus, Long Mai, Simon Chen, and Chunhua Shen. Learning to recover 3d scene shape from a single image. In Proceedings of the IEEE/CVF Conference on Computer Vision and Pattern Recognition, pp. 204-213, 2021.
Menghua Zhai, Scott Workman, and Nathan Jacobs. Detecting vanishing points using global image context in a non-manhattan world. In Proceedings of the IEEE Conference on Computer Vision and Pattern Recognition, pp. 5657-5665, 2016.
Tinghui Zhou, Matthew Brown, Noah Snavely, and David G Lowe. Unsupervised learning of depth and ego-motion from video. In Proceedings of the IEEE conference on computer vision and pattern recognition, pp. 1851-1858, 2017.
Rui Zhu, Xingyi Yang, Yannick Hold-Geoffroy, Federico Perazzi, Jonathan Eisenmann, Kalyan Sunkavalli, and Manmohan Chandraker. Single view metrology in the wild. In European Conference on Computer Vision, pp. 316-333. Springer, 2020.
Enric Corona, Albert Pumarola, Guillem Alenyà, Gerard Pons-Moll, Francesc Moreno-Noguer—SMPLicit: Topology-aware Generative Model for Clothed People, Corona et al., 2021.

(56) References Cited

OTHER PUBLICATIONS

Kevin Lin, Lijuan Wang, Zicheng Liu—End-to-End Human Pose and Mesh Reconstruction with Transformers, CVPR (2021).
Kripasindhu Sarkar, Vladislav Golyanik, Lingjie Liu, Christian Theobalt—Style and Pose Control for Image Synthesis of Humans from a Single Monocular View, Sarkar et al., 2021.
Xie et al., SegFormer: Simple and Efficient Design for Semantic Segmentation with Transformers, 2021.
Zhe Cao, Gines Hildago, Tomas Simon, Shih-En Wei, Yaser Sheikh—OpenPose—Realtime Multi-Person 2D Pose Estimation using Part Affinity Fields, CVPS (2019).
Office Action as received in CN Application No. 2023112860680.7 dated Nov. 2, 2023.
Combined Search Report and Written Opinion as received in GB 2312456.3 dated Feb. 15, 2024.
Lili Wang et al., "Bidirectional Shadow Rendering for Interactive Mixed 360° Videos", 2021 IEEE Virtual Reality and 3D User Interfaces (VR), p. 170-178, 2021.
Combined Search Report and Written Opinion as received in GB 2402407.7 dated Jul. 9, 2024.
U.S. Appl. No. 18/055,585, Aug. 26, 2024, Office Action.
U.S. Appl. No. 18/055,590, Sep. 17, 2024, Office Action.
U.S. Appl. No. 18/304,162, Sep. 11, 2024, Notice of Allowance.
Combined Search Report and Written Opinion as received in GB 2403090.0 dated Jan. 28, 2025.
Chung-Yi Weng et al. "Photo Wake-Up: 3D Character Animation from a Single Photo" IEEE/CVF Conference on Computer Vision and Pattern Recognition (CVPR), pp. 5908-5917 (2019).
Federica Bogo et al. "Keep it SMPL: Automatic Estimation of 3D Human Pose and Shape from a Single Image", ECCV, pp. 561-578 (2016).
Imry Kissos et al. "Beyond Weak Perspective for Monocular 3D Human Pose Estimation", Springer Nature, pp. 541-554 (2021).
S. Lv, X. Yang, L. Gu, X. Xing, L. Pan and M. Fang, "Delaunay Mesh Reconstruction from 3D Medical Images Based on Centroidal Voronoi Tessellations," 2009 International Conference on Computational Intelligence and Software Engineering, Wuhan, China, 2009, pp. 1-4, doi: 10.1109/CISE.2009.5364777. (Year: 2009).
Shih-En Wei et al. "Convolutional Pose Machines", IEEE Conference on Computer Vision and Pattern Recognition (CVPR), pp. 4724-4732 (2016).
Shrivastava, S. (2020). Stereo Vision Based Object Detection Using V-Disparity and 3D Density-Based Clustering. In: Arai, K., Kapoor, S. (eds) Advances in Computer Vision. CVC 2019. Advances in Intelligent Systems and Computing, vol. 944. Springer, Cham. (Year: 2019).
Watson, Jamie, Oisin Mac Aodha, Daniyar Turmukhambetov, Gabriel J. Brostow and Michael Firman. University of Edinburgh. "Learning Stereo from Single Images." European Conference on Computer Vision (2020). Aug. 2020. (Year: 2020).
U.S. Appl. No. 18/055,584, Dec. 16, 2024, Office Action.
U.S. Appl. No. 18/055,585, Jan. 13, 2025, Notice of Allowance.
U.S. Appl. No. 18/055,590, Feb. 3, 2025, Notice of Allowance.
U.S. Appl. No. 18/055,594, Mar. 5, 2025, Notice of Allowance.
U.S. Appl. No. 18/304,144, Mar. 10, 2025, Office Action.
U.S. Appl. No. 18/304,147, Jan. 21, 2025, Office Action.

* cited by examiner

Global Modulation Block 602
Spatial Modulation Block 603
612
614
616
fc
604
604a
604b
604c
604d
Mod std
Upsample
Conv 3x3
Norm std
620
618
APN
606
606a
606b
606c
622
624
608
608a
608b
608c
608d
610
610a
610b
610c
sMod std
sNorm std
626
628
630
632

2002
2004
2006
2008
2012a
Shape: Sphere
Color: Brown
Material: Metal 2014
2016a
2016b
2016c
Shape:
Color: Brown
Cube
Sphere
Prism 2010
2012b
2012c 5610b 5610a

6502

6500

GENERATING SCALE FIELDS INDICATING PIXEL-TO-METRIC DISTANCES RELATIONSHIPS IN DIGITAL IMAGES VIA NEURAL NETWORKS

CROSS-REFERENCE TO RELATED APPLICATIONS

This application claims priority to and the benefit of U.S. Provisional Patent Application No. 63/378,212, filed Oct. 3, 2022, which is incorporated herein by reference in its entirety. This application is a continuation-in-part of U.S. patent application Ser. No. 18/058,538, filed on Nov. 23, 2022. This application is also a continuation-in-part of U.S. patent application Ser. No. 18/190,500, filed on Mar. 27, 2023, and U.S. patent application Ser. No. 18/190,513, filed on Mar. 27, 2023, each of which claims the benefit of and priority to U.S. Provisional Patent Application No. 63/378,616, filed Oct. 6, 2022, and is a continuation-in-part of U.S. patent application Ser. No. 18/058,538, filed Nov. 23, 2022, U.S. patent application Ser. No. 18/058,554, filed Nov. 23, 2022, U.S. patent application Ser. No. 18/058,575, filed Nov. 23, 2022, U.S. patent application Ser. No. 18/058,601, filed Nov. 23, 2022, U.S. patent application Ser. No. 18/058,622, filed Nov. 23, 2022, and U.S. patent application Ser. No. 18/058,630, filed Nov. 23, 2022. This application is also a continuation-in-part of U.S. patent application Ser. No. 18/190,544, filed on Mar. 27, 2023, and U.S. patent application Ser. No. 18/190,556, filed on Mar. 27, 2023, each of which claims the benefit of and priority to U.S. Provisional Patent Application No. 63/378,616, filed Oct. 6, 2022, and is a continuation-in-part of U.S. patent application Ser. No. 18/058,538, filed Nov. 23, 2022, U.S. patent application Ser. No. 18/058,554, filed Nov. 23, 2022, and U.S. patent application Ser. No. 18/058,601, filed Nov. 23, 2022. The aforementioned applications are hereby incorporated by reference in their entirety.

BACKGROUND

Recent years have seen significant advancement in hardware and software platforms for performing computer vision and image editing tasks. Indeed, systems provide a variety of image-related tasks, such as object identification, classification, segmentation, composition, style transfer, image inpainting, etc.

SUMMARY

One or more embodiments described herein provide benefits and/or solve one or more problems in the art with systems, methods, and non-transitory computer-readable media that implement artificial intelligence models to facilitate flexible and efficient scene-based image editing. To illustrate, in one or more embodiments, a system utilizes one or more machine learning models to learn/identify characteristics of a digital image, anticipate potential edits to the digital image, and/or generate supplementary components that are usable in various edits. Accordingly, the system gains an understanding of the two-dimensional image as if it were a real scene, having distinct semantic areas reflecting real-world (e.g., three-dimensional) conditions. Further, the system enables the two-dimensional image to be edited so that the changes automatically and consistently reflect the corresponding real-world conditions without relying on additional user input. The system also provides realistic editing of two-dimensional objects in two-dimensional images based on three-dimensional characteristics of two-dimensional scenes, such as by generating one or more three-dimensional meshes based on the two-dimensional images. Thus, the system facilitates flexible and intuitive editing of digital images while efficiently reducing the user interactions typically required to make such edits.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 47A-47C illustrate example three-dimensional meshes corresponding to a two-dimensional image in connection with generating a proxy three-dimensional mesh for an object in accordance with one or more embodiments;

DETAILED DESCRIPTION

Figure 1:
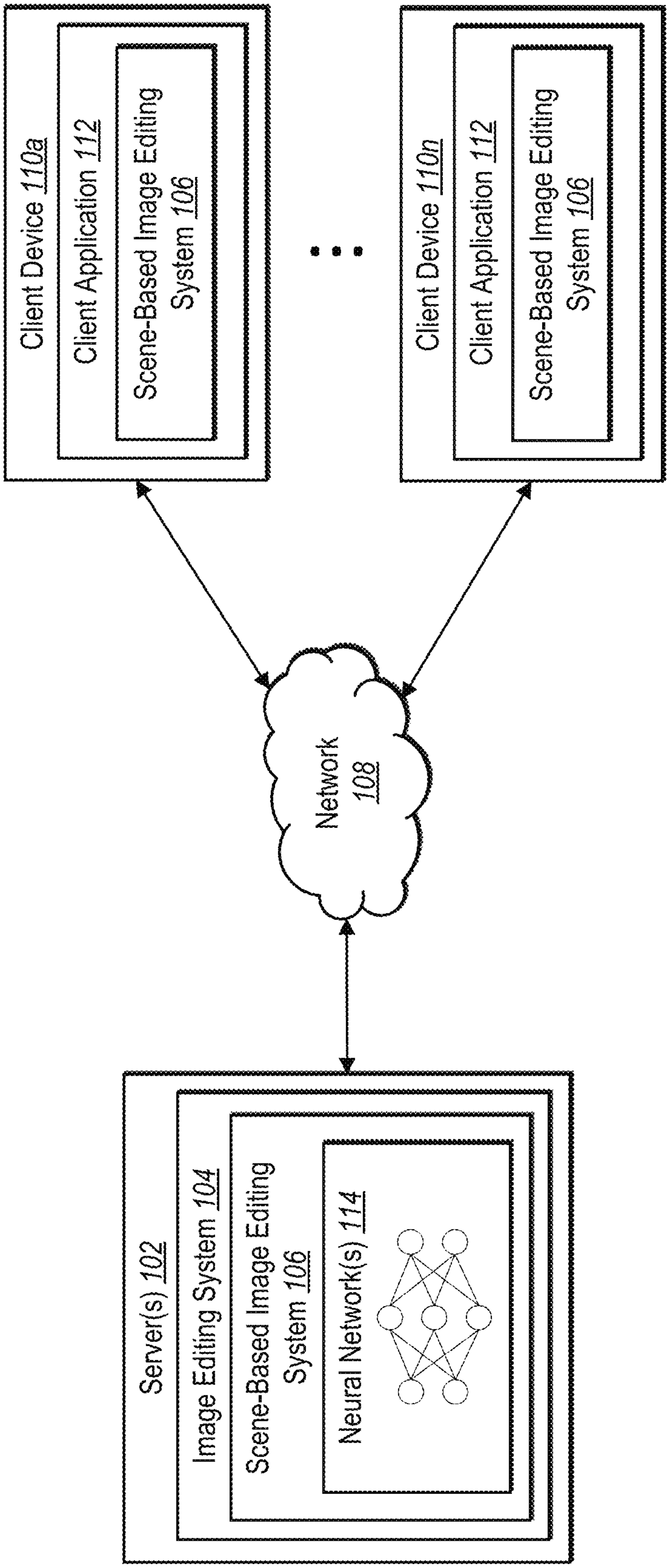
FIG. 1 illustrates an example environment in which a scene-based image editing system operates in accordance with one or more embodiments.

One or more embodiments described herein include a scene-based image editing system that implements scene-based image editing techniques using intelligent image understanding. Indeed, in one or more embodiments, the scene-based image editing system utilizes one or more machine learning models to process a digital image in anticipation of user interactions for modifying the digital image. For example, in some implementations, the scene-based image editing system performs operations that build a knowledge set for the digital image and/or automatically initiate workflows for certain modifications before receiving user input for those modifications. Based on the pre-processing, the scene-based image editing system facilitates user interactions with the digital image as if it were a real scene reflecting real-world conditions. For instance, the scene-based image editing system enables user interactions that target pre-processed semantic areas (e.g., objects that have been identified and/or masked via pre-processing) as distinct components for editing rather than target the individual underlying pixels. Further, the scene-based image editing system automatically modifies the digital image to consistently reflect the corresponding real-world conditions.

As indicated above, in one or more embodiments, the scene-based image editing system utilizes machine learning to process a digital image in anticipation of future modifications. In particular, in some cases, the scene-based image editing system employs one or more machine learning models to perform preparatory operations that will facilitate subsequent modification. In some embodiments, the scene-based image editing system performs the pre-processing automatically in response to receiving the digital image. For instance, in some implementations, the scene-based image editing system gathers data and/or initiates a workflow for editing the digital image before receiving user input for such edits. Thus, the scene-based image editing system allows user interactions to directly indicate intended edits to the digital image rather than the various preparatory steps often utilized for making those edits.

As an example, in one or more embodiments, the scene-based image editing system pre-processes a digital image to facilitate object-aware modifications. In particular, in some embodiments, the scene-based image editing system pre-processes a digital image in anticipation of user input for manipulating one or more semantic areas of a digital image, such as user input for moving or deleting one or more objects within the digital image.

To illustrate, in some instances, the scene-based image editing system utilizes a segmentation neural network to generate, for each object portrayed in a digital image, an object mask. In some cases, the scene-based image editing system utilizes a hole-filing model to generate, for each object (e.g., for each corresponding object mask), a content fill (e.g., an inpainting segment). In some implementations, the scene-based image editing system generates a completed background for the digital image by pre-filling object holes with the corresponding content fill. Accordingly, in one or more embodiments, the scene-based image editing system pre-processes the digital image in preparation for an object-aware modification, such as a move operation or a delete operation, by pre-generating object masks and/or content fills before receiving user input for such a modification.

Thus, upon receiving one or more user inputs targeting an object of the digital image for an object-aware modification (e.g., a move operation or a delete operation), the scene-based image editing system leverages the corresponding pre-generated object mask and/or content fill to complete the modification. For instance, in some cases, the scene-based image editing system detects, via a graphical user interface displaying the digital image, a user interaction with an object portrayed therein (e.g., a user selection of the object). In response to the user interaction, the scene-based image editing system surfaces the corresponding object mask that was previously generated. The scene-based image editing system further detects, via the graphical user interface, a second user interaction with the object (e.g., with the surfaced object mask) for moving or deleting the object. Accordingly, the moves or deletes the object, revealing the content fill previously positioned behind the object.

Additionally, in one or more embodiments, the scene-based image editing system pre-processes a digital image to generate a semantic scene graph for the digital image. In particular, in some embodiments, the scene-based image editing system generates a semantic scene graph to map out various characteristics of the digital image. For instance, in some cases, the scene-based image editing system generates a semantic scene graph that describes the objects portrayed in the digital image, the relationships or object attributes of those objects, and/or various other characteristics determined to be useable for subsequent modification of the digital image.

In some cases, the scene-based image editing system utilizes one or more machine learning models to determine the characteristics of the digital image to be included in the semantic scene graph. Further, in some instances, the scene-based image editing system generates the semantic scene graph utilizing one or more predetermined or pre-generated template graphs. For instance, in some embodiments, the scene-based image editing system utilizes an image analysis graph, a real-world class description graph, and/or a behavioral policy graph in generating the semantic scene.

Thus, in some cases, the scene-based image editing system uses the semantic scene graph generated for a digital image to facilitate modification of the digital image. For instance, in some embodiments, upon determining that an object has been selected for modification, the scene-based image editing system retrieves characteristics of the object from the semantic scene graph to facilitate the modification. To illustrate, in some implementations, the scene-based image editing system executes or suggests one or more additional modifications to the digital image based on the characteristics from the semantic scene graph.

As one example, in some embodiments, upon determining that an object has been selected for modification, the scene-based image editing system provides one or more object attributes of the object for display via the graphical user interface displaying the object. For instance, in some cases, the scene-based image editing system retrieves a set of object attributes for the object (e.g., size, shape, or color) from the corresponding semantic scene graph and presents the set of object attributes for display in association with the object.

In some cases, the scene-based image editing system further facilitates user interactivity with the displayed set of object attributes for modifying one or more of the object attributes. For instance, in some embodiments, the scene-based image editing system enables user interactions that change the text of the displayed set of object attributes or select from a provided set of object attribute alternatives. Based on the user interactions, the scene-based image editing system modifies the digital image by modifying the one or more object attributes in accordance with the user interactions.

As another example, in some implementations, the scene-based image editing system utilizes a semantic scene graph to implement relationship-aware object modifications. To illustrate, in some cases, the scene-based image editing system detects a user interaction selecting an object portrayed in a digital image for modification. The scene-based image editing system references the semantic scene graph previously generated for the digital image to identify a relationship between that object and one or more other objects portrayed in the digital image. Based on the identified relationships, the scene-based image editing system also targets the one or more related objects for the modification.

For instance, in some cases, the scene-based image editing system automatically adds the one or more related objects to the user selection. In some instances, the scene-based image editing system provides a suggestion that the one or more related objects be included in the user selection and adds the one or more related objects based on an acceptance of the suggestion. Thus, in some embodiments, the scene-based image editing system modifies the one or more related objects as it modifies the user-selected object.

In one or more embodiments, in addition to pre-processing a digital image to identify objects portrayed as well as their relationships and/or object attributes, the scene-based image editing system further pre-processes a digital image to aid in the removal of distracting objects. For example, in some cases, the scene-based image editing system utilizes a distractor detection neural network to classify one or more objects portrayed in a digital image as subjects of the digital image and/or classify one or more other objects portrayed in the digital image as distracting objects. In some embodiments, the scene-based image editing system provides a visual indication of the distracting objects within a display of the digital image, suggesting that these objects be removed to present a more aesthetic and cohesive visual result.

Further, in some cases, the scene-based image editing system detects the shadows of distracting objects (or other selected objects) for removal along with the distracting objects. In particular, in some cases, the scene-based image editing system utilizes a shadow detection neural network to identify shadows portrayed in the digital image and associate those shadows with their corresponding objects. Accordingly, upon removal of a distracting object from a digital image, the scene-based image editing system further removes the associated shadow automatically.

In one or more embodiments, the scene-based image editing system also provides editing of two-dimensional images based on three-dimensional characteristics of scenes in the two-dimensional images. For example, the scene-based image editing system utilizes depth estimations of scenes of two-dimensional images to generate three-dimensional meshes representing foreground/background objects in the scenes. Additionally, the scene-based image editing system utilizes the three-dimensional characteristics to provide realistic editing of objects within the two-dimensional images according to three-dimensional relative positions. To illustrate, the scene-based image editing system provides shadow generation or focal point determination according to the three-dimensional characteristics of scenes in two-dimensional images. In additional embodiments, the scene-based image editing system provides three-dimensional human modeling with interactive reposing.

The scene-based image editing system provides advantages over conventional systems. Indeed, conventional image editing systems suffer from several technological shortcomings that result in inflexible and inefficient operation. To illustrate, conventional systems are typically inflexible in that they rigidly perform edits on a digital image on the pixel level. In particular, conventional systems often perform a particular edit by targeting pixels individually for the edit. Accordingly, such systems often rigidly require user interactions for editing a digital image to interact with individual pixels to indicate the areas for the edit. Additionally, many conventional systems (e.g., due to their pixel-based editing) require users to have a significant amount of deep, specialized knowledge in how to interact with digital images, as well as the user interface of the system itself, to select the desired pixels and execute the appropriate workflow to edit those pixels.

Additionally, conventional image editing systems often fail to operate efficiently. For example, conventional systems typically require a significant amount of user interaction to modify a digital image. Indeed, in addition to user interactions for selecting individual pixels, conventional systems typically require a user to interact with multiple menus, sub-menus, and/or windows to perform the edit. For instance, many edits may require multiple editing steps using multiple different tools. Accordingly, many conventional systems require multiple interactions to select the proper tool at a given editing step, set the desired parameters for the tool, and utilize the tool to execute the editing step.

The scene-based image editing system operates with improved flexibility when compared to conventional systems. In particular, the scene-based image editing system implements techniques that facilitate flexible scene-based editing. For instance, by pre-processing a digital image via machine learning, the scene-based image editing system allows a digital image to be edited as if it were a real scene, in which various elements of the scene are known and are able to be interacted with intuitively on the semantic level to perform an edit while continuously reflecting real-world conditions. Indeed, where pixels are the targeted units under many conventional systems and objects are generally treated as groups of pixels, the scene-based image editing system allows user interactions to treat whole semantic areas (e.g., objects) as distinct units. Further, where conventional systems often require deep, specialized knowledge of the tools and workflows needed to perform edits, the scene-based editing system offers a more intuitive editing experience that enables a user to focus on the end goal of the edit.

Further, the scene-based image editing system operates with improved efficiency when compared to conventional systems. In particular, the scene-based image editing system implements a graphical user interface that reduces the user interactions required for editing. Indeed, by pre-processing a digital image in anticipation of edits, the scene-based image editing system reduces the user interactions that are required to perform an edit. Specifically, the scene-based image editing system performs many of the operations required for an edit without relying on user instructions to perform those operations. Thus, in many cases, the scene-based image editing system reduces the user interactions typically required under conventional systems to select pixels to target for editing and to navigate menus, sub-menus, or other windows to select a tool, select its corresponding parameters, and apply the tool to perform the edit. By implementing a graphical user interface that reduces and simplifies user interactions needed for editing a digital image, the scene-based image editing system offers improved user experiences on computing devices—such as tablets or smart phone devices—having relatively limited screen space.

Additional detail regarding the scene-based image editing system will now be provided with reference to the figures. For example, FIG. 1 illustrates a schematic diagram of an exemplary system 100 in which a scene-based image editing system 106 operates. As illustrated in FIG. 1, the system 100 includes a server(s) 102, a network 108, and client devices 110*a*-110*n*.

Although the system 100 of FIG. 1 is depicted as having a particular number of components, the system 100 is capable of having any number of additional or alternative components (e.g., any number of servers, client devices, or other components in communication with the scene-based image editing system 106 via the network 108). Similarly, although FIG. 1 illustrates a particular arrangement of the server(s) 102, the network 108, and the client devices 110*a*-110*n*, various additional arrangements are possible.

The server(s) 102, the network 108, and the client devices 110*a*-110*n* are communicatively coupled with each other either directly or indirectly (e.g., through the network 108 discussed in greater detail below in relation to FIG. 94). Moreover, the server(s) 102 and the client devices 110*a*-110*n* include one or more of a variety of computing devices (including one or more computing devices as discussed in greater detail with relation to FIG. 94).

As mentioned above, the system 100 includes the server(s) 102. In one or more embodiments, the server(s) 102 generates, stores, receives, and/or transmits data including digital images and modified digital images. In one or more embodiments, the server(s) 102 comprises a data server. In some implementations, the server(s) 102 comprises a communication server or a web-hosting server.

In one or more embodiments, the image editing system 104 provides functionality by which a client device (e.g., a user of one of the client devices 110*a*-110*n*) generates, edits, manages, and/or stores digital images. For example, in some instances, a client device sends a digital image to the image editing system 104 hosted on the server(s) 102 via the network 108. The image editing system 104 then provides options that the client device may use to edit the digital image, store the digital image, and subsequently search for, access, and view the digital image. For instance, in some cases, the image editing system 104 provides one or more options that the client device may use to modify objects within a digital image.

In one or more embodiments, the client devices 110*a*-110*n* include computing devices that access, view, modify, store, and/or provide, for display, digital images. For example, the client devices 110*a*-110*n* include smartphones, tablets, desktop computers, laptop computers, head-mounted-display devices, or other electronic devices. The client devices 110*a*-110*n* include one or more applications (e.g., the client application 112) that can access, view, modify, store, and/or provide, for display, digital images. For example, in one or more embodiments, the client application 112 includes a software application installed on the client devices 110*a*-110*n*. Additionally, or alternatively, the client application 112 includes a web browser or other application that accesses a software application hosted on the server(s) 102 (and supported by the image editing system 104).

To provide an example implementation, in some embodiments, the scene-based image editing system 106 on the server(s) 102 supports the scene-based image editing system 106 on the client device 110*n*. For instance, in some cases, the scene-based image editing system 106 on the server(s)

102 learns parameters for a neural network(s) 114 for analyzing and/or modifying digital images. The scene-based image editing system 106 then, via the server(s) 102, provides the neural network(s) 114 to the client device 110*n*. In other words, the client device 110*n* obtains (e.g., downloads) the neural network(s) 114 with the learned parameters from the server(s) 102. Once downloaded, the scene-based image editing system 106 on the client device 110*n* utilizes the neural network(s) 114 to analyze and/or modify digital images independent from the server(s) 102.

In alternative implementations, the scene-based image editing system 106 includes a web hosting application that allows the client device 110*n* to interact with content and services hosted on the server(s) 102. To illustrate, in one or more implementations, the client device 110*n* accesses a software application supported by the server(s) 102. In response, the scene-based image editing system 106 on the server(s) 102 modifies digital images. The server(s) 102 then provides the modified digital images to the client device 110*n* for display.

Indeed, the scene-based image editing system 106 is able to be implemented in whole, or in part, by the individual elements of the system 100. Indeed, although FIG. 1 illustrates the scene-based image editing system 106 implemented with regard to the server(s) 102, different components of the scene-based image editing system 106 are able to be implemented by a variety of devices within the system 100. For example, one or more (or all) components of the scene-based image editing system 106 are implemented by a different computing device (e.g., one of the client devices 110*a*-110*n*) or a separate server from the server(s) 102 hosting the image editing system 104. Indeed, as shown in FIG. 1, the client devices 110*a*-110*n* include the scene-based image editing system 106. Example components of the scene-based image editing system 106 will be described below with regard to FIG. 44.

Figure 2:
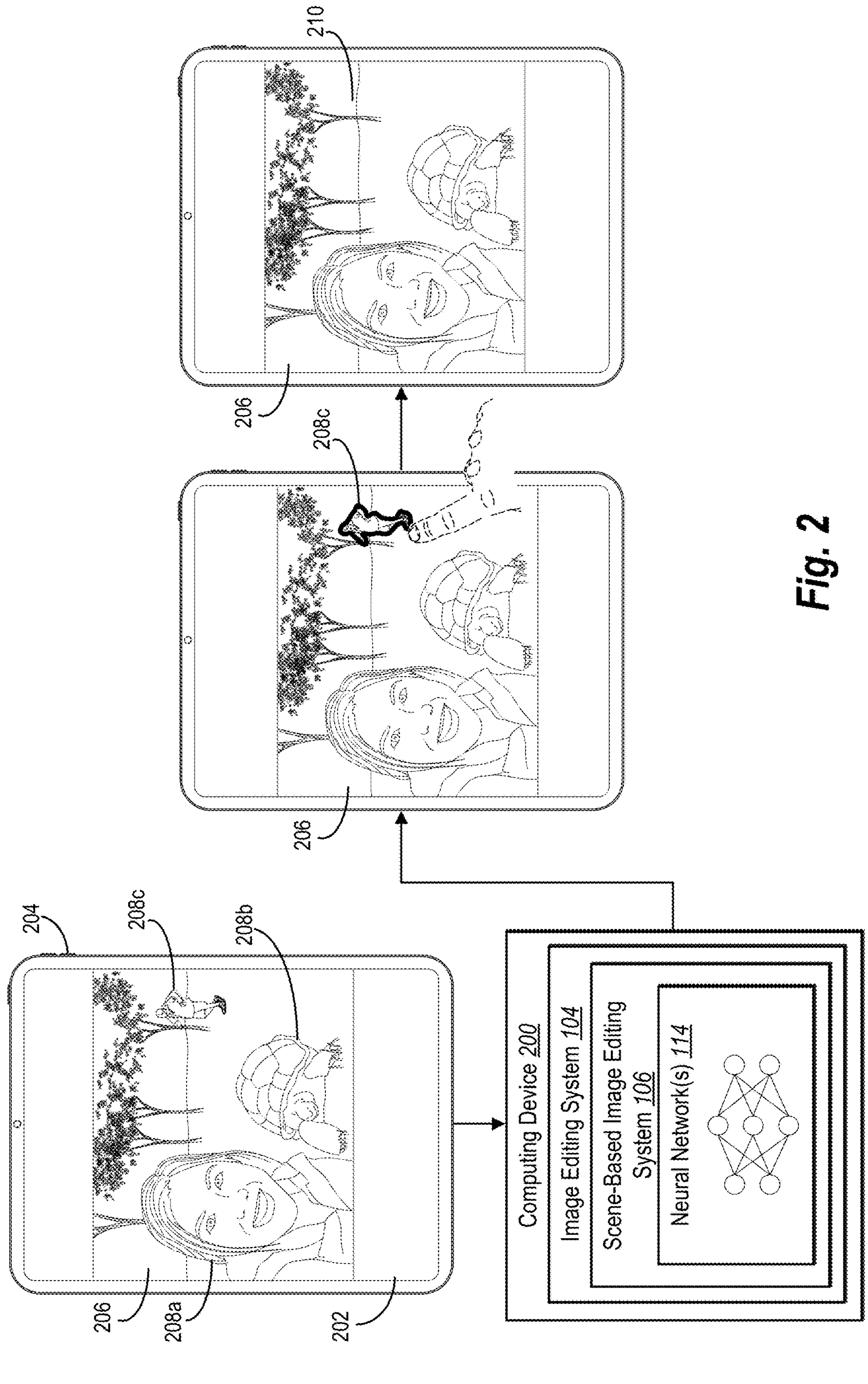
FIG. 2 illustrates an overview diagram of the scene-based image editing system editing a digital image as a real scene in accordance with one or more embodiments.

As mentioned, in one or more embodiments, the scene-based image editing system 106 manages a two-dimensional digital image as a real scene reflecting real-world conditions. In particular, the scene-based image editing system 106 implements a graphical use interface that facilitates the modification of a digital image as a real scene. FIG. 2 illustrates an overview diagram of the scene-based image editing system 106 managing a digital image as a real scene in accordance with one or more embodiments.

As shown in FIG. 2, the scene-based image editing system 106 provides a graphical user interface 202 for display on a client device 204. As further shown, the scene-based image editing system 106 provides, for display within the graphical user interface 202, a digital image 206. In one or more embodiments, the scene-based image editing system 106 provides the digital image 206 for display after the digital image 206 is captured via a camera of the client device 204. In some instances, the scene-based image editing system 106 receives the digital image 206 from another computing device or otherwise accesses the digital image 206 at some storage location, whether local or remote.

As illustrated in FIG. 2, the digital image 206 portrays various objects. In one or more embodiments, an object includes a distinct visual component portrayed in a digital image. In particular, in some embodiments, an object includes a distinct visual element that is identifiable separately from other visual elements portrayed in a digital image. In many instances, an object includes a group of pixels that, together, portray the distinct visual element separately from the portrayal of other pixels. An object refers to a visual representation of a subject, concept, or sub-concept in an image. In particular, an object refers to a set of pixels in an image that combine to form a visual depiction of an item, article, partial item, component, or element. In some cases, an object is identifiable via various levels of abstraction. In other words, in some instances, an object includes separate object components that are identifiable individually or as part of an aggregate. To illustrate, in some embodiments, an object includes a semantic area (e.g., the sky, the ground, water, etc.). In some embodiments, an object comprises an instance of an identifiable thing (e.g., a person, an animal, a building, a car, or a cloud, clothing, or some other accessory). In one or more embodiments, an object includes sub-objects, parts, or portions. For example, a person's face, hair, or leg can be objects that are part of another object (e.g., the person's body). In still further implementations, a shadow or a reflection comprises part of an object. As another example, a shirt is an object that can be part of another object (e.g., a person).

As shown in FIG. 2, the digital image 206 portrays a static, two-dimensional image. In particular, the digital image 206 portrays a two-dimensional projection of a scene that was captured from the perspective of a camera. Accordingly, the digital image 206 reflects the conditions (e.g., the lighting, the surrounding environment, or the physics to which the portrayed objects are subject) under which the image was captured; however, it does so statically. In other words, the conditions are not inherently maintained when changes to the digital image 206 are made. Under many conventional systems, additional user interactions are required to maintain consistency with respect to those conditions when editing a digital image.

Further, the digital image 206 includes a plurality of individual pixels that collectively portray various semantic areas. For instance, the digital image 206 portrays a plurality of objects, such as the objects 208*a*-208*c*. While the pixels of each object are contributing to the portrayal of a cohesive visual unit, they are not typically treated as such. Indeed, a pixel of a digital image is typically inherently treated as an individual unit with its own values (e.g., color values) that are modifiable separately from the values of other pixels. Accordingly, conventional systems typically require user interactions to target pixels individually for modification when making changes to a digital image.

As illustrated in FIG. 2, however, the scene-based image editing system 106 manages the digital image 206 as a real scene, consistently maintaining the conditions under which the image was captured when modifying the digital image. In particular, the scene-based image editing system 106 maintains the conditions automatically without relying on user input to reflect those conditions. Further, the scene-based image editing system 106 manages the digital image 206 on a semantic level. In other words, the digital image 206 manages each semantic area portrayed in the digital image 206 as a cohesive unit. For instance, as shown in FIG. 2 and as will be discussed, rather than requiring a user interaction to select the underlying pixels in order to interact with a corresponding object, the scene-based image editing system 106 enables user input to target the object as a unit and the scene-based image editing system 106 automatically recognizes the pixels that are associated with that object.

To illustrate, as shown in FIG. 2, in some cases, the scene-based image editing system 106 operates on a computing device 200 (e.g., the client device 204 or a separate computing device, such as the server(s) 102 discussed above with reference to FIG. 1) to pre-process the digital image 206. In particular, the scene-based image editing system 106 performs one or more pre-processing operations in anticipation of future modification to the digital image. In one or more embodiments, the scene-based image editing system 106 performs these pre-processing operations automatically in response to receiving or accessing the digital image 206 before user input for making the anticipated modifications have been received. As further shown, the scene-based image editing system 106 utilizes one or more machine learning models, such as the neural network(s) 114 to perform the pre-processing operations.

In one or more embodiments, the scene-based image editing system 106 pre-processes the digital image 206 by learning characteristics of the digital image 206. For instance, in some cases, the scene-based image editing system 106 segments the digital image 206, identifies objects, classifies objects, determines relationships and/or attributes of objects, determines lighting characteristics, and/or determines depth/perspective characteristics. In some embodiments, the scene-based image editing system 106 pre-processes the digital image 206 by generating content for use in modifying the digital image 206. For example, in some implementations, the scene-based image editing system 106 generates an object mask for each portrayed object and/or generates a content fill for filling in the background behind each portrayed object. Background refers to what is behind an object in an image. Thus, when a first object is positioned in front of a second object, the second object forms at least part of the background for the first object. Alternatively, the background comprises the furthest element in the image (often a semantic area like the sky, ground, water, etc.). The background for an object, in or more embodiments, comprises multiple object/semantic areas. For example, the background for an object can comprise part of another object and part of the furthest element in the image. The various pre-processing operations and their use in modifying a digital image will be discussed in more detail below with reference to the subsequent figures.

As shown in FIG. 2, the scene-based image editing system 106 detects, via the graphical user interface 202, a user interaction with the object 208*c*. In particular, the scene-based image editing system 106 detects a user interaction for selecting the object 208*c*. Indeed, in one or more embodiments, the scene-based image editing system 106 determines that the user interaction targets the object even where the user interaction only interacts with a subset of the pixels that contribute to the object 208*c* based on the pre-processing of the digital image 206. For instance, as mentioned, the scene-based image editing system 106 pre-processes the digital image 206 via segmentation in some embodiments. As such, at the time of detecting the user interaction, the scene-based image editing system 106 has already partitioned/segmented the digital image 206 into its various semantic areas. Thus, in some instances, the scene-based image editing system 106 determines that the user interaction selects a distinct semantic area (e.g., the object 208*c*) rather than the particular underlying pixels or image layers with which the user interacted.

As further shown in FIG. 2, the scene-based image editing system 106 modifies the digital image 206 via a modification to the object 208*c*. Though FIG. 2 illustrates a deletion of the object 208*c*, various modifications are possible and will be discussed in more detail below. In some embodiments, the scene-based image editing system 106 edits the object 208*c* in response to detecting a second user interaction for performing the modification.

As illustrated, upon deleting the object 208*c* from the digital image 206, the scene-based image editing system 106 automatically reveals background pixels that have been positioned in place of the object 208*c*. Indeed, as mentioned, in some embodiments, the scene-based image editing system 106 pre-processes the digital image 206 by generating a content fill for each portrayed foreground object. Thus, as indicated by FIG. 2, the scene-based image editing system 106 automatically exposes the content fill 210 previously generated for the object 208*c* upon removal of the object 208*c* from the digital image 206. In some instances, the scene-based image editing system 106 positions the content fill 210 within the digital image so that the content fill 210 is exposed rather than a hole appearing upon removal of object 208*c*.

Thus, the scene-based image editing system 106 operates with improved flexibility when compared to many conventional systems. In particular, the scene-based image editing system 106 implements flexible scene-based editing techniques in which digital images are modified as real scenes that maintain real-world conditions (e.g., physics, environment, or object relationships). Indeed, in the example shown in FIG. 2, the scene-based image editing system 106 utilizes pre-generated content fills to consistently maintain the background environment portrayed in the digital image 206 as though the digital image 206 had captured that background in its entirety. Thus, the scene-based image editing system 106 enables the portrayed objects to be moved around freely (or removed entirely) without disrupting the scene portrayed therein.

Further, the scene-based image editing system 106 operates with improved efficiency. Indeed, by segmenting the digital image 206 and generating the content fill 210 in anticipation of a modification that would remove the object 208*c* from its position in the digital image 206, the scene-based image editing system 106 reduces the user interactions that are typically required to perform those same operations under conventional systems. Thus, the scene-based image editing system 106 enables the same modifications to a digital image with less user interactions when compared to these conventional systems.

As just discussed, in one or more embodiments, the scene-based image editing system 106 implements object-aware image editing on digital images. In particular, the scene-based image editing system 106 implements object-aware modifications that target objects as cohesive units that are interactable and can be modified. FIGS. 3-9B illustrate the scene-based image editing system 106 implementing object-aware modifications in accordance with one or more embodiments.

Indeed, many conventional image editing systems are inflexible and inefficient with respect to interacting with objects portrayed in a digital image. For instance, as previously mentioned, conventional systems are often rigid in that they require user interactions to target pixels individually rather than the objects that those pixels portray. Thus, such systems often require a rigid, meticulous process of selecting pixels for modification. Further, as object identification occurs via user selection, these systems typically fail to anticipate and prepare for potential edits made to those objects.

Further, many conventional image editing systems require a significant amount of user interactions to modify objects portrayed in a digital image. Indeed, in addition to the pixel-selection process for identifying objects in a digital image—which can require a series of user interactions on its own—conventional systems may require workflows of significant length in which a user interacts with multiple menus, sub-menus, tool, and/or windows to perform the edit. Often, performing an edit on an object requires multiple preparatory steps before the desired edit is able to be executed, requiring additional user interactions.

The scene-based image editing system 106 provides advantages over these systems. For instance, the scene-based image editing system 106 offers improved flexibility via object-aware image editing. In particular, the scene-based image editing system 106 enables object-level—rather than pixel-level or layer level—interactions, facilitating user interactions that target portrayed objects directly as cohesive units instead of their constituent pixels individually.

Further, the scene-based image editing system 106 improves the efficiency of interacting with objects portrayed in a digital image. Indeed, previously mentioned, and as will be discussed further below, the scene-based image editing system 106 implements pre-processing operations for identifying and/or segmenting for portrayed objects in anticipation of modifications to those objects. Indeed, in many instances, the scene-based image editing system 106 performs these pre-processing operations without receiving user interactions for those modifications. Thus, the scene-based image editing system 106 reduces the user interactions that are required to execute a given edit on a portrayed object.

Figure 3:
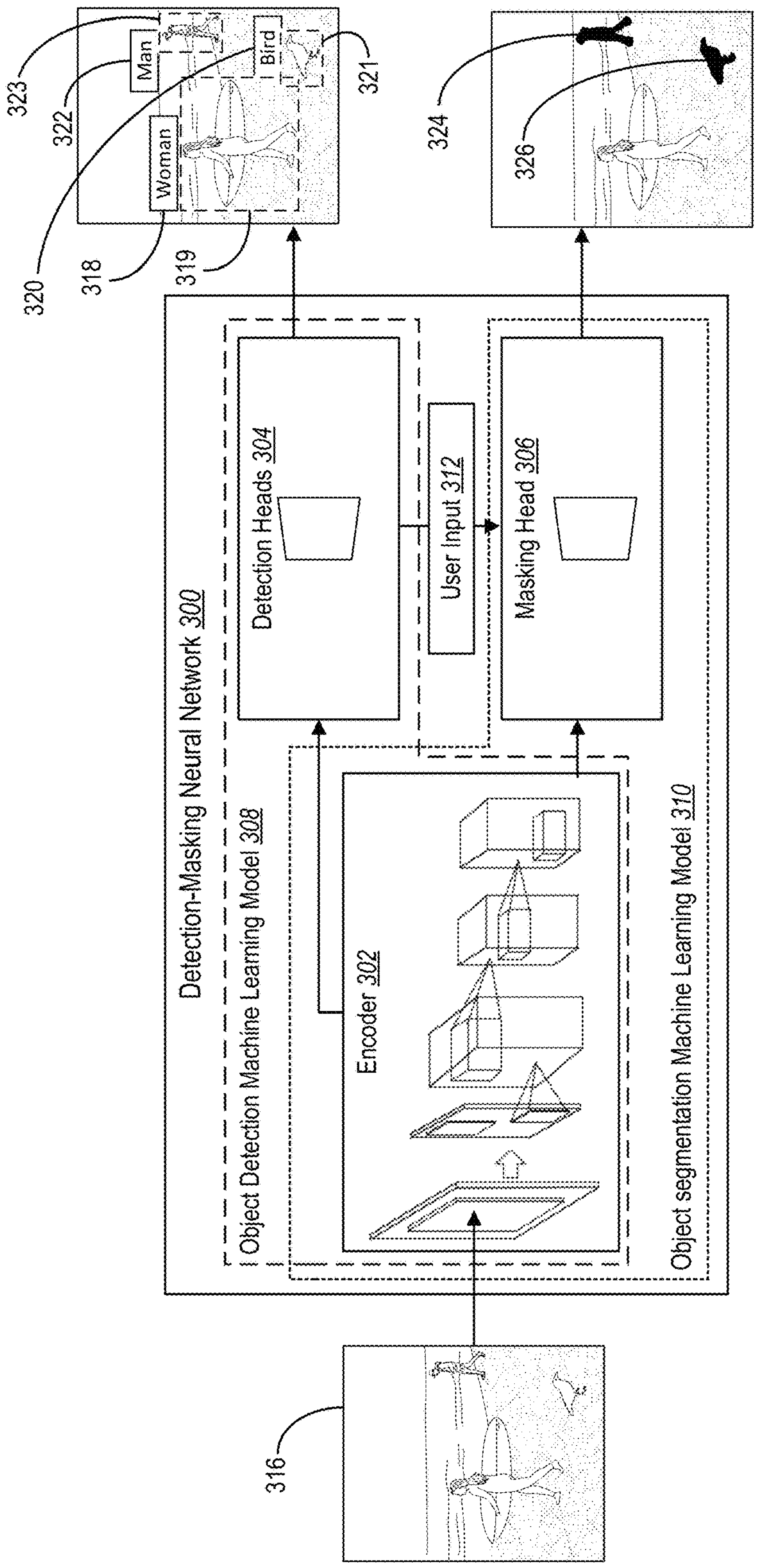
FIG. 3 illustrates a segmentation neural network utilized by the scene-based image editing system to generate object masks for objects in accordance with one or more embodiments.

In some embodiments, the scene-based image editing system 106 implements object-aware image editing by generating an object mask for each object/semantic area portrayed in a digital image. In particular, in some cases, the scene-based image editing system 106 utilizes a machine learning model, such as a segmentation neural network, to generate the object mask(s). FIG. 3 illustrates a segmentation neural network utilized by the scene-based image editing system 106 to generate object masks for objects in accordance with one or more embodiments.

In one or more embodiments, an object mask includes a map of a digital image that has an indication for each pixel of whether the pixel corresponds to part of an object (or other semantic area) or not. In some implementations, the indication includes a binary indication (e.g., a "1" for pixels belonging to the object and a "0" for pixels not belonging to the object). In alternative implementations, the indication includes a probability (e.g., a number between 1 and 0) that indicates the likelihood that a pixel belongs to an object. In such implementations, the closer the value is to 1, the more likely the pixel belongs to an object and vice versa.

In one or more embodiments, a machine learning model includes a computer representation that is tunable (e.g., trained) based on inputs to approximate unknown functions used for generating the corresponding outputs. In particular, in some embodiments, a machine learning model includes a computer-implemented model that utilizes algorithms to learn from, and make predictions on, known data by analyzing the known data to learn to generate outputs that reflect patterns and attributes of the known data. For instance, in some instances, a machine learning model includes, but is not limited to a neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), principal component analysis, or a combination thereof.

In one or more embodiments, a neural network includes a model of interconnected artificial neurons (e.g., organized in layers) that communicate and learn to approximate complex functions and generate outputs based on a plurality of inputs provided to the model. In some instances, a neural network includes one or more machine learning algorithms. Further, in some cases, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a generative adversarial neural network, a graph neural network, or a multi-layer perceptron. In some embodiments, a neural network includes a combination of neural networks or neural network components.

In one or more embodiments, a segmentation neural network includes a computer-implemented neural network that generates object masks for objects portrayed in digital images. In particular, in some embodiments, a segmentation neural network includes a computer-implemented neural network that detects objects within digital images and generates object masks for the objects. Indeed, in some implementations, a segmentation neural network includes a neural network pipeline that analyzes a digital image, identifies one or more objects portrayed in the digital image, and generates an object mask for the one or more objects. In some cases, however, a segmentation neural network focuses on a subset of tasks for generating an object mask.

As mentioned, FIG. 3 illustrates one example of a segmentation neural network that the scene-based image editing system 106 utilizes in one or more implementations to generate object masks for objects portrayed in a digital image. In particular, FIG. 3 illustrates one example of a segmentation neural network used by the scene-based image editing system 106 in some embodiments to both detect objects in a digital image and generate object masks for those objects. Indeed, FIG. 3 illustrates a detection-masking neural network 300 that comprises both an object detection machine learning model 308 (in the form of an object detection neural network) and an object segmentation machine learning model 310 (in the form of an object segmentation neural network). Specifically, the detection-masking neural network 300 is an implementation of the on-device masking system described in U.S. patent application Ser. No. 17/589,114, "DETECTING DIGITAL OBJECTS AND GENERATING OBJECT MASKS ON DEVICE," filed on Jan. 31, 2022, the entire contents of which are hereby incorporated by reference.

Although FIG. 3 illustrates the scene-based image editing system 106 utilizing the detection-masking neural network 300, in one or more implementations, the scene-based image editing system 106 utilizes different machine learning models to detect objects, generate object masks for objects, and/or extract objects from digital images. For instance, in one or more implementations, the scene-based image editing system 106 utilizes, as the segmentation neural network (or as an alternative to a segmentation neural network), one of the machine learning models or neural networks described in U.S. patent application Ser. No. 17/158,527, entitled "Segmenting Objects In Digital Images Utilizing A Multi-Object Segmentation Model Framework," filed on Jan. 26, 2021; or U.S. patent application Ser. No. 16/388,115, entitled "Robust Training of Large-Scale Object Detectors with Noisy Data," filed on Apr. 8, 2019; or U.S. patent application Ser. No. 16/518,880, entitled "Utilizing Multiple Object Segmentation Models To Automatically Select User-Requested Objects In Images," filed on Jul. 22, 2019; or U.S. patent application Ser. No. 16/817,418, entitled "Utilizing A Large-Scale Object Detector To Automatically Select Objects In Digital Images," filed on Mar. 20, 2020; or Ren, et al., "Faster r-cnn: Towards real-time object detection with region proposal networks," NIPS, 2015; or Redmon, et al., "You Only Look Once: Unified, Real-Time Object Detection," CVPR 2016, the contents of each of the foregoing applications and papers are hereby incorporated by reference in their entirety.

Similarly, in one or more implementations, the scene-based image editing system 106 utilizes, as the segmentation neural network (or as an alternative to a segmentation neural network), one of the machine learning models or neural networks described in Ning Xu et al., "Deep GrabCut for Object Selection," published Jul. 14, 2017; or U.S. Patent Application Publication No. 2019/0130229, entitled "Deep Salient Content Neural Networks for Efficient Digital Object Segmentation," filed on Oct. 31, 2017; or U.S. patent application Ser. No. 16/035,410, entitled "Automatic Trimap Generation and Image Segmentation," filed on Jul. 13, 2018; or U.S. Pat. No. 10,192,129, entitled "Utilizing Interactive Deep Learning To Select Objects In Digital Visual Media," filed Nov. 18, 2015, each of which are incorporated herein by reference in their entirety.

In one or more implementations the segmentation neural network is a panoptic segmentation neural network. In other words, the segmentation neural network creates object mask for individual instances of a given object type. Furthermore, the segmentation neural network, in one or more implementations, generates object masks for semantic regions (e.g., water, sky, sand, dirt, etc.) in addition to countable things. Indeed, in one or more implementations, the scene-based image editing system 106 utilizes, as the segmentation neural network (or as an alternative to a segmentation neural network), one of the machine learning models or neural networks described in U.S. patent application Ser. No. 17/495,618, entitled "PANOPTIC SEGMENTATION REFINEMENT NETWORK," filed on Oct. 2, 2021; or U.S. patent application Ser. No. 17/454,740, entitled "MULTI-SOURCE PANOPTIC FEATURE PYRAMID NETWORK," filed on Nov. 12, 2021, each of which are incorporated herein by reference in their entirety.

Returning now to FIG. 3, in one or more implementations, the scene-based image editing system 106 utilizes a detection-masking neural network 300 that includes an encoder 302 (or neural network encoder) having a backbone network, detection heads 304 (or neural network decoder head), and a masking head 306 (or neural network decoder head). As shown in FIG. 3, the encoder 302 encodes a digital image 316 and provides the encodings to the detection heads 304 and the masking head 306. The detection heads 304 utilize the encodings to detect one or more objects portrayed in the digital image 316. The masking head 306 generates at least one object mask for the detected objects.

As just mentioned, the detection-masking neural network 300 utilizes both the object detection machine learning model 308 and the object segmentation machine learning model 310. In one or more implementations, the object detection machine learning model 308 includes both the encoder 302 and the detection heads 304 shown in FIG. 3. While the object segmentation machine learning model 310 includes both the encoder 302 and the masking head 306. Furthermore, the object detection machine learning model 308 and the object segmentation machine learning model 310 are separate machine learning models for processing objects within target and/or source digital images. FIG. 3 illustrates the encoder 302, detection heads 304, and the masking head 306 as a single model for detecting and segmenting objects of a digital image. For efficiency purposes, in some embodiments the scene-based image editing system 106 utilizes the network illustrated in FIG. 3 as a single network. The collective network (i.e., the object detection machine learning model 308 and the object segmentation machine learning model 310) is referred to as the detection-masking neural network 300. The following paragraphs describe components relating to the object detection machine learning model 308 of the network (such as the detection heads 304) and transitions to discussing components relating to the object segmentation machine learning model 310.

As just mentioned, in one or more embodiments, the scene-based image editing system 106 utilizes the object detection machine learning model 308 to detect and identify objects within the digital image 316 (e.g., a target or a source digital image). FIG. 3 illustrates one implementation of the object detection machine learning model 308 that the scene-based image editing system 106 utilizes in accordance with at least one embodiment. In particular, FIG. 3 illustrates the scene-based image editing system 106 utilizing the object detection machine learning model 308 to detect objects. In one or more embodiments, the object detection machine learning model 308 comprises a deep learning convolutional neural network (CNN). For example, in some embodiments, the object detection machine learning model 308 comprises a region-based (R-CNN).

As shown in FIG. 3, the object detection machine learning model 308 includes lower neural network layers and higher neural network layers. In general, the lower neural network layers collectively form the encoder 302 and the higher neural network layers collectively form the detection heads 304 (e.g., decoder). In one or more embodiments, the encoder 302 includes convolutional layers that encodes a digital image into feature vectors, which are outputted from the encoder 302 and provided as input to the detection heads 304. In various implementations, the detection heads 304 comprise fully connected layers that analyze the feature vectors and output the detected objects (potentially with approximate boundaries around the objects).

In particular, the encoder 302, in one or more implementations, comprises convolutional layers that generate a feature vector in the form of a feature map. To detect objects within the digital image 316, the object detection machine learning model 308 processes the feature map utilizing a convolutional layer in the form of a small network that is slid across small windows of the feature map. The object detection machine learning model 308 further maps each sliding window to a lower-dimensional feature. In one or more embodiments, the object detection machine learning model 308 processes this feature using two separate detection heads that are fully connected layers. In some embodiments, the first head comprises a box-regression layer that generates the detected object and an object-classification layer that generates the object label.

As shown by FIG. 3, the output from the detection heads 304 shows object labels above each of the detected objects. For example, the detection-masking neural network 300, in response to detecting objects, assigns an object label to each of the detected objects. In particular, in some embodiments, the detection-masking neural network 300 utilizes object labels based on classifications of the objects. To illustrate, FIG. 3 shows a label 318 for woman, a label 320 for bird, and a label 322 for man. Though not shown in FIG. 3, the detection-masking neural network 300 further distinguishes between the woman and the surfboard held by the woman in some implementations. Additionally, the detection-masking neural network 300 optionally also generates object masks for the semantic regions shown (e.g., the sand, the sea, and the sky).

As mentioned, the object detection machine learning model 308 detects the objects within the digital image 316. In some embodiments, and as illustrated in FIG. 3, the detection-masking neural network 300 indicates the detected objects utilizing approximate boundaries (e.g., bounding boxes 319, 321, and 323). For example, each of the bounding boxes comprises an area that encompasses an object. In some embodiments, the detection-masking neural network 300 annotates the bounding boxes with the previously mentioned object labels such as the name of the detected object, the coordinates of the bounding box, and/or the dimension of the bounding box.

As illustrated in FIG. 3, the object detection machine learning model 308 detects several objects for the digital image 316. In some instances, the detection-masking neural network 300 identifies all objects within the bounding boxes. In one or more embodiments, the bounding boxes comprise the approximate boundary area indicating the detected object. In some cases, an approximate boundary refers to an indication of an area including an object that is larger and/or less accurate than an object mask. In one or more embodiments, an approximate boundary includes at least a portion of a detected object and portions of the digital image 316 not comprising the detected object. An approximate boundary includes various shape, such as a square, rectangle, circle, oval, or other outline surrounding an object. In one or more embodiments, an approximate boundary comprises a bounding box.

Upon detecting the objects in the digital image 316, the detection-masking neural network 300 generates object masks for the detected objects. Generally, instead of utilizing coarse bounding boxes during object localization, the detection-masking neural network 300 generates segmentations masks that better define the boundaries of the object. The following paragraphs provide additional detail with respect to generating object masks for detected objects in accordance with one or more embodiments. In particular, FIG. 3 illustrates the scene-based image editing system 106 utilizing the object segmentation machine learning model 310 to generate segmented objects via object masks in accordance with some embodiments.

As illustrated in FIG. 3, the scene-based image editing system 106 processes a detected object in a bounding box utilizing the object segmentation machine learning model 310 to generate an object mask, such as an object mask 324 and an object mask 326. In alternative embodiments, the scene-based image editing system 106 utilizes the object detection machine learning model 308 itself to generate an object mask of the detected object (e.g., segment the object for selection).

In one or more implementations, prior to generating an object mask of a detected object, scene-based image editing system 106 receives user input 312 to determine objects for which to generate object masks. For example, the scene-based image editing system 106 receives input from a user indicating a selection of one of the detected objects. To illustrate, in the implementation shown, the scene-based image editing system 106 receives user input 312 of the user selecting bounding boxes 321 and 323. In alternative implementations, the scene-based image editing system 106 generates objects masks for each object automatically (e.g., without a user request indicating an object to select).

As mentioned, the scene-based image editing system 106 processes the bounding boxes of the detected objects in the digital image 316 utilizing the object segmentation machine learning model 310. In some embodiments, the bounding box comprises the output from the object detection machine learning model 308. For example, as illustrated in FIG. 3, the bounding box comprises a rectangular border about the object. Specifically, FIG. 3 shows bounding boxes 319, 321 and 323 which surround the woman, the bird, and the man detected in the digital image 316.

In some embodiments, the scene-based image editing system 106 utilizes the object segmentation machine learning model 310 to generate the object masks for the aforementioned detected objects within the bounding boxes. For example, the object segmentation machine learning model 310 corresponds to one or more deep neural networks or models that select an object based on bounding box parameters corresponding to the object within the digital image 316. In particular, the object segmentation machine learning model 310 generates the object mask 324 and the object mask 326 for the detected man and bird, respectively.

In some embodiments, the scene-based image editing system 106 selects the object segmentation machine learning model 310 based on the object labels of the object identified by the object detection machine learning model 308. Generally, based on identifying one or more classes of objects associated with the input bounding boxes, the scene-based image editing system 106 selects an object segmentation machine learning model tuned to generate object masks for objects of the identified one or more classes. To illustrate, in some embodiments, based on determining that the class of one or more of the identified objects comprises a human or person, the scene-based image editing system 106 utilizes a special human object mask neural network to generate an object mask, such as the object mask 324 shown in FIG. 3.

As further illustrated in FIG. 3, the scene-based image editing system 106 receives the object mask 324 and the object mask 326 as output from the object segmentation machine learning model 310. As previously discussed, in one or more embodiments, an object mask comprises a pixel-wise mask that corresponds to an object in a source or target digital image. In one example, an object mask includes a segmentation boundary indicating a predicted edge of one or more objects as well as pixels contained within the predicted edge.

In some embodiments, the scene-based image editing system 106 also detects the objects shown in the digital image 316 via the collective network, i.e., the detection-masking neural network 300, in the same manner outlined above. For example, in some cases, the scene-based image editing system 106, via the detection-masking neural network 300 detects the woman, the man, and the bird within the digital image 316. In particular, the scene-based image editing system 106, via the detection heads 304, utilizes the feature pyramids and feature maps to identify objects within the digital image 316 and generates object masks via the masking head 306.

Furthermore, in one or more implementations, although FIG. 3 illustrates generating object masks based on the user input 312, the scene-based image editing system 106 generates object masks without user input 312. In particular, the scene-based image editing system 106 generates object masks for all detected objects within the digital image 316. To illustrate, in at least one implementation, despite not receiving the user input 312, the scene-based image editing system 106 generates object masks for the woman, the man, and the bird.

Figure 4:
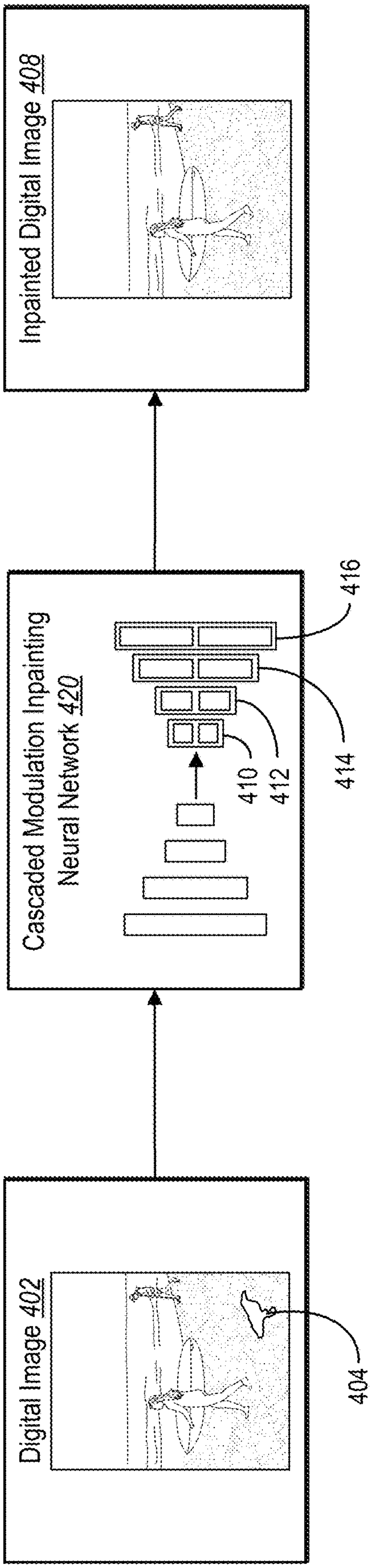
FIG. 4 illustrates utilizing a cascaded modulation inpainting neural network to generate an inpainted digital image in accordance with one or more embodiments.
Figure 5:
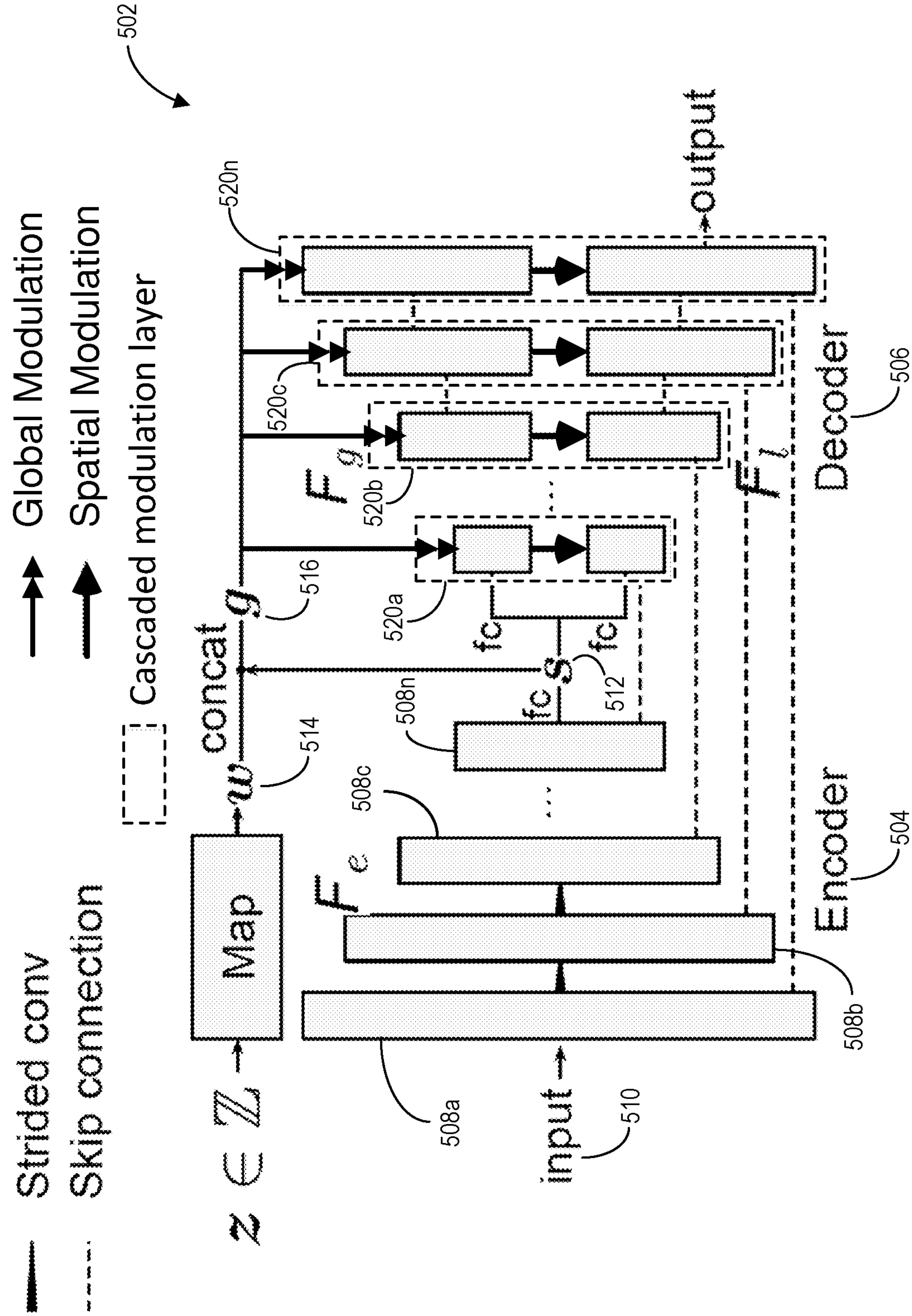
FIG. 5 illustrates an example architecture of a cascaded modulation inpainting neural network in accordance with one or more embodiments.
Figure 6:
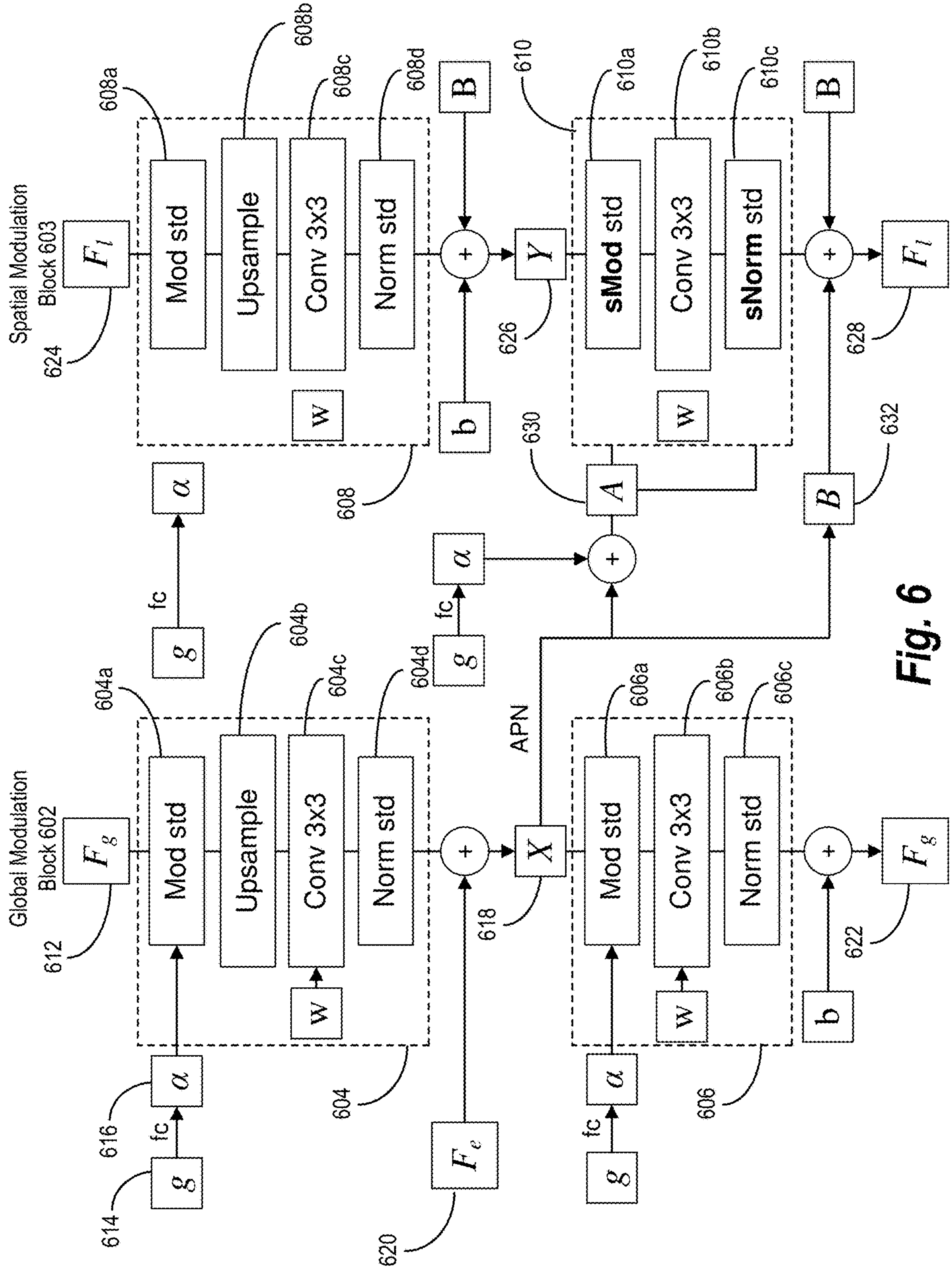
FIG. 6 illustrates global modulation blocks and spatial modulation blocks implemented in a cascaded modulation inpainting neural network in accordance with one or more embodiments.

In one or more embodiments, the scene-based image editing system 106 implements object-aware image editing by generating a content fill for each object portrayed in a digital image (e.g., for each object mask corresponding to portrayed objects) utilizing a hole-filing model. In particular, in some cases, the scene-based image editing system 106 utilizes a machine learning model, such as a content-aware hole-filling machine learning model to generate the content fill(s) for each foreground object. FIGS. 4-6 illustrate a content-aware hole-filling machine learning model utilized by the scene-based image editing system 106 to generate content fills for objects in accordance with one or more embodiments.

In one or more embodiments, a content fill includes a set of pixels generated to replace another set of pixels of a digital image. Indeed, in some embodiments, a content fill includes a set of replacement pixels for replacing another set of pixels. For instance, in some embodiments, a content fill includes a set of pixels generated to fill a hole (e.g., a content void) that remains after (or if) a set of pixels (e.g., a set of pixels portraying an object) has been removed from or moved within a digital image. In some cases, a content fill corresponds to a background of a digital image. To illustrate, in some implementations, a content fill includes a set of pixels generated to blend in with a portion of a background proximate to an object that could be moved/removed. In some cases, a content fill includes an inpainting segment, such as an inpainting segment generated from other pixels (e.g., other background pixels) within the digital image. In some cases, a content fill includes other content (e.g., arbitrarily selected content or content selected by a user) to fill in a hole or replace another set of pixels.

In one or more embodiments, a content-aware hole-filling machine learning model includes a computer-implemented machine learning model that generates content fill. In particular, in some embodiments, a content-aware hole-filling machine learning model includes a computer-implemented machine learning model that generates content fills for replacement regions in a digital image. For instance, in some cases, the scene-based image editing system 106 determines that an object has been moved within or removed from a digital image and utilizes a content-aware hole-filling machine learning model to generate a content fill for the hole that has been exposed as a result of the move/removal in response. As will be discussed in more detail, however, in some implementations, the scene-based image editing system 106 anticipates movement or removal of an object and utilizes a content-aware hole-filling machine learning model to pre-generate a content fill for that object. In some cases, a content-aware hole-filling machine learning model includes a neural network, such as an inpainting neural network (e.g., a neural network that generates a content fill—more specifically, an inpainting segment—using other pixels of the digital image). In other words, the scene-based image editing system 106 utilizes a content-aware hole-filling machine learning model in various implementations to provide content at a location of a digital image that does not initially portray such content (e.g., due to the location being occupied by another semantic area, such as an object).

FIG. 4 illustrates the scene-based image editing system 106 utilizing a content-aware machine learning model, such as a cascaded modulation inpainting neural network 420, to generate an inpainted digital image 408 from a digital image 402 with a replacement region 404 in accordance with one or more embodiments.

Indeed, in one or more embodiments, the replacement region 404 includes an area corresponding to an object (and a hole that would be present if the object were moved or deleted). In some embodiments, the scene-based image editing system 106 identifies the replacement region 404 based on user selection of pixels (e.g., pixels portraying an object) to move, remove, cover, or replace from a digital image. To illustrate, in some cases, a client device selects an object portrayed in a digital image. Accordingly, the scene-based image editing system 106 deletes or removes the object and generates replacement pixels. In some case, the scene-based image editing system 106 identifies the replacement region 404 by generating an object mask via a segmentation neural network. For instance, the scene-based image editing system 106 utilizes a segmentation neural network (e.g., the detection-masking neural network 300 discussed above with reference to FIG. 3) to detect objects with a digital image and generate object masks for the objects. Thus, in some implementations, the scene-based image editing system 106 generates content fill for the replacement region 404 before receiving user input to move, remove, cover, or replace the pixels initially occupying the replacement region 404.

As shown, the scene-based image editing system 106 utilizes the cascaded modulation inpainting neural network 420 to generate replacement pixels for the replacement region 404. In one or more embodiments, the cascaded modulation inpainting neural network 420 includes a generative adversarial neural network for generating replacement pixels. In some embodiments, a generative adversarial neural network (or "GAN") includes a neural network that is tuned or trained via an adversarial process to generate an output digital image (e.g., from an input digital image). In some cases, a generative adversarial neural network includes multiple constituent neural networks such as an encoder neural network and one or more decoder/generator neural networks. For example, an encoder neural network extracts latent code from a noise vector or from a digital image. A generator neural network (or a combination of generator neural networks) generates a modified digital image by combining extracted latent code (e.g., from the encoder neural network). During training, a discriminator neural network, in competition with the generator neural network, analyzes a generated digital image to generate an authenticity prediction by determining whether the generated digital image is real (e.g., from a set of stored digital images) or fake (e.g., not from the set of stored digital images). The discriminator neural network also causes the scene-based image editing system 106 to modify parameters of the encoder neural network and/or the one or more generator neural networks to eventually generate digital images that fool the discriminator neural network into indicating that a generated digital image is a real digital image.

Along these lines, a generative adversarial neural network refers to a neural network having a specific architecture or a specific purpose such as a generative inpainting neural network. For example, a generative inpainting neural network includes a generative adversarial neural network that inpaints or fills pixels of a digital image with a content fill (or generates a content fill in anticipation of inpainting or filling in pixels of the digital image). In some cases, a generative inpainting neural network inpaints a digital image by filling hole regions (indicated by object masks). Indeed, as mentioned above, in some embodiments an object mask defines a replacement region using a segmentation or a mask indicating, overlaying, covering, or outlining pixels to be removed or replaced within a digital image.

Accordingly, in some embodiments, the cascaded modulation inpainting neural network 420 includes a generative inpainting neural network that utilizes a decoder having one or more cascaded modulation decoder layers. Indeed, as illustrated in FIG. 4, the cascaded modulation inpainting neural network 420 includes a plurality of cascaded modulation decoder layers 410, 412, 414, 416. In some cases, a cascaded modulation decoder layer includes at least two connected (e.g., cascaded) modulations blocks for modulating an input signal in generating an inpainted digital image. To illustrate, in some instances, a cascaded modulation decoder layer includes a first global modulation block and a second global modulation block. Similarly, in some cases, a cascaded modulation decoder layer includes a first global modulation block (that analyzes global features and utilizes a global, spatially-invariant approach) and a second spatial modulation block (that analyzes local features utilizing a spatially-varying approach). Additional detail regarding modulation blocks will be provided below (e.g., in relation to FIGS. 5-6).

As shown, the scene-based image editing system 106 utilizes the cascaded modulation inpainting neural network 420 (and the cascaded modulation decoder layers 410, 412, 414, 416) to generate the inpainted digital image 408. Specifically, the cascaded modulation inpainting neural network 420 generates the inpainted digital image 408 by generating a content fill for the replacement region 404. As illustrated, the replacement region 404 is now filled with a content fill having replacement pixels that portray a photorealistic scene in place of the replacement region 404.

As mentioned above, the scene-based image editing system 106 utilizes a cascaded modulation inpainting neural network that includes cascaded modulation decoder layers to generate inpainted digital images. FIG. 5 illustrates an example architecture of a cascaded modulation inpainting neural network 502 in accordance with one or more embodiments.

As illustrated, the cascaded modulation inpainting neural network 502 includes an encoder 504 and a decoder 506. In particular, the encoder 504 includes a plurality of convolutional layers 508*a*-508*n* at different scales/resolutions. In some cases, the scene-based image editing system 106 feeds the digital image input 510 (e.g., an encoding of the digital image) into the first convolutional layer 508*a* to generate an encoded feature vector at a higher scale (e.g., lower resolution). The second convolutional layer 508*b* processes the encoded feature vector at the higher scale (lower resolution) and generates an additional encoded feature vector (at yet another higher scale/lower resolution). The cascaded modulation inpainting neural network 502 iteratively generates these encoded feature vectors until reaching the final/highest scale convolutional layer 508*n* and generating a final encoded feature vector representation of the digital image.

As illustrated, in one or more embodiments, the cascaded modulation inpainting neural network 502 generates a global feature code from the final encoded feature vector of the encoder 504. A global feature code includes a feature representation of the digital image from a global (e.g., high-level, high-scale, low-resolution) perspective. In particular, a global feature code includes a representation of the digital image that reflects an encoded feature vector at the highest scale/lowest resolution (or a different encoded feature vector that satisfies a threshold scale/resolution).

As illustrated, in one or more embodiments, the cascaded modulation inpainting neural network 502 applies a neural network layer (e.g., a fully connected layer) to the final encoded feature vector to generate a style code 512 (e.g., a style vector). In addition, the cascaded modulation inpainting neural network 502 generates the global feature code by combining the style code 512 with a random style code 514. In particular, the cascaded modulation inpainting neural network 502 generates the random style code 514 by utilizing a neural network layer (e.g., a multi-layer perceptron) to process an input noise vector. The neural network layer maps the input noise vector to a random style code 514. The cascaded modulation inpainting neural network 502 combines (e.g., concatenates, adds, or multiplies) the random style code 514 with the style code 512 to generate the global feature code 516. Although FIG. 5 illustrates a particular approach to generate the global feature code 516, the scene-based image editing system 106 is able to utilize a variety of different approaches to generate a global feature code that represents encoded feature vectors of the encoder 504 (e.g., without the style code 512 and/or the random style code 514).

As mentioned above, in some embodiments, the cascaded modulation inpainting neural network 502 generates an image encoding utilizing the encoder 504. An image encoding refers to an encoded representation of the digital image. Thus, in some cases, an image encoding includes one or more encoding feature vectors, a style code, and/or a global feature code.

In one or more embodiments, the cascaded modulation inpainting neural network 502 utilizes a plurality of Fourier convolutional encoder layer to generate an image encoding (e.g., the encoded feature vectors, the style code 512, and/or the global feature code 516). For example, a Fourier convolutional encoder layer (or a fast Fourier convolution) comprises a convolutional layer that includes non-local receptive fields and cross-scale fusion within a convolutional unit. In particular, a fast Fourier convolution can include three kinds of computations in a single operation unit: a local branch that conducts small-kernel convolution, a semi-global branch that processes spectrally stacked image patches, and a global branch that manipulates image-level spectrum. These three branches complementarily address different scales. In addition, in some instances, a fast Fourier convolution includes a multi-branch aggregation process for cross-scale fusion. For example, in one or more embodiments, the cascaded modulation inpainting neural network 502 utilizes a fast Fourier convolutional layer as described by Lu Chi, Borui Jiang, and Yadong Mu in "Fast Fourier convolution, Advances in Neural Information Processing Systems," 33 (2020), which is incorporated by reference herein in its entirety.

Specifically, in one or more embodiments, the cascaded modulation inpainting neural network 502 utilizes Fourier convolutional encoder layers for each of the encoder convolutional layers 508*a*-508*n*. Thus, the cascaded modulation inpainting neural network 502 utilizes different Fourier convolutional encoder layers having different scales/resolutions to generate encoded feature vectors with improved, non-local receptive field.

Operation of the encoder 504 can also be described in terms of variables or equations to demonstrate functionality of the cascaded modulation inpainting neural network 502. For instance, as mentioned, the cascaded modulation inpainting neural network 502 is an encoder-decoder network with proposed cascaded modulation blocks at its decoding stage for image inpainting. Specifically, the cascaded modulation inpainting neural network 502 starts with an encoder E that takes the partial image and the mask as inputs to produce multi-scale feature maps from input resolution to resolution 4×4:

$$F_e^{(1)}, \ldots, F_e^{(L)} = E(x \odot (1-m), m),$$

where $$F_e^{(i)}$$

are the generated feature at scale 1≤i≤L (and L is the highest scale or resolution). The encoder is implemented by a set of stride-2 convolutions with residual connection.

After generating the highest scale feature $$F_e^{(L)},$$

a fully connected layer followed by a $\ell_2$ normalization products a global style code $$s = fc(F_e^{(L)})/\|fc(F_e^{(L)})\|_2$$

to represent the input globally. In parallel to the encoder, an MLP-based mapping network produces a random style code w from a normalized random Gaussian noise z, simulating the stochasticity of the generation process. Moreover, the scene-based image editing system 106 joins w with s to produce the final global code g=[s; w] for decoding. As mentioned, in some embodiments, the scene-based image editing system 106 utilizes the final global code as an image encoding for the digital image.

As mentioned above, in some implementations, full convolutional models suffer from slow growth of effective receptive field, especially at the early stage of the network. Accordingly, utilizing strided convolution within the encoder can generate invalid features inside the hole region, making the feature correction at decoding stage more challenging. Fast Fourier convolution (FFC) can assist early layers to achieve receptive field that covers an entire image. Conventional systems, however, have only utilized FFC at a bottleneck layer, which is computationally demanding. Moreover, the shallow bottleneck layer cannot capture global semantic features effectively. Accordingly, in one or more implementations the scene-based image editing system 106 replaces the convolutional block in the encoder with FFC for the encoder layers. FFC enables the encoder to propagate features at early stage and thus address the issue of generating invalid features inside the hole, which helps improve the results.

As further shown in FIG. 5, the cascaded modulation inpainting neural network 502 also includes the decoder 506. As shown, the decoder 506 includes a plurality of cascaded modulation layers 520*a*-520*n*. The cascaded modulation layers 520*a*-520*n* process input features (e.g., input global feature maps and input local feature maps) to generate new features (e.g., new global feature maps and new local feature maps). In particular, each of the cascaded modulation layers 520*a*-520*n* operate at a different scale/resolution. Thus, the first cascaded modulation layer 520*a* takes input features at a first resolution/scale and generates new features at a lower scale/higher resolution (e.g., via upsampling as part of one or more modulation operations). Similarly, additional cascaded modulation layers operate at further lower scales/higher resolutions until generating the inpainted digital image at an output scale/resolution (e.g., the lowest scale/highest resolution).

Moreover, each of the cascaded modulation layers include multiple modulation blocks. For example, with regard to FIG. 5 the first cascaded modulation layer 520*a* includes a global modulation block and a spatial modulation block. In particular, the cascaded modulation inpainting neural network 502 performs a global modulation with regard to input features of the global modulation block. Moreover, the cascaded modulation inpainting neural network 502 performs a spatial modulation with regard to input features of the spatial modulation block. By performing both a global modulation and spatial modulation within each cascaded modulation layer, the scene-based image editing system 106 refines global positions to generate more accurate inpainted digital images.

As illustrated, the cascaded modulation layers 520*a*-520*n* are cascaded in that the global modulation block feeds into the spatial modulation block. Specifically, the cascaded modulation inpainting neural network 502 performs the spatial modulation at the spatial modulation block based on features generated at the global modulation block. To illustrate, in one or more embodiments the cascaded modulation inpainting neural network 502 utilizes the global modulation block to generate an intermediate feature. The cascaded modulation inpainting neural network 502 further utilizes a convolutional layer (e.g., a 2-layer convolutional affine parameter network) to convert the intermediate feature to a spatial tensor. The cascaded modulation inpainting neural network 502 utilizes the spatial tensor to modulate the input features analyzed by the spatial modulation block.

For example, FIG. 6 provides additional detail regarding operation of global modulation blocks and spatial modulation blocks in accordance with one or more embodiments. Specifically, FIG. 6 illustrates a global modulation block 602 and a spatial modulation block 603. As shown in FIG. 6, the global modulation block 602 includes a first global modulation operation 604 and a second global modulation operation 606. Moreover, the spatial modulation block 603 includes a global modulation operation 608 and a spatial modulation operation 610.

For example, a modulation block (or modulation operation) includes a computer-implemented process for modulating (e.g., scaling or shifting) an input signal according to one or more conditions. To illustrate, modulation block includes amplifying certain features while counteracting/normalizing these amplifications to preserve operation within a generative model. Thus, for example, a modulation block (or modulation operation) includes a modulation layer, a convolutional layer, and a normalization layer in some cases. The modulation layer scales each input feature of the convolution, and the normalization removes the effect of scaling from the statistics of the convolution's output feature maps.

Indeed, because a modulation layer modifies feature statistics, a modulation block (or modulation operation) often includes one or more approaches for addressing these statistical changes. For example, in some instances, a modulation block (or modulation operation) includes a computer-implemented process that utilizes batch normalization or instance normalization to normalize a feature. In some embodiments, the modulation is achieved by scaling and shifting the normalized activation according to affine parameters predicted from input conditions. Similarly, some modulation procedures replace feature normalization with a demodulation process. Thus, in one or more embodiments, a modulation block (or modulation operation) includes a modulation layer, convolutional layer, and a demodulation layer. For example, in one or more embodiments, a modulation block (or modulation operation) includes the modulation approaches described by Tero Karras, Samuli Laine, Miika Aittala, Janne Hellsten, Jaakko Lehtinen, and Timo Aila in "Analyzing and improving the image quality of StyleGAN," CVPR (2020) (hereinafter StyleGan2), which is incorporated by reference herein in its entirety. In some instances, a modulation block includes one or more modulation operations.

Moreover, in one or more embodiments, a global modulation block (or global modulation operation) includes a modulation block (or modulation operation) that modulates an input signal in a spatially-invariant manner. For example, in some embodiments, a global modulation block (or global modulation operation) performs a modulation according to global features of a digital image (e.g., that do not vary spatially across coordinates of a feature map or image). Thus, for example, a global modulation block includes a modulation block that modulates an input signal according to an image encoding (e.g., global feature code) generated by an encoder. In some implementations, a global modulation block includes multiple global modulation operations.

In one or more embodiments, a spatial modulation block (or spatial modulation operation) includes a modulation block (or modulation operation) that modulates an input signal in a spatially-varying manner (e.g., according to a spatially-varying feature map). In particular, in some embodiments, a spatial modulation block (or spatial modulation operation) utilizes a spatial tensor, to modulate an input signal in a spatially-varying manner. Thus, in one or more embodiments a global modulation block applies a global modulation where affine parameters are uniform across spatial coordinates, and a spatial modulation block applies a spatially-varying affine transformation that varies across spatial coordinates. In some embodiments, a spatial modulation block includes both a spatial modulation operation in combination with another modulation operation (e.g., a global modulation operation and a spatial modulation operation).

For instance, in some embodiments, a spatial modulation operation includes spatially-adaptive modulation as described by Taesung Park, Ming-Yu Liu, Ting-Chun Wang, and Jun-Yan Zhu in "Semantic image synthesis with spatially-adaptive normalization," CVPR (2019), which is incorporated by reference herein in its entirety (hereinafter Taesung). In some embodiments, the spatial modulation operation utilizes a spatial modulation operation with a different architecture than Taesung, including a modulation-convolution-demodulation pipeline.

Thus, with regard to FIG. 6, the scene-based image editing system 106 utilizes a global modulation block 602. As shown, the global modulation block 602 includes a first global modulation operation 604 and a second global modulation operation 606. Specifically, the first global modulation operation 604 processes a global feature map 612. For example, the global feature map 612 includes a feature vector generated by the cascaded modulation inpainting neural network reflecting global features (e.g., high-level features or features corresponding to the whole digital image). Thus, for example, the global feature map 612 includes a feature vector reflecting global features generated from a previous global modulation block of a cascaded decoder layer. In some instances, the global feature map 612 also includes a feature vector corresponding to the encoded feature vectors generated by the encoder (e.g., at a first decoder layer the scene-based image editing system 106 utilizes an encoded feature vector, style code, global feature code, constant, noise vector, or other feature vector as input in various implementations).

As shown, the first global modulation operation 604 includes a modulation layer 604*a*, an upsampling layer 604*b*, a convolutional layer 604*c*, and a normalization layer 604*d*. In particular, the scene-based image editing system 106 utilizes the modulation layer 604*a* to perform a global modulation of the global feature map 612 based on a global feature code 614 (e.g., the global feature code 516). Specifically, the scene-based image editing system 106 applies a neural network layer (i.e., a fully connected layer) to the global feature code 614 to generate a global feature vector 616. The scene-based image editing system 106 then modulates the global feature map 612 utilizing the global feature vector 616.

In addition, the scene-based image editing system 106 applies the upsampling layer 604*b* (e.g., to modify the resolution scale). Further, the scene-based image editing system 106 applies the convolutional layer 604*c*. In addition, the scene-based image editing system 106 applies the normalization layer 604*d* to complete the first global modulation operation 604. As shown, the first global modulation operation 604 generates a global intermediate feature 618. In particular, in one or more embodiments, the scene-based image editing system 106 generates the global intermediate feature 618 by combining (e.g., concatenating) the output of the first global modulation operation 604 with an encoded feature vector 620 (e.g., from a convolutional layer of the encoder having a matching scale/resolution).

As illustrated, the scene-based image editing system 106 also utilizes a second global modulation operation 606. In particular, the scene-based image editing system 106 applies the second global modulation operation 606 to the global intermediate feature 618 to generate a new global feature map 622. Specifically, the scene-based image editing system 106 applies a global modulation layer 606*a* to the global intermediate feature 618 (e.g., conditioned on the global feature vector 616). Moreover, the scene-based image editing system 106 applies a convolutional layer 606*b* and a normalization layer 606*c* to generate the new global feature map 622. As shown, in some embodiments, the scene-based image editing system 106 applies a spatial bias in generating the new global feature map 622.

Furthermore, as shown in FIG. 6, the scene-based image editing system 106 utilizes a spatial modulation block 603. In particular, the spatial modulation block 603 includes a global modulation operation 608 and a spatial modulation operation 610. The global modulation operation 608 processes a local feature map 624. For example, the local feature map 624 includes a feature vector generated by the cascaded modulation inpainting neural network reflecting local features (e.g., low-level, specific, or spatially variant features). Thus, for example, the local feature map 624 includes a feature vector reflecting local features generated from a previous spatial modulation block of a cascaded decoder layer. In some cases, the global feature map 612 also includes a feature vector corresponding to the encoded feature vectors generated by the encoder (e.g., at a first decoder layer, the scene-based image editing system 106 utilizes an encoded feature vector, style code, noise vector or other feature vector in various implementations).

As shown, the scene-based image editing system 106 utilizes the global modulation operation 608 to generate a local intermediate feature 626 from the local feature map 624. Specifically, the scene-based image editing system 106 applies a modulation layer 608*a*, an upsampling layer 608*b*, a convolutional layer 608*c*, and a normalization layer 608*d*. Moreover, in some embodiments, the scene-based image editing system 106 applies spatial bias and broadcast noise to the output of the global modulation operation 608 to generate the local intermediate feature 626.

As illustrated in FIG. 6, the scene-based image editing system 106 utilizes the spatial modulation operation 610 to generate a new local feature map 628. Indeed, the spatial modulation operation 610 modulates the local intermediate feature 626 based on the global intermediate feature 618. Specifically, the scene-based image editing system 106 generates a spatial tensor 630 from the global intermediate feature 618. For example, the scene-based image editing system 106 applies a convolutional affine parameter network to generate the spatial tensor 630. In particular, the scene-based image editing system 106 applies a convolutional affine parameter network to generate an intermediate spatial tensor. The scene-based image editing system 106 combines the intermediate spatial tensor with the global feature vector 616 to generate the spatial tensor 630. The scene-based image editing system 106 utilizes the spatial tensor 630 to modulate the local intermediate feature 626 (utilizing the spatial modulation layer 610*a*) and generated a modulated tensor.

As shown, the scene-based image editing system 106 also applies a convolutional layer 610*b* to the modulated tensor. In particular, the convolutional layer 610*b* generates a convolved feature representation from the modulated tensor. In addition, the scene-based image editing system 106 applies a normalization layer 610*c* to convolved feature representation to generate the new local feature map 628.

Although illustrated as a normalization layer 610*c*, in one or more embodiments, the scene-based image editing system 106 applies a demodulation layer. For example, the scene-based image editing system 106 applies a modulation-convolution-demodulation pipeline (e.g., general normalization rather than instance normalization). In some cases, this approach avoids potential artifacts (e.g., water droplet artifacts) caused by instance normalization. Indeed, a demodulation/normalization layer includes a layer that scales each output feature map by a uniform demodulation/normalization value (e.g., by a uniform standard deviation instead of instance normalization that utilizes data-dependent constant normalization based on the contents of the feature maps).

As shown in FIG. 6, in some embodiments, the scene-based image editing system 106 also applies a shifting tensor 632 and broadcast noise to the output of the spatial modulation operation 610. For example, the spatial modulation operation 610 generates a normalized/demodulated feature. The scene-based image editing system 106 also generates the shifting tensor 632 by applying the affine parameter network to the global intermediate feature 618. The scene-based image editing system 106 combines the normalized/demodulated feature, the shifting tensor 632, and/or the broadcast noise to generate the new local feature map 628.

In one or more embodiments, upon generating the new global feature map 622 and the new local feature map 628, the scene-based image editing system 106 proceeds to the next cascaded modulation layer in the decoder. For example, the scene-based image editing system 106 utilizes the new global feature map 622 and the new local feature map 628 as input features to an additional cascaded modulation layer at a different scale/resolution. The scene-based image editing system 106 further utilizes the additional cascaded modulation layer to generate additional feature maps (e.g., utilizing an additional global modulation block and an additional spatial modulation block). In some cases, the scene-based image editing system 106 iteratively processes feature maps utilizing cascaded modulation layers until coming to a final scale/resolution to generate an inpainted digital image.

Although FIG. 6 illustrates the global modulation block 602 and the spatial modulation block 603, in some embodiments, the scene-based image editing system 106 utilizes a global modulation block followed by another global modulation block. For example, the scene-based image editing system 106 replaces the spatial modulation block 603 with an additional global modulation block. In such an embodiment, the scene-based image editing system 106 replaces APN (and spatial tensor) and corresponding spatial modulation illustrated in FIG. 6 with a skip connection. For example, the scene-based image editing system 106 utilizes the global intermediate feature to perform a global modulation with regard to the local intermediate vector. Thus, in some cases, the scene-based image editing system 106 utilizes a first global modulation block and a second global modulation block.

As mentioned, the decoder can also be described in terms of variables and equations to illustrate operation of the cascaded modulation inpainting neural network. For example, as discussed, the decoder stacks a sequence of cascaded modulation blocks to upsample the input feature map $$F_e^{(L)}.$$

Each cascaded modulation block takes the global code g as input to modulate the feature according to the global representation of the partial image. Moreover, in some cases, the scene-based image editing system 106 provides mechanisms to correct local error after predicting the global structure.

In particular, in some embodiments, the scene-based image editing system 106 utilizes a cascaded modulation block to address the challenge of generating coherent features both globally and locally. At a high level, the scene-based image editing system 106 follows the following approach: i) decomposition of global and local features to separate local details from the global structure, ii) a cascade of global and spatial modulation that predicts local details from global structures. In one or more implementations, the scene-based image editing system 106 utilizes spatial modulations generated from the global code for better predictions (e.g., and discards instance normalization to make the design compatible with StyleGAN2).

Specifically, the cascaded modulation takes the global and local feature $$F_g^{(i)} \text{ and } F_l^{(i)}$$

from previous scale and the global code g as input and produces the new global and local features $$F_g^{(i+1)} \text{ and } F_l^{(i+1)}$$

at next scale/resolution. To produce the new global code $$F_g^{(i+1)} \text{ from } F_g^{(i)},$$

the scene-based image editing system 106 utilizes a global code modulation stage that includes a modulation-convolution-demodulation procedure, which generates an upsampled feature X.

Due to the limited expressive power of the global vector g on representing 2-d visual details, and the inconsistent features inside and outside the hole, the global modulation may generate distorted features inconsistent with the context. To compensate, in some cases, the scene-based image editing system 106 utilizes a spatial modulation that generates more accurate features. Specifically, the spatial modulation takes X as the spatial code and g as the global code to modulate the input local feature $$F_l^{(i)}$$

in a spatially adaptive fashion.

Moreover, the scene-based image editing system 106 utilizes a unique spatial modulation-demodulation mechanism to avoid potential "water droplet" artifacts caused by instance normalization in conventional systems. As shown, the spatial modulation follows a modulation-convolution-demodulation pipeline.

In particular, for spatial modulation, the scene-based image editing system 106 generates a spatial tensor $A_0$=APN (Y) from feature X by a 2-layer convolutional affine parameter network (APN). Meanwhile, the scene-based image editing system 106 generates a global vector $\alpha$=fc(g) from global gode g with a fully connected layer (fc) to capture global context. The scene-based image editing system 106 generates a final spatial tensor $A=A_0+\alpha$ as the broadcast summation of $A_0$ and $\alpha$ for scaling intermediate feature Y of the block with element-wise product $\odot$:

$$\bar{Y} = Y \odot A$$

Moreover, for convolution, the modulated tensor $\bar{Y}$ is convolved with a 3×3 learnable kernel K, resulting in:

$$\hat{Y} = \bar{Y} * K$$

For spatially-aware demodulation, the scene-based image editing system 106 applies a demodularization step to compute the normalized output $\tilde{Y}$. Specifically, the scene-based image editing system 106 assumes that the input features Y are independent random variables with unit variance and after the modulation, the expected variance of the output is not changed, i.e., $\mathbb{E}_{y\in \tilde{Y}}[\mathrm{Var}(y)]=1$. Accordingly, this gives the demodulation computation:

$$\tilde{Y} = \hat{Y} \odot D,$$

where $D=1/\sqrt{K^2 \odot \mathbb{E}_{a\in A}[a^2]}$ is the demodulation coefficient. In some cases, the scene-based image editing system 106 implements the foregoing equation with standard tensor operations.

In one or more implementations, the scene-based image editing system 106 also adds spatial bias and broadcast noise. For example, the scene-based image editing system 106 adds the normalized feature $\tilde{Y}$ to a shifting tensor B=APN(X) produced by another affine parameter network (APN) from feature X along with the broadcast noise n to product the new local feature $$F_l^{(i+1)}:$$

$$F_l^{(i+1)} = \tilde{Y} + B + n$$

Thus, in one or more embodiments, to generate a content fill having replacement pixels for a digital image having a replacement region, the scene-based image editing system 106 utilizes an encoder of a content-aware hole-filling machine learning model (e.g., a cascaded modulation inpainting neural network) to generate an encoded feature map from the digital image. The scene-based image editing system 106 further utilizes a decoder of the content-aware hole-filling machine learning model to generate the content fill for the replacement region. In particular, in some embodiments, the scene-based image editing system 106 utilizes a local feature map and a global feature map from one or more decoder layers of the content-aware hole-filling machine learning model in generating the content fill for the replacement region of the digital image.

Figure 7:
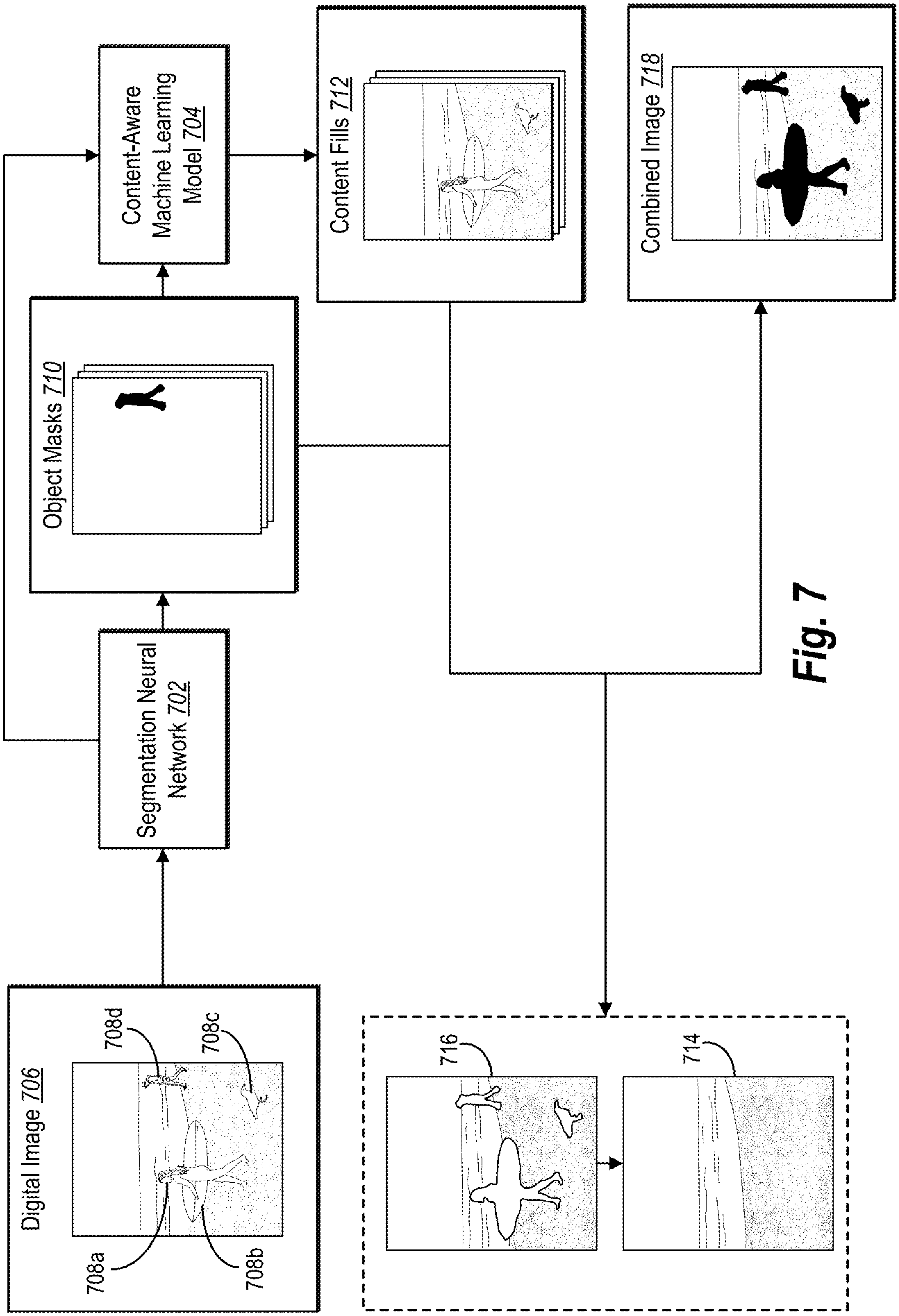
FIG. 7 illustrates a diagram for generating object masks and content fills to facilitate object-aware modifications to a digital image in accordance with one or more embodiments.

As discussed above with reference to FIGS. 3-6, in one or more embodiments, the scene-based image editing system 106 utilizes a segmentation neural network to generate object masks for objects portrayed in a digital image and a content-aware hole-filling machine learning model to generate content fills for those objects (e.g., for the object masks generated for the objects). As further mentioned, in some embodiments, the scene-based image editing system 106 generates the object mask(s) and the content fill(s) in anticipation of one or more modifications to the digital image—before receiving user input for such modifications. For example, in one or more implementations, upon opening, accessing, or displaying the digital image 706, the scene-based image editing system 106 generates the object mask(s) and the content fill(s) automatically (e.g., without user input to do so). Thus, in some implementations the scene-based image editing system 106 facilitates object-aware modifications of digital images. FIG. 7 illustrates a diagram for generating object masks and content fills to facilitate object-aware modifications to a digital image in accordance with one or more embodiments.

In one or more embodiments, an object-aware modification includes an editing operation that targets an identified object in a digital image. In particular, in some embodiments, an object-aware modification includes an editing operation that targets an object that has been previously segmented. For instance, as discussed, the scene-based image editing system 106 generates a mask for an object portrayed in a digital image before receiving user input for modifying the object in some implementations. Accordingly, upon user selection of the object (e.g., a user selection of at least some of the pixels portraying the object), the scene-based image editing system 106 determines to target modifications to the entire object rather than requiring that the user specifically designate each pixel to be edited. Thus, in some cases, an object-aware modification includes a modification that targets an object by managing all the pixels portraying the object as part of a cohesive unit rather than individual elements. For instance, in some implementations an object-aware modification includes, but is not limited to, a move operation or a delete operation.

As shown in FIG. 7, the scene-based image editing system 106 utilizes a segmentation neural network 702 and a content-aware hole-filling machine learning model 704 to analyze/process a digital image 706. The digital image 706 portrays a plurality of objects 708*a*-708*d* against a background. Accordingly, in one or more embodiments, the scene-based image editing system 106 utilizes the segmentation neural network 702 to identify the objects 708*a*-708*d* within the digital image.

In one or more embodiments, the scene-based image editing system 106 utilizes the segmentation neural network 702 and the content-aware hole-filling machine learning model 704 to analyze the digital image 706 in anticipation of receiving user input for modifications of the digital image 706. Indeed, in some instances, the scene-based image editing system 106 analyzes the digital image 706 before receiving user input for such modifications. For instance, in some embodiments, the scene-based image editing system 106 analyzes the digital image 706 automatically in response to receiving or otherwise accessing the digital image 706. In some implementations, the scene-based image editing system 106 analyzes the digital image in response to a general user input to initiate pre-processing in anticipation of subsequent modification.

As shown in FIG. 7, the scene-based image editing system 106 utilizes the segmentation neural network 702 to generate object masks 710 for the objects 708*a*-708*d* portrayed in the digital image 706. In particular, in some embodiments, the scene-based image editing system 106 utilizes the segmentation neural network 702 to generate a separate object mask for each portrayed object.

As further shown in FIG. 7, the scene-based image editing system 106 utilizes the content-aware hole-filling machine learning model 704 to generate content fills 712 for the objects 708*a*-708*d*. In particular, in some embodiments, the scene-based image editing system 106 utilizes the content-aware hole-filling machine learning model 704 to generate a separate content fill for each portrayed object. As illustrated, the scene-based image editing system 106 generates the content fills 712 using the object masks 710. For instance, in one or more embodiments, the scene-based image editing system 106 utilizes the object masks 710 generated via the segmentation neural network 702 as indicators of replacement regions to be replaced using the content fills 712 generated by the content-aware hole-filling machine learning model 704. In some instances, the scene-based image editing system 106 utilizes the object masks 710 to filter out the objects from the digital image 706, which results in remaining holes in the digital image 706 to be filled by the content fills content fills 712.

As shown in FIG. 7, the scene-based image editing system 106 utilizes the object masks 710 and the content fills 712 to generate a completed background 714. In one or more embodiments, a completed background image includes a set of background pixels having objects replaced with content fills. In particular, a completed background includes the background of a digital image having the objects portrayed within the digital image replaced with corresponding content fills. In one or more implementations, a completed background comprises generating a content fill for each object in the image. Thus, the completed background may comprise various levels of completion when objects are in front of each other such that the background for a first object comprises part of a second object and the background of the second object comprises a semantic area or the furthest element in the image.

Indeed, FIG. 7 illustrates the background 716 of the digital image 706 with holes 718*a*-718*d* where the objects 708*a*-708*d* were portrayed. For instance, in some cases, the scene-based image editing system 106 filters out the objects 708*a*-708*d* using the object masks 710, causing the holes 718*a*-718*d* to remain. Further, the scene-based image editing system 106 utilizes the content fills 712 to fill in the holes 718*a*-718*d*, resulting in the completed background 714.

In other implementations, the scene-based image editing system 106 utilizes the object masks 710 as indicators of replacement regions in the digital image 706. In particular, the scene-based image editing system 106 utilizes the object masks 710 as indicators of potential replacement regions that may result from receiving user input to modify the digital image 706 via moving/removing one or more of the objects 708*a*-708*d*. Accordingly, the scene-based image editing system 106 utilizes the content fills 712 to replace pixels indicated by the object masks 710.

Though FIG. 7 indicates generating a separate completed background, it should be understood that, in some implementations, the scene-based image editing system 106 creates the completed background 714 as part of the digital image 706. For instance, in one or more embodiments, the scene-based image editing system 106 positions the content fills 712 behind their corresponding object (e.g., as a separate image layer) in the digital image 706. Further, in one or more embodiments, the scene-based image editing system 106 positions the object masks 710 behind their corresponding object (e.g., as a separate layer). In some implementations, the scene-based image editing system 106 places the content fills 712 behind the object masks 710.

Further, in some implementations, the scene-based image editing system 106 generates multiple filled-in backgrounds (e.g., semi-completed backgrounds) for a digital image. For instance, in some cases, where a digital image portrays a plurality of objects, the scene-based image editing system 106 generates a filled-in background for each object from the plurality of objects. To illustrate, the scene-based image editing system 106 generates a filled-in background for an object by generating a content fill for that object while treating the other objects of the digital image as part of the background. Thus, in some instances, the content fill includes portions of other objects positioned behind the object within the digital image.

Thus, in one or more embodiments, the scene-based image editing system 106 generates a combined image 718 as indicated in FIG. 7. Indeed, the scene-based image editing system 106 generates the combined image having the digital image 706, the object masks 710, and the content fills 712 as separate layers. Though, FIG. 7 shows the object masks 710 on top of the objects 708*a*-708*d* within the combined image 718, it should be understood that the scene-based image editing system 106 places the object masks 710 as well as the content fills 712 behind the objects 708*a*-708*d* in various implementations. Accordingly, the scene-based image editing system 106 presents the combined image 718 for display within a graphical user interface so that the object masks 710 and the content fills 712 are hidden from view until user interactions that trigger display of those components is received.

Further, though FIG. 7 shows the combined image 718 as separate from the digital image 706, it should be understood that the combined image 718 represents modifications to the digital image 706 in some implementations. In other words, in some embodiments, to generate the combined image 718 the scene-based image editing system 106 modifies the digital image 706 by adding additional layers composed of the object masks 710 and the content fills 712.

In one or more embodiments, the scene-based image editing system 106 utilizes the combined image 718 (e.g., the digital image 706, the object masks 710, and the content fills 712) to facilitate various object-aware modifications with respect to the digital image 706. In particular, the scene-based image editing system 106 utilizes the combined image 718 to implement an efficient graphical user interface that facilitates flexible object-aware modifications. FIGS. 8A-8D illustrate a graphical user interface implemented by the scene-based image editing system 106 to facilitate a move operation in accordance with one or more embodiments.

Figure 8B:
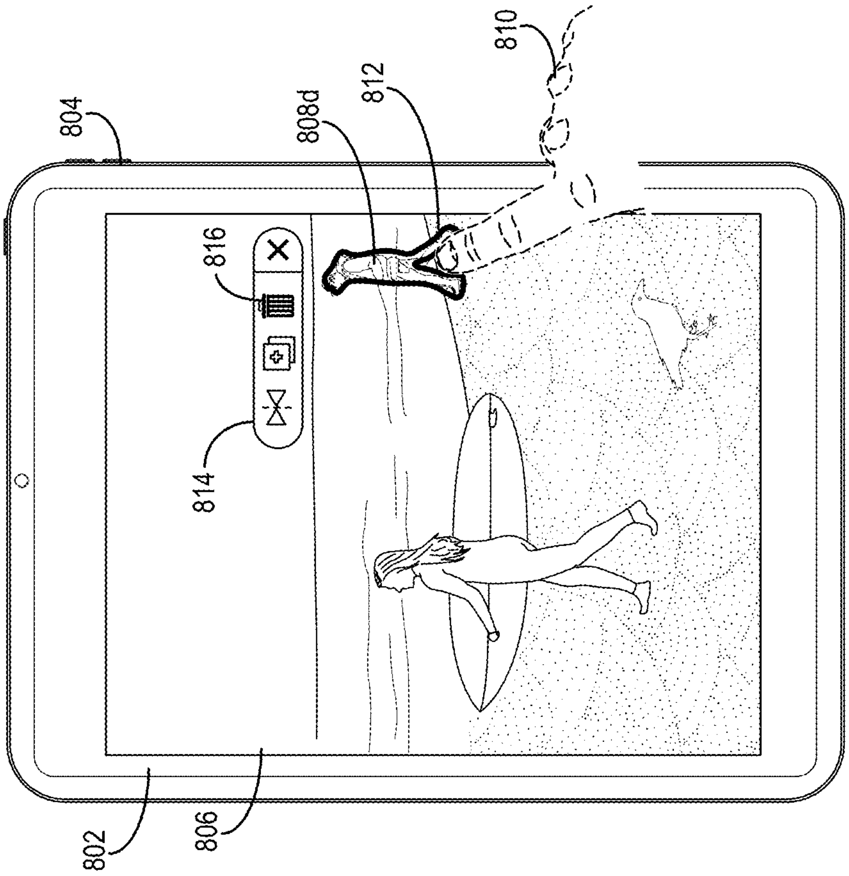
FIGS. 8A-8D illustrate a graphical user interface implemented by the scene-based image editing system to facilitate a move operation in accordance with one or more embodiments.
Figure 8A:
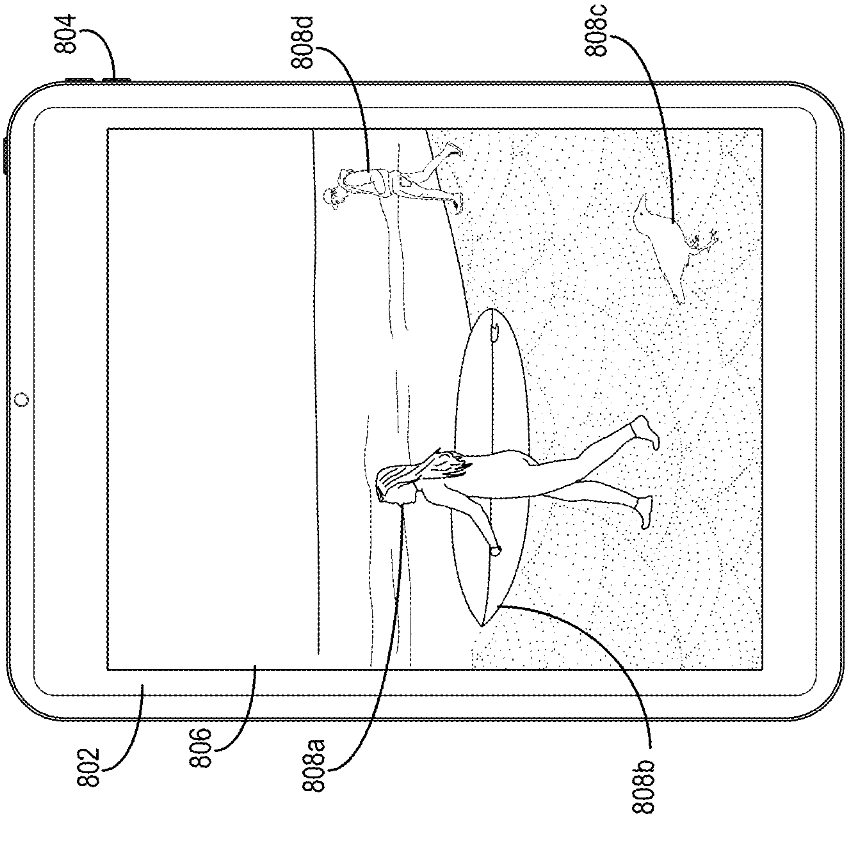

Indeed, as shown in FIG. 8A, the scene-based image editing system 106 provides a graphical user interface 802 for display on a client device 804, such as a mobile device. Further, the scene-based image editing system 106 provides a digital image 806 for display with the graphical user interface.

It should be noted that the graphical user interface 802 of FIG. 8A is minimalistic in style. In particular, the graphical user interface 802 does not include a significant number of menus, options, or other visual elements aside from the digital image 806. Though the graphical user interface 802 of FIG. 8A displays no menus, options, or other visual elements aside from the digital image 806, it should be understood that the graphical user interface 802 displays at least some menus, options, or other visual elements in various embodiments—at least when the digital image 806 is initially displayed.

As further shown in FIG. 8A, the digital image 806 portrays a plurality of objects 808*a*-808*d*. In one or more embodiments, the scene-based image editing system 106 pre-processes the digital image 806 before receiving user input for the move operation. In particular, in some embodiments, the scene-based image editing system 106 utilizes a segmentation neural network to detect and generate masks for the plurality of objects 808*a*-808*d* and/or utilizes a content-aware hole-filling machine learning model to generate content fills that correspond to the objects 808*a*-808*d*. Furthermore, in one or more implementations, the scene-based image editing system 106 generates the object masks, content fills, and a combined image upon loading, accessing, or displaying the digital image 806, and without, user input other than to open/display the digital image 806.

As shown in FIG. 8B, the scene-based image editing system 106 detects a user interaction with the object 808*d* via the graphical user interface 802. In particular, FIG. 8B illustrates the scene-based image editing system 106 detecting a user interaction executed by a finger (part of a hand 810) of a user (e.g., a touch interaction), though user interactions are executed by other instruments (e.g., stylus or pointer controlled by a mouse or track pad) in various embodiments. In one or more embodiments, the scene-based image editing system 106 determines that, based on the user interaction, the object 808*d* has been selected for modification.

The scene-based image editing system 106 detects the user interaction for selecting the object 808*d* via various operations in various embodiments. For instance, in some cases, the scene-based image editing system 106 detects the selection via a single tap (or click) on the object 808*d*. In some implementations, the scene-based image editing system 106 detects the selection of the object 808*d* via a double tap (or double click) or a press and hold operation. Thus, in some instances, the scene-based image editing system 106 utilizes the second click or the hold operation to confirm the user selection of the object 808*d*.

In some cases, the scene-based image editing system 106 utilizes various interactions to differentiate between a single object select or a multi-object select. For instance, in some cases, the scene-based image editing system 106 determines that a single tap is for selecting a single object and a double tap is for selecting multiple objects. To illustrate, in some cases, upon receiving a first tap on an object, the scene-based image editing system 106 selects the object. Further, upon receiving a second tap on the object, the scene-based image editing system 106 selects one or more additional objects. For instance, in some implementations, the scene-based image editing system 106 selects one or more additional object having the same or a similar classification (e.g., selecting other people portrayed in an image when the first tap interacted with a person in the image). In one or more embodiments, the scene-based image editing system 106 recognizes the second tap as an interaction for selecting multiple objects if the second tap is received within a threshold time period after receiving the first tap.

In some embodiments, the scene-based image editing system 106 recognizes other user interactions for selecting multiple objects within a digital image. For instance, in some implementations, the scene-based image editing system 106 receives a dragging motion across the display of a digital image and selects all object captured within the range of the dragging motion. To illustrate, in some cases, the scene-based image editing system 106 draws a box that grows with the dragging motion and selects all objects that falls within the box. In some cases, the scene-based image editing system 106 draws a line that follows the path of the dragging motion and selects all objects intercepted by the line.

In some implementations, the scene-based image editing system 106 further allows for user interactions to select distinct portions of an object. To illustrate, in some cases, upon receiving a first tap on an object, the scene-based image editing system 106 selects the object. Further, upon receiving a second tap on the object, the scene-based image editing system 106 selects a particular portion of the object (e.g., a limb or torso of a person or a component of a vehicle). In some cases, the scene-based image editing system 106 selects the portion of the object touched by the second tap. In some cases, the scene-based image editing system 106 enters into a "sub object" mode upon receiving the second tap and utilizes additional user interactions for selecting particular portions of the object.

Returning to FIG. 8B, as shown, based on detecting the user interaction for selecting the object 808*d*, the scene-based image editing system 106 provides a visual indication 812 in association with the object 808*d*. Indeed, in one or more embodiments, the scene-based image editing system 106 detects the user interaction with a portion of the object 808*d*—e.g., with a subset of the pixels that portray the object—and determines that the user interaction targets the object 808*d* as a whole (rather than the specific pixels with which the user interacted). For instance, in some embodiments, the scene-based image editing system 106 utilizes the pre-generated object mask that corresponds to the object 808*d* to determine whether the user interaction targets the object 808*d* or some other portion of the digital image 806. For example, in some cases, upon detecting that the user interacts with an area inside the object mask that corresponds to the object 808*d*, the scene-based image editing system 106 determines that the user interaction targets the object 808*d* as a whole. Thus, the scene-based image editing system 106 provides the visual indication 812 in association with the object 808*d* as a whole.

In some cases, the scene-based image editing system 106 utilizes the visual indication 812 to indicate, via the graphical user interface 802, that the selection of the object 808*d* has been registered. In some implementations, the scene-based image editing system 106 utilizes the visual indication 812 to represent the pre-generated object mask that corresponds to the object 808*d*. Indeed, in one or more embodiments, in response to detecting the user interaction with the object 808*d*, the scene-based image editing system 106 surfaces the corresponding object mask. For instance, in some cases, the scene-based image editing system 106 surfaces the object mask in preparation for a modification to the object 808*d* and/or to indicate that the object mask has already been generated and is available for use. In one or more embodiments, rather than using the visual indication 812 to represent the surfacing of the object mask, the scene-based image editing system 106 displays the object mask itself via the graphical user interface 802.

Additionally, as the scene-based image editing system 106 generated the object mask for the object 808*d* prior to receiving the user input to select the object 808*d*, the scene-based image editing system 106 surfaces the visual indication 812 without latency or delay associated with conventional systems. In other words, the scene-based image editing system 106 surfaces the visual indication 812 without any delay associated with generating an object mask.

As further illustrated, based on detecting the user interaction for selecting the object 808*d*, the scene-based image editing system 106 provides an option menu 814 for display via the graphical user interface 802. The option menu 814 shown in FIG. 8B provides a plurality of options, though the option menu includes various numbers of options in various embodiments. For instance, in some implementations, the option menu 814 includes one or more curated options, such as options determined to be popular or used with the most frequency. For example, as shown in FIG. 8B, the option menu 814 includes an option 816 to delete the object 808*d*.

Thus, in one or more embodiments, the scene-based image editing system 106 provides modification options for display via the graphical user interface 802 based on the context of a user interaction. Indeed, as just discussed, the scene-based image editing system 106 provides an option menu that provides options for interacting with (e.g., modifying) a selected object. In doing so, the scene-based image editing system 106 minimizes the screen clutter that is typical under many conventional systems by withholding options or menus for display until it is determined that those options or menus would be useful in the current context in which the user is interacting with the digital image. Thus, the graphical user interface 802 used by the scene-based image editing system 106 allows for more flexible implementation on computing devices with relatively limited screen space, such as smart phones or tablet devices.

Figure 8D:
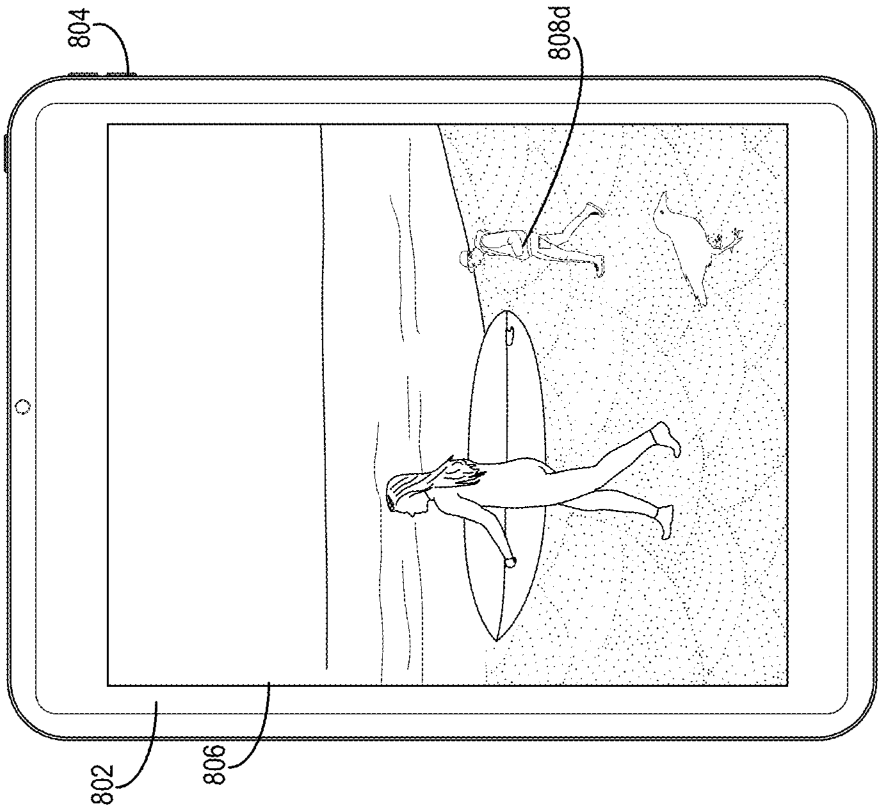
Figure 8C:
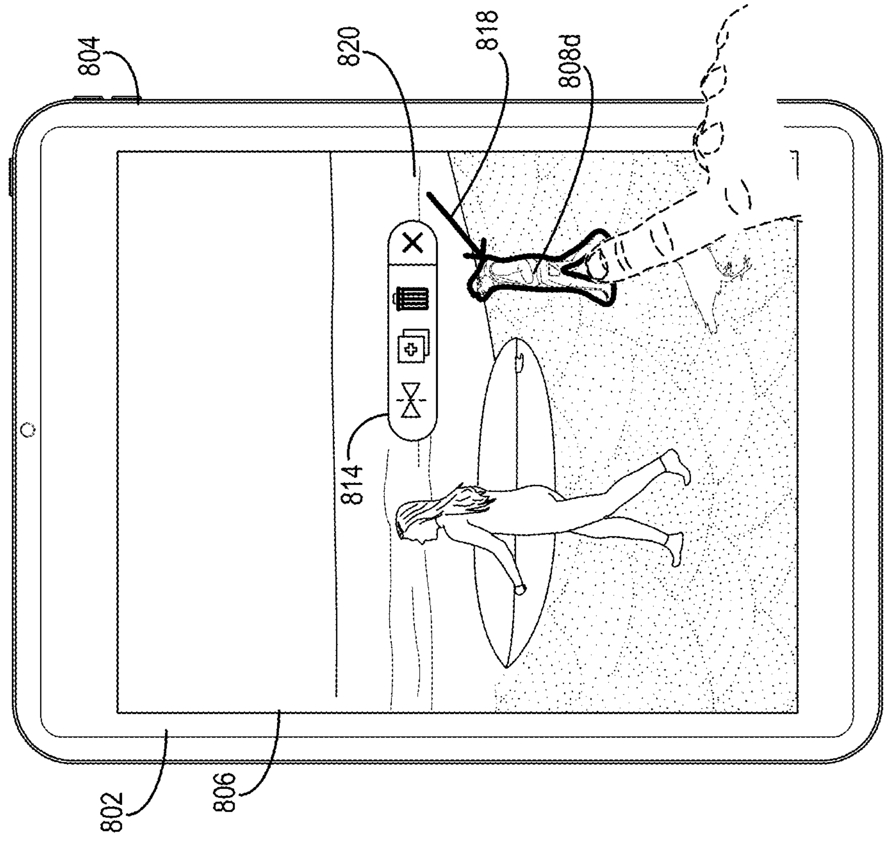

As shown in FIG. 8C, the scene-based image editing system 106 detects, via the graphical user interface 802, an additional user interaction for moving the object 808*d* across the digital image 806 (as shown via the arrow 818). In particular, the scene-based image editing system 106 detects the additional user interaction for moving the object 808*d* from a first position in the digital image 806 to a second position. For instance, in some cases, the scene-based image editing system 106 detects the second user interaction via a dragging motion (e.g., the user input selects the object 808*d* and moves across the graphical user interface 802 while holding onto the object 808*d*). In some implementations, after the initial selection of the object 808*d*, the scene-based image editing system 106 detects the additional user interaction as a click or tap on the second position and determines to use the second position as a new position for the object 808*d*. It should be noted that the scene-based image editing system 106 moves the object 808*d* as a whole in response to the additional user interaction.

As indicated in FIG. 8C, upon moving the object 808*d* from the first position to the second position, the scene-based image editing system 106 exposes the content fill 820 that was placed behind the object 808*d* (e.g., behind the corresponding object mask). Indeed, as previously discussed, the scene-based image editing system 106 places pre-generated content fills behind the objects (or corresponding object masks) for which the content fills were generated. Accordingly, upon removing the object 808*d* from its initial position within the digital image 806, the scene-based image editing system 106 automatically reveals the corresponding content fill. Thus, the scene-based image editing system 106 provides a seamless experience where an object is movable without exposing any holes in the digital image itself. In other words, the scene-based image editing system 106 provides the digital image 806 for display as if it were a real scene in which the entire background is already known.

Additionally, as the scene-based image editing system 106 generated the content fill 820 for the object 808*d* prior to receiving the user input to move the object 808*d*, the scene-based image editing system 106 exposes or surfaces the content fill 820 without latency or delay associated with conventional systems. In other words, the scene-based image editing system 106 exposes the content fill 820 incrementally as the object 808*d* is moved across the digital image 806 without any delay associated with generating content.

As further shown in FIG. 8D, the scene-based image editing system 106 deselects the object 808*d* upon completion of the move operation. In some embodiments, the object 808*d* maintains the selection of the object 808*d* until receiving a further user interaction to indicate deselection of the object 808*d* (e.g., a user interaction with another portion of the digital image 806). As further indicated, upon deselecting the object 808*d*, the scene-based image editing system 106 further removes the option menu 814 that was previously presented. Thus, the scene-based image editing system 106 dynamically presents options for interacting with objects for display via the graphical user interface 802 to maintain a minimalistic style that does not overwhelm the displays of computing devices with limited screen space.

Figure 9C:
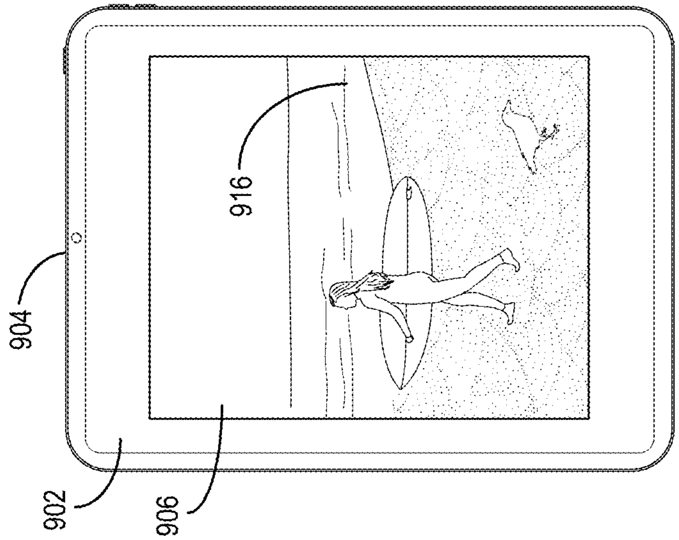
FIGS. 9A-9C illustrate a graphical user interface implemented by the scene-based image editing system to facilitate a delete operation in accordance with one or more embodiments.
Figure 9B:
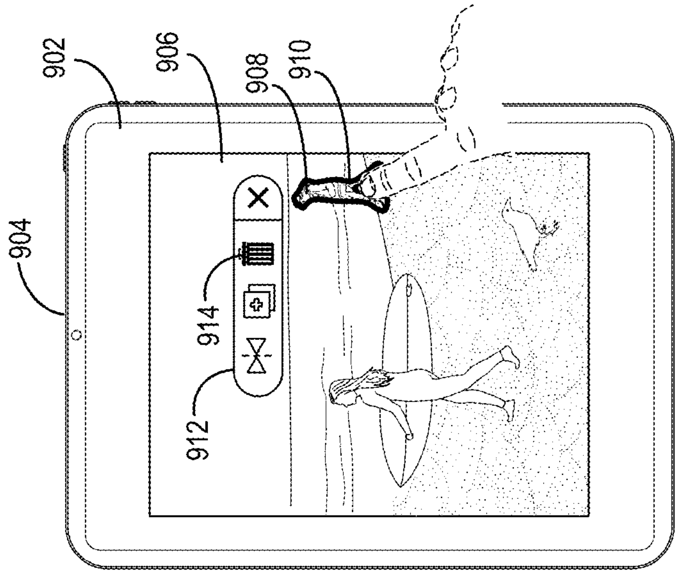
Figure 9A:
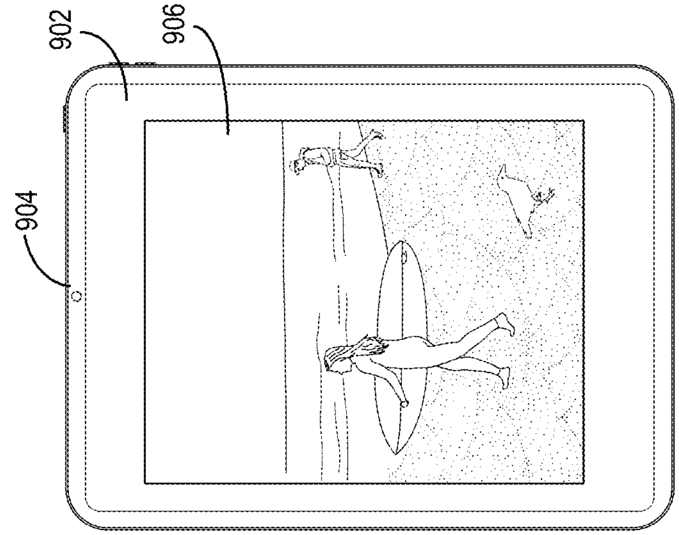

FIGS. 9A-9C illustrate a graphical user interface implemented by the scene-based image editing system 106 to facilitate a delete operation in accordance with one or more embodiments. Indeed, as shown in FIG. 9A, the scene-based image editing system 106 provides a graphical user interface 902 for display on a client device 904 and provides a digital image 906 for display in the graphical user interface 902.

As further shown in FIG. 9B, the scene-based image editing system 106 detects, via the graphical user interface 902, a user interaction with an object 908 portrayed in the digital image 906. In response to detecting the user interaction, the scene-based image editing system 106 surfaces the corresponding object mask, providing the visual indication 910 (or the object mask itself) for display in association with the object 908, and provides the option menu 912 for display. In particular, as shown, the option menu 912 includes an option 914 for deleting the object 908 that has been selected.

Additionally, as shown in FIG. 9C, the scene-based image editing system 106 removes the object 908 from the digital image 906. For instance, in some cases, the scene-based image editing system 106 detects an additional user interaction via the graphical user interface 902 (e.g., an interaction with the option 914 for deleting the object 908) and removes the object 908 from the digital image 906 in response. As further shown, upon removing the object 908 from the digital image 906, the scene-based image editing system 106 automatically exposes the content fill 916 that was previously placed behind the object 908 (e.g., behind the corresponding object mask). Thus, in one or more embodiments, the scene-based image editing system 106 provides the content fill 916 for immediate display upon removal of the object 908.

While FIGS. 8B, 8C, and 9B illustrate the scene-based image editing system 106 providing a menu, in or more implementations, the scene-based image editing system 106 allows for object-based editing without requiring or utilizing a menu. For example, the scene-based image editing system 106 selects an object 808*d*, 908 and surfaces a visual indication 812, 910 in response to a first user interaction (e.g., a tap on the respective object). The scene-based image editing system 106 performs an object-based editing of the digital image in response to second user interaction without the use of a menu. For example, in response to a second user input dragging the object across the image, the scene-based image editing system 106 moves the object. Alternatively, in response to a second user input (e.g., a second tap), the scene-based image editing system 106 deletes the object.

The scene-based image editing system 106 provides more flexibility for editing digital images when compared to conventional systems. In particular, the scene-based image editing system 106 facilitates object-aware modifications that enable interactions with objects rather than requiring targeting the underlying pixels. Indeed, based on a selection of some pixels that contribute to the portrayal of an object, the scene-based image editing system 106 flexibly determines that the whole object has been selected. This is in contrast to conventional systems that require a user to select an option from a menu indicating an intention to selection an object, provide a second user input indicating the object to select (e.g., a bounding box about the object or drawing of another rough boundary about the object), and another user input to generate the object mask. The scene-based image editing system 106 instead provides for selection of an object with a single user input (a tap on the object).

Further, upon user interactions for implementing a modification after the prior selection, the scene-based image editing system 106 applies the modification to the entire object rather than the particular set of pixels that were selected. Thus, the scene-based image editing system 106 manages objects within digital images as objects of a real scene that are interactive and can be handled as cohesive units. Further, as discussed, the scene-based image editing system 106 offers improved flexibility with respect to deployment on smaller devices by flexibly and dynamically managing the amount of content that is displayed on a graphical user interface in addition to a digital image.

Additionally, the scene-based image editing system 106 offers improved efficiency when compared to many conventional systems. Indeed, as previously discussed, conventional systems typically require execution of a workflow consisting of a sequence of user interactions to perform a modification. Where a modification is meant to target a particular object, many of these systems require several user interactions just to indicate that the object is the subject of the subsequent modification (e.g., user interactions for identifying the object and separating the object from the rest of the image) as well as user interactions for closing the loop on executed modifications (e.g., filling in the holes remaining after removing objects). The scene-based image editing system 106, however, reduces the user interactions typically required for a modification by pre-processing a digital image before receiving user input for such a modification. Indeed, by generating object masks and content fills automatically, the scene-based image editing system 106 eliminates the need for user interactions to perform these steps.

In one or more embodiments, the scene-based image editing system 106 performs further processing of a digital image in anticipation of modifying the digital image. For instance, as previously mentioned, the scene-based image editing system 106 generates a semantic scene graph from a digital image in some implementations. Thus, in some cases, upon receiving one or more user interactions for modifying the digital image, the scene-based image editing system 106 utilizes the semantic scene graph to execute the modifications. Indeed, in many instances, the scene-based image editing system 106 generates a semantic scene graph for use in modifying a digital image before receiving user input for such modifications. FIGS. 10-15 illustrate diagrams for generating a semantic scene graph for a digital image in accordance with one or more embodiments.

Indeed, many conventional systems are inflexible in that they typically wait upon user interactions before determining characteristics of a digital image. For instance, such conventional systems often wait upon a user interaction that indicates a characteristic to be determined and then performs the corresponding analysis in response to receiving the user interaction. Accordingly, these systems fail to have useful characteristics readily available for use. For example, upon receiving a user interaction for modifying a digital image, conventional systems typically must perform an analysis of the digital image to determine characteristics to change after the user interaction has been received.

Further, as previously discussed, such operation results in inefficient operation as image edits often require workflows of user interactions, many of which are used in determining characteristics to be used in execution of the modification. Thus, conventional systems often require a significant number of user interactions to determine the characteristics needed for an edit.

The scene-based image editing system 106 provides advantages by generating a semantic scene graph for a digital image in anticipation of modifications to the digital image. Indeed, by generating the semantic scene graph, the scene-based image editing system 106 improves flexibility over conventional systems as it makes characteristics of a digital image readily available for use in the image editing process. Further, the scene-based image editing system 106 provides improved efficiency by reducing the user interactions required in determining these characteristics. In other words, the scene-based image editing system 106 eliminates the user interactions often required under conventional systems for the preparatory steps of editing a digital image. Thus, the scene-based image editing system 106 enables user interactions to focus on the image edits more directly themselves.

Additionally, by generating a semantic scene graph for a digital image, the scene-based image editing system 106 intelligently generates/obtains information the allows an image to be edited like a real-world scene. For example, the scene-based image editing system 106 generates a scene graph that indicates objects, object attributes, object relationships, etc. that allows the scene-based image editing system 106 to enable object/scene-based image editing.

In one or more embodiments, a semantic scene graph includes a graph representation of a digital image. In particular, in some embodiments, a semantic scene graph includes a graph that maps out characteristics of a digital image and their associated characteristic attributes. For instance, in some implementations, a semantic scene graph includes a node graph having nodes that represent characteristics of the digital image and values associated with the node representing characteristic attributes of those characteristics. Further, in some cases, the edges between the nodes represent the relationships between the characteristics.

Figure 10:
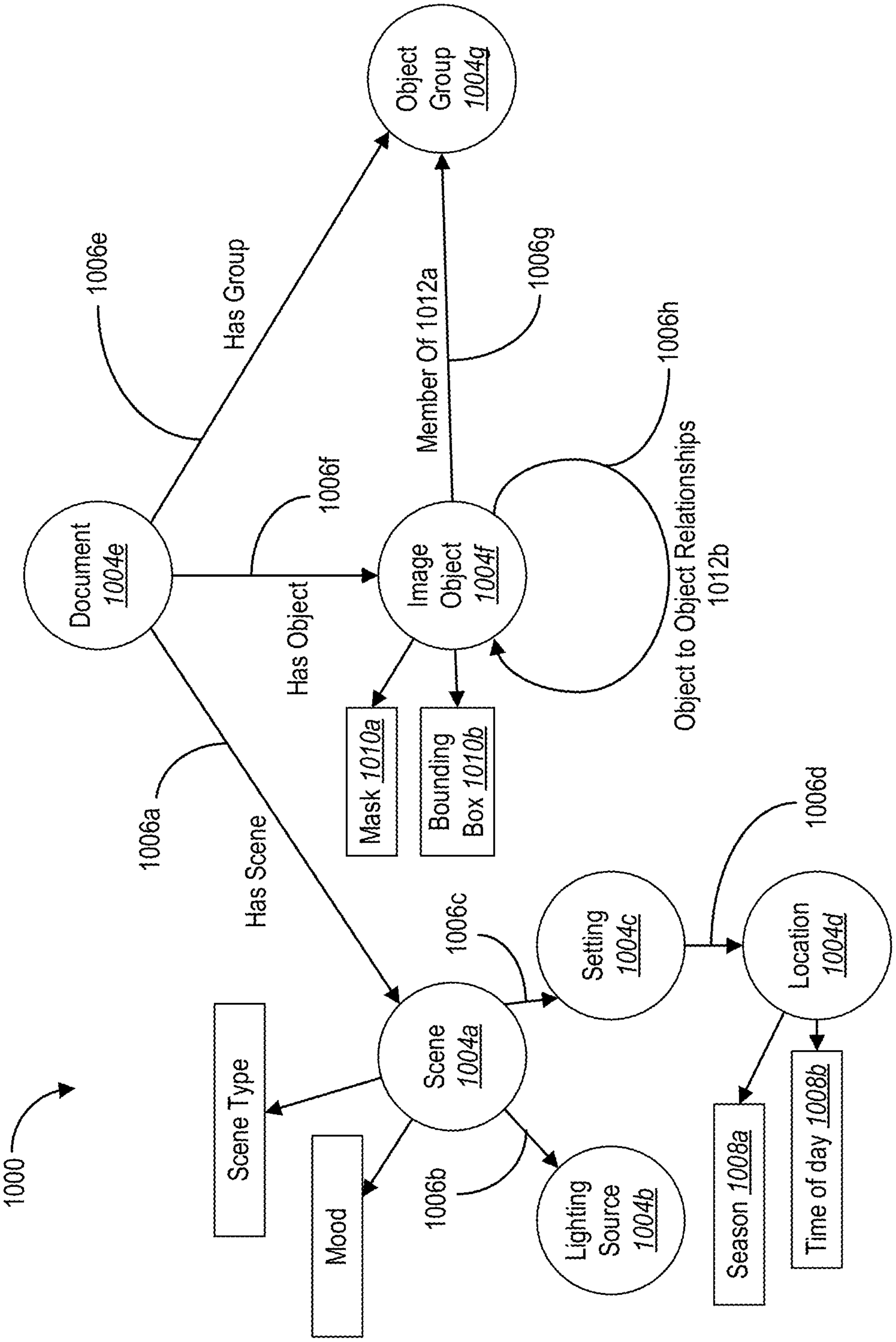
FIG. 10 illustrates an image analysis graph utilized by the scene-based image editing system in generating a semantic scene graph in accordance with one or more embodiments.

As mentioned, in one or more implementations, the scene-based image editing system 106 utilizes one or more predetermined or pre-generated template graphs in generating a semantic scene graph for a digital image. For instance, in some cases, the scene-based image editing system 106 utilizes an image analysis graph in generating a semantic scene graph. FIG. 10 illustrates an image analysis graph 1000 utilized by the scene-based image editing system 106 in generating a semantic scene graph in accordance with one or more embodiments.

In one or more embodiments, an image analysis graph includes a template graph for structing a semantic scene graph. In particular, in some embodiments, an image analysis graph includes a template graph used by the scene-based image editing system 106 to organize the information included in a semantic scene graph. For instance, in some implementations, an image analysis graph includes a template graph that indicates how to organize the nodes of the semantic scene graph representing characteristics of a digital image. In some instances, an image analysis graph additionally or alternatively indicates the information to be represented within a semantic scene graph. For instance, in some cases, an image analysis graph indicates the characteristics, relationships, and characteristic attributes of a digital image to be represented within a semantic scene graph.

Indeed, as shown in FIG. 10, the image analysis graph 1000 includes a plurality of nodes 1004*a*-1004*g*. In particular, the plurality of nodes 1004*a*-1004*g* correspond to characteristics of a digital image. For instance, in some cases, the plurality of nodes 1004*a*-1004*g* represent characteristic categories that are to be determined when analyzing a digital image. Indeed, as illustrated, the image analysis graph 1000 indicates that a semantic scene graph is to represent the objects and object groups within a digital image as well as the scene of a digital image, including the lighting source, the setting, and the particular location.

As further shown in FIG. 10, the image analysis graph 1000 includes an organization of the plurality of nodes 1004*a*-1004*g*. In particular, the image analysis graph 1000 includes edges 1006*a*-1006*h* arranged in a manner that organizes the plurality of nodes 1004*a*-1004*g*. In other words, the image analysis graph 1000 illustrates the relationships among the characteristic categories included therein. For instance, the image analysis graph 1000 indicates that the object category represented by the node 1004*f* and the object group category represented by the node 1004*g* are closely related, both describing objects that portrayed in a digital image.

Additionally, as shown in FIG. 10, the image analysis graph 1000 associates characteristic attributes with one or more of the nodes 1004*a*-1004*g* to represent characteristic attributes of the corresponding characteristic categories. For instance, as shown, the image analysis graph 1000 associates a season attribute 1008*a* and a time-of-day attribute 1008*b* with the setting category represented by the node 1004*c*. In other words, the image analysis graph 1000 indicates that the season and time of day should be determined when determining a setting of a digital image. Further, as shown, the image analysis graph 1000 associates an object mask 1010*a* and a bounding box 1010*b* with the object category represented by the node 1004*f*. Indeed, in some implementations, the scene-based image editing system 106 generates content for objects portrayed in a digital image, such as an object mask and a bounding box. Accordingly, the image analysis graph 1000 indicates that this pre-generated content is to be associated with the node representing the corresponding object within a semantic scene graph generated for the digital image.

As further shown in FIG. 10, the image analysis graph 1000 associates characteristic attributes with one or more of the edges 1006*a*-1006*h* to represent characteristic attributes of the corresponding characteristic relationships represented by these edges 1006*a*-1006*h*. For instance, as shown, the image analysis graph 1000 associates a characteristic attribute 1012*a* with the edge 1006*g* indicating that an object portrayed in a digital image will be a member of a particular object group. Further, the image analysis graph 1000 associates a characteristic attribute 1012*b* with the edge 1006*h* indicating that at least some objects portrayed in a digital image have relationships with one another. FIG. 10 illustrates a sample of relationships that are identified between objects in various embodiments, and additional detail regarding these relationships will be discussed in further detail below.

It should be noted that the characteristic categories and characteristic attributes represented in FIG. 10 are exemplary and the image analysis graph 1000 includes a variety of characteristic categories and/or characteristic attributes not shown in various embodiments. Further, FIG. 10 illustrates a particular organization of the image analysis graph 1000, though alternative arrangements are used in different embodiments. Indeed, in various embodiments, the scene-based image editing system 106 accommodates a variety of characteristic categories and characteristic attributes to facilitate subsequent generation of a semantic scene graph that supports a variety of image edits. In other words, the scene-based image editing system 106 includes those characteristic categories and characteristic attributes that it determines are useful in editing a digital image.

Figure 11:
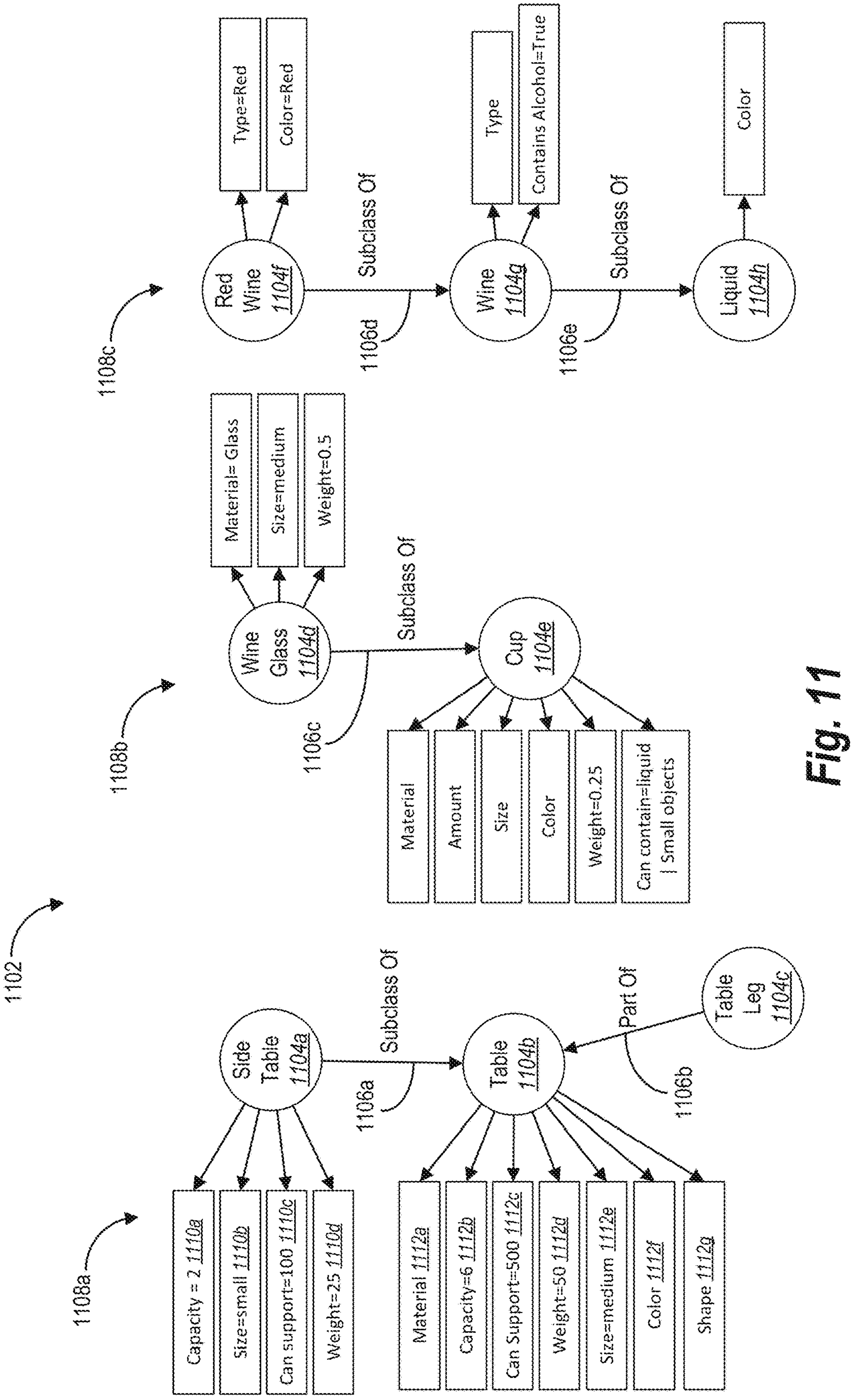
FIG. 11 illustrates a real-world class description graph utilized by the scene-based image editing system in generating a semantic scene graph in accordance with one or more embodiments.

In some embodiments, the scene-based image editing system 106 utilizes a real-world class description graph in generating a semantic scene graph for a digital image. FIG. 11 illustrates a real-world class description graph 1102 utilized by the scene-based image editing system 106 in generating a semantic scene graph in accordance with one or more embodiments.

In one or more embodiments, a real-world class description graph includes a template graph that describes scene components (e.g., semantic areas) that may be portrayed in a digital image. In particular, in some embodiments, a real-world class description graph includes a template graph used by the scene-based image editing system 106 to provide contextual information to a semantic scene graph regarding scene components—such as objects—potentially portrayed in a digital image. For instance, in some implementations, a real-world class description graph provides a hierarchy of object classifications and/or an anatomy (e.g., object components) of certain objects that may be portrayed in a digital image. In some instances, a real-world class description graph further includes object attributes associated with the objects represented therein. For instance, in some cases, a real-world class description graph provides object attributes assigned to a given object, such as shape, color, material from which the object is made, weight of the object, weight the object can support, and/or various other attributes determined to be useful in subsequently modifying a digital image. Indeed, as will be discussed, in some cases, the scene-based image editing system 106 utilizes a semantic scene graph for a digital image to suggest certain edits or suggest avoiding certain edits to maintain consistency of the digital image with respect to the contextual information contained in the real-world class description graph from which the semantic scene graph was built.

As shown in FIG. 11, the real-world class description graph 1102 includes a plurality of nodes 1104*a*-1104*h* and a plurality of edges 1106*a*-1106*e* that connect some of the nodes 1104*a*-1104*h*. In particular, in contrast to the image analysis graph 1000 of FIG. 10, the real-world class description graph 1102 does not provide a single network of interconnected nodes. Rather, in some implementations, the real-world class description graph 1102 includes a plurality of node clusters 1108*a*-1108*c* that are separate and distinct from one another.

In one or more embodiments, each node cluster corresponds to a separate scene component (e.g., semantic area) class that may be portrayed in a digital image. Indeed, as shown in FIG. 11, each of the node clusters 1108*a*-1108*c* corresponds to a separate object class that may be portrayed in a digital image. As indicated above, the real-world class description graph 1102 is not limited to representing object classes and can represent other scene component classes in various embodiments.

As shown in FIG. 11, each of the node clusters 1108*a*-1108*c* portrays a hierarchy of class descriptions (otherwise referred to as a hierarchy of object classifications) corresponding to a represented object class. In other words, each of the node clusters 1108*a*-1108*c* portrays degrees of specificity/generality with which an object is described or labeled. Indeed, in some embodiments, the scene-based image editing system 106 applies all class descriptions/labels represented in a node cluster to describe a corresponding object portrayed in a digital image. In some implementations, however, the scene-based image editing system 106 utilizes a subset of the class descriptions/labels to describe an object.

As an example, the node cluster 1108*a* includes a node 1104*a* representing a side table class and a node 1104*b* representing a table class. Further, as shown in FIG. 11, the node cluster 1108*a* includes an edge 1106*a* between the node 1104*a* and the node 1104*b* to indicate that the side table class is a subclass of the table class, thus indicating a hierarchy between these two classifications that are applicable to a side table. In other words, the node cluster 1108*a* indicates that a side table is classifiable either as a side table and/or more generally as a table. In other words, in one or more embodiments, upon detecting a side table portrayed in a digital image, the scene-based image editing system 106 labels the side table as a side table and/or as a table based on the hierarchy represented in the real-world class description graph 1102.

The degree to which a node cluster represents a hierarchy of class descriptions varies in various embodiments. In other words, the length/height of the represented hierarchy varies in various embodiments. For instance, in some implementations, the node cluster 1108*a* further includes a node representing a furniture class, indicating that a side table is classifiable as a piece of furniture. In some cases, the node cluster 1108*a* also includes a node representing an inanimate object lass, indicating that a side table is classifiable as such. Further, in some implementations, the node cluster 1108*a* includes a node representing an entity class, indicating that a side table is classifiable as an entity. Indeed, in some implementations, the hierarchies of class descriptions represented within the real-world class description graph 1102 include a class description/label—such as an entity class—at such a high level of generality that it is commonly applicable to all objects represented within the real-world class description graph 1102.

As further shown in FIG. 11, the node cluster 1108*a* includes an anatomy (e.g., object components) of the represented object class. In particular, the node cluster 1108*a* includes a representation of component parts for the table class of objects. For instance, as shown, the node cluster 1108*a* includes a node 1104*c* representing a table leg class. Further, the node cluster 1108*a* includes an edge 1106*b* indicating that a table leg from the table leg class is part of a table from the table class. In other words, the edge 1106*b* indicates that a table leg is a component of a table. In some cases, the node cluster 1108*a* includes additional nodes for representing other components that are part of a table, such as a tabletop, a leaf, or an apron.

As shown in FIG. 11, the node 1104*c* representing the table leg class of objects is connected to the node 1104*b* representing the table class of objects rather than the node 1104*a* representing the side table class of objects. Indeed, in some implementations, the scene-based image editing system 106 utilizes such a configuration based on determining that all tables include one or more table legs. Thus, as side tables are a subclass of tables, the configuration of the node cluster 1108*a* indicates that all side tables also include one or more table legs. In some implementations, however, the scene-based image editing system 106 additionally or alternatively connects the node 1104*c* representing the table leg class of objects to the node 1104*a* representing the side table class of objects to specify that all side tables include one or more table legs.

Similarly, the node cluster 1108*a* includes object attributes 1110*a*-1110*d* associated with the node 1104*a* for the side table class and an additional object attributes 1112*a*-1112*g* associated with the node 1104*b* for the table class. Thus, the node cluster 1108*a* indicates that the object attributes 1110*a*-1110*d* are specific to the side table class while the additional object attributes 1112*a*-1112*g* are more generally associated with the table class (e.g., associated with all object classes that fall within the table class). In one or more embodiments, the object attributes 1110*a*-1110*d* and/or the additional object attributes 1112*a*-1112*g* are attributes that have been arbitrarily assigned to their respective object class (e.g., via user input or system defaults). For instance, in some cases, the scene-based image editing system 106 determines that all side tables can support one hundred pounds as suggested by FIG. 11 regardless of the materials used or the quality of the build. In some instances, however, the object attributes 1110*a*-1110*d* and/or the additional object attributes 1112*a*-1112*g* represent object attributes that are common among all objects that fall within a particular class, such as the relatively small size of side tables. In some implementations, however, the object attributes 1110*a*-1110*d* and/or the additional object attributes 1112*a*-1112*g* are indicators of object attributes that should be determined for an object of the corresponding object class. For instance, in one or more embodiments, upon identifying a side table, the scene-based image editing system 106 determines at least one of the capacity, size, weight, or supporting weight of the side table.

It should be noted that there is some overlap between object attributes included in a real-world class description graph and characteristic attributes included in an image analysis graph in some embodiments. Indeed, in many implementations, object attributes are characteristic attributes that are specific towards objects (rather than attributes for the setting or scene of a digital image). Further, it should be noted that the object attributes are merely exemplary and do not necessarily reflect the object attributes that are to be associated with an object class. Indeed, in some embodiments, the object attributes that are shown and their association with particular object classes are configurable to accommodate different needs in editing a digital image.

In some cases, a node cluster corresponds to one particular class of objects and presents a hierarchy of class descriptions and/or object components for that one particular class. For instance, in some implementations, the node cluster 1108*a* only corresponds to the side table class and presents a hierarchy of class descriptions and/or object components that are relevant to side tables. Thus, in some cases, upon identifying a side table within a digital image, the scene-based image editing system 106 refers to the node cluster 1108*a* for the side table class when generating a semantic scene graph but refers to a separate node cluster upon identifying another subclass of table within the digital image. In some cases, this separate node cluster includes several similarities (e.g., similar nodes and edges) with the node cluster 1108*a* as the other type of table would be included in a subclass of the table class and include one or more table legs.

In some implementations, however, a node cluster corresponds to a plurality of different but related object classes and presents a common hierarchy of class descriptions and/or object components for those object classes. For instance, in some embodiments, the node cluster 1108*a* includes an additional node representing a dining table class that is connected to the node 1104*b* representing the table class via an edge indicating that dining tables are also a subclass of tables. Indeed, in some cases, the node cluster 1108*a* includes nodes representing various subclasses of a table class. Thus, in some instances, upon identifying a table from a digital image, the scene-based image editing system 106 refers to the node cluster 1108*a* when generating a semantic scene graph for the digital image regardless of the subclass to which the table belongs.

As will be described, in some implementations, utilizing a common node cluster for multiple related subclasses facilitates object interactivity within a digital image. For instance, as noted, FIG. 11 illustrates multiple separate node clusters. As further mentioned however, the scene-based image editing system 106 includes a classification (e.g., an entity classification) that is common among all represented objects within the real-world class description graph 1102 in some instances. Accordingly, in some implementations, the real-world class description graph 1102 does include a single network of interconnected nodes where all node clusters corresponding to separate object classes connect at a common node, such as a node representing an entity class. Thus, in some embodiments, the real-world class description graph 1102 illustrates the relationships among all represented objects.

Figure 12:
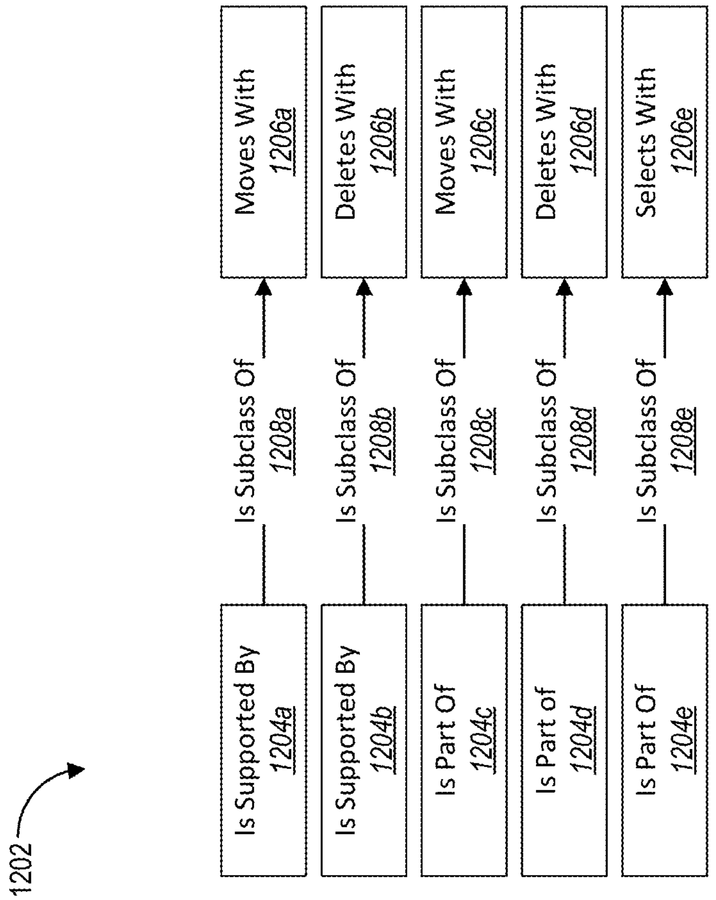
FIG. 12 illustrates a behavioral policy graph utilized by the scene-based image editing system in generating a semantic scene graph in accordance with one or more embodiments.

In one or more embodiments, the scene-based image editing system 106 utilizes a behavioral policy graph in generating a semantic scene graph for a digital image. FIG. 12 illustrates a behavioral policy graph 1202 utilized by the scene-based image editing system 106 in generating a semantic scene graph in accordance with one or more embodiments.

In one or more embodiments, a behavioral policy graph includes a template graph that describes the behavior of an object portrayed in a digital image based on the context in which the object is portrayed. In particular, in some embodiments, a behavioral policy graph includes a template graph that assigns behaviors to objects portrayed in a digital image based on a semantic understanding of the objects and/or their relationships to other objects portrayed in the digital image. Indeed, in one or more embodiments, a behavioral policy includes various relationships among various types of objects and designates behaviors for those relationships. In some cases, the scene-based image editing system 106 includes a behavioral policy graph as part of a semantic scene graph. In some implementations, as will be discussed further below, a behavioral policy is separate from the semantic scene graph but provides plug-in behaviors based on the semantic understanding and relationships of objects represented in the semantic scene graph.

As shown in FIG. 12, the behavioral policy graph 1202 includes a plurality of relationship indicators 1204*a*-1204*e* and a plurality of behavior indicators 1206*a*-1206*e* that are associated with the relationship indicators 1204*a*-1204*e*. In one or more embodiments, the relationship indicators 1204*a*-1204*e* reference a relationship subject (e.g., an object in the digital image that is the subject of the relationship) and a relationship object (e.g., an object in the digital image that is the object of the relationship). For example, the relationship indicators 1204*a*-1204*e* of FIG. 12 indicate that the relationship subject "is supported by" or "is part of" the relationship object. Further, in one or more embodiments the behavior indicators 1206*a*-1206*e* assign a behavior to the relationship subject (e.g., indicating that the relationship subject "moves with" or "deletes with" the relationship object). In other words, the behavior indicators 1206*a*-1206*e* provide modification instructions for the relationship subject when the relationship object is modified.

FIG. 12 provides a small subset of the relationships recognized by the scene-based image editing system 106 in various embodiments. For instance, in some implementations, the relationships recognized by the scene-based image editing system 106 and incorporated into generated semantic scene graphs include, but are not limited to, relationships described as "above," "below," "behind," "in front of," "touching," "held by," "is holding," "supporting," "standing on," "worn by," "wearing," "leaning on," "looked at by," or "looking at." Indeed, as suggested by the foregoing, the scene-based image editing system 106 utilizes relationship pairs to describe the relationship between objects in both directions in some implementations. For instance, in some cases, where describing that a first object "is supported by" a second object, the scene-based image editing system 106 further describes that the second object "is supporting" the first object. Thus, in some cases, the behavioral policy graph 1202 includes these relationship pairs, and the scene-based image editing system 106 includes the information in the semantic scene graphs accordingly.

As further shown, the behavioral policy graph 1202 further includes a plurality of classification indicators 1208*a*-1208*e* associated with the relationship indicators 1204*a*-1204*e*. In one or more embodiments, the classification indicators 1208*a*-1208*e* indicate an object class to which the assigned behavior applies. Indeed, in one or more embodiments, the classification indicators 1208*a*-1208*e* reference the object class of the corresponding relationship object. As shown by FIG. 12, the classification indicators 1208*a*-1208*e* indicate that a behavior is assigned to object classes that are a subclass of the designated object class. In other words, FIG. 12 shows that the classification indicators 1208*a*-1208*e* reference a particular object class and indicate that the assigned behavior applies to all objects that fall within that object class (e.g., object classes that are part of a subclass that falls under that object class).

The level of generality or specificity of a designated object class referenced by a classification indicator within its corresponding hierarchy of object classification varies in various embodiments. For instance, in some embodiments, a classification indicator references a lowest classification level (e.g., the most specific classification applicable) so that there are no subclasses, and the corresponding behavior applies only to those objects having that particular object lowest classification level. On the other hand, in some implementations, a classification indicator references a highest classification level (e.g., the most generic classification applicable) or some other level above the lowest classification level so that the corresponding behavior applies to objects associated with one or more of the multiple classification levels that exist within that designated classification level.

To provide an illustration of how the behavioral policy graph 1202 indicates assigned behavior, the relationship indicator 1204*a* indicates a "is supported by" relationship between an object (e.g., the relationship subject) and another object (e.g., the relationship object). The behavior indicator 1206*a* indicates a "moves with" behavior that is associated with the "is supported by" relationship, and the classification indicator 1208*a* indicates that this particular behavior applies to objects within some designated object class. Accordingly, in one or more embodiments, the behavioral policy graph 1202 shows that an object that falls within the designated object class and has a "is supported by" relationship with another object will exhibit the "moves with" behavior. In other words, if a first object of the designated object class is portrayed in a digital image being supported by a second object, and the digital image is modified to move that second object, then the scene-based image editing system 106 will automatically move the first object with the second object as part of the modification in accordance with the behavioral policy graph 1202. In some cases, rather than moving the first object automatically, the scene-based image editing system 106 provides a suggestion to move the first object for display within the graphical user interface in use to modify the digital image.

As shown by FIG. 12, some of the relationship indicators (e.g., the relationship indicators 1204*a*-1204*b* or the relationship indicators 1204*c*-1204*e*) refer to the same relationship but are associated with different behaviors. Indeed, in some implementations, the behavioral policy graph 1202 assigns multiple behaviors to the same relationship. In some instances, the difference is due to the difference in the designated subclass. In particular, in some embodiments, the scene-based image editing system 106 assigns an object of one object class a particular behavior for a particular relationship but assigns an object of another object class a different behavior for the same relationship. Thus, in configuring the behavioral policy graph 1202, the scene-based image editing system 106 manages different object classes differently in various embodiments.

Figure 13:
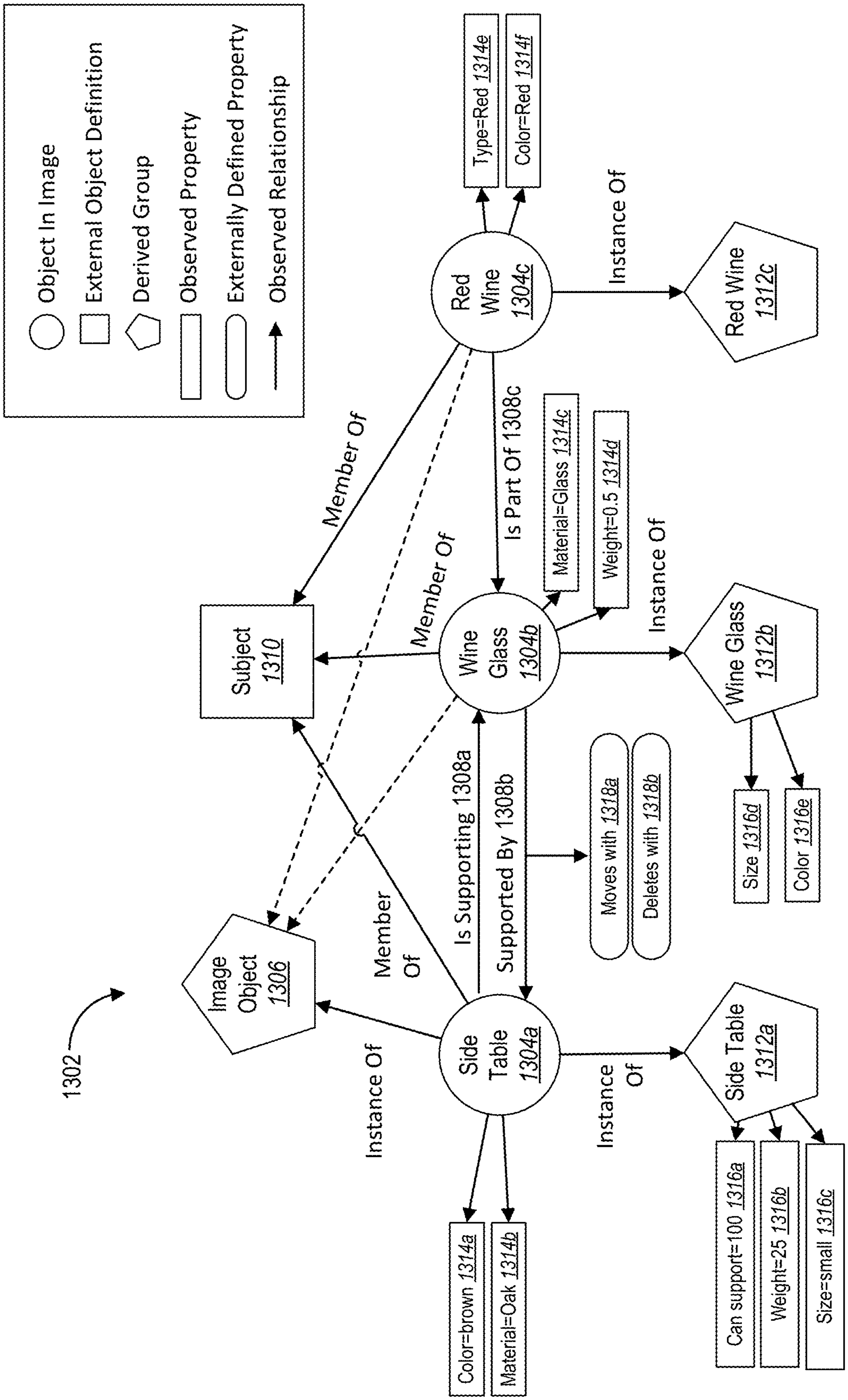
FIG. 13 illustrates a semantic scene graph generated by the scene-based image editing system for a digital image in accordance with one or more embodiments.

FIG. 13 illustrates a semantic scene graph 1302 generated by the scene-based image editing system 106 for a digital image in accordance with one or more embodiments. In particular, the semantic scene graph 1302 shown in FIG. 13 is a simplified example of a semantic scene graph and does not portray all the information included in a semantic scene graph generated by the scene-based image editing system 106 in various embodiments.

As shown in FIG. 13, the semantic scene graph 1302 is organized in accordance with the image analysis graph 1000 described above with reference to FIG. 10. In particular, the semantic scene graph 1302 includes a single network of interconnected nodes that reference characteristics of a digital image. For instance, the semantic scene graph 1302 includes nodes 1304*a*-1304*c* representing portrayed objects as indicated by their connection to the node 1306. Further, the semantic scene graph 1302 includes relationship indicators 1308*a*-1308*c* representing the relationships between the objects corresponding to the nodes 1304*a*-1304*c*. As further shown, the semantic scene graph 1302 includes a node 1310 representing a commonality among the objects (e.g., in that the objects are all included in the digital image, or the objects indicate a subject or topic of the digital image). Additionally, as shown, the semantic scene graph 1302 includes the characteristic attributes 1314*a*-1314*f* of the objects corresponding to the nodes 1304*a*-1304*c*.

As further shown in FIG. 13, the semantic scene graph 1302 includes contextual information from the real-world class description graph 1102 described above with reference to FIG. 11. In particular, the semantic scene graph 1302 includes nodes 1312*a*-1312*c* that indicate the object class to which the objects corresponding to the nodes 1304*a*-1304*c* belong. Though not shown in FIG. 11, the semantic scene graph 1302 further includes the full hierarchy of object classifications for each of the object classes represented by the nodes 1312*a*-1312*c*. In some cases, however, the nodes 1312*a*-1312*c* each include a pointer that points to their respective hierarchy of object classifications within the real-world class description graph 1102. Additionally, as shown in FIG. 13, the semantic scene graph 1302 includes object attributes 1316*a*-1316*e* of the object classes represented therein.

Additionally, as shown in FIG. 13, the semantic scene graph 1302 includes behaviors from the behavioral policy graph 1202 described above with reference to FIG. 12. In particular, the semantic scene graph 1302 includes behavior indicators 1318*a*-1318*b* indicating behaviors of the objects represented therein based on their associated relationships.

Figure 14:
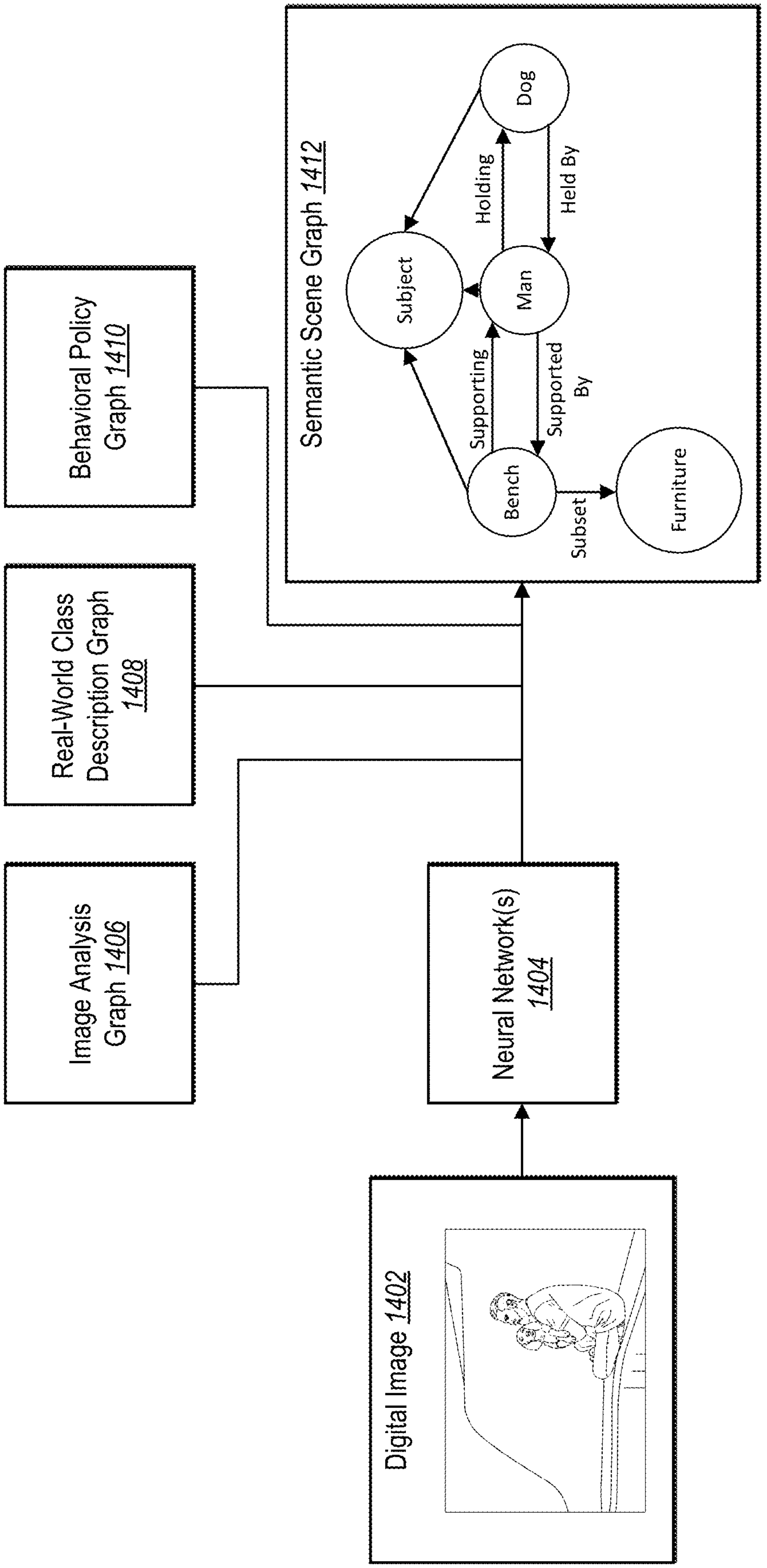
FIG. 14 illustrates a diagram for generating a semantic scene graph for a digital image utilizing template graphs in accordance with one or more embodiments.

FIG. 14 illustrates a diagram for generating a semantic scene graph for a digital image utilizing template graphs in accordance with one or more embodiments. Indeed, as shown in FIG. 14, the scene-based image editing system 106 analyzes a digital image 1402 utilizing one or more neural networks 1404. In particular, in one or more embodiments, the scene-based image editing system 106 utilizes the one or more neural networks 1404 to determine various characteristics of the digital image 1402 and/or their corresponding characteristic attributes. For instance, in some cases, the scene-based image editing system 106 utilizes a segmentation neural network to identify and classify objects portrayed in a digital image (as discussed above with reference to FIG. 3). Further, in some embodiments, the scene-based image editing system 106 utilizes neural networks to determine the relationships between objects and/or their object attributes as will be discussed in more detail below.

In one or more implementations, the scene-based image editing system 106 utilizes a depth estimation neural network to estimate a depth of an object in a digital image and stores the determined depth in the semantic scene graph 1412. For example, the scene-based image editing system 106 utilizes a depth estimation neural network as described in U.S. application Ser. No. 17/186,436, filed Feb. 26, 2021, titled "GENERATING DEPTH IMAGES UTILIZING A MACHINE-LEARNING MODEL BUILT FROM MIXED DIGITAL IMAGE SOURCES AND MULTIPLE LOSS FUNCTION SETS," which is herein incorporated by reference in its entirety. Alternatively, the scene-based image editing system 106 utilizes a depth refinement neural network as described in U.S. application Ser. No. 17/658,873, filed Apr. 12, 2022, titled "UTILIZING MACHINE LEARNING MODELS TO GENERATE REFINED DEPTH MAPS WITH SEGMENTATION MASK GUIDANCE," which is herein incorporated by reference in its entirety. The scene-based image editing system 106 then accesses the depth information (e.g., average depth for an object) for an object from the semantic scene graph 1412 when editing an object to perform a realistic scene edit. For example, when moving an object within an image, the scene-based image editing system 106 then accesses the depth information for objects in the digital image from the semantic scene graph 1412 to ensure that the object being moved is not placed in front an object with less depth.

In one or more implementations, the scene-based image editing system 106 utilizes a depth estimation neural network to estimate lighting parameters for an object or scene in a digital image and stores the determined lighting parameters in the semantic scene graph 1412. For example, the scene-based image editing system 106 utilizes a source-specific-lighting-estimation-neural network as described in U.S. application Ser. No. 16/558,975, filed Sep. 3, 2019, titled "DYNAMICALLY ESTIMATING LIGHT-SOURCE-SPECIFIC PARAMETERS FOR DIGITAL IMAGES USING A NEURAL NETWORK," which is herein incorporated by reference in its entirety. The scene-based image editing system 106 then accesses the lighting parameters for an object or scene from the semantic scene graph 1412 when editing an object to perform a realistic scene edit. For example, when moving an object within an image or inserting a new object in a digital image, the scene-based image editing system 106 accesses the lighting parameters for from the semantic scene graph 1412 to ensure that the object being moved/placed within the digital image has realistic lighting.

In one or more implementations, the scene-based image editing system 106 utilizes a depth estimation neural network to estimate lighting parameters for an object or scene in a digital image and stores the determined lighting parameters in the semantic scene graph 1412. For example, the scene-based image editing system 106 utilizes a source-specific-lighting-estimation-neural network as described in U.S. application Ser. No. 16/558,975, filed Sep. 3, 2019, titled "DYNAMICALLY ESTIMATING LIGHT-SOURCE-SPECIFIC PARAMETERS FOR DIGITAL IMAGES USING A NEURAL NETWORK," which is herein incorporated by reference in its entirety. The scene-based image editing system 106 then accesses the lighting parameters for an object or scene from the semantic scene graph 1412 when editing an object to perform a realistic scene edit. For example, when moving an object within an image or inserting a new object in a digital image, the scene-based image editing system 106 accesses the lighting parameters for from the semantic scene graph 1412 to ensure that the object being moved/placed within the digital image has realistic lighting.

As further shown in FIG. 14, the scene-based image editing system 106 utilizes the output of the one or more neural networks 1404 along with an image analysis graph 1406, a real-world class description graph 1408, and a behavioral policy graph 1410 to generate a semantic scene graph 1412. In particular, the scene-based image editing system 106 generates the semantic scene graph 1412 to include a description of the digital image 1402 in accordance with the structure, characteristic attributes, hierarchies of object classifications, and behaviors provided by the image analysis graph 1406, the real-world class description graph 1408, and the behavioral policy graph 1410.

As previously indicated, in one or more embodiments, the image analysis graph 1406, the real-world class description graph 1408, and/or the behavioral policy graph 1410 are predetermined or pre-generated. In other words, the scene-based image editing system 106 pre-generates, structures, or otherwise determines the content and organization of each graph before implementation. For instance, in some cases, the scene-based image editing system 106 generates the image analysis graph 1406, the real-world class description graph 1408, and/or the behavioral policy graph 1410 based on user input.

Further, in one or more embodiments, the image analysis graph 1406, the real-world class description graph 1408, and/or the behavioral policy graph 1410 are configurable. Indeed, the graphs can be re-configured, re-organized, and/or have data represented therein added or removed based on preferences or the needs of editing a digital image. For instance, in some cases, the behaviors assigned by the behavioral policy graph 1410 work in some image editing contexts but not others. Thus, when editing an image in another image editing context, the scene-based image editing system 106 implements the one or more neural networks 1404 and the image analysis graph 1406 but implements a different behavioral policy graph (e.g., one that was configured to satisfy preferences for that image editing context). Accordingly, in some embodiments, the scene-based image editing system 106 modifies the image analysis graph 1406, the real-world class description graph 1408, and/or the behavioral policy graph 1410 to accommodate different image editing contexts.

For example, in one or more implementations, the scene-based image editing system 106 determines a context for selecting a behavioral policy graph by identifying a type of user. In particular, the scene-based image editing system 106 generates a plurality of behavioral policy graphs for various types of users. For instance, the scene-based image editing system 106 generates a first behavioral policy graph for novice or new users. The first behavioral policy graph, in one or more implementations, includes a greater number of behavior policies than a second behavioral policy graph. In particular, for newer users, the scene-based image editing system 106 utilizes a first behavioral policy graph that provides greater automation of actions and provides less control to the user. On the other hand, the scene-based image editing system 106 utilizes a second behavioral policy graph for advanced users with less behavior policies than the first behavioral policy graph. In this manner, the scene-based image editing system 106 provides the advanced user with greater control over the relationship-based actions (automatic moving/deleting/editing) of objects based on relationships. In other words, by utilizing the second behavioral policy graph for advanced users, the scene-based image editing system 106 performs less automatic editing of related objects.

In one or more implementations the scene-based image editing system 106 determines a context for selecting a behavioral policy graph based on visual content of a digital image (e.g., types of objects portrayed in the digital image), the editing application being utilized, etc. Thus, the scene-based image editing system 106, in one or more implementations, selects/utilizes a behavioral policy graph based on image content, a type of user, an editing application being utilizes, or another context.

Moreover, in some embodiments, the scene-based image editing system 106 utilizes the graphs in analyzing a plurality of digital images. Indeed, in some cases, the image analysis graph 1406, the real-world class description graph 1408, and/or the behavioral policy graph 1410 do not specifically target a particular digital image. Thus, in many cases, these graphs are universal and re-used by the scene-based image editing system 106 for multiple instances of digital image analysis.

In some cases, the scene-based image editing system 106 further implements one or more mappings to map between the outputs of the one or more neural networks 1404 and the data scheme of the image analysis graph 1406, the real-world class description graph 1408, and/or the behavioral policy graph 1410. As one example, the scene-based image editing system 106 utilizes various segmentation neural networks to identify and classify objects in various embodiments. Thus, depending on the segmentation neural network used, the resulting classification of a given object can be different (e.g., different wording or a different level of abstraction). Thus, in some cases, the scene-based image editing system 106 utilizes a mapping that maps the particular outputs of the segmentation neural network to the object classes represented in the real-world class description graph 1408, allowing the real-world class description graph 1408 to be used in conjunction with multiple neural networks.

Figure 15:
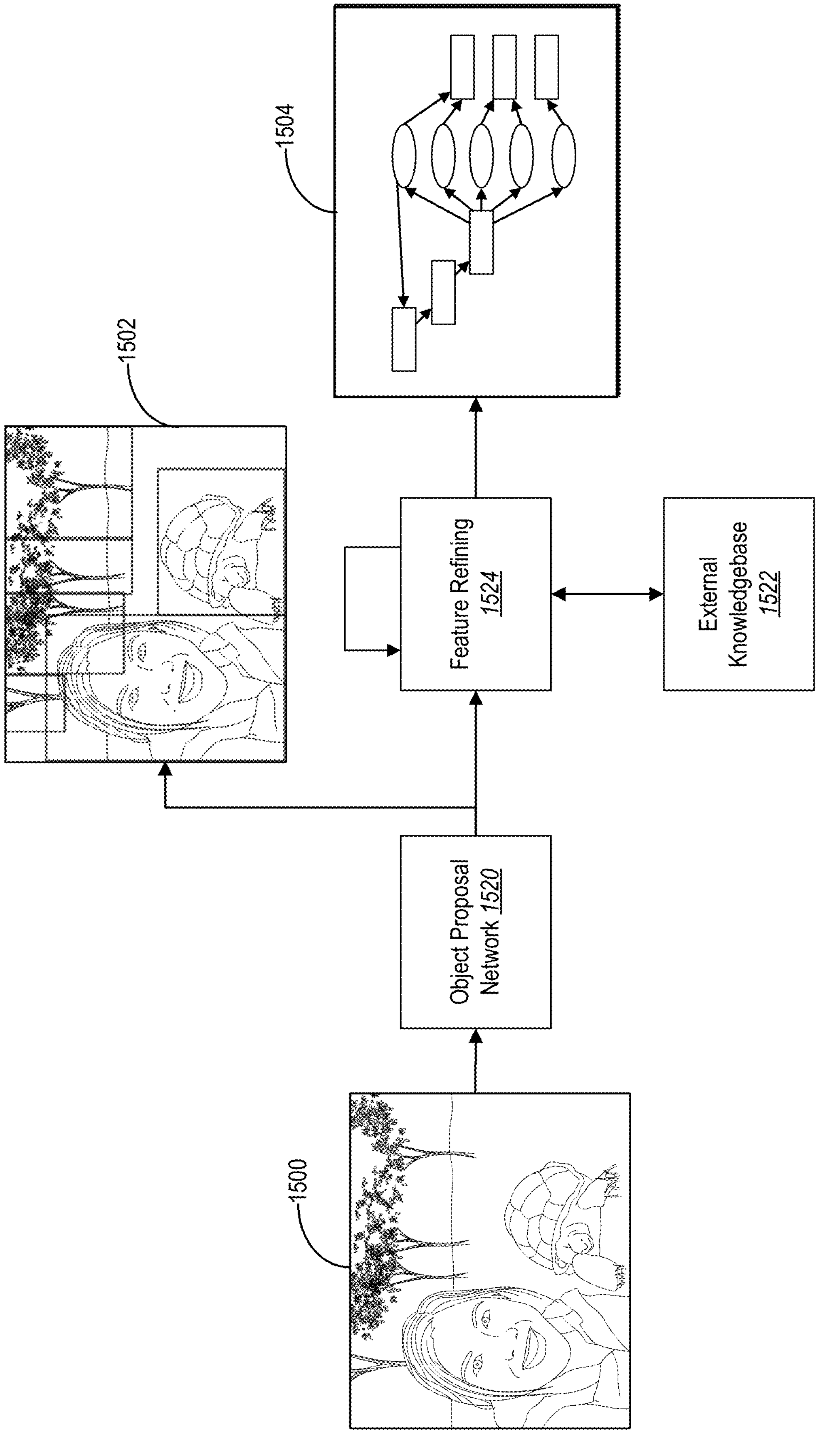
FIG. 15 illustrates another diagram for generating a semantic scene graph for a digital image in accordance with one or more embodiments.

FIG. 15 illustrates another diagram for generating a semantic scene graph for a digital image in accordance with one or more embodiments. In particular, FIG. 15 illustrates an example framework of the scene-based image editing system 106 generating a semantic scene graph in accordance with one or more embodiments.

As shown in FIG. 15, the scene-based image editing system 106 identifies an input image 1500. In some cases, the scene-based image editing system 106 identifies the input image 1500 based on a request. For instances, in some cases, the request includes a request to generate a semantic scene graph for the input image 1500. In one or more implementations the request comprises to analyze the input image comprises the scene-based image editing system 106 accessing, opening, or displaying by the input image 1500.

In one or more embodiments, the scene-based image editing system 106 generates object proposals and subgraph proposals for the input image 1500 in response to the request. For instance, in some embodiments, the scene-based image editing system 106 utilizes an object proposal network 1520 to extract a set of object proposals for the input image 1500. To illustrate, in some cases, the scene-based image editing system 106 extracts a set of object proposals for humans detected within the input image 1500, objects that the human(s) are wearing, objects near the human(s), buildings, plants, animals, background objects or scenery (including the sky or objects in the sky), etc.

In one or more embodiments, the object proposal network 1520 comprises the detection-masking neural network 300 (specifically, the object detection machine learning model 308) discussed above with reference to FIG. 3. In some cases, the object proposal network 1520 includes a neural network such as a region proposal network ("RPN"), which is part of a region-based convolutional neural network, to extract the set of object proposals represented by a plurality of bounding boxes. One example RPN is disclosed in S. Ren, K. He, R. Girshick, and J. Sun, "Faster r-cnn: Towards real-time object detection with region proposal networks," NIPS, 2015, the entire contents of which are hereby incorporated by reference. As an example, in some cases, the scene-based image editing system 106 uses the RPN to extract object proposals for significant objects (e.g., detectable objects or objects that have a threshold size/visibility) within the input image. The algorithm below represents one embodiment of a set of object proposals:

$$[o_0, \ldots, 0_{N-1}] = f_{RPN}(I)$$

where I is the input image, fRPN(·) represents the RPN network, and oi is the i-th object proposal.

In some implementations, in connection with determining the object proposals, the scene-based image editing system 106 also determines coordinates of each object proposal relative to the dimensions of the input image 1500. Specifically, in some instances, the locations of the object proposals are based on bounding boxes that contain the visible portion(s) of objects within a digital image. To illustrate, for oi, the coordinates of the corresponding bounding box are represented by $r_i=[x_i, y_i, w_i, h_i]$, with $(x_i, y_i)$ being the coordinates of the top left corner and $w_i$ and $h_i$ being the width and the height of the bounding box, respectively. Thus, the scene-based image editing system 106 determines the relative location of each significant object or entity in the input image 1500 and stores the location data with the set of object proposals.

As mentioned, in some implementations, the scene-based image editing system 106 also determines subgraph proposals for the object proposals. In one or more embodiments, the subgraph proposals indicate relations involving specific object proposals in the input image 1500. As can be appreciated, any two different objects (oi, oj) in a digital image can correspond to two possible relationships in opposite directions. As an example, a first object can be "on top of" a second object, and the second object can be "underneath" the first object. Because each pair of objects has two possible relations, the total number of possible relations for N object proposals is N(N−1). Accordingly, more object proposals result in a larger scene graph than fewer object proposals, while increasing computational cost and deteriorating inference speed of object detection in systems that attempt to determine all the possible relations in both directions for every object proposal for an input image.

Subgraph proposals reduce the number of potential relations that the scene-based image editing system 106 analyze. Specifically, as mentioned previously, a subgraph proposal represents a relationship involving two or more specific object proposals. Accordingly, in some instances, the scene-based image editing system 106 determines the subgraph proposals for the input image 1500 to reduce the number of potential relations by clustering, rather than maintaining the N(N−1) number of possible relations. In one or more embodiments, the scene-based image editing system 106 uses the clustering and subgraph proposal generation process described in Y. Li, W. Ouyang, B. Zhou, Y. Cui, J. Shi, and X. Wang, "Factorizable net: An efficient subgraph based framework for scene graph generation," ECCV, Jun. 29, 2018, the entire contents of which are hereby incorporated by reference.

As an example, for a pair of object proposals, the scene-based image editing system 106 determines a subgraph based on confidence scores associated with the object proposals. To illustrate, the scene-based image editing system 106 generates each object proposal with a confidence score indicating the confidence that the object proposal is the right match for the corresponding region of the input image. The scene-based image editing system 106 further determines the subgraph proposal for a pair of object proposals based on a combined confidence score that is the product of the confidence scores of the two object proposals. The scene-based image editing system 106 further constructs the subgraph proposal as the union box of the object proposals with the combined confidence score.

In some cases, the scene-based image editing system 106 also suppresses the subgraph proposals to represent a candidate relation as two objects and one subgraph. Specifically, in some embodiments, the scene-based image editing system 106 utilizes non-maximum-suppression to represent the candidate relations as $$\langle o_i, o_j, s_k^i \rangle,$$

where i≠j and $$s_k^i$$

is the k-th subgraph of all the subgraphs associated with $o_i$, the subgraphs for $o_i$ including $o_j$ and potentially other object proposals. After suppressing the subgraph proposals, the scene-based image editing system 106 represents each object and subgraph as a feature vector, $o_i \in \mathbb{R}^D$, D and a feature map $$s_k^i \in \mathbb{R}^{D \times K_a \times K_a},$$

respectively, where D and Ka are dimensions.

After determining object proposals and subgraph proposals for objects in the input image, the scene-based image editing system 106 retrieves and embeds relationships from an external knowledgebase 1522. In one or more embodiments, an external knowledgebase includes a dataset of semantic relationships involving objects. In particular, in some embodiments, an external knowledgebase includes a semantic network including descriptions of relationships between objects based on background knowledge and contextual knowledge (also referred to herein as "commonsense relationships"). In some implementations, an external knowledgebase includes a database on one or more servers that includes relationship knowledge from one or more sources including expert-created resources, crowdsourced resources, web-based sources, dictionaries, or other sources that include information about object relationships.

Additionally, in one or more embodiments an embedding includes a representation of relationships involving objects as a vector. For instance, in some cases, a relationship embedding includes a vector representation of a triplet (i.e., an object label, one or more relationships, and an object entity) using extracted relationships from an external knowledgebase.

Indeed, in one or more embodiments, the scene-based image editing system 106 communicates with the external knowledgebase 1522 to obtain useful object-relationship information for improving the object and subgraph proposals. Further, in one or more embodiments, the scene-based image editing system 106 refines the object proposals and subgraph proposals (represented by the box 1524) using embedded relationships, as described in more detail below.

In some embodiments, in preparation for retrieving the relationships from the external knowledgebase 1522, the scene-based image editing system 106 performs a process of inter-refinement on the object and subgraph proposals (e.g., in preparation for refining features of the object and subgraph proposals). Specifically, the scene-based image editing system 106 uses the knowledge that each object $o_i$ is connected to a set of subgraphs $S^i$, and each subgraph $s_k$ is associated with a set of objects $O^k$ to refine the object vector (resp. the subgraphs) by attending the associated subgraph feature maps (resp. the associated object vectors). For instance, in some cases, the inter-refinement process is represented as:

$$\overline{o}_i = o_i + f_{s \to o}\left( \sum_{s_k^i \in S^i} \alpha_k^{s \to o} \cdot s_k^i \right)$$

$$\overline{s}_i = s_i + f_{o \to s}\left( \sum_{o_i^k \in O^k} \alpha_i^{o \to s} \cdot o_i^k \right)$$

where $$\alpha_k^{s \to o} (resp.\ \alpha_i^{o \to s})$$

is the output of a softmax layer indicating the weight for passing $$s_k^i$$

(resp.

$$o_i^k)$$

to $o_i$ (resp. to sk), and $f_{s \to o}$ and $f_{o \to s}$ are non-linear mapping functions. In one or more embodiments, due to different dimensions of $o_i$ and sk, the scene-based image editing system 106 applies pooling or spatial location-based attention for s→o or o→s refinement.

In some embodiments, once the inter-refinement is complete, the scene-based image editing system 106 predicts an object label from the initially refined object feature vector $\overline{o}_i$ and matches the object label with the corresponding semantic entities in the external knowledgebase 1522. In particular, the scene-based image editing system 106 accesses the external knowledgebase 1522 to obtain the most common relationships corresponding to the object label. The scene-based image editing system 106 further selects a predetermined number of the most common relationships from the external knowledgebase 1522 and uses the retrieved relationships to refine the features of the corresponding object proposal/feature vector.

In one or more embodiments, after refining the object proposals and subgraph proposals using the embedded relationships, the scene-based image editing system 106 predicts object labels 1502 and predicate labels from the refined proposals. Specifically, the scene-based image editing system 106 predicts the labels based on the refined object/subgraph features. For instance, in some cases, the scene-based image editing system 106 predicts each object label directly with the refined features of a corresponding feature vector. Additionally, the scene-based image editing system 106 predicts a predicate label (e.g., a relationship label) based on subject and object feature vectors in connection with their corresponding subgraph feature map due to subgraph features being associated with several object proposal pairs. In one or more embodiments, the inference process for predicting the labels is shown as:

$$P_{i,j} \sim \text{softmax}(f_{rel}([\tilde{o}_i \otimes \bar{s}_k; \tilde{o}_j \otimes \bar{s}_k; \bar{s}_k]))$$

$$V_i \sim \text{softmax}(f_{node}(\tilde{o}_i))$$

where $f_{rel}(\cdot)$ and $f_{node}(\cdot)$ denote the mapping layers for predicate and object recognition, respectively, and $\otimes$ represents a convolution operation. Furthermore, $\tilde{o}_i$ represents a refined feature vector based on the extracted relationships from the external knowledgebase.

In one or more embodiments, the scene-based image editing system 106 further generates a semantic scene graph 1504 using the predicted labels. In particular, the scene-based image editing system 106 uses the object labels 1502 and predicate labels from the refined features to create a graph representation of the semantic information of the input image 1500. In one or more embodiments, the scene-based image editing system 106 generates the scene graph as $\mathcal{G} = \langle V_i, P_{i,j}, V_j \rangle$, i≠j, where $\mathcal{G}$ is the scene graph.

Thus, the scene-based image editing system 106 utilizes relative location of the objects and their labels in connection with an external knowledgebase 1522 to determine relationships between objects. The scene-based image editing system 106 utilizes the determined relationships when generating a behavioral policy graph 1410. As an example, the scene-based image editing system 106 determines that a hand and a cell phone have an overlapping location within the digital image. Based on the relative locations and depth information, the scene-based image editing system 106 determines that a person (associated with the hand) has a relationship of "holding" the cell phone. As another example, the scene-based image editing system 106 determines that a person and a shirt have an overlapping location and overlapping depth within a digital image. Based on the relative locations and relative depth information, the scene-based image editing system 106 determines that the person has a relationship of "wearing" the shirt. On other hand, the scene-based image editing system 106 determines that a person and a shirt have an overlapping location and but the shirt has a greater average depth than an average depth of the person within a digital image. Based on the relative locations and relative depth information, the scene-based image editing system 106 determines that the person has a relationship of "in front of" with the shirt.

By generating a semantic scene graph for a digital image, the scene-based image editing system 106 provides improved flexibility and efficiency. Indeed, as mentioned above, the scene-based image editing system 106 generates a semantic scene graph to provide improved flexibility as characteristics used in modifying a digital image are readily available at the time user interactions are received to execute a modification. Accordingly, the scene-based image editing system 106 reduces the user interactions typically needed under conventional systems to determine those characteristics (or generate needed content, such as bounding boxes or object masks) in preparation for executing a modification. Thus, the scene-based image editing system 106 provides a more efficient graphical user interface that requires less user interactions to modify a digital image.

Additionally, by generating a semantic scene graph for a digital image, the scene-based image editing system 106 provides an ability to edit a two-dimensional image like a real-world scene. For example, based on a generated semantic scene graph for an image generated utilizing various neural networks, the scene-based image editing system 106 determines objects, their attributes (position, depth, material, color, weight, size, label, etc.). The scene-based image editing system 106 utilizes the information of the semantic scene graph to edit an image intelligently as if the image were a real-world scene.

Indeed, in one or more embodiments, the scene-based image editing system 106 utilizes a semantic scene graph generated for a digital image to facilitate modification to the digital image. For instance, in one or more embodiments, the scene-based image editing system 106 facilitates modification of one or more object attributes of an object portrayed in a digital image utilizing the corresponding semantic scene graph. FIGS. 16-21C illustrate modifying one or more object attributes of an object portrayed in a digital image in accordance with one or more embodiments.

Many conventional systems are inflexible in that they often require difficult, tedious workflows to target modifications to a particular object attribute of an object portrayed in a digital image. Indeed, modifying an object attribute often requires manual manipulation of the object attribute under such systems. For example, modifying a shape of an object portrayed in a digital image often requires several user interactions to manually restructure the boundaries of an object (often at the pixel level), and modifying a size often requires tedious interactions with resizing tools to adjust the size and ensure proportionality. Thus, in addition to inflexibility, many conventional systems suffer from inefficiency in that the processes required by these systems to execute such a targeted modification typically involve a significant number of user interactions.

The scene-based image editing system 106 provides advantages over conventional systems by operating with improved flexibility and efficiency. Indeed, by presenting a graphical user interface element through which user interactions are able to target object attributes of an object, the scene-based image editing system 106 offers more flexibility in the interactivity of objects portrayed in digital images. In particular, via the graphical user interface element, the scene-based image editing system 106 provides flexible selection and modification of object attributes. Accordingly, the scene-based image editing system 106 further provides improved efficiency by reducing the user interactions required to modify an object attribute. Indeed, as will be discussed below, the scene-based image editing system 106 enables user interactions to interact with a description of an object attribute in order to modify that object attribute, avoiding the difficult, tedious workflows of user interactions required under many conventional systems.

Figure 16:
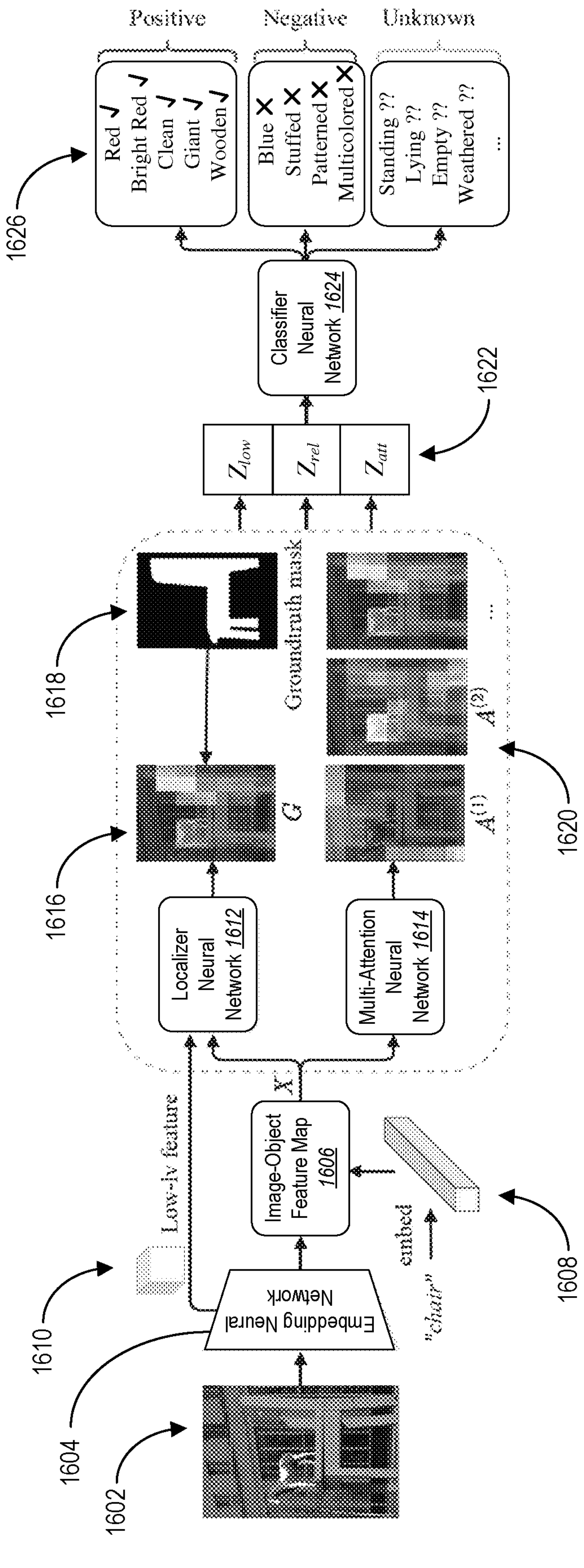
FIG. 16 illustrates an overview of a multi-attribute contrastive classification neural network in accordance with one or more embodiments.
Figure 17:
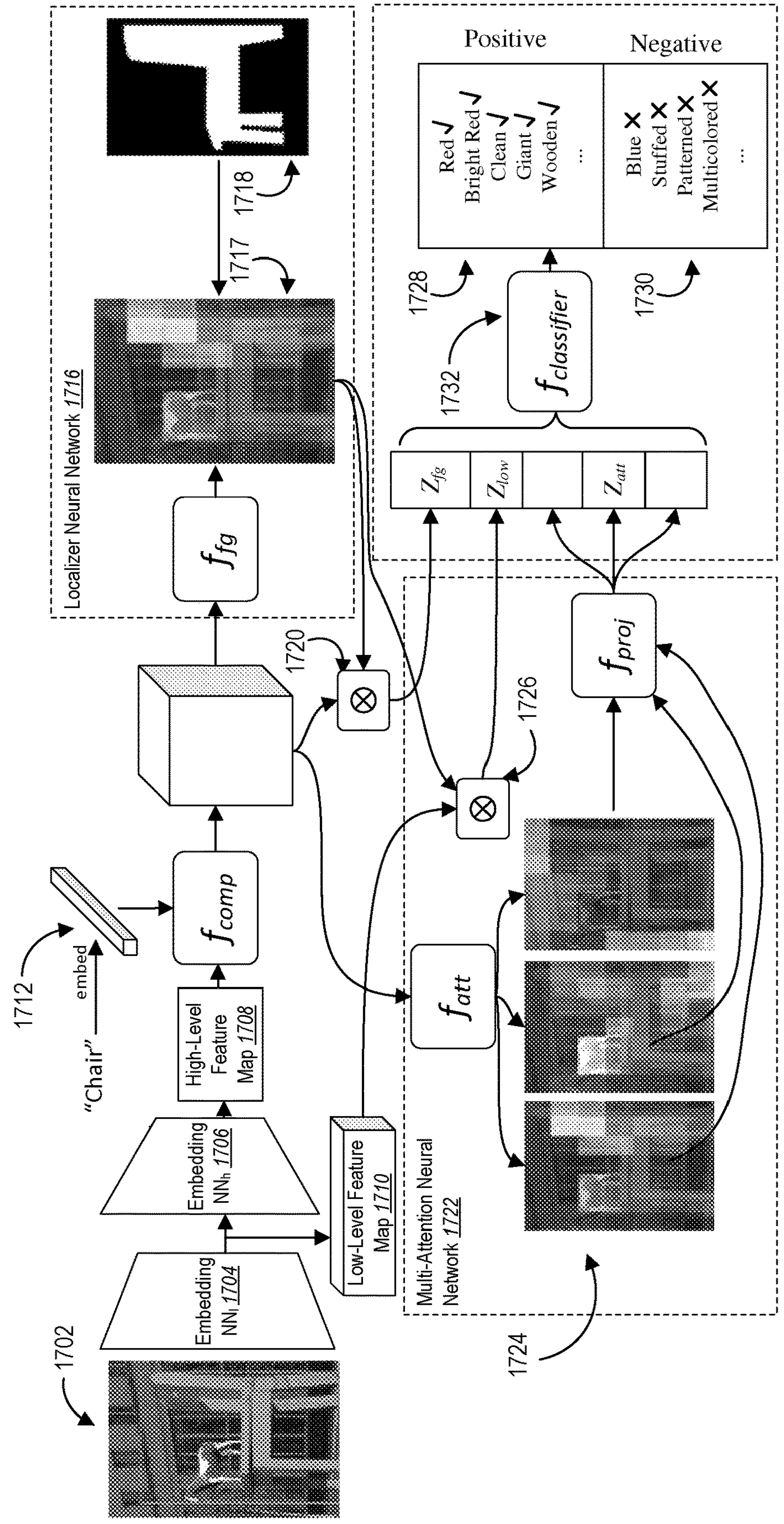
FIG. 17 illustrates an architecture of a multi-attribute contrastive classification neural network in accordance with one or more embodiments.

As suggested, in one or more embodiments, the scene-based image editing system 106 facilitates modifying object attributes of objects portrayed in a digital image by determining the object attributes of those objects. In particular, in some cases, the scene-based image editing system 106 utilizes a machine learning model, such as an attribute classification neural network, to determine the object attributes. FIGS. 16-17 illustrates an attribute classification neural network utilized by the scene-based image editing system 106 to determine object attributes for objects in accordance with one or more embodiments. In particular, FIGS. 16-17 illustrate a multi-attribute contrastive classification neural network utilized by the scene-based image editing system 106 in one or more embodiments.

In one or more embodiments, an attribute classification neural network includes a computer-implemented neural network that identifies object attributes of objects portrayed in a digital image. In particular, in some embodiments, an attribute classification neural network includes a computer-implemented neural network that analyzes objects portrayed in a digital image, identifies the object attributes of the objects, and provides labels for the corresponding object attributes in response. It should be understood that, in many cases, an attribute classification neural network more broadly identifies and classifies attributes for semantic areas portrayed in a digital image. Indeed, in some implementations, an attribute classification neural network determines attributes for semantic areas portrayed in a digital image aside from objects (e.g., the foreground or background).

FIG. 16 illustrates an overview of a multi-attribute contrastive classification neural network in accordance with one or more embodiments. In particular, FIG. 16 illustrates the scene-based image editing system 106 utilizing a multi-attribute contrastive classification neural network to extract a wide variety of attribute labels (e.g., negative, positive, and unknown labels) for an object portrayed within a digital image.

As shown in FIG. 16, the scene-based image editing system 106 utilizes an embedding neural network 1604 with a digital image 1602 to generate an image-object feature map 1606 and a low-level attribute feature map 1610. In particular, the scene-based image editing system 106 generates the image-object feature map 1606 (e.g., the image-object feature map X) by combining an object-label embedding vector 1608 with a high-level attribute feature map from the embedding neural network 1604. For instance, the object-label embedding vector 1608 represents an embedding of an object label (e.g., "chair").

Furthermore, as shown in FIG. 16, the scene-based image editing system 106 generates a localized image-object feature vector Zrel. In particular, the scene-based image editing system 106 utilizes the image-object feature map 1606 with the localizer neural network 1612 to generate the localized image-object feature vector Zrel. Specifically, the scene-based image editing system 106 combines the image-object feature map 1606 with a localized object attention feature vector 1616 (denoted G) to generate the localized image-object feature vector Zrel to reflect a segmentation prediction of the relevant object (e.g., "chair") portrayed in the digital image 1602. As further shown in FIG. 16, the localizer neural network 1612, in some embodiments, is trained using ground truth object segmentation masks 1618.

Additionally, as illustrated in FIG. 16, the scene-based image editing system 106 also generates a localized low-level attribute feature vector Zlow. In particular, in reference to FIG. 16, the scene-based image editing system 106 utilizes the localized object attention feature vector G from the localizer neural network 1612 with the low-level attribute feature map 1610 to generate the localized low-level attribute feature vector Zlow.

Moreover, as shown FIG. 16, the scene-based image editing system 106 generates a multi-attention feature vector Zatt. As illustrated in FIG. 16, the scene-based image editing system 106 generates the multi-attention feature vector Zatt from the image-object feature map 1606 by utilizing attention maps 1620 of the multi-attention neural network 1614. Indeed, in one or more embodiments, the scene-based image editing system 106 utilizes the multi-attention feature vector Zatt to attend to features at different spatial locations in relation to the object portrayed within the digital image 1602 while predicting attribute labels for the portrayed object.

As further shown in FIG. 16, the scene-based image editing system 106 utilizes a classifier neural network 1624 to predict the attribute labels 1626 upon generating the localized image-object feature vector Zrel, the localized low-level attribute feature vector Zlow, and the multi-attention feature vector Zatt (collectively shown as vectors 1622 in FIG. 16). In particular, in one or more embodiments, the scene-based image editing system 106 utilizes the classifier neural network 1624 with a concatenation of the localized image-object feature vector Zrel, the localized low-level attribute feature vector Zlow, and the multi-attention feature vector Zatt to determine the attribute labels 1626 for the object (e.g., chair) portrayed within the digital image 1602. As shown in FIG. 16, the scene-based image editing system 106 determines positive attribute labels for the chair portrayed in the digital image 1602, negative attribute labels that are not attributes of the chair portrayed in the digital image 1602, and unknown attribute labels that correspond to attribute labels that the scene-based image editing system 106 could not confidently classify utilizing the classifier neural network 1624 as belonging to the chair portrayed in the digital image 1602.

In some instances, the scene-based image editing system 106 utilizes probabilities (e.g., a probability score, floating point probability) output by the classifier neural network 1624 for the particular attributes to determine whether the attributes are classified as positive, negative, and/or unknown attribute labels for the object portrayed in the digital image 1602 (e.g., the chair). For example, the scene-based image editing system 106 identifies an attribute as a positive attribute when a probability output for the particular attribute satisfies a positive attribute threshold (e.g., a positive probability, a probability that is over 0.5). Moreover, the scene-based image editing system 106 identifies an attribute as a negative attribute when a probability output for the particular attribute satisfies a negative attribute threshold (e.g., a negative probability, a probability that is below −0.5). Furthermore, in some cases, the scene-based image editing system 106 identifies an attribute as an unknown attribute when the probability output for the particular attribute does not satisfy either the positive attribute threshold or the negative attribute threshold.

In some cases, a feature map includes a height, width, and dimension locations (H×W×D) which have D-dimensional feature vectors at each of the H×W image locations. Furthermore, in some embodiments, a feature vector includes a set of values representing characteristics and/or features of content (or an object) within a digital image. Indeed, in some embodiments, a feature vector includes a set of values corresponding to latent and/or patent attributes related to a digital image. For example, in some instances, a feature vector is a multi-dimensional dataset that represents features depicted within a digital image. In one or more embodiments, a feature vector includes a set of numeric metrics learned by a machine learning algorithm.

FIG. 17 illustrates an architecture of the multi-attribute contrastive classification neural network in accordance with one or more embodiments. Indeed, in one or more embodiments, the scene-based image editing system 106 utilizes the multi-attribute contrastive classification neural network, as illustrated in FIG. 17, with the embedding neural network, the localizer neural network, the multi-attention neural network, and the classifier neural network components to determine positive and negative attribute labels (e.g., from output attribute presence probabilities) for an object portrayed in a digital image.

As shown in FIG. 17, the scene-based image editing system 106 utilizes an embedding neural network within the multi-attribute contrastive classification neural network. In particular, as illustrated in FIG. 17, the scene-based image editing system 106 utilizes a low-level embedding layer 1704 (e.g., embedding NN1) (e.g., of the embedding neural network 1604 of FIG. 16) to generate a low-level attribute feature map 1710 from a digital image 1702. Furthermore, as shown in FIG. 17, the scene-based image editing system 106 utilizes a high-level embedding layer 1706 (e.g., embedding NNh) (e.g., of the embedding neural network 1604 of FIG. 16) to generate a high-level attribute feature map 1708 from the digital image 1702.

In particular, in one or more embodiments, the scene-based image editing system 106 utilizes a convolutional neural network as an embedding neural network. For example, the scene-based image editing system 106 generates a D-dimensional image feature map $f_{img}(I) \in \mathbb{R}^{H \times W \times D}$ with a spatial size H×W extracted from a convolutional neural network-based embedding neural network. In some instance, the scene-based image editing system 106 utilizes an output of the penultimate layer of ResNet-50 as the image feature map $f_{img}(I)$.

As shown in FIG. 17, the scene-based image editing system 106 extracts both a high-level attribute feature map 1708 and a low-level attribute feature map 1710 utilizing a high-level embedding layer and a low-level embedding layer of an embedding neural network. By extracting both the high-level attribute feature map 1708 and the low-level attribute feature map 1710 for the digital image 1702, the scene-based image editing system 106 addresses the heterogeneity in features between different classes of attributes. Indeed, attributes span across a wide range of semantic levels.

By utilizing both low-level feature maps and high-level feature maps, the scene-based image editing system 106 accurately predicts attributes across the wide range of semantic levels. For instance, the scene-based image editing system 106 utilizes low-level feature maps to accurately predict attributes such as, but not limited to, colors (e.g., red, blue, multicolored), patterns (e.g., striped, dotted, striped), geometry (e.g., shape, size, posture), texture (e.g., rough, smooth, jagged), or material (e.g., wooden, metallic, glossy, matte) of a portrayed object. Meanwhile, in one or more embodiments, the scene-based image editing system 106 utilizes high-level feature maps to accurately predict attributes such as, but not limited to, object states (e.g., broken, dry, messy, full, old) or actions (e.g., running, sitting, flying) of a portrayed object.

Furthermore, as illustrated in FIG. 17, the scene-based image editing system 106 generates an image-object feature map 1714. In particular, as shown in FIG. 17, the scene-based image editing system 106 combines an object-label embedding vector 1712 (e.g., such as the object-label embedding vector 1608 of FIG. 16) from a label corresponding to the object (e.g., "chair") with the high-level attribute feature map 1708 to generate the image-object feature map 1714 (e.g., such as the image-object feature map 1606 of FIG. 16). As further shown in FIG. 17, the scene-based image editing system 106 utilizes a feature composition module (e.g., f comp) that utilizes the object-label embedding vector 1712 and the high-level attribute feature map 1708 to output the image-object feature map 1714.

In one or more embodiments, the scene-based image editing system 106 generates the image-object feature map 1714 to provide an extra signal to the multi-attribute contrastive classification neural network to learn the relevant object for which it is predicting attributes (e.g., while also encoding the features for the object). In particular, in some embodiments, the scene-based image editing system 106 incorporates the object-label embedding vector 1712 (as an input in a feature composition module $f_{comp}$ to generate the image-object feature map 1714) to improve the classification results of the multi-attribute contrastive classification neural network by having the multi-attribute contrastive classification neural network learn to avoid unfeasible object-attribute combinations (e.g., a parked dog, a talking table, a barking couch). Indeed, in some embodiments, the scene-based image editing system 106 also utilizes the object-label embedding vector 1712 (as an input in the feature composition module $f_{comp}$) to have the multi-attribute contrastive classification neural network learn to associate certain object-attribute pairs together (e.g., a ball is always round). In many instances, by guiding the multi-attribute contrastive classification neural network on what object it is predicting attributes for enables the multi-attribute contrastive classification neural network to focus on particular visual aspects of the object. This, in turn, improves the quality of extracted attributes for the portrayed object.

In one or more embodiments, the scene-based image editing system 106 utilizes a feature composition module (e.g., $f_{comp}$) to generate the image-object feature map 1714. In particular, the scene-based image editing system 106 implements the feature composition module (e.g., $f_{comp}$) with a gating mechanism in accordance with the following:

$$f_{comp}(f_{img}(I), \phi_o) = f_{img}(I) \odot f_{gate}(\phi_o)$$

and $$f_{comp}(\phi_o) = \sigma(W_{g2} \cdot ReLU(W_{g1}\phi_o + b_{g1}) + b_{g2})$$

In the first function above, the scene-based image editing system 106 utilizes a channel-wise product ($\odot$) of the high-level attribute feature map $f_{img}(I)$ and a filter $f_{gate}$ of the object-label embedding vector $\phi_o \in \mathbb{R}^d$ to generate an image-object feature map $f_{comp}(f_{img}(I), \phi_o) \in \mathbb{R}^D$.

In addition, in the second function above, the scene-based image editing system 106 utilizes a sigmoid function $\sigma$ in the $f_{gate}(\phi_o)) \in \mathbb{R}^D$ that is broadcasted to match the feature map spatial dimension as a 2-layer multilayer perceptron (MLP). Indeed, in one or more embodiments, the scene-based image editing system 106 utilizes $f_{gate}$ as a filter that selects attribute features that are relevant to the object of interest (e.g., as indicated by the object-label embedding vector $\phi_o$). In many instances, the scene-based image editing system 106 also utilizes $f_{gate}$ to suppress incompatible object-attribute pairs (e.g., talking table). In some embodiments, the scene-based image editing system 106 can identify object-image labels for each object portrayed within a digital image and output attributes for each portrayed object by utilizing the identified object-image labels with the multi-attribute contrastive classification neural network.

Furthermore, as shown in FIG. 17, the scene-based image editing system 106 utilizes the image-object feature map 1714 with a localizer neural network 1716 to generate a localized image-object feature vector $Z_{rel}$ (e.g., as also shown in FIG. 16 as localizer neural network 1612 and $Z_{rel}$). In particular, as shown in FIG. 17, the scene-based image editing system 106 generates a localized object attention feature vector 1717 (e.g., G in FIG. 16) that reflects a segmentation prediction of the portrayed object by utilizing the image-object feature map 1714 with a convolutional layer $f_{rel}$ of the localizer neural network 1716. Then, as illustrated in FIG. 17, the scene-based image editing system 106 combines the localized object attention feature vector 1717 with the image-object feature map 1714 to generate the localized image-object feature vector $Z_{rel}$. As shown in FIG. 17, the scene-based image editing system 106 utilizes matrix multiplication 1720 between the localized object attention feature vector 1717 and the image-object feature map 1714 to generate the localized image-object feature vector $Z_{rel}$.

In some instances, digital images may include multiple objects (and/or a background). Accordingly, in one or more embodiments, the scene-based image editing system 106 utilizes a localizer neural network to learn an improved feature aggregation that suppresses non-relevant-object regions (e.g., regions not reflected in a segmentation prediction of the target object to isolate the target object). For example, in reference to the digital image 1702, the scene-based image editing system 106 utilizes the localizer neural network 1716 to localize an object region such that the multi-attribute contrastive classification neural network predicts attributes for the correct object (e.g., the portrayed chair) rather than other irrelevant objects (e.g., the portrayed horse). To do this, in some embodiments, the scene-based image editing system 106 utilizes a localizer neural network that utilizes supervised learning with object segmentation masks (e.g., ground truth relevant-object masks) from a dataset of labeled images (e.g., ground truth images as described below).

To illustrate, in some instances, the scene-based image editing system 106 utilizes 2-stacked convolutional layers $f_{rel}$ (e.g., with a kernel size of 1) followed by a spatial softmax to generate a localized object attention feature vector G (e.g., a localized object region) from an image-object feature map $X \in \mathbb{R}^{H \times W \times D}$ in accordance with the following:

$$g = f_{rel}(X),\ g \in \mathbb{R}^{H \times W},\ G_{h,w} = \frac{\exp(g_h, w)}{\sum_{h,w} \exp(g_h, w)},\ G \in \mathbb{R}^{H \times W}$$

For example, the localized object attention feature vector G includes a single plane of data that is H×W (e.g., a feature map having a single dimension). In some instances, the localized object attention feature vector G includes a feature map (e.g., a localized object attention feature map) that includes one or more feature vector dimensions.

Then, in one or more embodiments, the scene-based image editing system 106 utilizes the localized object attention feature vector $G_{h,w}$ and the image-object feature map $X_{h,w}$ to generate the localized image-object feature vector $Z_{rel}$ in accordance with the following:

$$Z_{rel} = \sum_{h,w} G_{h,w} X_{h,w}$$

In some instances, in the above function, the scene-based image editing system 106 pools H×W D-dimensional feature vectors $X_{h,w}$ (from the image-object feature map) in $\mathbb{R}^D$ using weights from the localized object attention feature vector $G_{h,w}$ into a single D-dimensional feature vector $Z_{rel}$.

In one or more embodiments, in reference to FIG. 17, the scene-based image editing system 106 trains the localizer neural network 1716 to learn the localized object attention feature vector 1717 (e.g., G) utilizing direct supervision with object segmentation masks 1718 (e.g., ground truth object segmentation masks 1618 from FIG. 16).

Furthermore, as shown in FIG. 17, the scene-based image editing system 106 utilizes the image-object feature map 1714 with a multi-attention neural network 1722 to generate a multi-attention feature vector $Z_{att}$ (e.g., the multi-attention neural network 1614 and $Z_{att}$ of FIG. 16). In particular, as shown in FIG. 17, the scene-based image editing system 106 utilizes a convolutional layer $f_{att}$ (e.g., attention layers) with the image-object feature map 1714 to extract attention maps 1724 (e.g., Attention 1 through Attention k) (e.g., attention maps 1620 of FIG. 16). Then, as further shown in FIG. 17, the scene-based image editing system 106 passes (e.g., via linear projection) the extracted attention maps 424 (attention 1 through attention k) through a projection layer $f_{proj}$ to extract one or more attention features that are utilized to generate the multi-attention feature vector $Z_{att}$.

In one or more embodiments, the scene-based image editing system 106 utilizes the multi-attention feature vector $Z_{att}$ to accurately predict attributes of a portrayed object within a digital image by providing focus to different parts of the portrayed object and/or regions surrounding the portrayed object (e.g., attending to features at different spatial locations). To illustrate, in some instances, the scene-based image editing system 106 utilizes the multi-attention feature vector $Z_{att}$ to extract attributes such as "barefooted" or "bald-headed" by focusing on different parts of a person (i.e., an object) that is portrayed in a digital image. Likewise, in some embodiments, the scene-based image editing system 106 utilizes the multi-attention feature vector $Z_{att}$ to distinguish between different activity attributes (e.g., jumping vs crouching) that may rely on information from surrounding context of the portrayed object.

In certain instances, the scene-based image editing system 106 generates an attention map per attribute portrayed for an object within a digital image. For example, the scene-based image editing system 106 utilizes an image-object feature map with one or more attention layers to generate an attention map from the image-object feature map for each known attribute. Then, the scene-based image editing system 106 utilizes the attention maps with a projection layer to generate the multi-attention feature vector $Z_{att}$. In one or more embodiments, the scene-based image editing system 106 generates various numbers of attention maps for various attributes portrayed for an object within a digital image (e.g., the system can generate an attention map for each attribute or a different number of attention maps than the number of attributes).

Furthermore, in one or more embodiments, the scene-based image editing system 106 utilizes a hybrid shared multi-attention approach that allows for attention hops while generating the attention maps from the image-object feature map. For example, the scene-based image editing system 106 extracts M attention maps $$\{A^{(m)}\}_{m=1}^{M}$$

from an image-object feature map X utilizing a convolutional layer $$f_{att}^{(m)}$$

(e.g., attention layers) in accordance with the following function:

$$E^{(m)} = f_{att}^{(m)}(X),\ E^{(m)} \in \mathbb{R}^{H \times W},\ m = 1, \ldots , M \text{ and}$$

$$A_{h,w}^{(m)} = \frac{\exp\left(E_{h,w}^{(m)}\right)}{\sum_{h,w} \exp\left(E_{h,w}^{(m)}\right)},\ A_{h,w}^{(m)} \in \mathbb{R}^{H \times W}$$

In some cases, the scene-based image editing system 106 utilizes a convolutional layer $$f_{att}^{(m)}$$

that has a similar architecture to the 2-stacked convolutional layers $f_{rel}$ from function (3) above. By utilizing the approach outlined in second function above, the scene-based image editing system 106 utilizes a diverse set of attention maps that correspond to a diverse range of attributes.

Subsequently, in one or more embodiments, the scene-based image editing system 106 utilizes the M attention maps (e.g., $$A_{h,w}^{(m)})$$

to aggregate M attention feature vectors $$(\{r^{(m)}\}_{m=1}^{M})$$

from the image-object feature map X in accordance with the following function:

$$r^{(m)} = \sum_{h,w} A_{h,w}^{(m)} X_{h,w},\ r^{(m)} \in \mathbb{R}^{D}$$

Moreover, in reference to FIG. 17, the scene-based image editing system 106 passes the M attention feature vectors $$(\{r^{(m)}\}_{i=1}^{M})$$

through a projection layer $$f_{proj}^{(m)}$$

to extract one or more attention feature vectors $z^{(m)}$ in accordance with the following function:

$$z_{att}^{(m)} = f_{proj}^{(m)}\left(r^{(m)}\right),\ z_{att}^{(m)} \in \mathbb{R}^{D_{proj}}$$

Then, in one or more embodiments, the scene-based image editing system 106 generates the multi-attention feature vector $Z_{att}$ by concatenating the individual attention feature vectors $$z_{att}^{(m)}$$

l in accordance with the following function:

$$Z_{att} = \text{concat}\left(\left[z_{att}^{(1)}, \ldots , z_{att}^{(M)}\right]\right)$$

In some embodiments, the scene-based image editing system 106 utilizes a divergence loss with the multi-attention neural network in the M attention hops approach. In particular, the scene-based image editing system 106 utilizes a divergence loss that encourages attention maps to focus on different (or unique) regions of a digital image (from the image-object feature map). In some cases, the scene-based image editing system 106 utilizes a divergence loss that promotes diversity between attention features by minimizing a cosine similarity (e.g., $\ell_2$-norm) between attention weight vectors (e.g., E) of attention features. For instance, the scene-based image editing system 106 determines a divergence loss $\mathcal{L}_{div}$ in accordance with the following function:

$$\mathcal{L}_{div} = \sum_{m \neq n} \frac{\langle E^{(m)}, E^{(n)} \rangle}{\|E^{(m)}\|_2 \|E^{(n)}\|_2}$$

In one or more embodiments, the scene-based image editing system 106 utilizes the divergence loss $\mathcal{L}_{div}$ to learn parameters of the multi-attention neural network 1722 and/or the multi-attribute contrastive classification neural network (as a whole).

Furthermore, as shown in FIG. 17, the scene-based image editing system 106 also generates a localized low-level attribute feature vector $Z_{low}$ (e.g., $Z_{low}$ of FIG. 16). Indeed, as illustrated in FIG. 17, the scene-based image editing system 106 generates the localized low-level attribute feature vector $Z_{low}$ by combining the low-level attribute feature map 1710 and the localized object attention feature vector 1717. For example, as shown in FIG. 17, the scene-based image editing system 106 combines the low-level attribute feature map 1710 and the localized object attention feature vector 1717 utilizing matrix multiplication 1726 to generate the localized low-level attribute feature vector $Z_{low}$.

By generating and utilizing the localized low-level attribute feature vector $Z_{low}$, in one or more embodiments, the scene-based image editing system 106 improves the accuracy of low-level features (e.g., colors, materials) that are extracted for an object portrayed in a digital image. In particular, in one or more embodiments, the scene-based image editing system 106 pools low-level features (as represented by a low-level attribute feature map from a low-level embedding layer) from a localized object attention feature vector (e.g., from a localizer neural network). Indeed, in one or more embodiments, by pooling low-level features from the localized object attention feature vector utilizing a low-level feature map, the scene-based image editing system 106 constructs a localized low-level attribute feature vector $Z_{low}$.

As further shown in FIG. 17, the scene-based image editing system 106 utilizes a classifier neural network 1732 ($f_{classifier}$) (e.g., the classifier neural network 1624 of FIG. 16) with the localized image-object feature vector $Z_{rel}$, the multi-attention feature vector $Z_{att}$, and the localized low-level attribute feature vector $Z_{low}$ to determine positive attribute labels 1728 and negative attribute labels 1730 for the object (e.g., "chair") portrayed within the digital image 1702. In some embodiments, the scene-based image editing system 106 utilizes a concatenation of the localized image-object feature vector $Z_{rel}$, the multi-attention feature vector $Z_{att}$, and the localized low-level attribute feature vector $Z_{low}$ as input in a classification layer of the classifier neural network 1732 ($f_{classifier}$) Then, as shown in FIG. 17, the classifier neural network 1732 ($f_{classifier}$) generates positive attribute labels 1728 (e.g., red, bright red, clean, giant, wooden) and also generates negative attribute labels 1730 (e.g., blue, stuffed, patterned, multicolored) for the portrayed object in the digital image 1702.

In one or more embodiments, the scene-based image editing system 106 utilizes a classifier neural network that is a 2-layer MLP. In some cases, the scene-based image editing system 106 utilizes a classifier neural network that includes various amounts of hidden units and output logic values followed by sigmoid. In some embodiments, the classifier neural network is trained by the scene-based image editing system 106 to generate both positive and negative attribute labels. Although one or more embodiments described herein utilize a 2-layer MLP, in some instances, the scene-based image editing system 106 utilizes a linear layer (e.g., within the classifier neural network, for the fgate, and for the image-object feature map).

Furthermore, in one or more embodiments, the scene-based image editing system 106 utilizes various combinations of the localized image-object feature vector $Z_{rel}$, the multi-attention feature vector $Z_{att}$, and the localized low-level attribute feature vector $Z_{low}$ with the classifier neural network to extract attributes for an object portrayed in a digital image. For example, in certain instances, the scene-based image editing system 106 provides the localized image-object feature vector $Z_{rel}$ and the multi-attention feature vector $Z_{att}$ to extract attributes for the portrayed object. In some instances, as shown in FIG. 17, the scene-based image editing system 106 utilizes a concatenation of each the localized image-object feature vector $Z_{rel}$, the multi-attention feature vector $Z_{att}$, and the localized low-level attribute feature vector $Z_{low}$ with the classifier neural network.

In one or more embodiments, the scene-based image editing system 106 utilizes the classifier neural network 1732 to generate prediction scores corresponding to attribute labels as outputs. For, example, the classifier neural network 1732 can generate a prediction score for one or more attribute labels (e.g., a score of 0.04 for blue, a score of 0.9 for red, a score of 0.4 for orange). Then, in some instances, the scene-based image editing system 106 utilizes attribute labels that correspond to prediction scores that satisfy a threshold prediction score. Indeed, in one or more embodiments, the scene-based image editing system 106 selects various attribute labels (both positive and negative) by utilizing output prediction scores for attributes from a classifier neural network.

Although one or more embodiments herein illustrate the scene-based image editing system 106 utilizing a particular embedding neural network, localizer neural network, multi-attention neural network, and classifier neural network, the scene-based image editing system 106 can utilize various types of neural networks for these components (e.g., CNN, FCN). In addition, although one or more embodiments herein describe the scene-based image editing system 106 combining various feature maps (and/or feature vectors) utilizing matrix multiplication, the scene-based image editing system 106, in some embodiments, utilizes various approaches to combine feature maps (and/or feature vectors) such as, but not limited to, concatenation, multiplication, addition, and/or aggregation. For example, in some implementations, the scene-based image editing system 106 combines a localized object attention feature vector and an image-object feature map to generate the localized image-object feature vector by concatenating the localized object attention feature vector and the image-object feature map.

Thus, in some cases, the scene-based image editing system 106 utilizes an attribute classification neural network (e.g., a multi-attribute contrastive classification neural network) to determine objects attributes of objects portrayed in a digital image or otherwise determined attributes of portrayed semantic areas. In some cases, the scene-based image editing system 106 adds object attributes or other attributes determined for a digital image to a semantic scene graph for the digital image. In other words, the scene-based image editing system 106 utilizes the attribute classification neural network in generating semantic scene graphs for digital images. In some implementations, however, the scene-based image editing system 106 stores the determined object attributes or other attributes in a separate storage location.

Figure 18:
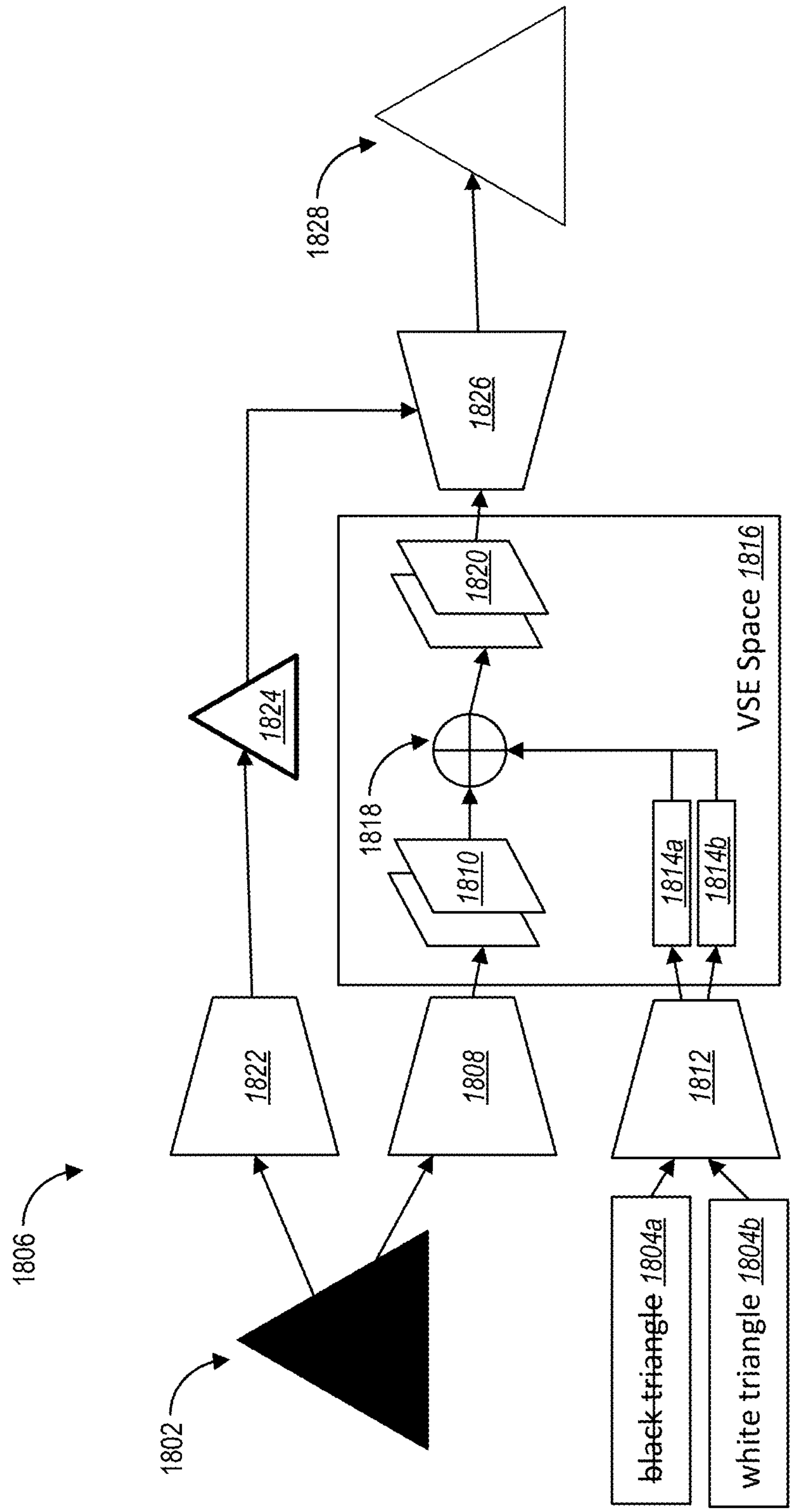
FIG. 18 illustrates an attribute modification neural network utilized by the scene-based image editing system to modify object attributes in accordance with one or more embodiments.

Further, in one or more embodiments, the scene-based image editing system 106 facilitates modifying object attributes of objects portrayed in a digital image by modifying one or more object attributes in response to user input. In particular, in some cases, the scene-based image editing system 106 utilizes a machine learning model, such as an attribute modification neural network to modify object attributes. FIG. 18 illustrates an attribute modification neural network utilized by the scene-based image editing system 106 to modify object attributes in accordance with one or more embodiments.

In one or more embodiments, an attribute modification neural network includes a computer-implemented neural network that modifies specified object attributes of an object (or specified attributes of other specified semantic areas). In particular, in some embodiments, an attribute modification neural network includes a computer-implemented neural network that receives user input targeting an object attribute and indicating a change to the object attribute and modifies the object attribute in accordance with the indicated change. In some cases, an attribute modification neural network includes a generative network.

As shown in FIG. 18, the scene-based image editing system 106 provides an object 1802 (e.g., a digital image that portrays the object 1802) and modification input 1804*a*-1804*b* to an object modification neural network 1806. In particular, FIG. 18 shows the modification input 1804*a*-1804*b* including input for the object attribute to be changed (e.g., the black color of the object 1802) and input for the change to occur (e.g., changing the color of the object 1802 to white).

As illustrated by FIG. 18, the object modification neural network 1806 utilizes an image encoder 1808 to generate visual feature maps 1810 from the object 1802. Further, the object modification neural network 1806 utilizes a text encoder 1812 to generate textual features 1814*a* -1814*b* from the modification input 1804*a*-1804*b*. In particular, as shown in FIG. 18, the object modification neural network 1806 generates the visual feature maps 1810 and the textual features 1814*a*-1814*b* within a joint embedding space 1816 (labeled "visual-semantic embedding space" or "VSE space").

In one or more embodiments, the object modification neural network 1806 performs text-guided visual feature manipulation to ground the modification input 1804*a*-1804*b* on the visual feature maps 1810 and manipulate the corresponding regions of the visual feature maps 1810 with the provided textual features. For instance, as shown in FIG. 18, the object modification neural network 1806 utilizes an operation 1818 (e.g., a vector arithmetic operation) to generate manipulated visual feature maps 1820 from the visual feature maps 1810 and the textual features 1814*a*-1814*b*.

As further shown in FIG. 18, the object modification neural network 1806 also utilizes a fixed edge extractor 1822 to extract an edge 1824 (a boundary) of the object 1802. In other words, the object modification neural network 1806 utilizes the fixed edge extractor 1822 to extract the edge 1824 of the area to be modified.

Further, as shown, the object modification neural network 1806 utilizes a decoder 1826 to generate the modified object 1828. In particular, the decoder 1826 generates the modified object 1828 from the edge 1824 extracted from the object 1802 and the manipulated visual feature maps 1820 generated from the object 1802 and the modification input 1804*a*-1804*b*.

In one or more embodiments, the scene-based image editing system 106 trains the object modification neural network 1806 to handle open-vocabulary instructions and open-domain digital images. For instance, in some cases, the scene-based image editing system 106 trains the object modification neural network 1806 utilizing a large-scale image-caption dataset to learn a universal visual-semantic embedding space. In some cases, the scene-based image editing system 106 utilizes convolutional neural networks and/or long short-term memory networks as the encoders of the object modification neural network 1806 to transform digital images and text input into the visual and textual features.

The following provides a more detailed description of the text-guided visual feature manipulation. As previously mentioned, in one or more embodiments, the scene-based image editing system 106 utilizes the joint embedding space 1816 to manipulate the visual feature maps 1810 with the text instructions of the modification input 1804*a*-1804*b* via vector arithmetic operations. When manipulating certain objects or object attributes, the object modification neural network 1806 aims to modify only specific regions while keeping other regions unchanged. Accordingly, the object modification neural network 1806 conducts vector arithmetic operations between the visual feature maps 1810 represented as $V \in \mathbb{R}^{1024 \times 7 \times 7}$ and the textual features 1814*a*-1814*b* (e.g., represented as textual feature vectors).

For instance, in some cases, the object modification neural network 1806 identifies the regions in the visual feature maps 1810 to manipulate (i.e., grounds the modification input 1804*a*-1804*b*) on the spatial feature map. In some cases, the object modification neural network 1806 provides a soft grounding for textual queries via a weighted summation of the visual feature maps 1810. In some cases, the object modification neural network 1806 uses the textual features 1814*a*-1814*b* (represented as $t \in \mathbb{R}^{1024 \times 1}$) as weights to compute the weighted summation of the visual feature maps 1810 $g = t^{\tau} V$. Using this approach, the object modification neural network 1806 provides a soft grounding map $g \in \mathbb{R}^{7 \times 7}$, which roughly localizes corresponding regions in the visual feature maps 1810 related to the text instructions.

In one or more embodiments, the object modification neural network 1806 utilizes the grounding map as location-adaptive coefficients to control the manipulation strength at different locations. In some cases, the object modification neural network 1806 utilizes a coefficient α to control the global manipulation strength, which enables continuous transitions between source images and the manipulated ones. In one or more embodiments, the scene-based image editing system 106 denotes the visual feature vector at spatial location (i,j) (where $i,j \in \{0, 1, \ldots 6\}$) in the visual feature map $V \in \mathbb{R}^{1024 \times 7 \times 7}$ as $v^{i,j} \in \mathbb{R}^{1024}$.

The scene-based image editing system 106 utilizes the object modification neural network 1806 to perform various types of manipulations via the vector arithmetic operations weighted by the soft grounding map and the coefficient α. For instance, in some cases, the scene-based image editing system 106 utilizes the object modification neural network 1806 to change an object attribute or a global attribute. The object modification neural network 1806 denotes the textual feature embeddings of the source concept (e.g., "black triangle") and the target concept (e.g., "white triangle") as $t_1$ and $t_2$, respectively. The object modification neural network 1806 performs the manipulation of image feature vector v at location (i, j) as follows:

$$v_m^{i,j} = v^{i,j} - \alpha \langle v^{i,j}, t_1 \rangle t_1 + \alpha \langle v^{i,j}, t_1 \rangle t_2,$$

where $i, j \in \{0, 1, \ldots 6\}$ and $$v_m^{i,j}$$

is the manipulated visual feature vector at location (i, j) of the 7×7 feature map.

In one or more embodiments, the object modification neural network 1806 removes the source features $t_1$ and adds the target features $t_2$ to each visual feature vector $v^{i,j}$. Additionally, $\langle v^{i,j}, t_1 \rangle$ represents the value of the soft grounding map at location (i, j), calculated as the dot product of the image feature vector and the source textual features. In other words, the value represents the projection of the visual embedding $v^{i,j}$ onto the direction of the textual embedding $t_1$. In some cases, object modification neural network 1806 utilizes the value as a location-adaptive manipulation strength to control which regions in the image should be edited. Further, the object modification neural network 1806 utilizes the coefficient α as a hyper-parameter that controls the image-level manipulation strength. By smoothly increasing α, the object modification neural network 1806 achieves smooth transitions from source to target attributes.

In some implementations, the scene-based image editing system 106 utilizes the object modification neural network 1806 to remove a concept (e.g., an object attribute, an object, or other visual elements) from a digital image (e.g., removing an accessory from a person). In some instances, the object modification neural network 1806 denotes the semantic embedding of the concept to be removed as t. Accordingly, the object modification neural network 1806 performs the removing operation as follows:

$$v_m^{i,j} = v^{i,j} - \alpha\langle v^{i,j}, t\rangle t$$

Further, in some embodiments, the scene-based image editing system 106 utilizes the object modification neural network 1806 to modify the degree to which an object attribute (or other attribute of a semantic area) appears (e.g., making a red apple less red or increasing the brightness of a digital image). In some cases, the object modification neural network 1806 controls the strength of an attribute via the hyper-parameter α. By smoothly adjusting α, the object modification neural network 1806 gradually strengthens or weakens the degree to which an attribute appears as follows:

$$v_m^{i,j} = v^{i,j} \pm \alpha\langle v^{i,j}, t\rangle t$$

After deriving the manipulated feature map $V_m \in \mathbb{R}^{1024\times7\times7}$ the object modification neural network 1806 utilizes the decoder 1826 (an image decoder) to generate a manipulated image (e.g., the modified object 1828). In one or more embodiments, the scene-based image editing system 106 trains the object modification neural network 1806 as described by F. Faghri et al., "Vse++: Improving visual-semantic Embeddings with Hard Negatives," arXiv: 1707.05612, 2017, which is incorporated herein by reference in its entirety. In some cases, the decoder 1826 takes 1024×7×7 features maps as input and is composed of seven ResNet blocks with upsampling layers in between, which generates 256×256 images. Also, in some instances, the scene-based image editing system 106 utilizes a discriminator that includes a multi-scale patch-based discriminator. In some implementations, the scene-based image editing system 106 trains the decoder 1826 with GAN loss, perceptual loss, and discriminator feature matching loss. Further, in some embodiments, the fixed edge extractor 1822 includes a bi-directional cascade network.

Figures 19A, 19B, 19C:
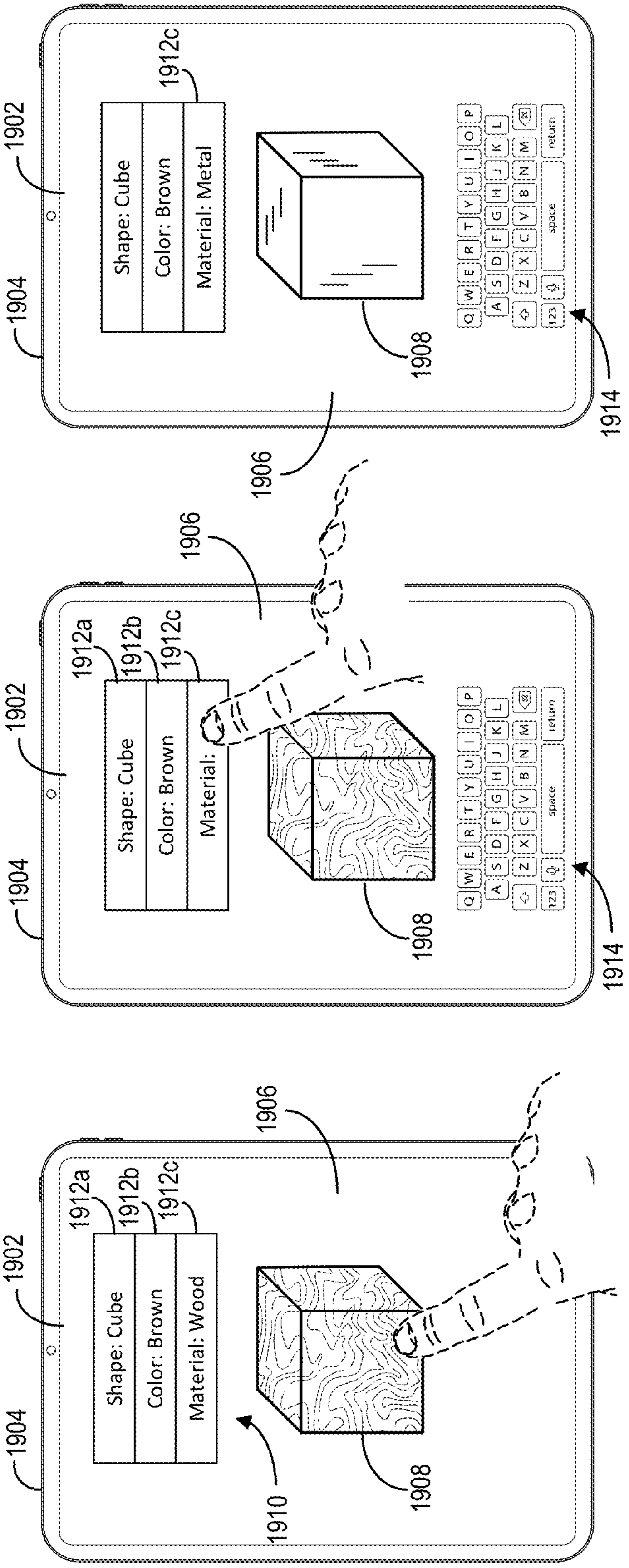
FIGS. 19A-19C illustrate a graphical user interface implemented by the scene-based image editing system to facilitate modifying object attributes of objects portrayed in a digital image in accordance with one or more embodiments.

FIGS. 19A-19C illustrate a graphical user interface implemented by the scene-based image editing system 106 to facilitate modifying object attributes of objects portrayed in a digital image in accordance with one or more embodiments. Indeed, though FIGS. 19A-19C particularly show modifying object attributes of objects, it should be noted that the scene-based image editing system 106 similarly modifies attributes of other semantic areas (e.g., background, foreground, ground, sky, etc.) of a digital image in various embodiments.

Indeed, as shown in FIG. 19A, the scene-based image editing system 106 provides a graphical user interface 1902 for display on a client device 1904 and provides a digital image 1906 for display within the graphical user interface 1902. As further shown, the digital image 1906 portrays an object 1908.

As further shown in FIG. 19A, in response to detecting a user interaction with the object 1908, the scene-based image editing system 106 provides an attribute menu 1910 for display within the graphical user interface 1902. In some embodiments, the attribute menu 1910 provides one or more object attributes of the object 1908. Indeed, FIG. 19A shows that the attribute menu 1910 provides object attributes indicators 1912*a*-1912*c*, indicating the shape, color, and material of the object 1908, respectively. It should be noted, however, that various alternative or additional object attributes are provided in various embodiments.

In one or more embodiments, the scene-based image editing system 106 retrieves the object attributes for the object attribute indicators 1912*a*-1912*c* from a semantic scene graph generated for the digital image 1906. Indeed, in some implementations, the scene-based image editing system 106 generates a semantic scene graph for the digital image 1906 (e.g., before detecting the user interaction with the object 1908). In some cases, the scene-based image editing system 106 determines the object attributes for the object 1908 utilizing an attribute classification neural network and includes the determined object attributes within the semantic scene graph. In some implementations, the scene-based image editing system 106 retrieves the object attributes from a separate storage location.

As shown in FIG. 19B, the scene-based image editing system 106 detects a user interaction with the object attribute indicator 1912*c*. Indeed, in one or more embodiments, the object attribute indicators 1912*a*-1912*c* are interactive. As shown, in response to detecting the user interaction, the scene-based image editing system 106 removes the corresponding object attribute of the object 1908 from display. Further, in response to detecting the user interaction, the scene-based image editing system 106 provides a digital keyboard 1914 for display within the graphical user interface 1902. Thus, the scene-based image editing system 106 provides a prompt for entry of textual user input. In some cases, upon detecting the user interaction with the object attribute indicator 1912*c*, the scene-based image editing system 106 maintains the corresponding object attribute for display, allowing user interactions to remove the object attribute in confirming that the object attribute has been targeted for modification.

As shown in FIG. 19C, the scene-based image editing system 106 detects one or more user interactions with the digital keyboard 1914 displayed within the graphical user interface 1902. In particular, the scene-based image editing system 106 receives textual user input provided via the digital keyboard 1914. The scene-based image editing system 106 further determines that the textual user input provides a change to the object attribute corresponding to the object attribute indicator 1912*c*. Additionally, as shown, the scene-based image editing system 106 provides the textual user input for display as part of the object attribute indicator 1912*c*.

In this case, the user interactions with the graphical user interface 1902 provide instructions to change a material of the object 1908 from a first material (e.g., wood) to a second material (e.g., metal). Thus, upon receiving the textual user input regarding the second material, the scene-based image editing system 106 modifies the digital image 1906 by modifying the object attribute of the object 1908 to reflect the user-provided second material.

In one or more embodiments, the scene-based image editing system 106 utilizes an attribute modification neural network to change the object attribute of the object 1908. In particular, as described above with reference to FIG. 18, the scene-based image editing system 106 provides the digital image 1906 as well as the modification input composed of the first material and the second material provided by the textual user input to the attribute modification neural network. Accordingly, the scene-based image editing system 106 utilizes the attribute modification neural network to provide a modified digital image portraying the object 1908 with the modified object attribute as output.

Figure 20C:
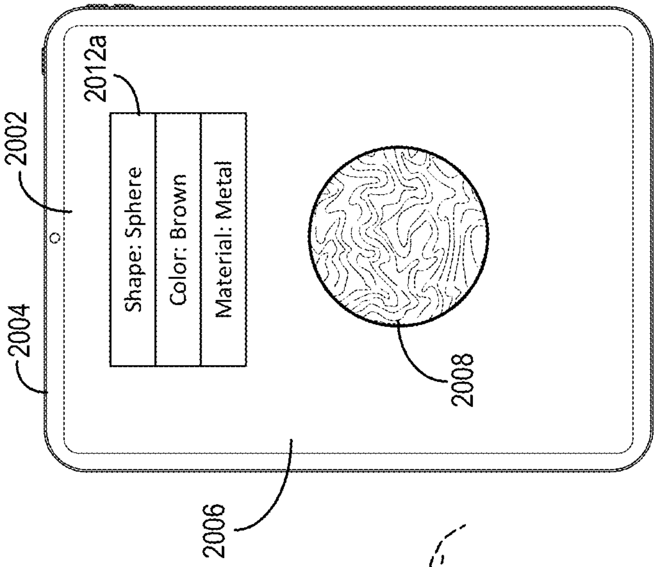
FIGS. 20A-20C illustrate another graphical user interface implemented by the scene-based image editing system to facilitate modifying object attributes of objects portrayed in a digital image in accordance with one or more embodiments.
Figure 20B:
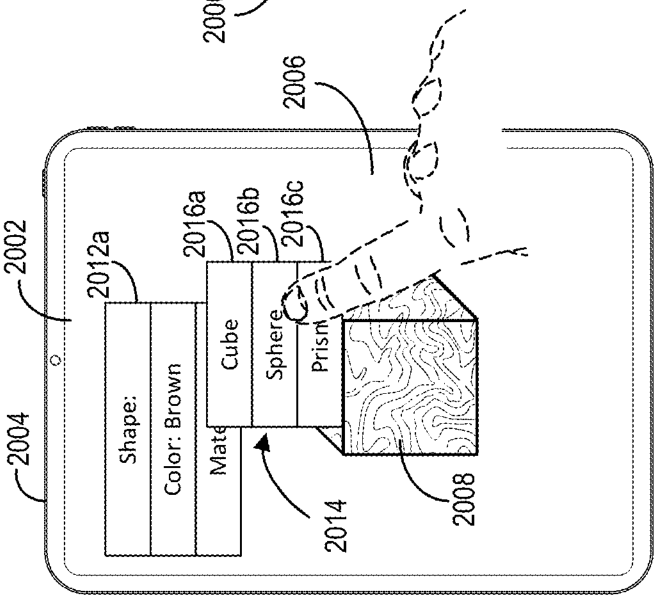
Figure 20A:
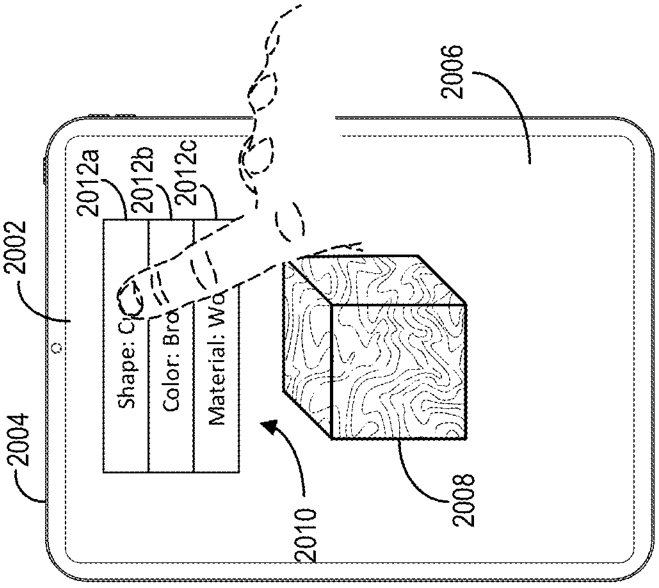

FIGS. 20A-20C illustrate another graphical user interface implemented by the scene-based image editing system 106 to facilitate modifying object attributes of objects portrayed in a digital image in accordance with one or more embodiments. As shown in FIG. 20A, the scene-based image editing system 106 provides a digital image 2006 portraying an object 2008 for display within a graphical user interface 2002 of a client device 2004. Further, upon detecting a user interaction with the object 2008, the scene-based image editing system 106 provides an attribute menu 2010 having attribute object indicators 2012*a*-2012*c* listing object attributes of the object 2008.

As shown in FIG. 20B, the scene-based image editing system 106 detects an additional user interaction with the object attribute indicator 2012*a*. In response to detecting the additional user interaction, the scene-based image editing system 106 provides an alternative attribute menu 2014 for display within the graphical user interface 2002. In one or more embodiments, the alternative attribute menu 2014 includes one or more options for changing a corresponding object attribute. Indeed, as illustrated in FIG. 20B, the alternative attribute menu 2014 includes alternative attribute indicators 2016*a*-2016*c* that provide object attributes that could be used in place of the current object attribute for the object 2008.

As shown in FIG. 20C, the scene-based image editing system 106 detects a user interaction with the alternative attribute indicator 2016*b*. Accordingly, the scene-based image editing system 106 modifies the digital image 2006 by modifying the object attribute of the object 2008 in accordance with the user input with the alternative attribute indicator 2016*b*. In particular, the scene-based image editing system 106 modifies the object 2008 to reflect the alternative object attribute associated with the alternative attribute indicator 2016*b*.

In one or more embodiments, the scene-based image editing system 106 utilizes a textual representation of the alternative object attribute in modifying the object 2008. For instance, as discussed above, the scene-based image editing system 106 provides the textual representation as textual input to an attribute modification neural network and utilizes the attribute modification neural network to output a modified digital image in which the object 2008 reflects the targeted change in its object attribute.

Figure 21A:
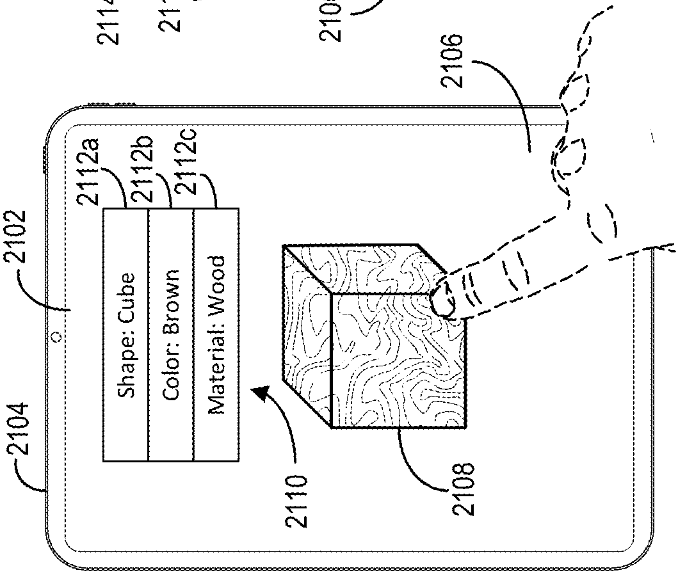
FIGS. 21A-21C illustrate yet another graphical user interface implemented by the scene-based image editing system to facilitate modifying object attributes of objects portrayed in a digital image in accordance with one or more embodiments.
Figure 21B:
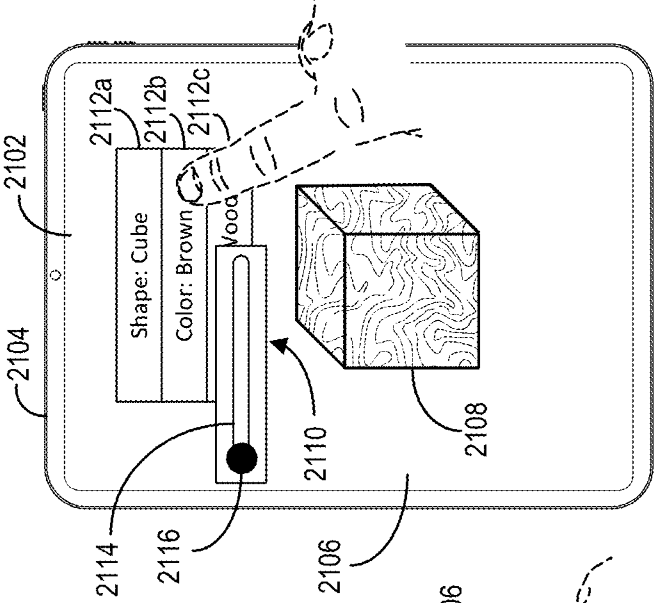
Figure 21C:
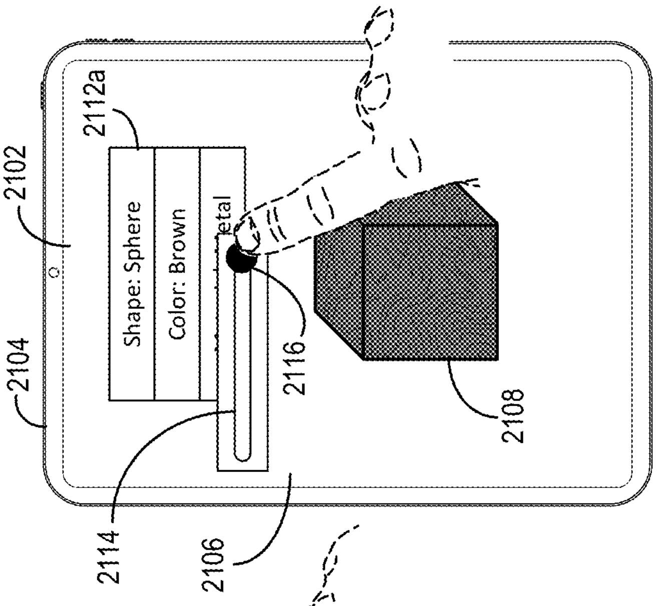

FIGS. 21A-21C illustrate another graphical user interface implemented by the scene-based image editing system 106 to facilitate modifying object attributes of objects portrayed in a digital image in accordance with one or more embodiments. As shown in FIG. 21A, the scene-based image editing system 106 provides a digital image 2106 portraying an object 2108 for display within a graphical user interface 2102 of a client device 2104. Further, upon detecting a user interaction with the object 2108, the scene-based image editing system 106 provides an attribute menu 2110 having attribute object indicators 2112*a*-2012*c* listing object attributes of the object 2108.

As shown in FIG. 21B, the scene-based image editing system 106 detects an additional user interaction with the object attribute indicator 2112*b*. In response to detecting the additional user interaction, the scene-based image editing system 106 provides a slider bar 2114 for display within the graphical user interface 2102. In one or more embodiments, the slider bar 2114 includes a slider element 2116 that indicates a degree to which the corresponding object attribute appears in the digital image 2106 (e.g., the strength or weakness of its presence in the digital image 2106).

As shown in FIG. 21C, the scene-based image editing system 106 detects a user interaction with the slider element 2116 of the slider bar 2114, increasing the degree to which the corresponding object attribute appears in the digital image. Accordingly, the scene-based image editing system 106 modifies the digital image 2106 by modifying the object 2108 to reflect the increased strength in the appearance of the corresponding object attribute.

In particular, in one or more embodiments, the scene-based image editing system 106 utilizes an attribute modification neural network to modify the digital image 2106 in accordance with the user interaction. Indeed, as described above with reference to FIG. 18, the scene-based image editing system 106 is capable of modifying the strength or weakness of the appearance of an object attribute via the coefficient $\alpha$. Accordingly, in one or more embodiments, the scene-based image editing system 106 adjusts the coefficient $\alpha$ based on the positioning of the slider element 2116 via the user interaction.

By facilitating image modifications that target particular object attributes as described above, the scene-based image editing system 106 provides improved flexibility and efficiency when compared to conventional systems. Indeed, the scene-based image editing system 106 provides a flexible, intuitive approach that visually displays descriptions of an object's attributes and allows user input that interacts with those descriptions to change the attributes. Thus, rather than requiring tedious, manual manipulation of an object attribute as is typical under many conventional systems, the scene-based image editing system 106 allows user interactions to target object attributes at a high level of abstraction (e.g., without having to interact at the pixel level). Further, as scene-based image editing system 106 enables modifications to object attributes via relatively few user interactions with provided visual elements, the scene-based image editing system 106 implements a graphical user interface that provides improved efficiency.

As previously mentioned, in one or more embodiments, the scene-based image editing system 106 further uses a semantic scene graph generated for a digital image to implement relationship-aware object modifications. In particular, the scene-based image editing system 106 utilizes the semantic scene graph to inform the modification behaviors of objects portrayed in a digital image based on their relationships with one or more other objects in the digital image. FIGS. 22A-25D illustrate implementing relationship-aware object modifications in accordance with one or more embodiments.

Indeed, many conventional systems are inflexible in that they require different objects to be interacted with separately for modification. This is often the case even where the different objects are to be modified similarly (e.g., similarly resized or moved). For instance, conventional systems often require separate workflows to be executed via user interactions to modify separate objects or, at least, to perform the preparatory steps for the modification (e.g., outlining the objects and/or separating the objects from the rest of the image). Further, conventional systems typically fail to accommodate relationships between objects in a digital image when executing a modification. Indeed, these systems may modify a first object within a digital image but fail to execute a modification on a second object in accordance with a relationship between the two objects. Accordingly, the resulting modified image can appear unnatural or aesthetically confusing as it does not properly reflect the relationship between the two objects.

Accordingly, conventional systems are also often inefficient in that they require a significant number of user interactions to modify separate objects portrayed in a digital image. Indeed, as mentioned, conventional systems often require separate workflows to be performed via user interactions to execute many of the steps needed in modifying separate objects. Thus, many of the user interactions are redundant in that a user interaction is received, processed, and responded to multiple times for the separate objects. Further, when modifying an object having a relationship with another object, conventional systems require additional user interactions to modify the other object in accordance with that relationship. Thus, these systems unnecessarily duplicate the interactions used (e.g., interactions for moving an object then moving a related object) to perform separate modifications on related objects even where the relationship is suggestive as to the modification to be performed.

The scene-based image editing system 106 provides more flexibility and efficiency over conventional systems by implementing relationship-aware object modifications. Indeed, as will be discussed, the scene-based image editing system 106 provides a flexible, simplified process for selecting related objects for modification. Accordingly, the scene-based image editing system 106 flexibly allows user interactions to select and modify multiple objects portrayed in a digital image via a single workflow. Further, the scene-based image editing system 106 facilitates the intuitive modification of related objects so that the resulting modified image continues to reflect that relationship. As such, digital images modified by the scene-based image editing system 106 provide a more natural appearance when compared to conventional systems.

Further, by implementing a simplified process for selecting and modifying related objects, the scene-based image editing system 106 improves efficiency. In particular, the scene-based image editing system 106 implements a graphical user interface that reduces the user interactions required for selecting and modifying multiple, related objects. Indeed, as will be discussed, the scene-based image editing system 106 processes a relatively small number of user interactions with one object to anticipate, suggest, and/or execute modifications to other objects thus eliminating the need for additional user interactions for those modifications.

Figure 22A:
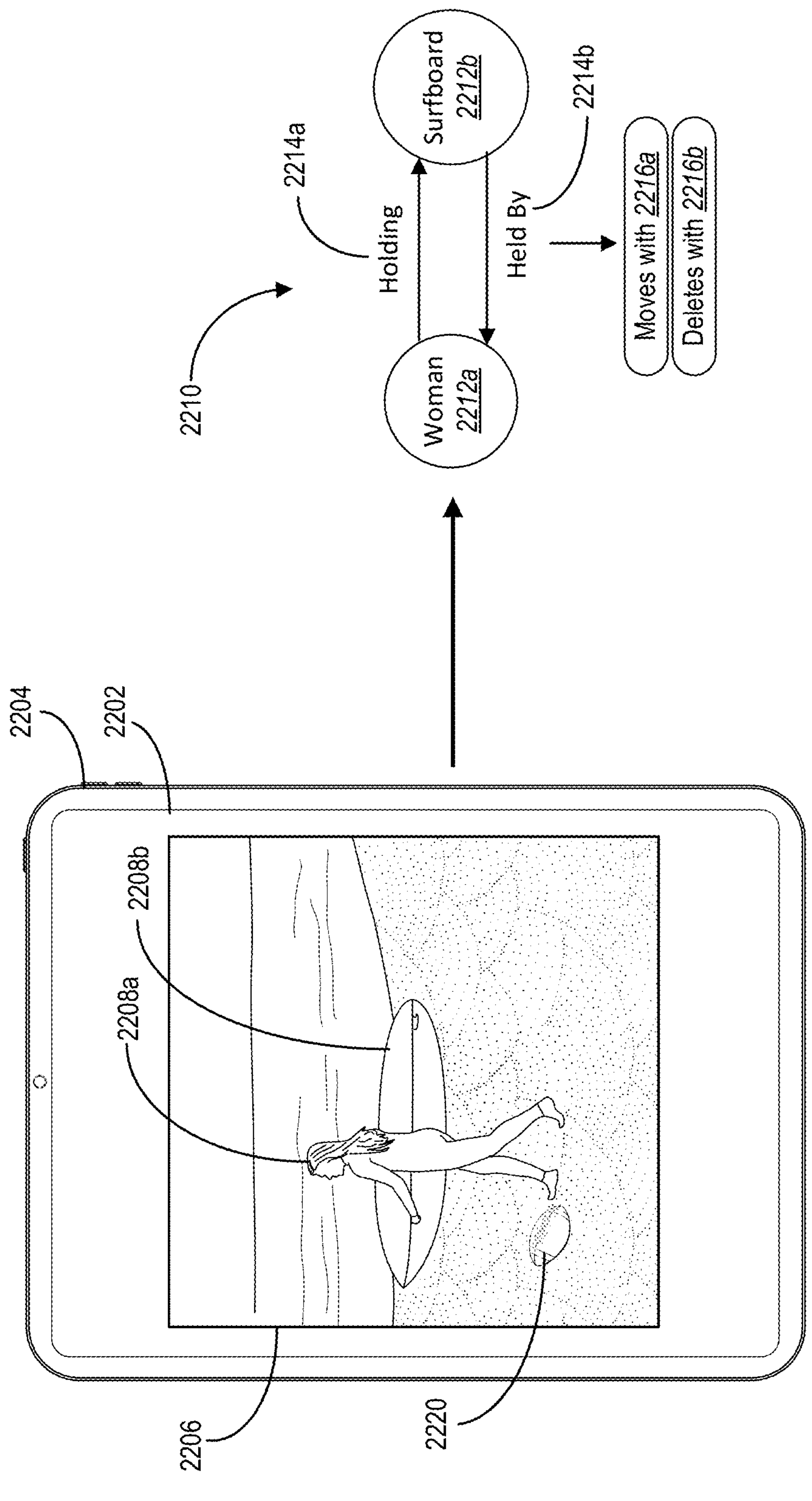
FIGS. 22A-22D illustrate a graphical user interface implemented by the scene-based image editing system to facilitate a relationship-aware object modification in accordance with one or more embodiments.

For instance, FIGS. 22A-22D illustrate a graphical user interface implemented by the scene-based image editing system 106 to facilitate a relationship-aware object modification in accordance with one or more embodiments. Indeed, as shown in FIG. 22A, the scene-based image editing system 106 provides, for display within a graphical user interface 2202 of a client device 2204, a digital image 2206 that portrays objects 2208*a*-2208*b* and object 2220. In particular, the digital image 2206 portrays a relationship between the objects 2208*a*-2208*b* in that the object 2208*a* is holding the object 2208*b*.

In one or more embodiments, the scene-based image editing system 106 references the semantic scene graph previously generated for the digital image 2206 to identify the relationship between the objects 2208*a*-2208*b*. Indeed, as previously discussed, in some cases, the scene-based image editing system 106 includes relationships among the objects of a digital image in the semantic scene graph generated for the digital image. For instance, in one or more embodiments, the scene-based image editing system 106 utilizes a machine learning model, such as one of the models (e.g., the clustering and subgraph proposal generation model) discussed above with reference to FIG. 15, to determine the relationships between objects. Accordingly, the scene-based image editing system 106 includes the determined relationships within the representation of the digital image in the semantic scene graph. Further, the scene-based image editing system 106 determines the relationship between the objects 2208*a*-2208*b* for inclusion in the semantic scene graph before receiving user interactions to modify either one of the objects 2208*a*-2208*b*.

Indeed, FIG. 22A illustrates a semantic scene graph component 2210 from a semantic scene graph of the digital image 2206. In particular, the semantic scene graph component 2210 includes a node 2212*a* representing the object 2208*a* and a node 2212*b* representing the object 2208*b*. Further, the semantic scene graph component 2210 includes relationship indicators 2214*a*-2214*b* associated with the nodes 2212*a*-2212*b*. The relationship indicators 2214*a*-2214*b* indicate the relationship between the objects 2208*a*-2208*b* in that the object 2208*a* is holding the object 2208*b*, and the object 2208*b* is conversely being held by the object 2208*a*.

As further shown, the semantic scene graph component 2210 includes behavior indicators 2216*a*-2216*b* associated with the relationship indicator 2214*b*. The behavior indicators 2216*a*-2216*b* assign a behavior to the object 2208*b* based on its relationship with the object 2208*a*. For instance, the behavior indicator 2216*a* indicates that, because the object 2208*b* is held by the object 2208*a*, the object 2208*b* moves with the object 2208*a*. In other words, the behavior indicator 2216*a* instructs the scene-based image editing system 106 to move the object 2208*b* (or at least suggest that the object 2208*b* be moved) when moving the object 2208*a*. In one or more embodiments, the scene-based image editing system 106 includes the behavior indicators 2216*a*-2216*b* within the semantic scene graph based on the behavioral policy graph used in generating the semantic scene graph. Indeed, in some cases, the behaviors assigned to a "held by" relationship (or other relationships) vary based on the behavioral policy graph used. Thus, in one or more embodiments, the scene-based image editing system 106 refers to a previously generated semantic scene graph to identify relationships between objects and the behaviors assigned based on those relationships.

It should be noted that the semantic scene graph component 2210 indicates that the behaviors of the behavior indicators 2216*a*-2216*b* are assigned to the object 2208*b* but not the object 2208*a*. Indeed, in one or more, the scene-based image editing system 106 assigns behavior to an object based on its role in the relationship. For instance, while it may be appropriate to move a held object when the holding object is moved, the scene-based image editing system 106 determines that the holding object does not have to move when the held object is moved in some embodiments. Accordingly, in some implementations, the scene-based image editing system 106 assigns different behaviors to different objects in the same relationship.

Figure 22B:
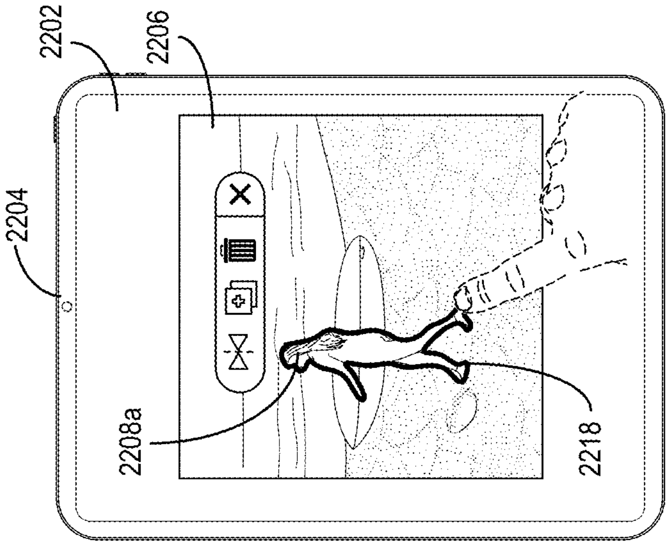

As shown in FIG. 22B, the scene-based image editing system 106 determines a user interaction selecting the object 2208*a*. For instance, the scene-based image editing system 106 determines that user interaction targets the object 2208*a* for modification. As further shown, the scene-based image editing system 106 provides a visual indication 2218 for display to indicate the selection of the object 2208*a*.

Figure 22C:
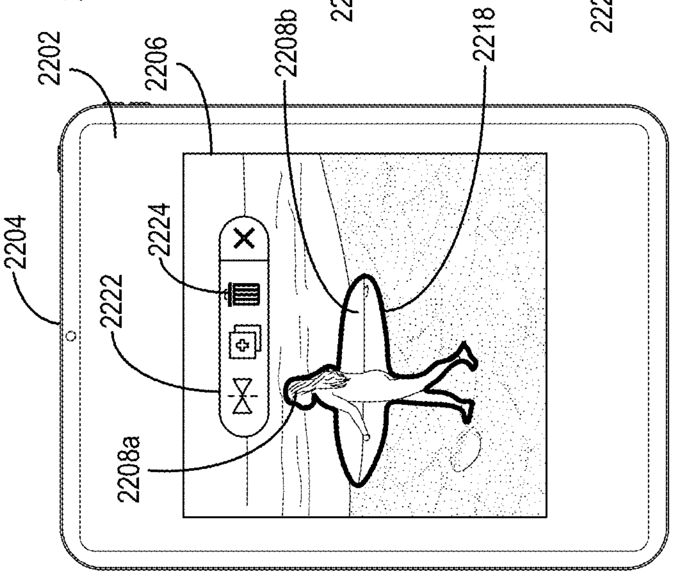

As illustrated by FIG. 22C, in response to detecting the user interaction selecting the object 2208*a*, the scene-based image editing system 106 automatically selects the object 2208*b*. For instance, in one or more embodiments, upon detecting the user interaction selecting the object 2208*a*, the scene-based image editing system 106 refers to the semantic scene graph generated for the digital image 2206 (e.g., the semantic scene graph component 2210 that corresponds to the object 2208*a*). Based on the information represented in the semantic scene graph, the scene-based image editing system 106 determines that there is another object in the digital image 2206 that has a relationship with the object 2208*a*. Indeed, the scene-based image editing system 106 determines that the object 2208*a* is holding the object 2208*b*. Conversely, the scene-based image editing system 106 determines that the object 2208*b* is held by the object 2208*a*.

Because the objects 2208*a*-2208*b* have a relationship, the scene-based image editing system 106 adds the object 2208*b* to the selection. As shown in FIG. 22C, the scene-based image editing system 106 modifies the visual indication 2218 of the selection to indicate that the object 2208*b* has been added to the selection. Though FIG. 22C illustrates an automatic selection of the object 2208*b*, in some cases, the scene-based image editing system 106 selects the object 2208*b* based on a behavior assigned to the object 2208*b* within the semantic scene graph in accordance with its relationship with the object 2208*a*. Indeed, in some cases, the scene-based image editing system 106 specifies when a relationship between objects leads to the automatic selection of one object upon the user selection of another object (e.g., via a "selects with" behavior). As shown in FIG. 22C, however, the scene-based image editing system 106 automatically selects the object 2208*b* by default in some instances.

In one or more embodiments, the scene-based image editing system 106 surfaces object masks for the object 2208*a* and the object 2208*b* based on their inclusion within the selection. Indeed, the scene-based image editing system 106 surfaces pre-generated object masks for the objects 2208*a*-2208*b* in anticipation of a modification to the objects 2208*a*-2208*b*. In some cases, the scene-based image editing system 106 retrieves the pre-generated object masks from the semantic scene graph for the digital image 2206 or retrieves a storage location for the pre-generated object masks. In either case, the object masks are readily available at the time the objects 2208*a*-2208*b* are included in the selection and before modification input has been received.

As further shown in FIG. 22C, the scene-based image editing system 106 provides an option menu 2222 for display within the graphical user interface 2202. In one or more embodiments, the scene-based image editing system 106 determines that at least one of the modification options from the option menu 222 would apply to both of the objects 2208*a*-2208*b* if selected. In particular, the scene-based image editing system 106 determines that, based on behavior assigned to the object 2208*b*, a modification selected for the object 2208*a* would also apply to the object 2208*b*.

Indeed, in one or more embodiments, in addition to determining the relationship between the objects 2208*a*-2208*b*, the scene-based image editing system 106 references the semantic scene graph for the digital image 2206 to determine the behaviors that have been assigned based on that relationship. In particular, the scene-based image editing system 106 references the behavior indicators associated with the relationship between the objects 2208*a*-2208*b* (e.g., the behavior indicators 2216*a*-2216*b*) to determine which behaviors are assigned to the objects 2208*a*-2208*b* based on their relationship. Thus, by determining the behaviors assigned to the object 2208*b*, the scene-based image editing system 106 determines how to respond to potential edits.

Figure 22D:
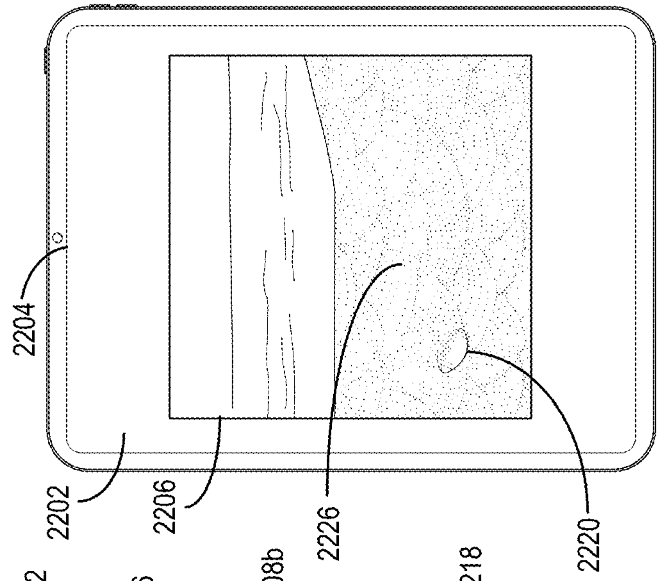

For instance, as shown in FIG. 22D, the scene-based image editing system 106 deletes the objects 2208*a*-2208*b* together. For instance, in some cases, the scene-based image editing system 106 deletes the objects 2208*a*-2208*b* in response to detecting a selection of the option 2224 presented within the option menu 2222. Accordingly, while the object 2208*a* was targeted for deletion via user interactions, the scene-based image editing system 106 includes the object 2208*b* in the deletion operation based on the behavior assigned to the object 2208*b* via the semantic scene graph (i.e., the "deletes with" behavior). Thus, in some embodiments, the scene-based image editing system 106 implements relationship-aware object modifications by deleting objects based on their relationships to other objects.

As previously suggested, in some implementations, the scene-based image editing system 106 only adds an object to a selection if its assigned behavior specifies that it should be selected with another object. At least, in some cases, the scene-based image editing system 106 only adds the object before receiving any modification input if its assigned behavior specifies that it should be selected with another object. Indeed, in some instances, only a subset of potential edits to a first object are applicable to a second object based on the behaviors assigned to that second object. Thus, including the second object in the selection of the first object before receiving modification input risks violating the rules set forth by the behavioral policy graph via the semantic scene graph if there is not a behavior providing for automatic selection. To avoid this risk, in some implementations, the scene-based image editing system 106 waits until modification input has been received before determining whether to add the second object to the selection. In one or more embodiments, however—as suggested by FIGS. 22A-22D—the scene-based image editing system 106 automatically adds the second object upon detecting a selection of the first object. In such embodiments, the scene-based image editing system 106 deselects the second object upon determining that a modification to the first object does not apply to the second object based on the behaviors assigned to the second object.

As further shown in FIG. 22D, the object 2220 remains in the digital image 2206. Indeed, the scene-based image editing system 106 did not add the object 2220 to the selection in response to the user interaction with the object 2208*a*, nor did it delete the object 2220 along with the objects 2208*a*-2208*b*. For instance, upon referencing the semantic scene graph for the digital image 2206, the scene-based image editing system 106 determines that there is not a relationship between the object 2220 and either of the objects 2208*a*-2208*b* (at least, there is not a relationship that applies in this scenario). Thus, the scene-based image editing system 106 enables user interactions to modify related objects together while preventing unrelated objects from being modified without more targeted user interactions.

Additionally, as shown in FIG. 22D, the scene-based image editing system 106 reveals content fill 2226 within the digital image 2206 upon removing the objects 2208*a*-2208*b*. In particular, upon deleting the objects 2208*a*-2208*b*, the scene-based image editing system 106 exposes a content fill previously generated for the object 2208*a* as well as a content fill previously generated for the object 2208*b*. Thus, the scene-based image editing system 106 facilitates seamless modification of the digital image 2206 as if it were a real scene.

Figure 23C:
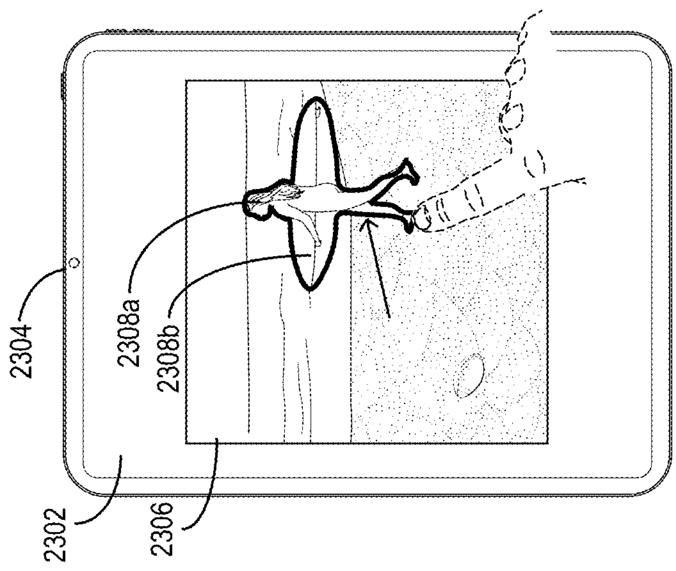
FIGS. 23A-23C illustrate another graphical user interface implemented by the scene-based image editing system to facilitate a relationship-aware object modification in accordance with one or more embodiments.
Figure 23B:
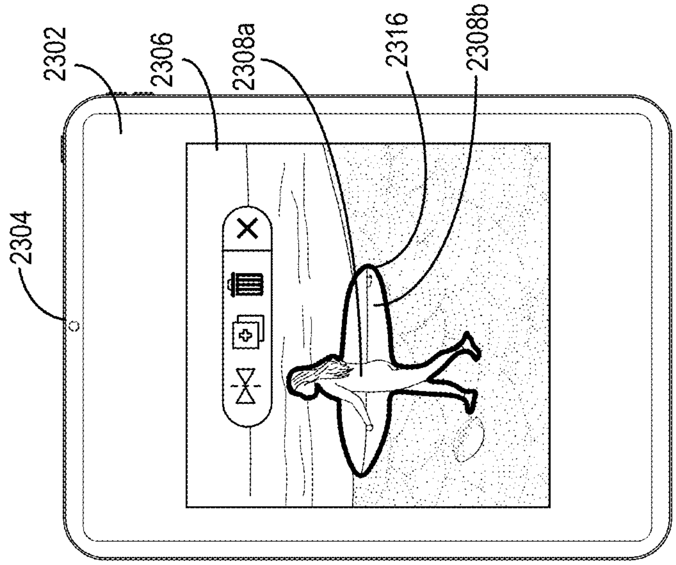
Figure 23A:
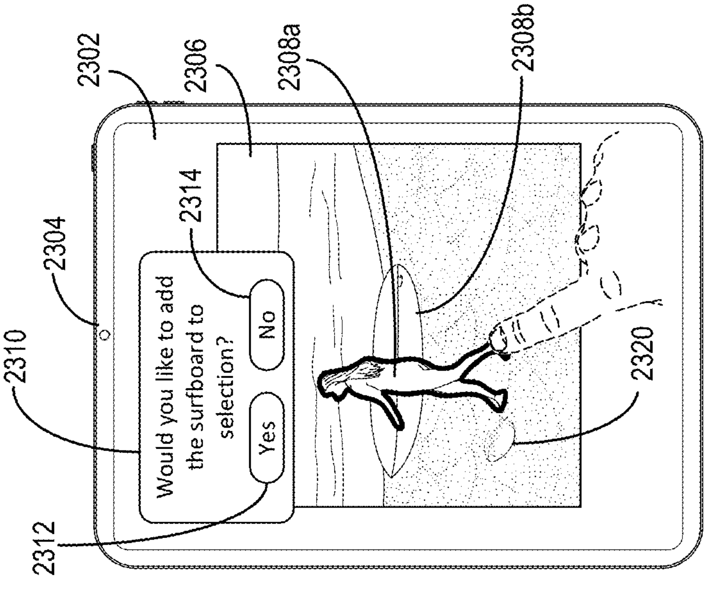

FIGS. 23A-23C illustrate another graphical user interface implemented by the scene-based image editing system 106 to facilitate a relationship-aware object modification in accordance with one or more embodiments. Indeed, as shown in FIG. 23A, the scene-based image editing system 106 provides, for display within a graphical user interface 2302 of a client device 2304, a digital image 2306 that portrays objects 2308a-2308b and object 2320. In particular, the digital image 2306 portrays a relationship between the objects 2308a-2308b in that the object 2308a is holding the object 2308b.

As further shown in FIG. 23A, the scene-based image editing system 106 detects a user interaction selecting the object 2308a. In response to detecting the user interaction, the scene-based image editing system 106 provides a suggestion that the object 2308b be added to the selection. In particular, the scene-based image editing system 106 provides a text box 2310 asking if the user wants the object 2308b to be added to the selection and provides an option 2312 for agreeing to add the object 2308b and an option 2314 for declining to add the object 2308b.

In one or more embodiments, the scene-based image editing system 106 provides the suggestion for adding the object 2308b to the selection based on determining the relationship between the objects 2308a-2308b via the semantic scene graph generated for the digital image 2306. In some cases, the scene-based image editing system 106 further provides the suggestion for adding the object 2308b based on the behaviors assigned to the object 2308b based on that relationship.

As suggested by FIG. 23A, the scene-based image editing system 106 does not suggest adding the object 2320 to the selection. Indeed, in one or more embodiments, based on referencing the semantic scene graph, the scene-based image editing system 106 determines that there is no relationship between the object 2320 and either of the objects 2308a-2308b (at least, that there is not a relevant relationship). Accordingly, the scene-based image editing system 106 determines to omit the object 2320 from the suggestion.

As shown in FIG. 23B, the scene-based image editing system 106 adds the object 2308b to the selection. In particular, in response to receiving a user interaction with the option 2312 for agreeing to add the object 2308b, the scene-based image editing system 106 adds the object 2308b to the selection. As shown in FIG. 23B, the scene-based image editing system 106 modifies a visual indication 2316 of the selection to indicate that the object 2308b has been added to the selection along with the object 2308a.

As illustrated in FIG. 23C, the scene-based image editing system 106 modifies the digital image 2306 by moving the object 2308a within the digital image 2306 in response to detecting one or more additional user interactions. Further, the scene-based image editing system 106 moves the object 2308b along with the object 2308a based on the inclusion of the object 2308b in the selection. Accordingly, the scene-based image editing system 106 implements a relationship-aware object modification by moving objects based on their relationship to other objects.

Figure 24C:
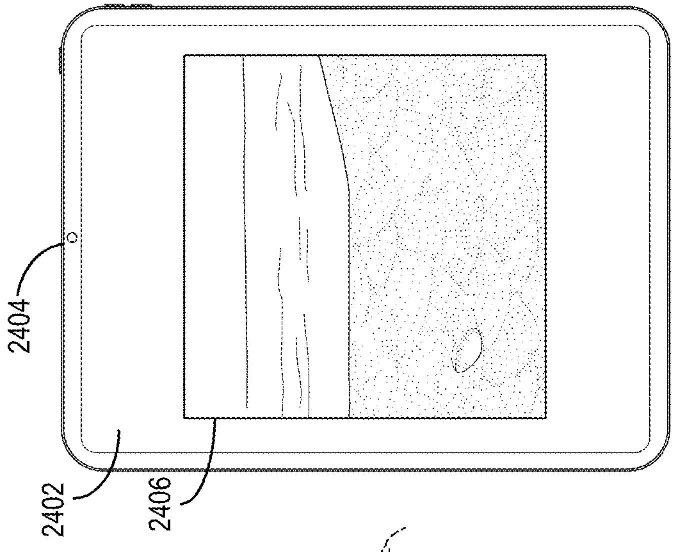
FIGS. 24A-24C illustrate yet another graphical user interface implemented by the scene-based image editing system to facilitate a relationship-aware object modification in accordance with one or more embodiments.
Figure 24B:
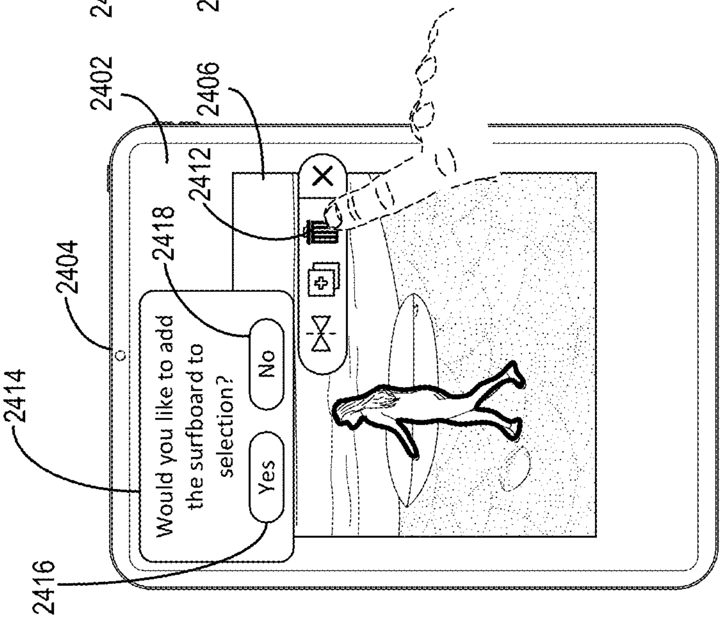
Figure 24A:
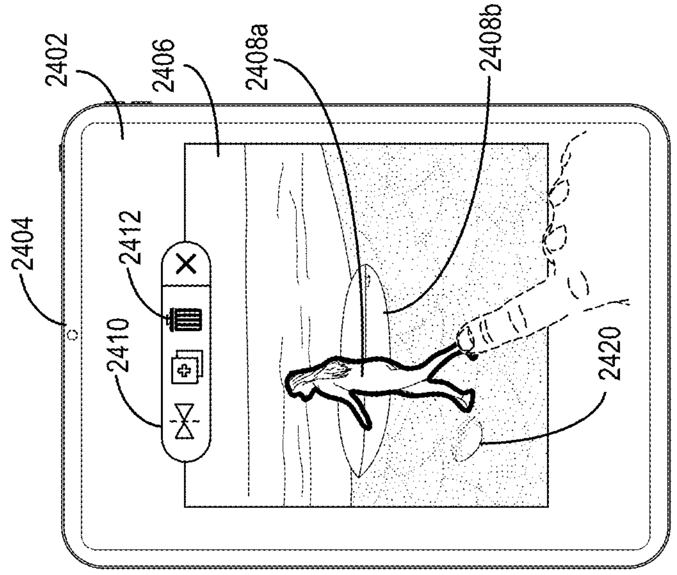

FIGS. 24A-24C illustrate yet another graphical user interface implemented by the scene-based image editing system 106 to facilitate a relationship-aware object modification in accordance with one or more embodiments. Indeed, as shown in FIG. 24A, the scene-based image editing system 106 provides, for display within a graphical user interface 2402 of a client device 2404, a digital image 2406 that portrays objects 2408a-2408b and an object 2420. In particular, the digital image 2406 portrays a relationship between the objects 2408a-2408b in that the object 2408a is holding the object 2408b.

As shown in FIG. 24A, the scene-based image editing system 106 detects a user interaction with the object 2408a. In response to detecting the user interaction, the scene-based image editing system 106 provides an option menu 2410 for display within the graphical user interface 2402. As illustrated, the option menu 2410 includes an option 2412 for deleting the object 2408a.

As shown in FIG. 24B, the scene-based image editing system 106 detects an additional user interaction with the option 2412 for deleting the object 2408a. In response to detecting the additional user interaction, the scene-based image editing system 106 provides, for display, a suggestion for adding the object 2408b to the selection via a text box 2414 asking if the user wants the object 2408b to be added to the selection, an option 2416 for agreeing to add the object 2408b, and an option 2418 for declining to add the object 2308b.

Indeed, as mentioned above, in one or more embodiments, the scene-based image editing system 106 waits upon receiving input to modify a first object before suggesting adding a second object (or automatically adding the second object). Accordingly, the scene-based image editing system 106 determines whether a relationship between the objects and the pending modification indicate that the second object should be added before including the second object in the selection.

To illustrate, in one or more embodiments, upon detecting the additional user interaction with the option 2412, the scene-based image editing system 106 references the semantic scene graph for the digital image 2406. Upon referencing the semantic scene graph, the scene-based image editing system 106 determines that the object 2408a has a relationship with the object 2408b. Further, the scene-based image editing system 106 determines that the behaviors assigned to the object 2408b based on that relationship indicate that the object 2408b should be deleted with the object 2408a. Accordingly, upon receiving the additional user interaction for deleting the object 2408a, the scene-based image editing system 106 determines that the object 2408b should also be deleted and then provides the suggestion to add the object 2408b (or automatically adds the object 2408b) to the selection.

As shown in FIG. 24C, the scene-based image editing system 106 deletes the object 2408a and the object 2408b from the digital image 2406 together. In particular, in response to detecting a user interaction with the option 2416 for adding the object 2408b to the selection, the scene-based image editing system 106 adds the object 2408b and executes the delete operation. In one or more embodiments, upon detecting a user interaction with the option 2418 to decline adding the object 2408b, the scene-based image editing system 106 omits the object 2408b from the selection and only deletes the object 2408a.

Though the above specifically discusses moving objects or deleting objects based on their relationships with other objects, it should be noted that the scene-based image editing system 106 implements various other types of relationship-aware object modifications in various embodiments. For example, in some cases, the scene-based image editing system 106 implements relationship-aware object modifications via resizing modifications, recoloring or retexturing modifications, or compositions. Further, as previously suggested, the behavioral policy graph utilized by the scene-based image editing system 106 is configurable in some embodiments. Thus, in some implementations, the relationship-aware object modifications implemented by the scene-based image editing system 106 change based on user preferences.

In one or more embodiments, in addition to modifying objects based on relationships as described within a behavioral policy graph that is incorporated into a semantic scene graph, the scene-based image editing system 106 modifies objects based on classification relationships. In particular, in some embodiments, the scene-based image editing system 106 modifies objects based on relationships as described by a real-world class description graph that is incorporated into a semantic scene graph. Indeed, as previously discussed, a real-world class description graph provides a hierarchy of object classifications for objects that may be portrayed in a digital image. Accordingly, in some implementations, the scene-based image editing system 106 modifies objects within digital images based on their relationship with other objects via their respective hierarchy of object classifications. For instance, in one or more embodiments, the scene-based image editing system 106 adds objects to a selection for modification based on their relationships with other objects via their respective hierarchy of object classifications. FIGS. 25A-25D illustrate a graphical user interface implemented by the scene-based image editing system 106 to add objects to a selection for modification based on classification relationships in accordance with one or more embodiments.

Figure 25A:
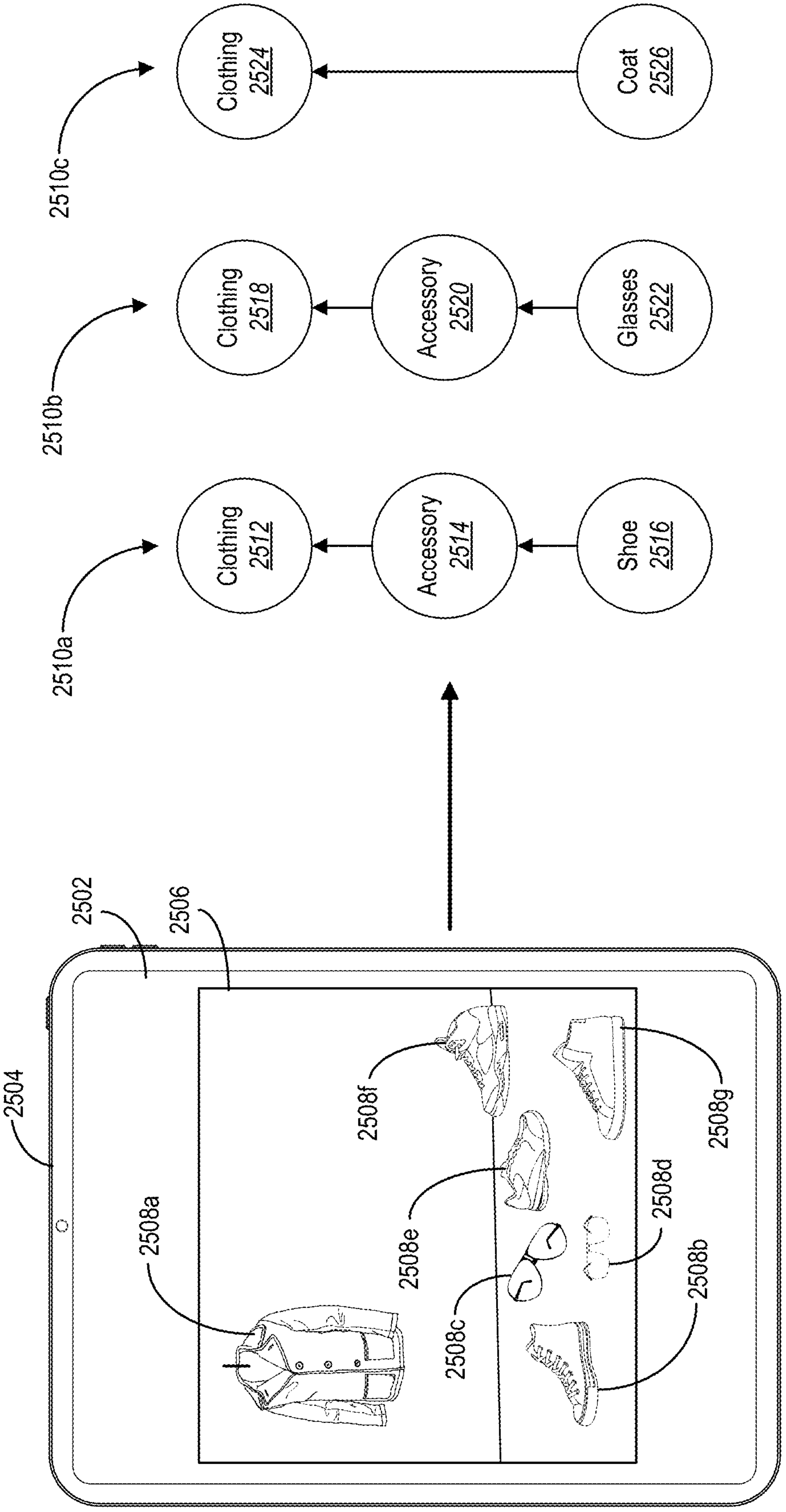
FIGS. 25A-25D illustrate a graphical user interface implemented by the scene-based image editing system to add objects to a selection for modification based on classification relationships in accordance with one or more embodiments.

In particular, FIG. 25A illustrates the scene-based image editing system 106 providing, for display in a graphical user interface 2502 of a client device 2504, a digital image 2506 portraying a plurality of objects 2508*a*-2508*g*. In particular, as shown the objects 2508*a*-2508*g* include various items, such as shoes, pairs of glasses, and a coat.

FIG. 25A further illustrates semantic scene graph components 2510*a*-2510*c* from a semantic scene graph of the digital image 2506. Indeed, the semantic scene graph components 2510*a*-2510*c* include portions of a semantic scene graph providing a hierarchy of object classifications for each of the objects 2508*a*-2508*g*. Alternatively, in some cases, the semantic scene graph components 2510*a*-2510*c* represent portions of the real-world class description graph used in making the semantic scene graph.

As shown in FIG. 25A, the semantic scene graph component 2510*a* includes a node 2512 representing a clothing class, a node 2514 representing an accessory class, and a node 2516 representing a shoe class. As further shown, the accessory class is a subclass of the clothing class, and the shoe class is a subclass of the accessory class. Similarly, the semantic scene graph component 2510*b* includes a node 2518 representing the clothing class, a node 2520 representing the accessory class, and a node 2522 representing a glasses class, which is a subclass of the accessory class. Further, the semantic scene graph component 2510*c* includes a node 2524 representing the clothing class and a node 2526 representing a coat class, which is another subclass of the clothing class. Thus, the semantic scene graph components 2510*a*-2510*c* provide various classifications that apply to each of the objects 2508*a*-2508*g*. In particular, the semantic scene graph component 2510*a* provides a hierarchy of object classifications associated with the shoes presented in the digital image 2506, the semantic scene graph component 2510*b* provides a hierarchy of object classifications associated with the pairs of glasses, and the semantic scene graph component 2510*c* provides a hierarchy of object classifications associated with the coat.

Figure 25C:
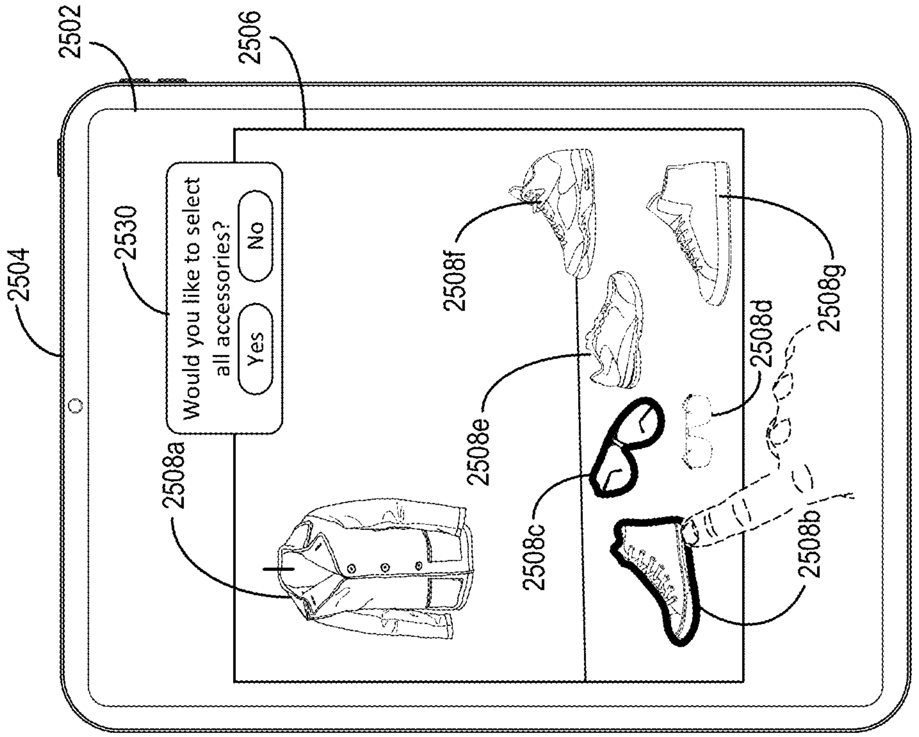
Figure 25B:
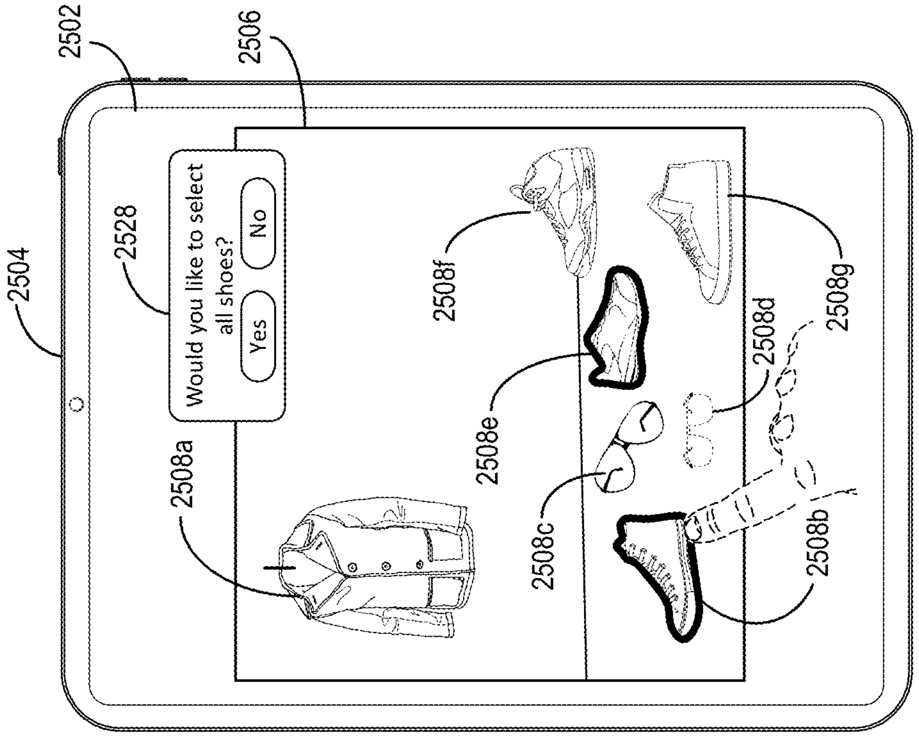

As shown in FIG. 25B, the scene-based image editing system 106 detects a user interaction selecting the object 2508*e*. Further, the scene-based image editing system 106 detects a user interaction selecting the object 2508*b*. As further shown, in response to detecting the selection of the object 2508*b* and the object 2508*e*, the scene-based image editing system 106 provides a text box 2528 suggesting all shoes in the digital image 2506 be added to the selection.

To illustrate, in some embodiments, in response to detecting the selection of the object 2508*b* and the object 2508*e*, the scene-based image editing system 106 references the semantic scene graph generated for the digital image 2506 (e.g., the semantic scene graph components that are associated with the object 2508*b* and the object 2508*e*). Based on referencing the semantic scene graph, the scene-based image editing system 106 determines that the object 2508*b* and the object 2508*e* are both part of the shoe class. Thus, the scene-based image editing system 106 determines that there is a classification relationship between the object 2508*b* and the object 2508*e* via the shoe class. In one or more embodiments, based on determining that the object 2508*b* and the object 2508*e* are both part of the shoe class, the scene-based image editing system 106 determines that the user interactions providing the selections are targeting all shoes within the digital image 2506. Thus, the scene-based image editing system 106 provides the text box 2528 suggesting adding the other shoes to the selection. In one or more embodiments, upon receiving a user interaction accepting the suggestion, the scene-based image editing system 106 adds the other shoes to the selection.

Similarly, as shown in FIG. 25C, the scene-based image editing system 106 detects a user interaction selecting the object 2508*c* and another user interaction selecting the object 2508*b*. In response to detecting the user interactions, the scene-based image editing system 106 references the semantic scene graph generated for the digital image 2506. Based on referencing the semantic scene graph, the scene-based image editing system 106 determines that the object 2508*b* is part of the shoe class, which is a subclass of the accessory class. In other words, the scene-based image editing system 106 determines that the object 2508*b* is part of the accessory class. Likewise, the scene-based image editing system 106 determines that the object 2508*c* is part of the glasses class, which is a subclass of the accessory class. Thus, the scene-based image editing system 106 determines that there is a classification relationship between the object 2508*b* and the object 2508*c* via the accessory class. As shown in FIG. 25C, based on determining that the object 2508*b* and the object 2508*c* are both part of the accessory class, the scene-based image editing system 106 provides a text box 2530 suggesting adding all other accessories portrayed in the digital image 2506 (e.g., the other shoes and pairs of glasses) to the selection.

Figure 25D:
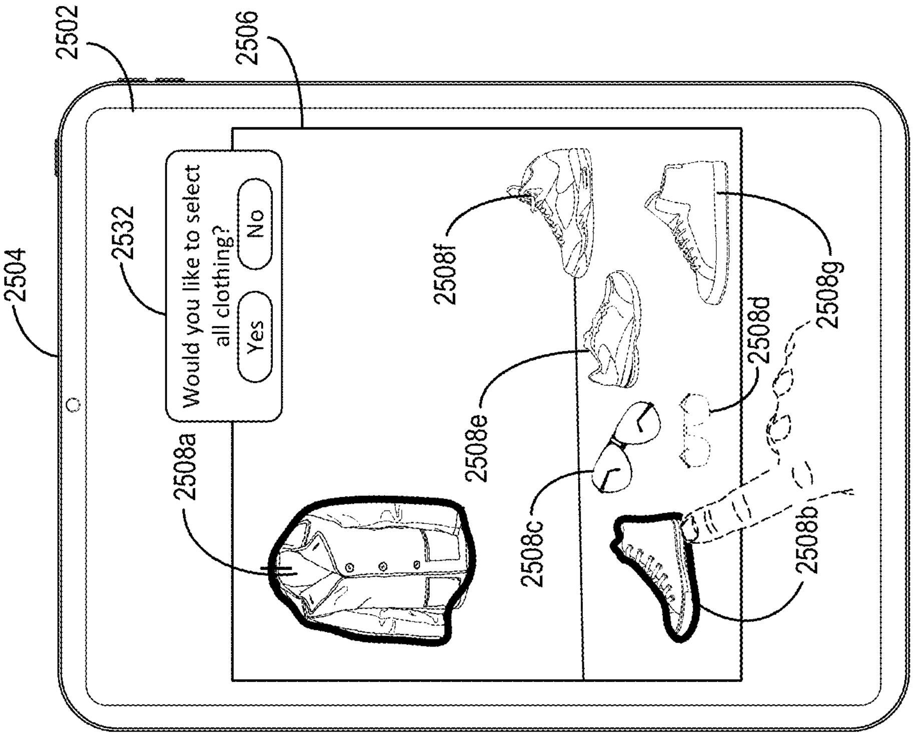

Further, as shown in FIG. 25D, the scene-based image editing system 106 detects a user interaction selecting the object 2508*a* and another user interaction selecting the object 2508*b*. In response to detecting the user interactions, the scene-based image editing system 106 references the semantic scene graph generated for the digital image 2506. Based on referencing the semantic scene graph, the scene-based image editing system 106 determines that the object 2508*b* is part of the shoe class, which is a subclass of the accessory class that is a subclass of the clothing class. Similarly, the scene-based image editing system 106 determines that the object 2508*a* is part of the coat class, which is also a subclass of the clothing class. Thus, the scene-based image editing system 106 determines that there is a classification relationship between the object 2508*b* and the object 2508*a* via the clothing class. As shown in FIG. 25D, based on determining that the object 2508*b* and the object 2508*a* are both part of the clothing class, the scene-based image editing system 106 provides a text box 2532 suggesting adding all other clothing items portrayed in the digital image 2506 to the selection.

Thus, in one or more embodiments, the scene-based image editing system 106 anticipates the objects that are targeted user interactions and facilitates quicker selection of those objects based on their classification relationships. In some embodiments, upon selection of multiple objects via provided suggestions, the scene-based image editing system 106 modifies the selected objects in response to additional user interactions. Indeed, the scene-based image editing system 106 modifies the selected objects together. Thus, the scene-based image editing system 106 implements a graphical user interface that provides a more flexible and efficient approach to selecting and modifying multiple related objects using reduced user interactions.

Indeed, as previously mentioned, the scene-based image editing system 106 provides improved flexibility and efficiency when compared to conventional systems. For instance, by selecting (e.g., automatically or via suggestion) objects based on the selection of related objects, the scene-based image editing system 106 provides a flexible method of targeting multiple objects for modification. Indeed, the scene-based image editing system 106 flexibly identifies the related objects and includes them with the selection. Accordingly, the scene-based image editing system 106 implements a graphical user interface that reduces user interactions typically required under conventional system for selecting and modifying multiple objects.

In one or more embodiments, the scene-based image editing system 106 further pre-processes a digital image to aid in the removal of distracting objects. In particular, the scene-based image editing system 106 utilizes machine learning to identify objects in a digital image, classify one or more of the objects as distracting objects, and facilitate the removal of the distracting objects to provide a resulting image that is more visually cohesive and aesthetically pleasing. Further, in some cases, the scene-based image editing system 106 utilizes machine learning to facilitate the removal of shadows associated with distracting objects. FIGS. 26-39C illustrate diagrams of the scene-based image editing system 106 identifying and removing distracting objects and their shadows from digital images in accordance with one or more embodiments.

Many conventional systems are inflexible in the methods they use for removing distracting human in that they strip control away from users. For instance, conventional systems often remove humans they have classified as distracting automatically. Thus, when a digital image is received, such systems fail to provide the opportunity for user interactions to provide input regarding the removal process. For example, these systems fail to allow user interactions to remove human from the set of humans identified for removal.

Additionally, conventional systems typically fail to flexibly remove all types of distracting objects. For instance, many conventional systems fail to flexibly remove shadows cast by distracting objects and non-human objects. Indeed, while some existing systems identify and remove distracting humans from a digital image, these systems often fail to identify shadows cast by humans or other objects within the digital image. Accordingly, the resulting digital image will still include the influence of a distracting human as its shadow remains despite the distracting human itself being removed. This further causes these conventional systems to require additional user interactions to identify and remove these shadows.

The scene-based image editing system 106 addresses these issues by providing more user control in the removal process while reducing the interactions typically required to delete an object from a digital image. Indeed, as will be explained below, the scene-based image editing system 106 presents identified distracting objects for display as a set of objects selected for removal. The scene-based image editing system 106 further enables user interactions to add objects to this set, remove objects from the set, and/or determine when the selected objects are deleted. Thus, the scene-based image editing system 106 employs a flexible workflow for removing distracting objects based on machine learning and user interactions.

Further, the scene-based image editing system 106 flexibly identifies and removes shadows associated with distracting objects within a digital image. By removing shadows associated with distracting objects, the scene-based image editing system 106 provides a better image result in that distracting objects and additional aspects of their influence within a digital image are removed. This allows for reduced user interaction when compared to conventional systems as the scene-based image editing system 106 does not require additional user interactions to identify and remove shadows.

Figure 26:
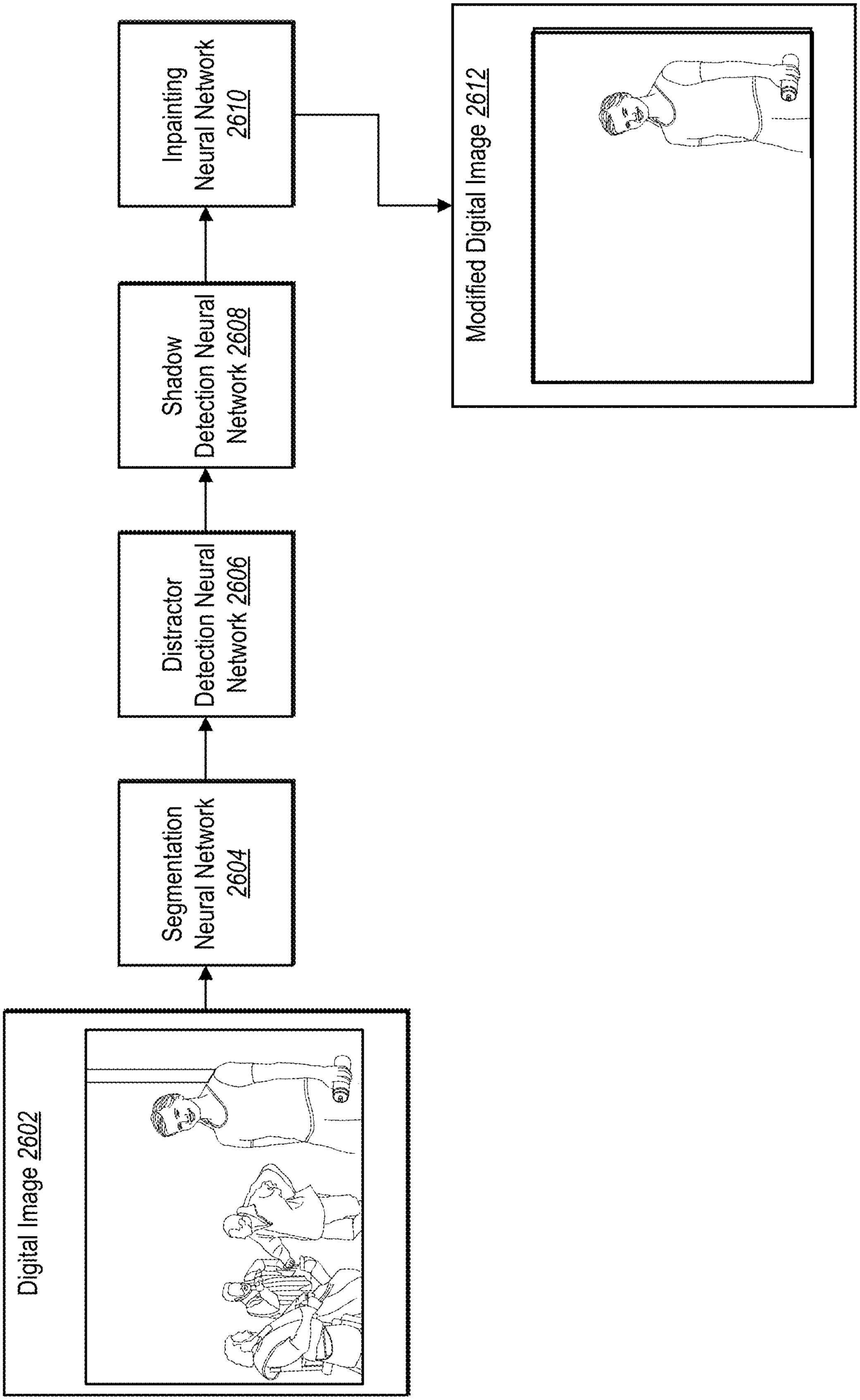
FIG. 26 illustrates a neural network pipeline utilized by the scene-based image editing system to identify and remove distracting objects from a digital image in accordance with one or more embodiments.

FIG. 26 illustrates a neural network pipeline utilized by the scene-based image editing system 106 to identify and remove distracting objects from a digital image in accordance with one or more embodiments. Indeed, as shown in FIG. 26, the scene-based image editing system 106 receives a digital image 2602 that portrays a plurality of objects. As illustrated, the scene-based image editing system 106 provides the digital image 2602 to a pipeline of neural networks comprising a segmentation neural network 2604, a distractor detection neural network 2606, a shadow detection neural network 2608, and an inpainting neural network 2610.

In one or more embodiments, the scene-based image editing system 106 utilizes, as the segmentation neural network 2604, one of the segmentation neural networks discussed above (e.g., the detection-masking neural network 300 discussed with reference to FIG. 3). In some embodiments, the scene-based image editing system 106 utilizes, as the inpainting neural network 2610, one of the content-aware machine learning models discussed above (e.g., the cascaded modulation inpainting neural network 420 discussed with reference to FIG. 4). The distractor detection neural network 2606 and the shadow detection neural network 2608 will be discussed in more detail below.

As shown in FIG. 26, the scene-based image editing system 106 utilizes the pipeline of neural networks to generate a modified digital image 2612 from the digital image 2602. In particular, the scene-based image editing system 106 utilizes the pipeline of neural networks to identify and remove distracting objects from the digital image 2602. In particular, the scene-based image editing system 106 generates an object mask for the objects in the digital image utilizing the segmentation neural network 2604. The scene-based image editing system 106 determines a classification for the objects of the plurality of objects utilizing the distractor detection neural network 2606. More specifically, the scene-based image editing system 106 assigns each object a classification of main subject object or distracting object. The scene-based image editing system 106 removes distracting objects from the digital image utilizing the object masks. Further, the scene-based image editing system 106 utilizes inpainting neural network 2610 to generate content fill for the portions of the digital image 2602 from which the distracting objects were removed to generate the modified digital image 2612. As shown, the scene-based image editing system 106 deletes a plurality of different types of distracting objects (multiple men and a pole). Indeed, the scene-based image editing system 106 is robust enough to identify non-human objects as distracting (e.g., the pole behind the girl).

In one or more embodiments, the scene-based image editing system 106 utilizes a subset of the neural networks shown in FIG. 26 to generate a modified digital image. For instance, in some cases, the scene-based image editing system 106 utilizes the segmentation neural network 2604, the distractor detection neural network 2606, and the content fill 210 to generate a modified digital image from a digital image. Further, in some cases, the scene-based image editing system 106 utilizes a different ordering of the neural networks than what is shown.

Figure 27:
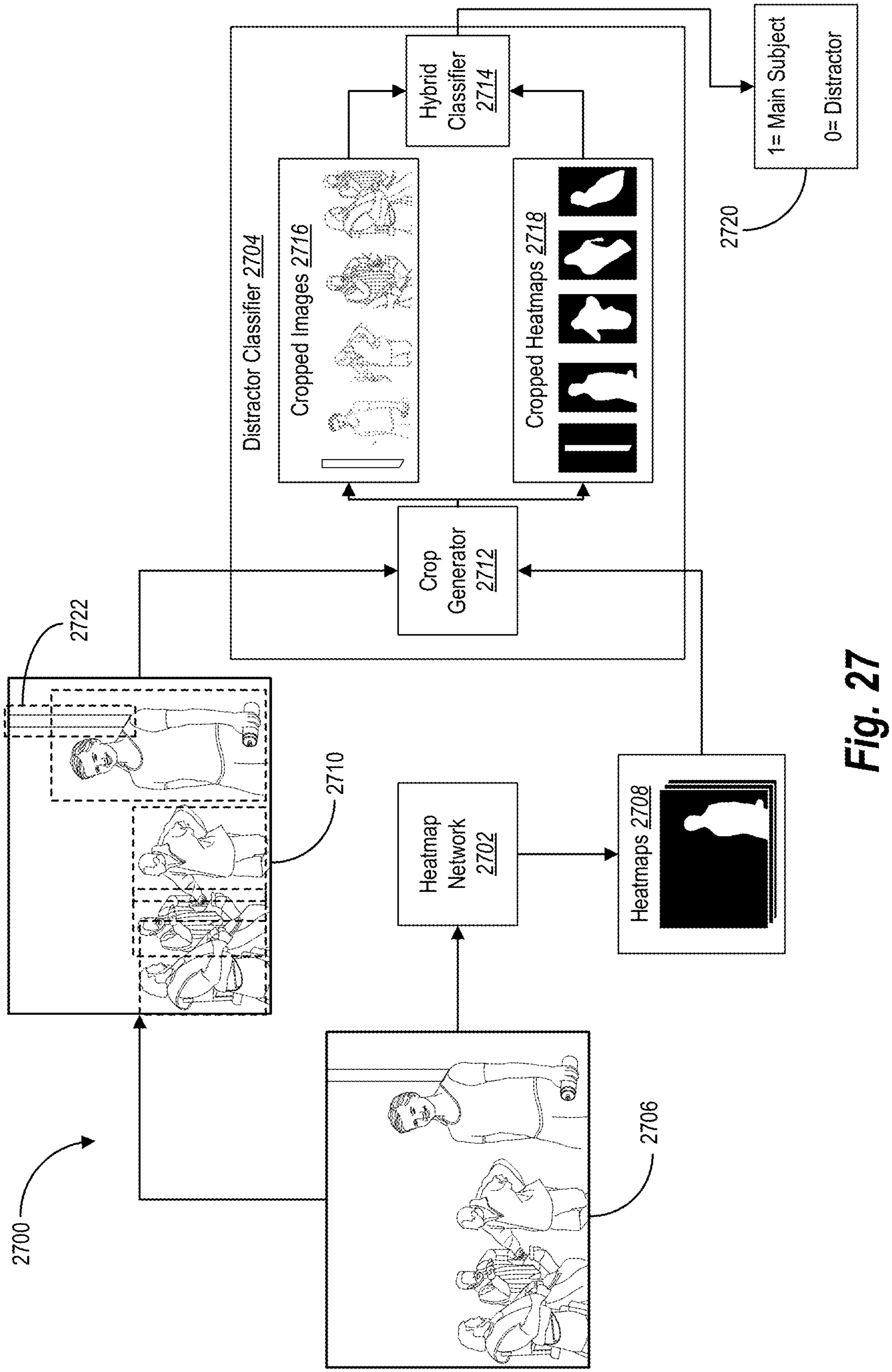
FIG. 27 illustrates an architecture of a distractor detection neural network utilized by the scene-based image editing system to identify and classify distracting objects in of a digital image in accordance with one or more embodiments.

FIG. 27 illustrates an architecture of a distractor detection neural network 2700 utilized by the scene-based image editing system 106 to identify and classify distracting objects in of a digital image in accordance with one or more embodiments. As shown in FIG. 27, the distractor detection neural network 2700 includes a heatmap network 2702 and a distractor classifier 2704.

As illustrated, the heatmap network 2702 operates on an input image 2706 to generate heatmaps 2708. For instance, in some cases, the heatmap network 2702 generates a main subject heatmap representing possible main subject objects and a distractor heatmap representing possible distracting objects. In one or more embodiments, a heatmap (also referred to as a class activation map) includes a prediction made by a convolutional neural network that indicates a probability value, on a scale of zero to one, that a specific pixel of an image belongs to a particular class from a set of classes. As opposed to object detection, the goal of a heatmap network is to classify individual pixels as being part of the same region in some instances. In some cases, a region includes an area of a digital image where all pixels are of the same color or brightness.

In at least one implementation, the scene-based image editing system 106 trains the heatmap network 2702 on whole images, including digital images where there are no distracting objects and digital images that portray main subject objects and distracting objects.

In one or more embodiments, the heatmap network 2702 identifies features in a digital image that contribute to a conclusion that that a given region is more likely to be a distracting object or more likely to be a main subject object, such as body posture and orientation. For instance, in some cases, the heatmap network 2702 determines that objects with slouching postures as opposed to standing at attention postures are likely distracting objects and also that objects facing away from the camera are likely to be distracting objects. In some cases, the heatmap network 2702 considers other features, such as size, intensity, color, etc.

In some embodiments, the heatmap network 2702 classifies regions of the input image 2706 as being a main subject or a distractor and outputs the heatmaps 2708 based on the classifications. For example, in some embodiments, the heatmap network 2702 represents any pixel determined to be part of a main subject object as white within the main subject heatmap and represents any pixel determined to not be part of a main subject object as black (or vice versa). Likewise, in some cases, the heatmap network 2702 represents any pixel determined to be part of a distracting object as white within the distractor heatmap while representing any pixel determined to not be part of a distracting object as black (or vice versa).

In some implementations, the heatmap network 2702 further generates a background heatmap representing a possible background as part of the heatmaps 2708. For instance, in some cases, the heatmap network 2702 determines that the background includes areas that are not part of a main subject object or a distracting object. In some cases, the heatmap network 2702 represents any pixel determined to be part of the background as white within the background heatmap while representing any pixel determined to not be part of the background as black (or vice versa).

In one or more embodiments, the distractor detection neural network 2700 utilizes the heatmaps 2708 output by the heatmap network 2702 as a prior to the distractor classifier 2704 to indicate a probability that a specific region of the input image 2706 contains a distracting object or a main subject object.

In one or more embodiments, the distractor detection neural network 2700 utilizes the distractor classifier 2704 to consider the global information included in the heatmaps 2708 and the local information included in one or more individual objects 2710. To illustrate, in some embodiments, the distractor classifier 2704 generates a score for the classification of an object. If an object in a digital image appears to be a main subject object based on the local information, but the heatmaps 2708 indicate with a high probability that the object is a distracting object, the distractor classifier 2704 concludes that the object is indeed a distracting object in some cases. On the other hand, if the heatmaps 2708 point toward the object being a main subject object, the distractor classifier 2704 determines that the object has been confirmed as a main subject object.

As shown in FIG. 27, the distractor classifier 2704 includes a crop generator 2712 and a hybrid classifier 2714. In one or more embodiments, the distractor classifier 2704 receives one or more individual objects 2710 that have been identified from the input image 2706. In some cases, the one or more individual objects 2710 are identified via user annotation or some object detection network (e.g., the object detection machine learning model 308 discussed above with reference to FIG. 3).

As illustrated by FIG. 27, the distractor classifier 2704 utilizes the crop generator 2712 to generate cropped images 2716 by cropping the input image 2706 based on the locations of the one or more individual objects 2710. For instance, where there are three object detections in the input image 2706, the crop generator 2712 generates three cropped images—one for each detected object. In one or more embodiments, the crop generator 2712 generates a cropped image by removing all pixels of the input image 2706 outside the location of the corresponding inferred bounding region.

As further shown, the distractor classifier 2704 also utilizes the crop generator 2712 to generate cropped heatmaps 2718 by cropping the heatmaps 2708 with respect to each detected object. For instance, in one or more embodiments, the crop generator 2712 generates—from each of the main subject heatmap, the distractor heatmap, and the background heatmap—one cropped heatmap for each of the detected objects based on a region within the heatmaps corresponding to the location of the detected objects.

In one or more embodiments, for each of the one or more individual objects 2710, the distractor classifier 2704 utilizes the hybrid classifier 2714 to operate on a corresponding cropped image (e.g., its features) and corresponding cropped heatmaps (e.g., their features) to determine whether the object is a main subject object or a distracting object. To illustrate, in some embodiments, for a detected object, the hybrid classifier 2714 performs an operation on the cropped image associated with the detected object and the cropped heatmaps associated with the detected object (e.g., the cropped heatmaps derived from the heatmaps 2708 based on a location of the detected object) to determine whether the detected object is a main subject object or a distracting object. In one or more embodiments, the distractor classifier 2704 combines the features of the cropped image for a detected object with the features of the corresponding cropped heatmaps (e.g., via concatenation or appending the features) and provides the combination to the hybrid classifier 2714. As shown in FIG. 27, the hybrid classifier 2714 generates, from its corresponding cropped image and cropped heatmaps, a binary decision 2720 including a label for a detected object as a main subject object or a distracting object.

Figure 28:
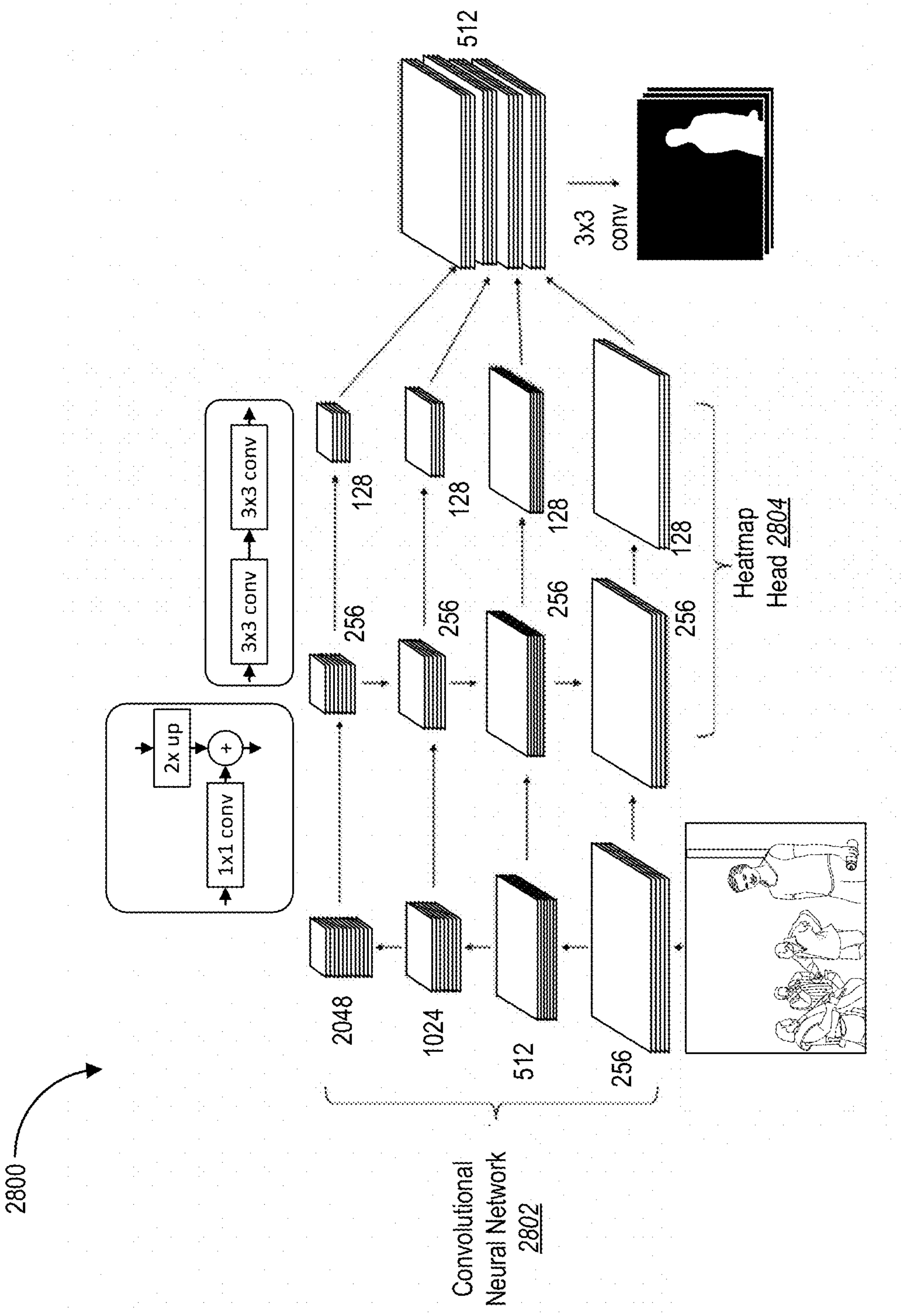
FIG. 28 illustrates an architecture of a heatmap network utilized by the scene-based image editing system as part of a distractor detection neural network in accordance with one or more embodiments.

FIG. 28 illustrates an architecture of a heatmap network 2800 utilized by the scene-based image editing system 106 as part of a distractor detection neural network in accordance with one or more embodiments. As shown in FIG. 28, the heatmap network 2800 includes a convolutional neural network 2802 as its encoder. In one or more embodiments, the convolutional neural network 2802 includes a deep residual network. As further shown in FIG. 28, the heatmap network 2800 includes a heatmap head 2804 as its decoder.

Figure 29:
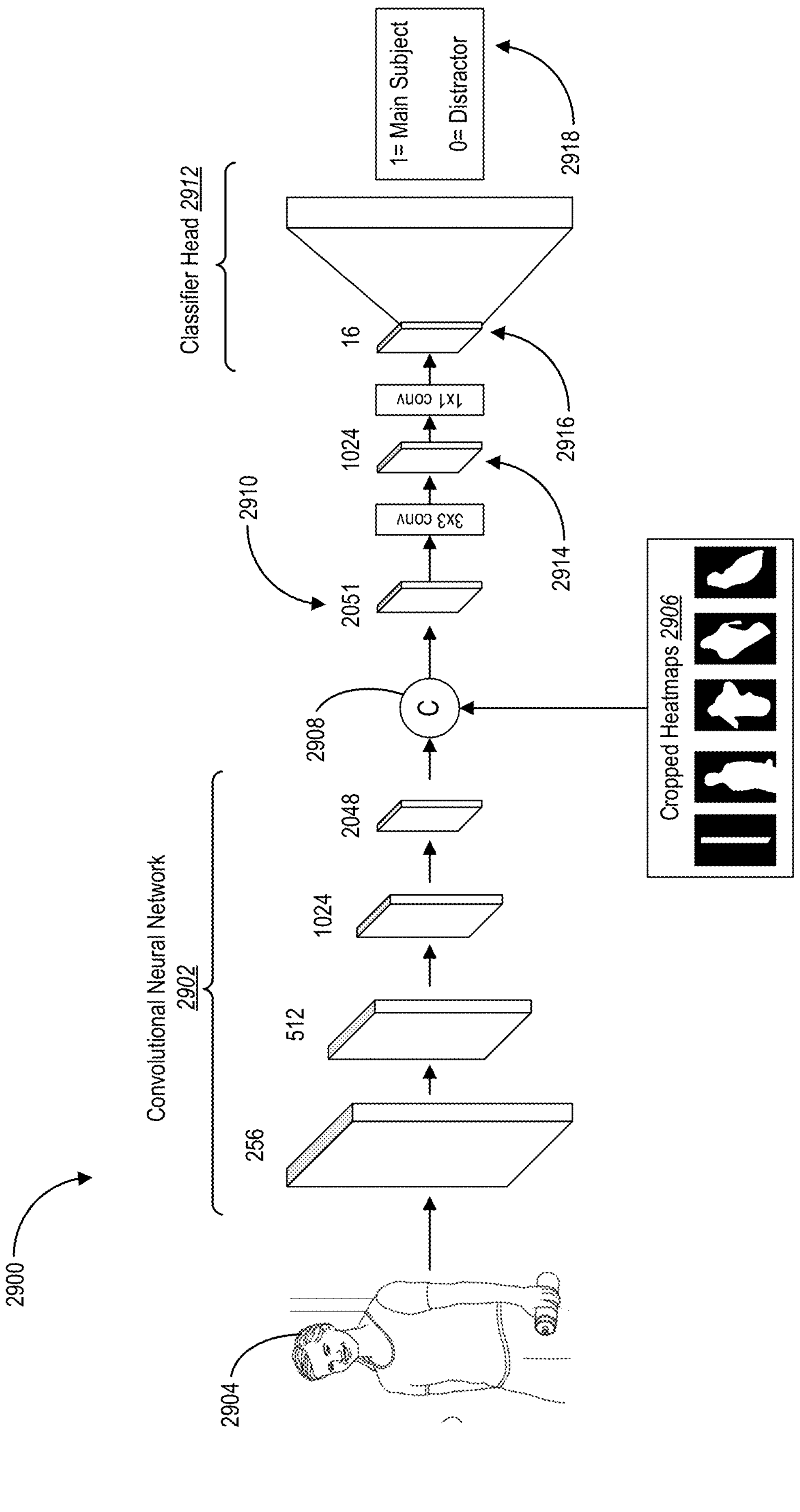
FIG. 29 illustrates an architecture of a hybrid classifier utilized by the scene-based image editing system as part of a distractor detection neural network in accordance with one or more embodiments.

FIG. 29 illustrates an architecture of a hybrid classifier 2900 utilized by the scene-based image editing system 106 as part of a distractor detection neural network in accordance with one or more embodiments. As shown in FIG. 29, the hybrid classifier 2900 includes a convolutional neural network 2902. In one or more embodiments, the hybrid classifier 2900 utilizes the convolutional neural network 2902 as an encoder.

To illustrate, in one or more embodiments, the scene-based image editing system 106 provides the features of a cropped image 2904 to the convolutional neural network 2902. Further, the scene-based image editing system 106 provides features of the cropped heatmaps 2906 corresponding to the object of the cropped image 2904 to an internal layer 2910 of the hybrid classifier 2900. In particular, as shown, in some cases, the scene-based image editing system 106 concatenates the features of the cropped heatmaps 2906 with the output of a prior internal layer (via the concatenation operation 2908) and provides the resulting feature map to the internal layer 2910 of the hybrid classifier 2900. In some embodiments, the feature map includes 2048+N channels, where N corresponds to the channels of the output of the heatmap network and 2048 corresponds to the channels of the output of the prior internal layer (though 2048 is an example).

As shown in FIG. 29, the hybrid classifier 2900 performs a convolution on the output of the internal layer 2910 to reduce the channel depth. Further, the hybrid classifier 2900 performs another convolution on the output of the subsequent internal layer 2914 to further reduce the channel depth. In some cases, the hybrid classifier 2900 applies a pooling to the output of the final internal layer 2916 before the binary classification head 2912. For instance, in some cases, the hybrid classifier 2900 averages the values of the final internal layer output to generate an average value. In some cases, where the average value is above the threshold, the hybrid classifier 2900 classifies the corresponding object as a distracting object and outputs a corresponding binary value; otherwise, the hybrid classifier 2900 classifies the corresponding object as a main subject object and outputs the corresponding binary value (or vice versa). Thus, the hybrid classifier 2900 provides an output 2918 containing a label for the corresponding object.

Figure 30B:
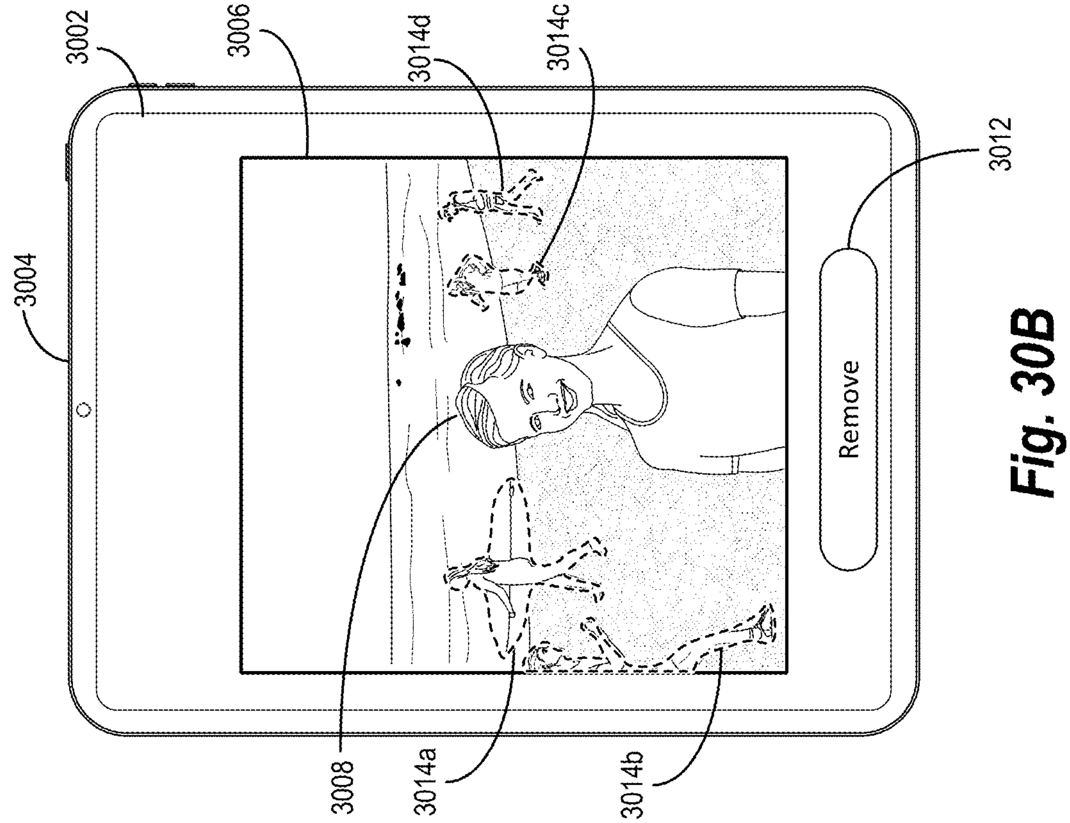
FIGS. 30A-30C illustrate a graphical user interface implemented by the scene-based image editing system to identify and remove distracting objects from a digital image in accordance with one or more embodiments.
Figure 30A:
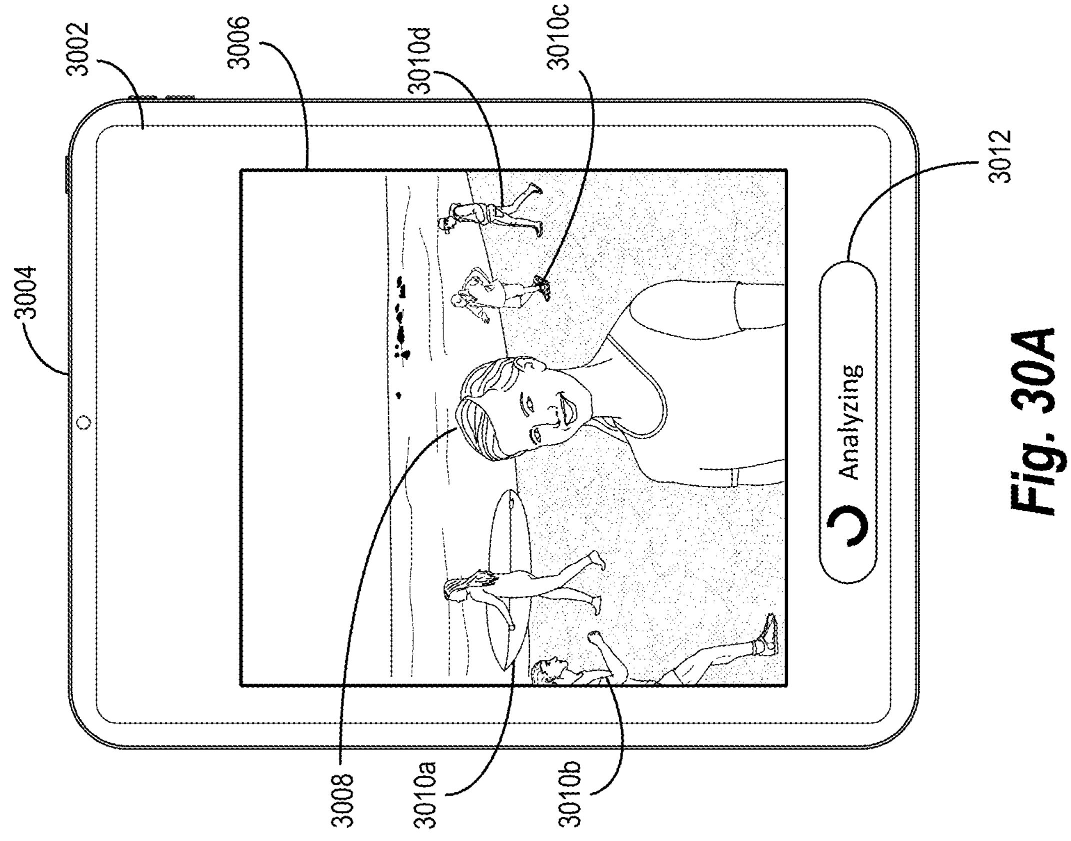
Figure 30C:
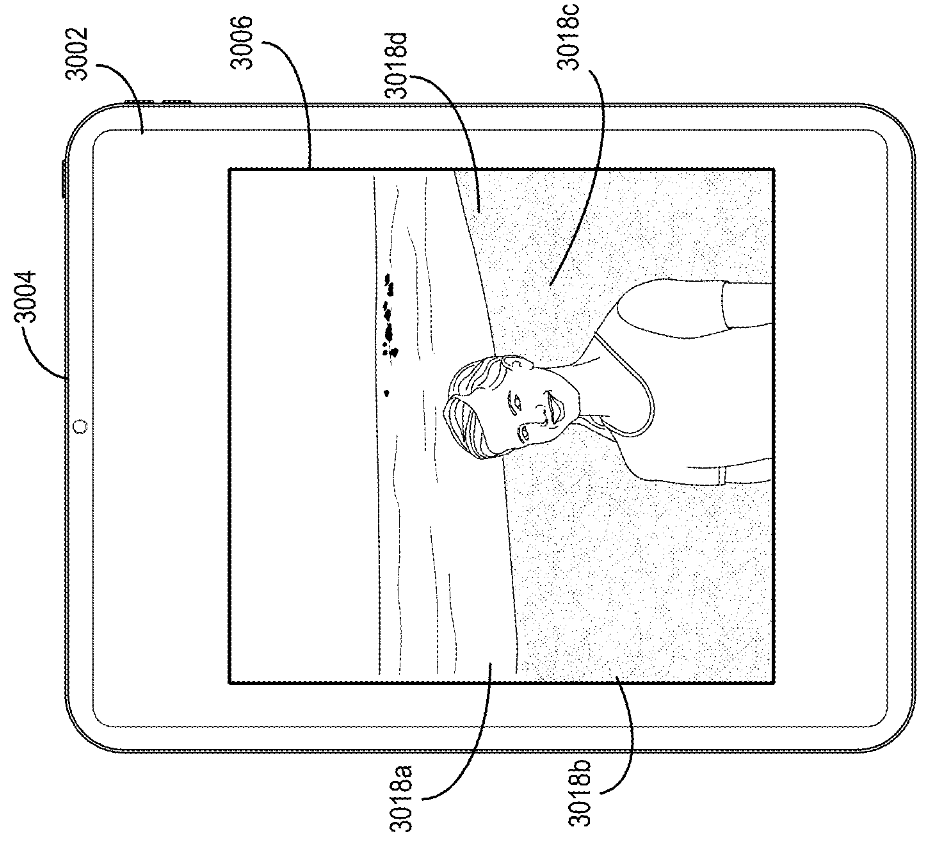

FIGS. 30A-30C illustrate a graphical user interface implemented by the scene-based image editing system 106 to identify and remove distracting objects from a digital image in accordance with one or more embodiments. For instance, as shown in FIG. 30A, the scene-based image editing system 106 provides a digital image 3006 for display within a graphical user interface 3002 of a client device 3004. As further shown, the digital image 3006 portrays an object 3008 and a plurality of additional objects 3010*a*-3010*d*.

Additionally, as shown in FIG. 30A, the scene-based image editing system 106 provides a progress indicator 3012 for display within the graphical user interface 3002. In some cases, the scene-based image editing system 106 provides the progress indicator 3012 to indicate that the digital image 3006 is being analyzed for distracting objects. For instance, in some embodiments, the scene-based image editing system 106 provides the progress indicator 3012 while utilizing a distractor detection neural network to identify and classify distracting objects within the digital image 3006. In one or more embodiments, the scene-based image editing system 106 automatically implements the distractor detection neural network upon receiving the digital image 3006 and before receiving user input for modifying one or more of the objects 3010*a*-3010*d*. In some implementations, however, the scene-based image editing system 106 waits upon receiving user input before analyzing the digital image 3006 for distracting objects.

As shown in FIG. 30B, the scene-based image editing system 106 provides visual indicators 3014*a*-3014*d* for display within the graphical user interface 3002 upon completing the analysis. In particular, the scene-based image editing system 106 provides the visual indicators 3014*a*-3014*d* to indicate that the objects 3010*a*-3010*d* have been classified as distracting objects.

In one or more embodiments, the scene-based image editing system 106 further provides the visual indicators 3014*a*-3014*d* to indicate that the objects 3010*a*-3010*d* have been selected for deletion. In some instances, the scene-based image editing system 106 also surfaces the pre-generated object masks for the objects 3010*a*-3010*d* in preparation of deleting the objects. Indeed, as has been discussed, the scene-based image editing system 106 pre-generates object masks and content fills for the objects of a digital image (e.g., utilizing the segmentation neural network 2604 and the inpainting neural network 2610 referenced above). Accordingly, the scene-based image editing system 106 has the object masks and content fills readily available for modifying the objects 3010*a*-3010*d*.

In one or more embodiments, the scene-based image editing system 106 enables user interactions to add to or remove from the selection of the objects for deletion. For instance, in some embodiments, upon detecting a user interaction with the object 3010*a*, the scene-based image editing system 106 determines to omit the object 3010*a* from the deletion operation. Further, the scene-based image editing system 106 removes the visual indication 3014*a* from the display of the graphical user interface 3002. On the other hand, in some implementations, the scene-based image editing system 106 detects a user interaction with the object 3008 and determines to include the object 3008 in the deletion operation in response. Further, in some cases, the scene-based image editing system 106 provides a visual indication for the object 3008 for display and/or surfaces a pre-generated object mask for the object 3008 in preparation for the deletion.

As further shown in FIG. 30B, the scene-based image editing system 106 provides a removal option 3016 for display within the graphical user interface 3002. In one or more embodiments, in response to detecting a user interaction with the removal option 3016, the scene-based image editing system 106 removes the objects that have been selected for deletion (e.g., the objects 3010*a*-3010*d* that had been classified as distracting objects). Indeed, as shown in FIG. 30C, the scene-based image editing system 106 removes the objects 3010*a*-3010*d* from the digital image 3006. Further, as shown in 30C, upon removing the objects 3010*a*-3010*d*, the scene-based image editing system 106 reveals content fills 3018*a*-3018*d* that were previously generated.

By enabling user interactions to control which objects are included in the deletion operation and to further choose when the selected objects are removed, the scene-based image editing system 106 provides more flexibility. Indeed, while conventional systems typically delete distracting objects automatically without user input, the scene-based image editing system 106 allows for the deletion of distracting objects in accordance with user preferences expressed via the user interactions. Thus, the scene-based image editing system 106 flexibly allow for control of the removal process via the user interactions.

Figure 31B:
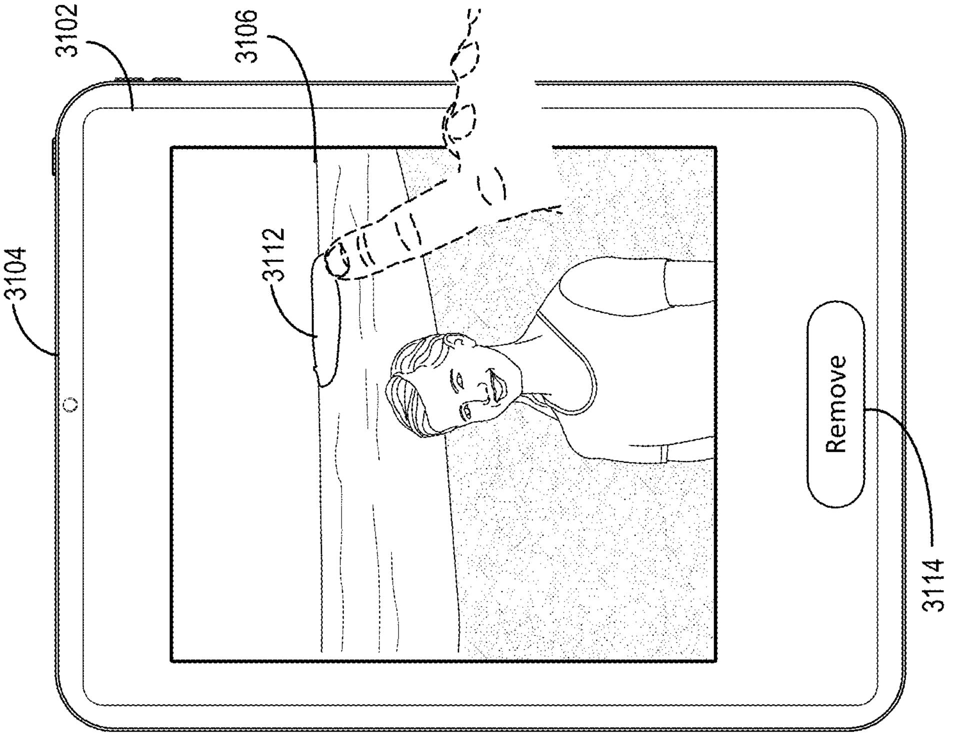
FIGS. 31A-31C illustrate another graphical user interface implemented by the scene-based image editing system to identify and remove distracting objects from a digital image in accordance with one or more embodiments.
Figure 31A:
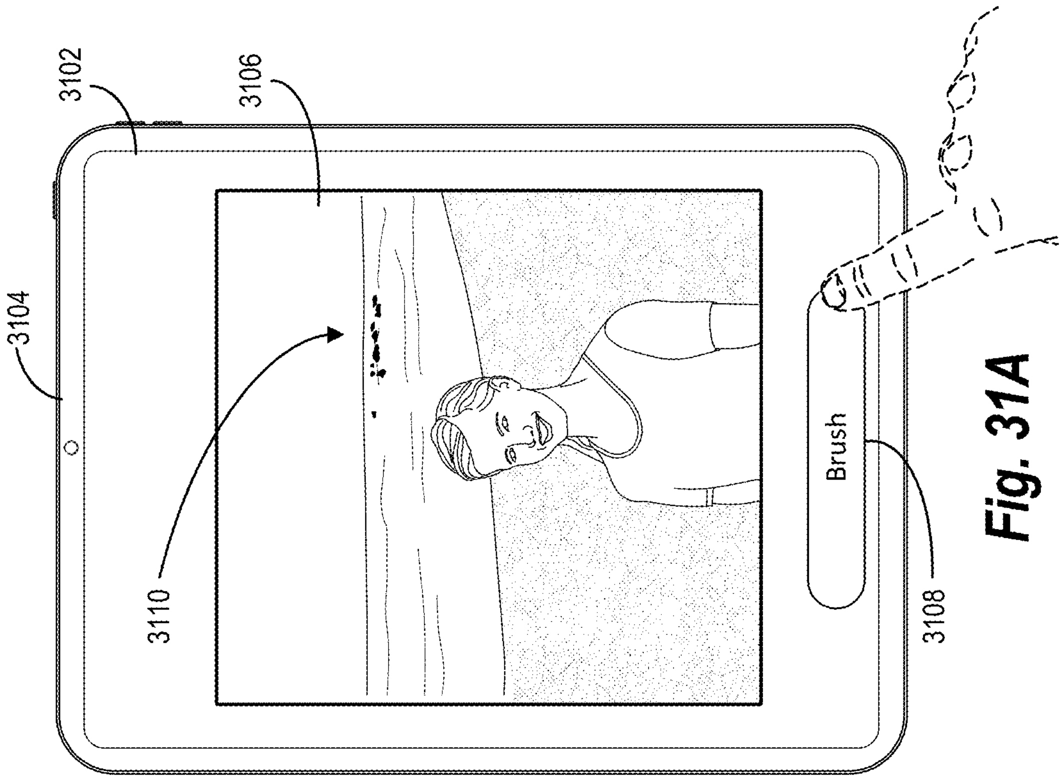
Figure 31C:
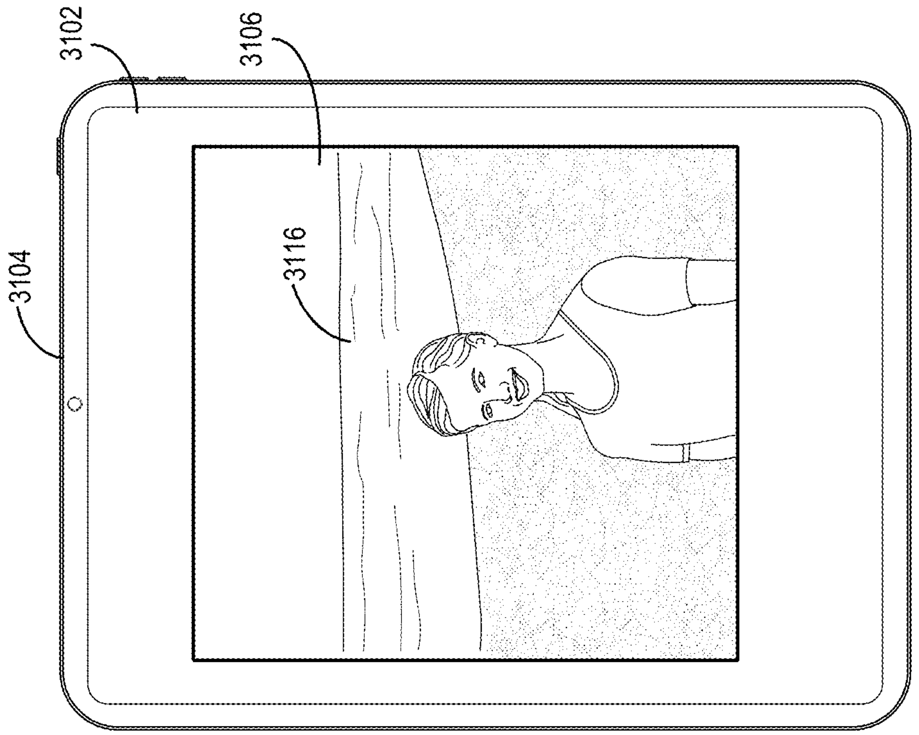

In addition to removing distracting objects identified via a distractor detection neural network, the scene-based image editing system 106 provides other features for removing unwanted portions of a digital image in various embodiments. For instance, in some cases, the scene-based image editing system 106 provides a tool whereby user interactions can target arbitrary portions of a digital image for deletion. FIGS. 31A-31C illustrate a graphical user interface implemented by the scene-based image editing system 106 to identify and remove distracting objects from a digital image in accordance with one or more embodiments.

In particular, FIG. 31A illustrates a digital image 3106 displayed on a graphical user interface 3102 of a client device 3104. The digital image 3106 corresponds to the digital image 3006 of FIG. 30C after distracting objects identified by a distractor detection neural network have been removed. Accordingly, in some cases, the objects remaining in the digital image 3106 represent those objects that were not identified and removed as distracting objects. For instance, in some cases, the collection of objects 3110 near the horizon of the digital image 3106 include objects that were not identified as distracting objects by the distractor detection neural network.

As further shown in FIG. 31A, the scene-based image editing system 106 provides a brush tool option 3108 for display within the graphical user interface 3102. FIG. 31B illustrates that, upon detecting a user interaction with the brush tool option 3108, the scene-based image editing system 106 enables one or more user interactions to use a brush tool to select arbitrary portions of the digital image 3106 (e.g., portions not identified by the distractor detection neural network) for removal. For instance, as illustrated, the scene-based image editing system 106 receives one or more user interactions with the graphical user interface 3102 that target a portion of the digital image 3106 that portrayed the collection of objects 3110.

As indicated by FIG. 31B, via the brush tool, the scene-based image editing system 106 enables free-form user input in some cases. In particular, FIG. 31B shows the scene-based image editing system 106 providing a visual indication 3112 representing the portion of the digital image 3106 selected via the brush tool (e.g., the specific pixels targeted). Indeed, rather than receiving user interactions with previously identified objects or other pre-segmented semantic areas, the scene-based image editing system 106 uses the brush tool to enable arbitrary selection of various portions of the digital image 3106. Accordingly, the scene-based image editing system 106 utilizes the brush tool to provide additional flexibility whereby user interactions is able to designate undesirable areas of a digital image that may not be identified by machine learning.

As further shown in FIG. 31B, the scene-based image editing system 106 provides a remove option 3114 for display within the graphical user interface 3102. As illustrated in FIG. 31C, in response to detecting a user interaction with the remove option 3114, the scene-based image editing system 106 removes the selected portion of the digital image 3106. Further, as shown, the scene-based image editing system 106 fills in the selected portion with a content fill 3116. In one or more embodiments, where the portion removed from the digital image 3106 does not include objects for which content fill was previously selected (or otherwise includes extra pixels not included in previously generated content fill), the scene-based image editing system 106 generates the content fill 3116 after removing the portion of the digital image 3106 selected via the brush tool. In particular, the scene-based image editing system 106 utilizes a content-aware hole-filling machine learning model to generate the content fill 3116 after the selected portion is removed.

Figure 32A:
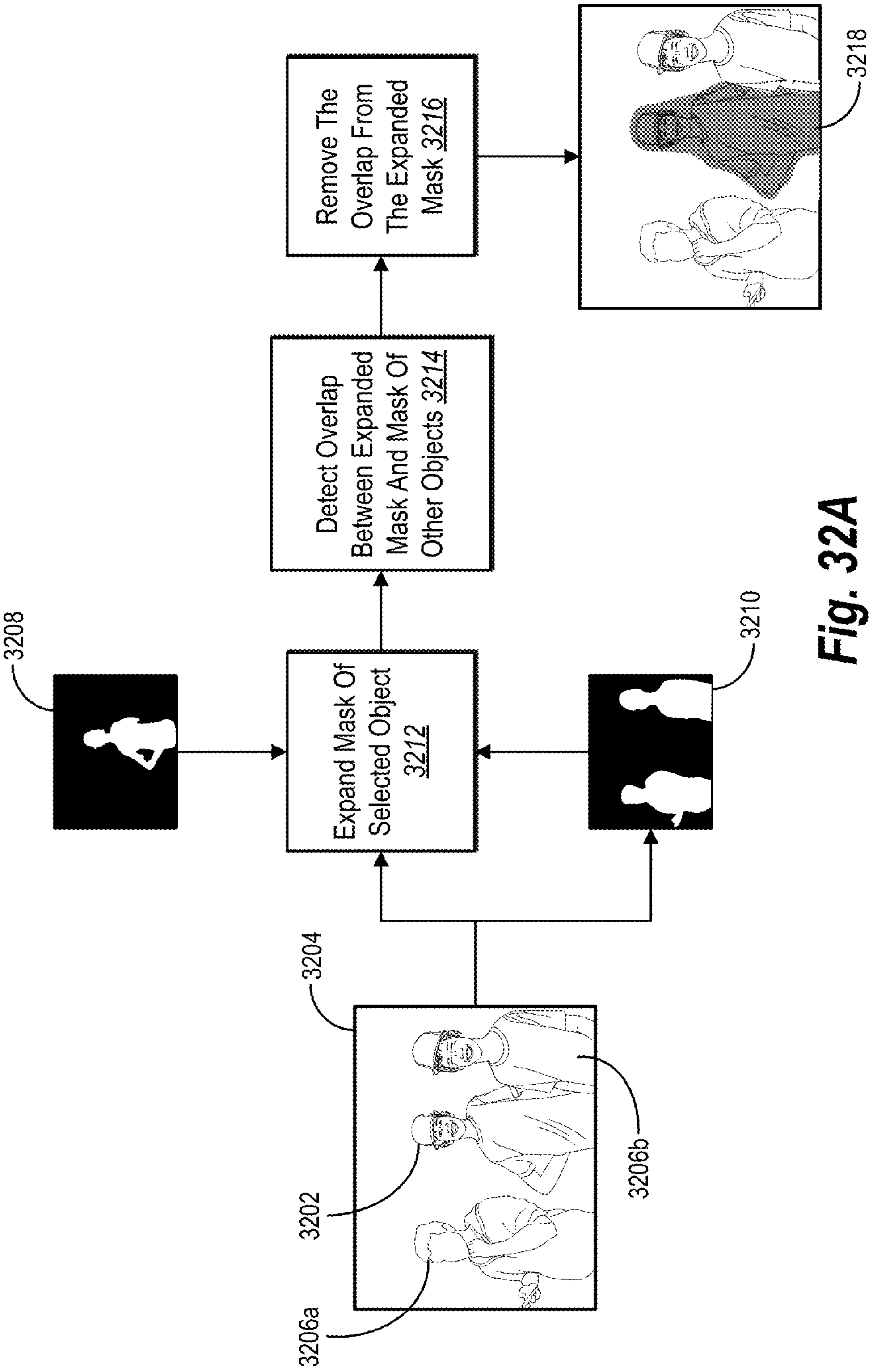
FIGS. 32A-32B illustrate the scene-based image editing system utilizing smart dilation to remove an object from a digital image in accordance with one or more embodiments.

In one or more embodiments, the scene-based image editing system 106 further implements smart dilation when removing objects, such as distracting objects, from digital images. For instance, in some cases, the scene-based image editing system 106 utilizes smart dilation to remove objects that touch, overlap, or are proximate to other objects portrayed in a digital image. FIG. 32A illustrates the scene-based image editing system 106 utilizes smart dilation to remove an object from a digital image in accordance with one or more embodiments.

Often, conventional systems remove objects from digital images utilizing tight masks (e.g., a mask that tightly adheres to the border of the corresponding object). In many cases, however, a digital image includes color bleeding or artifacts around the border of an object. For instance, there exist some image formats (JPEG) that are particularly susceptible to having format-related artifacts around object borders. Using tight masks when these issues are present causes undesirable effects in the resulting image. For example, inpainting models are typically sensitive to these image blemishes, creating large artifacts when operating directly on the segmentation output. Thus, the resulting modified images inaccurately capture the user intent in removing an object by creating additional image noise.

Thus, the scene-based image editing system 106 dilates (e.g., expands) the object mask of an object to avoid associated artifacts when removing the object. Dilating objects masks, however, presents the risk of removing portions of other objects portrayed in the digital image. For instance, where a first object to be removed overlaps, touches, or is proximate to a second object, a dilated mask for the first object will often extend into the space occupied by the second object. Thus, when removing the first object using the dilated object mask, significant portions of the second object are often removed and the resulting hole is filled in (generally improperly), causing undesirable effects in the resulting image. Accordingly, the scene-based image editing system 106 utilizes smart dilation to avoid significantly extending the object mask of an object to be removed into areas of the digital image occupied by other objects.

As shown in FIG. 32A, the scene-based image editing system 106 determines to remove an object 3202 portrayed in a digital image 3204. For instance, in some cases, the scene-based image editing system 106 determines (e.g., via a distractor detection neural network) that the object 3202 is a distracting object. In some implementations, the scene-based image editing system 106 receives a user selection of the object 3202 for removal. The digital image 3204 also portrays the objects 3206*a*-3206*b*. As shown, the object 3202 selected for removal overlaps with the object 3206*b* in the digital image 3204.

As further illustrated in FIG. 32A, the scene-based image editing system 106 generates an object mask 3208 for the object 3202 to be removed and a combined object mask 3210 for the objects 3206*a*-3206*b*. For instance, in some embodiments, the scene-based image editing system 106 generates the object mask 3208 and the combined object mask 3210 from the digital image 3204 utilizing a segmentation neural network. In one or more embodiments, the scene-based image editing system 106 generates the combined object mask 3210 by generating an object mask for each of the objects 3206*a*-3206*b* and determining the union between the separate object masks.

Additionally, as shown in FIG. 32A, the scene-based image editing system 106 performs an act 3212 of expanding the object mask 3208 for the object 3202 to be removed. In particular, the scene-based image editing system 106 expands the representation of the object 3202 within the object mask 3208. In other words, the scene-based image editing system 106 adds pixels to the border of the representation of the object within the object mask 3208. The amount of expansion varies in various embodiments and, in some implementations, is configurable to accommodate user preferences. For example, in one or more implementations, the scene-based image editing system 106 expands the object mask by extending the object mask outward ten, fifteen, twenty, twenty-five, or thirty pixels.

After expanding the object mask 3208, the scene-based image editing system 106 performs an act 3214 of detecting overlap between the expanded object mask for the object 3202 and the object masks of the other detected objects 3206*a*-3206*b* (i.e., the combined object mask 3210). In particular, the scene-based image editing system 106 determines where pixels corresponding to the expanded representation of the object 3202 within the expanded object mask overlap pixels corresponding to the objects 3206*a*-3206*b* within the combined object mask 3210. In some cases, the scene-based image editing system 106 determines the union between the expanded object mask and the combined object mask 3210 and determines the overlap using the resulting union. The scene-based image editing system 106 further performs an act 3216 of removing the overlapping portion from the expanded object mask for the object 3202. In other words, the scene-based image editing system 106 removes pixels from the representation of the object 3202 within the expanded object mask that overlaps with the pixels corresponding to the object 3206*a* and/or the object 3206*b* within the combined object mask 3210.

Thus, as shown in FIG. 32A, the scene-based image editing system 106 generates a smartly dilated object mask 3218 (e.g., an expanded object mask) for the object 3202 to be removed. In particular, the scene-based image editing system 106 generates the smartly dilated object mask 3218 by expanding the object mask 3208 in areas that don't overlap with either one of the objects 3206*a*-3206*b* and avoiding expansion in areas that do overlap with at least one of the objects 3206*a*-3206*b*. At least, in some implementations, the scene-based image editing system 106 reduces the expansion in areas that do overlap. For instance, in some cases, the smartly dilated object mask 3218 still includes expansion in overlapping areas but the expansion is significantly less when compared to areas where there is no overlap. In other words, the scene-based image editing system 106 expands using less pixels in areas where there is overlap. For example, in one or more implementations, the scene-based image editing system 106 expands or dilates an object mask five, ten, fifteen, or twenty times as far into areas where there is no overlap compared to areas where there are overlaps.

To describe it differently, in one or more embodiments, the scene-based image editing system 106 generates the smartly dilated object mask 3218 (e.g., an expanded object mask) by expanding the object mask 3208 for the object 3202 into areas not occupied by the object masks for the objects 3206*a*-3206*b* (e.g., areas not occupied by the objects 3206*a*-3206*b* themselves). For instance, in some cases, the scene-based image editing system 106 expands the object mask 3208 into portions of the digital image 3204 that abut the object mask 3208. In some cases, the scene-based image editing system 106 expands the object mask 3208 into the abutting portions by a set number of pixels. In some implementations, the scene-based image editing system 106 utilizes a different number of pixels for expanding the object mask 3208 into different abutting portions (e.g., based on detecting a region of overlap between the object mask 3208 and other object masks).

To illustrate, in one or more embodiments, the scene-based image editing system 106 expands the object mask 3208 into the foreground and the background of the digital image 3204. In particular, the scene-based image editing system 106 determines foreground by combining the object masks of objects not to be deleted. The scene-based image editing system 106 expands the object mask 3208 into the abutting foreground and background. In some implementations, the scene-based image editing system 106 expands the object mask 3208 into the foreground by a first amount and expands the object mask 3208 into the background by a second amount that differs from the first amount (e.g., the second amount is greater than the first amount). For example, in one or more implementations the scene-based image editing system 106 expands the object mask by twenty pixels into background areas and two pixels into foreground areas (into abutting object masks, such as the combined object mask 3210).

In one or more embodiments, the scene-based image editing system 106 determines the first amount to use for the expanding the object mask 3208 into the foreground by expanding the object mask 3208 into the foreground by the second amount—the same amount used to expand the object mask 3208 into the background. In other words, the scene-based image editing system 106 expands the object mask 3208 as a whole into the foreground and background by the same amount (e.g., using the same number of pixels). The scene-based image editing system 106 further determines a region of overlap between the expanded object mask and the object masks corresponding to the other objects 3206*a*-3206*b* (e.g., the combined object mask 3210). In one or more embodiments, the region of overlap exists in the foreground of the digital image 3204 abutting the object mask 3208. Accordingly, the scene-based image editing system 106 reduces the expansion of the object mask 3208 into the foreground so that the expansion corresponds to the second amount. Indeed, in some instances, the scene-based image editing system 106 removes the region of overlap from the expanded object mask for the object 3202 (e.g., removes the overlapping pixels). In some cases, scene-based image editing system 106 removes a portion of the region of overlap rather than the entire region of overlap, causing a reduced overlap between the expanded object mask for the object 3202 and the object masks corresponding to the objects 3206*a*-3206*b*.

In one or more embodiments, as removing the object 3202 includes removing foreground and background abutting the smartly dilated object mask 3218 (e.g., the expanded object mask) generated for the object 3202, the scene-based image editing system 106 inpaints a hole remaining after the removal. In particular, the scene-based image editing system 106 inpaints a hole with foreground pixels and background pixels. Indeed, in one or more embodiments, the scene-based image editing system 106 utilizes an inpainting neural network to generate foreground pixels and background pixels for the resulting hole and utilizes the generated pixels to inpaint the hole, resulting in a modified digital image (e.g., an inpainted digital image) where the object 3202 has been removed and the corresponding portion of the digital image 3204 has been filled in.

Figure 32B:
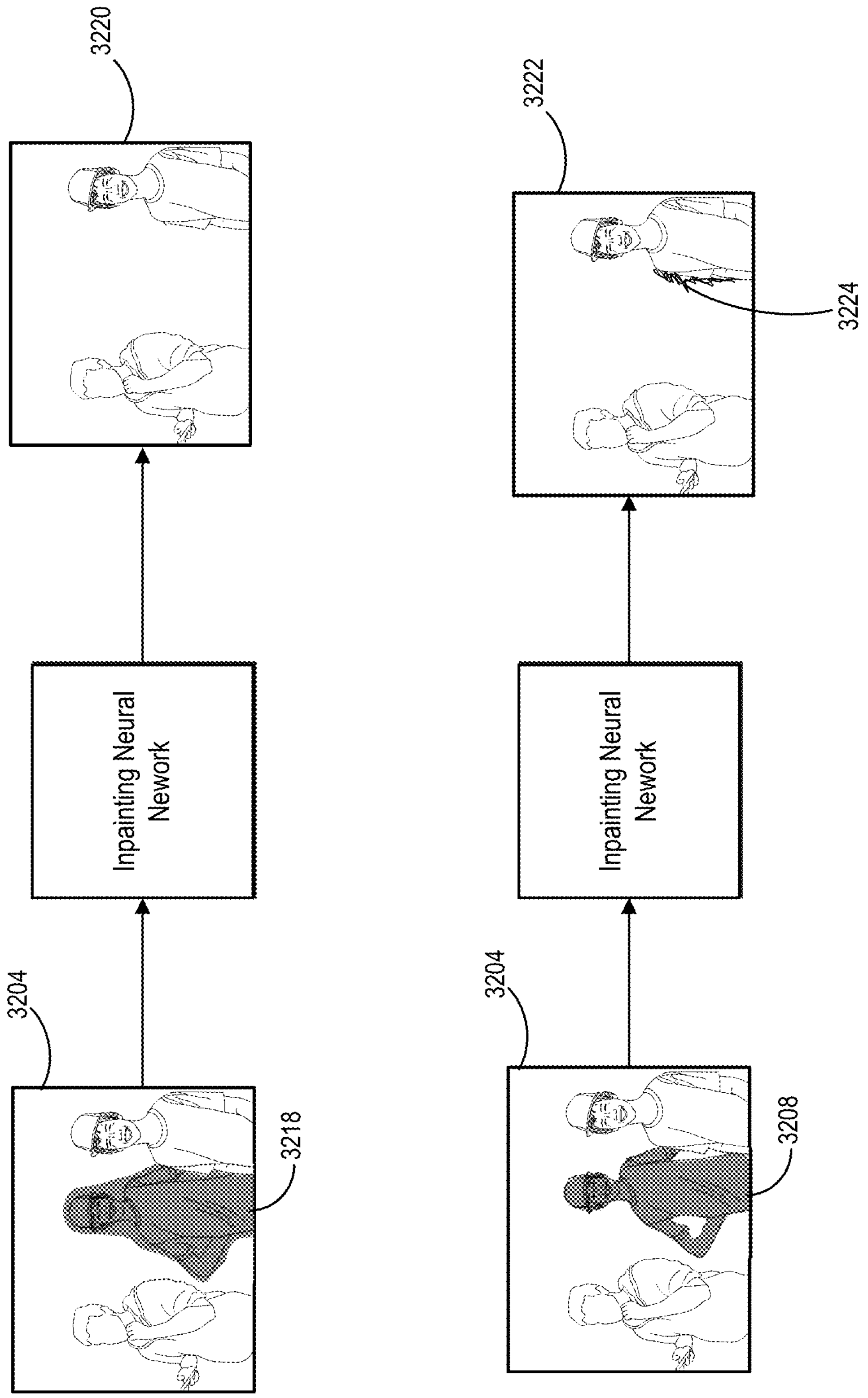

For example, FIG. 32B illustrates the advantages provided by intelligently dilating object masks prior to performing inpainting. In particular, FIG. 32B illustrates that when the smartly dilated object mask 3218 (e.g., the expanded object mask) is provided to an inpainting neural network (e.g., the cascaded modulation inpainting neural network 420) as an area to fill, the inpainting neural network generates a modified digital image 3220 with the area corresponding to the smartly dilated object mask 3218 filled with pixel generated by the inpainting neural network. As shown, the modified digital image 3220 includes no artifacts in the inpainted area corresponding to the smartly dilated object mask 3218. Indeed, the modified digital image 3220 provides a realistic appearing image.

In contrast, FIG. 32B illustrates that when the object mask 3208 (e.g., the non-expanded object mask) is provided to an inpainting neural network (e.g., the cascaded modulation inpainting neural network 420) as an area to fill, the inpainting neural network generates a modified digital image 3222 with the area corresponding to the smartly dilated object mask 3218 filled with pixel generated by the inpainting neural network. As shown, the modified digital image 3222 includes artifacts in the inpainted area corresponding to the object mask 3208. In particular, artifacts are along the back of the girl and event in the generated water.

By generating smartly dilated object masks, the scene-based image editing system 106 provides improved image results when removing objects. Indeed, the scene-based image editing system 106 leverages expansion to remove artifacts, color bleeding, or other undesirable errors in a digital image but avoids removing significant portions of other objects that are remain in the digital image. Thus, the scene-based image editing system 106 is able to fill in holes left by removed objects without enhancing present errors where possible without needlessly replacing portions of other objects that remain.

As previously mentioned, in one or more embodiments, the scene-based image editing system 106 further utilizes a shadow detection neural network to detect shadows associated with distracting objects portrayed within a digital image. FIGS. 33-38 illustrate diagrams of a shadow detection neural network utilized by the scene-based image editing system 106 to detect shadows associated with objects in accordance with one or more embodiments.

Figure 33:
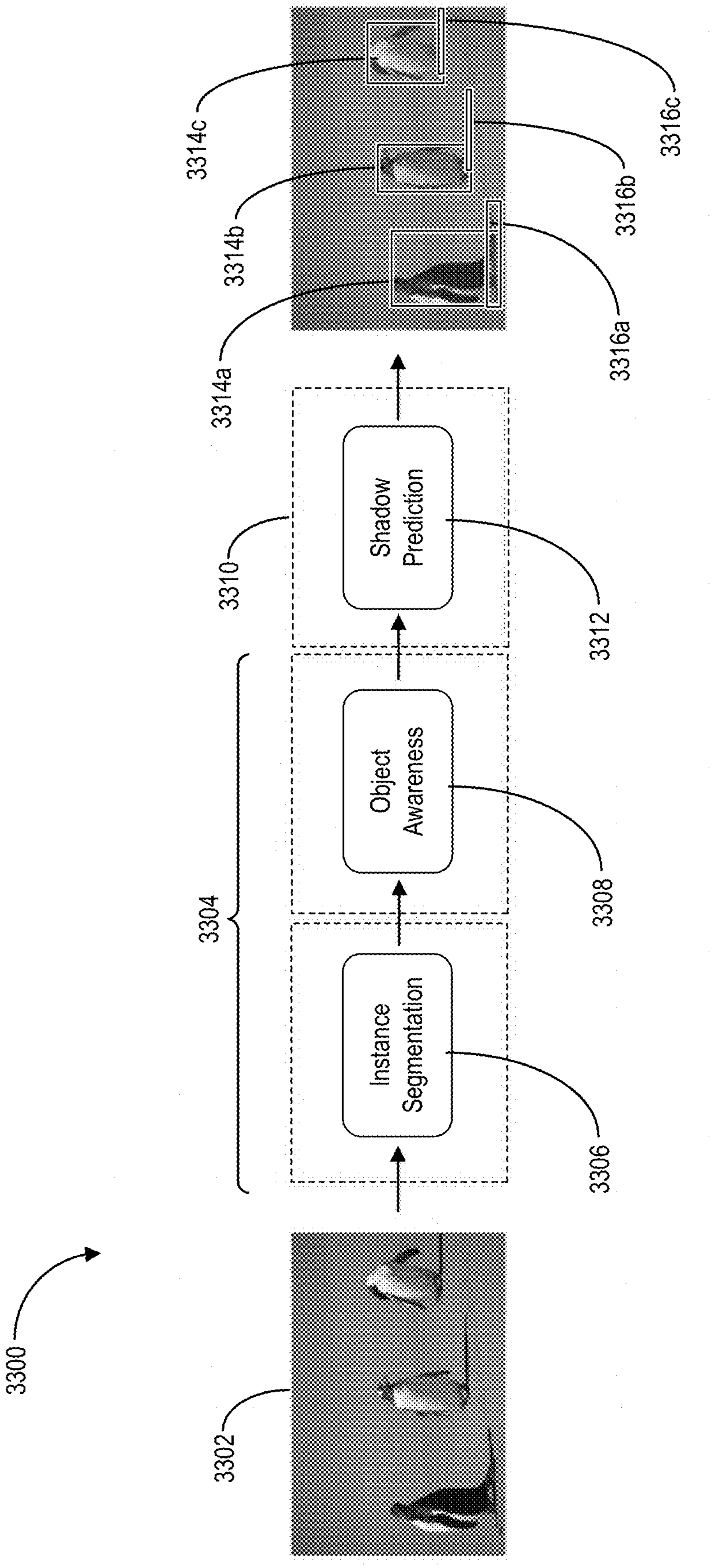
FIG. 33 illustrates an overview of a shadow detection neural network in accordance with one or more embodiments.

In particular, FIG. 33 illustrates an overview of a shadow detection neural network 3300 in accordance with one or more embodiments. Indeed, as shown in FIG. 33, the shadow detection neural network 3300 analyzes an input image 3302 via a first stage 3304 and a second stage 3310. In particular, the first stage 3304 includes an instance segmentation component 3306 and an object awareness component 3308. Further, the second stage 3310 includes a shadow prediction component 3312. In one or more embodiments, the instance segmentation component 3306 includes the segmentation neural network 2604 of the neural network pipeline discussed above with reference to FIG. 26.

As shown in FIG. 33, after analyzing the input image 3302, the shadow detection neural network 3300 identifies objects 3314*a*-3314*c* and shadows 3316*a*-3316*c* portrayed therein. Further, the shadow detection neural network 3300 associates the objects 3314*a*-3314*c* with their respective shadows. For instance, the shadow detection neural network 3300 associates the object 3314*a* with the shadow 3316*a* and likewise for the other objects and shadows. Thus, the shadow detection neural network 3300 facilitates inclusion of a shadow when its associated object is selected for deletion, movement, or some other modification.

Figure 34:
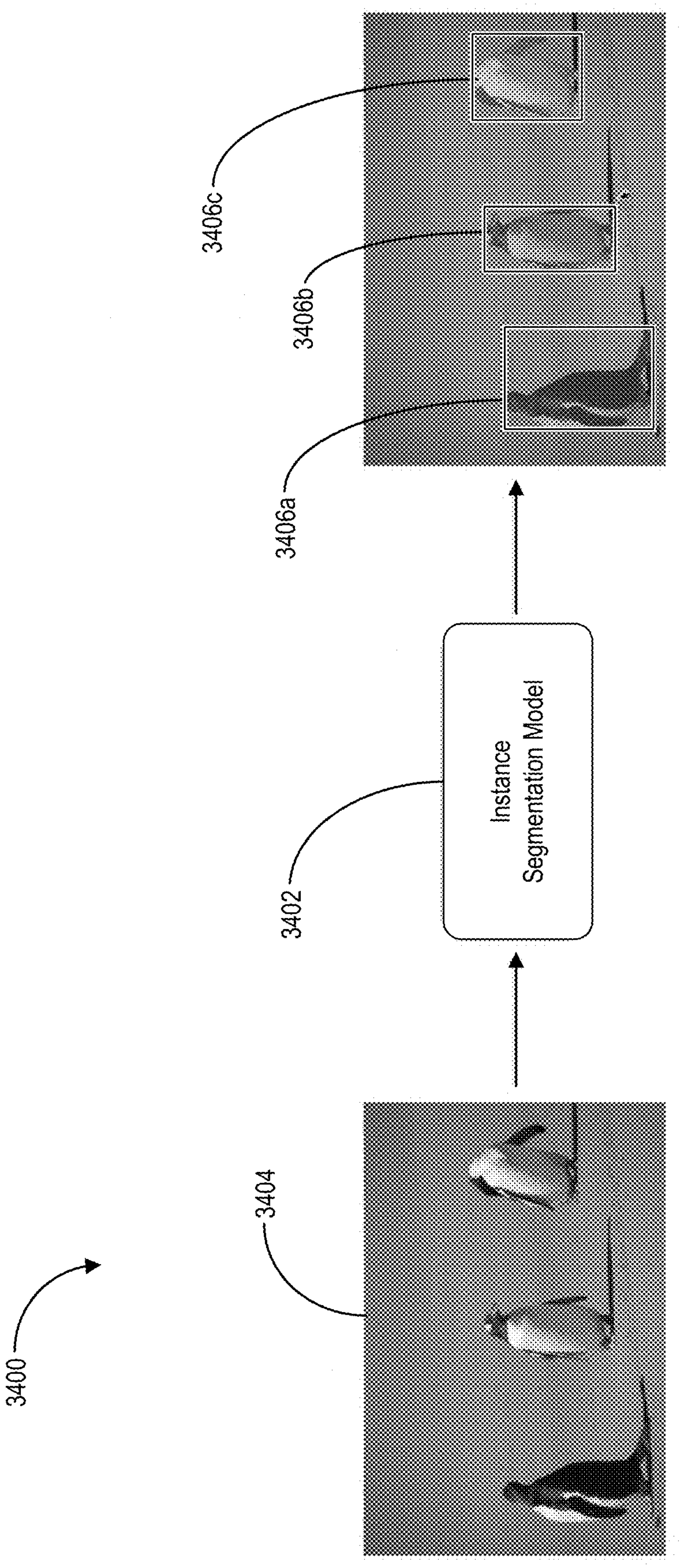
FIG. 34 illustrates an overview of an instance segmentation component of a shadow detection neural network in accordance with one or more embodiments.

FIG. 34 illustrates an overview of an instance segmentation component 3400 of a shadow detection neural network in accordance with one or more embodiments. As shown in FIG. 34, the instance segmentation component 3400 implements an instance segmentation model 3402. In one or more embodiments, the instance segmentation model 3402 includes the detection-masking neural network 300 discussed above with reference to FIG. 3. As shown in FIG. 34, the instance segmentation component 3400 utilizes the instance segmentation model 3402 to analyze an input image 3404 and identify objects 3406*a*-3406*c* portrayed therein based on the analysis. For instance, in some cases, the scene-based image editing system 106 outputs object masks and/or bounding boxes for the objects 3406*a*-3406*c*.

Figure 35:
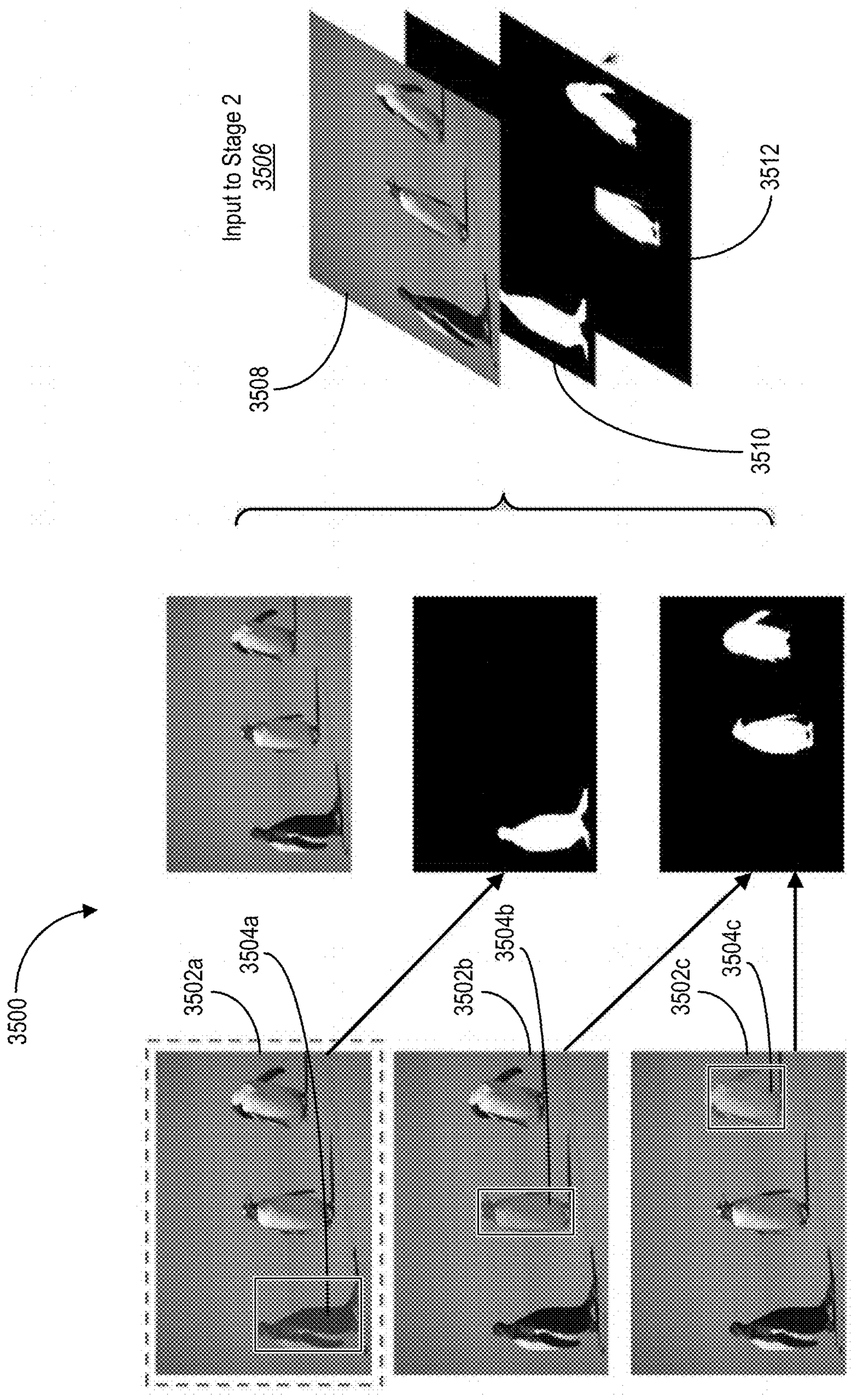
FIG. 35 illustrates an overview of an object awareness component of a shadow detection neural network in accordance with one or more embodiments.

FIG. 35 illustrates an overview of an object awareness component 3500 of a shadow detection neural network in accordance with one or more embodiments. In particular, FIG. 35 illustrates input image instances 3502*a*-3502*c* corresponding to each object detected within the digital image via the prior instance segmentation component. In particular, each input image instance corresponds to a different detected object and corresponds to an object mask and/or a bounding box generated for that digital image. For instance, the input image instance 3502*a* corresponds to the object 3504*a*, the input image instance 3502*b* corresponds to the object 3504*b*, and the input image instance 3502*c* corresponds to the object 3504*c*. Thus, the input image instances 3502*a*-3502*c* illustrate the separate object detections provided by the instance segmentation component of the shadow detection neural network.

In some embodiments, for each detected object, the scene-based image editing system 106 generates input for the second stage of the shadow detection neural network (i.e., the shadow prediction component). FIG. 35 illustrates the object awareness component 3500 generating input 3506 for the object 3504*a*. Indeed, as shown in FIG. 35, the object awareness component 3500 generates the input 3506 using the input image 3508, the object mask 3510 corresponding to the object 3504*a* (referred to as the object-aware channel) and a combined object mask 3512 corresponding to the objects 3504*b*-3504*c* (referred to as the object-discriminative channel). For instance, in some implementations, the object awareness component 3500 combines (e.g., concatenates) the input image 3508, the object mask 3510, and the combined object mask 3512. The object awareness component 3500 similarly generates second stage input for the other objects 3504*b*-3504*c* as well (e.g., utilizing their respective object mask and combined object mask representing the other objects along with the input image 3508).

In one or more embodiments, the scene-based image editing system 106 (e.g., via the object awareness component 3500 or some other component of the shadow detection neural network) generates the combined object mask 3512 using the union of separate object masks generated for the object 3504*b* and the object 3504*c*. In some instances, the object awareness component 3500 does not utilize the object-discriminative channel (e.g., the combined object mask 3512). Rather, the object awareness component 3500 generates the input 3506 using the input image 3508 and the object mask 3510. In some embodiments, however, using the object-discriminative channel provides better shadow prediction in the second stage of the shadow detection neural network.

Figure 36:
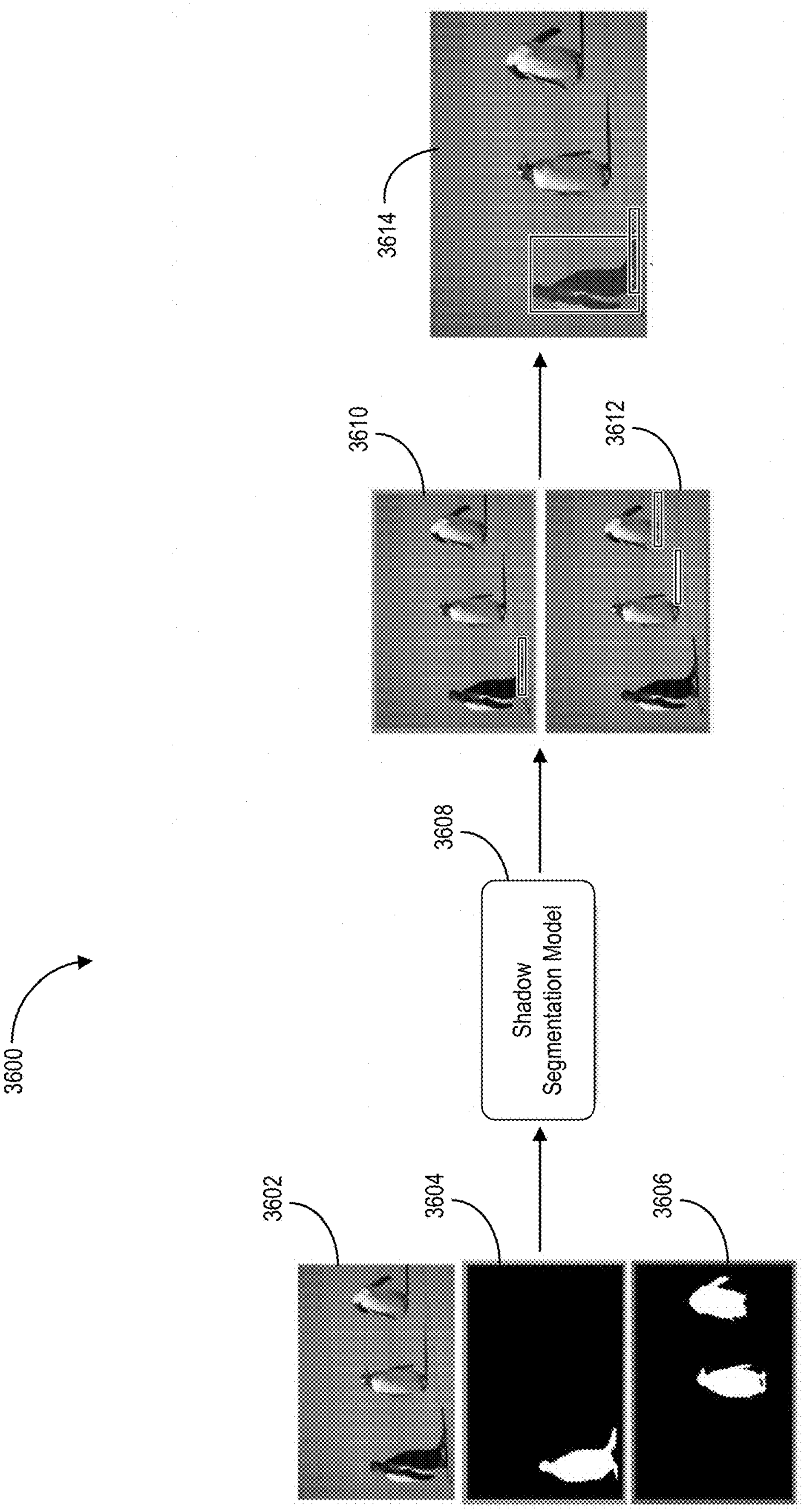
FIG. 36 illustrates an overview of a shadow prediction component of a shadow detection neural network in accordance with one or more embodiments.

FIG. 36 illustrates an overview of a shadow prediction component 3600 of a shadow detection neural network in accordance with one or more embodiments. As shown in FIG. 36, the shadow detection neural network provides, to the shadow prediction component 3600, input compiled by an object awareness component consisting of an input image 3602, an object mask 3604 for an object of interest, and a combined object mask 3606 for the other detected objects. The shadow prediction component 3600 utilizes a shadow segmentation model 3608 to generate a first shadow prediction 3610 for the object of interest and a second shadow prediction 3612 for the other detected objects. In one or more embodiments, the first shadow prediction 3610 and/or the second shadow prediction 3612 include shadow masks (e.g., where a shadow mask includes an object mask for a shadow) for the corresponding shadows. In other words, the shadow prediction component 3600 utilizes the shadow segmentation model 3608 to generate the first shadow prediction 3610 by generating a shadow mask for the shadow predicted for the object of interest. Likewise, the shadow prediction component 3600 utilizes the shadow segmentation model 3608 to generate the second shadow prediction 3612 by generating a combined shadow mask for the shadows predicted for the other detected objects.

Based on the outputs of the shadow segmentation model 3608, the shadow prediction component 3600 provides an object-shadow pair prediction 3614 for the object of interest. In other words, the shadow prediction component 3600 associates the object of interest with its shadow cast within the input image 3602. In one or more embodiments, the shadow prediction component 3600 similarly generates an object-shadow pair prediction for all other objects portrayed in the input image 3602. Thus, the shadow prediction component 3600 identifies shadows portrayed in a digital image and associates each shadow with its corresponding object.

In one or more embodiments, the shadow segmentation model 3608 utilized by the shadow prediction component 3600 includes a segmentation neural network. For instance, in some cases, the shadow segmentation model 3608 includes the detection-masking neural network 300 discussed above with reference to FIG. 3. As another example, in some implementations, the shadow segmentation model 3608 includes the DeepLabv3 semantic segmentation model described by Liang-Chieh Chen et al., Rethinking Atrous Convolution for Semantic Image Segmentation, arXiv:1706.05587, 2017, or the DeepLab semantic segmentation model described by Liang-Chieh Chen et al., "Deeplab: Semantic Image Segmentation with Deep Convolutional Nets, Atrous Convolution, and Fully Connected CRFs," arXiv:1606.00915, 2016, both of which are incorporated herein by reference in their entirety.

Figure 37:
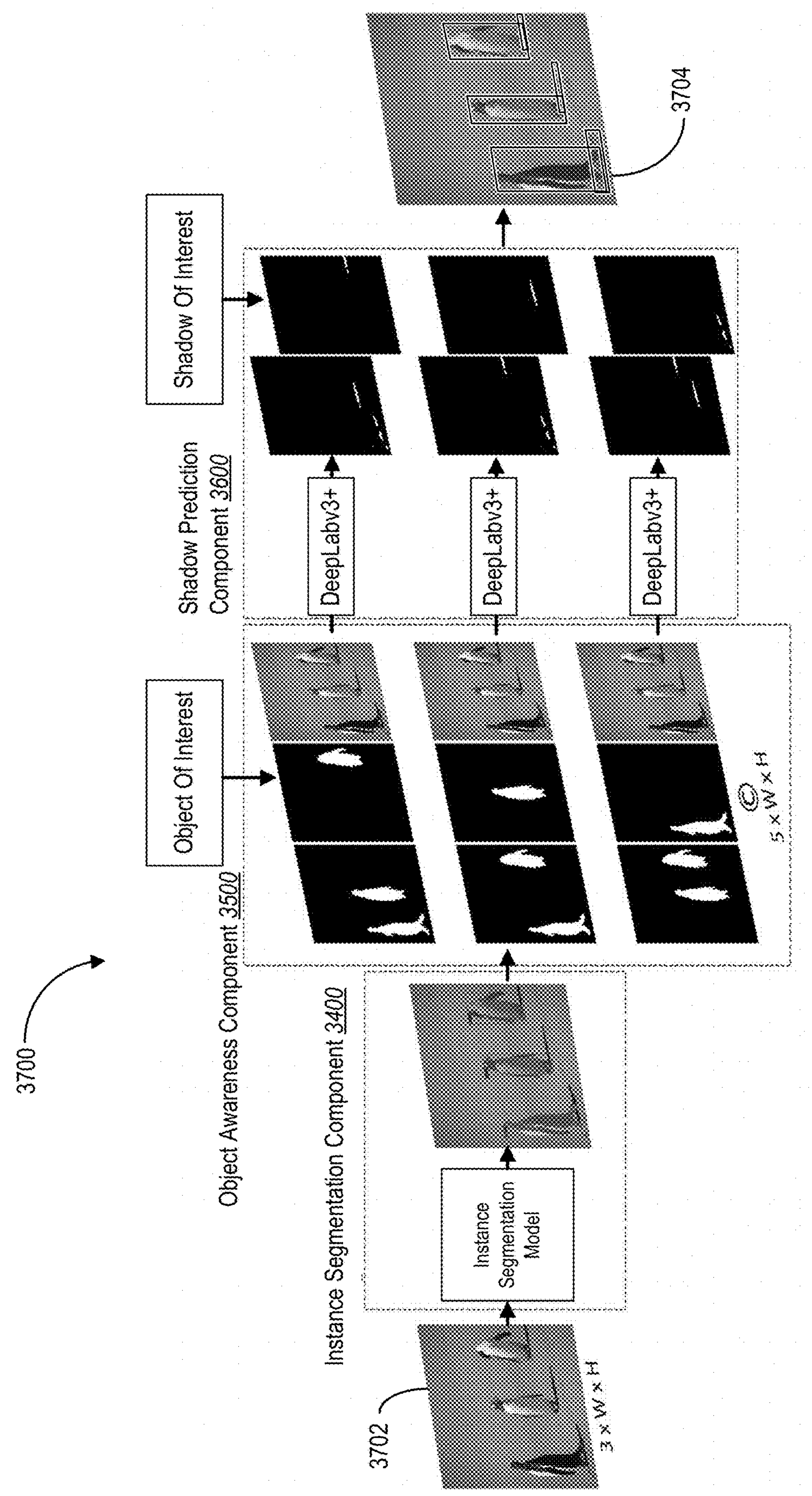
FIG. 37 illustrates an overview of the architecture of a shadow detection neural network in accordance with one or more embodiments.

FIG. 37 illustrates an overview of the architecture of a shadow detection neural network 3700 in accordance with one or more embodiments. In particular, FIG. 37 illustrates the shadow detection neural network 3700 consisting of the instance segmentation component 3400 discussed with reference to FIG. 34, the object awareness component 3500 discussed with reference to FIG. 35, and the shadow prediction component 3600 discussed with reference to FIG. 36. Further, FIG. 37 illustrates the shadow detection neural network 3700 generating object masks, shadow masks, and predictions with respect to each object portrayed in the input image 3702. Thus, the shadow detection neural network 3700 outputs a final prediction 3704 that associates each object portrayed in a digital image with its shadow. Accordingly, as shown in FIG. 37, the shadow detection neural network 3700 provides an end-to-end neural network framework that receives a digital image and outputs an association between objects and shadows depicted therein.

In some implementations, the shadow detection neural network 3700 determines that an object portrayed within a digital image does not have an associated shadow. Indeed, in some cases, upon analyzing the digital image utilizing its various components, the shadow detection neural network 3700 determines that there is not a shadow portrayed within the digital image that is associated with the object. In some cases, the scene-based image editing system 106 provides feedback indicating the lack of a shadow. For example, in some cases, upon determining that there are no shadows portrayed within a digital image (or that there is not a shadow associated with a particular object), the scene-based image editing system 106 provides a message for display or other feedback indicating the lack of shadows. In some instances, the scene-based image editing system 106 does not provide explicit feedback but does not auto-select or provide a suggestion to include a shadow within a selection of an object as discussed below with reference to FIGS. 39A-39C.

In some implementations, the scene-based image editing system 106 utilizes the second stage of the shadow detection neural network to determine shadows associated with objects portrayed in a digital image when the objects masks of the objects have already been generated. Indeed, FIG. 38 illustrates a diagram for using the second stage of the shadow detection neural network for determining shadows associated with objects portrayed in a digital image in accordance with one or more embodiments.

Figure 38:
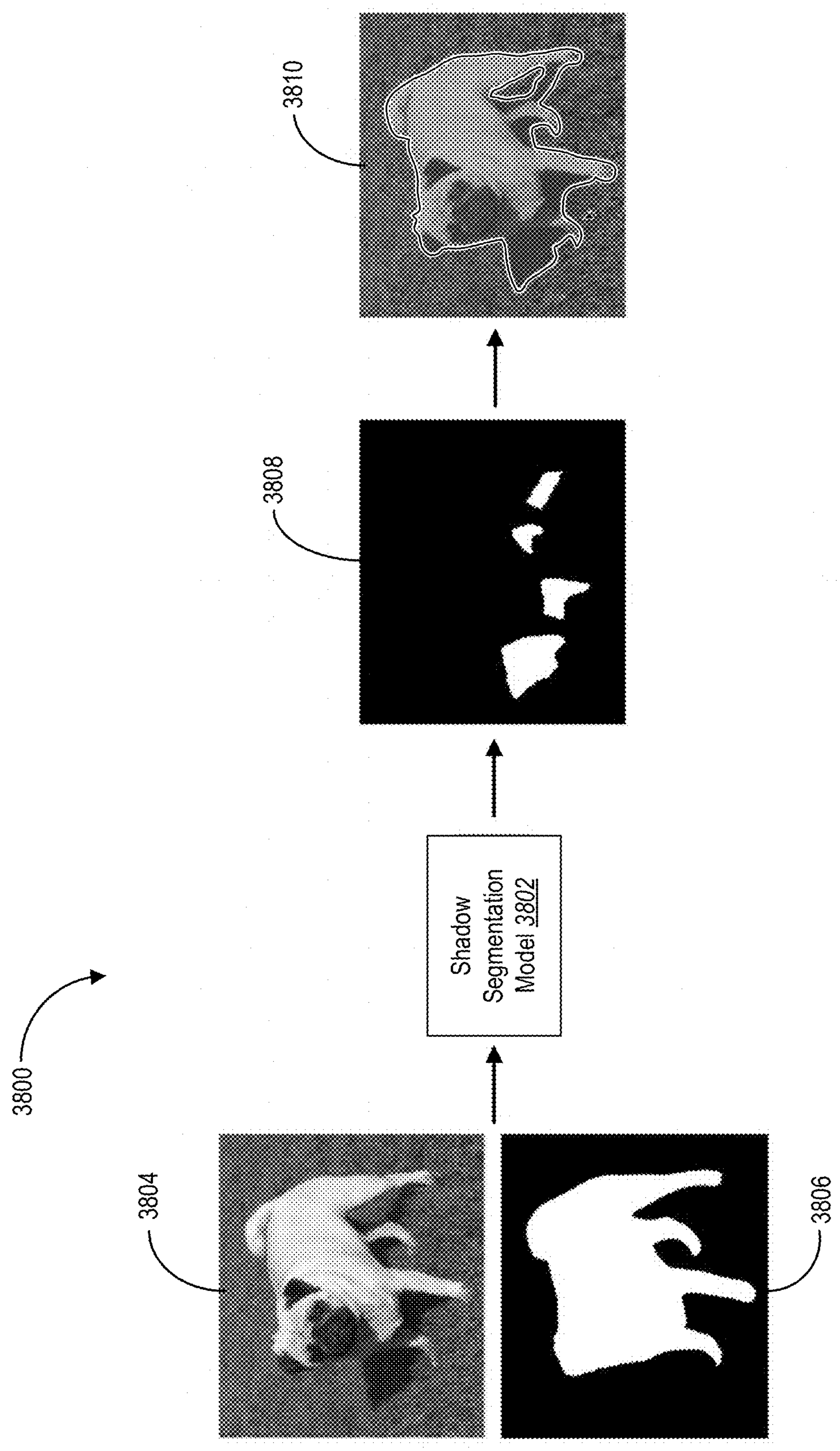
FIG. 38 illustrates a diagram for using the second stage of the shadow detection neural network for determining shadows associated with objects portrayed in a digital image in accordance with one or more embodiments.

As shown in FIG. 38, the scene-based image editing system 106 provides an input image 3804 to the second stage of a shadow detection neural network (i.e., a shadow prediction model 3802). Further, the scene-based image editing system 106 provides an object mask 3806 to the second stage. The scene-based image editing system 106 utilizes the second stage of the shadow detection neural network to generate a shadow mask 3808 for the shadow of the object portrayed in the input image 3804, resulting in the association between the object and the shadow cast by the object within the input image 3804 (e.g., as illustrated in the visualization 3810).

By providing direct access to the second stage of the shadow detection neural network, the scene-based image editing system 106 provides flexibility in the shadow detection process. Indeed, in some cases, an object mask will already have been created for an object portrayed in a digital image. For instance, in some cases, the scene-based image editing system 106 implements a separate segmentation neural network to generate an object mask for a digital image as part of a separate workflow. Accordingly, the object mask for the object already exists, and the scene-based image editing system 106 leverages the previous work in determining the shadow for the object. Thus, the scene-based image editing system 106 further provides efficiency as it avoids duplicating work by accessing the shadow prediction model of the shadow detection neural network directly.

Figure 39B:
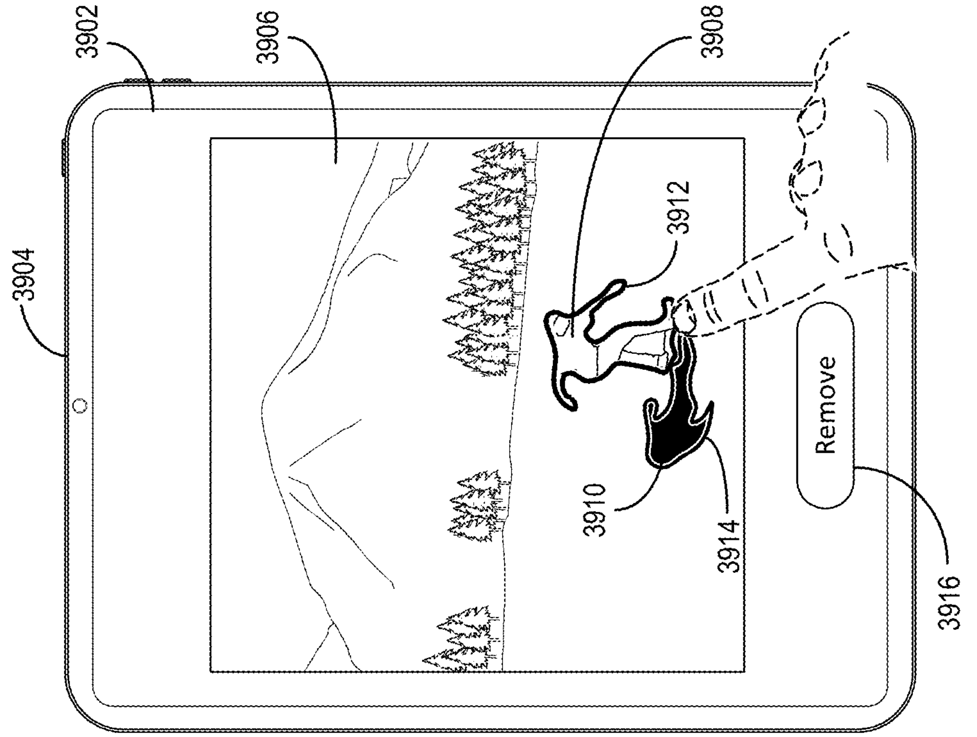
FIGS. 39A-39C illustrate a graphical user interface implemented by the scene-based image editing system to identify and remove shadows of objects portrayed in a digital image in accordance with one or more embodiments.
Figure 39A:
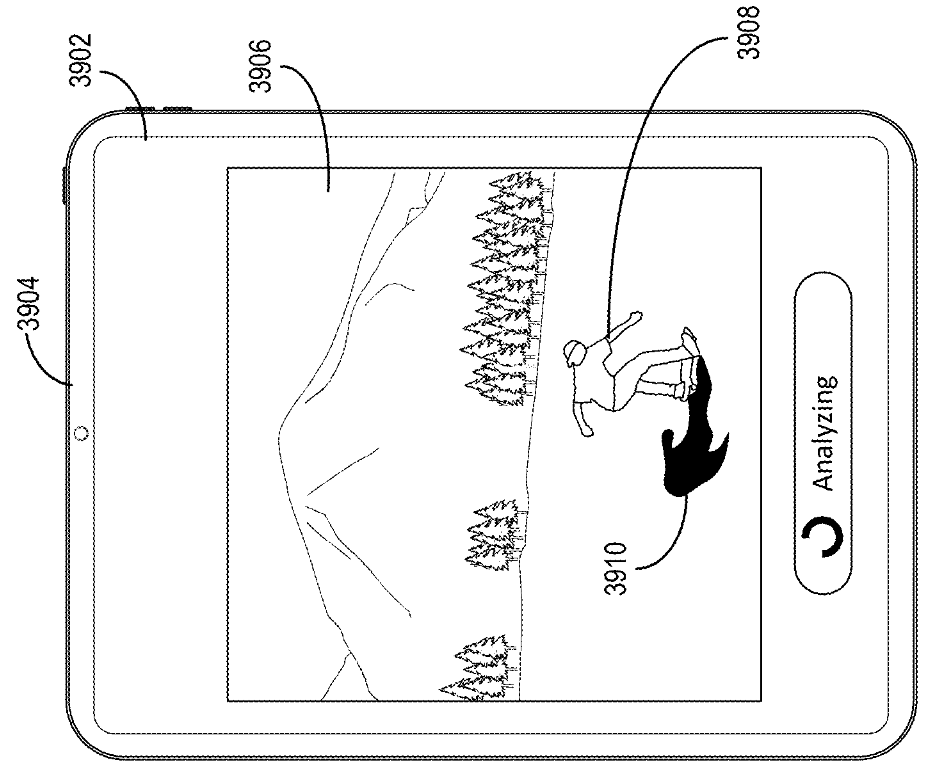
Figure 39C:
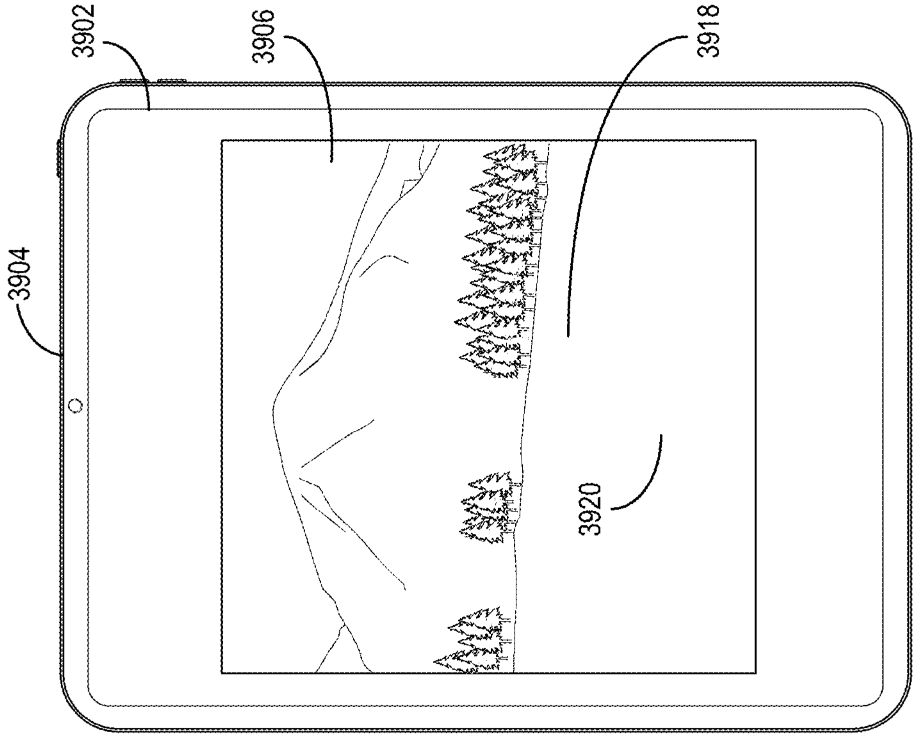

FIGS. 39A-39C illustrate a graphical user interface implemented by the scene-based image editing system 106 to identify and remove shadows of objects portrayed in a digital image in accordance with one or more embodiments. Indeed, as shown in FIG. 39A, the scene-based image editing system 106 provides, for display within a graphical user interface 3902 of a client device, a digital image 3906 portraying an object 3908. As further shown, the object 3908 casts a shadow 3910 within the digital image 3906.

In one or more embodiments, upon receiving the digital image 3906, the scene-based image editing system 106 utilizes a shadow detection neural network to analyze the digital image 3906. In particular, the scene-based image editing system 106 utilizes the shadow detection neural network to identify the object 3908, identify the shadow 3910 cast by the object 3908, and further associate the shadow 3910 with the object 3908. As previously mentioned, in some implementations, the scene-based image editing system 106 further utilizes the shadow detection neural network to generate object masks for the object 3908 and the shadow 3910.

As previously discussed with reference to FIG. 26, in one or more embodiments, the scene-based image editing system 106 identifies shadows cast by objects within a digital image as part of a neural network pipeline for identifying distracting objects within the digital image. For instance, in some cases, the scene-based image editing system 106 utilizes a segmentation neural network to identify objects for a digital image, a distractor detection neural network to classify one or more of the objects as distracting objects, a shadow detection neural network to identify shadows and associate the shadows with their corresponding objects, and an inpainting neural network to generate content fills to replace objects (and their shadows) that are removed. In some cases, the scene-based image editing system 106 implements the neural network pipeline automatically in response to receiving a digital image.

Indeed, as shown in FIG. 39B, the scene-based image editing system 106 provides, for display within the graphical user interface 3902, a visual indication 3912 indicating a selection of the object 3908 for removal. As further shown, the scene-based image editing system 106 provides, for display, a visual indication 3914 indicating a selection of the shadow 3910 for removal. As suggested, in some cases, the scene-based image editing system 106 selects the object 3908 and the shadow 3910 for deletion automatically (e.g., upon determining the object 3908 is a distracting object). In some implementations, however, the scene-based image editing system 106 selects the object 3908 and/or the shadow 3910 in response to receiving one or more user interactions.

For instance, in some cases, the scene-based image editing system 106 receives a user selection of the object 3908 and automatically adds the shadow 3910 to the selection. In some implementations, the scene-based image editing system 106 receives a user selection of the object 3908 and provides a suggestion for display in the graphical user interface 3902, suggesting that the shadow 3910 be added to the selection. In response to receiving an additional user interaction, the scene-based image editing system 106 adds the shadow 3910.

As further shown in FIG. 39B, the scene-based image editing system 106 provides a remove option 3916 for display within the graphical user interface 3902. As indicated by FIG. 39C, upon receiving a selection of the remove option 3916, the scene-based image editing system 106 removes the object 3908 and the shadow 3910 from the digital image. As further shown, the scene-based image editing system 106 replaces the object 3908 with a content fill 3918 and replaces the shadow 3910 with a content fill 3920. In other words, the scene-based image editing system 106 reveals the content fill 3918 and the content fill 3920 upon removing the object 3908 and the shadow 3910, respectively.

Though FIGS. 39A-39C illustrates implementing shadow detection with respect to a delete operation, it should be noted that the scene-based image editing system 106 implements shadow detection for other operations (e.g., a move operation) in various embodiments. Further, thought FIGS. 39A-39C are discussed with respect to removing distracting objects from a digital image, the scene-based image editing system 106 implements shadow detection in the context of other features described herein. For instance, in some cases, the scene-based image editing system 106 implements shadow detection with respect to object-aware modifications where user interactions target objects directly. Thus, the scene-based image editing system 106 provides further advantages to object-aware modifications by segmenting objects and their shadows and generating corresponding content fills before receiving user interactions to modify the objects to allow for seamless interaction with digital images as if they were real scenes.

By identifying shadows cast by objects within digital images, the scene-based image editing system 106 provides improved flexibility when compared to conventional systems. Indeed, the scene-based image editing system 106 flexibly identifies objects within a digital image along with other aspects of those objects portrayed in the digital image (e.g., their shadows). Thus, the scene-based image editing system 106 provides a better image result when removing or moving objects as it accommodates these other aspects. This further leads to reduced user interaction with a graphical user interface as the scene-based image editing system 106 does not require user interactions for targeting the shadows of objects for movement or removal (e.g., user interactions to identify shadow pixels and/or tie the shadow pixels to the object).

In some implementations, the scene-based image editing system 106 implements one or more additional features to facilitate the modification of a digital image. In some embodiments, these features provide additional user-interface-based efficiency in that they reduce the amount of user interactions with a user interface typically required to perform some action in the context of image editing. In some instances, these features further aid in the deployment of the scene-based image editing system 106 on computing devices with limited screen space as they efficiently use the space available to aid in image modification without crowding the display with unnecessary visual elements.

As mentioned, in one or more embodiments the scene-based image editing system 106 provides editing of two-dimensional images based on three-dimensional ("3D") characteristics of scenes of the two-dimensional ("2D") images. Specifically, the scene-based image editing system 106 processes a two-dimensional image utilizing a plurality of models to determine a three-dimensional understanding of a two-dimensional scene in the two-dimensional image. The scene-based image editing system 106 also provides tools for editing the two-dimensional image, such as by moving objects within the two-dimensional image or inserting objects into the two-dimensional image.

Figure 40:
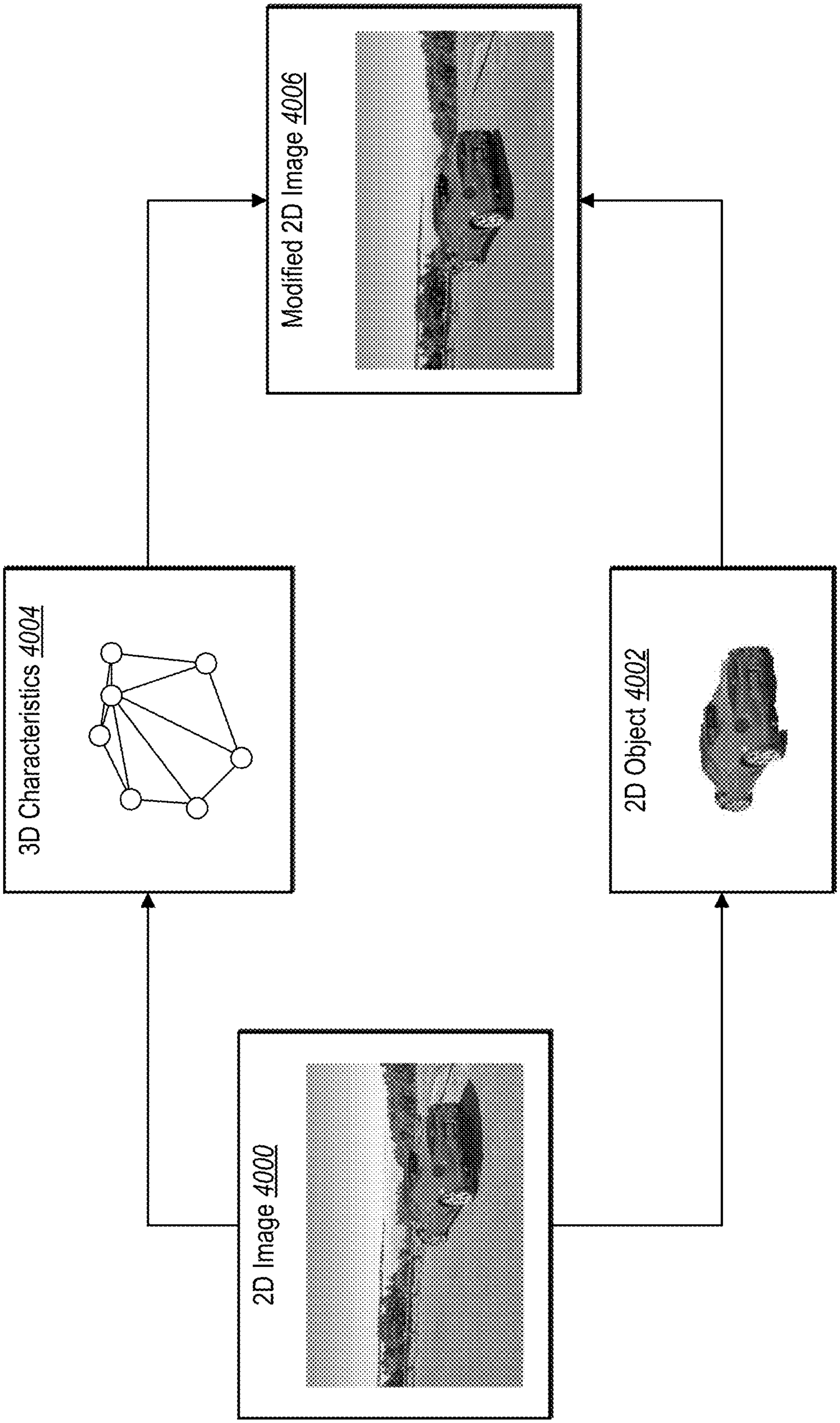
FIG. 40 illustrates an overview diagram of the scene-based image editing system modifying a two-dimensional image by placing a two-dimensional object according to three-dimensional characteristics of a scene of the two-dimensional image in accordance with one or more embodiments.

FIG. 40 illustrates an overview of the scene-based image editing system 106 modifying a two-dimensional image by placing a two-dimensional object according to three-dimensional characteristics of a scene of the two-dimensional image. In particular, the scene-based image editing system 106 provides tools for editing a two-dimensional image 4000. For example, the scene-based image editing system 106 provides tools for editing objects within the two-dimensional image 4000 or inserting objects into the two-dimensional image 4000 and generating shadows based on the edited image.

In one or more embodiments, the scene-based image editing system 106 detects a request to place a two-dimensional object 4002 at a selected position within the two-dimensional image 4000. For example, the scene-based image editing system 106 determines that the two-dimensional object 4002 includes an object detected within the two-dimensional image 4000. In additional embodiments, the scene-based image editing system 106 determines that the two-dimensional object 4002 includes an object inserted into the two-dimensional image 4000.

According to one or more embodiments, the scene in the two-dimensional image 4000 includes one or more foreground and/or one or more background objects. As an example, the two-dimensional image 4000 of FIG. 40 includes a foreground object such as a car against a background that includes a scenic overlook. In some embodiments, a two-dimensional image includes one or more objects that the scene-based image editing system 106 determines are part of a background and no foreground objects.

In one or more embodiments, in connection with editing the two-dimensional image 4000, the scene-based image editing system 106 processes the two-dimensional image 4000 to obtain a three-dimensional understanding of a scene in the two-dimensional image 4000. For example, the scene-based image editing system 106 determines three-dimensional characteristics 4004 of the scene in the two-dimensional image 4000. In some embodiments, the scene-based image editing system 106 determines the three-dimensional characteristics 4004 by determining a relative positioning of objects in the two-dimensional image 4000 in three-dimensional space. To illustrate, the scene-based image editing system 106 determines the three-dimensional characteristics 4004 by estimating depth values of pixels in the two-dimensional image 4000. In additional embodiments, the scene-based image editing system 106 generates a three-dimensional mesh (or a plurality of three-dimensional meshes) representing the scene in the two-dimensional image 4000.

According to one or more embodiments, as illustrated in FIG. 40, the scene-based image editing system 106 utilizes the three-dimensional characteristics 4004 to generate a modified two-dimensional image 4006 including the two-dimensional object 4002 at a selected position. Specifically, the scene-based image editing system 106 utilizes the three-dimensional characteristics 4004 to determine where to place the two-dimensional image relative to one or more other objects and generate realistic shading according to the three-dimensional understanding of the scene. For instance, the scene-based image editing system 106 utilizes the three-dimensional characteristics 4004 to determine object and scene meshes and determine where the object is located in three-dimensional space relative to one or more other objects in the scene.

Additionally, the scene-based image editing system 106 generates the modified two-dimensional image 4006 to include one or more shadows based on the position of the two-dimensional object 4002 relative to the other object(s) in the scene. In particular, the scene-based image editing system 106 utilizes the three-dimensional characteristics 4004 of the object and scene, along with image lighting parameters, to generate shadow maps. Furthermore, the scene-based image editing system 106 renders the modified two-dimensional image 4006 by merging the shadow maps according to the relative positioning of the two-dimensional object 4002 and the one or more other objects (e.g., a background object) in the scene to determine the correct placement, direction, and shape of the one or more shadows in the modified two-dimensional image 4006. Thus, the scene-based image editing system 106 provides editing of two-dimensional images with accurate movement, insertion, and shadowing of objects according to automatically determined three-dimensional characteristics of two-dimensional scenes.

In one or more embodiments, the scene-based image editing system 106 provides improvements over conventional systems that provide shadow generation and editing in digital images. For example, in contrast to conventional systems that use image-based shadow generation in two-dimensional images, the scene-based image editing system 106 leverages a three-dimensional understanding of content in two-dimensional images to generate shadows. Specifically, the scene-based image editing system 106 can reconstruct a scene of a two-dimensional image in a three-dimensional space for use in determining whether, and how, modifications to content in the two-dimensional image affect shadows within the scene. To illustrate, the scene-based image editing system 106 provides plausible shadow interaction while moving existing and virtual objects within the two-dimensional images according to the three-dimensional representations of the scenes.

By generating a three-dimensional representation of a two-dimensional scene in a two-dimensional image, the scene-based image editing system 106 generates shadows in real-time according to a three-dimensional understanding of the content for presentation within a graphical user interface. In particular, in contrast to conventional systems that utilize deep learning to generate shadows based on modified content in two-dimensional images, the scene-based image editing system 106 provides updated shadows as a user interacts with the scene. Thus, the scene-based image editing system 106 can provide users with an accurate rendering of modifications to shadows within a two-dimensional image according to the three-dimensional context of foreground and background objects (e.g., according to estimated depths and positions of the objects). Furthermore, by generating proxy objects to represent existing objects in a scene of a two-dimensional image, the scene-based image editing system can provide efficient and accurate shadow generation according to changes made to the corresponding objects in the scene.

Figure 41:
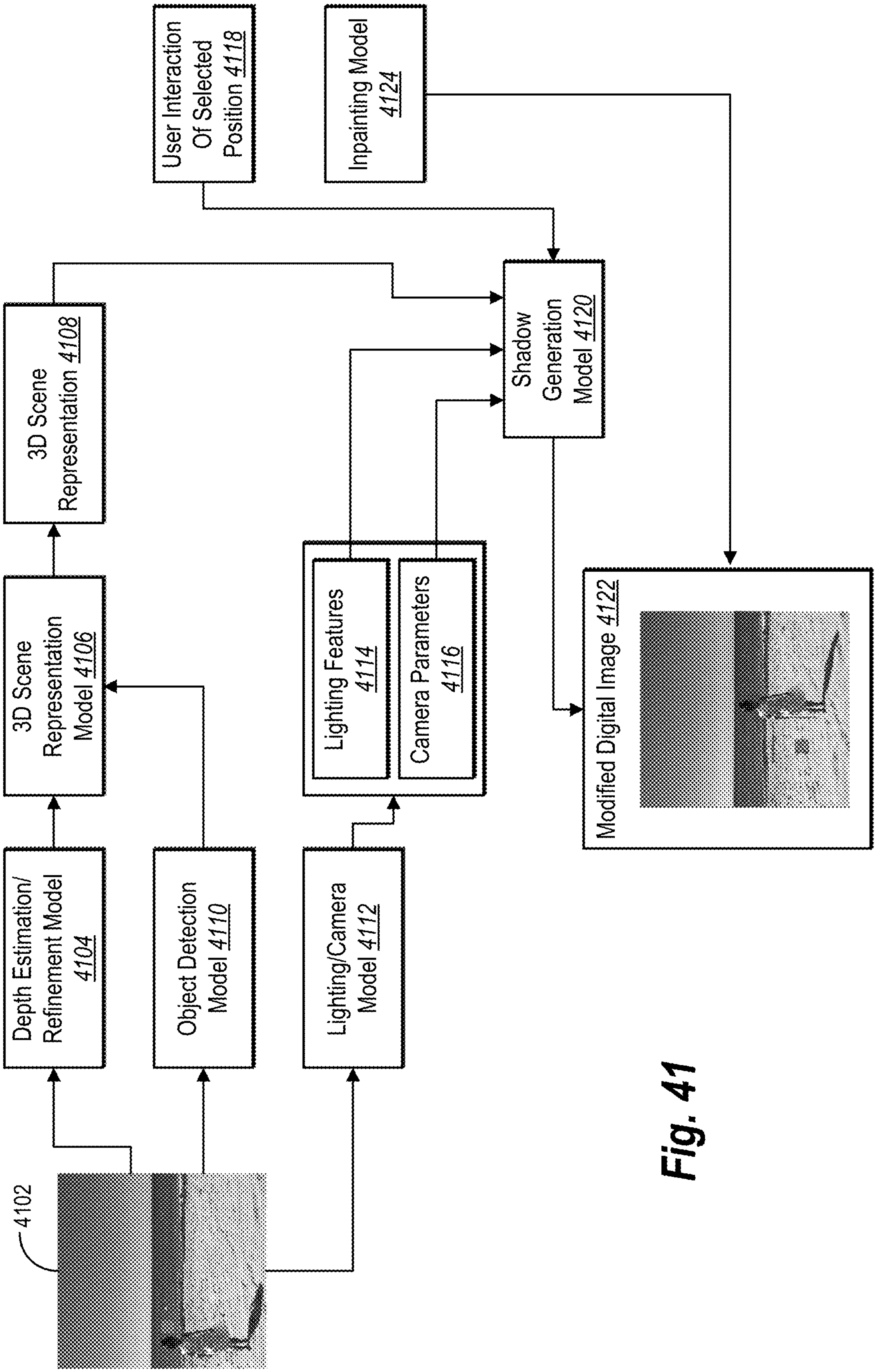
FIG. 41 illustrates a diagram of the scene-based image editing system utilizing a plurality of models to generate shadows for placing or moving objects in a two-dimensional image in accordance with one or more embodiments.

As mentioned, the scene-based image editing system 106 utilizes a plurality of models to modify two-dimensional images based on movement or insertion of objects within scenes of the two-dimensional images. Specifically, the scene-based image editing system 106 utilizes a plurality of models to extract features of two-dimensional images and determine lighting and structure of the two-dimensional images. FIG. 41 illustrates an embodiment in which the scene-based image editing system 106 utilizes a plurality of models to edit a two-dimensional image according to user interactions to place an object within a scene of the two-dimensional image. More specifically, the scene-based image editing system 106 utilizes the plurality of models to generate updated two-dimensional shadows according to extracted lighting and three-dimensional characteristics from the two-dimensional image.

As illustrated in FIG. 41, the scene-based image editing system 106 can utilize a variety of machine-learning models or neural networks to generate a modified digital image portraying a manipulated shadow modeled according to a three-dimensional scene extracted from a two-dimensional image. For example, FIG. 41 illustrates a digital image 4102. As shown, the scene-based image editing system 106 utilizes a depth estimation/refinement model 4104 to generate and/or refine a depth map for the digital image 4102. To illustrate, the scene-based image editing system 106 utilizes the depth estimation/refinement model 4104 to determine per-pixel depth values portrayed in the digital image 4102.

In one or more embodiments, the depth estimation/refinement model 4104 includes a depth estimation neural network to generate a depth map including per-pixel depth values for the digital image 4102 relative to a view of the digital image 4102. Specifically, the per-pixel depth values determine relative depth/distance from the view of the digital image 4102 (e.g., camera view) based on relative positioning of objects in the digital image 4102. To illustrate, the depth estimation model includes a monocular depth estimation model (e.g., a single image depth estimation model, or SIDE) with a convolutional neural network architecture. Alternatively, the depth estimation model utilizes a transformer model and/or leverage self-attention layers to generate the depth map. For example, in one or more embodiments, the scene-based image editing system 106 utilizes a depth estimation model as described in "Generating Depth Images Utilizing A Machine-Learning Model Built From Mixed Digital Image Sources And Multiple Loss Function Sets," U.S. patent application Ser. No. 17/186,436, filed Feb. 26, 2021, which is incorporated by reference in its entirety herein. In one or more embodiments, the depth estimation/refinement model 4104 generates the depth map by determining relative distances/depths of objects detected in the digital image 4102 for each pixel in the digital image 4102.

Additionally, in one or more embodiments, the depth estimation/refinement model includes a refinement model to refine the depth map for the digital image 4102. In particular, the refinement model leverages an image segmentation model of the digital image 4102 to generate (or otherwise obtain) a segmentation mask for the digital image 4102. To illustrate, the image segmentation model includes a convolutional neural network trained to segment digital objects from digital images. In one or more embodiments, the scene-based image editing system 106 utilizes an image segmentation model as described in "Deep Salient Content Neural Networks for Efficient Digital Object Segmentation," U.S. Patent Application Publication No. 2019/0130229, filed Oct. 31, 2017, which is incorporated by reference in its entirety herein. Furthermore, in one or more embodiments, the refinement model includes a model as described by Indeed, in one or more implementations, the scene-based image editing system 106 utilizes one or more approaches described by UTILIZING MACHINE LEARNING MODELS TO GENERATE REFINED DEPTH MAPS WITH SEGMENTATION MASK GUIDANCE, U.S. patent application Ser. No. 17/658,873, filed Apr. 12, 2022, which is incorporated by reference herein in its entirety.

FIG. 41 also illustrates that the scene-based image editing system 106 utilizes a three-dimensional scene representation model 4106 to generate a three-dimensional scene representation 4108 of a scene portrayed in the digital image 4102. In one or more embodiments, the three-dimensional scene representation model 4106 includes one or more neural networks for generating one or more three-dimensional meshes representing objects in the digital image 4102. For example, the three-dimensional scene representation model 4106 utilizes a depth map to generate one or more three-dimensional meshes representing the scene in digital image 4102. To illustrate, the three-dimensional scene representation model 4106 utilizes the per-pixel depth values of the depth map to generate vertices and connecting edges with coordinates in three-dimensional space to represent the scene of the digital image 4102 in the three-dimensional space according to a specific mesh resolution (e.g., a selected density or number of vertices/faces).

In some embodiments, the scene-based image editing system 106 utilizes one or more neural networks to generate a three-dimensional mesh representing one or more objects in the digital image 4102. For example, the scene-based image editing system 106 generates a three-dimensional mesh including a tessellation from pixel depth values and estimated camera parameters of the two-dimensional image. To illustrate, the scene-based image editing system 106 determines a mapping (e.g., a projection) between the three-dimensional mesh and pixels of the digital image 4102 for determining which portions of a three-dimensional mesh to modify in connection with editing the digital image 4102. In alternative embodiments, the scene-based image editing system 106 utilizes depth displacement information and/or adaptive sampling based on density information from the digital image 4102 to generate an adaptive three-dimensional mesh representing the content of the digital image 4102.

In one or more embodiments, the scene-based image editing system 106 detects objects in the digital image 4102. Specifically, in connection with generating the three-dimensional scene representation 4108 via the three-dimensional scene representation model 4106. For example, the scene-based image editing system 106 utilizes an object detection model 4110 to detect foreground and/or background objects in the digital image 4102 (e.g., via a segmentation mask generated by the image segmentation model above). In one or more embodiments, the object detection model 4110 includes or is part of the image segmentation model. The scene-based image editing system 106 thus utilizes the object detection model 4110 to provide information associated with various objects in the digital image 4102 to the three-dimensional scene representation model 4106. The three-dimensional scene representation model 4106 utilizes the object information and depth map to generate one or more three-dimensional meshes representing the one or more detected objects in the digital image 4102. Accordingly, the three-dimensional scene representation model 4106 generates the three-dimensional scene representation 4108 via one or more three-dimensional meshes representing the content of the digital image 4102 in accordance with the depth map generated by the depth estimation/refinement model 4104.

Furthermore, in one or more embodiments, the scene-based image editing system 106 estimates camera/lighting parameters of the digital image 4102. For instance, the scene-based image editing system 106 utilizes a lighting/camera model 4112 that extracts lighting features 4114 and camera parameters 4116 from the digital image 4102. To illustrate, the scene-based image editing system 106 utilizes the lighting/camera model 4112 to determine the one or more values or parameters of one or more light sources in the digital image 4102. Additionally, the scene-based image editing system 106 utilizes the lighting/camera model 4112 to determine one or more camera parameters based on a view represented in the digital image 4102. In one or more embodiments, the scene-based image editing system 106 utilizes a camera parameter estimation neural network as described in U.S. Pat. No. 11,094,083, filed Jan. 25, 2019, titled UTILIZING A CRITICAL EDGE DETECTION NEURAL NETWORK AND A GEOMETRIC MODEL TO DETERMINE CAMERA PARAMETERS FROM A SINGLE DIGITAL IMAGE, which is herein incorporated by reference in its entirety. In additional embodiments, the scene-based image editing system 106 extracts one or more camera parameters from metadata associated with the digital image 4102.

According to one or more embodiments, the scene-based image editing system 106 detects interactions with a client device to modify the digital image 4102. Specifically, the scene-based image editing system 106 detects a user interaction of a selected position 4118 in connection with an object within the digital image 4102. For example, the scene-based image editing system 106 detects a user interaction to insert an object or move an object within the digital image 4102. To illustrate, the user interaction of the selected position 4118 moves an object from one position to another position in the digital image 4102. Alternatively, the user interaction of the selected position 4118 inserts an object at a selected position in the digital image 4102.

In one or more embodiments, the scene-based image editing system 106 utilizes a shadow generation model 4120 to generate a modified digital image 4122 based on the digital image 4102. In particular, the shadow generation model 4120 generates the modified digital image 4122 by generating updated shadows according to the selected position of the object. To illustrate, the shadow generation model 4120 generates a plurality of shadow maps according to the three-dimensional scene representation 4108, the lighting features 4114, and the camera parameters 4116 corresponding to the digital image 4102. Additionally, the scene-based image editing system 106 utilizes the shadow generation model 4120 to generate the modified digital image 4122 based on the shadow maps.

In additional embodiments, the scene-based image editing system 106 utilizes an inpainting model 4124 to generate the modified digital image 4122. Specifically, the scene-based image editing system 106 utilizes the inpainting model 4124 to generate one or more inpainted regions in the modified digital image 4122 in response to moving an object from one position to another. For example, the scene-based image editing system 106 utilizes the inpainting model 4124 to fill in a portion of a three-dimensional mesh corresponding to the initial position of the object in three-dimensional space. The scene-based image editing system 106 also utilizes the inpainting model 4124 (or another inpainting model) to generate fill in a corresponding portion of the modified digital image 4122 in two-dimensional space. In one or more embodiments, the scene-based image editing system 106 utilizes an inpainting neural network as described in U.S. patent application Ser. No. 17/663,317, filed May 13, 2022, titled OBJECT CLASS INPAINTING IN DIGITAL IMAGES UTILIZING CLASS-SPECIFIC INPAINTING NEURAL NETWORKS or as described in U.S. patent application Ser. No. 17/815,409, filed Jul. 27, 2022, titled GENERATING NEURAL NETWORK BASED PERCEPTUAL ARTIFACT SEGMENTATIONS IN MODIFIED PORTIONS OF A DIGITAL IMAGE, which are herein incorporated by reference in their entirety.

Figure 42:
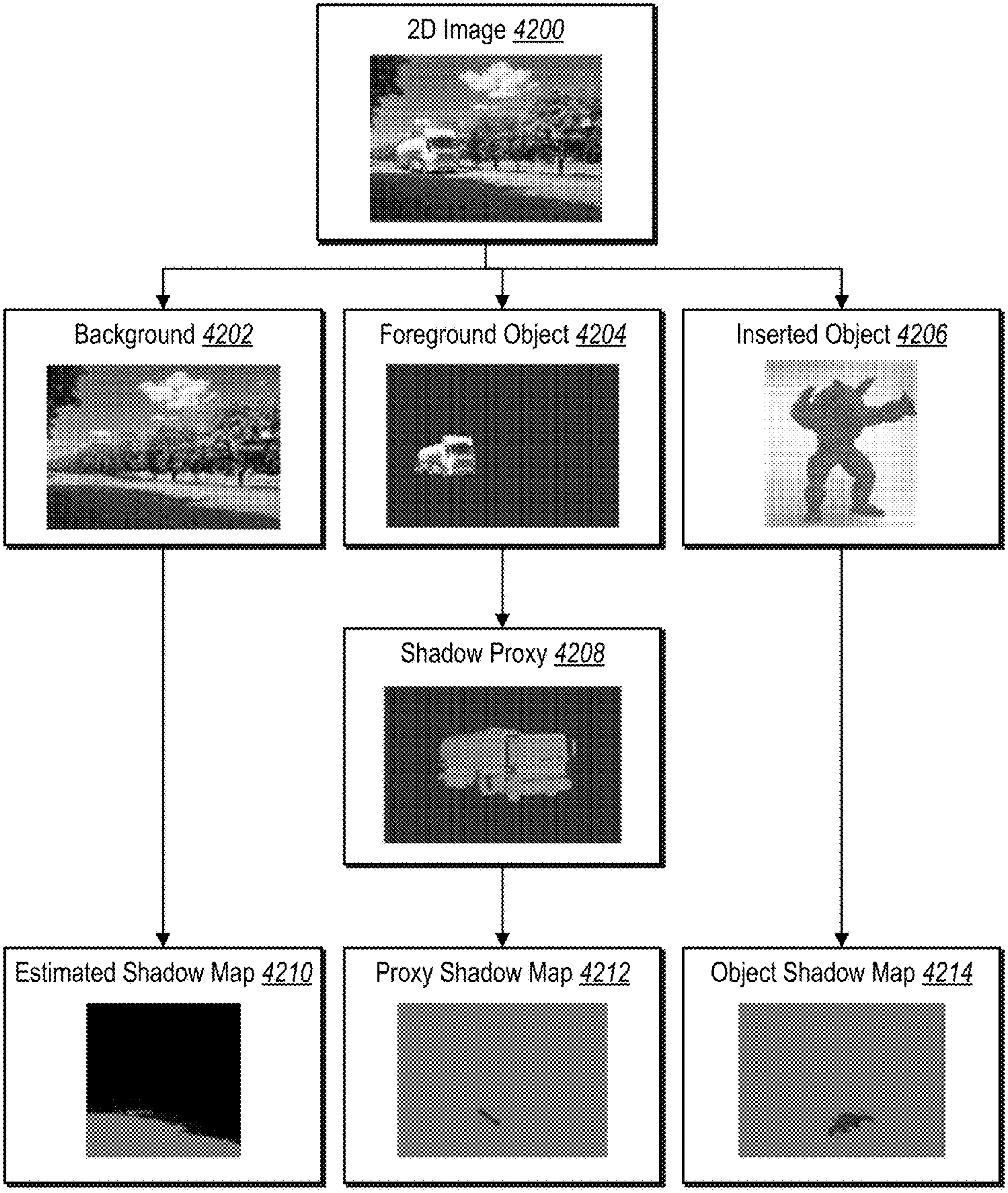
FIG. 42 illustrates a diagram of the scene-based image editing system generating shadow maps for a plurality of different types of objects in a two-dimensional image in accordance with one or more embodiments.

As mentioned, the scene-based image editing system 106 modifies two-dimensional images utilizing a plurality of shadow maps. FIG. 42 illustrates that the scene-based image editing system 106 edits a two-dimensional image by placing one or more objects within a scene of the two-dimensional image. Specifically, FIG. 42 illustrates that the scene-based image editing system 106 generates a plurality of shadow maps corresponding to different object types of the objects placed within the two-dimensional image.

In one or more embodiments, a shadow map includes a projection used in a process for determining whether and where to generate one or more shadows in a three-dimensional space. For example, a shadow map includes data indicating whether a particular object casts a shadow in one or more directions according to one or more light sources within a three-dimensional space. Accordingly, the scene-based image editing system 106 utilizes a shadow map to determine whether a particular pixel, in a rendered two-dimensional image based on a scene, is visible from a light source according to a depth value associated with the pixel (e.g., a corresponding three-dimensional position of a surface in three-dimensional space), a position and direction of a light source, and/or one or more intervening objects. The scene-based image editing system 106 thus utilizes a plurality of shadow maps to generate shadows according to positions of object(s) and/or light source(s) in a scene.

In one or more embodiments, the scene-based image editing system 106 processes a two-dimensional image 4200 including one or more foreground and/or background objects in a scene. For example, the scene-based image editing system 106 utilizes one or more image processing models (e.g., an object detection model) to extract a background 4202 from the two-dimensional image 4200. Additionally, the scene-based image editing system 106 utilizes the one or more image processing models to extract a foreground object 4204 from the two-dimensional image 4200. To illustrate, the scene-based image editing system 106 determines that the foreground object 4204 of the two-dimensional image 4200 includes a large vehicle and the background 4202 includes a roadway lined with trees.

In additional embodiments, the scene-based image editing system 106 also determines one or more additional objects for insertion into the two-dimensional image 4200 in connection with editing the two-dimensional image 4200. As an example, FIG. 42 illustrates an inserted object 4206 including a figure imported from a separate file or program. To illustrate, the inserted object 4206 includes a three-dimensional model with a previously generated three-dimensional mesh.

According to one or more embodiments, the scene-based image editing system 106 generates a plurality of shadow maps based on a plurality of shadow types corresponding to the extracted data from the two-dimensional image 4200. For example, the scene-based image editing system 106 determines separate foreground and background shadow maps. Additionally, the scene-based image editing system 106 generates a separate shadow map based on any objects inserted into the two-dimensional image 4200.

For instance, FIG. 42 illustrates that the scene-based image editing system 106 generates an estimated shadow map 4210 corresponding to the background 4202. Specifically, the scene-based image editing system 106 generates the estimated shadow map 4210 to represent shadows that correspond to one or more background objects and/or off-camera objects corresponding to the background 4202. To illustrate, the background 4202 includes shadows produced by trees lining a side of the roadway that are not visible (or only partially visible) within the two-dimensional image 4200. Additionally, in one or more embodiments, the scene-based image editing system 106 generates the estimated shadow map 4210 for shadows produced by ground formations or other objects that are part of the background scenery, such as mountains.

According to one or more embodiments, the scene-based image editing system 106 generates the estimated shadow map 4210 by determining pixels in the two-dimensional image 4200 that indicate shaded portions. In particular, the scene-based image editing system 106 extracts luminescence values (or other lighting-based values) indicating changes in pixel values of portions of the two-dimensional image 4200 due to shadows. The scene-based image editing system 106 utilizes the extracted values to identify specific regions of the two-dimensional image 4200 that are covered by background shadows. Additionally, the scene-based image editing system 106 utilizes camera parameters (e.g., a camera position) corresponding to the two-dimensional image 4200 to generate the shadow map for the shaded regions of the two-dimensional image 4200 (e.g., based on projected rays from the camera position in connection with background depth values or a background mesh). In some embodiments, the scene-based image editing system 106 renders a background mesh with the estimated shadow map 4210 as a texture, in which the scene-based image editing system 106 writes masked regions to the estimated shadow map 4210 as occluded pixels at infinity.

In one or more embodiments, the scene-based image editing system 106 also generates a separate shadow map for the foreground object 4204. Specifically, the foreground object 4204 detected in the two-dimensional image 4200 may include a partial object based on visible portions of the foreground object 4204. For example, when determining three-dimensional characteristics of the foreground object 4204, the scene-based image editing system 106 determines the three-dimensional characteristics for the visible portion. In some embodiments, the scene-based image editing system 106 generates a partial three-dimensional mesh representing the visible portion of the foreground object 4204.

Accordingly, in one or more embodiments, the scene-based image editing system 106 generates a shadow proxy 4208 to include a more complete representation of the foreground object 4204. For instance, the scene-based image editing system 106 generates the shadow proxy 4208 to determine one or more shadows cast by the foreground object 4204 by estimating a complete (or more complete) three-dimensional shape for the foreground object 4204. In some embodiments, as described in more detail with respect to FIGS. 47A-47B below, the scene-based image editing system 106 generates the shadow proxy 4208 to replace one or more shadows corresponding to the foreground object 4204 within the scene of the two-dimensional image 4200.

In at least some embodiments, the scene-based image editing system 106 generates a proxy shadow map 4212 for the foreground object 4204 utilizing the shadow proxy 4208. Specifically, the scene-based image editing system 106 generates the proxy shadow map 4212 for generating one or more shadows in connection with the shadow proxy 4208. To illustrate, the scene-based image editing system 106 generates the proxy shadow map 4212 to include one or more shadows based on the shadow proxy 4208, rather than based on the foreground object 4204. In connection with generating the proxy shadow map 4212, in one or more embodiments, the scene-based image editing system 106 removes one or more shadows generated by the foreground object 4204. Thus, the scene-based image editing system 106 utilizes the proxy shadow map 4212 as a replacement for original shadows of the foreground object 4204.

FIG. 42 further illustrates that the scene-based image editing system 106 generates an object shadow map 4214 representing the inserted object 4206. In particular, the scene-based image editing system 106 generates the object shadow map 4214 to represent any objects inserted into the two-dimensional image 4200 for which the scene-based image editing system 106 has determined a previously generated three-dimensional mesh (or already existing three-dimensional mesh). For example, the scene-based image editing system 106 determines that one or more objects inserted into the two-dimensional image 4200 have corresponding three-dimensional meshes imported from one or more other files or applications.

Accordingly, as indicated above, the scene-based image editing system 106 generates each of the separate shadow maps in connection with a plurality of different object types or shadow types. For example, the different shadow maps include different information for generating shadows based on corresponding object types. To illustrate, the scene-based image editing system 106 determines whether each object type is visible within the two-dimensional image 4200, is lit, casts shadow, or receives shadow. The scene-based image editing system 106 also determines whether each object type receives shadow from one or more other specific object types.

As an example, the scene-based image editing system 106 determines that background objects (e.g., the background 4202) are visible, unlit, and do not cast shadows (e.g., due to being part of the background). Furthermore, the scene-based image editing system 106 determines that the background objects receive shadow from shadow proxies and inserted objects. In one or more embodiments, the scene-based image editing system 106 determines that foreground objects (e.g., the foreground object 4204) are visible, unlit, and do not cast shadow (e.g., due to having incomplete three-dimensional characteristic data). The scene-based image editing system 106 also determines that the foreground objects receive shadow from inserted objects and the estimated shadow map 4210. In additional embodiments, the scene-based image editing system 106 also determines that inserted objects (e.g., the inserted object 4206) are visible, lit, cast shadow, and receive shadow from all other shadow sources.

In one or more embodiments, although FIG. 42 illustrates individual objects of each object type, the scene-based image editing system 106 alternatively determines that one or more object types have a plurality of objects. For example, the scene-based image editing system 106 determines that a two-dimensional image includes more than one foreground object and/or more than one inserted object. Accordingly, the scene-based image editing system 106 generates each shadow map in connection with all objects of the corresponding type. To illustrate, the scene-based image editing system 106 generates a proxy shadow map in connection with a plurality of foreground objects or an object shadow map in connection with a plurality of inserted objects.

Figure 43:
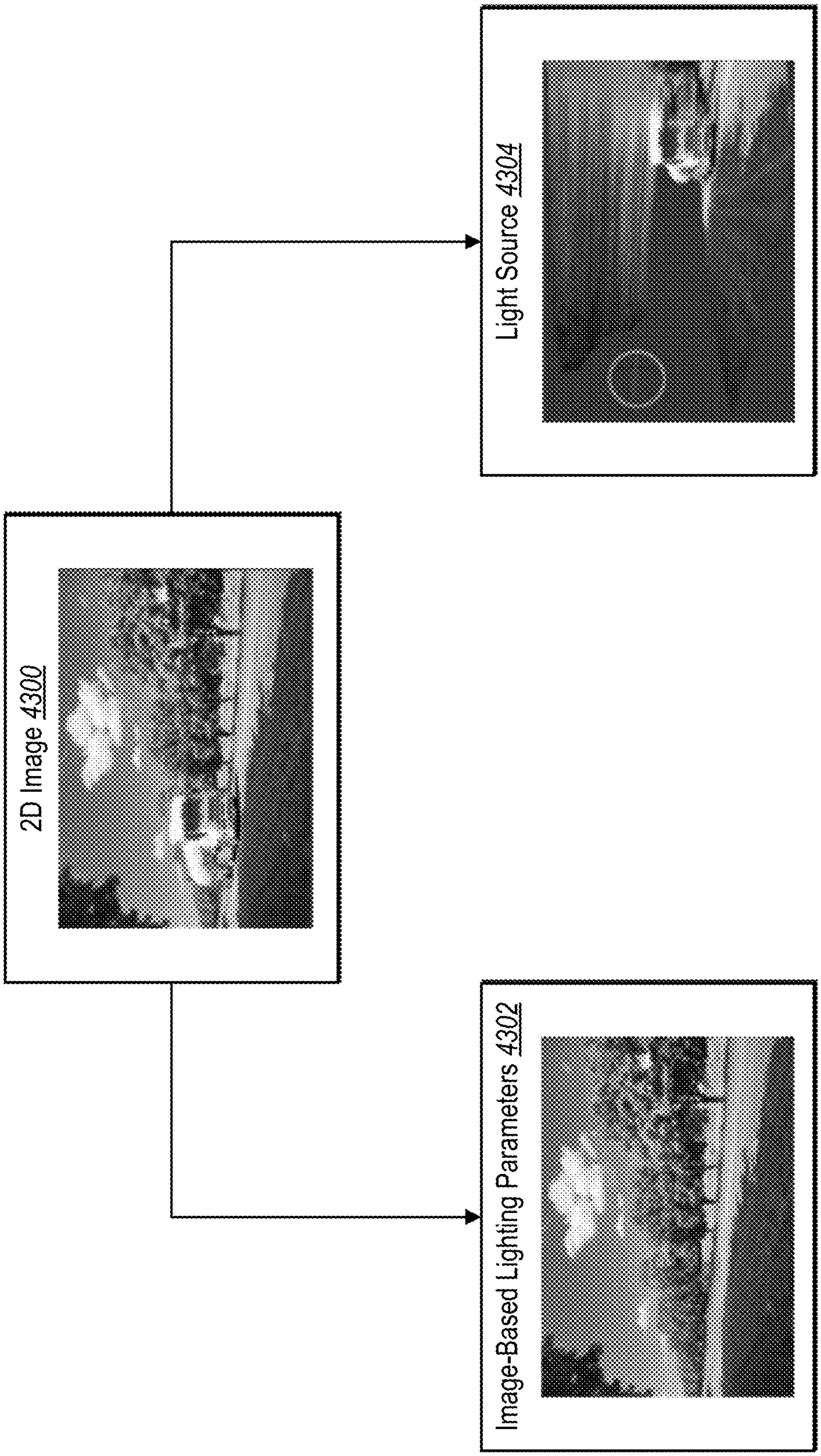
FIG. 43 illustrates a diagram of the scene-based image editing system determining lighting features of a two-dimensional image in accordance with one or more embodiments.

According to one or more embodiments, in response to generating a plurality of shadow maps for a plurality of object types in connection with editing a two-dimensional image, the scene-based image editing system 106 utilizes the shadow maps to generate a modified two-dimensional image. For example, the scene-based image editing system 106 utilizes camera and lighting information associated with the two-dimensional image to generate realistic shadows in the modified two-dimensional image according to the shadow maps. FIG. 43 illustrates a diagram of the scene-based image editing system 106 determining lighting information associated with a two-dimensional image 4300.

Specifically, FIG. 43 illustrates that the scene-based image editing system 106 processes the two-dimensional image 4300 to determine image-based lighting parameters 4302 and a light source 4304. For example, the scene-based image editing system 106 utilizes one or more image processing models to estimate the location, brightness, color, and/or tone of the light source 4304. Furthermore, the scene-based image editing system 106 utilizes the one or more image processing models to determine a camera position/location, focal length, or other camera parameters relative to the light source 4304. In one or more embodiments, the scene-based image editing system 106 utilizes a machine-learning model as described in U.S. patent application Ser. No. 16/558,975, filed Sep. 3, 2019, titled DYNAMICALLY ESTIMATING LIGHT-SOURCE-SPECIFIC PARAMETERS FOR DIGITAL IMAGES USING A NEURAL NETWORK, which is herein incorporated by reference in its entirety.

According to one or more embodiments, in response to determining lighting parameters for one or more light sources based on a two-dimensional image, the scene-based image editing system 106 inserts one or more corresponding light sources into a three-dimensional space with a three-dimensional representation of a scene in the two-dimensional image. Specifically, the scene-based image editing system 106 utilizes an estimated light source position, an estimated light source direction, an estimated light source intensity, and an estimated light source type (e.g., a point source, a linear source, an area source, an image based light source, or a global source) to insert a light source into the three-dimensional space. To illustrate, the scene-based image editing system 106 inserts a light source at the specific location and with the specific parameters estimated from the two-dimensional image 4300 to provide light to a plurality of three-dimensional objects (e.g., a foreground object and a background object) for rendering according to the image-based lighting parameters 4302 and the estimated camera parameters.

Figure 44:
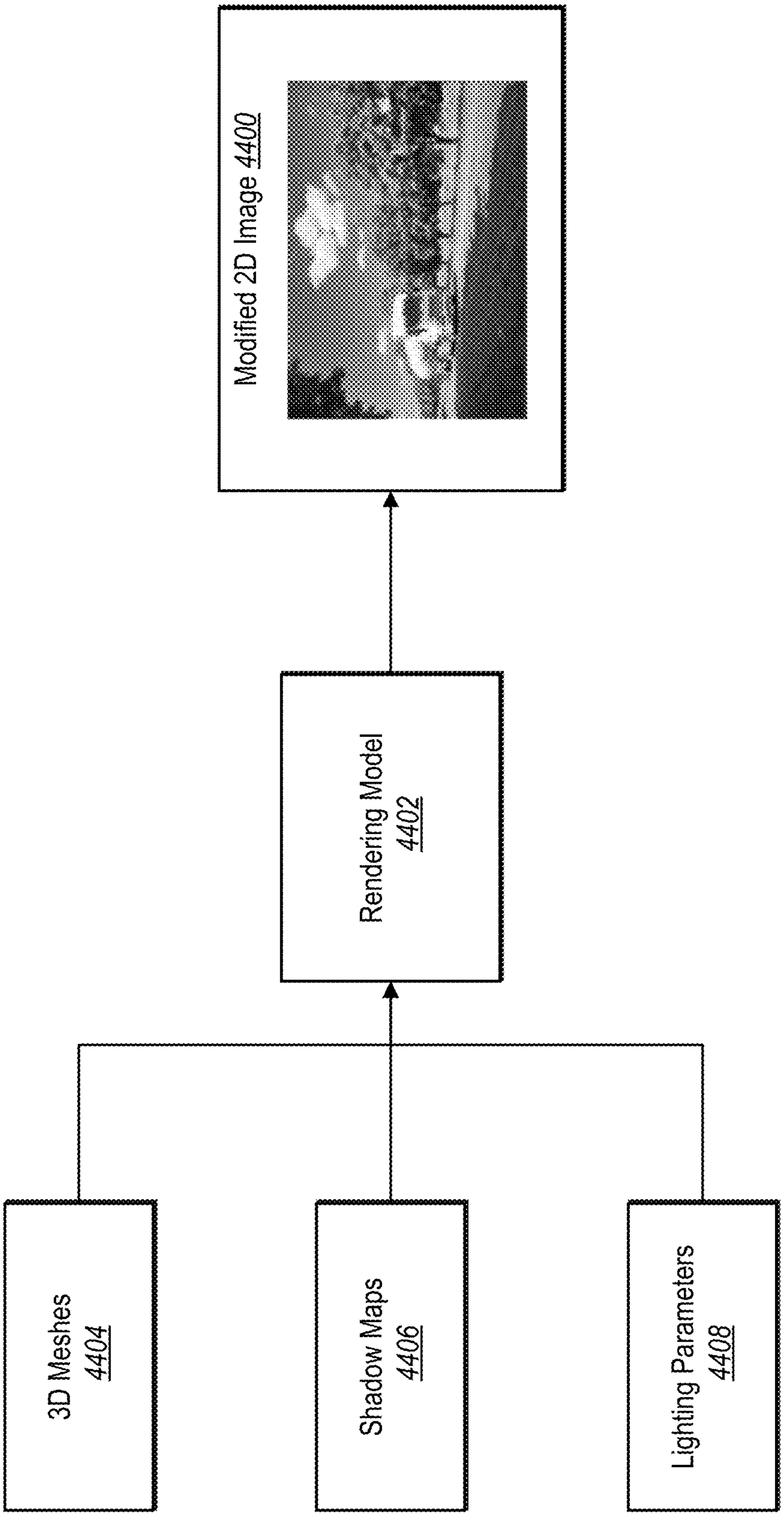
FIG. 44 illustrates an a diagram of the scene-based image editing system utilizing a rendering model to generate a modified two-dimensional image based on an object placed in a two-dimensional image in accordance with one or more embodiments.

In connection with determining lighting parameters for one or more light sources in a digital image and/or one or more camera parameters of a digital image, the scene-based image editing system 106 renders a modified digital image in response to user inputs. FIG. 44 illustrates that the scene-based image editing system 106 generates a modified two-dimensional image 4400 based on one or more objects inserted or modified within a two-dimensional image (e.g., the two-dimensional image 4200 of FIG. 42). Additionally, FIG. 44 illustrates that the scene-based image editing system 106 utilizes lighting data, shading data, and three-dimensional characteristics of content in the two-dimensional image to generate the modified two-dimensional image 4400.

According to one or more embodiments, the scene-based image editing system 106 utilizes a rendering model 4402 to process data from a two-dimensional image and one or more objects associated with the two-dimensional image. For example, the scene-based image editing system 106 utilizes the rendering model 4402, which includes a three-dimensional rendering model, to generate the modified two-dimensional image 4400 based on three-dimensional meshes 4404 representing one or more objects in the two-dimensional image. Additionally, the scene-based image editing system 106 utilizes the rendering model 4402 to generate shadows for the one or more objects according to shadow maps 4406 and the lighting parameters 4408. Thus, the scene-based image editing system 106 reconstructs a scene in the two-dimensional image utilizing the three-dimensional meshes 4404, the shadow maps 4406, and the lighting parameters 4408.

In one or more embodiments, the scene-based image editing system 106 utilizes the shadow maps to generate one or more shadows for one or more foreground objects and/or one or more inserted objects. Specifically, the scene-based image editing system 106 utilizes the lighting parameters (e.g., a light source position) to merge the shadow maps for compositing the modified two-dimensional image 4400. For instance, the scene-based image editing system 106 utilizes the rendering model 4402 to merge the shadow maps 4406 based on the object types and relative positions of the three-dimensional meshes 4404 according to the lighting parameters 4408. To illustrate, as mentioned, the scene-based image editing system 106 merges the shadow maps 4406 to create a foreground shadow map and a background shadow map. In some embodiments, the scene-based image editing system 106 also merges the shadow maps 4406 to generate an inserted shadow map for one or more inserted objects.

As an example, the scene-based image editing system 106 generates a foreground shadow map by merging an estimated shadow map corresponding to a background of the two-dimensional image and an object shadow map corresponding to an inserted object. In particular, the scene-based image editing system 106 generates the foreground shadow map as: FOREGROUND(x)=min(INSERTED(x), SHADOWMASK(x)), in which OBJECT represents an object shadow map, SHADOWMASK represents an estimated shadow map, and x represents a distance from a light source for a particular pixel. Additionally, the scene-based image editing system 106 generates the background shadow map as: BACKGROUND(x)=max(1−FOREGROUND(x), min (OBJECT(x), PROXY(x))), in which PROXY represents a proxy shadow map. Furthermore, the scene-based image editing system 106 generates an inserted shadow map as: INSERTED(x)=min(FOREGROUND(x), PROXY(x)). By merging the shadow maps as described above, the scene-based image editing system 106 thus detects whether a first object is between a light source and a second object for determining how to shade the first object and/or the second object.

In one or more embodiments, the scene-based image editing system 106 applies the merged shadow maps when shading individual objects in a scene according to the object type/category of each object. In particular, as mentioned, the scene-based image editing system 106 shades inserted objects using a physically based rendering shader by sampling the object shadow map to calculate a light intensity. In one or more embodiments, the scene-based image editing system 106 does not render proxy objects in the final color output (e.g., the proxy objects are hidden from view in the modified two-dimensional image 4400). Furthermore, the scene-based image editing system 106 generates background and foreground object colors by: COLOR(x)=(SHADOW_FACTOR(x))*TEXTURE(x)+(1−SHADOW_FACTOR(x))*SHADOW_COLOR. SHAD- OW_FACTOR is a value that the scene-based image editing system 106 generates by sampling the appropriate shadow map, with a larger sampling radius producing softer shadows. Additionally, SHADOW_COLOR represents the ambient light, which the scene-based image editing system 106 determines via a shadow estimation model or based on user input. TEXTURE represents a texture applied to the three-dimensional meshes 4404 according to corresponding pixel values in the two-dimensional image.

Although the above embodiment includes the scene-based image editing system 106 merging shadow maps for a background, a shadow proxy, and an inserted object for a digital image, in some embodiments, the scene-based image editing system 106 generates and merges subsets of combinations of the above-indicated shadow maps. For instance, in some embodiments, the scene-based image editing system 106 generates an estimated shadow map based on a background of a two-dimensional image and a proxy shadow map based on a proxy three-dimensional mesh for a foreground object without generating a shadow map for inserted objects (e.g., in response to determining that the two-dimensional image does not have any inserted objects). The scene-based image editing system 106 merges the estimated shadow map and the proxy shadow map to generate a modified two-dimensional image. Alternatively, the scene-based image editing system 106 merges an estimated shadow map and a shadow map for one or more inserted objects without a proxy shadow map (e.g., in response to determining that the two-dimensional image does not have any other foreground objects). Thus, the scene-based image editing system 106 can utilize the above equations for merging and applying the different shadow maps for different object types according to the specific objects in the two-dimensional image.

Additionally, the scene-based image editing system 106 utilizes the lighting parameters 4408 to determine lighting and coloring of the objects in the scene of the modified two-dimensional image 4400. For example, when rendering the modified two-dimensional image 4400, the scene-based image editing system 106 determines ambient lighting, ambient occlusion, reflection, and/or other effects based on the lighting parameters 4408 and the three-dimensional meshes 4404. In one or more embodiments, the scene-based image editing system 106 determines the ambient lighting by blurring a copy of the two-dimensional image, wrapping the blurred copy of the two-dimensional image around the three-dimensional meshes 4404 (e.g., generating a 360-degree environment surrounding the scene), and renders the resulting scene. In alternative embodiments, the scene-based image editing system 106 utilizes one or more neural networks to determine lighting from one or more hidden/off-camera portions of the scene for use during rendering of the modified two-dimensional image 4400.

Figure 45:
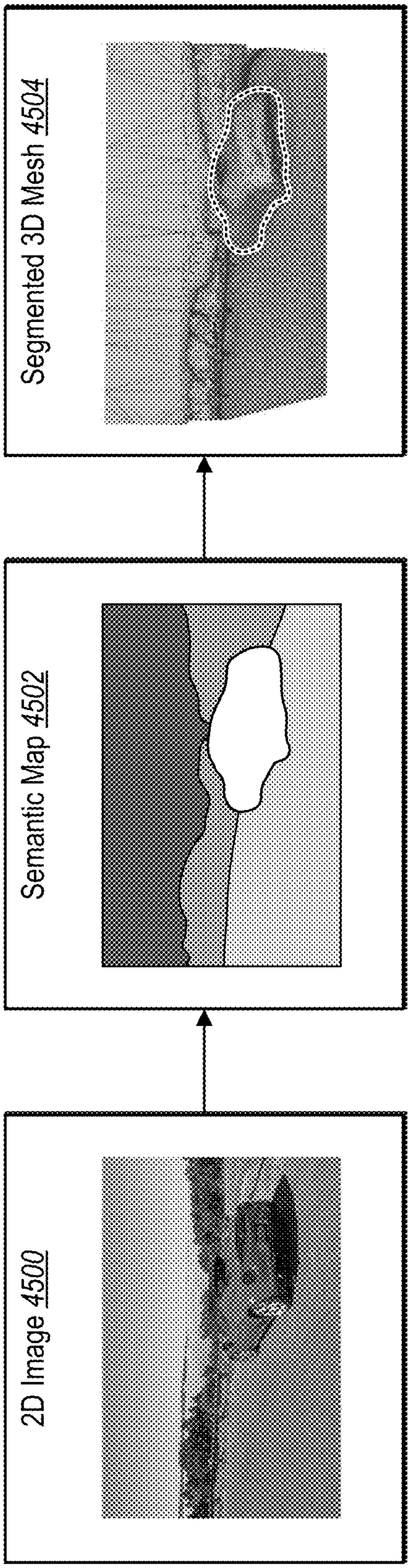
FIG. 45 illustrates a diagram of the scene-based image editing system generating a segmented three-dimensional mesh for a two-dimensional image in accordance with one or more embodiments.

As mentioned, in one or more embodiments, the scene-based image editing system 106 provides object segmentation in a two-dimensional image. For example, the scene-based image editing system 106 utilizes object segmentation to identify foreground/background objects and/or for generating three-dimensional meshes corresponding to the foreground/background objects. FIG. 45 illustrates an overview of the scene-based image editing system 106 generating a semantic map to indicate separate objects within a two-dimensional image for generating one or more two-dimensional object meshes in a corresponding three-dimensional representation of a scene of the two-dimensional image.

As illustrated in FIG. 45, the scene-based image editing system 106 determines a two-dimensional image 4500. For example, the two-dimensional image 4500 includes a plurality of objects—e.g., one or more objects in a foreground region and/or one or more objects in a background region. In one or more embodiments, the scene-based image editing system 106 utilizes a semantic segmentation neural network (e.g., an object detection model, a deep learning model) to automatically label pixels of the two-dimensional image 4500 into object classifications based on detected objects in the two-dimensional image 4500. In various embodiments, the scene-based image editing system 106 utilizes a variety of models or architectures to determine object classifications and image segmentations, as previously indicated. Additionally, the scene-based image editing system 106 generates a semantic map 4502 including the object classifications of the pixels of the two-dimensional image 4500.

In one or more embodiments, the scene-based image editing system 106 utilizes the semantic map 4502 to generate a segmented three-dimensional mesh 4504. Specifically, the scene-based image editing system 106 utilizes the object classifications of the pixels in the two-dimensional image 4500 to determine portions of a three-dimensional mesh that correspond to the objects in the two-dimensional image 4500. For example, the scene-based image editing system 106 utilizes a mapping between the two-dimensional image 4500 and the three-dimensional mesh representing the two-dimensional image 4500 to determine object classifications of portions of the three-dimensional mesh. To illustrate, the scene-based image editing system 106 determines specific vertices of the three-dimensional mesh that correspond to a specific object (e.g., a foreground object) detected in the two-dimensional image 4500 based on the mapping between the two-dimensional image 4500 and the two-dimensional image 4500.

In one or more embodiments, in response to determining that different portions of a three-dimensional mesh associated with a two-dimensional image correspond to different objects, the scene-based image editing system 106 segments the three-dimensional mesh. In particular, the scene-based image editing system 106 utilizes the object classification information associated with portions of the three-dimensional mesh to separate the three-dimensional mesh into a plurality of separate three-dimensional object meshes. For instance, the scene-based image editing system 106 determines that a portion of the three-dimensional mesh corresponds to the car in the two-dimensional image 4500 and separates the portion of the three-dimensional mesh corresponding to the car from the rest of the three-dimensional mesh.

Accordingly, in one or more embodiments, the scene-based image editing system 106 segments a three-dimensional mesh into two or more separate meshes corresponding to a two-dimensional image. To illustrate, the scene-based image editing system 106 generates the segmented three-dimensional mesh 4504 by separating the two-dimensional image 4500 into a plurality of separate three-dimensional object meshes in the scene. For example, the scene-based image editing system 106 generates a three-dimensional object mesh corresponding to the car, a three-dimensional object mesh corresponding to the road, one or more three-dimensional object meshes corresponding to the one or more groups of trees, etc.

In additional embodiments, the scene-based image editing system 106 segments a three-dimensional mesh based on a subset of objects in a two-dimensional image. To illustrate, the scene-based image editing system 106 determines one or more objects in the two-dimensional image 4500 for segmenting the three-dimensional mesh. For example, the scene-based image editing system 106 determines one or more objects in a foreground of the two-dimensional image 4500 for generating separate three-dimensional object meshes. In some embodiments, the scene-based image editing system 106 determines a prominence (e.g., proportional size) of the objects for generating separate three-dimensional object meshes. In one or more embodiments, the scene-based image editing system 106 determines one or more objects in response to a selection of one or more objects (e.g., a manual selection of the car in the two-dimensional image 4500 via a graphical user interface displaying the two-dimensional image 4500). Alternatively, the scene-based image editing system 106 determines whether the objects belong to a foreground or background and generates separate meshes for only foreground objects.

Figure 46A:
FIGS. 46A-46C illustrate graphical user interfaces for moving an object in a two-dimensional image with realistic shadow generation in accordance with one or more embodiments.
Figure 46B:
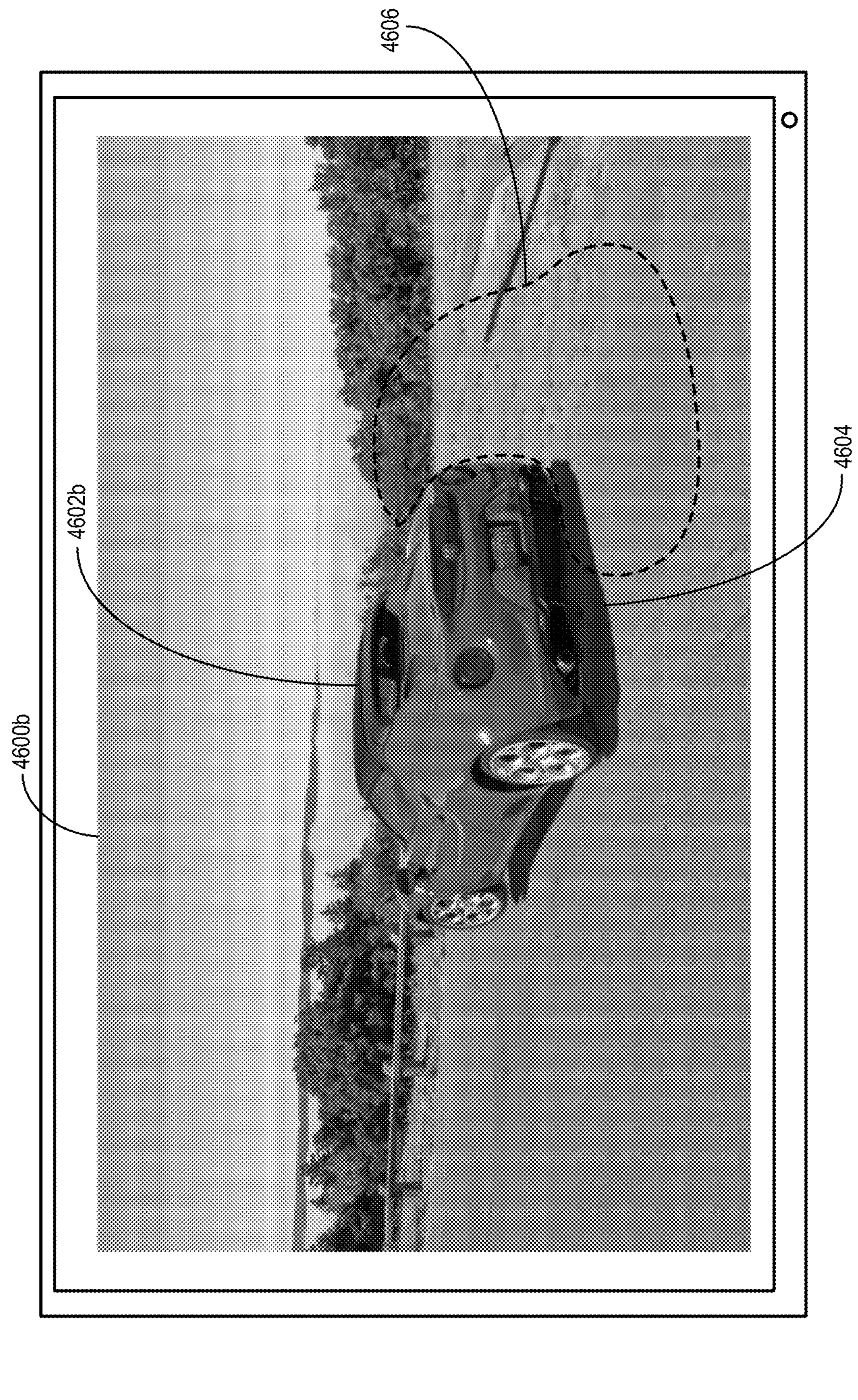
Figure 46C:
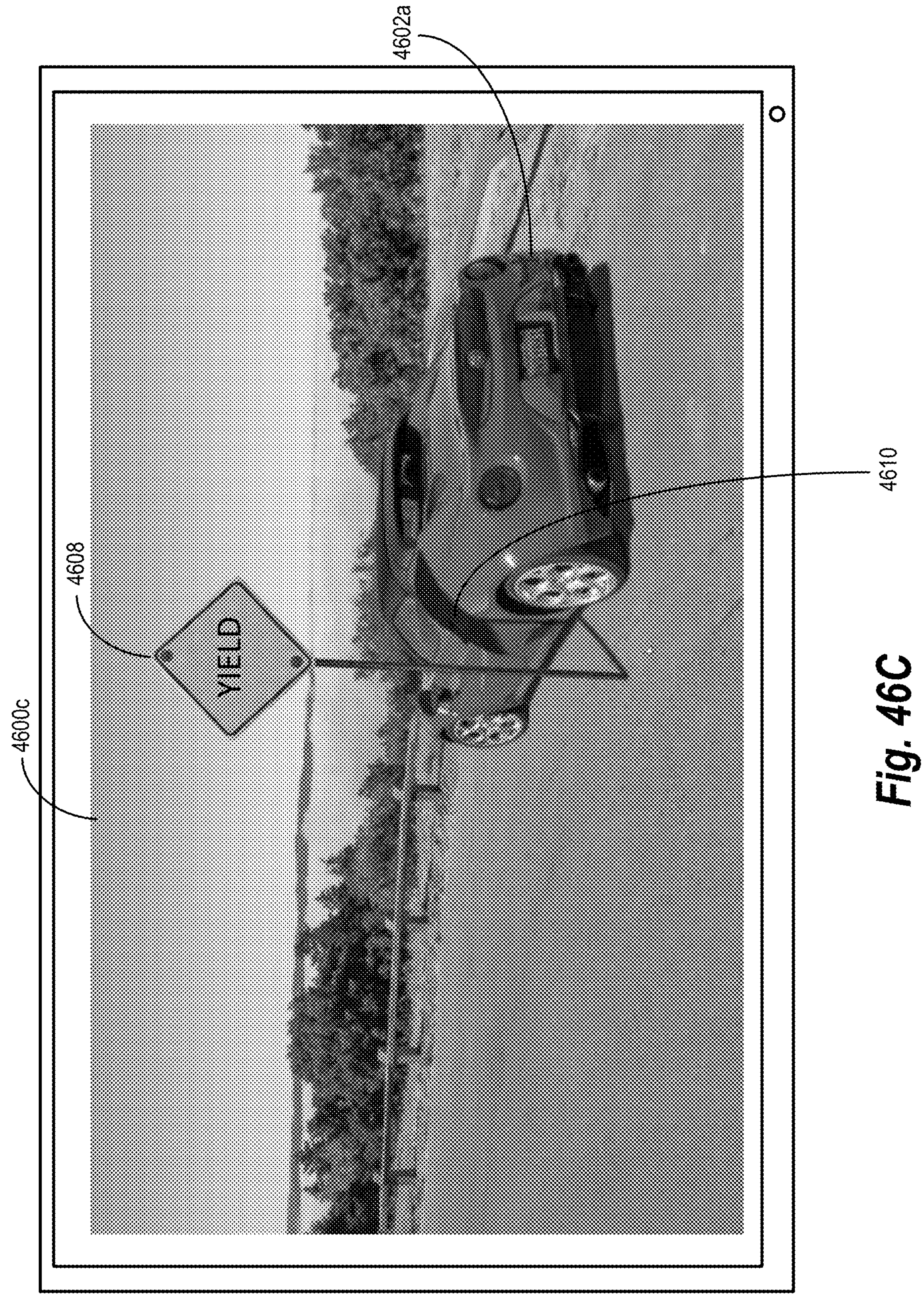

According to one or more embodiments, the scene-based image editing system 106 provides tools for editing two-dimensional digital images according to estimated three-dimensional characteristics of the digital images. FIGS. 46A-46C illustrates graphical user interfaces of a client device for editing a two-dimensional image based on a generated three-dimensional representation of the two-dimensional image. For example, the scene-based image editing system 106 provides tools for moving objects within the two-dimensional image and/or inserting (e.g., importing) objects into the two-dimensional image.

In one or more embodiments, as illustrated in FIG. 46A, a client device displays a two-dimensional image 4600*a* for editing within a client application. For example, the client application includes a digital image editing application including a plurality of tools for generating a digital image or performing various modifications to a digital image. Accordingly, the client device displays the two-dimensional image 4600*a* for modifying via interactions with one or more objects in the two-dimensional image 4600*a*.

In connection with editing the two-dimensional image 4600*a*, the scene-based image editing system 106 determines three-dimensional characteristics of a scene in the two-dimensional image 4600*a*. For instance, the scene-based image editing system 106 utilizes one or more neural networks to generate one or more three-dimensional meshes corresponding to objects in the scene of the two-dimensional image 4600*a*. To illustrate, the scene-based image editing system 106 generates a first three-dimensional mesh representing a plurality of background objects in the background of the scene. Additionally, the scene-based image editing system 106 generates a second three-dimensional mesh representing a foreground object 4602*a* at a first position within the scene of the two-dimensional image 4600*a* (e.g., by segmenting the second three-dimensional mesh from the first three-dimensional mesh). In some embodiments, the scene-based image editing system 106 generates one or more additional three-dimensional meshes corresponding to one or more additional detected foreground objects (e.g., one or more portions of the fence shown in the two-dimensional image 4600*a*).

According to one or more embodiments, in response to an input selecting an object in the two-dimensional image 4600*a* via the graphical user interface of the client device, the scene-based image editing system 106 provides one or more options for placing the selected object within the two-dimensional image 4600*a*. Specifically, the client device provides a tool within the client application by which a user can select to move an object within the two-dimensional image 4600*a*. For example, in response to a selection of the foreground object 4602*a*, the scene-based image editing system 106 selects a three-dimensional mesh corresponding to the foreground object 4602*a*. To illustrate, the scene-based image editing system 106 selects a plurality of vertices corresponding to the three-dimensional mesh of the foreground object 4602*a* in response to the selection.

In one or more embodiments, the scene-based image editing system 106 modifies the two-dimensional image 4600*a* by changing a position of the selected object based on a user input via the client device. For instance, in response to a request to move the foreground object 4602*a* from a first position (e.g., an original position of the foreground object 4602*a*) to a second position, the scene-based image editing system 106 modifies the position of the corresponding three-dimensional mesh in three-dimensional space from a first position to a second position. Furthermore, the scene-based image editing system 106 updates the two-dimensional image 4600*a* displayed within the graphical user interface of the client device in response to moving the selected object.

FIG. 46B illustrates that the client device displays a modified two-dimensional image 4600*b* based on a moved foreground object 4602*b* from the first position illustrated in FIG. 46A to a second position. In particular, by generating a plurality of three-dimensional meshes corresponding to the foreground object(s) and background object(s) in a two-dimensional image, the scene-based image editing system 106 provides realistic shadows in connection with placing the moved foreground object 4602*b* at the second position. For example, as illustrated, the scene-based image editing system 106 generates an updated shadow 4604 for the moved foreground object 4602*b* at the new position within the modified two-dimensional image 4600*b*.

In one or more embodiments, the scene-based image editing system 106 removes a previous shadow corresponding to the foreground object 4602*a* at the first position (as in FIG. 46A). For example, the scene-based image editing system 106 utilizes the shadow removal operations described previously to remove the original shadow produced by the foreground object 4602*a* in relation to a light source for the two-dimensional image 4600*a*. In at least some embodiments, the scene-based image editing system 106 removes the initial shadow prior to moving the foreground object 4602*a* within the two-dimensional image 4600*a*. To illustrate, the scene-based image editing system 106 removes the initial shadow in response to a selection of a tool or function to move objects within the two-dimensional image 4600*a* or in response to opening the two-dimensional image 4600*a* within the client application. In additional embodiments, the scene-based image editing system 106 generates a new shadow for the foreground object 4602*a* at the first position and updates the new shadow (e.g., generates the updated shadow 4604) in response to moving the foreground object 4602*a*. In further embodiments, the scene-based image editing system 106 removes the initial shadow and generates the updated shadow 4604 in response to placing the foreground object 4602*b* at the second position.

As mentioned, the scene-based image editing system 106 generates shadows based on a plurality of shadow maps according to object types in two-dimensional images. For example, the scene-based image editing system 106 generates the updated shadow 4604 for the moved foreground object 4602*b* based at least in part on an estimated shadow map for the background and a proxy shadow map for the moved foreground object 4602*b*. To illustrate, the scene-based image editing system 106 generates a shadow proxy (e.g., a proxy three-dimensional mesh) for the moved foreground object 4602*b* and generates the updated shadow

4604 utilizing the shadow proxy instead of the moved foreground object 4602*b*. The scene-based image editing system 106 thus merges the respective shadow maps to generate the updated shadow 4604 according to estimated lighting parameters for the modified two-dimensional image 4600*b*.

Furthermore, in one or more embodiments, the scene-based image editing system 106 generates one or more inpainted regions in response to moving an object within a two-dimensional image. In particular, as shown in FIG. 46B, the scene-based image editing system 106 detects one or more regions of a background portion covered by a foreground object. Specifically, as illustrated, the scene-based image editing system 106 determines that a portion of the roadway, fence, plants, etc. in the background behind the car are exposed in response to moving the car.

The scene-based image editing system 106 utilizes one or more inpainting models (e.g., one or more neural networks) to inpaint the one or more regions of the background portion. To illustrate, the scene-based image editing system 106 generates an inpainted region 4606 to recover lost information based on the moved foreground object 4602*b* previously covering the one or more regions in the background portion. For instance, the scene-based image editing system 106 utilizes a first model to reconstruct a mesh at a position in three-dimensional space corresponding to the two-dimensional coordinates of a region behind the moved foreground object 4602*b*. More specifically, the scene-based image editing system 106 utilizes a smoothing model to generate smoothed depth values based on estimated three-dimensional points in three-dimensional space corresponding to pixels in the two-dimensional image 4600*a* adjacent or surrounding the region in the background portion. Accordingly, the scene-based image editing system 106 generates a plurality of vertices and edges to fill the "hole" in the three-dimensional mesh corresponding to the background behind the moved foreground object 4602*b*.

In one or more embodiments, the scene-based image editing system 106 generates the inpainted region 4606 utilizing the filled portion of the three-dimensional mesh in the background. In particular, the scene-based image editing system 106 utilizes an inpainting model to generate predicted pixel values for pixels within the inpainted region 4606. For example, the scene-based image editing system 106 utilizes the inpainting model to capture features of areas adjacent the inpainted region 4606, such as based on the pixel values, detected objects, or other visual or semantic attributes of the areas adjacent the inpainted region 4606. Thus, the scene-based image editing system 106 utilizes contextual information from neighboring areas to generate inpainted content for the inpainted region 4606. Additionally, the scene-based image editing system 106 applies the inpainted region 4606 as a texture to the reconstructed mesh portion.

As mentioned, the scene-based image editing system 106 also provides tools for inserting objects into a two-dimensional image. FIG. 46C illustrates that the client device displays a modified two-dimensional image 4600*c* including the foreground object 4602*a* of FIG. 46A at the initial position. Additionally, FIG. 46C illustrates that the client device displays an inserted object 4608 imported into the modified two-dimensional image 4600*c*.

In one or more embodiments, in response to a request to insert an object into a two-dimensional image, the scene-based image editing system 106 accesses the specified object and inserts the object into the two-dimensional image for display via a graphical user interface of the client device. For example, the selected object is associated with a previously defined three-dimensional mesh. To illustrate, the scene-based image editing system 106 imports a three-dimensional mesh corresponding to the inserted object 4608 from a separate file, database, or application in response to a request to import the inserted object 4608 into a three-dimensional representation of the modified two-dimensional image 4600*c*.

Alternatively, the scene-based image editing system 106 imports a two-dimensional mesh corresponding to the inserted object 4608 into the modified two-dimensional image 4600*c*. For example, the scene-based image editing system 106 generates a three-dimensional mesh representing the two-dimensional object in connection with the request to insert the object into the two-dimensional image. For instance, the scene-based image editing system 106 generates a three-dimensional mesh representing the inserted object 4608 utilizing one or more neural networks based on visual features of the inserted object 4608, semantic information associated with the inserted object 4608 (e.g., by detecting that the object is a road sign), or other information associated with the inserted object 4608.

In one or more embodiments, the scene-based image editing system 106 utilizes the three-dimensional mesh corresponding to the inserted object 4608 to generate a shadow 4610 within the modified two-dimensional image 4600*c*. Specifically, the scene-based image editing system 106 generates an object shadow map corresponding to the inserted object 4608 (e.g., based on the corresponding three-dimensional mesh and lighting parameters). To illustrate, as previously described, the scene-based image editing system 106 generates the object shadow map for rendering shadows cast by the inserted object 4608 onto one or more other objects according to one or more light sources in the modified two-dimensional image 4600*c* (i.e., so that the shadows follow the three-dimensional contours of other objects portrayed in the two-dimensional scene, as demonstrated by the shadow on the car of FIG. 46C).

The scene-based image editing system 106 also applies the shadow map when rendering the modified two-dimensional image 4600*c*. In particular, the scene-based image editing system 106 merges the object shadow map based on the inserted object 4608 with one or more additional shadow maps for the modified two-dimensional image 4600*c*. For instance, the scene-based image editing system 106 determines that the modified two-dimensional image 4600*c* includes the inserted object 4608 and the foreground object 4602*a* (e.g., at an initial position). The scene-based image editing system 106 merges an object shadow map corresponding to the inserted object 4608, a proxy shadow map corresponding to a shadow proxy of the foreground object 4602*a*, and an estimated shadow map of the background of the modified two-dimensional image 4600*c*.

To illustrate, the scene-based image editing system 106 merges the shadow maps to generate the shadow 4610 based on the inserted object 4608 in connection with the foreground object 4602*a* and the background of the modified two-dimensional image 4600*c*. For example, the scene-based image editing system 106 determines that the inserted object 4608 is at least partially positioned between the foreground object 4602*a* and a light source extracted from the modified two-dimensional image 4600*c*. Additionally, the scene-based image editing system 106 generates one or more shadows in the modified two-dimensional image 4600*c* by merging the shadow maps according to the relative three-dimensional positioning of objects and characteristics of each object type. The scene-based image editing system

106 thus merges the shadow maps to cast the shadow 4610 of the inserted object 4608 onto at least a portion of the foreground object 4602*a* and a portion of the background.

In one or more embodiments, the scene-based image editing system 106 updates shadows for a two-dimensional image in real-time as a user edits the image. For instance, the scene-based image editing system 106 determines, based on inputs via a client device, one or more requests to insert, move, or delete one or more objects in a digital image. In response to such requests, the scene-based image editing system 106 generates updated shadow maps for each of the object types in the digital image. Furthermore, the scene-based image editing system 106 renders a modified digital image (or a preview of the modified digital image) within a graphical user interface of the client device based on the updated positions of objects and merged shadow maps.

In one or more additional embodiments, the scene-based image editing system 106 provides realistic shadow generation in two-dimensional images via shadow mapping for a plurality of image editing operations. For example, although the above embodiments describe editing two-dimensional images by placing an object at a specific location within a two-dimensional image, the scene-based image editing system 106 also generates and merges a plurality of shadow maps in response to modifications to objects in two-dimensional images. To illustrate, in response to a request to change a shape, size, or orientation of an object within a two-dimensional image, the scene-based image editing system 106 updates three-dimensional characteristics (e.g., a proxy three-dimensional mesh) for the object based on the request. Additionally, the scene-based image editing system 106 generates an updated shadow map (e.g., an updated proxy shadow map) based on the updated three-dimensional characteristics and re-renders the two-dimensional image according to the updated shadow map.

Figure 47A:
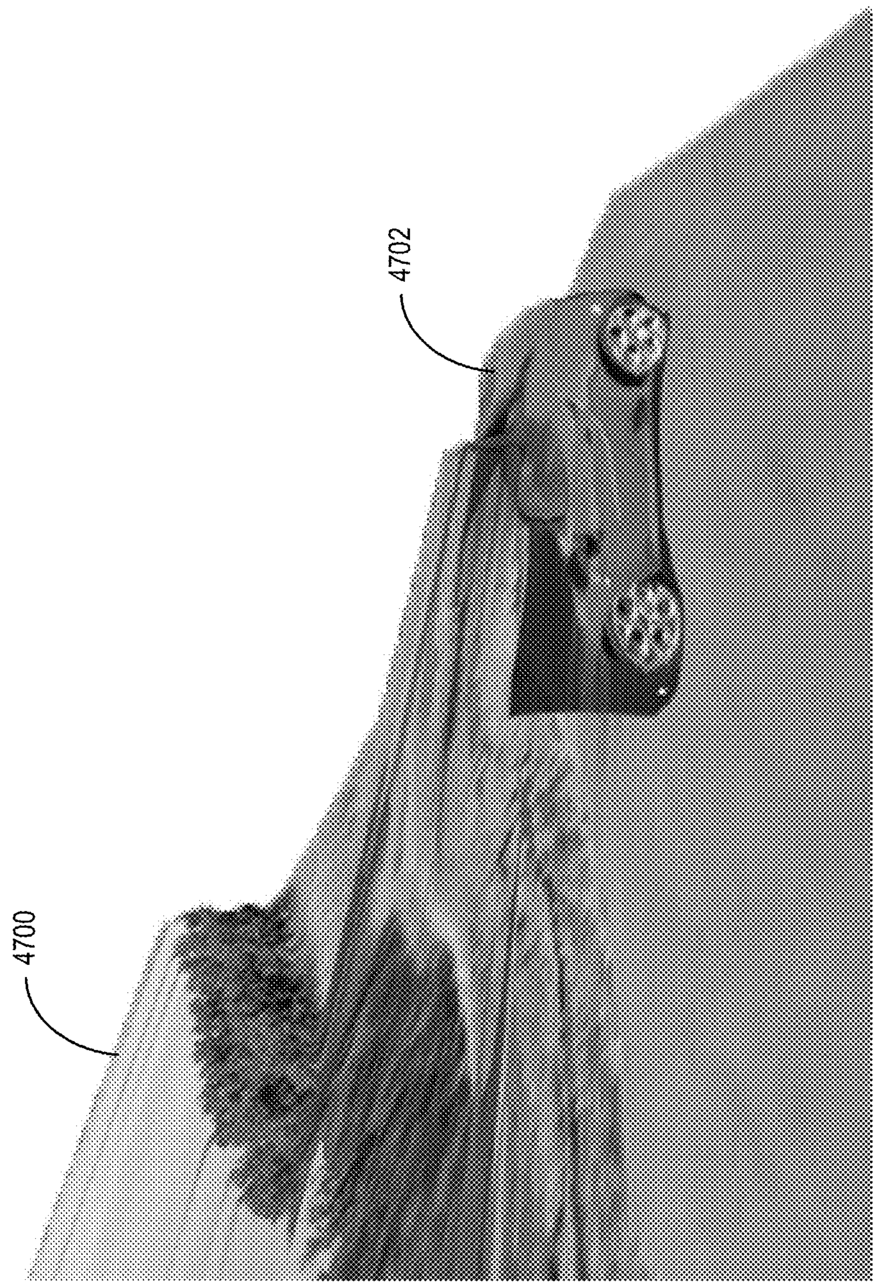
Figure 47B:

As mentioned, the scene-based image editing system 106 generates shadow proxies for objects within two-dimensional images for editing the two-dimensional images. FIGS. 47A-47B illustrate example three-dimensional meshes corresponding to a scene of a two-dimensional image. Specifically, the three-dimensional meshes of FIGS. 47A-47B correspond to the scene of the two-dimensional image of FIG. 46A. FIG. 47A illustrates three-dimensional meshes representing a background and a foreground object in a two-dimensional image. FIG. 47B illustrates a shadow proxy of the foreground object.

As illustrated in FIG. 47A, the scene-based image editing system 106 generates one or more three-dimensional meshes based on the two-dimensional image. In particular, the scene-based image editing system 106 generates a first three-dimensional mesh 4700 representing background content in a scene of the two-dimensional image (e.g., based on estimated depth values from the two-dimensional image). The scene-based image editing system 106 also determines a foreground object (e.g., the car) from the two-dimensional image and generates a second three-dimensional mesh 4702 for the foreground object. In some embodiments, the scene-based image editing system 106 generates an initial three-dimensional mesh including all content of the two-dimensional image and separates the three-dimensional mesh into the first three-dimensional mesh 4700 and the second three-dimensional mesh 4702. In alternative embodiments, the scene-based image editing system 106 generates the first three-dimensional mesh 4700 and the second three-dimensional mesh 4702 separately (e.g., based on a segmentation mask).

In one or more embodiments, the scene-based image editing system 106 generates the second three-dimensional mesh 4702 representing a visible portion of the foreground object. For example, the scene-based image editing system 106 utilizes depth values corresponding to the pixels in the two-dimensional image to generate the second three-dimensional mesh 4702 (e.g., by separating the second three-dimensional mesh 4702 from the first three-dimensional mesh 4700 at a boundary of the foreground object). Additionally, as illustrated in FIG. 47A, the second three-dimensional mesh 4702 lacks detail due to only a portion of the foreground object being visible in the two-dimensional image.

Furthermore, in one or more embodiments, the scene-based image editing system 106 utilizes one or more inpainting models to inpaint a portion of a two-dimensional image and a corresponding portion of a three-dimensional mesh. As illustrated in FIG. 47A, the scene-based image editing system 106 inpaints a portion of the first three-dimensional mesh 4700 corresponding to a portion of the background behind the foreground object. For example, the scene-based image editing system 106 inserts a plurality of vertices into the portion of the first three-dimensional mesh 4700 based on three-dimensional positions of vertices in the adjacent regions of the first three-dimensional mesh 4700 (e.g., utilizing a smoothing model) to provide consistent three-dimensional depth for the portion. Additionally, the scene-based image editing system 106 generates a texture to apply to the portion of the first three-dimensional mesh 4700 utilizing an additional inpainting model.

According to one or more embodiments, the scene-based image editing system 106 generates a shadow proxy for the foreground object. In particular, FIG. 47B illustrates that the scene-based image editing system 106 generates a proxy three-dimensional mesh 4704 to represent the foreground object. For example, the scene-based image editing system 106 generates the proxy three-dimensional mesh 4704 based on the foreground object according to a three-dimensional position of the second three-dimensional mesh 4702 in three-dimensional space. To illustrate, the scene-based image editing system 106 generates the proxy three-dimensional mesh 4704 to estimate a shape of the visible and non-visible portions of the foreground object in the three-dimensional space for producing shadows when rendering the two-dimensional image.

In some embodiments, the scene-based image editing system 106 generates the proxy three-dimensional mesh 4704 by determining an axis or plane of symmetry of the foreground object. For instance, the scene-based image editing system 106 processes features of the visible portion of the foreground object to detect the symmetric axis (e.g., based on repeated features). To illustrate, the scene-based image editing system 106 utilizes image processing techniques and/or object detection techniques to determine a symmetric axis of the car in the two-dimensional image based on the visibility of two taillights of the car in the two-dimensional image. The scene-based image editing system 106 determines that the foreground object thus has a plane of symmetry at approximately the halfway mark of the trunk and which runs through the middle of the car.

In response to detecting the symmetric axis of the foreground object, the scene-based image editing system 106 generates the proxy three-dimensional mesh 4704 by mirroring the second three-dimensional mesh 4702 and stitching the mirrored portion to the second three-dimensional mesh 4702. In one or more embodiments, the scene-based image editing system 106 copies a plurality of vertices in the second three-dimensional mesh 4702 and replicates the copied vertices. Additionally, the scene-based image editing system 106 mirrors the positions of the replicated vertices and translates the replicated vertices according to the symmetric axis. The scene-based image editing system 106 also connects the vertices to the copied vertices across the symmetric axis to create a complete three-dimensional mesh. In alternative embodiments, the scene-based image editing system 106 mirrors the vertices of the existing mesh to the other side of the symmetric axis and utilizes a sphere object to shrinkwrap vertices from the sphere to a surface of the geometry including the mirrored portion.

In additional embodiments, the scene-based image editing system 106 generates the proxy three-dimensional mesh 4704 by importing a previously generated three-dimensional mesh representing a shape of the foreground object. Specifically, the scene-based image editing system 106 utilizes object detection to determine that the foreground object belongs to a specific object category associated with a previously generated three-dimensional mesh. To illustrate, the scene-based image editing system 106 determines that the foreground object includes a specific make and/or model of car associated with a previously generated three-dimensional mesh. The scene-based image editing system 106 accesses the previously generated three-dimensional mesh (e.g., from a database) and inserts the three-dimensional mesh into a corresponding location in three-dimensional space to generate the proxy three-dimensional mesh 4704.

In some embodiments, the scene-based image editing system 106 determines that a particular object in a two-dimensional image includes a human with a specific pose. The scene-based image editing system 106 utilizes a model to generate a three-dimensional mesh of a human with the specific pose. Accordingly, the scene-based image editing system 106 generates a proxy three-dimensional mesh based on a posed human model generated via one or more neural networks that extract shape and pose information from the two-dimensional image (e.g., by regressing the pose of the detected human shape).

Although FIG. 47B illustrates that the proxy three-dimensional mesh 4704 is visible in three-dimensional space, in one or more embodiments, the scene-based image editing system 106 hides the proxy three-dimensional mesh 4704 from view within a graphical user interface. For example, the scene-based image editing system 106 utilizes the proxy three-dimensional mesh 4704 to generate shadows in a rendered two-dimensional image without being visible in the two-dimensional image. Additionally, in some embodiments, the scene-based image editing system 106 utilizes the three-dimensional mesh of the foreground object, rather than the proxy three-dimensional mesh, to render shadows cast on the foreground object by one or more other objects. Thus, the scene-based image editing system 106 can approximate shadows generated by the foreground object via the proxy three-dimensional mesh 4704 while providing accurate rendering of shadows on the visible portion of the foreground object.

Figure 48A:
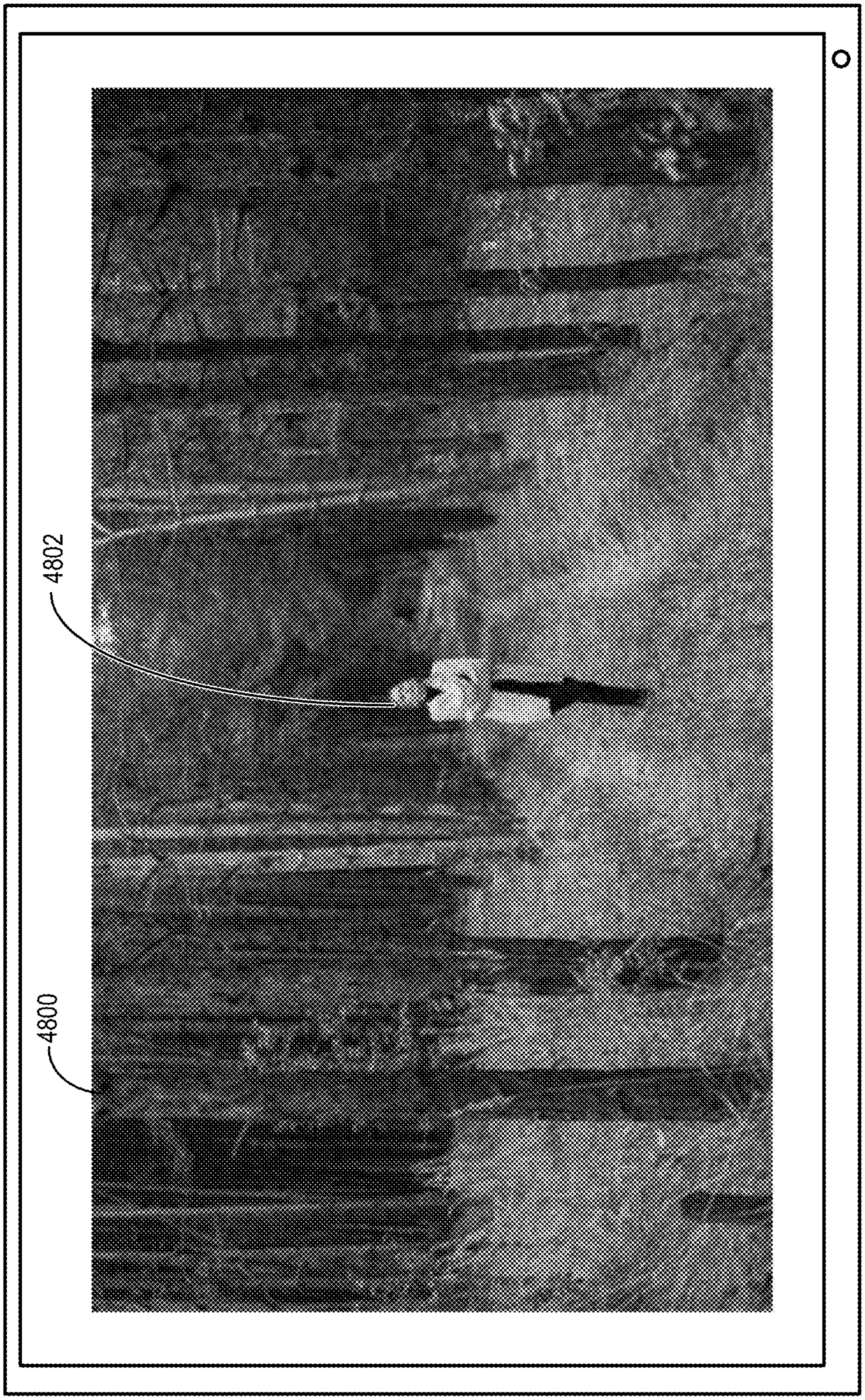
FIGS. 48A-48B illustrate graphical user interfaces for inserting an object from a first two-dimensional image into a second two-dimensional image in accordance with one or more embodiments.
Figure 48B:
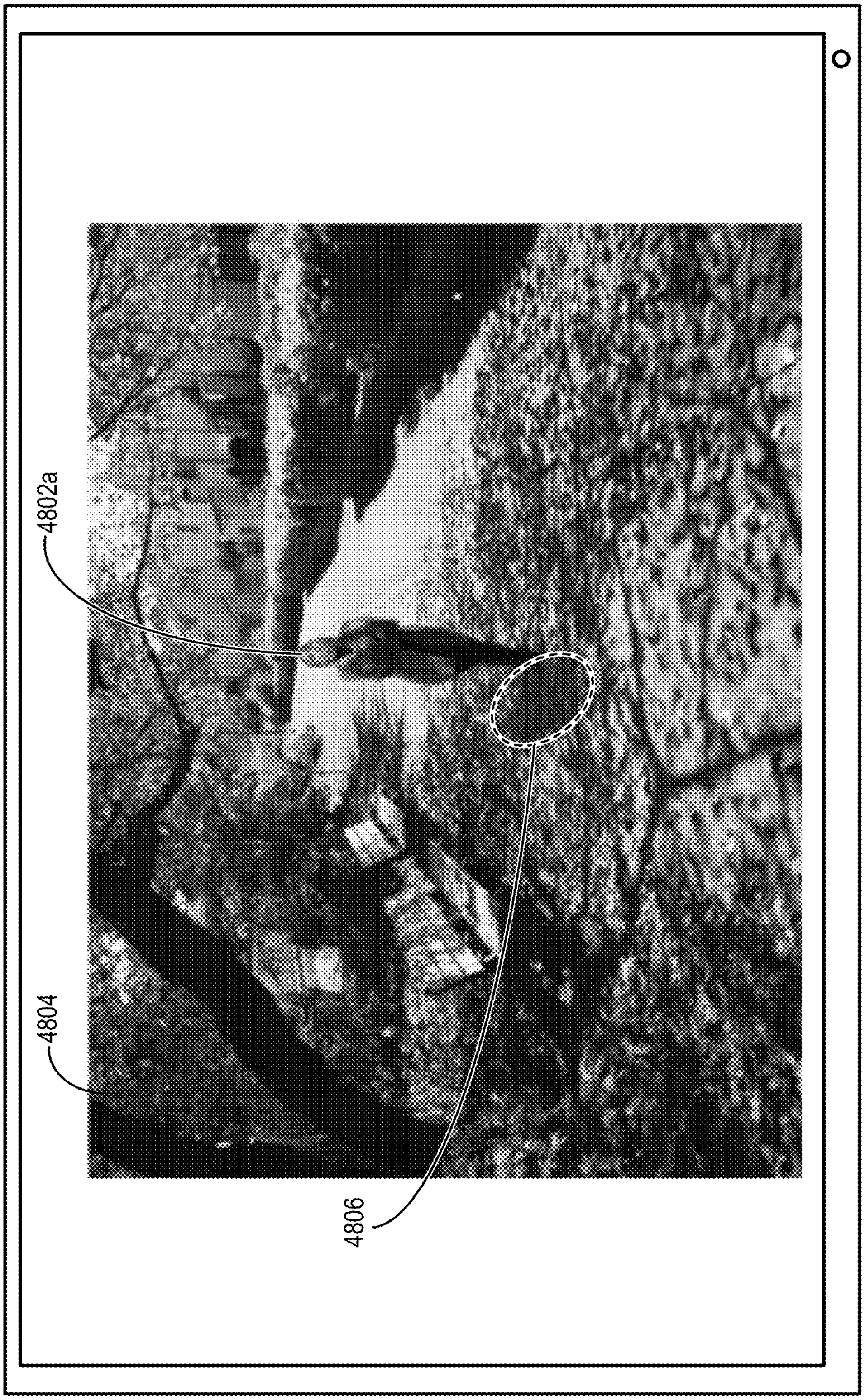

FIGS. 48A-48B illustrate additional examples of the scene-based image editing system 106 modifying a two-dimensional image via three-dimensional characteristics of two-dimensional scenes. Specifically, FIG. 48A illustrates a first two-dimensional image 4800 including a foreground object 4802 (e.g., a human). In one or more embodiments, the scene-based image editing system 106 receives a request to copy the foreground object 4802 from the first two-dimensional image 4800 and insert the foreground object 4802 into a second two-dimensional image.

According to one or more embodiments, in response to the request or in response to inserting the foreground object 4802 into another digital image, the scene-based image editing system 106 generates a proxy three-dimensional mesh for the foreground object 4802. FIG. 48B illustrates a second two-dimensional image 4804 into which the foreground object 4802*a* has been inserted. In particular, the scene-based image editing system 106 inserts the foreground object 4802*a* into the second two-dimensional image 4804 at a selected position. Additionally, the scene-based image editing system 106 inserts a proxy three-dimensional mesh corresponding to the foreground object 4802*a* at a corresponding position in a three-dimensional space that includes a three-dimensional mesh representing the scene of the second two-dimensional image 4804.

Furthermore, in one or more embodiments, the scene-based image editing system 106 generates a plurality of shadow maps based on the second two-dimensional image 4804 and the proxy three-dimensional mesh corresponding to the foreground object 4802*a*. Specifically, in response to inserting the proxy three-dimensional mesh for the foreground object 4802*a* into a three-dimensional space corresponding to the second two-dimensional image 4804, the scene-based image editing system 106 generates a proxy shadow map for the second two-dimensional image 4804. Additionally, the scene-based image editing system 106 generates an estimated shadow map for the second two-dimensional image 4804 according to shadows already in the second two-dimensional image 4804 (e.g., shadows generated by the trees and bushes).

In connection with inserting the foreground object 4802*a* into the second two-dimensional image 4804, the scene-based image editing system 106 renders a modified two-dimensional image to include a shadow 4806 generated by the foreground object 4802*a*. Furthermore, as illustrated, the scene-based image editing system 106 renders the modified two-dimensional image to include the effects of one or more shadows cast by background objects onto the foreground object 4802*a*. In particular, the scene-based image editing system 106 merges the proxy shadow map and the estimated shadow map to determine whether and where to place shadows cast by the foreground object 4802*a* and the background. As illustrated in FIG. 48B, the foreground object 4802*a* casts a shadow onto the background, and the background (e.g., the tree) casts at least a partial shadow onto the foreground object 4802*a*. Moving the object within the second two-dimensional image 4804 causes the scene-based image editing system 106 to update the positioning and effects of the shadows of the foreground object 4802*a* and/or the background.

Figure 49:
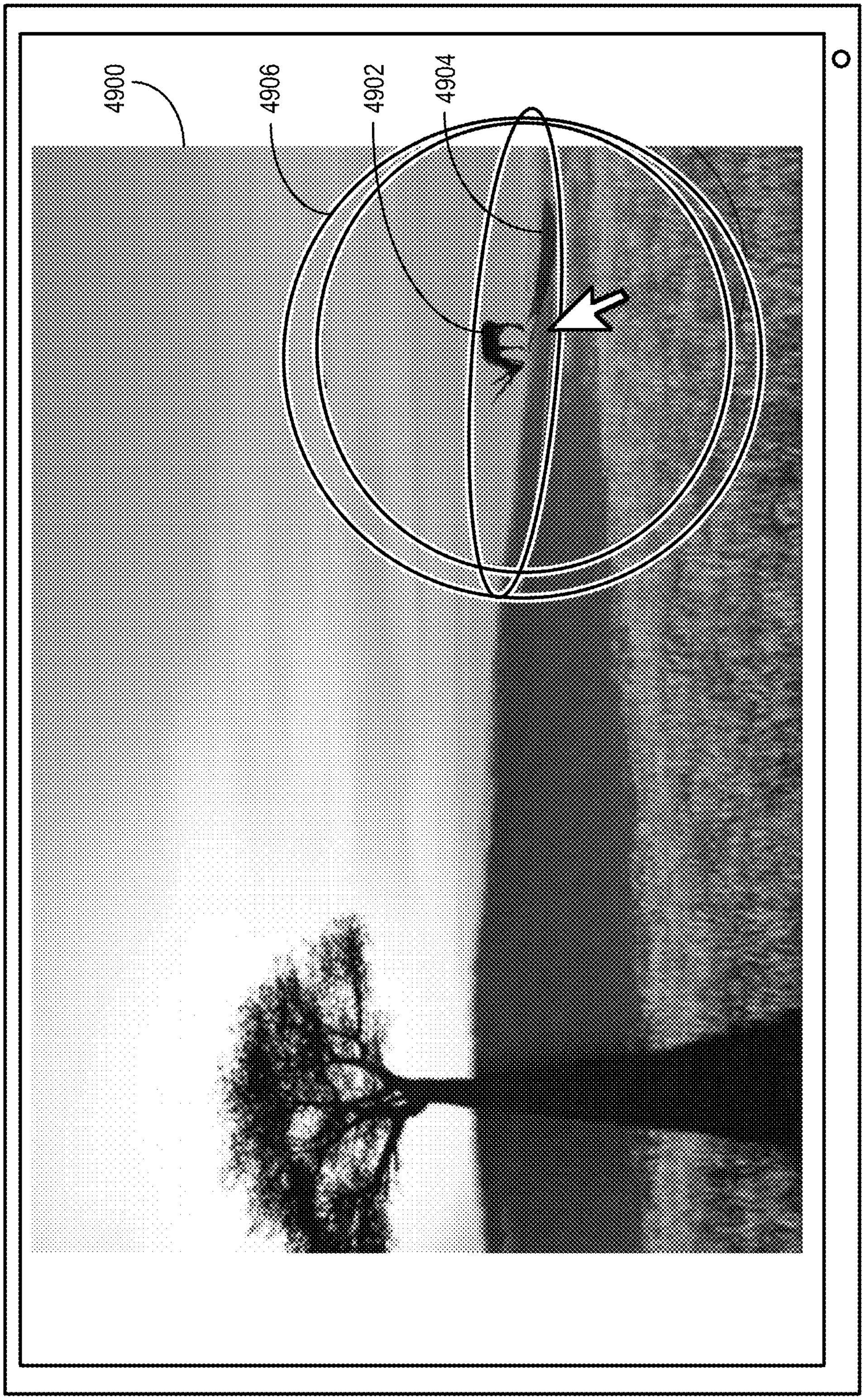
FIG. 49 illustrates a graphical user interface for performing three-dimensional edits to an object inserted into a two-dimensional image in accordance with one or more embodiments.

FIG. 49 illustrates a graphical user interface for editing various visual characteristics of an object in a two-dimensional image. Specifically, FIG. 49 illustrates a client device that displays a two-dimensional image 4900 including an inserted object 4902. For example, the client device displays an object 4902 inserted into the two-dimensional image 4900 at a selected location. In one or more embodiments, the client device provides tools for modifying the position of the object 4902, such as by moving the object 4902 along the ground in three-dimensional space. Accordingly, as the object 4902 moves within the two-dimensional image 4900, the scene-based image editing system 106 also moves a corresponding three-dimensional mesh for the object 4902 relative to a three-dimensional mesh representing the scene within a three-dimensional space of the two-dimensional image 4900. To illustrate, moving the object 4902 forward along the ground in the two-dimensional image 4900 causes the scene-based image editing system 106 to increase or decrease a size and/or rotation of the object 4902 based on the geometry of the ground in the three-dimensional space.

Furthermore, in one or more embodiments, the scene-based image editing system 106 generates a shadow 4904 for the object 4902 based on a plurality of shadow maps for the two-dimensional image 4900. For instance, the scene-based image editing system 106 generates an estimated shadow map based on the background of the two-dimensional image 4900, which includes a tree and its corresponding shadow based on the light source being in the background. Additionally, the scene-based image editing system 106 generates an object shadow map for the object 4902. The scene-based image editing system 106 generates the shadow 4904 for the object 4902 including a direction and length based on the light source and a perspective corresponding to the three-dimensional mesh of the object 4902 in the three-dimensional space by merging the shadow maps. Furthermore, moving the object 4902 in the two-dimensional image 4900 causes the scene-based image editing system 106 to update the position, direction, and size of the shadow 4904.

In one or more additional embodiments, the scene-based image editing system 106 also provides tools for editing three-dimensional characteristics of the object 4902. In particular, FIG. 49 illustrates a set of visual indicators 4906 for rotating the object 4902 in the three-dimensional space. More specifically, in response to detecting one or more interactions with the set of visual indicators 4906, the scene-based image editing system 106 modifies an orientation of the three-dimensional mesh corresponding to the object 4902 in the three-dimensional space and updates the two-dimensional depiction of the object 4902 accordingly. Furthermore, in some embodiments, the scene-based image editing system 106 utilizes a three-dimensional mesh of the background to provide realistic modifications to the orientation of the object 4902, such as by constraining certain portions of the object 4902 to be in contact with the ground (e.g., by ensuring that the feet of an animal are in contact with the ground while rotating the object 4902). Similarly, the scene-based image editing system 106 can modify a position of the object 4902 along the ground with such constraints to maintain consistent contact between a particular portion of the object 4902 and the background according to one or more contours of the background.

The scene-based image editing system 106 can utilize these three-dimensional modeling and shadow generation approaches in conjunction with a variety of image editing approaches discussed above. For example, the scene-based image editing system 106 can pre-process a digital image to identify foreground objects, generate three-dimensional models of the foreground objects, and inpaint behind the foreground objects. In response to a user selection (e.g., finger press) of an object, the image editing system can move the object and generate dynamic shadows that fall and warp across three-dimensional contours of other objects portrayed in the scene.

Figure 50:
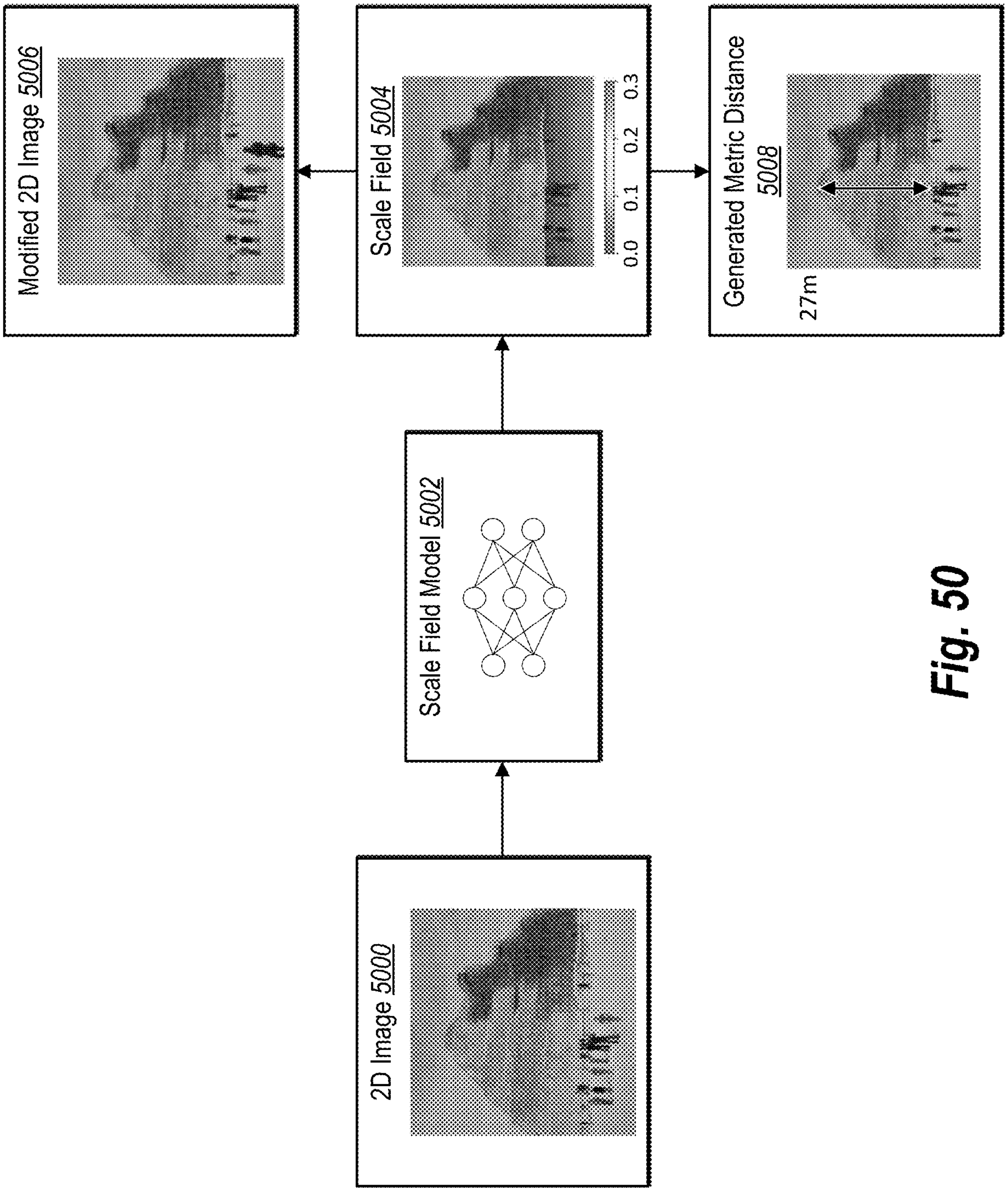
FIG. 50 illustrates an overview diagram of the scene-based image editing system generating a scale field from a two-dimensional image utilizing a scale field model in connection with performing one or more downstream operations in accordance with one or more embodiments.

In some embodiments, the scene-based image editing system 106 utilizes three-dimensional characteristics and/or a three-dimensional representation of a two-dimensional image to determine depth and/or scale information associated with content of the two-dimensional image. For example, the scene-based image editing system 106 utilizes three-dimensional characteristics of detected ground features and camera parameters in a two-dimensional image to estimate pixel-to-metric scaling (e.g., number of pixels to metric distance/height) corresponding to specific pixel locations in two-dimensional images. FIG. 50 illustrates an overview of the scene-based image editing system 106 utilizing three-dimensional characteristics of a two-dimensional image 5000 to generate a scale field including scale information of content in the two-dimensional image 5000. Specifically, FIG. 50 illustrates that the scene-based image editing system 106 utilizing a machine-learning model to generate the scale field for use in performing one or more downstream operations.

In one or more embodiments, the scene-based image editing system 106 utilizes a scale field model 5002 to generate a scale field 5004 from the two-dimensional image 5000. In particular, the scene-based image editing system 106 provides tools for automatically processing the two-dimensional image 5000 to determine scale information of content of the two-dimensional image 5000. For example, the scene-based image editing system 106 provides tools for editing or inserting objects into the two-dimensional image 5000 by scaling the objects based on content of the two-dimensional image 5000. In an additional example, the scene-based image editing system 106 provides tools for determining metric distances of content portrayed in the two-dimensional image 5000.

According to one or more embodiments, the scale field model 5002 includes a machine-learning model (e.g., a neural network including one or more neural network layers) to generate the scale field 5004. In particular, the scene-based image editing system 106 utilizes the scale field model 5002 to generate the scale field 5004 representing a scale of metric distance relative to pixel distance. For instance, the scene-based image editing system 106 generates the scale field 5004 to represent a ratio of a metric distance in three-dimensional space relative to a corresponding pixel distance in two-dimensional space for the two-dimensional image 5000. Thus, the scene-based image editing system 106 generates the scale field 5004 to include a plurality of values indicating the pixel-to-metric ratio for a plurality of pixels in the two-dimensional image 5000. To illustrate, a value in the scale field 5004 represents, for a given pixel, a ratio between a distance from the point to the horizon line in two-dimensional space and a corresponding three-dimensional space.

In one or more embodiments, the scene-based image editing system 106 utilizes the scale field model 5002 to generate the scale field 5004 to include values for a subset of pixels of the two-dimensional image 5000. For example, the scale field 5004 includes non-null or non-zero values corresponding to pixels below the horizon line of the two-dimensional image 5000. According to one or more embodiments, the scene-based image editing system 106 generates the scale field 5004 as a matrix of values corresponding to a matrix of pixels in the two-dimensional image 5000. In some examples, the scene-based image editing system 106 generates the scale field 5004 for storage within memory while editing the two-dimensional image 5000 or as a separate file (or metadata) corresponding to the two-dimensional image 5000 for use in various downstream operations.

As illustrated in FIG. 50, the scene-based image editing system 106 utilizes the scale field 5004 to perform one or more additional downstream operations associated with the two-dimensional image 5000. For example, the scene-based image editing system 106 utilizes the scale field 5004 to generate a modified two-dimensional image 5006 based on the two-dimensional image 5000. To illustrate, the scene-based image editing system 106 generates the modified two-dimensional image 5006 by inserting an object into the two-dimensional image 5000 at a specific location according to the scale field 5004. In some embodiments, the scene-based image editing system 106 generates the modified two-dimensional image 5006 by moving an object in the two-dimensional image 5000 from one location to another location according to the scale field 5004.

In additional embodiments, the scene-based image editing system 106 utilizes the scale field 5004 to determine metric distances in the two-dimensional image 5000. For example, the scene-based image editing system 106 utilizes the scale field 5004 to determine a generated distance 5008 in connection with content of the two-dimensional image 5000. To illustrate, the scene-based image editing system 106 utilizes the scale field 5004 to determine a size, length, width, or depth of content within the two-dimensional image 5000 based on one or more values of the scale field 5004 for one or more pixels of the two-dimensional image 5000. Accordingly, the scene-based image editing system 106 utilizes the scale field 5004 to provide information associated with metric distance measurements corresponding to content in the two-dimensional image 5000 based on pixel distances of the content as portrayed in the two-dimensional image 5000.

According to one or more embodiments, by utilizing the scale field model of FIG. 50 to generate scale fields for two-dimensional images, the scene-based image editing system 106 provides improved scale-aware information of digital images over conventional systems. In particular, in contrast to conventional systems that utilize camera intrinsic/extrinsic parameters for converting between two-dimensional measurements and three-dimensional measurements, the scene-based image editing system 106 provides accurate scaling according to translations between two-dimensional and three-dimensional spaces directly from two-dimensional images. Furthermore, in contrast to conventional systems that utilize single view metrology to establish relationships among low-level image features such as vanishing points and vanishing lines, the scene-based image editing system 106 leverages the scale fields to more accurately determine scaling of objects by training a scale field model using annotated scale fields on digital images.

In one or more embodiments, the scene-based image editing system 106 utilizes a scale field model to generate scale fields for analyzing and/or modifying digital images. In particular, as mentioned, the scene-based image editing system 106 utilizes scale fields to provide accurate scale-aware processing of two-dimensional image content. For example, the scene-based image editing system 106 generates scale fields representing a translation of two-dimensional measurements in pixels to three-dimensional measurements in a corresponding three-dimensional space. To illustrate, the scene-based image editing system 106 generates a scale field to provide such scale-aware data by leveraging estimated distances to a camera of a two-dimensional image and estimated parameters of the camera during training of the scale field model.

According to one or more embodiments, at each ground pixel of a two-dimensional image, pixel height grows linearly (or approximately linearly) with the corresponding three-dimensional metric height according to a perspective camera model. By locally defining the ratio between a pixel and its corresponding metric height, the scene-based image editing system 106 generates a scale field. Thus, the scene-based image editing system 106 provides a dense, local, non-parametric representation of the scale of a scene in a two-dimensional image.

Figure 51:
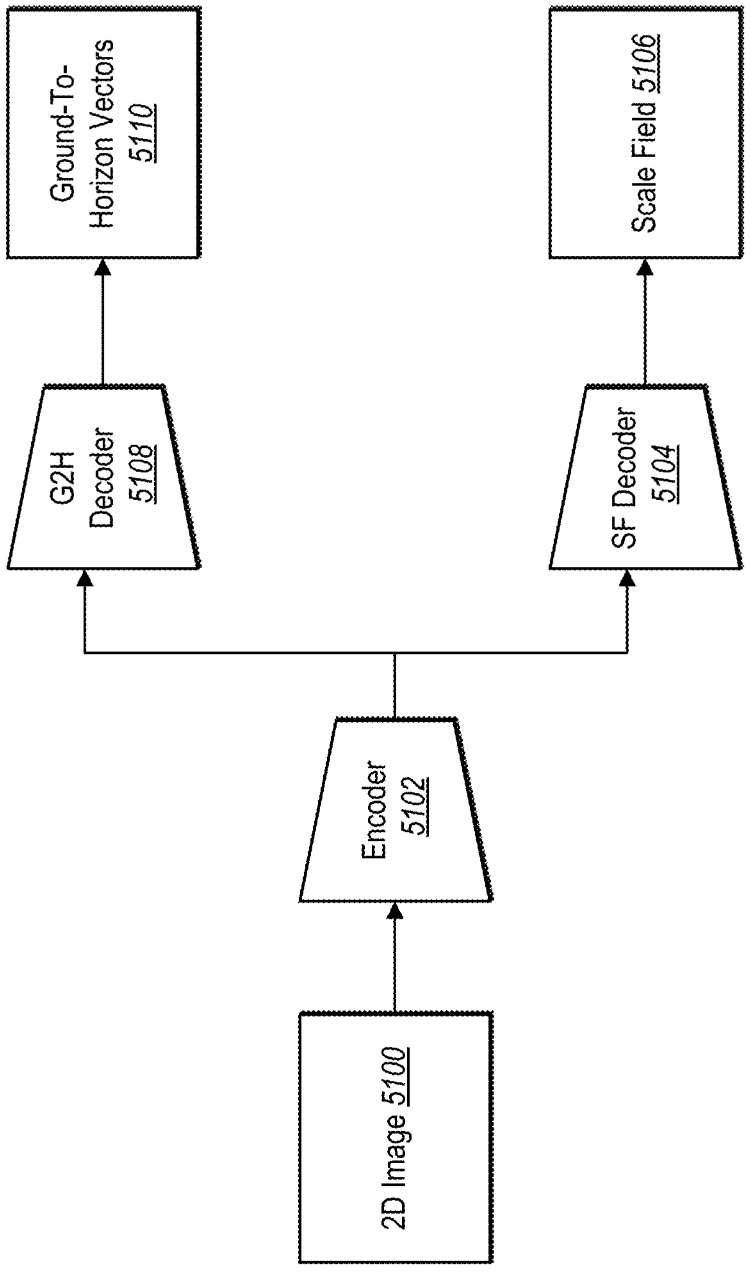
FIG. 51 illustrates a diagram of the scene-based image editing system utilizing a machine-learning model to generate a scale field and ground-to-horizon vectors from a two-dimensional image in accordance with one or more embodiments.

As mentioned, in one or more embodiments, the scene-based image editing system 106 generates scale fields for two-dimensional images utilizing a machine-learning model. FIG. 51 illustrates an embodiment of a scale field model that the scene-based image editing system 106 utilizes to determine the scale of content in a two-dimensional image 5100. Specifically, FIG. 51 illustrates an embodiment of a scale field model that includes a plurality of branches for generating a plurality of types of data associated with scale of content in the two-dimensional image 5100.

As illustrated in FIG. 51, the scale field model includes a plurality of neural network layers in an encoder-decoder architecture. In particular, the scale field model includes an encoder 5102 to encode features of the two-dimensional image 5100. In one or more embodiments, the encoder 5102 includes a transformer-based feature extractor to extract features from the two-dimensional image 5100. For example, the scene-based image editing system 106 utilizes the encoder 5102 of the scale field model to generate a feature representation of the two-dimensional image 5100 based on the extracted features of the two-dimensional image 5100.

In response to generating the feature representation from the two-dimensional image 5100, the scene-based image editing system 106 utilizes the scale field model of FIG. 51 to generate a plurality of different outputs. More specifically, the scale field model includes a scale field decoder 5104 ("SF Decoder") to generate a scale field 5106 based on the feature representation. To illustrate, the scale field decoder 5104 processes the feature representation generated by the encoder 5102 to generate a scale field 5106 in a first branch of the scale field model. In one or more embodiments, the scale field model includes the scale field decoder 5104 to generate the scale field 5106 at the same resolution as the two-dimensional image 5100. For instance, the encoder 5102 generates the feature representation at a downsampled resolution from the two-dimensional image 5100, and the scale field decoder 5104 decodes and upsamples the feature resolution to a higher resolution (e.g., the resolution of the two-dimensional image 5100).

According to one or more embodiments, the scale field model also includes an additional branch. In particular, as illustrated in FIG. 51, the scale field model includes a neural network branch with a ground-to-horizon decoder 5108 ("G2H Decoder"). Specifically, the ground-to-horizon decoder 5108 decodes the feature representation to generate a plurality of ground-to-horizon vectors 5110. In one or more embodiments, a ground-to-horizon vector includes a vector indicating a direction and a distance from a particular point in three-dimensional space to a horizon line. For example, the ground-to-horizon decoder 5108 generates the ground-to-horizon vectors 5110 for a plurality of ground points portrayed in the two-dimensional image 5100 to indicate the perpendicular distances from the ground points to the horizon line based on a projection of the content of the two-dimensional image 5100 projected to a three-dimensional space.

As illustrated in FIG. 51, the scene-based image editing system 106 utilizes the scale field model to generate the scale field 5106 and the ground-to-horizon vectors 5110 from the two-dimensional image 5100. Although FIG. 51 illustrates that the scale field model generates the scale field 5106 and the ground-to-horizon vectors 5110, in alternative embodiments, the scene-based image editing system 106 utilizes a scale field model that generates only scale fields for two-dimensional images. For instance, the scene-based image editing system 106 utilizes a single-branch neural network to generate scale fields based on two-dimensional images.

According to one or more embodiments, the scene-based image editing system 106 utilizes the scale field 5106 and the ground-to-horizon vectors 5110 to perform one or more downstream operations. For example, the scene-based image editing system 106 utilizes the scale field 5106 to measure metric distances of content portrayed in a digital image or other in-scale image compositing operations. In another example, the scene-based image editing system 106 utilizes the scale field 5106 to insert an object or move an object within a digital image, including use in architectural or furniture applications. Additionally, the scene-based image editing system 106 utilizes the ground-to-horizon vectors 5110 to determine a placement angle (e.g., rotation/direction) of the object within the digital image.

In some embodiments, the scene-based image editing system 106 trains one or more neural networks for generating scale-aware information associated with two-dimensional images. For example, the scene-based image editing system 106 generates training data including a plurality of annotated two-dimensional images for learning parameters of the scale field model of FIG. 51. Specifically, as described in more detail below with respect to FIG. 54, the scene-based image editing system 106 generates a dataset of annotated two-dimensional images including scaling information for training a scale field model that automatically generates scale fields based on content in two-dimensional images.

Figure 52:
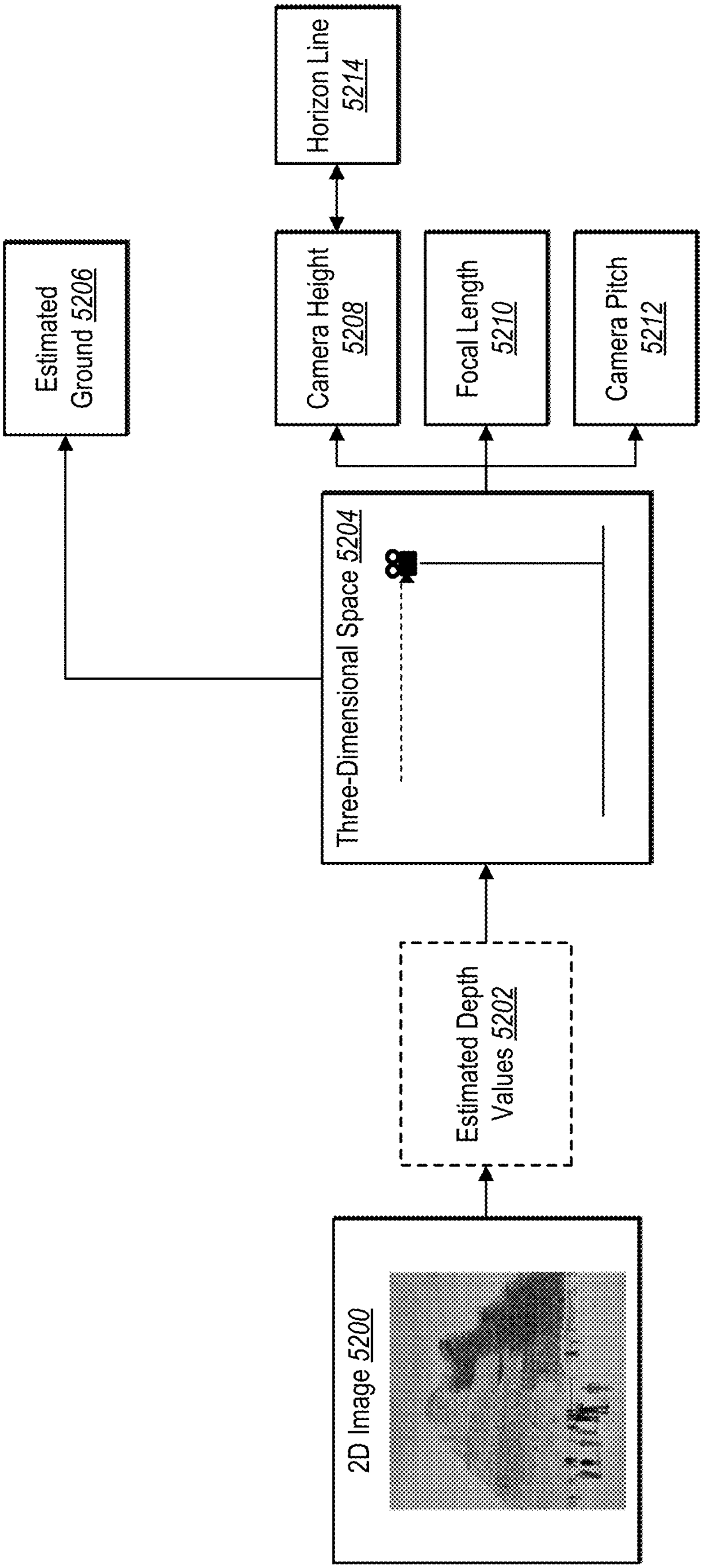
FIG. 52 illustrates a diagram of three-dimensional characteristics of a two-dimensional image projected to a three-dimensional space in accordance with one or more embodiments.

In connection with generating annotated two-dimensional images, the scene-based image editing system 106 determines scaling information associated with the two-dimensional images. For example, FIG. 52 illustrates a representation of a two-dimensional image 5200 projecting two-dimensional features of the content of the two-dimensional image 5200 into three-dimensional features. In one or more embodiments, as shown, transforming the two-dimensional features into three-dimensional features optionally involves determining estimated depth values 5202 from the two-dimensional image 5200. To illustrate, as described previously, the scene-based image editing system 106 utilizes a depth estimation neural network to estimate depth values for pixels of a two-dimensional image.

As illustrated in FIG. 52, the scene-based image editing system 106 determines a three-dimensional space 5204 corresponding to content of the two-dimensional image 5200 by projecting the content of the two-dimensional image 5200 into the three-dimensional space 5204. For instance, the scene-based image editing system 106 determines the three-dimensional space 5204 based on the estimated depth values 5202. To illustrate, the scene-based image editing system 106 converts the estimated depth values 5202 into three-dimensional points in the three-dimensional space 5204 by utilizing one or more neural networks, such as an adaptive tessellation model or other three-dimensional mesh generation model.

In additional embodiments, the scene-based image editing system 106 projects the content of the two-dimensional image 5200 into the three-dimensional space 5204 by identifying specific content in the two-dimensional image 5200. In particular, the scene-based image editing system 106 determines an estimated ground 5206 in the two-dimensional image 5200. For example, the scene-based image editing system 106 identifies ground pixels in the two-dimensional image 5200 that correspond to a ground.

Additionally, in one or more embodiments, the scene-based image editing system 106 determines annotations that indicate camera parameters associated with the two-dimensional image 5200. Specifically, the scene-based image editing system 106 determines a camera height 5208 corresponding to a camera position of a camera that captured the two-dimensional image 5200. In some embodiments, the scene-based image editing system 106 determines a focal length 5210 and a camera pitch 5212 associated with the camera. For example, the scene-based image editing system 106 determines the camera parameters that affect a position, rotation, tilt, focus, etc., of content portrayed in the two-dimensional image 5200. In additional embodiments, the scene-based image editing system 106 determines annotations indicating specific heights or distances in the two-dimensional image 5200. According to one or more embodiments, the scene-based image editing system 106 utilizes one or more neural networks to determine the camera parameters. Furthermore, in some embodiments, the scene-based image editing system 106 utilizes the camera height 5208 to determine a horizon line 5214 of the two-dimensional image 5200.

Alternatively, in one or more embodiments, the scene-based image editing system 106 determines annotations in the two-dimensional image 5200 indicating certain information that allows the scene-based image editing system 106 to determine the three-dimensional space 5204 and the camera parameters in response to user input. For example, the scene-based image editing system 106 (or another system) provides the two-dimensional image 5200, along with a plurality of additional digital images, to a plurality of human annotators to annotate the horizon line. Thus, the scene-based image editing system 106 obtains the annotated digital images and utilizes one or more image processing models to determine the three-dimensional space (e.g., estimated camera heights, horizon lines, and grounds) based on the annotations by human sources or other sources.

Figure 53C:
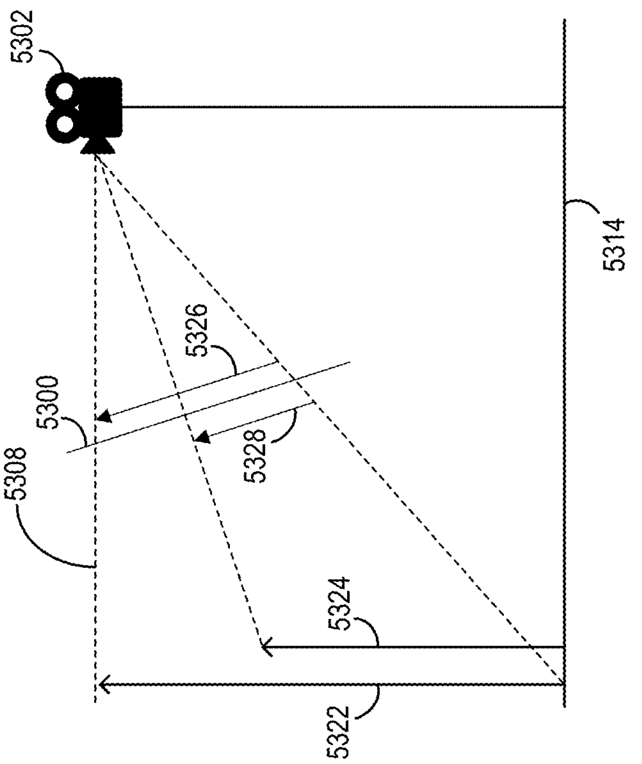
FIGS. 53A-53C illustrate diagrams of relationships between two-dimensional characteristics of a two-dimensional image and three-dimensional characteristics of the two-dimensional image projected into a three-dimensional space in accordance with one or more embodiments.
Figure 53A:
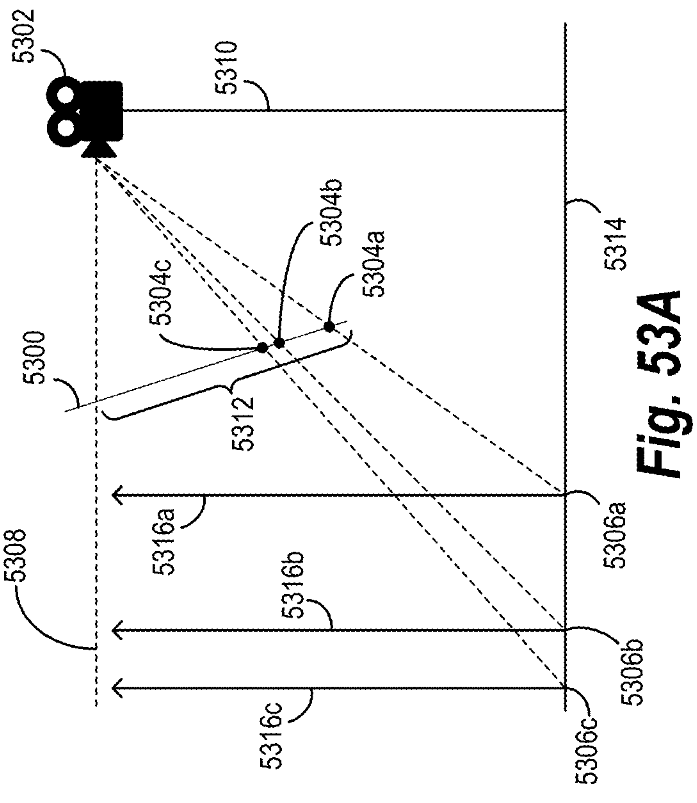
Figure 53B:
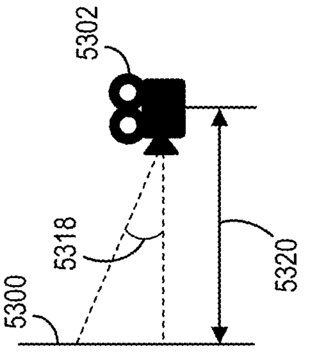

FIGS. 53A-53C illustrated diagrams that indicate relationships between metric distances and pixel distances in a two-dimensional image. Additionally, FIGS. 53A-53C illustrate the effect of the camera parameters on the relationships between the metric distances and pixel distances. Specifically, FIG. 53A illustrates a projection of points in an image plane 5300 to points in a three-dimensional space according to camera parameters of a camera 5302. FIG. 53B illustrates a diagram depicting various camera parameters for a camera that captures a two-dimensional image. Additionally, FIG. 53C illustrates relationships between the metric distances in the three-dimensional space and the pixel distances in the two-dimensional space according to the camera parameters and projection of points.

As mentioned, FIG. 53A illustrates a projection of points from a two-dimensional image to points in a three-dimensional space. For example, FIG. 53A illustrates a projection of a plurality of points corresponding to different pixels on the image plane 5300 of a two-dimensional image onto a plurality of ground points in a three-dimensional space corresponding to the two-dimensional image. To illustrate, a first point 5304*a* in the image plane 5300 corresponding to a first pixel height projects to a first ground point 5306*a* in the three-dimensional space based on the camera parameters of the camera 5302. Additionally, a second point 5304*b* in the image plane 5300 corresponding to a second pixel height projects to a second ground point 5306*b* in the three-dimensional space based on the camera parameters of the camera 5302. FIG. 53A also illustrates that a third point 5304*c* in the image plane 5300 corresponding to a third pixel height projects to a third ground point 5306*c* in the three-dimensional space based on the camera parameters of the camera 5302.

In one or more embodiments, as illustrated in FIG. 53A, a horizon line 5308 in the three-dimensional space corresponds to a camera height 5310 of the camera 5302. Specifically, the horizon line 5308 corresponds to a visual boundary that separates the ground from the sky in the two-dimensional image. Furthermore, in one or more embodiments, the horizon line 5308 is equal to the camera height 5310. Accordingly, determining the camera height 5310 of the camera 5302 also indicates the horizon line 5308 in the three-dimensional space when projecting the content of the two-dimensional image to the three-dimensional space.

In one or more additional embodiments, the two-dimensional image includes ground pixels 5312 that correspond to a ground 5314 projected into the three-dimensional space as a single plane from which the camera height 5310 is determined. In particular, the ground pixels 5312 include pixels below a point in the image plane 5300 that corresponds to the horizon line 5308 in the three-dimensional space. Thus, projecting pixels below the point in the image plane 5300 that corresponds to the horizon line 5308 into the three-dimensional space results in projecting the pixels to ground points on the ground 5314. Additionally, projecting pixels above the horizon line into the three-dimensional space does not result in projecting the pixels to ground points on the ground 5314.

FIG. 53A further illustrates that, by extending the horizon line 5308 in the three-dimensional space, the horizon line 5308 is at an equidistant position relative to the ground 5314. Specifically, FIG. 53A illustrates a first ground-to-horizon vector 5316*a* representing a first distance from the first ground point 5306*a* to the horizon line 5308, a second ground-to-horizon vector 5316*b* representing a second distance from the second ground point 5306*b* to the horizon line 5308, and a third ground-to-horizon vector 5316*c* representing a third distance from the third ground point 5306*c* to the horizon line 5308. More specifically, the first ground-to-horizon vector 5316*a*, the second ground-to-horizon vector 5316*b*, and the third ground-to-horizon vector 5316*c* indicate the same distance (e.g., the same metric height) from the ground 5314 to the horizon line 5308.

FIG. 53B illustrates various camera parameters of the camera 5302 of FIG. 53A. In particular, FIG. 53B illustrates a camera pitch 5318 indicating an angle θ of the camera 5302 relative to the horizon line 5308. For example, a camera pitch of 0 degrees indicates that the camera 5302 is pointed in a horizontal direction, while a camera pitch of 45 degrees indicates that the camera 5302 is pointed in a downward direction halfway between horizontal and vertical. Furthermore, FIG. 53B illustrates a focal length 5320 of the camera 5302 indicating a distance between the center of a lens of the camera 5302 and the point of focus (e.g., a point on the image plane the image plane 5300).

FIG. 53C illustrates relationships between distances in the three-dimensional space and the two-dimensional space of the two-dimensional image according to the camera parameters of the camera 5302. For instance, FIG. 53C illustrates a ground-to-horizon vector 5322 corresponding to a distance between a point on the ground 5314 and the horizon line 5308. Additionally, FIG. 53C illustrates a ground-to-point vector 5324 corresponding to a distance between the point on the ground 5314 and a specific point in the three-dimensional space. To illustrate, the ground-to-point vector 5324 indicates a height of an object positioned at the point on the ground 5314.

In one or more embodiments, as illustrated in FIG. 53C, the ground-to-horizon vector 5322 in the three-dimensional space corresponds to a first pixel distance 5326 on the image plane 5300 (e.g., in two-dimensional space). Furthermore, the ground-to-point vector 5324 in the three-dimensional space corresponds to a second pixel distance 5328 on the image plane 5300. As shown, a difference between the first pixel distance 5326 and the second pixel distance 5328 corresponds to a difference between the ground-to-horizon vector 5322 and the ground-to-point vector 5324. To illustrate, the difference in two-dimensional space has a linear relationship (or approximately a linear relationship) relative to the difference in three-dimensional space. Thus, changing the ground-to-point vector 5324 changes to the second pixel distance 5328, resulting in a linear change to the differences in three-dimensional space and two-dimensional space.

In one or more embodiments, the scene-based image editing system 106 determines the linear relationship between the pixel distances and metric distances in three-dimensional space based on a ratio formula. For example, the scene-based image editing system 106 determines the relationship between pixel height and metric height on a fixed ground point. More specifically, the scene-based image editing system 106 determines a camera height $h_{cam}$, a camera pitch θ, a focal length f, and the z-axis distance d from the camera to two vectors. For example, a first vector at the fixed ground point includes a first metric height $h_1$, and a second vector at the fixed ground point includes a second metric height $h_2$. The pixel distances of lines on the image plane include a first pixel distance $ph_1$ corresponding to the first vector and a second pixel distance $ph_2$ corresponding to the second vector. Additionally, the scene-based image editing system 106 determines the pixel distances of:

$$ph_1 = h_1 \frac{f\cos\phi_1}{d\cos\theta\cos(\phi_1 - \theta)}$$

$$ph_2 = h_2 \frac{f\cos\phi_1(\cos\theta + \sin\theta\tan\phi_2)}{d\cos(\phi_1 - \theta)}$$

$$\phi_1 = \arctan\frac{h_1}{d}$$

$$\phi_2 = \theta - \arctan\frac{h_1 - h_2}{d}$$

The scene-based image editing system 106 modifies the above pixel distances via approximations resulting in a linear relationship as:

$$\frac{ph_1}{ph_2} = \frac{h_1}{h_2}$$

Based on the above determination indicating the linear relationship between metric distances and pixel distances, the scene-based image editing system 106 determines a two-dimensional vector field in a two-dimensional image for which a plurality of vectors start from ground pixels and end at an intersection with the horizon line. Specifically, the scene-based image editing system 106 determines a plurality of ground-to-horizon vectors in the two-dimensional space that are perpendicular to the ground plan when projected to the three-dimensional space. Additionally, as mentioned, the ground-to-horizon vectors have the same metric distance corresponding to the camera height. The ground-to-horizon vectors also have linear relationships between pixel and metric distances. Accordingly, the scene-based image editing system 106 defines the scale field SF by dividing the pixel magnitudes of the ground-to-horizon vectors by the absolute metric height of the camera:

$$SF(x, y) = \begin{cases} ph(x, y)/h_{cam} & \text{if } (x, y) \in \text{ground}, \\ 0 & \text{otherwise}, \end{cases}$$

in which (x, y) is a two-dimensional coordinate, and ph is a pixel height of the ground-to-horizon vector from (x, y) normalized by the image height and width. The resulting scale field is a two-dimensional map of per-pixel values indicating pixel-to-metric ratios.

In one or more embodiments, the scene-based image editing system 106 determines the scale field providing information for each ground pixel in a two-dimensional image indicating how many pixels represent a certain amount of vertical metric length in the projected three-dimensional space. By generating the scale field, the scene-based image editing system 106 enables various scale-aware operations on two-dimensional images such as three-dimensional understanding or scale-aware image editing. Additionally, in some embodiments, the scene-based image editing system 106 utilizes the scale fields of two-dimensional images to further improve the performance of neural networks for determining depth estimation of two-dimensional images. Furthermore, although the above examples describe determining pixel-to-metric heights in two-dimensional images, the scene-based image editing system 106 can also utilize scale fields to determine other pixel-to-metric distances based on the pixel-to-metric heights. In alternative embodiments, the scene-based image editing system 106 generates scale fields to represent metric-to-pixel heights based on metric-to-pixel heights.

Figure 54:
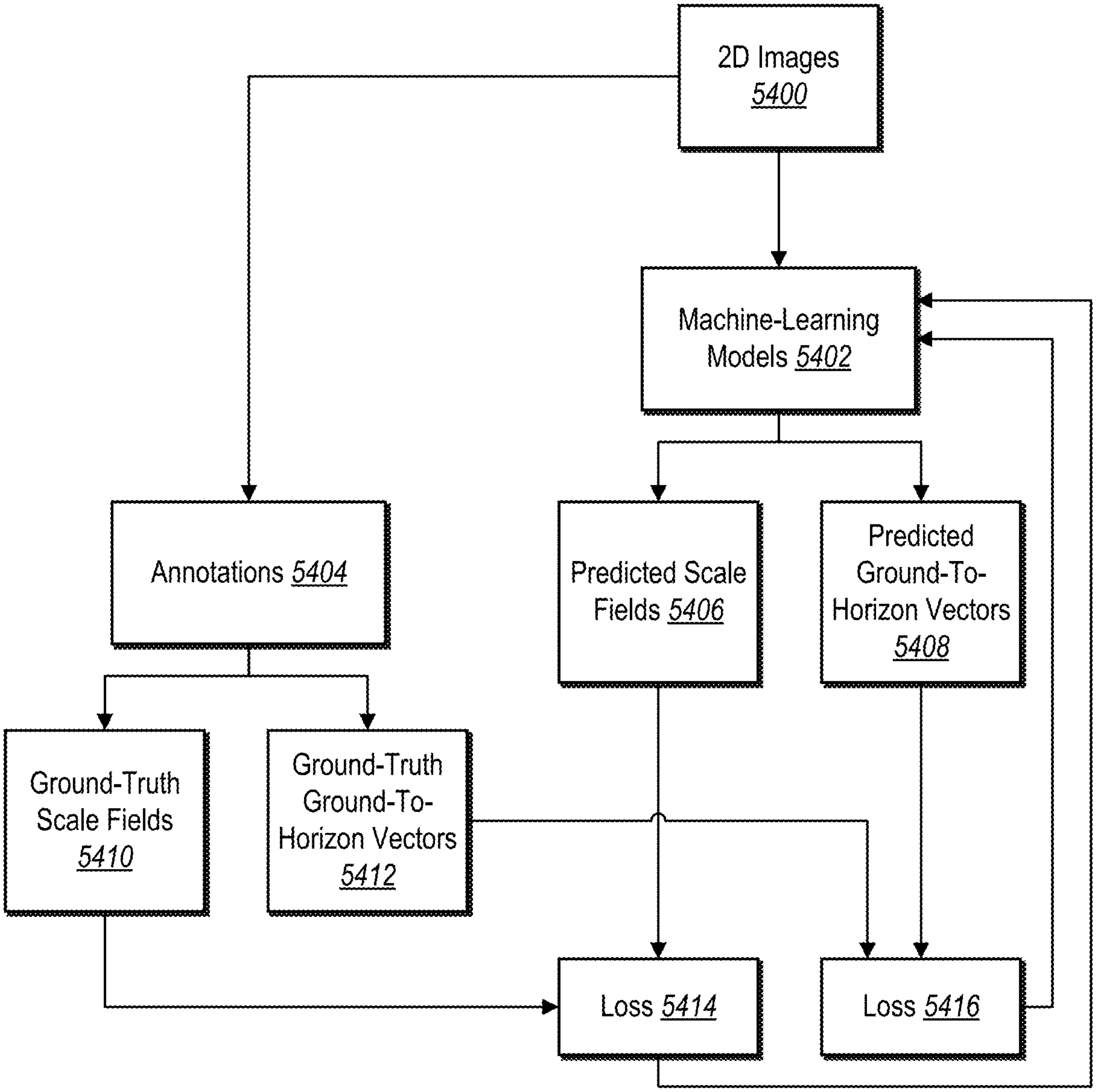
FIG. 54 illustrates a diagram of the scene-based image editing system modifying parameters of one or more machine-learning models based on scale fields and ground-to-horizon vectors in accordance with one or more embodiments.

According to one or more embodiments, the scene-based image editing system 106 utilizes annotated two-dimensional images to train one or more neural networks in connection with generating scale-aware data from two-dimensional images. For example, as illustrated in FIG. 54, the scene-based image editing system 106 utilizes a dataset including two-dimensional images 5400 to train machine-learning models 5402. Specifically, in one or more embodiments, the scene-based image editing system 106 utilizes a training dataset including the two-dimensional images 5400 to modify parameters of the machine-learning models 5402 in connection with generating scale field data and/or additional scale-aware information (e.g., ground-to-horizon vectors).

In one or more embodiments, the scene-based image editing system 106 generates the training dataset including the two-dimensional images 5400 by annotating the two-dimensional images 5400 with scale-aware information. For instance, the scene-based image editing system 106 automatically annotates one or more portions of the two-dimensional images 5400 (e.g., via one or more additional machine-learning models). In some embodiments, the scene-based image editing system 106 annotates one or more portions of the two-dimensional images 5400 based on user input (e.g., via one or more human annotations). Furthermore, in some embodiments, the scene-based image editing system 106 utilizes a variety of scene types, image types, and/or camera parameters to train the machine-learning models 5402.

In at least some embodiments, the scene-based image editing system 106 determines annotations 5404 for the two-dimensional images 5400 based on camera parameters. To illustrate, the scene-based image editing system 106 determines scale information for a dataset of web images or other two-dimensional images based on intrinsic and extrinsic camera parameters. In additional embodiments, the scene-based image editing system 106 determines the annotations based on additional sensor systems and/or metadata associated with the two-dimensional images 5400. Accordingly, the scene-based image editing system 106 utilizes one or more types of sources to annotate the two-dimensional images 5400 with field of view, pitch, roll, and/or camera height parameters. Furthermore, the scene-based image editing system 106 utilizes camera parameters to determine horizon lines and ground-to-horizon vectors for the two-dimensional images 5400. FIGS. 55A-55D and FIGS. 56A-56E and the corresponding description provide additional detail with respect to annotating two-dimensional images.

In connection with generating the dataset of two-dimensional images 5400 including a plurality of annotations 5404, the scene-based image editing system 106 utilizes the machine-learning models 5402 to generate predicted scaling information. For instance, as illustrated in FIG. 54, the scene-based image editing system 106 utilizes a first machine-learning model to generate predicted scale fields 5406 for the two-dimensional images 5400. Additionally, as illustrated in FIG. 54, the scene-based image editing system 106 utilizes a second machine-learning model to generate predicted ground-to-horizon vectors 5408 for the two-dimensional images 5400.

In response to generating the predicted scale fields 5406 and/or the predicted ground-to-horizon vectors 5408, the scene-based image editing system 106 utilizes the annotations 5404 to determine one or more losses. Specifically, the scene-based image editing system 106 determines ground-truth scale fields 5410 and ground-truth ground-to-horizon vectors 5412 according to the annotations 5404. For instance, the scene-based image editing system 106 compares the predicted scale fields 5406 to the ground-truth scale fields to determine a first loss 5414. Additionally, the scene-based image editing system 106 compares the predicted ground-to-horizon vectors 5408 to determine a second loss 5416.

In one or more embodiments, the scene-based image editing system 106 utilizes the first loss 5414 and/or the second loss 5416 to modify parameters of one or more of the machine-learning models 5402. For example, the scene-based image editing system 106 modifies parameters of the first machine-learning model that generates scale fields based on the first loss 5414. Additionally, the scene-based image editing system 106 modifies parameters of the second machine-learning model that generates ground-to-horizon vectors based on the second loss 5416. In some embodiments, the scene-based image editing system 106 utilizes a single model (e.g., a multi-branch model) to generate the predicted scale fields 5406 and the predicted ground-to-horizon vectors 5408. Accordingly, the scene-based image editing system 106 utilizes the first loss 5414 and the second loss 5416 to modify parameters of the single model (e.g., via modifying parameters of the separate branches).

In some embodiments, the scene-based image editing system 106 determines the first loss 5414 and the second loss 5416 utilizing regression losses (e.g., mean squared error losses with equal loss weights). For example, the scene-based image editing system 106 determines the losses by normalizing the predicted scale fields 5406, the predicted ground-to-horizon vectors 5408, the ground-truth scale fields 5410, and the ground-truth ground-to-horizon vectors 5412. To illustrate, the scene-based image editing system 106 normalizes the data according to corresponding mean and variance values. More specifically, the scene-based image editing system 106 determines outputs of fully connected layers with a plurality of channels, softmaxed and weighted summed by predefined bin values. According to one or more embodiments, the scene-based image editing system 106 determines bin ranges and distributions for global parameter estimation according to Table 1 below, with $\mathcal{U}$ and $\mathcal{N}$ referring to uniform and normal distributions, respectively. Additionally, the horizon line offset is the vertical distance of the horizon line from the center of an image, with the upper left corner set as the origin.

| Parameter | Range | Distribution |
|---|---|---|
| Camera Height | [0.05 m, 300 m] | Logscale $\mathcal{U}$ |
| Camera roll | [−30°, 30°] | $\mathcal{N}$ (0, 20°) |
| Horizontal Offset | [−0.5, 1.0] | $\mathcal{N}$ (0.5, 0.5) |
| Field of View | [15°, 120°] | $\mathcal{U}$ |

Figure 55B:
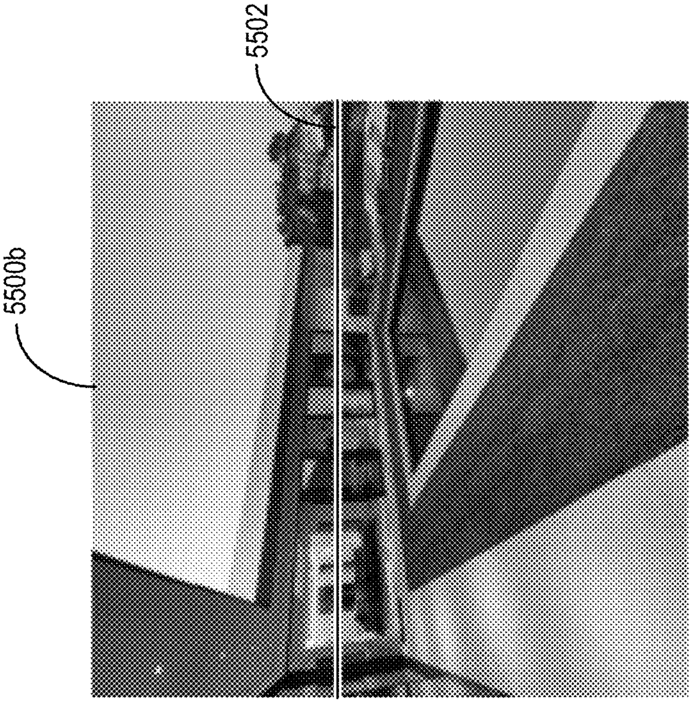
FIGS. 55A-55D illustrate image overlays in a process for determining a scale field for a two-dimensional image in accordance with one or more embodiments.
Figure 55A:
Figure 55D:
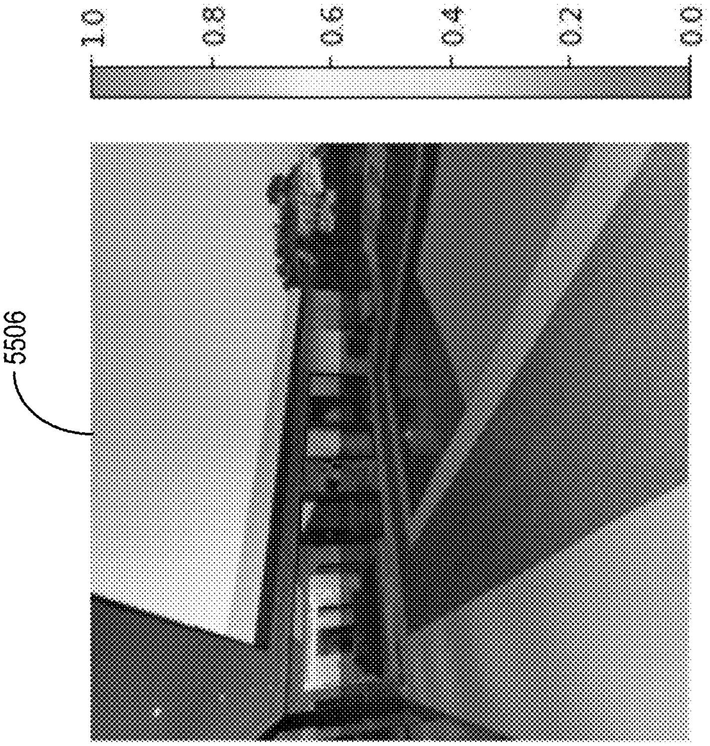
Figure 55C:
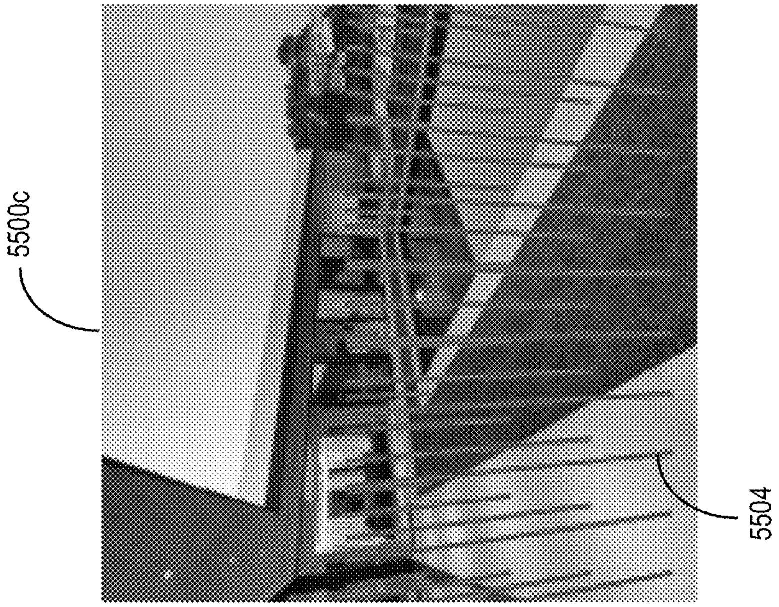

FIGS. 55A-55D illustrate a two-dimensional image including a plurality of different annotations related to generating a scale field for the two-dimensional image. Specifically, FIG. 55A illustrates an unannotated two-dimensional image 5500*a*. Specifically, as illustrated the unannotated two-dimensional image 5500*a* includes a scene captured by a camera with known (or estimated) camera height. FIG. 55B illustrates a first annotated two-dimensional image 5500*b* including a horizon line 5502 corresponding to the camera height. FIG. 55C illustrates a second annotated two-dimensional image 5500*c* with a plurality of ground-to-horizon vectors (e.g., ground-to-horizon vector 5504) from a plurality of ground points in a corresponding three-dimensional space to the horizon line.

FIG. 55D illustrates a two-dimensional image 5506 including a scale field overlay. In particular, as illustrated, the scale field includes a plurality of values for a plurality of pixels below the horizon line. For instance, two-dimensional image 5506 includes the scale field overlay including a colorized value representing each pixel in the region below the horizon line. As shown, each value represents a pixel-to-metric ratio corresponding to the parameters of the two-dimensional image. More specifically, as illustrated in FIG. 55D, the values of the scale field are lower (e.g., indicating lower pixel-to-depth ratios) nearest the horizon line and higher farther away from the horizon line (and closer to the camera position). Thus, the ratio of a pixel distance from each pixel to the horizon line (in number of pixels) relative to the metric distance from the corresponding ground point in three-dimensional space to the horizon line (in three-dimensional space) is lowest near the horizon line.

As mentioned, in one or more embodiments, the scene-based image editing system 106 utilizes a plurality of different types of digital images to train machine-learning models for determining scene-aware data. In particular, the scene-based image editing system 106 utilizes two-dimensional panoramic images to generate a training dataset. For example, the scene-based image editing system 106 utilizes panoramic images to extract a plurality of different images for scaling the training dataset. In some embodiments, the panoramic images provide different combinations of camera parameters while maintaining the same camera height. FIGS. 56A-56D illustrate a panoramic image and a plurality of images extracted from the panoramic image.

Figure 56A:
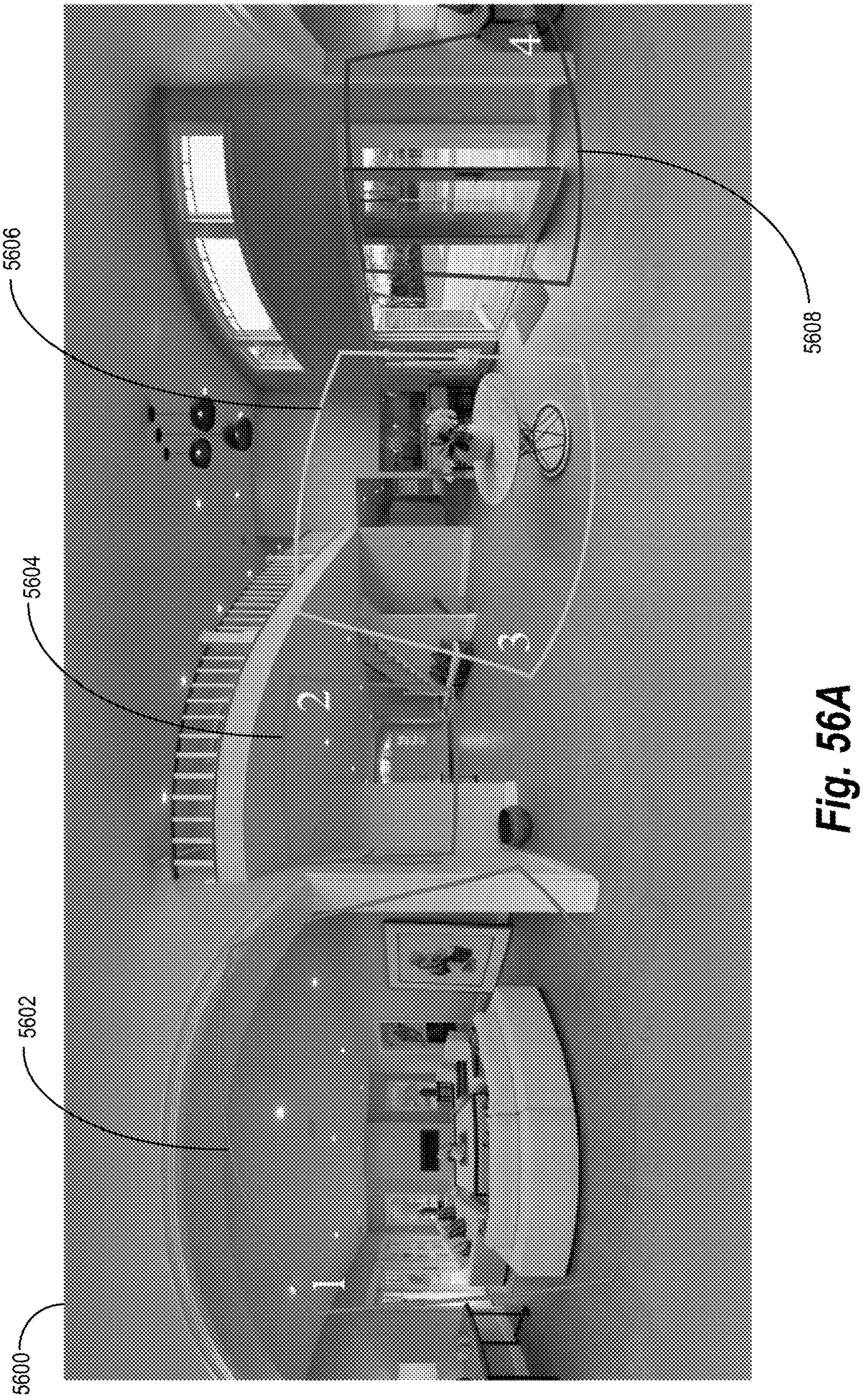
FIGS. 56A-56E illustrate scale fields generated for cropped portions of a panoramic two-dimensional image in accordance with one or more embodiments.

For example, FIG. 56A illustrates a panoramic image 5600 including a 360° view of a space. Additionally, as shown, the scene-based image editing system 106 determines a plurality of separate two-dimensional images for a training dataset based on the panoramic image 5600. To illustrate, the scene-based image editing system 106 determines a first portion 5602, a second portion 5604, a third portion 5606, and a fourth portion 5608 of the panoramic image 5600. Each of the images extracted from the panoramic image 5600 includes different camera parameters (e.g., pitch, roll) with the same camera height. The images also each include different views of content within the space.

Figure 56B:

FIG. 56B illustrates a first image 5610*a* corresponding to the first portion 5602 of the panoramic image 5600. FIG. 56B also illustrates an overlaid first image 5610*b* including a scale field and ground-to-horizon vectors overlaid on top of the first image 5610*a*.

Figure 56C:
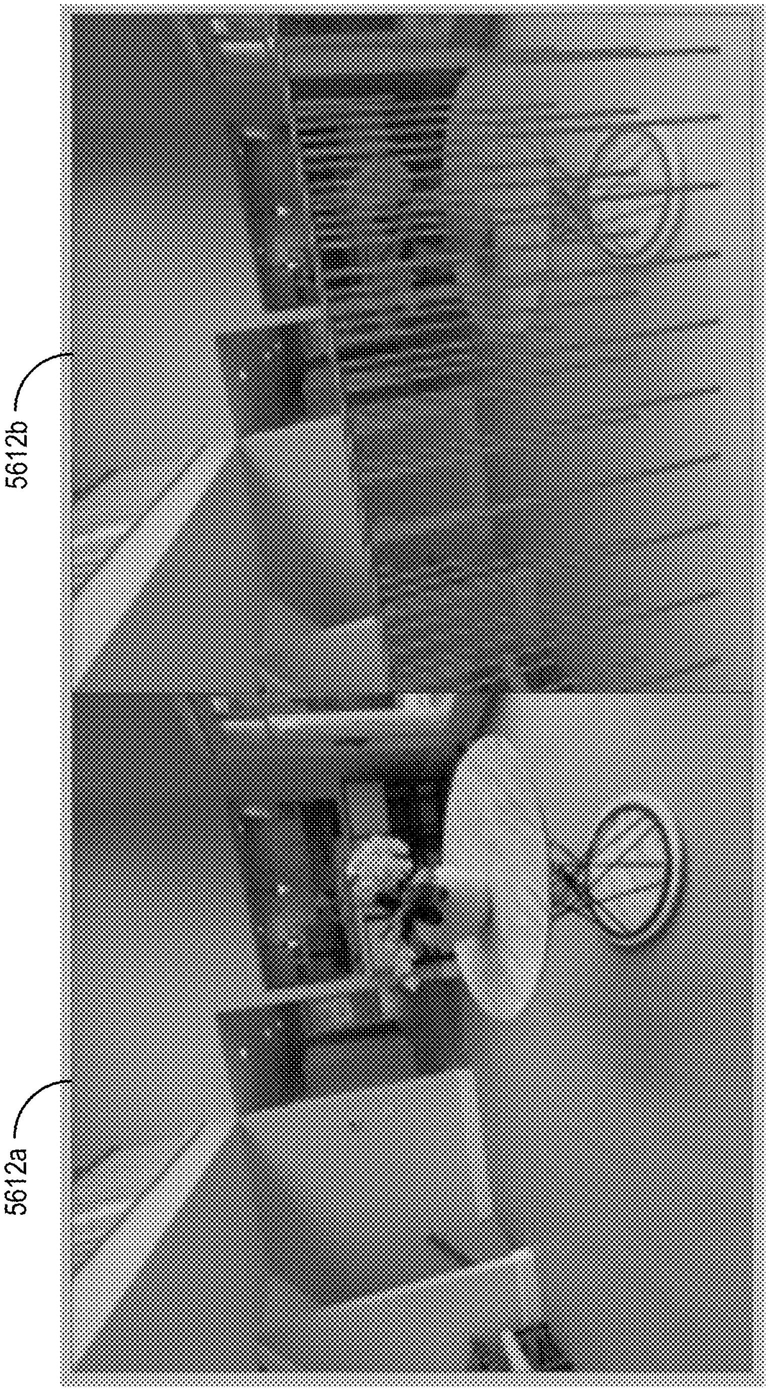

FIG. 56C illustrates a second image 5612*a* corresponding to the second portion 5604 of the panoramic image 5600. FIG. 56C also illustrates an overlaid second image 5612*b* including a scale field and ground-to-horizon vectors overlaid on top of the second image 5612*a*.

Figure 56D:
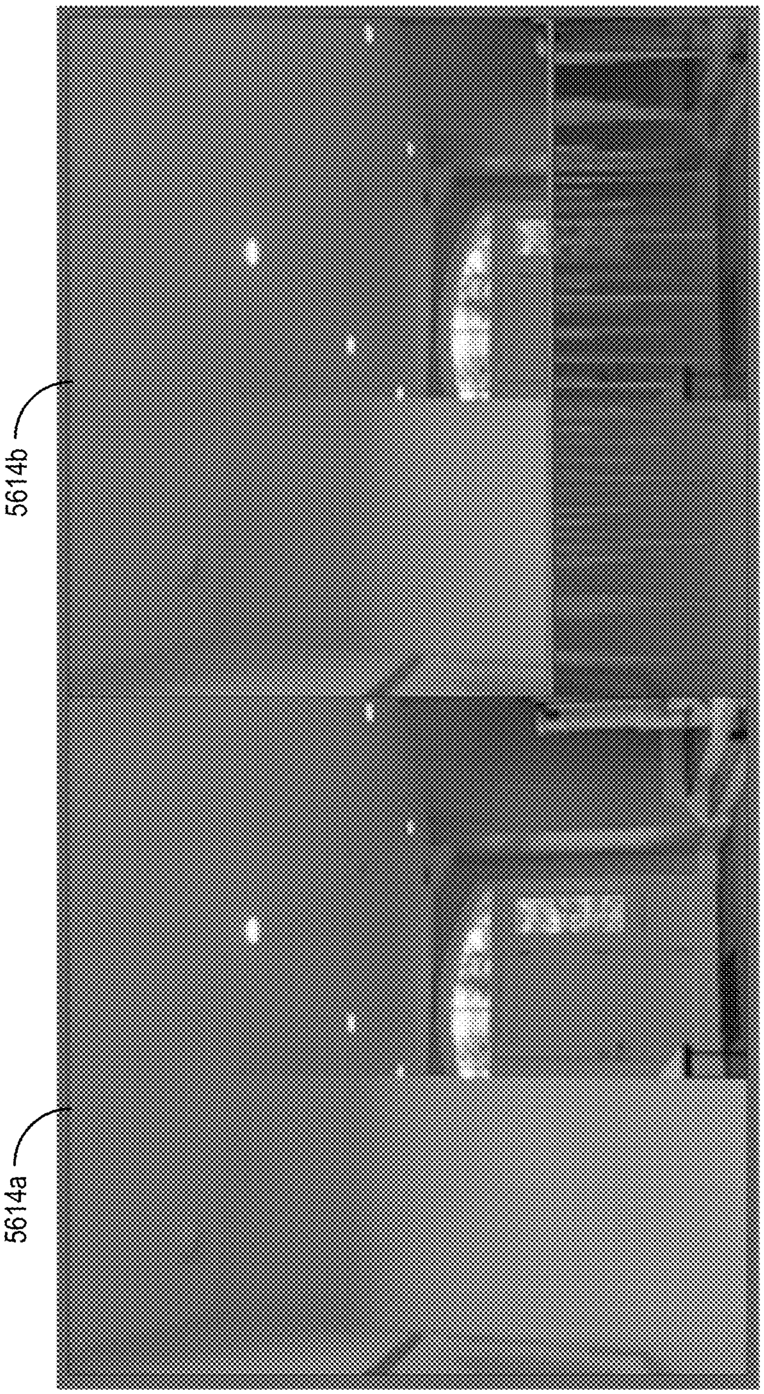

FIG. 56D illustrates a third image 5614*a* corresponding to the third portion 5606 of the panoramic image 5600. FIG. 56D also illustrates an overlaid third image 5614*b* including a scale field and ground-to-horizon vectors overlaid on top of the third image 5614*a*.

Figure 56E:
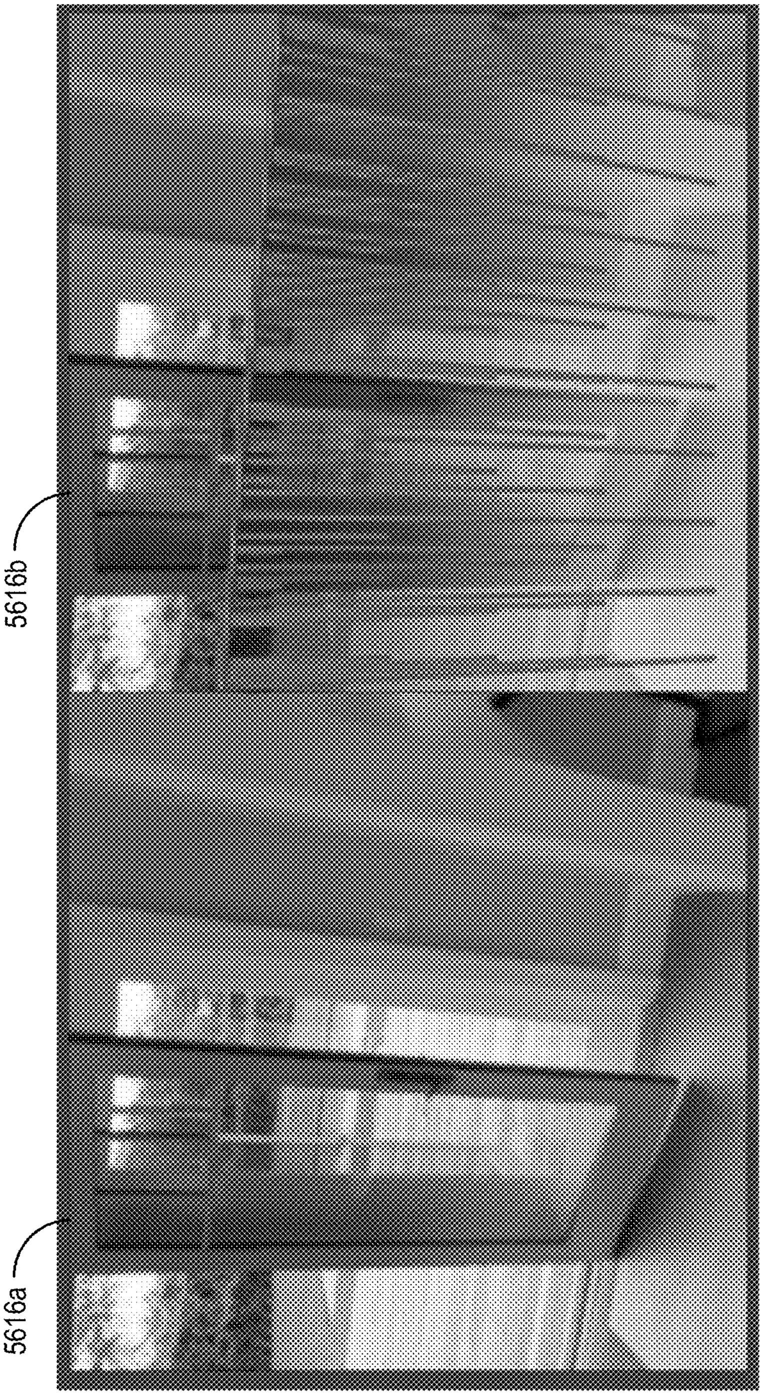

FIG. 56E illustrates a fourth image 5616*a* corresponding to the fourth portion 5608 of the panoramic image 5600. FIG. 56E also illustrates an overlaid fourth image 5616*b* including a scale field and ground-to-horizon vectors overlaid on top of the fourth image 5616*a*.

As shown in FIGS. 56B-56E, the scene-based image editing system 106 determines equirectangular-to-perspective croppings of each of the separate portions of the panoramic image 5600. In connection with determining the separate croppings, the scene-based image editing system 106 determines scale fields for each of the separate portions of the panoramic image 5600. Accordingly, the scene-based image editing system 106 generates a plurality of separate images with different combinations of camera parameters with the same camera height from a single panorama. Furthermore, as illustrated in the separate images, the scene-based image editing system 106 determines scale fields with respect to the specific horizon lines of the different images and corresponding ground-to-horizon vectors. The scene-based image editing system 106 can similarly extract a plurality of images from panoramas of various indoor and outdoor scenes.

In one or more embodiments, the scene-based image editing system 106 generates a training dataset including digital images with a plurality of non-horizontal horizon lines. In particular, the scene-based image editing system 106 utilizes the camera parameters in connection with the horizon lines to determine whether the digital images are tilted due to camera roll and/or pitch. The scene-based image editing system 106 can utilize such information when training the machine-learning models to account for such camera roll and/or pitch in processed digital images.

Figure 57:
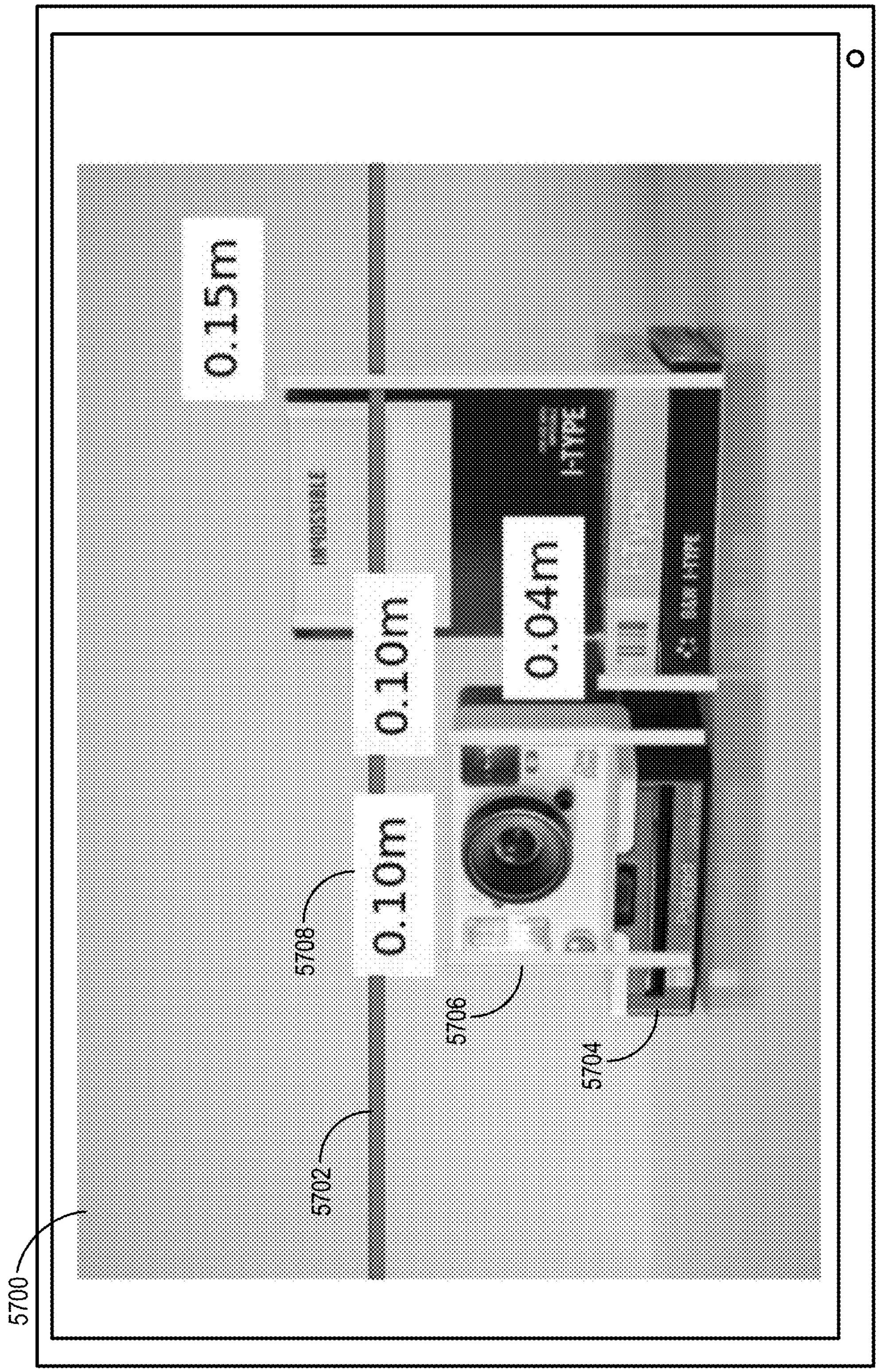
FIG. 57 illustrates a two-dimensional image including overlays indicating metric distances in accordance with one or more embodiments.

FIG. 57 illustrates a graphical user interface of a client device displaying a digital image 5700 including scale-aware information based on the content of the digital image. Specifically, the client device displays the digital image 5700 including a plurality of objects in a scene captured by a camera with specific parameters. In one or more embodiments, the scene-based image editing system 106 processes the digital image 5700 utilizing one or more neural networks to generate a scale field for the digital image 5700. The scene-based image editing system 106 (or another system, such as a digital image editing system) utilizes the scale field to perform one or more downstream operations.

For example, as illustrated, the client device displays the digital image 5700 with scale-aware information overlaid on top of the digital image 5700. To illustrate, the scene-based image editing system 106 utilizes the scale field generated for the digital image 5700 to display, via the client device, a horizon line 5702 corresponding to the camera height of the camera that captured the digital image 5700. Additionally, the scene-based image editing system 106 generates a plurality of measurements based on metric distances extracted based on the scale field for the digital image 5700. More specifically, the client device displays the digital image 5700 including a first object 5704 with a height line 5706 indicating a distance from a detected ground point to a top of the first object 5704. The client device also displays a measurement overlay 5708 indicating the metric distance of the height line 5706, which indicates a metric distance in three-dimensional space according to the pixel-to-metric value extracted from the scale field for the pixel at the detected ground point.

In additional embodiments, the scene-based image editing system 106 provides metric distances for additional objects and/or portions of a two-dimensional image. For example, the scene-based image editing system 106 utilizes scale-aware information for a digital image to determine non-vertical distances within the two-dimensional image. To illustrate, the scene-based image editing system 106 utilizes a plurality of ground-to-horizon vectors of the two-dimensional image and/or pixel-to-metric values from a scale field to estimate horizontal or other distances corresponding to lines that are not perpendicular to the horizon line within the two-dimensional image.

In one or more embodiments, the scene-based image editing system 106 measures a metric distance (e.g., height or width) within a two-dimensional image based on a scale field value for a selected pixel in the two-dimensional image. For instance, in connection with measuring a distance from a first pixel (e.g., a ground point) to a second pixel in the two-dimensional image— such as from a bottom to a top of an object—the scene-based image editing system 106 determines the value in the scale field for the two-dimensional image at the first pixel indicating a ratio of pixel height to camera height at the first pixel. The scene-based image editing system 106 utilizes the indicated ratio to convert a pixel distance associated with the object in the two-dimensional image to a metric distance for the object (e.g., 50 pixels represents 2 meters at that ground point). In some embodiments, the scene-based image editing system 106 utilizes scale field values for more than one pixel to determine a distance from one ground point to another.

Figure 58:
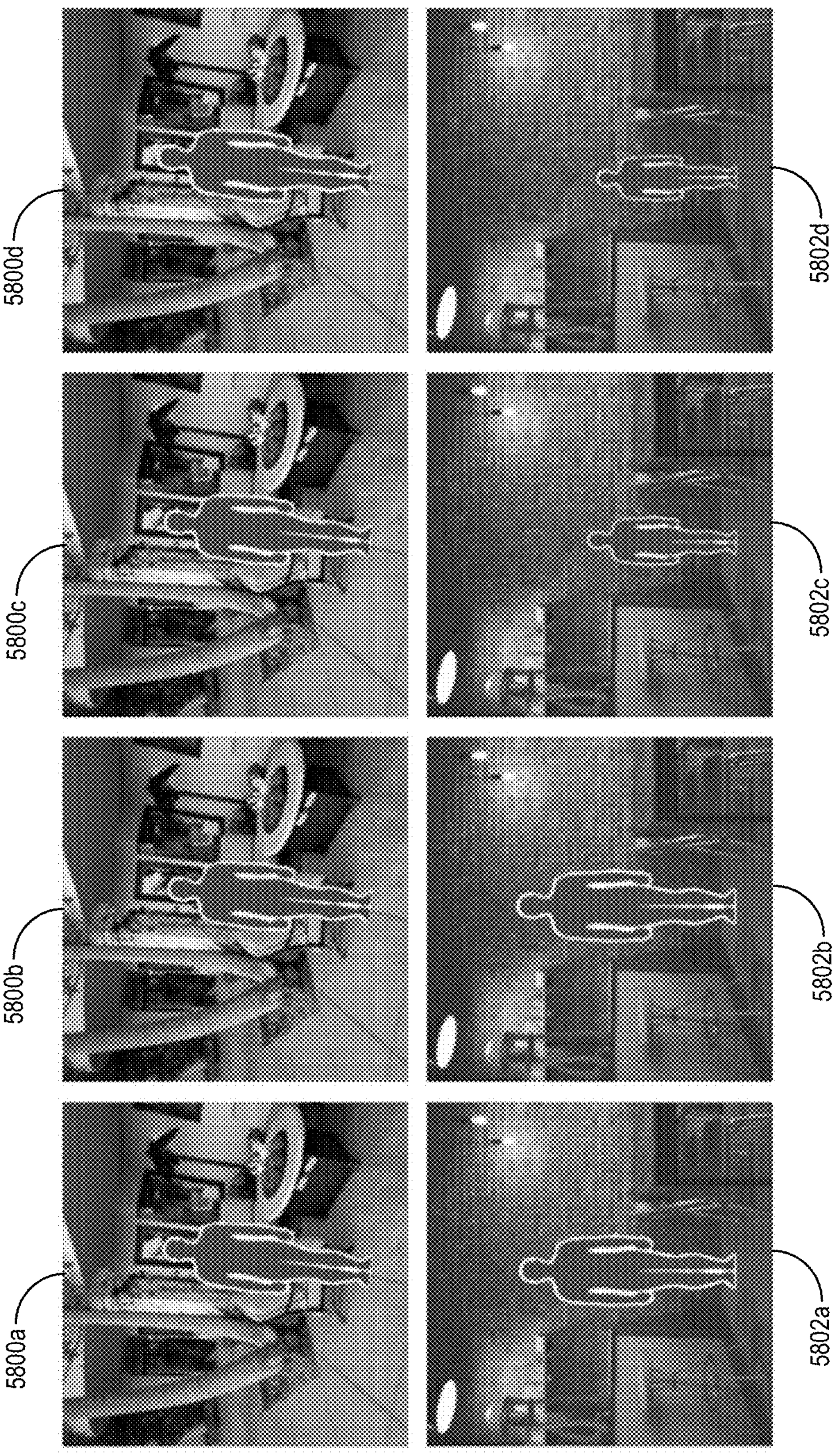
FIGS. 58A-58D illustrate a plurality of two-dimensional images including an inserted object utilizing different methods in accordance with one or more embodiments.

According to one or more embodiments, the scene-based image editing system 106 also utilizes scale-aware information to modify digital images. For instance, FIG. 58 illustrates a plurality of digital images modified by inserting an object into a scene. Specifically, FIG. 58 illustrates a ground-truth image 5800*a* including a first human silhouette 5802*a* with a ground-truth height into the ground-truth image 5800*a* at a specific location. Additionally, in connection with determining the ground-truth image 5800*a*, the scene-based image editing system 106 determines camera parameters and a horizon line associated with the ground-truth image 5800*a*.

In one or more embodiments, the scene-based image editing system 106 inserts an object into a two-dimensional image by determining a scale field value for a pixel indicating a ground point at the insertion point of the object. For example, the scene-based image editing system 106 determines the scale field value of the pixel to determine a ratio of pixel distance to metric distance at the insertion point. The scene-based image editing system 106 utilizes knowledge of a distance associated with the inserted object (e.g., a known height) and converts the distance into a pixel distance. The scene-based image editing system 106 scales the object for insertion at the insertion point based on the pixel distance determined based on the scale field value. Additionally, the scene-based image editing system 106 modifies a scale of the object in response to changing a position of the object within the image based on one or more additional scale field values of one or more additional pixels in the two-dimensional image.

FIG. 58 also illustrates a plurality of modified digital images including the human silhouette at the same position scaled utilizing a variety of models. In particular, the scene-based image editing system 106 generates a first modified image 5800*b* including a human silhouette 5802*b* at the position according to a scale field and a ground-to-horizon vector generated for the first modified image 5800*b* utilizing the scale field model described above (e.g., in FIG. 51). FIG. 58 also illustrates a second modified image 5800*c* including a human silhouette 5802*c* at the position according to a ground-to-horizon vector and a camera height estimated for the second modified image 5800*c*. FIG. 58 further illustrates a third modified image 5800*d* including a human silhouette 5802*d* at the position according to a plurality of camera parameters (e.g., horizontal offset/horizon line, field of view, camera roll, and camera height) estimated for the third modified image 5800*d*. As illustrated, the scene-based image editing system 106 utilizes the scale field to generate the first modified image 5800*b* with accurate scaling relative to the ground-truth image 5800*a*, while the other models produce inaccurate scaling.

Table 2 below includes measurements of model scaling performance for a plurality of different models on a plurality of different image datasets. Specifically, Table 2 includes quantitative evaluations of model performance (e.g., performance of Model 1, Model 2, and Model 3) on samples from the various datasets. Model 1 includes the scale field model utilized by the scene-based image editing system 106 trained on a panorama dataset. Model 2 includes the model for generating the second modified image 5800*c* of FIG. 58 above trained on the panorama dataset. Model 3 includes the model for generating the third modified image 5800*d* of FIG. 58 above trained on the panorama dataset. Model 1* and Model 2* refer to Model 1 and Model 2 trained on the panorama dataset and a web image dataset. Additionally, Stanford2D3D corresponds to a dataset described by Iro Armeni Sasha Sax, Amir R. Zamir, and Silvio Savarese in “Joint 2d-3d-semantic data for indoor scene understanding” in arXiv:1702.01105 (2017). Matterport3D corresponds to a dataset described by Angel Chang, Angela Dai, Thomas Funkhouser, Maciej Halber, Matthias Niessner, Manolis Savva, Shuran Song, Andy Zeng, and Yinda Zhang in “Matterport3d: Learning from rgb-d data in indoor environments” in International Conference on 3D Vision (2017).

| Model | Stanford2D3D | Matterport3D | Web Images |
|---|---|---|---|
| Model 3 | 1.932 | 4.154 | 21.510 |
| Model 2 | 1.612 | 3.558 | 21.738 |
| Model 1 | 1.502 | 3.522 | 21.263 |
| Model 2* | 1.924 | 3.702 | 13.785 |
| Model 1* | 1.858 | 3.601 | 3.076 |

As indicated in the table above, the scene-based image editing system 106 utilizes scale fields to provide improved scaling accuracy over the other models. Specifically, the scale metrics indicate that the performance when replacing global parameter prediction with dense field information provided in the scale fields. Furthermore, as indicated, training the scale field model utilized by the scene-based image editing system 106 on panoramas and web images significantly improves the scaling performance on web images including a large variety of scenes without significantly degrading performance with respect to the other datasets, which have a limited range of camera heights in specific indoor scenes.

Figure 59:
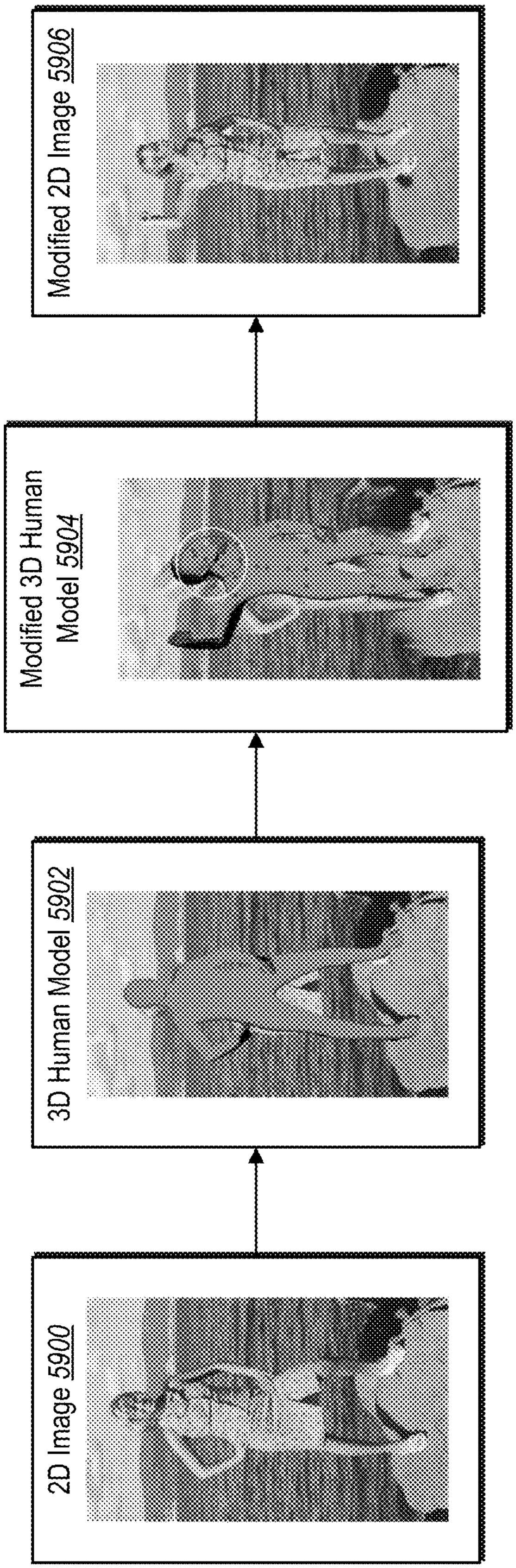
FIG. 59 illustrates an overview diagram of the scene-based image editing system reposing a two-dimensional human extracted from a two-dimensional image via a three-dimensional representation of the two-dimensional human in accordance with one or more embodiments.

In one or more embodiments, as mentioned, the scene-based image editing system 106 generates three-dimensional representations of two-dimensional humans detected in two-dimensional images. In particular, the scene-based image editing system 106 generates three-dimensional human models representing the two-dimensional humans in the two-dimensional images for performing a number of downstream operations. For example, FIG. 59 illustrates an overview of the scene-based image editing system 106 generating a three-dimensional representation based on a two-dimensional human in a two-dimensional image 5900. More specifically, FIG. 59 illustrates that the scene-based image editing system 106 utilizes the three-dimensional representation of the two-dimensional human to modify the two-dimensional image based on a modified pose of the three-dimensional representation.

In one or more embodiments, the scene-based image editing system 106 utilizes a plurality of neural networks to generate a three-dimensional human model 5902 corresponding to a two-dimensional human extracted from the two-dimensional image 5900. Specifically, the scene-based image editing system 106 utilizes neural networks to extract pose and shape information based on the two-dimensional human to generate the three-dimensional human model 5902 within a three-dimensional space. For example, as mentioned previously, the scene-based image editing system 106 generates a three-dimensional representation of content within a scene of the two-dimensional image 5900. The scene-based image editing system 106 thus generates and inserts the three-dimensional human model 5902 into a specific location within the three-dimensional space relative to other content of the two-dimensional image 5900.

In one or more embodiments, as illustrated in FIG. 59, the scene-based image editing system 106 determines a modified three-dimensional human model 5904 based on the three-dimensional human model 5902. For instance, the scene-based image editing system 106 generates a reposed three-dimensional human model in response to a user input via a graphical user interface interacting with the three-dimensional human model 5902. Accordingly, the scene-based image editing system 106 generates the modified three-dimensional human model 5904 including a target pose.

Furthermore, as illustrated in FIG. 59, the scene-based image editing system 106 utilizes the modified three-dimensional human model 5904 to generate a modified two-dimensional image 5906. Specifically, the scene-based image editing system 106 generates the modified two-dimensional image 5906 including a modified two-dimensional image based on the modified three-dimensional human model 5904. Thus, the scene-based image editing system 106 provides tools for reposing two-dimensional humans in two-dimensional images based on corresponding three-dimensional representations in three-dimensional space.

Although FIG. 59 illustrates that the scene-based image editing system 106 utilizes the three-dimensional human model 5902 to generate a modified two-dimensional image 5906 via reposing the three-dimensional human model 5902, in additional embodiments, the scene-based image editing system 106 utilizes the three-dimensional human model 5902 to perform one or more additional downstream operations associated with the two-dimensional image 5900. For example, the scene-based image editing system 106 utilizes the three-dimensional human model 5902 to determine interactions between objects of the two-dimensional image 5900 in the three-dimensional space. Additionally, in some embodiments, the scene-based image editing system 106 utilizes the three-dimensional human model 5902 to generate shadows in the three-dimensional space (e.g., as described above with respect to FIG. 40).

According to one or more embodiments, by utilizing a plurality of neural networks to generate three-dimensional representations of humans in two-dimensional images, the scene-based image editing system 106 provides real-time editing of human poses in the two-dimensional images. In particular, in contrast to conventional systems that provide reposing of humans in two-dimensional images based on poses of humans in additional two-dimensional images, the scene-based image editing system 106 provides dynamic real-time reposing of a human in a two-dimensional image based on user input with the two-dimensional image. More specifically, the scene-based image editing system 106 provides reposing of humans from a single monocular image.

Additionally, the scene-based image editing system 106 provides accurate reposing of humans in two-dimensional images by extracting both three-dimensional pose and three-dimensional shape information from a two-dimensional human in a two-dimensional image. In contrast to other systems that repose humans in two-dimensional images based on poses of different humans in additional two-dimensional images, the scene-based image editing system 106 utilizes three-dimensional understanding of humans in two-dimensional images for reposing the humans in the two-dimensional images. Specifically, the scene-based image editing system 106 leverages a three-dimensional representation of a two-dimensional human to provide an accurate reposing of the three-dimensional representation and reconstruction of the two-dimensional human according to the reposed three-dimensional representation. Additionally, in contrast to the conventional systems, the scene-based image editing system 106 preserves a body shape of the human when reposing the three-dimensional representation by extracting the shape and pose of the human directly from the two-dimensional image. Moreover, as described in greater detail below, the scene-based image editing system 106 also provides improved user interfaces that reduce interactions and improve efficiency of implementing systems in generating modified digital images (relative to conventional systems that require significant user interactions with a large number of tools and pixels to generate an image with a modified pose).

Figure 60:
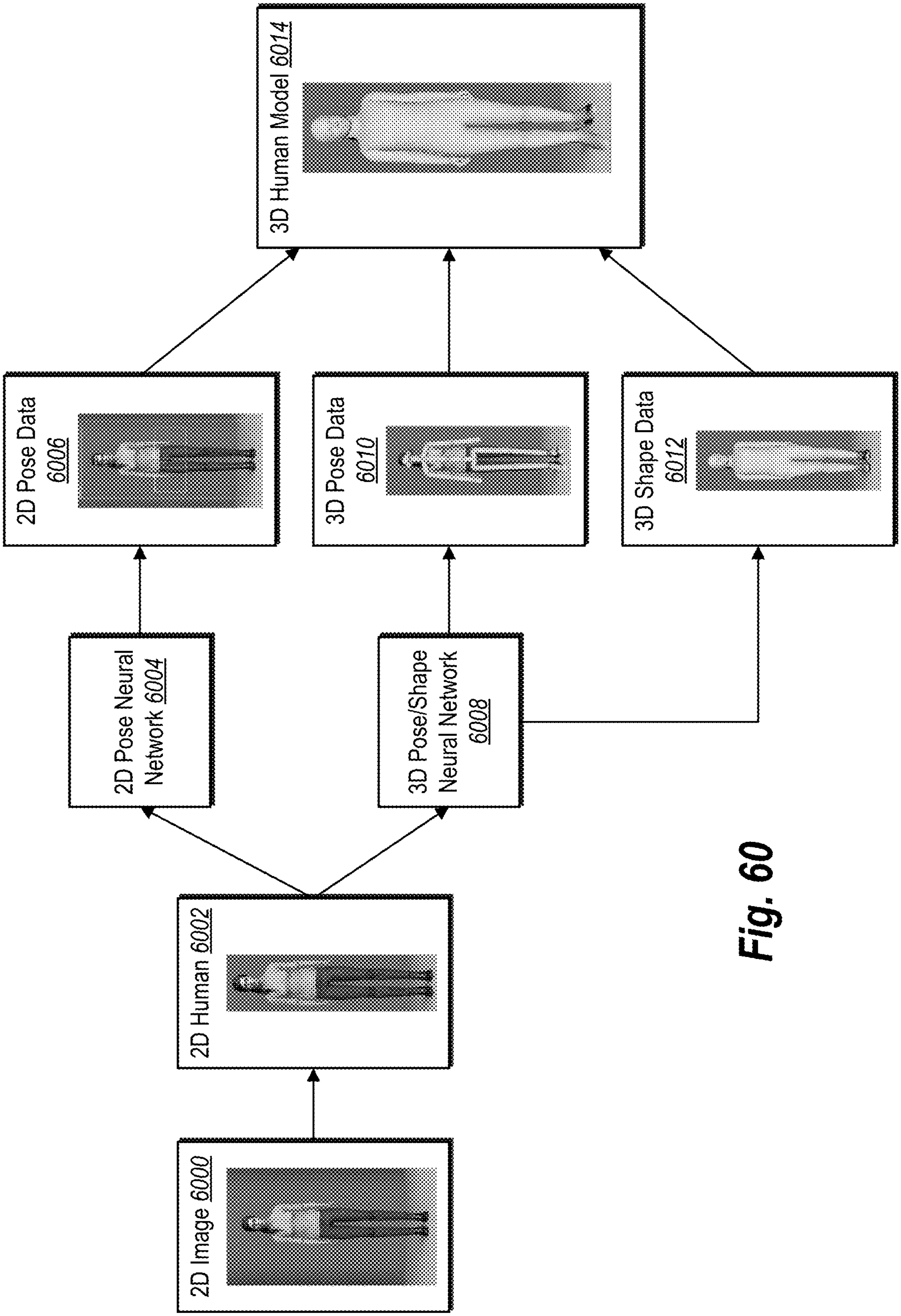
FIG. 60 illustrates a diagram of the scene-based image editing system generating a three-dimensional human model representing a two-dimensional human extracted from a two-dimensional image in accordance with one or more embodiments.

As mentioned, in one or more embodiments, the scene-based image editing system 106 generates a three-dimensional representation of a two-dimensional human extracted from a two-dimensional image. FIG. 60 illustrates a diagram of the scene-based image editing system 106 utilizing a plurality of neural networks to generate a three-dimensional representation of a human in a two-dimensional image 6000.

Specifically, the scene-based image editing system 106 determines three-dimensional characteristics of a human in a two-dimensional image for performing various downstream operations, such as, but not limited to, reposing the human, generating shadows, and/or determining interactions with other objects in the two-dimensional image. To illustrate, the scene-based image editing system 106 utilizes a plurality of neural networks to extract two-dimensional features and three-dimensional features of a human detected in a two-dimensional image to reconstruct a three-dimensional human model based on the human.

In one or more embodiments, the two-dimensional image 6000 includes a two-dimensional human 6002. For example, the two-dimensional image 6000 includes a photograph or other image from which the scene-based image editing system 106 extracts information associated with one or more humans. To illustrate, the scene-based image editing system 106 utilizes a two-dimensional pose neural network 6004 to extract two-dimensional pose data associated with the two-dimensional human. In particular, the two-dimensional pose neural network 6004 includes a two-dimensional body tracker that detects/tracks humans in images and generates two-dimensional pose data 6006 for the two-dimensional human 6002. More specifically, the two-dimensional pose data 6006 includes a pose of the two-dimensional human 6002 within a two-dimensional space (e.g., relative to an x-axis and a y-axis) corresponding to the two-dimensional image 6000.

According to one or more embodiments, the scene-based image editing system 106 utilizes a neural network as described by Zhe Cao, Gines Hidalgo, Tomas Simon, Shih-En Wei, and Yaser Sheikh in "OpenPose: Realtime Multi-Person 2D Pose Estimation using Part Affinity Fields," CVPS (2019), which is herein incorporated by reference in its entirety. For example, the two-dimensional pose neural network 6004 utilizes non-parametric representations ("part affinity fields") for associating specific body parts with detected individuals in a digital image. In additional embodiments, the scene-based image editing system 106 utilizes one or more additional neural networks that use human detection with body part/joint detection and/or segmentation to generate the two-dimensional pose data 6006. For instance, the scene-based image editing system 106 utilizes a convolutional neural network-based model to detect articulated two-dimensional poses via grid-wise image feature maps.

In one or more additional embodiments, the scene-based image editing system 106 utilizes a three-dimensional pose/shape neural network 6008 to extract three-dimensional characteristics of the two-dimensional human 6002 in the two-dimensional image 6000. Specifically, the scene-based image editing system 106 utilizes the three-dimensional pose/shape neural network 6008 to generate three-dimensional pose data 6010 and three-dimensional shape data 6012 based on the two-dimensional human 6002. As mentioned, the scene-based image editing system 106 determines a three-dimensional pose of the two-dimensional human 6002 in a three-dimensional space while retaining a three-dimensional shape of the two-dimensional human 6002 in the three-dimensional space. For instance, the scene-based image editing system 106 generates the three-dimensional space including a three-dimensional representation of a scene of the two-dimensional image 6000 and generates the three-dimensional pose data 6010 and the three-dimensional shape data 6012 of the detected human relative to one or more other objects (e.g., a background) of the scene.

The scene-based image editing system 106 can utilize a variety of machine learning architectures to reconstruct a three-dimensional human pose. According to one or more embodiments, the scene-based image editing system 106 utilizes a neural network as described by Kevin Lin, Lijuan Wang, and Zicheng Liu in "End-to-End Human Pose and Mesh Reconstruction with Transformers," CVPR (2021) (hereinafter "Lin"), which is herein incorporated by reference in its entirety. Specifically, the scene-based image editing system 106 utilizes a neural network to reconstruct a three-dimensional human pose and mesh vertices (e.g., a shape) from a single monocular image. For example, the three-dimensional pose/shape neural network 6008 includes a transformer-based encoder to jointly model vertex—vertex and vertex—joint interactions for jointly generating three-dimensional joint coordinates and mesh vertices. In alternative embodiments, the scene-based image editing system 106 utilizes separate neural networks to generate the three-dimensional pose data 6010 and the three-dimensional shape data 6012 from the two-dimensional image 6000 separately.

In one or more embodiments, as illustrated in FIG. 60, the scene-based image editing system 106 utilizes the two-dimensional and three-dimensional data to generate a three-dimensional representation of the two-dimensional human 6002. In particular, the scene-based image editing system 106 generates a three-dimensional human model 6014 by combining the two-dimensional pose data 6006 with the three-dimensional pose data 6010 and the three-dimensional shape data 6012. For instance, the scene-based image editing system 106 utilizes the two-dimensional pose data 6006 to refine the three-dimensional pose data 6010. Additionally, the scene-based image editing system 106 utilizes the three-dimensional shape data 6012 in connection with the refined three-dimensional pose data to generate the three-dimensional human model 6014 with the pose of the two-dimensional human 6002 in the two-dimensional image 6000 while retaining the shape of the two-dimensional human 6002.

As mentioned, the scene-based image editing system 106 generates a three-dimensional representation of a two-dimensional human in a two-dimensional image by extracting pose and shape data from the two-dimensional image. For instance, as illustrated in FIGS. 61A-61D the scene-based image editing system 106 generates and combines two-dimensional data and three-dimensional data representing a two-dimensional human in a two-dimensional image. Specifically, the scene-based image editing system 106 utilizes a plurality of separate neural networks to extract two-dimensional and three-dimensional characteristics of the human in the two-dimensional image. The scene-based image editing system 106 also utilizes one or more optimization/refinement models to refine the three-dimensional data for a three-dimensional representation of the human.

Figure 61A:
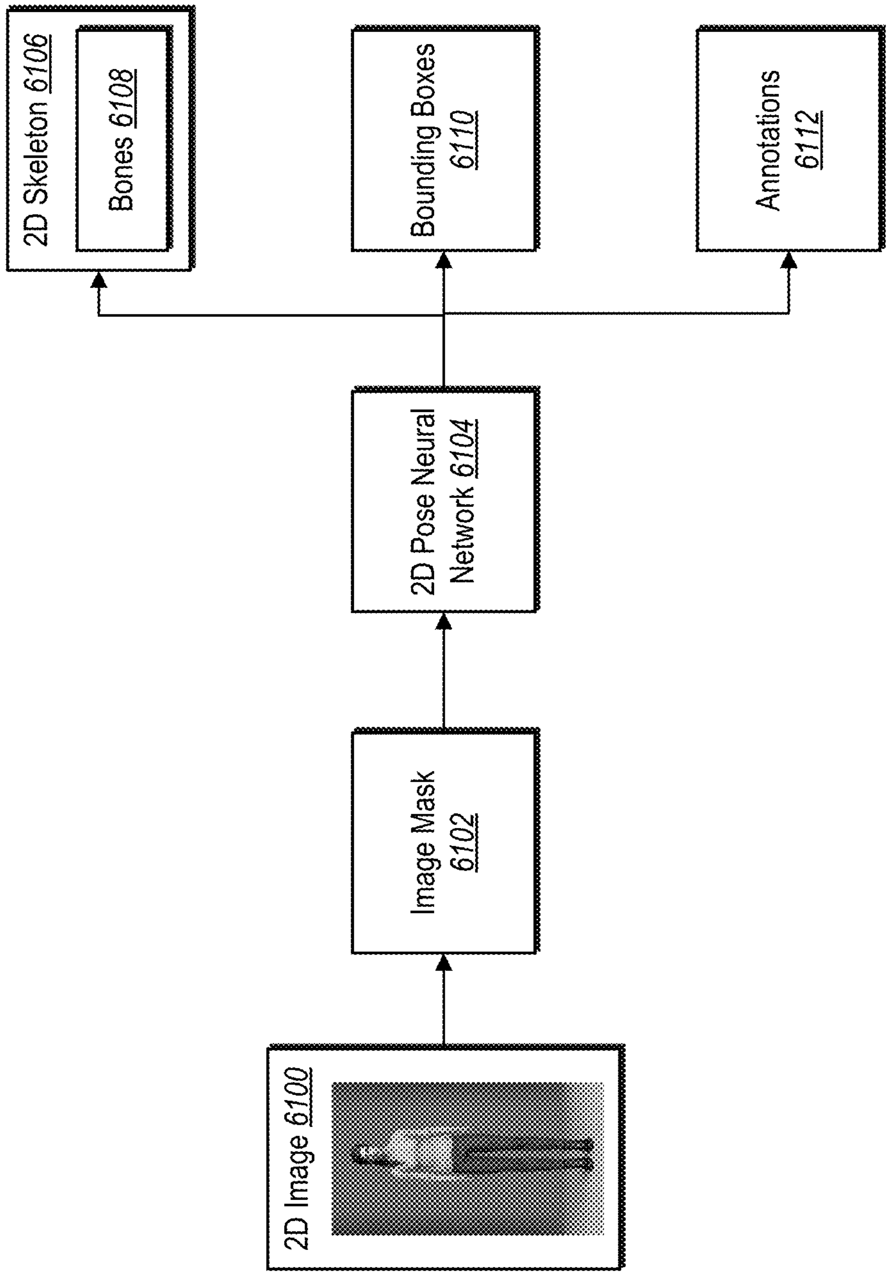
FIGS. 61A-61D illustrate diagrams of the scene-based image editing system generating and refining a three-dimensional human model based on a two-dimensional human extracted from a two-dimensional image in accordance with one or more embodiments.

For example, as illustrated in FIG. 61A, the scene-based image editing system 106 generates two-dimensional pose data based on a two-dimensional human in a two-dimensional image 6100. In one or more embodiments, the scene-based image editing system 106 generates an image mask 6102 based on the two-dimensional image 6100. In particular, the scene-based image editing system 106 determines a portion of the two-dimensional image 6100 that includes a human and generates the image mask 6102 based on the identified portion of the two-dimensional image 6100. In additional embodiments, the scene-based image editing system 106 crops the two-dimensional image 6100 in response to detecting the human in the two-dimensional image 6100. For example, the scene-based image editing system 106 utilizes a cropping neural network that automatically detects and crops the two-dimensional image 6100 to the portion of the two-dimensional image 6100 that includes the human.

In one or more embodiments, the scene-based image editing system 106 utilizes the image mask 6102 to extract pose information from the two-dimensional image 6100. For instance, the scene-based image editing system 106 provides the two-dimensional image 6100 with the image mask 6102 to a two-dimensional pose neural network 6104. Alternatively, the scene-based image editing system 106 provides a cropped image based on the two-dimensional image 6100 and the image mask 6102 to the two-dimensional pose neural network 6104. In additional examples, the scene-based image editing system 106 provides the two-dimensional image 6100 (e.g., uncropped and without an image mask) to the two-dimensional pose neural network 6104. For example, the scene-based image editing system 106 provides the two-dimensional image 6100 to the two-dimensional pose neural network 6104, which generates a cropped image corresponding to the two-dimensional human in the two-dimensional image 6100.

As mentioned, in one or more embodiments, the two-dimensional pose neural network 6104 includes a two-dimensional body tracker that detects and identifies humans in two-dimensional images. Specifically, the scene-based image editing system 106 utilizes the two-dimensional pose neural network 6104 to detect the human in the two-dimensional image 6100 (e.g., within a portion corresponding to the image mask 6102). Additionally, the scene-based image editing system 106 utilizes the two-dimensional pose neural network 6104 to generate two-dimensional pose data corresponding to a pose of the human in the two-dimensional image 6100.

As illustrated in FIG. 61A, for example, the scene-based image editing system 106 utilizes the two-dimensional pose neural network 6104 to generate a two-dimensional skeleton 6106 for the human in the two-dimensional image 6100. In particular, the scene-based image editing system 106 generates the two-dimensional skeleton 6106 by determining bones 6108 (connected via various joints) representing a physical structure of the human in the two-dimensional image 6100. To illustrate, the scene-based image editing system 106 determines lengths, positions, and rotations of the bones 6108 corresponding to specific body parts (limbs, torsos, etc.) in relation to the two-dimensional space of the two-dimensional image 6100. Thus, the scene-based image editing system 106 generates the two-dimensional skeleton 6106 in terms of pixel coordinates according to the human in the two-dimensional image 6100.

In additional embodiments, the scene-based image editing system 106 utilizes the two-dimensional pose neural network 6104 to generate bounding boxes 6110 corresponding to portions of the two-dimensional image 6100. Specifically, the scene-based image editing system 106 generates the bounding boxes 6110 to indicate one or more body parts of the human in the two-dimensional image 6100. For example, the scene-based image editing system 106 labels body parts that correspond to one or more of the bones 6108 in the two-dimensional skeleton 6106 and/or for one or more groups of bones. To illustrate, the scene-based image editing system 106 generates a bounding box in connection with the full body of the human. In some embodiments, the scene-based image editing system 106 also generates separate bounding boxes corresponding to the hands (e.g., a first bounding box for a first hand and a second bounding box for a second hand).

In one or more embodiments, the scene-based image editing system 106 generates annotations 6112 based on the human in the two-dimensional image 6100. In particular, the scene-based image editing system 106 utilizes the two-dimensional pose neural network 6104 to determine one or more categories for the human based on visual characteristics of the human in connection with the other pose data (e.g., the two-dimensional skeleton 6106). For instance, the scene-based image editing system 106 generates an annotation indicating whether the full body of the human is visible in the two-dimensional image 6100, whether the detected pose is a standing pose (neutral or non-neutral) or a non-standing pose and/or an orientation of the pose (e.g., front, side, back). In some embodiments, the scene-based image editing system 106 generates additional annotations indicating other characteristics, such as whether the human is holding an object, what type of clothes the human is wearing, and other details that can affect a shape or pose of the human.

Figure 61B:
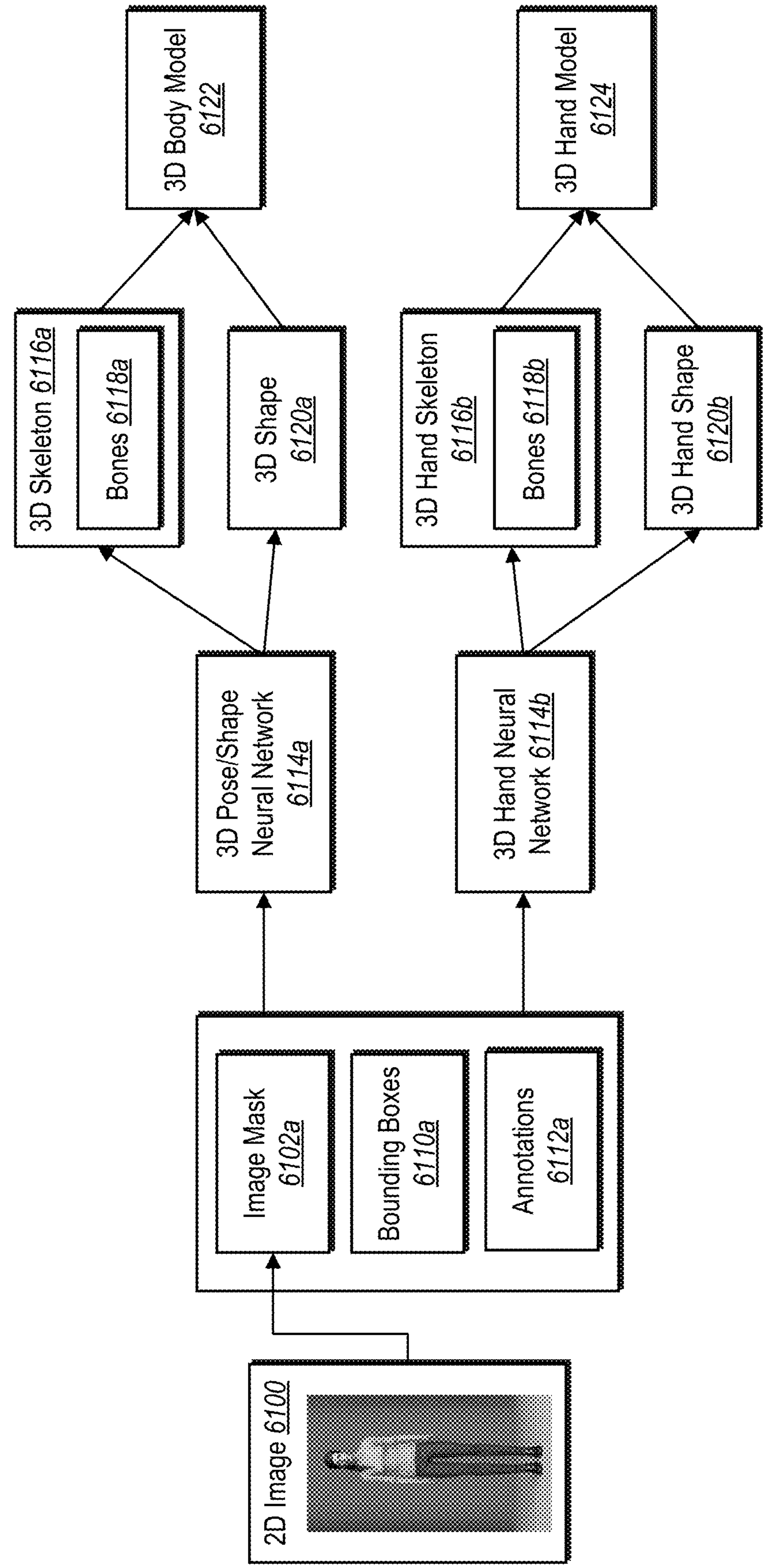

In connection with generating the two-dimensional pose data for the human in the two-dimensional image 6100, the scene-based image editing system 106 also generates three-dimensional pose and shape data for the human. In at least some embodiments, the scene-based image editing system 106 utilizes one or more neural networks to extract three-dimensional characteristics of the human from the two-dimensional image 6100. For example, FIG. 61B illustrates that the scene-based image editing system 106 utilizes a plurality of neural networks to extract three-dimensional pose/shape data for specific portions of a human. To illustrate, the scene-based image editing system 106 generates separate three-dimensional pose/shape data for a full body portion and for one or more hand portions of the two-dimensional image 6100.

As illustrated in FIG. 61B, the scene-based image editing system 106 determines data corresponding to the two-dimensional image 6100 based on two-dimensional pose data extracted from the two-dimensional image 6100. For instance, the scene-based image editing system 106 determines an image mask 6102*a* associated with the two-dimensional image 6100. Additionally, in one or more embodiments, the scene-based image editing system 106 determines bounding boxes 6110*a* and annotations 6112*a* generated by a two-dimensional pose neural network 6104 based on the image mask 6102*a* and the two-dimensional image 6100. Accordingly, the scene-based image editing system 106 provides data extracted from the two-dimensional image 6100 to a plurality of neural networks. In alternative embodiments, the scene-based image editing system 106 provides the two-dimensional image 6100 to the neural networks.

In one or more embodiments, the scene-based image editing system 106 provides the data extracted from the two-dimensional image 6100 to one or more neural networks to generate three-dimensional pose data and three-dimensional shape data. Specifically, the scene-based image editing system 106 utilizes a first neural network (e.g., a three-dimensional pose/shape neural network 6114*a*) to generate three-dimensional pose data and three-dimensional shape data for a first portion of the human in the two-dimensional image 6100. For example, the scene-based image editing system 106 provides a body bounding box corresponding to a body of the two-dimensional human in the two-dimensional image 6100 to the three-dimensional pose/shape neural network 6114*a*. The scene-based image editing system 106 also provides one or more annotations associated with the body of the two-dimensional human to the three-dimensional pose/shape neural network 6114*a*.

In additional embodiments, the scene-based image editing system 106 provides data extracted from the two-dimensional image 6100 to a second neural network (e.g., a three-dimensional hand neural network 6114*b*) to generate three-dimensional pose data and three-dimensional for a second portion of the human in the two-dimensional image 6100. For instance, the scene-based image editing system 106 provides one or more hand bounding boxes corresponding to one or more hands of the two-dimensional human in the two-dimensional image 6100 to the three-dimensional hand neural network 6114*b*. In some embodiments, the scene-based image editing system 106 provides one or more annotations associated with the hand(s) of the two-dimensional human to the three-dimensional hand neural network 6114*b*.

According to one or more embodiments, the scene-based image editing system 106 utilizes the neural networks to generate three-dimensional pose data and three-dimensional shape data for separate portions of the two-dimensional human in the two-dimensional image 6100. In particular, the scene-based image editing system 106 generates body and hand pose/shape data utilizing the separate neural networks. For example, the scene-based image editing system 106 utilizes the three-dimensional pose/shape neural network 6114*a* to generate three-dimensional pose data and three-dimensional shape data for the body portion of the human in the two-dimensional image 6100. Additionally, the scene-based image editing system 106 utilizes the three-dimensional hand neural network 6114*b* to generate three-dimensional pose data and three-dimensional shape data for the hand portion(s) of the two-dimensional image 6100.

For instance, the scene-based image editing system 106 utilizes the three-dimensional pose/shape neural network 6114*a* to generate a three-dimensional skeleton 6116*a* corresponding to the human in the two-dimensional image 6100. To illustrate, the scene-based image editing system 106 generates bones 6118*a* corresponding to the body of the human in the two-dimensional image 6100 within a three-dimensional space. More specifically, the scene-based image editing system 106 determines lengths, rotations, directions, and relative positioning of the bones 6118*a* in the three-dimensional space. Furthermore, the scene-based image editing system 106 determines joints connecting the bones in the three-dimensional space, including determining one or more angles of possible rotation corresponding to the bones 6118*a* and their respective joints.

In one or more embodiments, the scene-based image editing system 106 also utilizes the three-dimensional pose/shape neural network 6114*a* to generate a three-dimensional shape 6120*a* for the body portion of the human in the two-dimensional image 6100. In particular, the scene-based image editing system 106 generates the three-dimensional shape 6120*a* by generating a mesh of a plurality of vertices within the three-dimensional space based on a detected shape of the human in the two-dimensional image 6100. For example, the scene-based image editing system 106 generates the vertices, each with a corresponding three-dimensional coordinate, connected by a plurality of edges according to the detected shape of the human.

In connection with generating the three-dimensional skeleton 6116*a* and the three-dimensional shape 6120*a*, the scene-based image editing system 106 generates a three-dimensional body model 6122 corresponding to the body portion of the human in the two-dimensional image 6100. Specifically, the scene-based image editing system 106 combines the three-dimensional skeleton 6116*a* with the three-dimensional shape 6120*a* to generate the three-dimensional body model 6122. For instance, the scene-based image editing system 106 generates the three-dimensional body model 6122 with a default pose (e.g., a rigged mesh with a t-pose) based on the three-dimensional shape 6120*a*. The scene-based image editing system 106 modifies the three-dimensional body model 6122 according to the three-dimensional skeleton 6116*a*, such as by adjusting the pose of the three-dimensional shape 6120*a* to fit portions of the three-dimensional body model 6122 to the bones 6118*a*.

According to one or more embodiments, the scene-based image editing system 106 utilizes the three-dimensional hand neural network 6114*b* to generate a three-dimensional hand skeleton 6116*b* corresponding to a hand portion of the human in the two-dimensional image 6100. In particular, the scene-based image editing system 106 generates bones 6118*b* corresponding to the hand portion of the human in the two-dimensional image 6100 within a three-dimensional space. For example, the scene-based image editing system 106 determines lengths, rotations, directions, and relative positioning of the bones 6118*b* in the three-dimensional space. To illustrate, the scene-based image editing system 106 determines joints connecting bones of the hand in the three-dimensional space, including determining one or more angles of possible rotation corresponding to the bones 6118*b* and their respective joints.

According to one or more embodiments, the scene-based image editing system 106 also utilizes the three-dimensional hand neural network 6114*b* to generate a three-dimensional hand shape 6120*b* for the hand portion of the human in the two-dimensional image 6100. In particular, the scene-based image editing system 106 generates the three-dimensional hand shape 6120*b* by generating a mesh of a plurality of vertices within the three-dimensional space based on a detected shape of the hand human in the two-dimensional image 6100. For example, the scene-based image editing system 106 generates the vertices, each with a corresponding three-dimensional coordinate, connected by a plurality of edges according to the detected shape of the hand.

Furthermore, the scene-based image editing system 106 generates a three-dimensional hand model 6124 corresponding to the hand portion of the human in the two-dimensional image 6100. In particular, the scene-based image editing system 106 combines the three-dimensional hand skeleton 6116*b* with the three-dimensional hand shape 6120*b* to generate a three-dimensional hand model 6124. In one or more embodiments, the scene-based image editing system 106 generates the three-dimensional hand model 6124 with a default pose (e.g., with a particular orientation of the hand in the three-dimensional space and/or a specific spread of fingers) based on the three-dimensional hand shape 6120*b*. Additionally, the scene-based image editing system 106 modifies the three-dimensional hand model 6124 according to the three-dimensional hand skeleton 6116*b*, such as by adjusting the pose of the three-dimensional hand shape 6120*b* to fit portions of the three-dimensional hand model 6124 to the bones 6118*b*.

In one or more embodiments, the scene-based image editing system 106 generates a plurality of three-dimensional hand models corresponding to each of the hands of the human in the two-dimensional image 6100. Specifically, the scene-based image editing system 106 utilizes the three-dimensional hand neural network 6114*b* to generate separate three-dimensional hand models for each of the hands in the two-dimensional image 6100. For example, the scene-based image editing system 106 utilizes a plurality of hand bounding boxes extracted from the two-dimensional image 6100 to generate a plurality of three-dimensional hand models.

According to one or more embodiments, the scene-based image editing system 106 utilizes the same neural network architecture for the three-dimensional pose/shape neural network 6114*a* and the three-dimensional hand neural network 6114*b*. For example, as previously mentioned, the scene-based image editing system 106 utilizes different instances of a neural network as described in Lin to generate one or more three-dimensional representations of one or more portions of a human in a two-dimensional image 6100. The scene-based image editing system 106 generates separate instances for extracting body-specific or hand-specific three-dimensional pose/shape data from two-dimensional images. To illustrate, the scene-based image editing system 106 trains the three-dimensional pose/shape neural network 6114*a* to extract three-dimensional pose/shape data from bodies of two-dimensional images based on a training dataset including bodies and corresponding three-dimensional body models. Additionally, the scene-based image editing system 106 trains the three-dimensional hand neural network 6114*b* to extract three-dimensional pose/shape data from hands of two-dimensional images based on a training dataset including hands and corresponding three-dimensional hand models. In alternative embodiments, the scene-based image editing system 106 utilizes different architectures for the three-dimensional pose/shape neural network 6114*a* and the three-dimensional hand neural network 6114*b*.

Figure 61C:
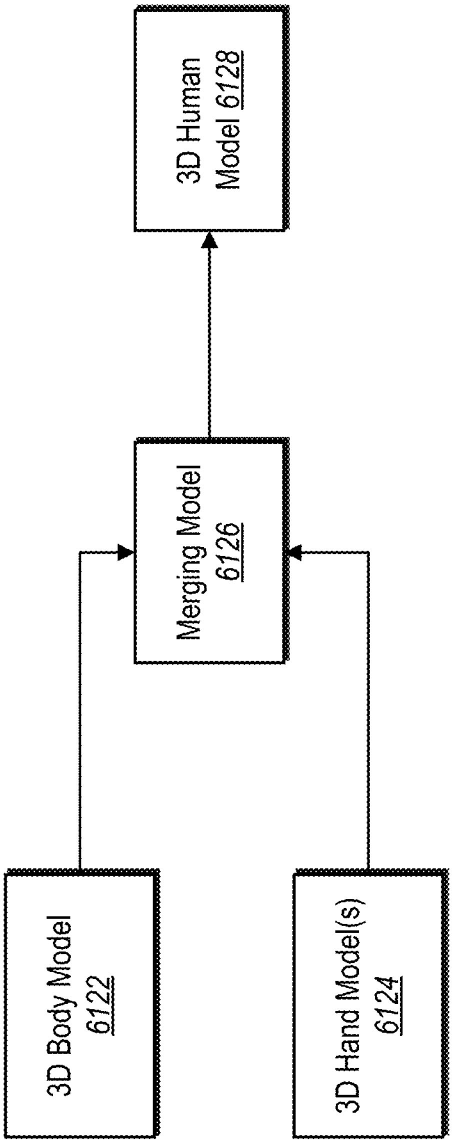

In response to generating two-dimensional pose data and three-dimensional pose data, the scene-based image editing system 106, the scene-based image editing system 106 performs one or more optimization operations to generate a final three-dimensional representation of a human in a two-dimensional image. For example, FIG. 61C illustrates that the scene-based image editing system 106 performs a first optimization operation in connection with generating a three-dimensional human model. More specifically, the scene-based image editing system 106 utilizes the first optimization operation to combine three-dimensional data corresponding to a body of a human in a two-dimensional image with three-dimensional data corresponding to one or more hands of the human in the two-dimensional image.

As illustrated in FIG. 61C, the scene-based image editing system 106 utilizes a merging model 6126 to merge the three-dimensional body model 6122 with the three-dimensional hand model 6124 (e.g., as generated in FIG. 61B). For example, the scene-based image editing system 106 utilizes the merging model 6126 to generate a three-dimensional human model 6128 by joining the three-dimensional hand model 6124 with the three-dimensional body model 6122 within three-dimensional space according to a camera space. Specifically, given a cropped hand region corresponding to the three-dimensional hand model 6124, the scene-based image editing system 106 utilizes the merging model 6126 to generate a predicted three-dimensional hand joint position in the camera space and a predicted two-dimensional joint position in the image space (e.g., the two-dimensional space corresponding to the two-dimensional image).

Furthermore, the scene-based image editing system 106 utilizes the merging model to assign the predicted three-dimensional hand joint position to a wrist of the full body three-dimensional joint in the three-dimensional hand model 6124. In particular, the scene-based image editing system 106 utilizes the merging model to subtract the wrist's three-dimensional position from the hand prediction (e.g., in the three-dimensional hand model 6124) and add the wrist's three-dimensional position from the full body prediction (e.g., from the three-dimensional body model 6122). Additionally, in one or more embodiments, the scene-based image editing system 106 maps image coordinates of a cropped image (e.g., based on the image mask 6102*a* of FIG. 61B) to the full image coordinates. The scene-based image editing system 106 utilizes the merging model 6126 to replace the two-dimensional hand joint positions of the full body prediction with the predicted two-dimensional hand joint positions according to the mapped coordinates. The scene-based image editing system 106 also optimizes three-dimensional joints using the updated two-dimensional joints to join the three-dimensional body model 6122 and the three-dimensional hand model 6124.

Figure 61D:
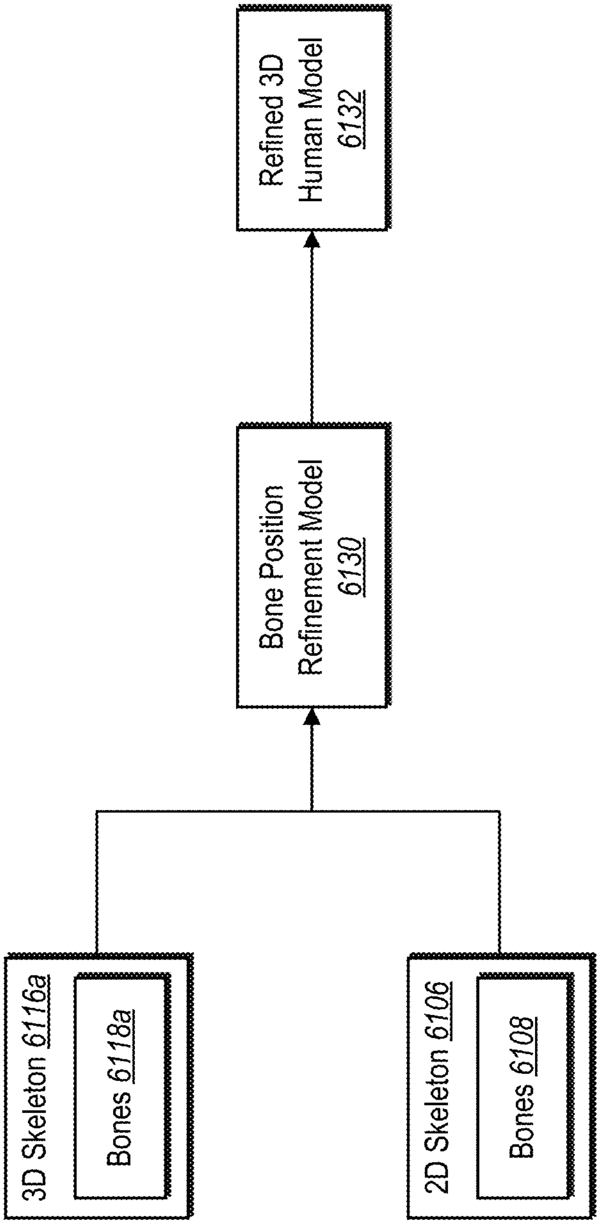

According to one or more embodiments, the scene-based image editing system 106 also performs a second optimization operation to generate a final representation of a human in a two-dimensional image. For example, FIG. 61D illustrates that the scene-based image editing system 106 performs an optimization operation to refine three-dimensional pose data generated for a human in a two-dimensional image according to two-dimensional pose data generated for the human. Specifically, the scene-based image editing system 106 utilizes information about a camera view associated with the two-dimensional image to modify the three-dimensional pose data based on the two-dimensional pose data.

As illustrated in FIG. 61D, the scene-based image editing system 106 refines the three-dimensional skeleton 6116*a* (e.g., including the bones 6118*a*) based on the two-dimensional skeleton 6106 (e.g., including the bones 6108), as described in relation to FIG. 61A. In one or more embodiments, the scene-based image editing system 106 utilizes a bone position refinement model 6130 to refine the positions, orientations, and joints corresponding to the bones 6118*a* in the three-dimensional skeleton 6116*a* based on the positions, orientations, and joints corresponding to the bones 6108 in the two-dimensional skeleton 6106.

In one or more embodiments, the scene-based image editing system 106 utilizes the bone position refinement model 6130 to modify positions and orientations of the bones 6118*a* in the three-dimensional skeleton 6116*a* to reduce differences relative to the bones 6108 in the two-dimensional skeleton 6106. For example, the scene-based image editing system 106 provides the bones 6118*a* in the three-dimensional skeleton 6116*a* to the bone position refinement model 6130 with the bones 6108 of the two-dimensional skeleton 6106 as a guide reference. The scene-based image editing system 106 utilizes the bone position refinement model 6130 to iteratively adjust the three-dimensional skeleton 6116*a* to reduce differences between the three-dimensional skeleton 6116*a* and the two-dimensional skeleton 6106. In one or more embodiments, the scene-based image editing system 106 jointly modifies positions and orientations of the bones 6118*a* of the three-dimensional skeleton 6116*a* to maintain the structure/shape of the three-dimensional skeleton 6116*a* in accordance with the shape of the three-dimensional human model.

Figure 62:
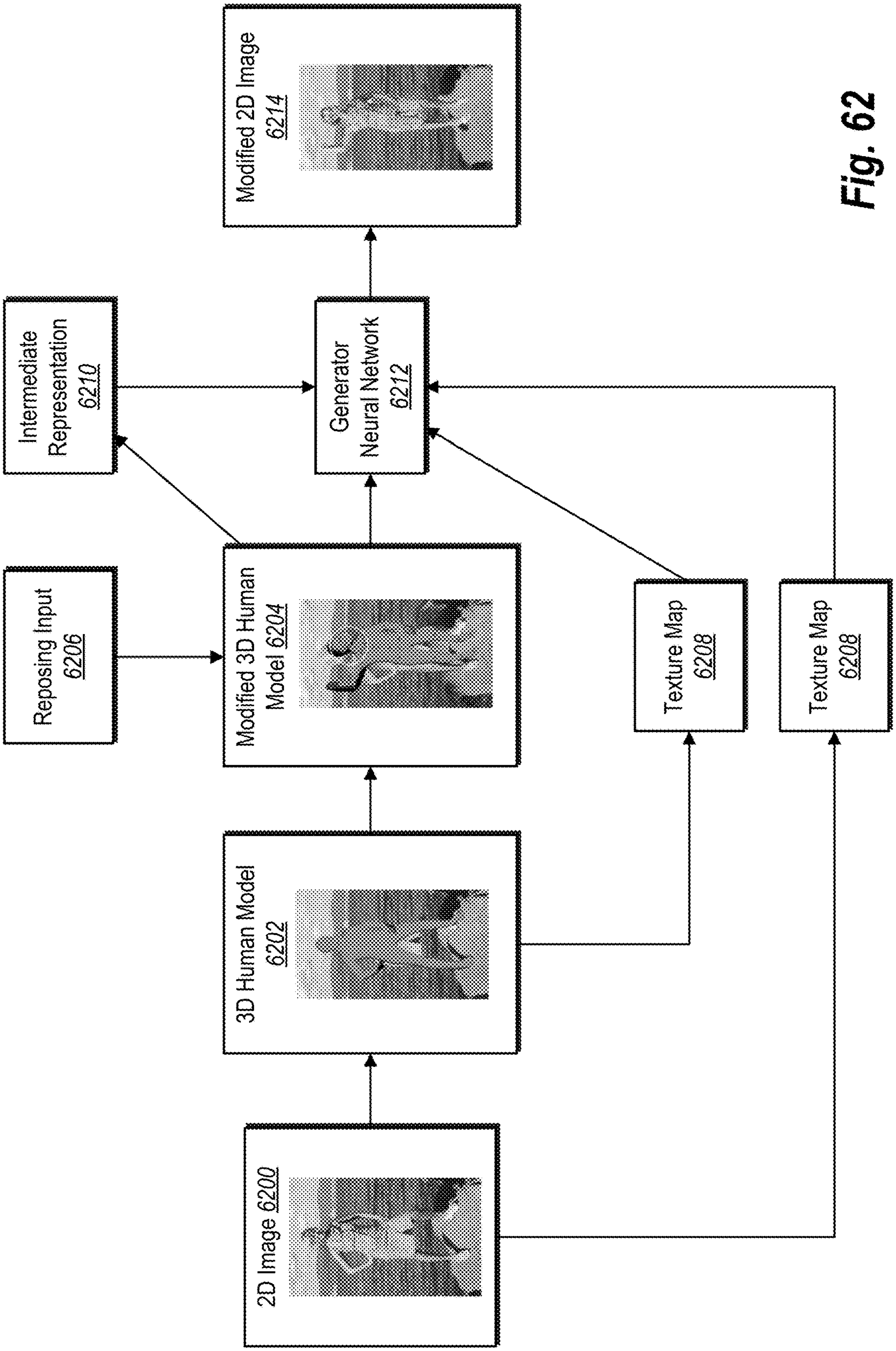
FIG. 62 illustrates a diagram of the scene-based image editing system generating a modified two-dimensional image in response to reposing a two-dimensional human via a three-dimensional representation in accordance with one or more embodiments.

In one or more embodiments, the scene-based image editing system 106 generates a three-dimensional representation of a two-dimensional human in a two-dimensional image for use in performing various downstream operations. For example, the scene-based image editing system 106 generates the three-dimensional representation for use in reposing the two-dimensional human in the two-dimensional image. FIG. 62 illustrates a diagram of the scene-based image editing system 106 modifying a two-dimensional image 6200 including a two-dimensional human.

More specifically, the scene-based image editing system 106 modifies the two-dimensional image 6200 by modifying a pose of the two-dimensional human via a three-dimensional representation of the two-dimensional human.

According to one or more embodiments, the scene-based image editing system 106 generates a three-dimensional human model 6202 representing the two-dimensional human in the two-dimensional image 6200. In particular, the scene-based image editing system 106 utilizes one or more neural networks to generate the three-dimensional human model 6202, as described above. For example, the scene-based image editing system 106 extracts pose and shape data associated with the two-dimensional human in a two-dimensional space and a three-dimensional space for generating the three-dimensional human model 6202 within the three-dimensional space.

In at least some embodiments, the scene-based image editing system 106 provides the three-dimensional human model 6202 for display at a client device for modifying the pose of the three-dimensional human model 6202. For example, the scene-based image editing system 106 determines, based on a reposing input 6206, a modified pose of the three-dimensional human model 6202. To illustrate, the reposing input 6206 includes an input directly modifying the pose of the three-dimensional human model 6202 via one or more graphical user interface elements. The scene-based image editing system 106 generates the modified three-dimensional human model 6204 according to the modified pose.

In some embodiments, in connection with modifying the two-dimensional image 6200 based on the modified three-dimensional human model 6204, the scene-based image editing system 106 also extracts a texture map 6208 corresponding to the three-dimensional human model 6202. Specifically, the scene-based image editing system 106 extracts the texture map 6208 from pixel values of the two-dimensional image 6200 in connection with the three-dimensional human model 6202. For instance, the scene-based image editing system 106 utilizes a neural network to generate the texture map 6208 including a UV mapping from the image space to the three-dimensional human model 6202. Accordingly, the texture map 6208 includes pixel values mapped to specific points (e.g., vertices or faces) of the three-dimensional human model 6202 based on the pixel values and corresponding locations in the two-dimensional image 6200.

Furthermore, in one or more embodiments, the scene-based image editing system 106 determines an intermediate representation of the modified three-dimensional human model 6204. Specifically, the scene-based image editing system 106 generates a dense representation of the modified three-dimensional human model 6204 by assigning a specific value to each point in the modified three-dimensional human model 6204 (e.g., a unique value for each point on the body in a two-dimensional array). In some embodiments, the values in the dense representation include color values, such that each point of the modified three-dimensional human model 6204 has a different assigned color value. Accordingly, different poses result in different dense representations.

In one or more embodiments, the scene-based image editing system 106 utilizes a generator neural network 6212 to generate a modified two-dimensional image 6214 according to the modified three-dimensional human model 6204. For instance, the scene-based image editing system 106 provides the texture map 6208 and the intermediate representation 6210 to the generator neural network 6212 to generate the modified two-dimensional image 6214. In some embodiments, the scene-based image editing system 106 also provides the two-dimensional image 6200 (or an additional intermediate representation of the pose of the two-dimensional human in the two-dimensional image 6200) to the generator neural network 6212.

The scene-based image editing system 106 utilizes the generator neural network 6212 to generate the modified two-dimensional image 6214 to include the two-dimensional human reposed according to the target pose indicated by the intermediate representation 6210 and the texture map 6208. To illustrate, the generator neural network 6212 predicts the pose and position of the two-dimensional human in the modified two-dimensional image 6214. Additionally, in one or more embodiments, the generator neural network 6212 generates one or more textures of one or more portions of the two-dimensional human and/or background in the modified two-dimensional image 6214 based on context information provided by the two-dimensional image 6200 and/or the texture map 6208.

In one or more embodiments, the scene-based image editing system 106 utilizes a generator neural network as described in U.S. patent application Ser. No. 18/190,636, filed Mar. 27, 2023, titled "SYNTHESIZING A MODIFIED DIGITAL IMAGE UTILIZING A REPOSING MODEL," which is herein incorporated by reference in its entirety. Specifically, the scene-based image editing system 106 utilizes the generator neural network 6212 to generate the modified two-dimensional image 6214 via features extracted from the two-dimensional image 6200. For example, the scene-based image editing system 106 utilizes the generator neural network 6212 to modify the pose of the two-dimensional human according to local features associated with the two-dimensional human while maintaining global features identified in the two-dimensional image 6200. The scene-based image editing system 106 thus provides modified visual features of the two-dimensional human according to the target pose within the scene of the two-dimensional image 6200.

In one or more embodiments, the scene-based image editing system 106 provides tools within a graphical user interface for modifying a pose of a human in a two-dimensional image via a three-dimensional representation. Additionally, the scene-based image editing system 106 provides tools within the graphical user interface for generating a modified two-dimensional image based on a modified pose of the human. FIGS. 63A-63G illustrate graphical user interfaces of a client device for modifying a two-dimensional image via pose modifications to a three-dimensional representation of a two-dimensional human in the two-dimensional image.

Figure 63A:
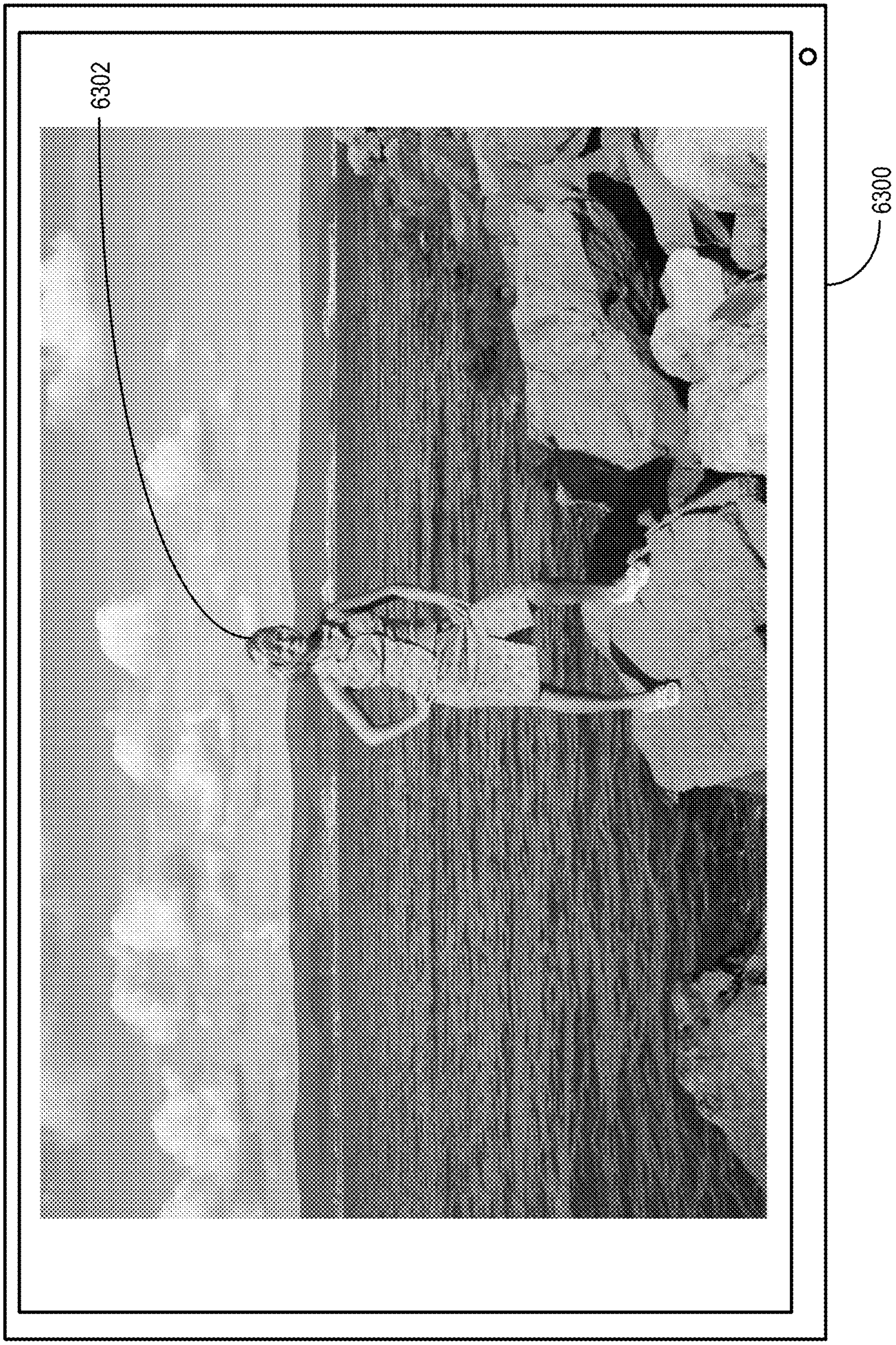
FIGS. 63A-63G illustrate graphical user interfaces for modifying a two-dimensional image via a three-dimensional human model representing a two-dimensional human in the two-dimensional image in accordance with one or more embodiments.

FIG. 63A illustrates a graphical user interface of a client application at a client device. For example, the client application includes a digital image editing application for performing a variety of image editing tasks. In one or more embodiments, the client device displays a two-dimensional image 6300 including a scene involving a two-dimensional human 6302. Specifically, as illustrated, the two-dimensional image 6300 includes the two-dimensional human 6302 against a background of various objects.

In one or more embodiments, the scene-based image editing system 106 utilizes one or more neural networks to detect and extract the two-dimensional human 6302 from the two-dimensional image 6300. For instance, the scene-based image editing system 106 extracts the two-dimensional human 6302 by generating an image mask for pixels including the two-dimensional human 6302. To illustrate, the scene-based image editing system 106 utilizes a neural network trained to detect humans in digital images. Additionally, in some embodiments, the scene-based image editing system 106 utilizes the image mask to generate a cropped image including the two-dimensional human 6302 (e.g., for storing in memory while performing one or more operations on the two-dimensional image 6300).

Figure 63B:
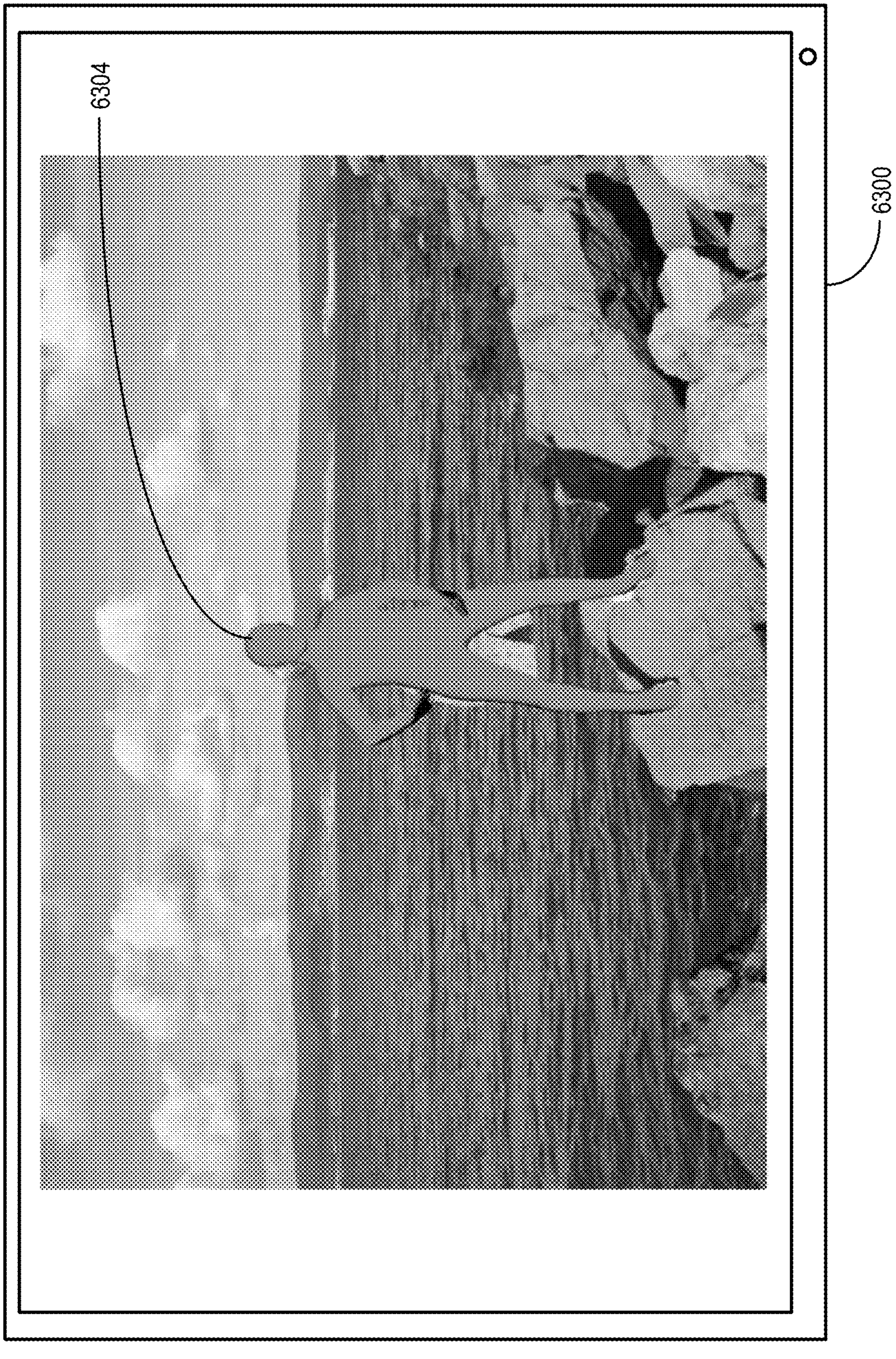

According to one or more embodiments, the scene-based image editing system 106 utilizes the cropped image to generate a three-dimensional representation of the two-dimensional human 6302. In particular, FIG. 63B illustrates that the scene-based image editing system 106 generates a three-dimensional human model 6304 representing the two-dimensional human 6302 in the two-dimensional image 6300. For example, the scene-based image editing system 106 generates the three-dimensional human model 6304 for display as an overlay on the two-dimensional image 6300 within the graphical user interface. To illustrate, the scene-based image editing system 106 generates the three-dimensional human model 6304 (e.g., utilizing a plurality of neural networks as described above) based on a detected pose of the two-dimensional human 6302 and displays the three-dimensional human model 6304 on top of the two-dimensional human 6302 within the graphical user interface.

In some embodiments, the client device displays the three-dimensional human model 6304 at a position within the graphical user interface corresponding to the two-dimensional human 6302 of the two-dimensional image 6300. Specifically, the scene-based image editing system 106 places the three-dimensional human model 6304 at a position based on a mapping of features from the two-dimensional human 6302 in the two-dimensional image 6300 to the three-dimensional human model 6304. For example, the scene-based image editing system 106 places the three-dimensional human model 6304 based on detected features of the two-dimensional human 6302 corresponding to portions of the three-dimensional human model 6304 (e.g., according to a texture map). In some embodiments, the scene-based image editing system 106 determines coordinates for placing the three-dimensional human model 6304 according to an image space of the two-dimensional image 6300.

In at least some embodiments, the scene-based image editing system 106 provides the three-dimensional human model 6304 for display within the graphical user interface without a texture. To illustrate, the client device displays the three-dimensional human model 6304 with a default texture (e.g., a solid color such as gray). Alternatively, the client device displays the three-dimensional human model 6304 with a texture based on the two-dimensional human 6302 in the FIG. 63A. For example, the scene-based image editing system 106 generates an estimated texture in response to modifications to the three-dimensional human model 6304 and displays the estimated texture on the three-dimensional human model 6304.

According to one or more embodiments, the scene-based image editing system 106 provides tools for modifying a pose of the two-dimensional human 6302 via a pose of the three-dimensional human model 6304. For example, the scene-based image editing system 106 provides one or more tools for modifying a pose of the three-dimensional human model 6304 in response to a selection of a pose modification tool. Alternatively, the scene-based image editing system 106 provides one or more tools for modifying a pose of the three-dimensional human model 6304 in response to a contextual determination of intent associated with the two-dimensional image 6300. To illustrate, the scene-based image editing system 106 provides a tool for modifying the pose of the three-dimensional human model 6304 in response to detecting the two-dimensional human 6302 in the two-dimensional image 6300. In some embodiments, the scene-based image editing system 106 provides the tool in response to a selection of the two-dimensional human 6302 in the two-dimensional image 6300 via the graphical user interface.

Figure 63C:
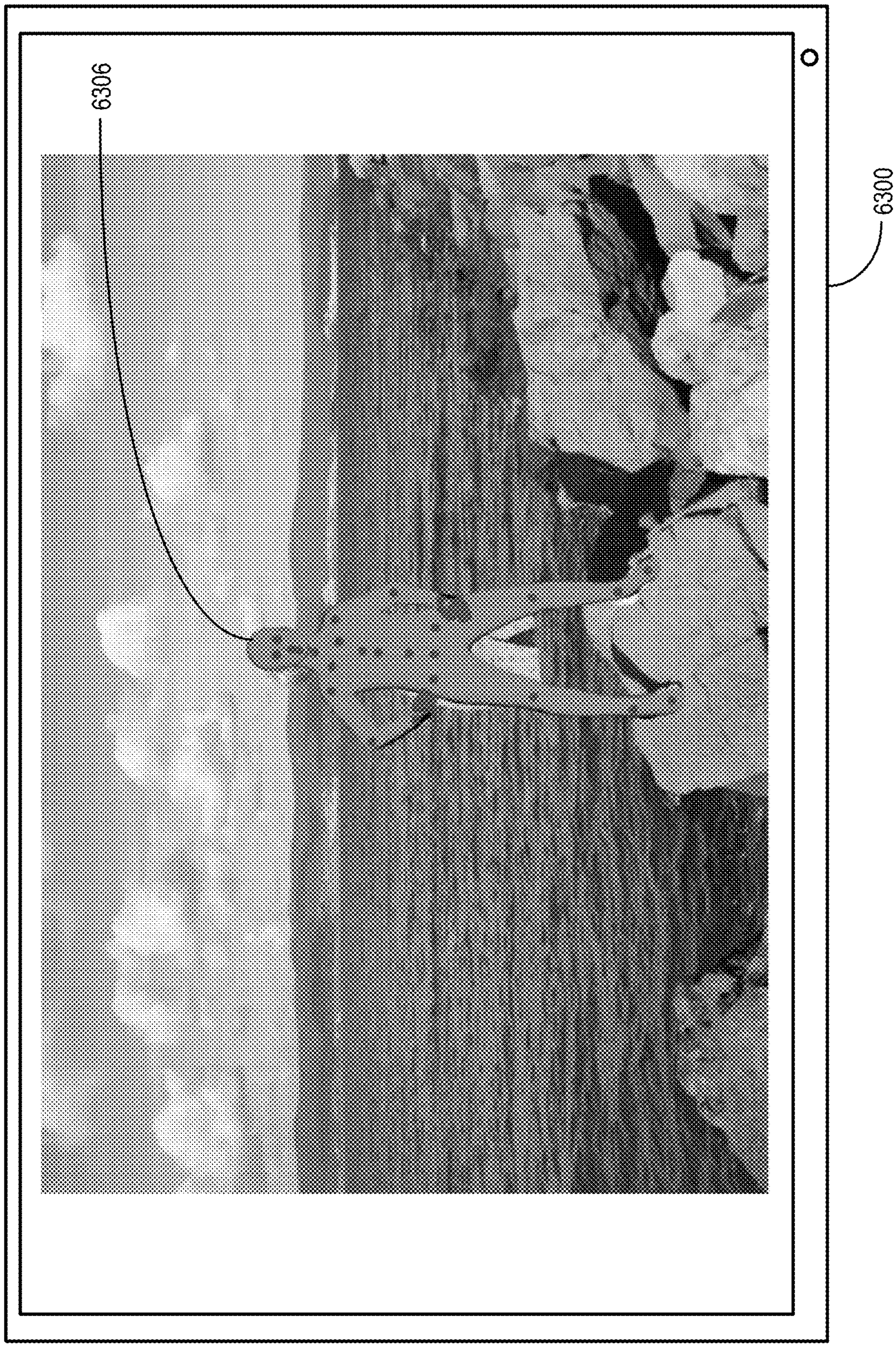

FIG. 63C illustrates that the client device displays one or more graphical elements indicating portions of a three-dimensional human model that are modifiable. In particular, as illustrated, the client device displays a three-dimensional human model 6306 including a plurality of points indicating modifiable joints in the three-dimensional human model 6306. For instance, the client device displays a selectable element for each interactive point (e.g., for each joint) in the three-dimensional human model 6306. In one or more embodiments, the scene-based image editing system 106 determines the points to display with the three-dimensional human model 6306 based on joints or other pose information in a three-dimensional skeleton corresponding to the three-dimensional human model 6306.

Figure 63D:
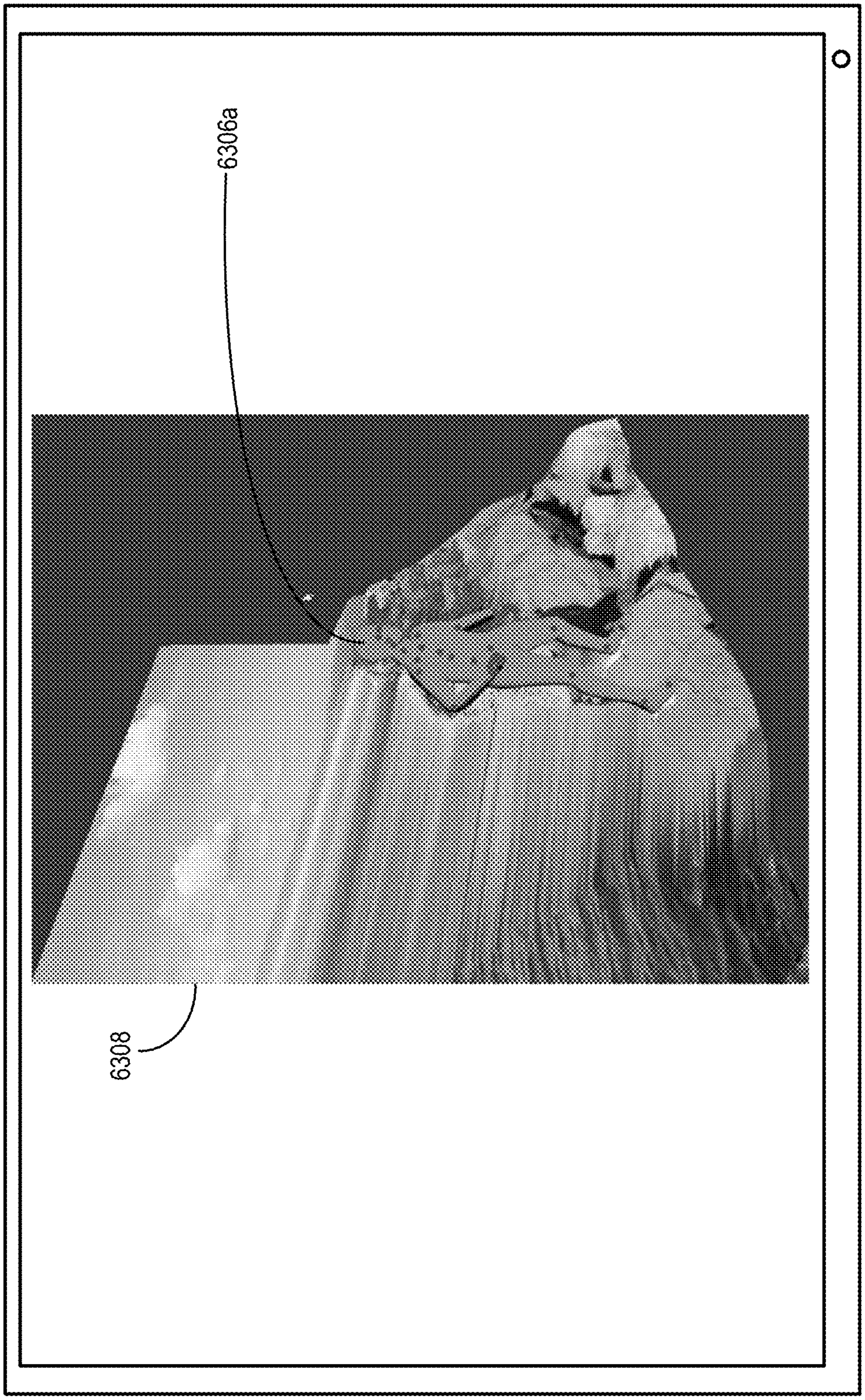

In one or more additional embodiments, the scene-based image editing system 106 also provides tools for viewing a projection of a two-dimensional image in a three-dimensional space. For example, FIG. 63D illustrates a three-dimensional representation 6308 of the two-dimensional image 6300 of FIG. 63A that the scene-based image editing system 106 generates within a three-dimensional space. Specifically, the scene-based image editing system 106 generates a three-dimensional mesh representing the content of the two-dimensional image 6300 (e.g., via one or more neural networks). To illustrate, the scene-based image editing system 106 generates the three-dimensional representation 6308 including depth displacement information based on one or more foreground objects and/or one or more background objects in the two-dimensional image 6300. Accordingly, the scene-based image editing system 106 generates the three-dimensional representation 6308 including a portion corresponding to the two-dimensional human 6302 illustrated in FIG. 63A.

According to one or more embodiments, the scene-based image editing system 106 generates a three-dimensional human model 6306*a* (e.g., as illustrated in FIG. 63D) corresponding to the two-dimensional human. Additionally, the scene-based image editing system 106 positions the three-dimensional human model 6306*a* within the three-dimensional space based on a position of the portion of the three-dimensional representation 6308 corresponding to the two-dimensional human. To illustrate, the scene-based image editing system 106 inserts the three-dimensional human model 6306*a* at the same location as, or in front of (e.g., relative to a camera position), the portion of the three-dimensional representation 6308 corresponding to the two-dimensional human. In some embodiments, as shown, the client device modifies the displayed two-dimensional image to show the three-dimensional representation 6308, such as in response to a user input rotating the three-dimensional representation 6308 within the three-dimensional space. In alternative embodiments, the scene-based image editing system 106 hides the three-dimensional representation 6308 from view within the graphical user interface while using the three-dimensional space to modify the two-dimensional image 6300.

In one or more embodiments, in response to an interaction with a point via the graphical user interface of the client device, the client device displays one or more additional interactive elements with the two-dimensional image 6300.

Figure 63E:
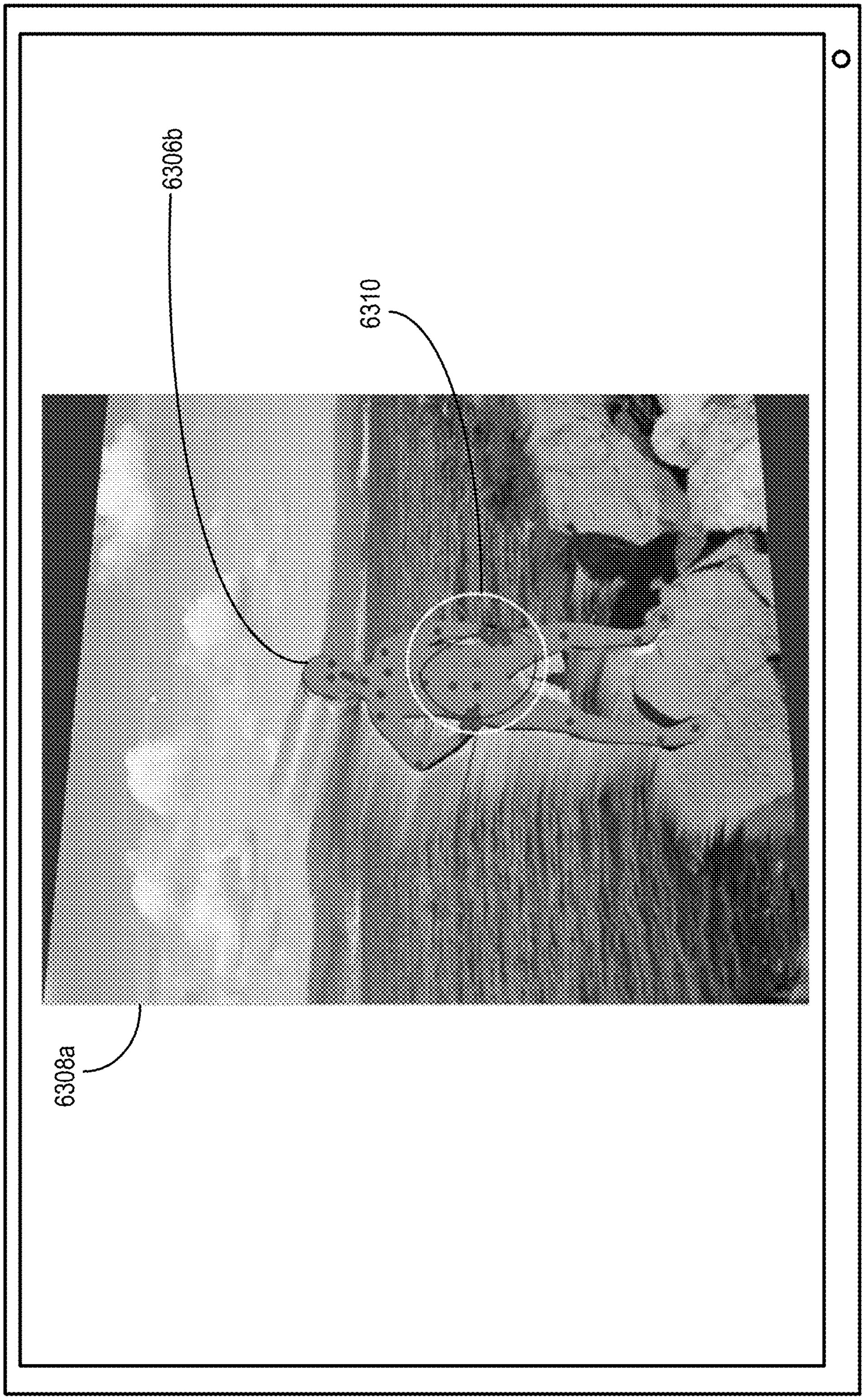

For example, FIG. 63E illustrates that the client device displays a second view of a three-dimensional representation 6308*a* of the two-dimensional image 6300 of FIG. 63A. In response to a selection of a point displayed on a three-dimensional human model 6306*b* representing the two-dimensional human 6302 of the two-dimensional image 6300, the scene-based image editing system 106 displays an interactive element 6310. In particular, the client device displays the interactive element 6310, which includes one or more axes for changing a rotation of the selected joint within the three-dimensional space in response to one or more inputs. To illustrate, the scene-based image editing system 106 utilizes inverse kinematics to change a position and/or rotation of one or more portions of the three-dimensional human model 6306*b* in response to one or more interactions with the interactive element 6310 at the selected point.

According to one or more embodiments, the scene-based image editing system 106 also utilizes one or more constraints for determining a modified pose of the three-dimensional human model 6306*b*. In particular, the scene-based image editing system 106 determines one or more motion constraints with a portion of the three-dimensional human model 6306*b* (e.g., a selected joint) based on one or more pose priors corresponding to the portion. For instance, the scene-based image editing system 106 determines one or more angles of rotation for a hip joint of the three-dimensional human model 6306*b* based on typical hip rotation angles. Thus, the scene-based image editing system 106 limits the rotation of one or more leg portions of the three-dimensional human model 6306*b* based on the motion constraints associated with the hip joint.

In one or more embodiments, the scene-based image editing system 106 provides additional tools for reposing the three-dimensional human model 6306*b* based on a library of pre-constructed poses. For example, the client device displays a list of poses from which a user can select. In response to a selection of a pose, the scene-based image editing system 106 modifies the pose of the three-dimensional human model 6306*b* based on the selected pose. To illustrate, the scene-based image editing system 106 obtains bone positions and joint information (e.g. rotation/angle) from the selected pose and modifies the three-dimensional skeleton of the three-dimensional human model 6306*b* according to the obtained bone positions and joint information.

Figure 63F:
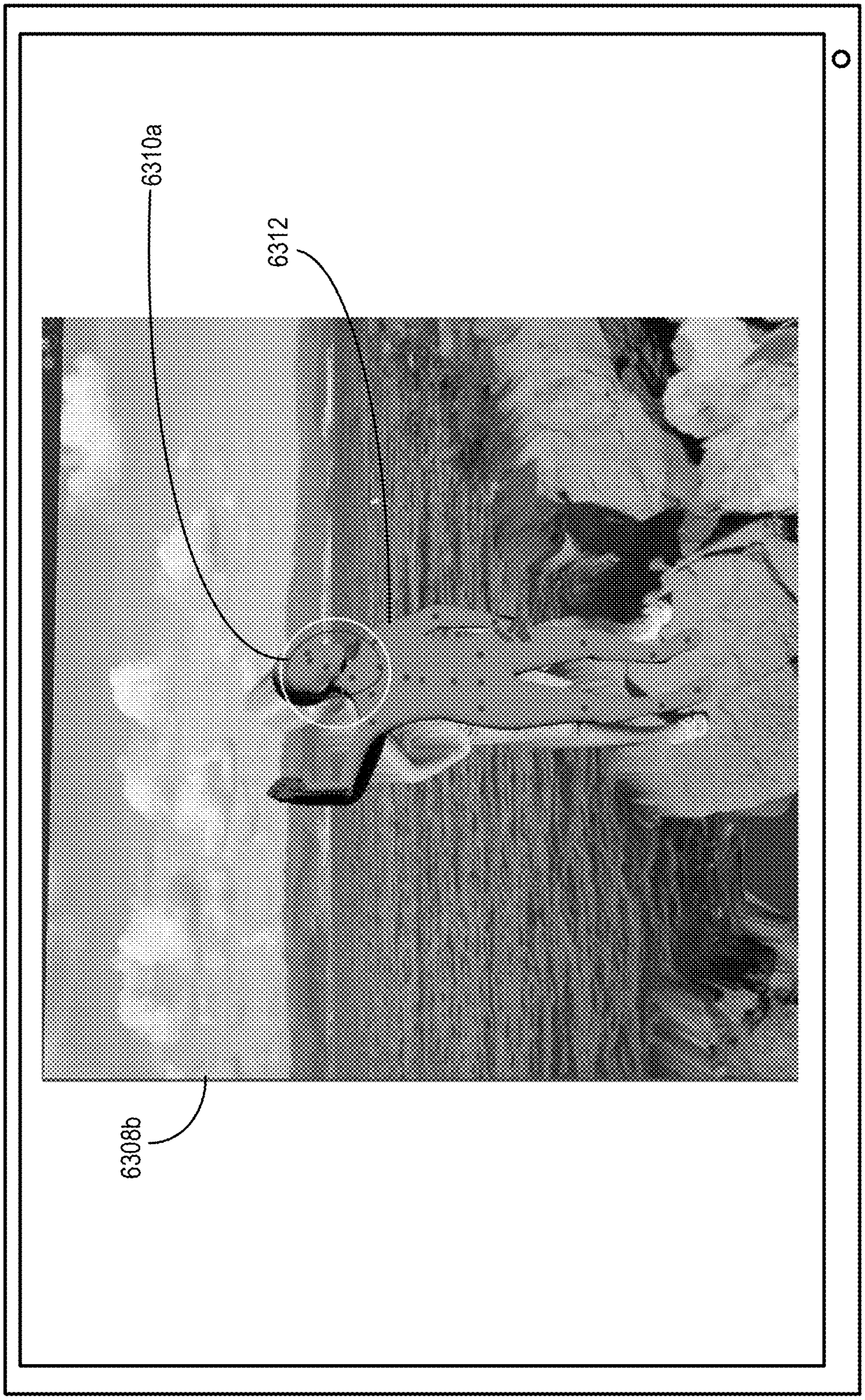

FIG. 63F illustrates a client device displaying a three-dimensional representation 6308*b* including a modified three-dimensional human model 6312 including a modified pose. Specifically, the scene-based image editing system 106 modifies one or more portions of a three-dimensional human model in response to one or more interactions with one or more interactive elements (e.g., an interactive element 6310*a* corresponding to a specific portion of the modified three-dimensional human model 6312). Accordingly, as illustrated, the scene-based image editing system 106 modifies a three-dimensional human model representing the two-dimensional human in the two-dimensional image according to one or more rotation and/or position changes of one or more portions of the three-dimensional human model. The scene-based image editing system 106 provides the modified three-dimensional human model 6312 for display at the client device based on the pose modification inputs.

In one or more embodiments, the scene-based image editing system 106 also provides a depiction of changes to the pose of the three-dimensional human model in connection with one or more pose modification inputs. For example, the scene-based image editing system 106 modifies the pose of the three-dimensional human model displayed at the client device along with the pose modification inputs. To illustrate, the scene-based image editing system 106 determines a range of motion of one or more portions of the three-dimensional human model according to an initial pose of the three-dimensional human model (e.g., as illustrated in FIG. 63E) and a target pose of the three-dimensional human model (e.g., as illustrated in FIG. 63F). The scene-based image editing system 106 displays the range of motion of the one or more portions of the three-dimensional human model within the graphical user interface (e.g., by following a cursor or touch input moving or rotating a portion of the three-dimensional human model).

In some embodiments, the scene-based image editing system 106 also updates the two-dimensional human in connection with the updates to the three-dimensional human model. For example, the scene-based image editing system 106 determines a corresponding range of motion of one or more portions of the two-dimensional human corresponding to the one or more portions of the three-dimensional human model. To illustrate, the scene-based image editing system 106 determines that a pose modification input modifies a portion of a three-dimensional human model. The scene-based image editing system 106 determines a corresponding portion of the two-dimensional human and updates, in real-time, the pose of the two-dimensional human based on the modifications to the three-dimensional human model. In alternative embodiments, the scene-based image editing system 106 updates the two-dimensional human in the two-dimensional image in response to a commit action or at a predetermined time interval based on the modified three-dimensional human model 6312.

Figure 63G:
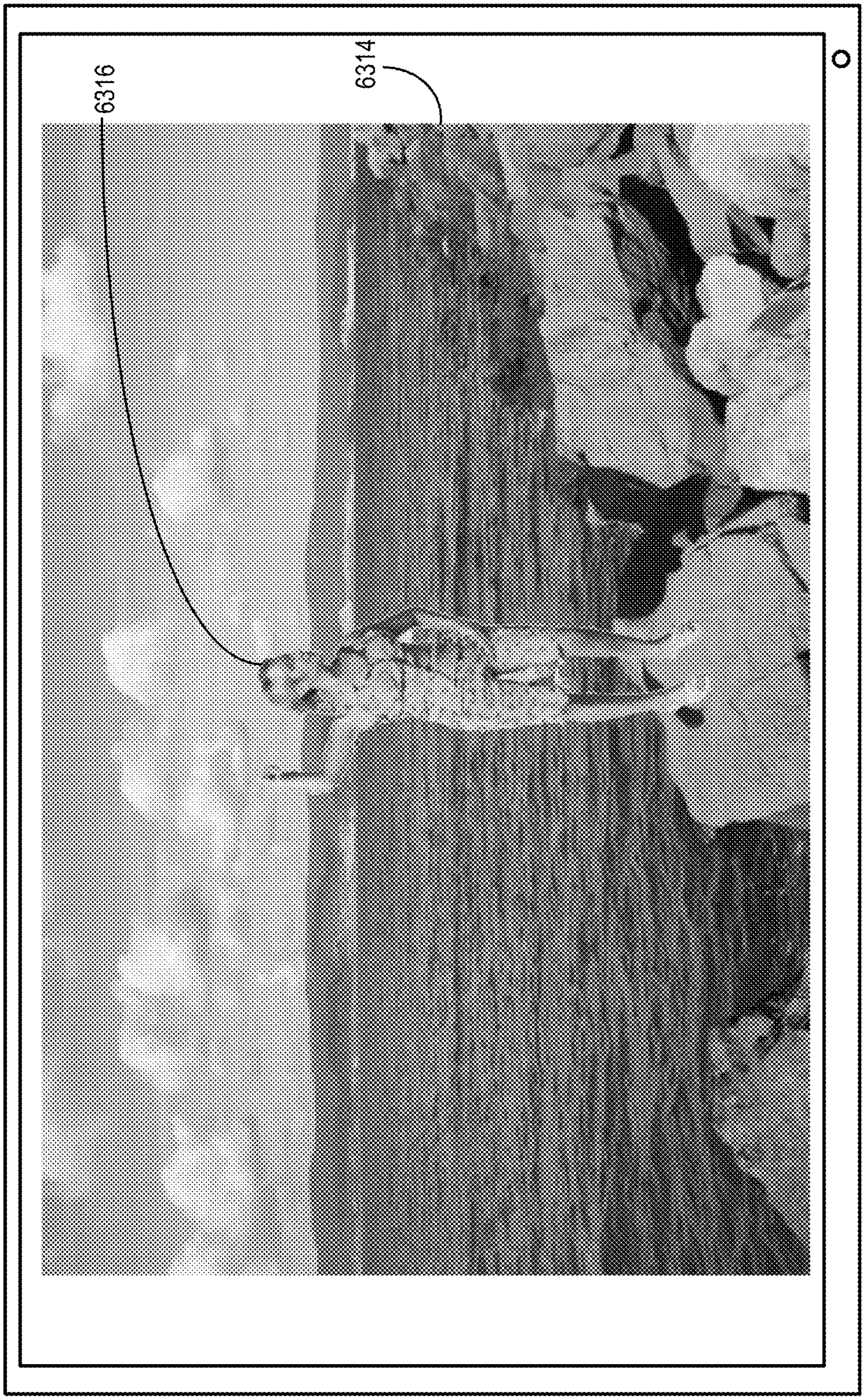

FIG. 63G illustrates the client device displaying a modified two-dimensional image 6314 based on the modified three-dimensional human model 6312 of FIG. 63F. Specifically, the scene-based image editing system 106 utilizes a neural network to generate the modified two-dimensional image 6314 based on the two-dimensional image 6300 (e.g., as illustrated in FIG. 63A) and the modified three-dimensional human model 6312. For example, the scene-based image editing system 106 generates a modified two-dimensional human 6316 to include a modified pose based on the modified pose of the modified three-dimensional human model 6132. Furthermore, in one or more embodiments, the scene-based image editing system 106 generates one or more updated textures of the two-dimensional human according to the modified pose (e.g., based on an initial texture map of the two-dimensional human). To illustrate, the scene-based image editing system 106 generates updated pixel values for portions of the two-dimensional human that were previously not visible (e.g., a previously hidden portion of an arm or leg) or modifying textures of clothing based on the modified pose. The scene-based image editing system 106 also generates one or more inpainted portions corresponding to a background behind the two-dimensional human in response to determining that the one or more portions of the background are revealed in response to the modified pose.

Figure 64:
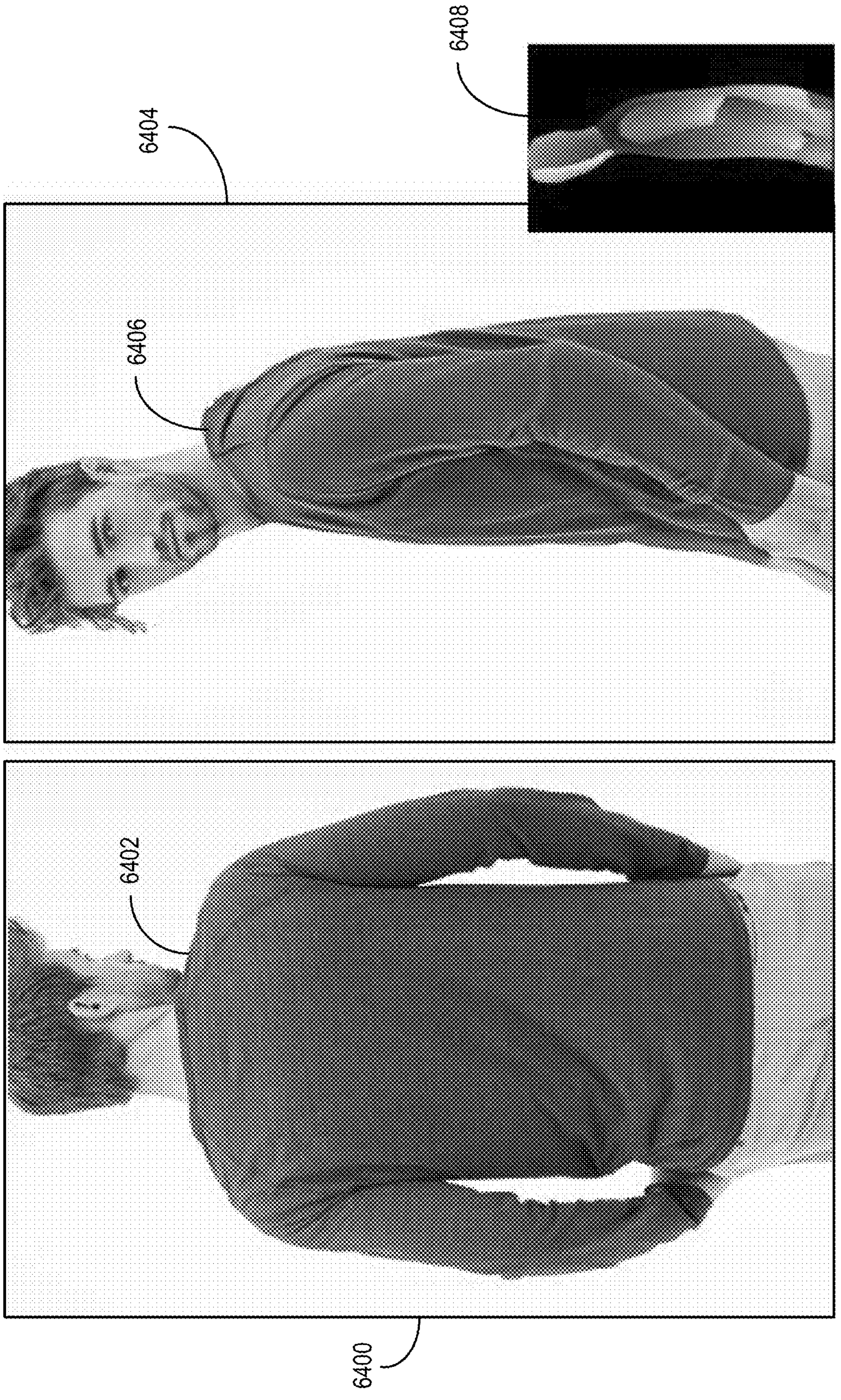
FIG. 64 illustrates digital images in connection with reposing a two-dimensional human in a two-dimensional image in accordance with one or more embodiments.

In one or more embodiments, as mentioned, the scene-based image editing system 106 generates modified two-dimensional images by reposing two-dimensional humans in two-dimensional images. FIG. 64 illustrates digital images associated with modifying a pose of a two-dimensional human in a two-dimensional image. In particular, FIG. 64 illustrates a first two-dimensional image 6400 including a two-dimensional human 6402 with an initial pose. FIG. 64 also generates a second two-dimensional image 6404 in response to modifying a pose of a corresponding three-dimensional human model representing the two-dimensional human 6402. Specifically, the second two-dimensional image 6404 includes a modified two-dimensional human 6406 based on the modified pose. Additionally, FIG. 64 illustrates an intermediate representation 6408 that the scene-based image editing system 106 generates based on the modified pose of the three-dimensional human model representing the two-dimensional human 6402.

Figure 65:
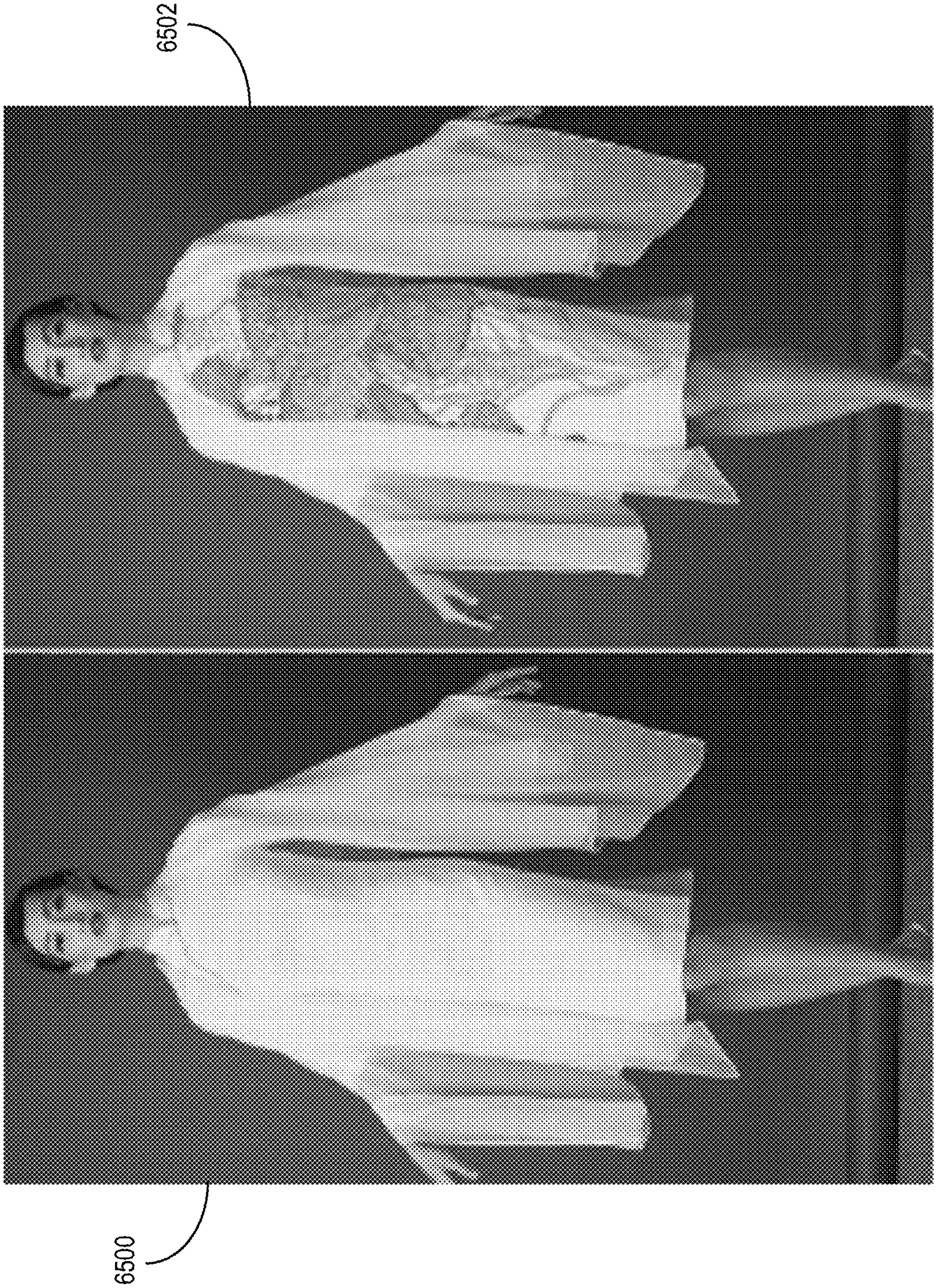
FIG. 65 illustrates digital images in connection with modifying two-dimensional objects interacting with a two-dimensional human in a two-dimensional image via a three-dimensional human model in accordance with one or more embodiments.

In additional embodiments, the scene-based image editing system 106 provides tools for performing additional operations on two-dimensional humans in two-dimensional images via three-dimensional representations. According to one or more embodiments, the scene-based image editing system 106 provides tools for modifying clothing of a two-dimensional human according to a three-dimensional representation that the scene-based image editing system 106 generates for the two-dimensional human, as described previously. FIG. 65 illustrates a two-dimensional image 6500 including a two-dimensional human and a modified two-dimensional image 6502. In particular, the scene-based image editing system 106 generates the modified two-dimensional image 6502 in response to an interaction with a three-dimensional human model representing a two-dimensional human in the two-dimensional image 6500 to change a pattern of clothing on the two-dimensional human (e.g., by modifying a texture map for the three-dimensional human model representing the two-dimensional human in the two-dimensional image 6500.

Although FIG. 65 illustrates that the scene-based image editing system 106 modifies a two-dimensional human in a two-dimensional image by changing a texture of clothing of the two-dimensional human, the scene-based image editing system 106 alternatively modifies a two-dimensional human by determining interactions between one or more objects in the two-dimensional human. For instance, the scene-based image editing system 106 determines interactions between three-dimensional objects in a three-dimensional space corresponding to a two-dimensional image and a three-dimensional human model representing a two-dimensional human. To illustrate, the scene-based image editing system 106 provides tools for interacting with objects in a scene, including a three-dimensional human model representing a two-dimensional human, and determining how those interactions affect other objects in the scene.

As an example, the scene-based image editing system 106 determines interactions between a reposed three-dimensional human model and one or more clothing objects. Specifically, modifying a pose of a three-dimensional human model can affect a position, shape, or other attribute of a clothing item (e.g., a hat or shirt), which allows the scene-based image editing system 106 to provide tools for trying on new outfits, etc. In additional examples, the scene-based image editing system 106 determines interactions between a reposed three-dimensional human model and one or more background objects. To illustrate, modifying a pose of a three-dimensional human model can cause a portion of the three-dimensional human model to touch a background object. In one or more embodiments, the scene-based image editing system 106 determines whether such interactions occur based on a three-dimensional representation of the scene in the two-dimensional image and places limitations on poses of a three-dimensional human model according to the interactions (e.g., by preventing a human's arm or leg from intersecting with a piece of furniture).

In additional embodiments, the scene-based image editing system 106 utilizes a generated three-dimensional human model representing a two-dimensional human in a two-dimensional image to perform one or more additional operations based on lighting in the two-dimensional image. For instance, the scene-based image editing system 106 utilizes a three-dimensional representation of a scene of the two-dimensional image to reproduce shadows in connection with modifying content of the two-dimensional image. To illustrate, the scene-based image editing system 106 utilizes the three-dimensional human model to generate realistic shadows for the two-dimensional image in response to reposing and/or moving the three-dimensional human model within the three-dimensional space, as described previously.

According to one or more embodiments, the scene-based image editing system 106 also provides tools for understanding three-dimensional positioning of objects within a three-dimensional space. In particular, in one or more embodiments, the scene-based image editing system 106 leverages a three-dimensional understanding of a scene of a two-dimensional image to determine relative positioning of objects within the scene. Additionally, the scene-based image editing system 106 utilizes the three-dimensional understanding of the scene to generate and display a planar surface in connection with a selection of an object in the image. The scene-based image editing system 106 thus provides an improved graphical user interface for modifying an object within a three-dimensional space with a better visual understanding of the positioning of the object within the scene.

Figure 66:
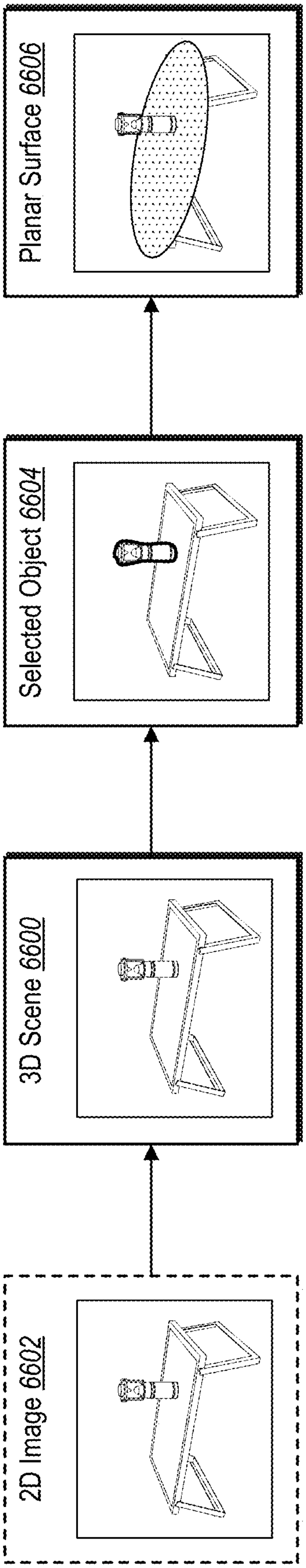
FIG. 66 illustrates an overview diagram of the scene-based image editing system generating a planar surface for display in connection with modifying an object in a two-dimensional image in accordance with one or more embodiments.

FIG. 66 illustrates an overview diagram of the scene-based image editing system 106 generating and displaying a planar surface for modifying an object in a three-dimensional representation of a scene. Specifically, FIG. 66 illustrates that the scene-based image editing system generates, in response to a selection of an object within a three-dimensional scene, a planar surface corresponding to the location of the selected object. The scene-based image editing system 106 maps the planar surface to the object such that modifications to the object within the three-dimensional space (e.g., a modification to a position of the object) results in modifying the planar surface as displayed within a graphical user interface.

In one or more embodiments, the scene-based image editing system 106 generates, or otherwise determines, a three-dimensional scene 6600 including a plurality of objects. For instance, the scene-based image editing system 106 optionally utilizes one or more neural networks to extract content from a two-dimensional image 6602 and generate the three-dimensional scene 6600 including objects in the two-dimensional image 6602. To illustrate, the scene-based image editing system 106 generates one or more three-dimensional meshes representing one or more objects (e.g., foreground and/or background objects) in the two-dimensional image 6602 within a three-dimensional space. In particular, the scene-based image editing system 106 generates one or more foreground three-dimensional meshes representing one or more foreground objects in the two-dimensional image and a background three-dimensional mesh representing a background in the two-dimensional image. In alternative embodiments, the scene-based image editing system 106 determines the three-dimensional scene 6600 including three-dimensional meshes representing any set of objects within a three-dimensional space (e.g., three-dimensional meshes generated via a three-dimensional model application).

According to one or more embodiments, the scene-based image editing system 106 determines a selected object 6604 from the three-dimensional scene 6600. Specifically, the scene-based image editing system 106 determines a selection of an object from a plurality of objects within the three-dimensional scene 6600 in response to an input indicating the selected object 6604. For example, the scene-based image editing system 106 determines the selected object 6604 in connection with a request to modify the selected object 6604 within the three-dimensional scene 6600. In some embodiments, the scene-based image editing system 106 determines a plurality of selected objects in the three-dimensional scene 6600 (e.g., in connection with a request to modify the plurality of selected objects together).

In one or more additional embodiments, the scene-based image editing system 106 generates a planar surface 6606 based on the selected object 6604 (or a group of selected objects including the selected object 6604). In particular, the scene-based image editing system 106 determines a three-dimensional position of the selected object 6604 (or of a portion of the selected object 6604) within a three-dimensional space relative to one or more axes within the three-dimensional space. Additionally, the scene-based image editing system 106 generates the planar surface 6606 according to the three-dimensional position of the selected object 6604. The scene-based image editing system 106 also provides the planar surface 6606 for display within a graphical user interface of a client device in connection with modifying the selected object 6604 in the three-dimensional scene 6600.

In one or more embodiments, the scene-based image editing system 106 utilizes the planar surface 6606 to provide a visual indication of movement of the selected object 6604 within a three-dimensional space. Specifically, modifying an object within a three-dimensional space under restricted conditions can be limiting and confusing for users. For example, modifying objects in a scene according to a three-dimensional understanding of the scene given a fixed camera position (e.g., a fixed editing viewpoint) can be challenging due to representing a three-dimensional space within a two-dimensional editing space. To illustrate, accurately representing relative three-dimensional positioning of objects within a two-dimensional editing space can be challenging depending on the sizes of the objects and/or the positioning of a selected object relative to a camera view or a horizon line. The scene-based image editing system 106 provides improved object interactions within a two-dimensional editing space by providing planar guidelines to assist in understanding the three-dimensional characteristics of the scene.

According to one or more embodiments, the scene-based image editing system 106 utilizes planar surfaces displayed within a two-dimensional editing space to indicate a three-dimensional position of a particular object within a three-dimensional space. To illustrate, the scene-based image editing system 106 displays and moves a planar surface within the three-dimensional space in connection with movement of a corresponding object. Thus, the scene-based image editing system 106 provides additional visual content in connection with transforming objects in a three-dimensional scene within a two-dimensional editing space. Some conventional image editing systems provide guidelines or visible axes to assist users in editing digital content in an editing space, which can be difficult to interpret from a single viewpoint. In contrast to these conventional systems, the scene-based image editing system 106 leverages the three-dimensional understanding of objects in the scene in connection with planar surfaces to provide intuitive and continuous transformation/movement of objects via a fixed-camera, two-dimensional editing space. To illustrate, by providing transformation planes in connection with modifying objects in a three-dimensional space, the scene-based image editing system 106 provides visual indications of movement forward-backward or up-down in the three-dimensional scene based on movement in an image space.

Figure 67:
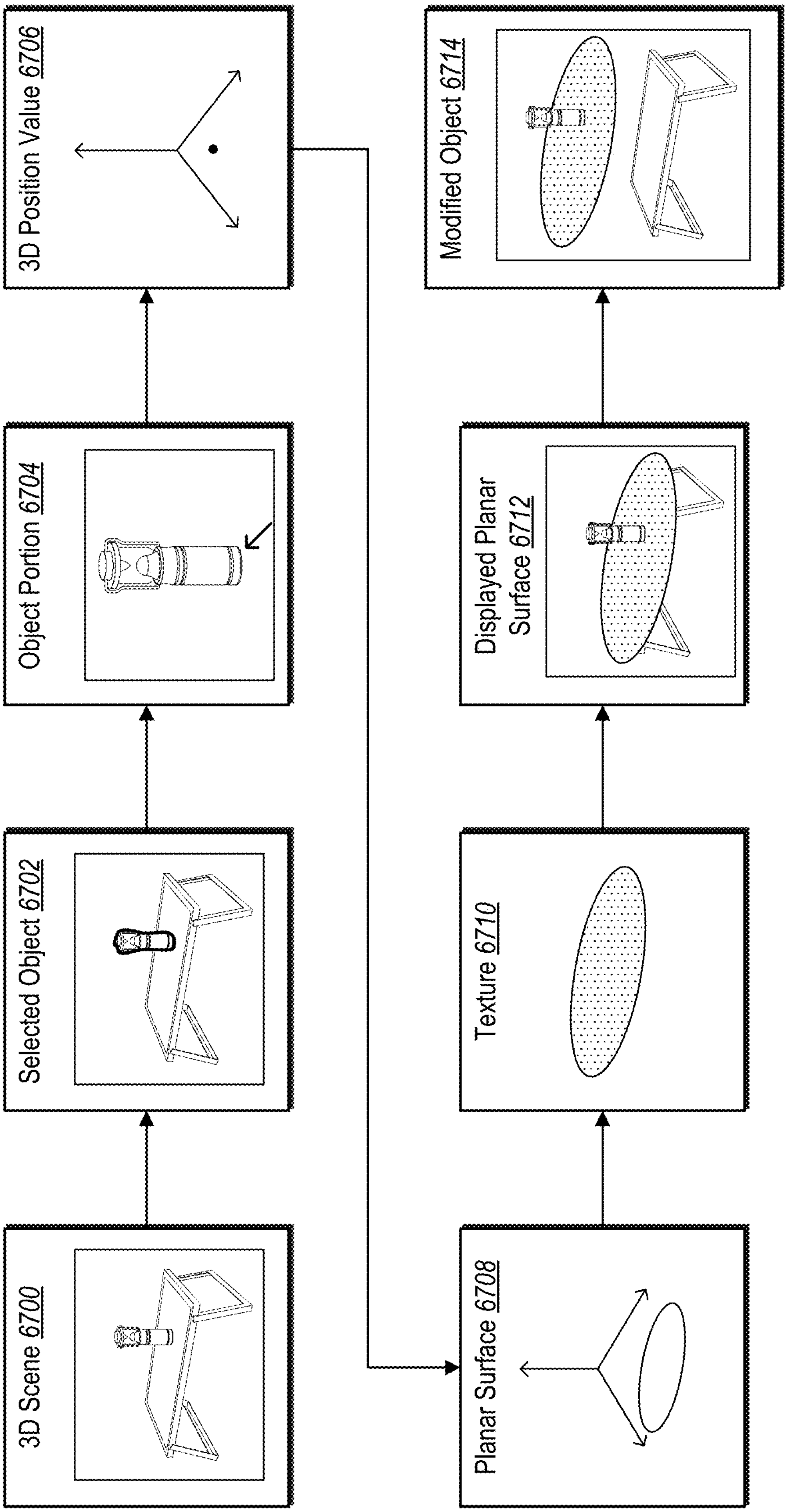
FIG. 67 illustrates a diagram of the scene-based image editing system determining a three-dimensional position of a portion of a selected object within a three-dimensional representation of a scene in a two-dimensional image for generating a planar surface in accordance with one or more embodiments.

FIG. 67 illustrates a diagram including additional detail associated with the scene-based image editing system 106 generating and displaying a planar surface for transforming an object in a three-dimensional scene. Specifically, FIG. 67 illustrates a three-dimensional scene 6700 including a plurality of objects within a three-dimensional space. For instance, as previously mentioned, the scene-based image editing system 106 determines the three-dimensional scene 6700 including a three-dimensional representation of a two-dimensional scene in a two-dimensional image (e.g., by generating three-dimensional meshes for objects in the two-dimensional scene). Accordingly, the scene-based image editing system 106 determines three-dimensional characteristics (e.g., three-dimensional shapes and/or coordinates of objects in a scene within a three-dimensional space.

In one or more embodiments, as illustrated in FIG. 67, the scene-based image editing system 106 determines a selected object 6702 (or group of selected objects) from the three-dimensional scene 6700. In particular, the scene-based image editing system 106 receives an indication of the selected object 6702 in response to a user input selecting an object in the three-dimensional scene 6700. Alternatively, the scene-based image editing system 106 determines the selected object 6702 in response to an automated process selecting an object in the three-dimensional scene 6700 (e.g., in response to utilizing one or more neural networks to infer an intent in connection with editing a digital image). In some embodiments, the scene-based image editing system 106 highlights the selected object 6702 within a graphical user interface displaying the three-dimensional scene 6700.

According to one or more embodiments, the scene-based image editing system 106 determines a specific portion of the selected object 6702 (or group of selected objects) for generating a graphical element indicating the position of the selected object 6702 in three-dimensional space. For example, FIG. 67 illustrates an indication of object portion 6704 of the selected object 6702. To illustrate, the scene-based image editing system 106 determines the portion of the selected object 6702 based on a position of the selected object 6702 along one or more axes within a three-dimensional space. In some embodiments, the scene-based image editing system 106 identifies a vertex or a group of vertices corresponding to a minimum value along a specific axis, such as a lowest portion along a z-axis or a vertical axis or a bottom portion of the selected object 6702 relative to a camera view of the three-dimensional scene 6700.

As illustrated in FIG. 67, the scene-based image editing system 106 also determines a three-dimensional position value 6706 corresponding to the object portion 6704 within the three-dimensional space. In particular, the scene-based image editing system 106 identifies a three-dimensional coordinate within the three-dimensional space that corresponds to the position of the object portion 6704. To illustrate, in response to identifying a lowest portion of the selected object 6702 (e.g., a bottom portion) along a particular axis or set of axes, the scene-based image editing system identifies a three-dimensional coordinate of the lowest portion. In at least some embodiments, the three-dimensional position value 6706 includes a minimum value of the object portion 6704 along a vertical axis. In alternative embodiments, the three-dimensional position value 6706 corresponding to a different portion of the selected object 6702, such as a top, a center, or a centroid of the selected object 6702.

According to one or more embodiments, in response to determining the three-dimensional position value 6706, the scene-based image editing system 106 generates a planar surface 6708 corresponding to the three-dimensional position value 6706. Specifically, the scene-based image editing system 106 generates the planar surface 6708 along two or more axes within the three-dimensional space. For example, the scene-based image editing system 106 generates an infinite plane or a partial plane that intersects the three-dimensional position value 6706 along the two or more axes. To illustrate, the scene-based image editing system 106 generates the planar surface 6708 at the three-dimensional position value along the x-axis and the y-axis such that the planar surface 6708 having the same z-axis value (e.g., a constant height along the planar surface 6708). In alternative embodiments, the scene-based image editing system 106 generates the planar surface 6708 along more than two axes, such as along a flat, angled surface within the three-dimensional scene 6700 (e.g., along a surface of the object portion 6704).

In at least some embodiments, the scene-based image editing system 106 generates the planar surface 6708 at a specific location within the three-dimensional space based on, but not intersecting with, the three-dimensional position value 6706. For instance, the scene-based image editing system 106 determines an additional three-dimensional position value at a distance from the three-dimensional position value 6706 along one or more axes in the three-dimensional space. To illustrate, the scene-based image editing system 106 determines the additional three-dimensional position value by applying a predetermined displacement value to the three-dimensional position value 6706 along a vertical axis. In some embodiments, the scene-based image editing system 106 generates the planar surface 6708 on a surface of an additional object at a specific distance from the three-dimensional position value 6706.

In addition to generating the planar surface 6708, the scene-based image editing system 106 generates a texture 6710 for the planar surface 6708. In particular, the scene-based image editing system 106 generates the texture 6710 to indicate that the planar surface 6708 is a visual element to assist in modifying objects within the three-dimensional space. In one or more embodiments, the scene-based image editing system 106 generates a partially transparent texture for displaying the planar surface 6708 while also providing a visual indication of objects/content behind or underneath the planar surface 6708 from the perspective of a camera view in a graphical user interface. Additionally, in some embodiments, the scene-based image editing system 106 generates a plurality of textures for the planar surface 6708 (e.g., for different portions of the planar surface 6708 or for different states of the planar surface 6708).

According to one or more embodiments, the scene-based image editing system 106 displays the planar surface 6708 with the three-dimensional scene 6700 within a graphical user interface. Specifically, FIG. 67 illustrates that the scene-based image editing system 106 provides a displayed planar surface 6712 within the graphical user interface. For example, the scene-based image editing system 106 provides the displayed planar surface 6712 with the texture 6710 within the three-dimensional space including the three-dimensional scene 6700 at the three-dimensional position value 6706, or at an additional three-dimensional position value based on the three-dimensional position value 6706. Thus, the scene-based image editing system 106 provides an infinite plan or a partial plane within a graphical user interface for providing additional information associated with relative positioning of one or more objects within the three-dimensional space.

In one or more embodiments, the scene-based image editing system 106 also provides tools for modifying the selected object 6702 within the three-dimensional space. For instance, the scene-based image editing system 106 provides tools for modifying a position of the selected object 6702 within the three-dimensional space. In response to modifying the position of the selected object 6702, the scene-based image editing system 106 provides a modified object 6714 within the graphical user interface, as illustrated in FIG. 67. In particular, the scene-based image editing system 106 provides the modified object 6714 at a new position and modifies a position or visual characteristic of the displayed planar surface 6712 in response to modifying the position of the selected object 6702. To illustrate, the scene-based image editing system 106 causes the displayed planar surface 6712 to follow the corresponding object portion 6704 along one or more axes in response to modifying the position of the selected object 6702 along the one or more axes.

As mentioned, the scene-based image editing system 106 provides tools for modifying objects within a graphical user interface via the use of planar surfaces. Specifically, the scene-based image editing system 106 utilizes planar surfaces in connection with one or more additional elements within a graphical user interface for providing accurate and intuitive three-dimensional representations of object positioning within a three-dimensional scene. For example, in one or more embodiments, the scene-based image editing system 106 generates three-dimensional representations of two-dimensional scenes in two-dimensional images. In some embodiments, the scene-based image editing system 106 utilizes the planar surfaces to illustrate relative three-dimensional positioning of objects within the scenes while maintaining a fixed camera viewpoint (e.g., two-dimensional visualizations of the planar surfaces in two-dimensional editing interfaces).

Figure 68A:
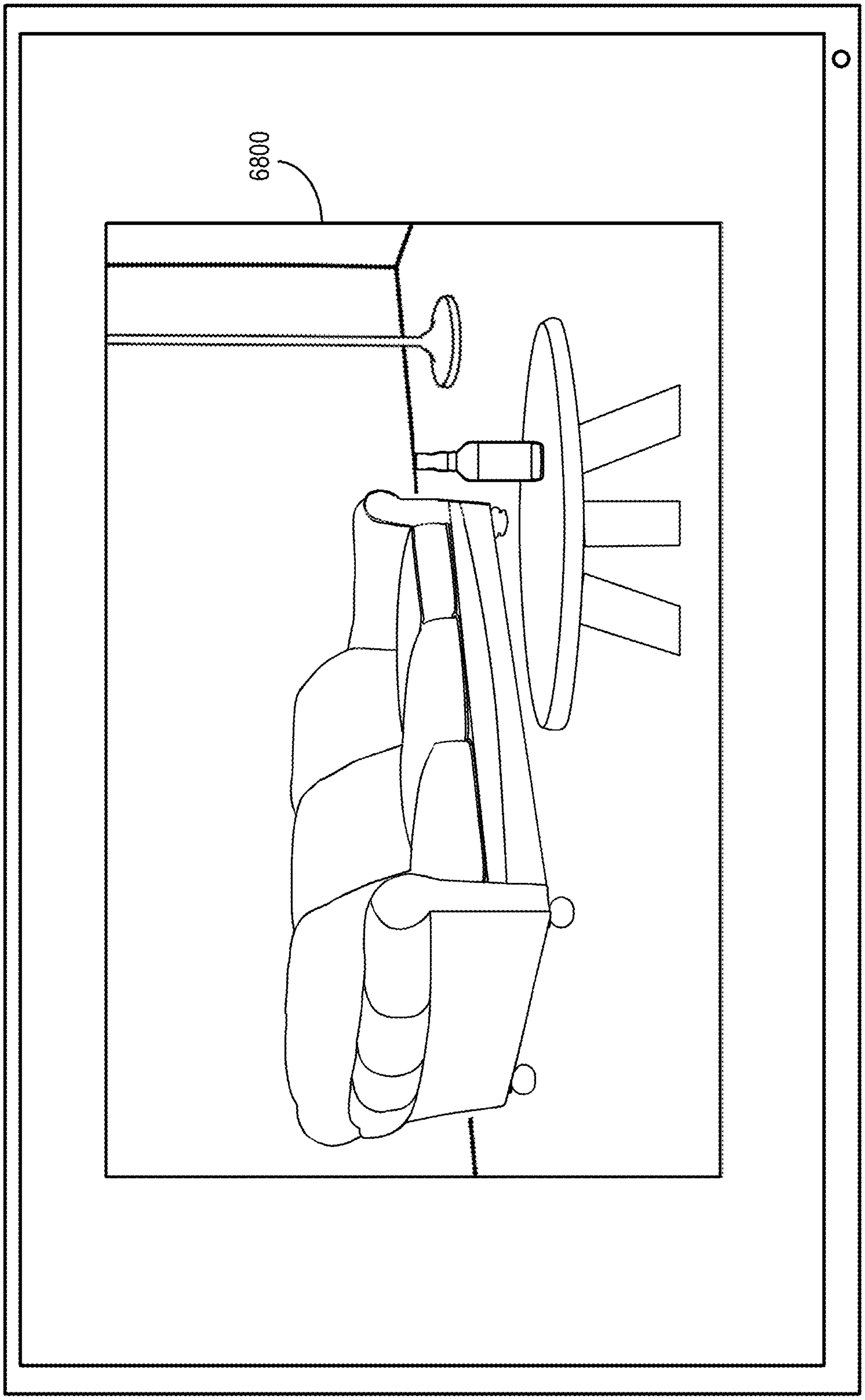
FIGS. 68A-68E illustrate graphical user interfaces for displaying a planar surface in connection with modifying a position of an object within a two-dimensional image in accordance with one or more embodiments.

FIGS. 68A-68DE illustrate graphical user interfaces of a client device for generating and displaying planar surfaces in connection with transforming one or more objects in a three-dimensional scene 6800. In one or more embodiments the client device includes a mobile device (e.g., a smartphone or a tablet), a desktop device, or a laptop device. Furthermore, in one or more embodiments, as illustrated in FIG. 68A, the scene-based image editing system 106 generates the three-dimensional scene 6800 based on a two-dimensional scene in a two-dimensional image. For example, the scene-based image editing system 106 generates the three-dimensional scene 6800 to include one or more three-dimensional meshes with vertices and edges in a three-dimensional space based on two-dimensional objects in the two-dimensional image. In alternative embodiments, the three-dimensional scene 6800 includes one or more objects generated via a three-dimensional editing application.

According to one or more embodiments, the client device detects interactions with the objects in the three-dimensional scene 6800 via the graphical user interface. For instance, the client device provides tools for moving, adding, removing, or otherwise interacting with the objects in the three-dimensional scene 6800. In some embodiments, the client device detects inputs interacting with the objects in the three-dimensional scene 6800 via a touchscreen interface and/or via a mouse device. Additionally, in one or more embodiments involving generating the three-dimensional scene 6800 from a two-dimensional image, the client device provides a two-dimensional editing space for modifying objects within the two-dimensional image according to detected three-dimensional characteristics of the two-dimensional image. To illustrate, the scene-based image editing system 106 provides three-dimensional editing of objects in a two-dimensional scene.

Figure 68B:
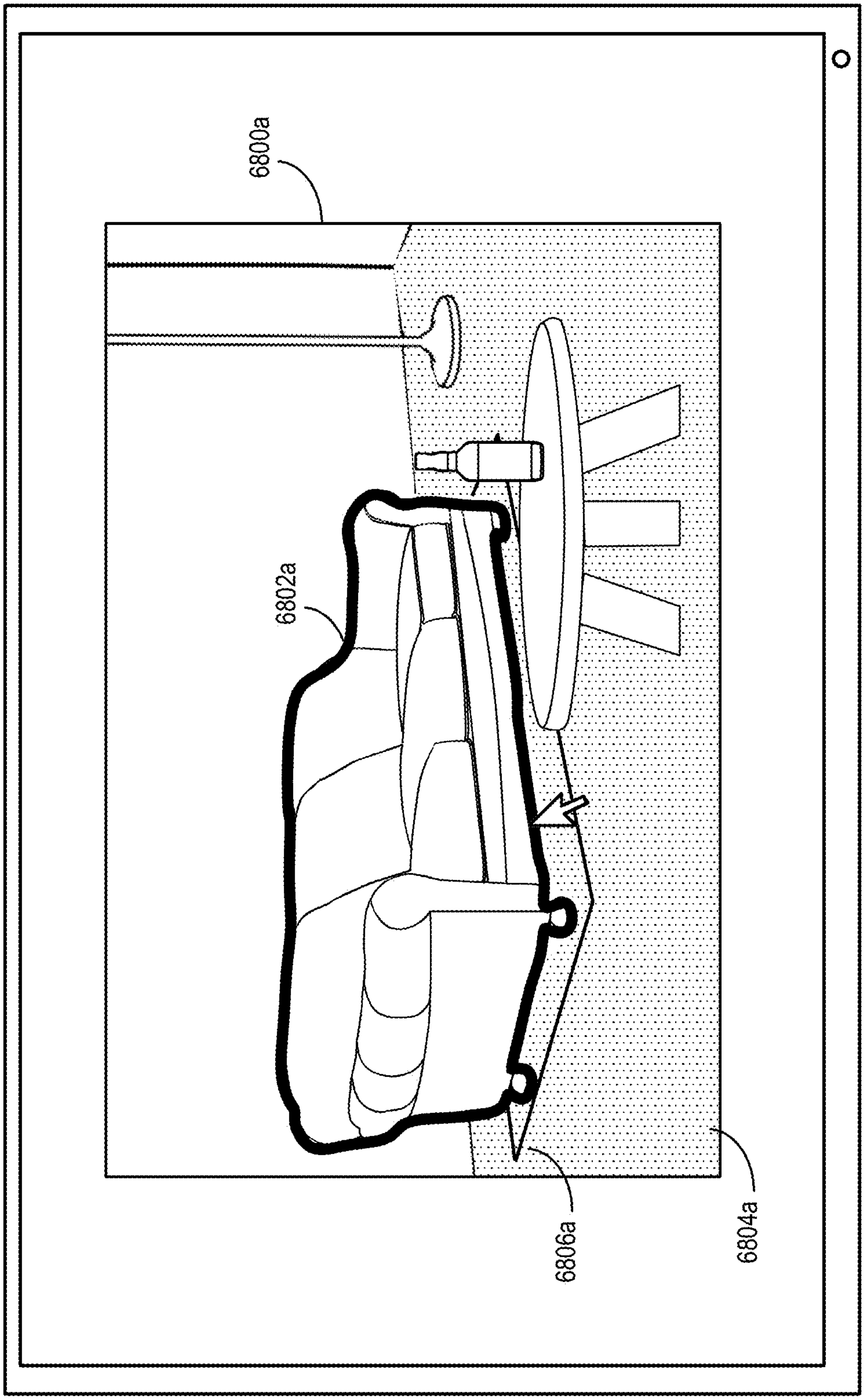

In one or more embodiments, the client device detects a selection of an object in the three-dimensional scene 6800. For example, as illustrated in FIG. 68B, the client device receives an input indicating a selected object 6802*a* within a three-dimensional scene 6800*a* via the graphical user interface. Specifically, as illustrated, the client device determines an intent to transform or modify the selected object 6802*a* within the three-dimensional scene 6800*a*. To illustrate, the client device determines an indicated or inferred intent to modify a position of the selected object 6802*a* within the three-dimensional scene 6800*a*.

In connection with determining the intent to modify the selected object 6802*a*, the scene-based image editing system 106 generates a planar surface 6804*a*. In particular, the scene-based image editing system 106 generates the planar surface 6804*a* at a specific location within the three-dimensional scene 6800*a* corresponding to a portion of the selected object 6802*a*. For example, the scene-based image editing system 106 determines a bottom portion of the selected object 6802*a* (e.g., one or more vertices of legs of the couch in FIG. 68B at a lowest position along a z-axis). The scene-based image editing system 106 generates the planar surface 6804*a* according to the determined portion of the selected object 6802*a* for display at the client device.

According to one or more embodiments, as previously mentioned, the scene-based image editing system 106 generates the planar surface 6804*a* including a partially transparent texture. For instance, the client displays the planar surface 6804*a* within the three-dimensional space with the partially transparent texture such that one or more objects (e.g., one or more background objects) behind or underneath the planar surface 6804*a* are at least partially visible. To illustrate, the client device displays the planar surface 6804*a* underneath the selected object 6802*a* at a specific three-dimensional position value along the vertical axis within the three-dimensional scene 6800*a*.

In one or more embodiments, the scene-based image editing system 106 also generates an object platform 6806*a* corresponding to the selected object 6802*a* relative to the planar surface 6804*a*. In particular, the scene-based image editing system 106 generates the object platform 6806*a* by determining a position of the selected object 6802*a* relative to the planar axes of the planar surface 6804*a*. For example, the scene-based image editing system 106 determines three-dimensional position values of one or more edges of the selected object 6802*a* along the planar axes. Additionally, the scene-based image editing system 106 generates the object platform 6806*a* based on the three-dimensional position values of the one or more edges of the selected object 6802*a*, such as by generating a bounding box indicating the horizontal positioning of the selected object 6802*a* on the planar surface 6804*a*.

In some embodiments, the scene-based image editing system 106 generates a separate texture for the object platform 6806*a*. Specifically, the scene-based image editing system 106 generates a first texture for a portion of the planar surface 6804*a* outside the object platform 6806*a* and a second texture for a portion of the planar surface 6804*a* inside the object platform 6806*a*. To illustrate, the scene-based image editing system 106 applies a separate transparency to the object platform 6806*a* than to the rest of the planar surface 6804*a*. Alternatively, the scene-based image editing system 106 generates an outline or bounding box for the object platform 6806*a* for display at the client device.

Figure 68C:
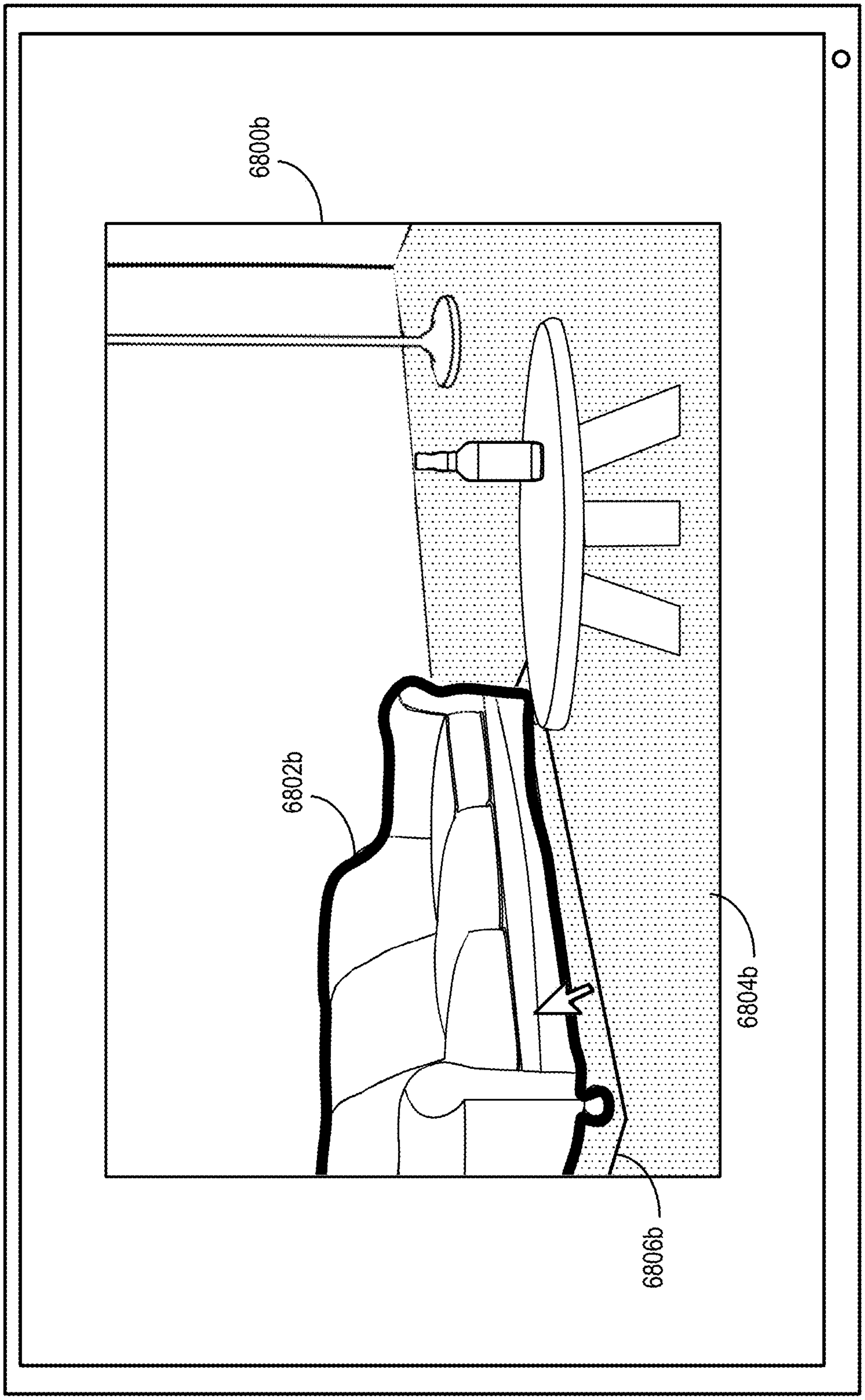

In one or more embodiments, the scene-based image editing system 106 modifies a planar surface in connection with transforming a selected object in a three-dimensional scene. FIG. 68C illustrates a graphical user interface for modifying a three-dimensional scene 6800*b* including a selected object 6802*b*. In particular, in response to modifying a position of the selected object 6802*b* along the planar axes corresponding to a planar surface 6804*b* displayed at the client device (e.g., in a horizontal direction), the scene-based image editing system 106 modifies the planar surface 6804*b*. For example, the scene-based image editing system 106 changes a position of an object platform 6806*b* based on the modification of the selected object 6802*b*, such as by moving the object platform 6806*b* to stay under the selected object 6802*b* in response to moving the selected object 6802*b* from a first position to a second position. By modifying the position of the object platform 6806*b* based on the position of the selected object 6802*b*, the scene-based image editing system provides a three-dimensional understanding of the relative positions of objects in the three-dimensional scene 6800*b* within the two-dimensional editing space of the graphical user interface of the client device. In some embodiments, the scene-based image editing system 106 also modifies a visual characteristic of the object platform 6806*b* when moving the object platform 6806*b*.

Figure 68D:
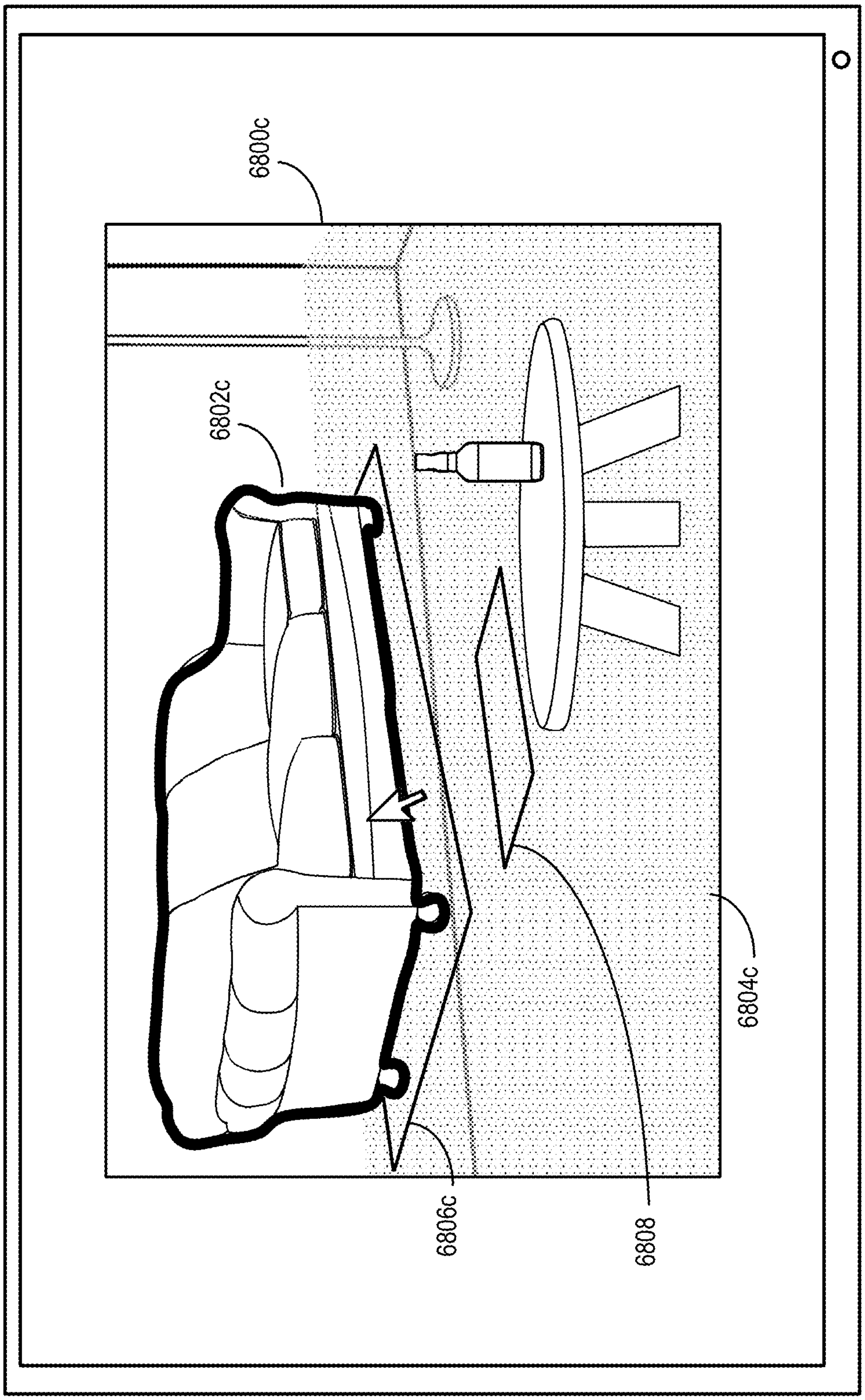

In one or more additional embodiments, the scene-based image editing system 106 provides tools for modifying a position of an object perpendicular to a planar surface within a three-dimensional scene. Specifically, FIG. 68D illustrates a graphical user interface of a client device for modifying planar surfaces with objects in a three-dimensional scene 6800*c*. For instance, FIG. 68D illustrates a movement of a selected object 6802*c* in a perpendicular direction relative to a planar surface 6804*c* generated for illustrating transformation of the selected object 6802*c*. More specifically, the client device displays movement of the selected object 6802*c* in an upward direction relative to a floor surface within the three-dimensional scene 6800*c*.

In one or more embodiments, the client device moves the selected object 6802*c* and the planar surface 6804*c* in a direction perpendicular to the planar surface 6804*c* in response to an input selecting and moving the selected object 6802*c* from a first position to a second position. In alternative embodiments, the client device moves the selected object 6802*c* and the planar surface 6804*c* in the direction perpendicular to the planar surface 6804*c* in response to an input selecting and modifying a position of the planar surface 6804*c* from a first position to a second position. Thus, in one or more embodiments, the client device moves the selected object 6802*c* and the planar surface 6804*c* together in response to movement of either the selected object 6802*c* or the planar surface 6804*c*. As illustrated, in some embodiments, the client device displays at least a portion of the planar surface 6804*c* with a partially or fully transparent texture to display objects that are behind the planar surface 6804*c* in response to moving the selected object 6802*c*.

Furthermore, in connection with moving the planar surface 6804*c* vertically, the scene-based image editing system 106 also modifies a perspective of the planar surface 6804*c* relative to a camera view (e.g., a horizon line) associated with the two-dimensional editing space to maintain an accurate perspective of the planar surface 6804*c* with other content in the three-dimensional scene 6800*c*. For example, in connection with generating or otherwise determining the three-dimensional scene 6800*c*, the scene-based image editing system 106 also determines camera parameters (e.g., a position, field of view, pitch, or roll). The scene-based image editing system 106 utilizes the camera parameters to determine a horizon line corresponding to the three-dimensional scene 6800*c*. The scene-based image editing system 106 utilizes the camera parameters to determine how to move and display the planar surface 6804*c* relative to other content in the three-dimensional scene 6800*c*, such as based on a distance from a position of the planar surface 6804*c* to the horizon line.

According to one or more additional embodiments, the scene-based image editing system 106 provides additional information within the graphical user interface in connection with modifying the selected object 6802*c*. In particular, the scene-based image editing 106 generates an additional plane 6808 (e.g., an additional planar surface) representing a distance between the selected object 6802*c* and an additional surface in the three-dimensional scene 6800*c*. For instance, the client device of FIG. 68D displays the additional plane 6808 with a size based on the closeness of the selected object 6802*c* (or object platform 6806*c*) to the additional surface. More specifically, the scene-based image editing system 106 determines the size of a visible portion of the additional planar surface according to a distance between the selected object 6802*c* and an additional surface or object.

To illustrate, the client device displays the additional plane 6808 in response to the distance between the selected object 6802*c* and the additional surface being within a threshold distance. In some embodiments, the client device increases the size of the additional plane 6808 as the selected object 6802*c* gets closer to the additional surface (e.g., based on vertical movement of the selected object 6802*c*) and shrinks the size of the additional plane 6808 as the selected object 6802*c* gets farther away from the additional surface. Furthermore, in some embodiments, the client device hides the additional plane 6808 in response to the distance between the selected object 6802*c* and the additional surface exceeding the threshold distance.

Figure 68E:
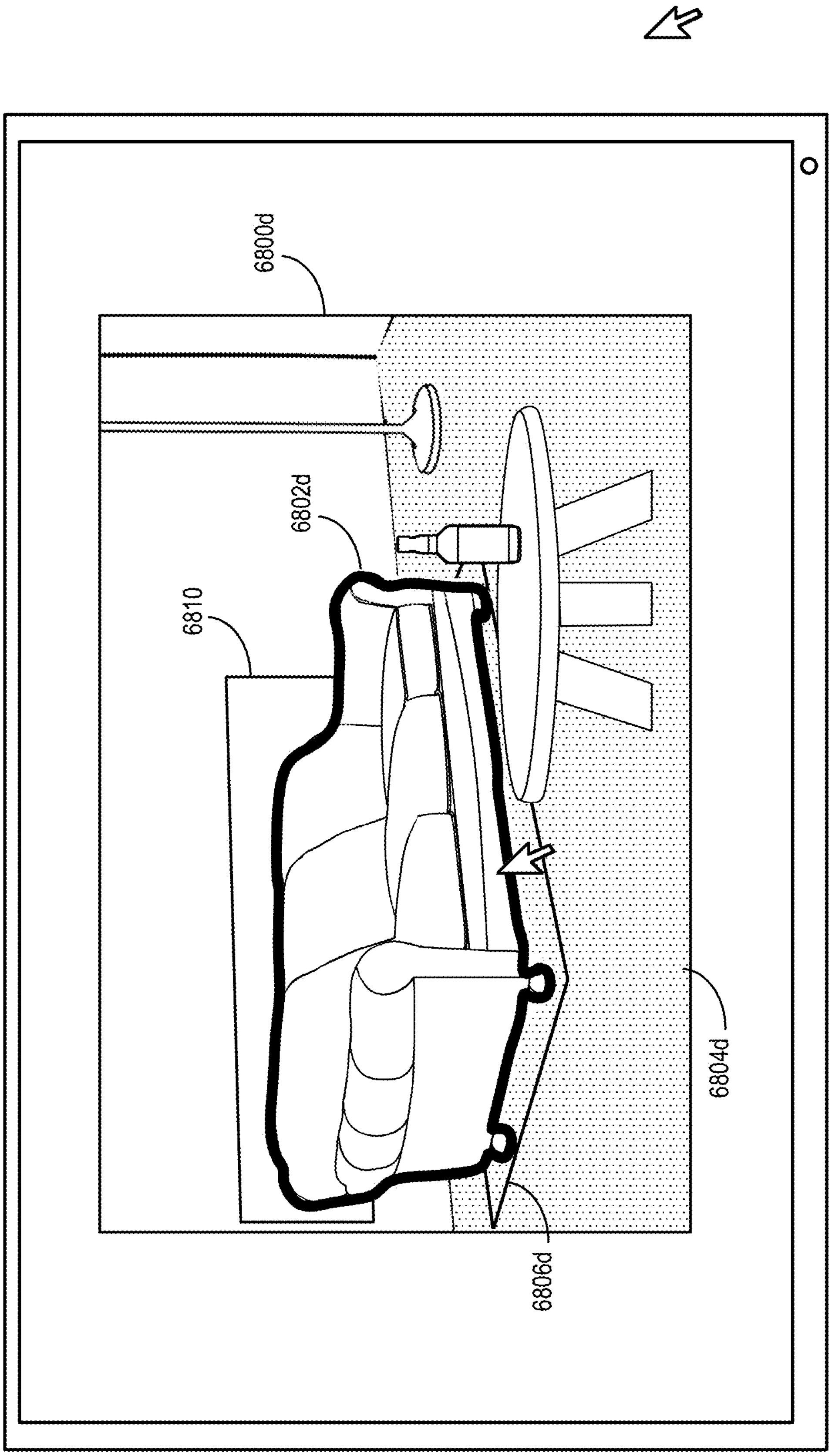

Furthermore, in some embodiments, the scene-based image editing system 106 generates one or more additional planes for a plurality of surfaces of a three-dimensional scene based on a proximity of an object moved within the three-dimensional scene. FIG. 68E illustrates a three-dimensional scene 6800*d* including a selected object 6802*d* moving within the three-dimensional scene 6800*d*. Specifically, in response to movement of the selected object 6802*d* within the three-dimensional scene 6800*d* (and corresponding movement of a planar surface 6804*d* and/or an object platform 6806*d*), the scene-based image editing system 106 generates an additional plane 6810 on an additional surface (e.g., a wall) in the three-dimensional scene 6800*d*. For example, as the selected object 6802*d* moves horizontally along one or more axes, the scene-based image editing system 106 displays (or hides) the additional plane 6810 with a corresponding size based on the distance between the selected object 6802*d* and the additional surface. In further embodiments, the scene-based image editing system 106 determines whether to display an additional plane based on a movement of direction of the selected object 6802*c* and/or a size of the additional surface.

In one or more embodiments, the scene-based image editing system 106 displays a planar surface with a finite size in connection with modifying an object in a three-dimensional scene. For example, although FIGS. 68A-68E illustrate that the scene-based image editing system 106 generates an infinite (or large) planar surface corresponding to a position of a selected object in a three-dimensional scene, the scene-based image editing system 106 alternatively generates a planar surface based on a size of a selected object. To illustrate, FIGS. 69A-69B illustrate graphical user interfaces displaying planar surfaces with a size and position based on a size and a position of a selected object.

Figure 69A:
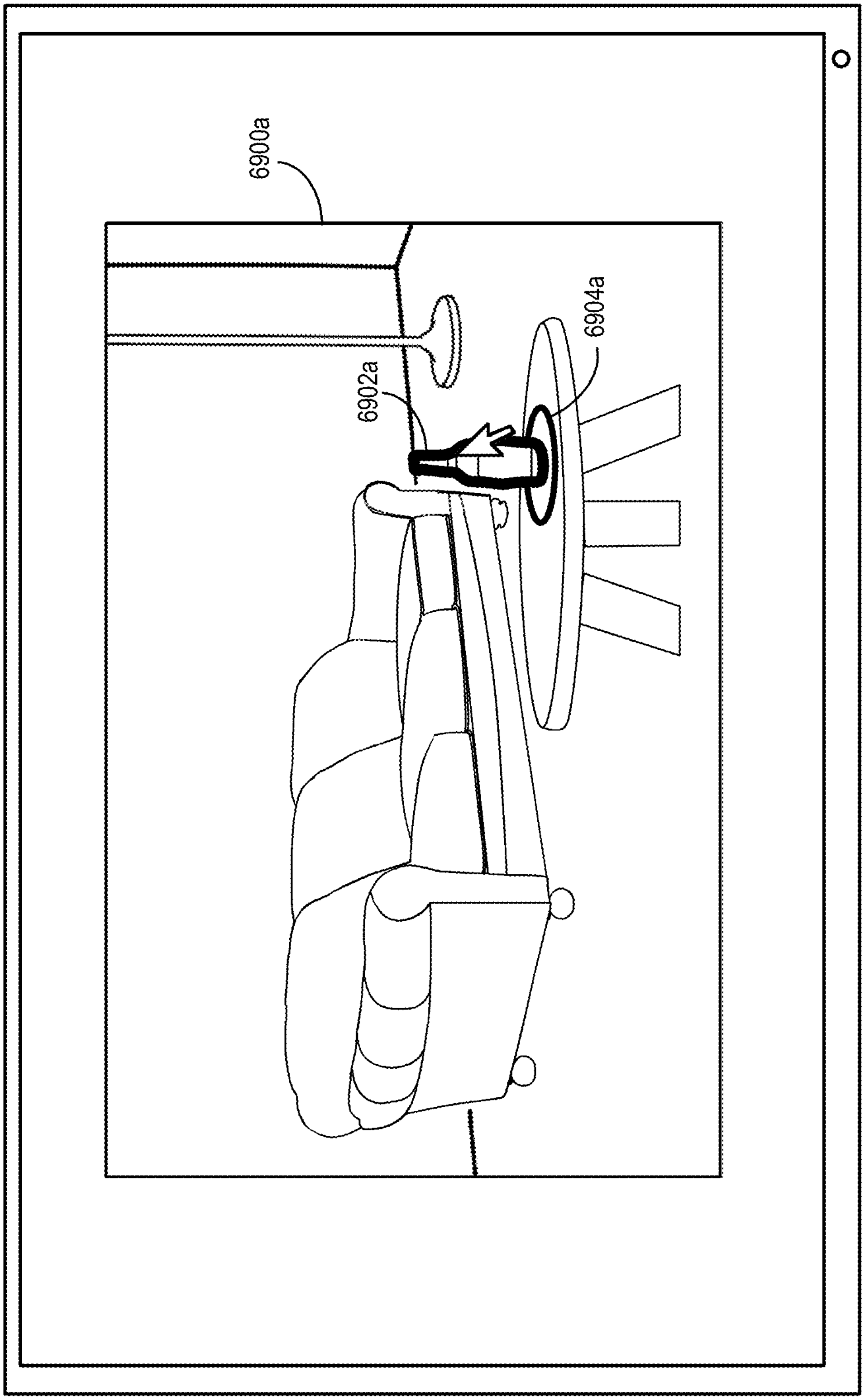
FIGS. 69A-69B illustrate graphical user interfaces for displaying different types of planar surfaces for modifying a selected object within a two-dimensional image in accordance with one or more embodiments.
Figure 69B:
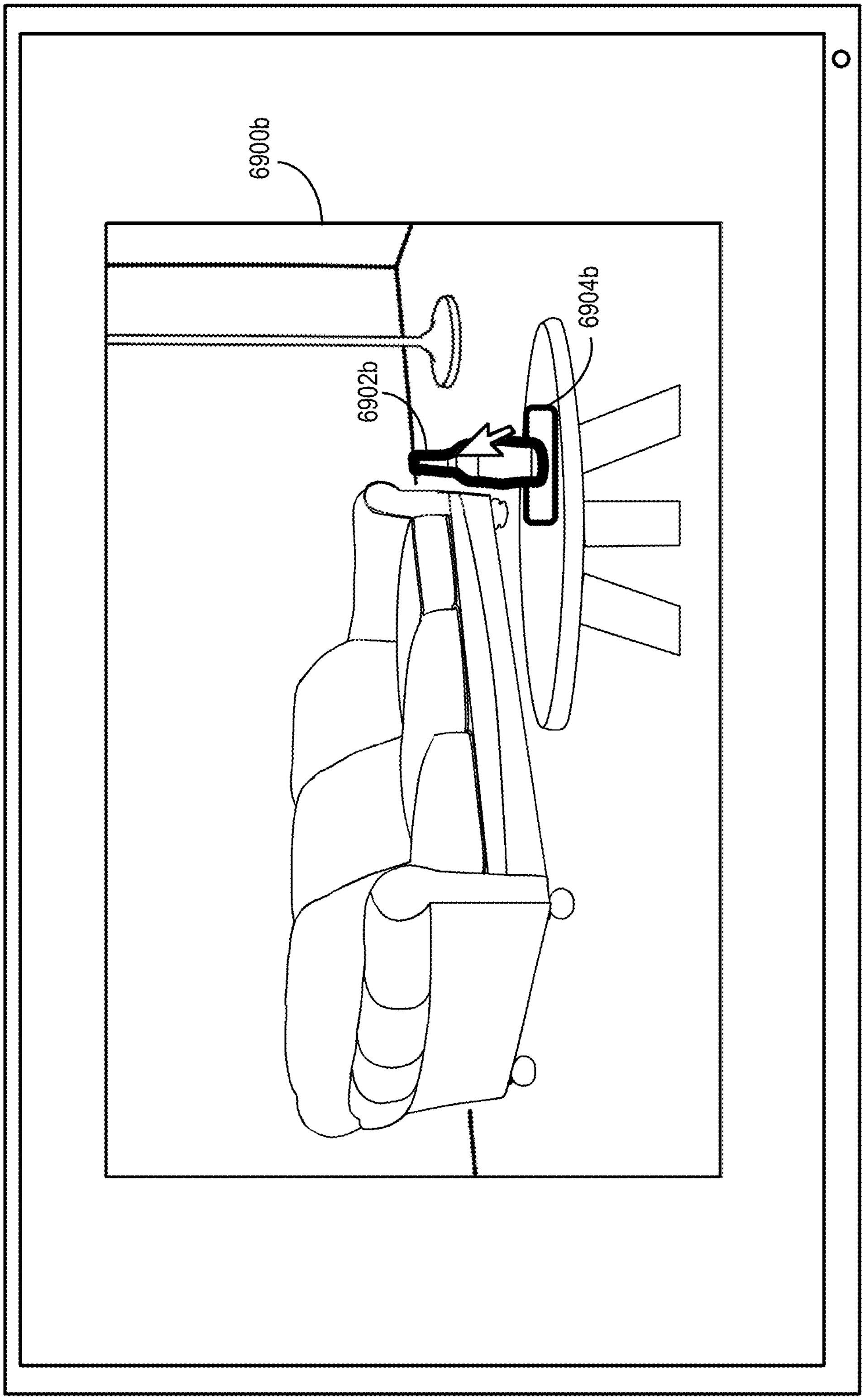

FIG. 69A illustrates a three-dimensional scene 6900*a* including a plurality of objects within the graphical user interface of the client device. For example, the client device displays a selected object 6902*a* within the three-dimensional scene 6900*a*. Furthermore, the client device displays a planar surface 6904*a* including a position based on a portion of the selected object 6902*a*. Additionally, in one or more embodiments, the scene-based image editing system 106 generates the planar surface 6904*a* including a finite size based on the size of the selected object 6902*a*. To illustrate, the scene-based image editing system 106 generates the planar surface 6904*a* according to an object platform corresponding to the size of the selected object 6902*a*. In one or more embodiments, the scene-based image editing system 106 generates an infinite planar surface while displaying only a portion of the planar surface, such as an object platform portion of the planar surface.

In some embodiments, the scene-based image editing system 106 generates planar surfaces with different shapes based on shapes of selected objects or other criteria. For, as illustrated in FIG. 69A, the scene-based image editing system 106 generates the planar surface 6904*a* based on a shape of the selected object 6902*a*. Alternatively, the scene-based image editing system 106 generates a planar surface according to a default setting, a shape of a surface on which a selected object rests, a visibility of a particular shape, etc. FIG. 69B illustrates a three-dimensional scene 6900*b* including a selected object 6902*b* and a planar surface 6904*b* generated for the selected object 6902*b*. As illustrated, the planar surface 6904*b* of FIG. 69B includes a different shape than the planar surface 6904*a* of FIG. 69A. In additional embodiments, the scene-based image editing system 106 generates planar surfaces including, but not limited to, circles, squares, rectangles, or other shapes.

Figure 70A:
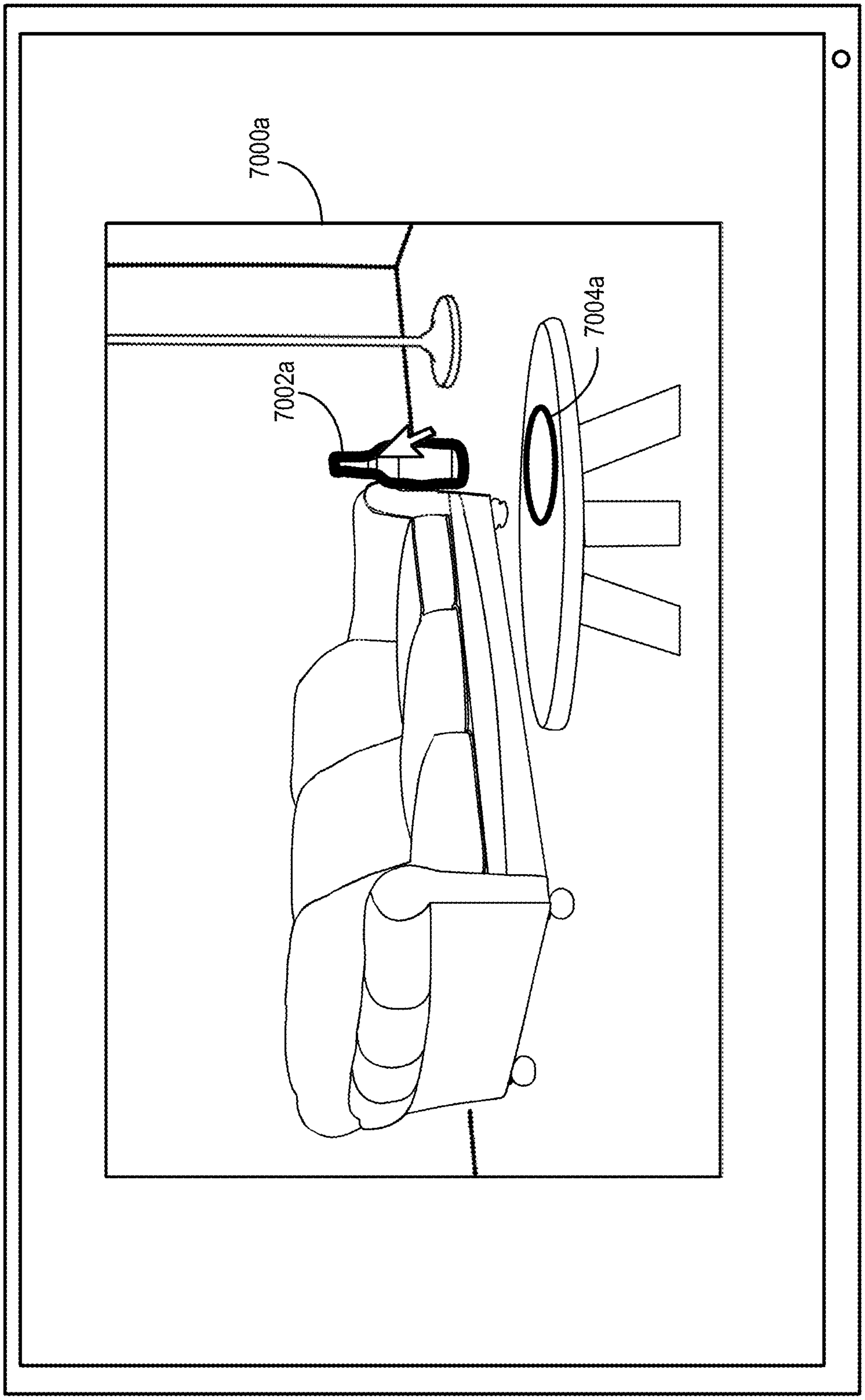
FIGS. 70A-70C illustrate graphical user interfaces for displaying and moving a planar surface in connection with modifying a selected object within a two-dimensional image in accordance with one or more embodiments.
Figure 70B:
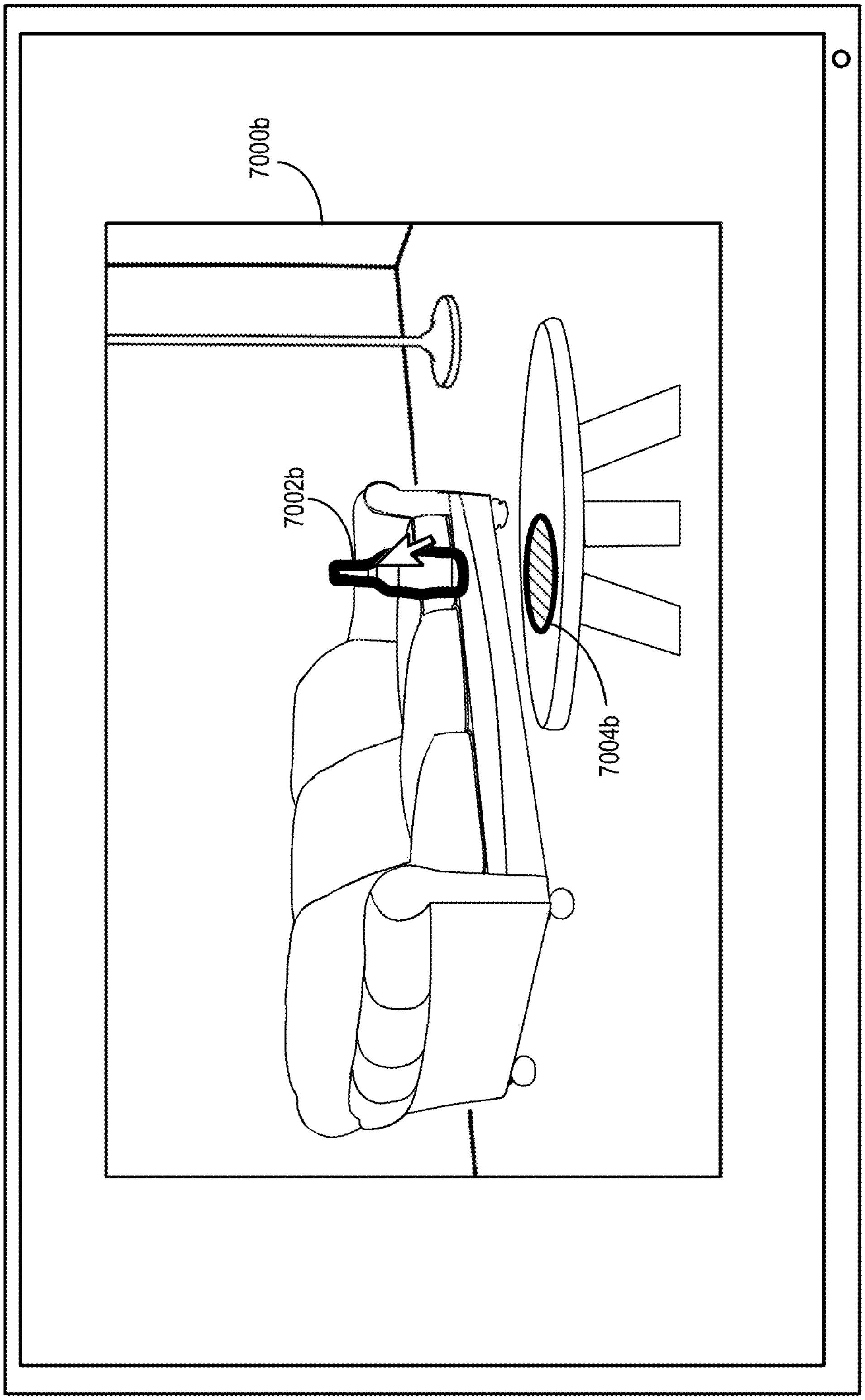
Figure 70C:
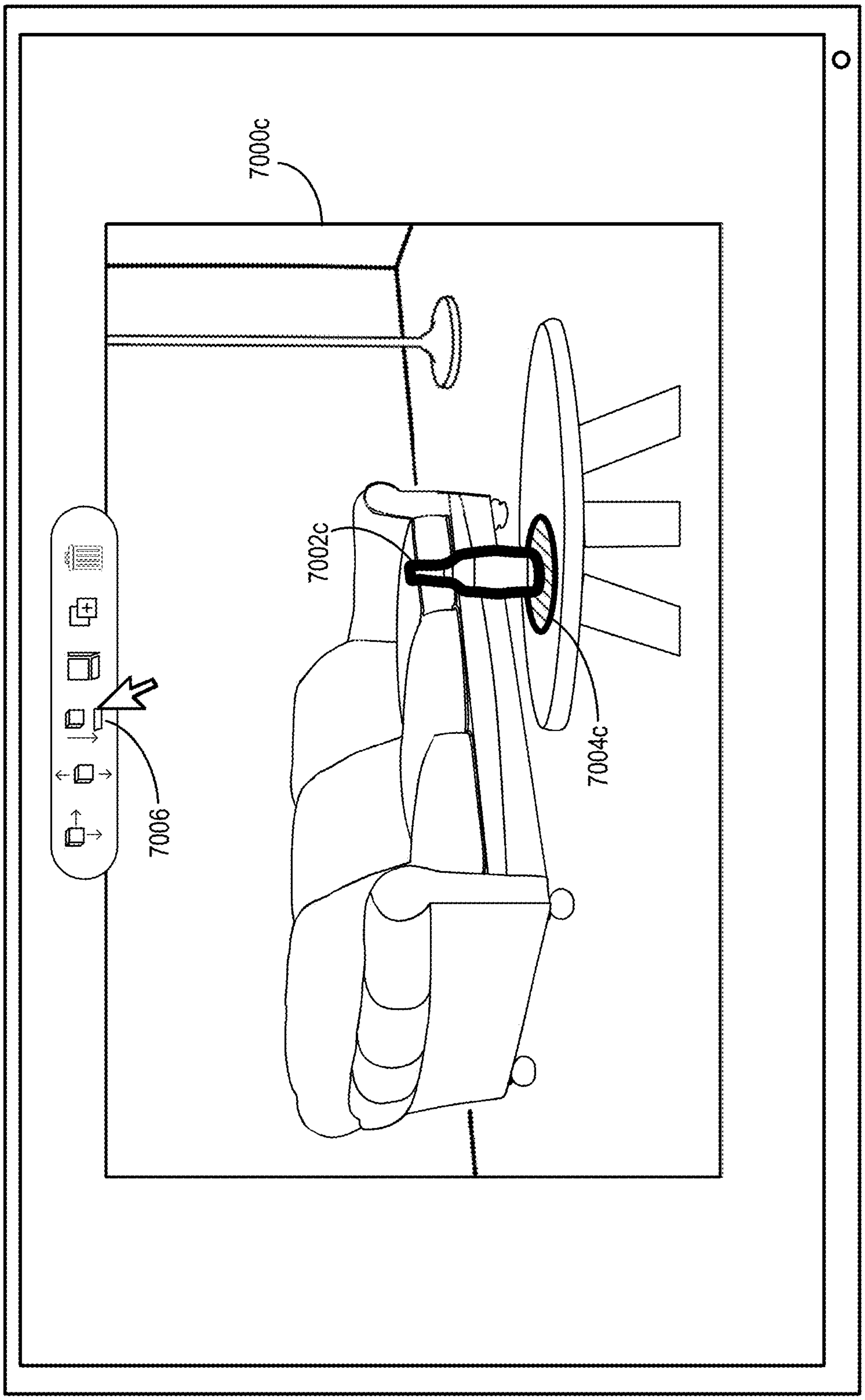

According to one or more embodiments, the scene-based image editing system 106 provides different textures for planar surfaces and/or object platforms based on states of the planar surfaces and/or states of the object platforms. FIGS. 70A-70C illustrate graphical user interfaces displaying a three-dimensional scene including a plurality of objects. For example, FIG. 70A illustrates that the client device displays a three-dimensional scene 7000*a* including a selected object 7002*a* at a first position. In particular, the client device receives a request to move the selected object 7002*a* from the first position to a second position.

As illustrated, the scene-based image editing system 106 generates a planar surface 7004*a* according to the first position of the selected object 7002*a*. In one or more embodiments, the scene-based image editing system 106 generates the planar surface 7004*a* at a position displaced from the selected object 7002*a*. For example, as illustrated in FIG. 70A, the scene-based image editing system 106 generates the planar surface 7004*a* on top of a surface (e.g., a table) below the selected object 7002*a*.

In one or more embodiments, the scene-based image editing system 106 provides an option (e.g., a selected tool or mode) to move the selected object 7002*a* perpendicularly to the planar surface 7004*a*. Thus, rather than moving the planar surface 7004*a* with the selected object 7002*a* in such a mode, the scene-based image editing system 106 moves the selected object 7002*a* along at least one axis without moving the planar surface 7004*a*. To illustrate, the scene-based image editing system 106 restricts movement of the selected object 7002*a* along the perpendicular direction relative to the planar surface 7004*a*. In one or more additional embodiments, the scene-based image editing system 106 moves the planar surface 7004*a* with movement of the selected object 7002*a* in one or more axes while restricting movement of the planar surface 7004*a* in one or more other axes. For example, the scene-based image editing system 106 moves the planar surface 7004*a* horizontally (or otherwise with the planar axes) without moving the planar surface 7004*a* in the perpendicular direction.

FIG. 70A illustrates that the client device displays the planar surface 7004*a* at the first position with a first texture. For instance, in response to determining that the planar surface 7004*a* is at rest (e.g., not moving and in a rest state), the client device displays the planar surface 7004*a* with the first texture. To illustrate, the client device displays the planar surface 7004*a* with a flat texture indicating that the planar surface 7004*a* is not moving.

FIG. 70B illustrates that the client device displays the planar surface 7004*b* with a second texture in connection with moving the selected object 7002*b* to the second position. Specifically, in response to determining that the planar surface 7004*b* is moving (e.g., in response to moving the selected object 7002*b* from the first position to the second position), the client device displays the planar surface 7004*b* with the second texture. In one or more embodiments, the second texture includes a texture with contours, bumps, or other fine-grain details that assist in illustrating movement of the planar surface 7004*b* within the three-dimensional scene 7000*b*. In some embodiments, the scene-based image editing system 106 also modifies a transparency (or other visual characteristic) of the planar surface 7004*b* in response to moving the planar surface 7004*b*.

In one or more additional embodiments, the scene-based image editing system 106 moves the planar surface 7004*b* along a surface within the three-dimensional scene 7000*b*. In particular, the scene-based image editing system 106 determines that the selected object 7002*b* moves in a direction along one or more planar axes (e.g., parallel to the planar surface 7004*b*) beyond a surface of an additional object. For example, as the planar surface 7004*b* moves beyond a surface of a table, the scene-based image editing system 106 automatically moves the planar surface 7004*b* to an additional surface (e.g., the floor surface) in the three-dimensional scene 7000*b*. To illustrate, the scene-based image editing system 106 moves the planar surface 7004*b* along one or more additional surfaces in embodiments in which the planar surface 7004*b* and the selected object 7002*b* are separated within the three-dimensional scene 7000*b*.

FIG. 70C illustrates a three-dimensional scene 7000*c* including a plurality of objects including a set of options associated with transforming objects in connection with planar surfaces. Specifically, as illustrated, the client device displays a set of tools for modifying a selected object 7002*c* within the three-dimensional scene 7000*c* and/or relative to a planar surface 7004*c*. For instance, the tools include a translation option 7006 to snap a position of the selected object 7002*c* to a surface of an additional object. To illustrate, in response to a selection of the translation option 7006, the scene-based image editing system 106 determines a nearest surface in a specific direction (e.g., based on a position of the planar surface 7004*c*, a selected direction, or in a vertical direction below the selected object 7002*c*).

The scene-based image editing system 106 snaps the selected object 7002*c* to the nearest surface by translating the selected object to the determined three-dimensional position value corresponding to the nearest surface. For example, the scene-based image editing system 106 determines a new position of the selected object 7002*c* to cause the selected object 7002*c* to be adjacent to, or in contact with, the nearest surface without overlapping the nearest surface by translating the selected object 7002*c* along one or more axes. In some embodiments, the scene-based image editing system 106 snaps the selected object 7002*c* to the planar surface 7004*c* in response to detecting a separation between the selected object 7002*c* and the planar surface 7004*c*.

Figure 71:
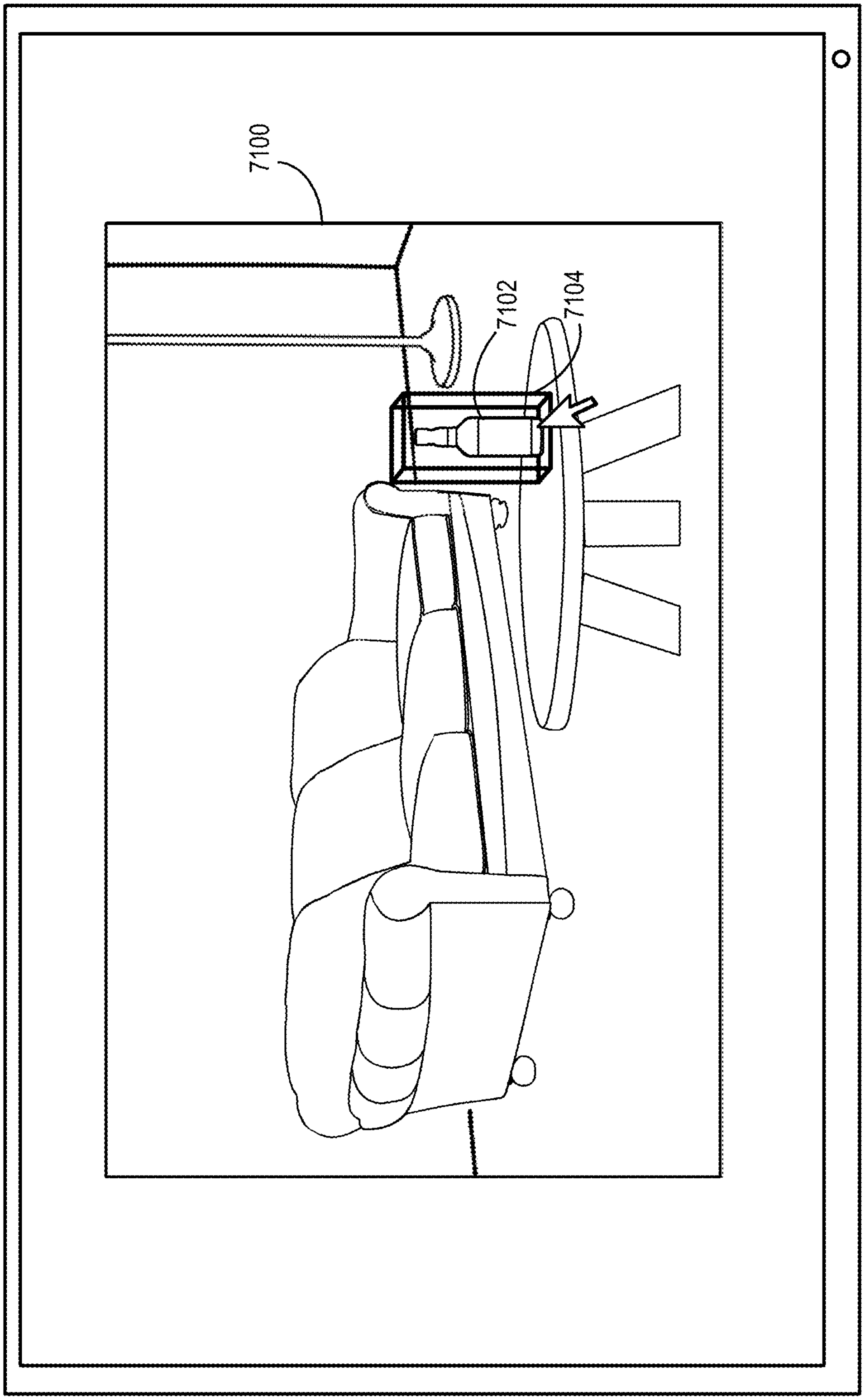
FIG. 71 illustrates a graphical user interface for generating and displaying a three-dimensional bounding box including a planar surface for modifying a selected object within a two-dimensional image in accordance with one or more embodiments.

In one or more embodiments, the scene-based image editing system 106 provides one or more additional types of indicators of a three-dimensional position of an object within a three-dimensional space for display within a two-dimensional editing space. For example, FIG. 71 illustrates a graphical user interface of a client device displaying a three-dimensional scene 7100 including a plurality of objects. As illustrated, in response to determining a selected object 7102 within the three-dimensional scene 7100 (e.g., within a two-dimensional image for which the scene-based image editing system 106 has generated the three-dimensional scene 7100), the scene-based image editing system 106 generates a three-dimensional bounding box 7104. Furthermore, moving the selected object 7102 causes the scene-based image editing system 106 to move the three-dimensional bounding box 7104 with the selected object 7102.

In one or more embodiments, the scene-based image editing system 106 generates the three-dimensional bounding box 7104 including a plurality of three-dimensional coordinates corresponding to corners of the three-dimensional bounding box 7104. The client device displays the three-dimensional bounding box 7104 by converting the three-dimensional coordinates to two-dimensional coordinates in a two-dimensional editing space (e.g., an image space) corresponding to the two-dimensional image. Accordingly, the three-dimensional bounding box 7104 includes a planar surface at the bottom of the selected object and additional (transparent) planes according to the three-dimensional coordinates.

Figure 72:
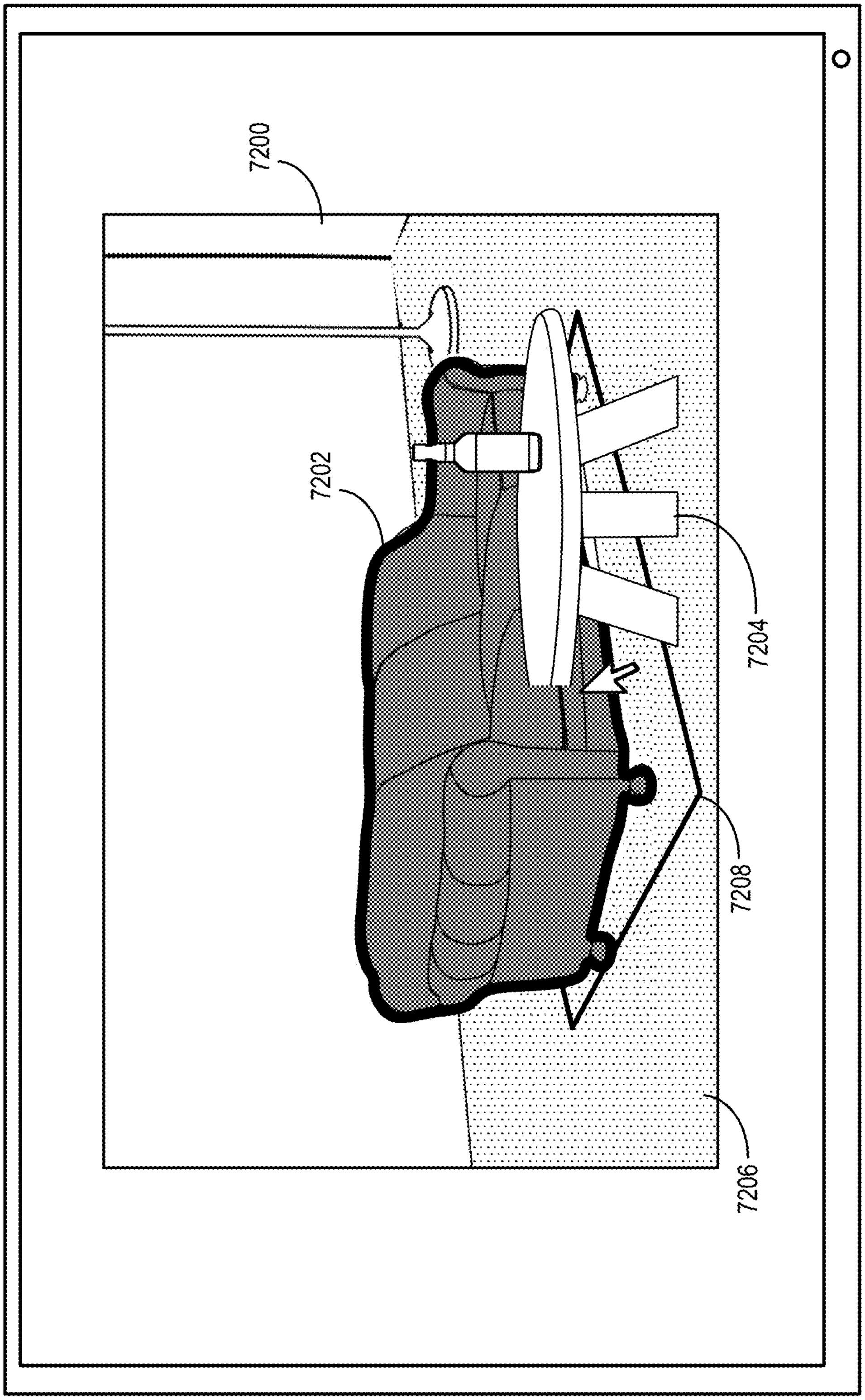
FIG. 72 illustrates a graphical user interface for modifying a visual characteristic of a selected object intersecting an additional object in a scene in accordance with one or more embodiments.

In additional embodiments, the scene-based image editing system 106 provides additional visual indications based on interactions between objects within a three-dimensional scene. FIG. 72 illustrates a graphical user interface of a client device displaying a three-dimensional scene 7200 including at least a first object 7202 and a second object 7204. In particular, in response to a selection of the first object 7202 and an input to move the first object 7202 in a direction toward the second object 7204, the scene-based image editing system 106 determines that the first object 7202 intersects with the second object 7204. In response to the first object 7202 intersecting with the second object 7204, the client device displays the first object 7202 with a modified texture or color to indicate an invalid position for the first object 7202. Accordingly, the scene-based image editing system 106 utilizes the color/texture of the first object 7202 in combination with a planar surface 7206 and/or an object platform 7208 to indicate a position of the first object 7202 within the three-dimensional scene 7200.

In one or more embodiments, the scene-based image editing system 106 provides tools for modifying a focal point of a two-dimensional image according to detected depth values in a corresponding three-dimensional scene. Specifically, the scene-based image editing system 106 generates and utilizes a three-dimensional scene of a two-dimensional scene to estimate depths values of content of the two-dimensional scene. Furthermore, the scene-based image editing system 106 provides interface tools for indicating depth values for modifying or setting a focal point of a camera associated with the two-dimensional image to modify blurring values of portions of the two-dimensional image. In some instances, the scene-based image editing system 106 also provides tools for selecting portions of a two-dimensional image according to estimated depth values—e.g., in connection with focusing and/or blurring portions of the two-dimensional image. In additional embodiments, the scene-based image editing system 106 utilizes the estimated depth values of a two-dimensional image corresponding to an input element to apply other localized image modifications, such as color changes, lighting changes, or other transformations to specific content of the two-dimensional image (e.g., to one or more objects or one or more portions of one or more objects).

Figure 73:
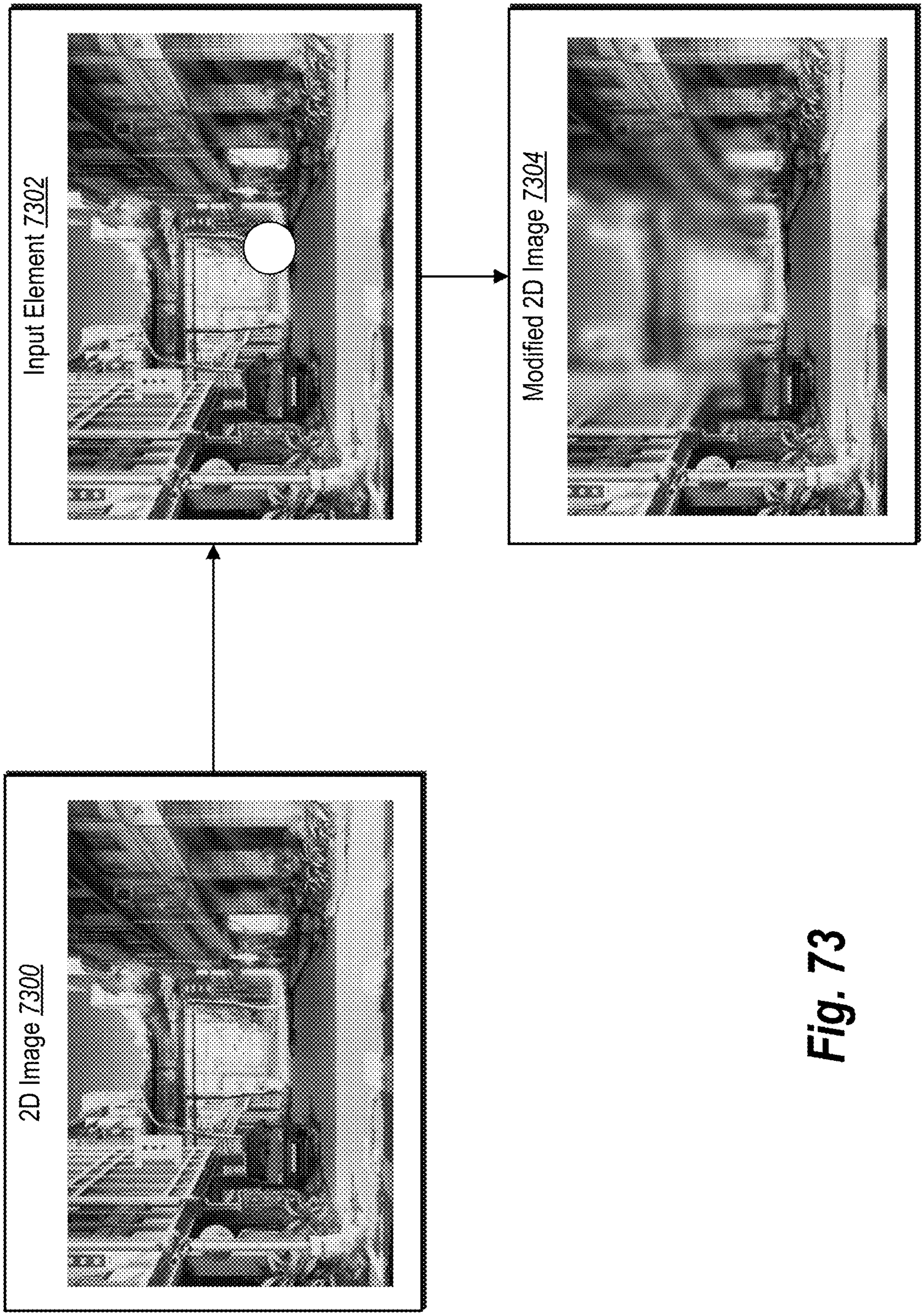
FIG. 73 illustrates an overview diagram of the scene-based image editing system modifying a blur of a two-dimensional image based on a position of an input element in accordance with one or more embodiments.

FIG. 73 illustrates an overview diagram of the scene-based image editing system 106 modifying blurring in one or more portions of a two-dimensional image based on a corresponding three-dimensional representation. Specifically, FIG. 73 illustrates that the scene-based image editing system provides tools for interacting with the two-dimensional image via a graphical user interface element to indicate a focal point for the two-dimensional image. The scene-based image editing system 106 utilizes the three-dimensional representation of the two-dimensional image to determine the focal point and apply an image blur based on the focal point.

In one or more embodiments, the scene-based image editing system 106 determines a two-dimensional image 7300 including a two-dimensional scene with one or more objects. For example, the two-dimensional scene includes one or more foreground objects and one or more background objects. To illustrate, the two-dimensional image 7300 of FIG. 73 includes a scene of a plurality of buildings along a street from a particular perspective. In alternative embodiments, the two-dimensional image 7300 includes a different scene of other types of objects, including a portrait, a panorama, synthetic image content, etc.

In additional embodiments, the scene-based image editing system 106 provides tools for selecting a new focal point in the two-dimensional image 7300. In particular, the scene-based image editing system 106 provides a tool for indicating a position of an input element 7302 within the two-dimensional image 7300. For instance, the scene-based image editing system 106 determines the input element 7302 within the two-dimensional image 7300 according to a position of a cursor input or touch input within the two-dimensional image 7300. Alternatively, the scene-based image editing system 106 determines the input element 7302 within the two-dimensional image 7300 according to a position of a three-dimensional object inserted into a three-dimensional representation of the two-dimensional image 7300 based on a user input.

In response to determining a position of an input element 7302, the scene-based image editing system 106 determines a focal point for the two-dimensional image 7300. As illustrated in FIG. 73, the scene-based image editing system 106 generates a modified two-dimensional image 7304 by blurring one or more portions of the two-dimensional image 7300. For example, the scene-based image editing system 106 determines the focal point based on a three-dimensional position of the input element 7302 and blurs one or more portions according to differences in depth of the one or more portions relative to the focal point.

By utilizing an input element to determine a focal point of a two-dimensional image, the scene-based image editing system 106 provides customizable focus modification of two-dimensional images. In particular, the scene-based image editing system 102 provides an improved graphical user interface for interacting with two-dimensional images for modifying focal points after capturing the two-dimensional images. In contrast to conventional systems that provide options for determining focal points of images when capturing the images (e.g., via focusing of camera lenses), the scene-based image editing system 106 provides focus customization via three-dimensional understanding of two-dimensional scenes. Thus, the scene-based image editing system 106 provides tools for editing an image blur for any two-dimensional images via three-dimensional representations of the two-dimensional images.

Furthermore, by leveraging three-dimensional representations of two-dimensional images to modify a focus of a two-dimensional image, the scene-based image editing system 106 also provides improved accuracy over conventional systems. In contrast to conventional systems that apply blur filters in an image space based on selection of portions of a two-dimensional image, the scene-based image editing system 106 utilizes the three-dimensional representation of a two-dimensional image to determine a three-dimensional position in a three-dimensional space. Accordingly, the scene-based image editing system 106 utilizes the three-dimensional position to provide more accurate blurring of portions of the two-dimensional image based on three-dimensional depths of the portions of the two-dimensional image relative to a focus point.

Figure 74A:
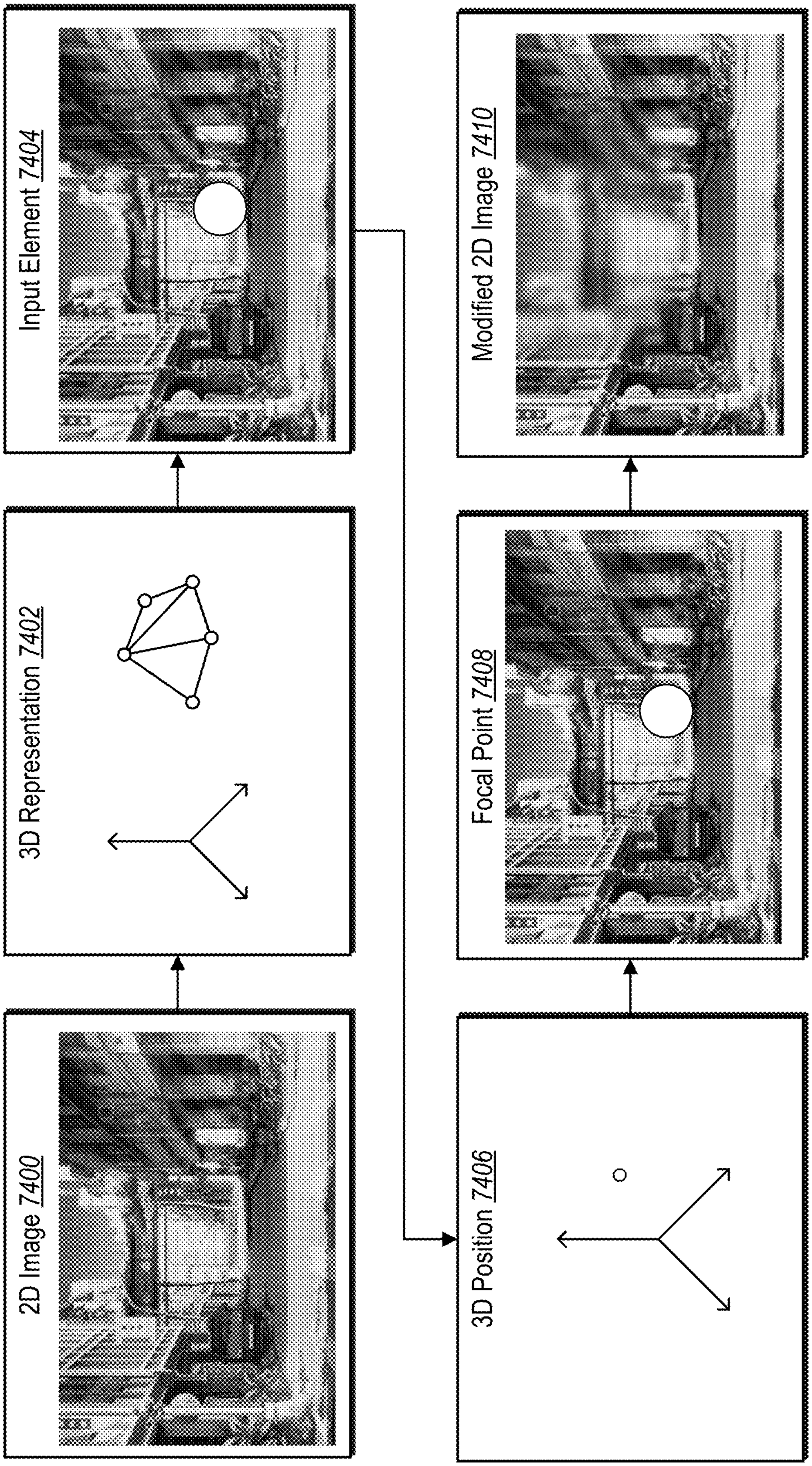
FIG. 74A illustrates a diagram of the scene-based image editing system utilizing a three-dimensional representation with an input element to modify a focal point for applying a blur to portions of a two-dimensional image in accordance with one or more embodiments.
Figure 74B:
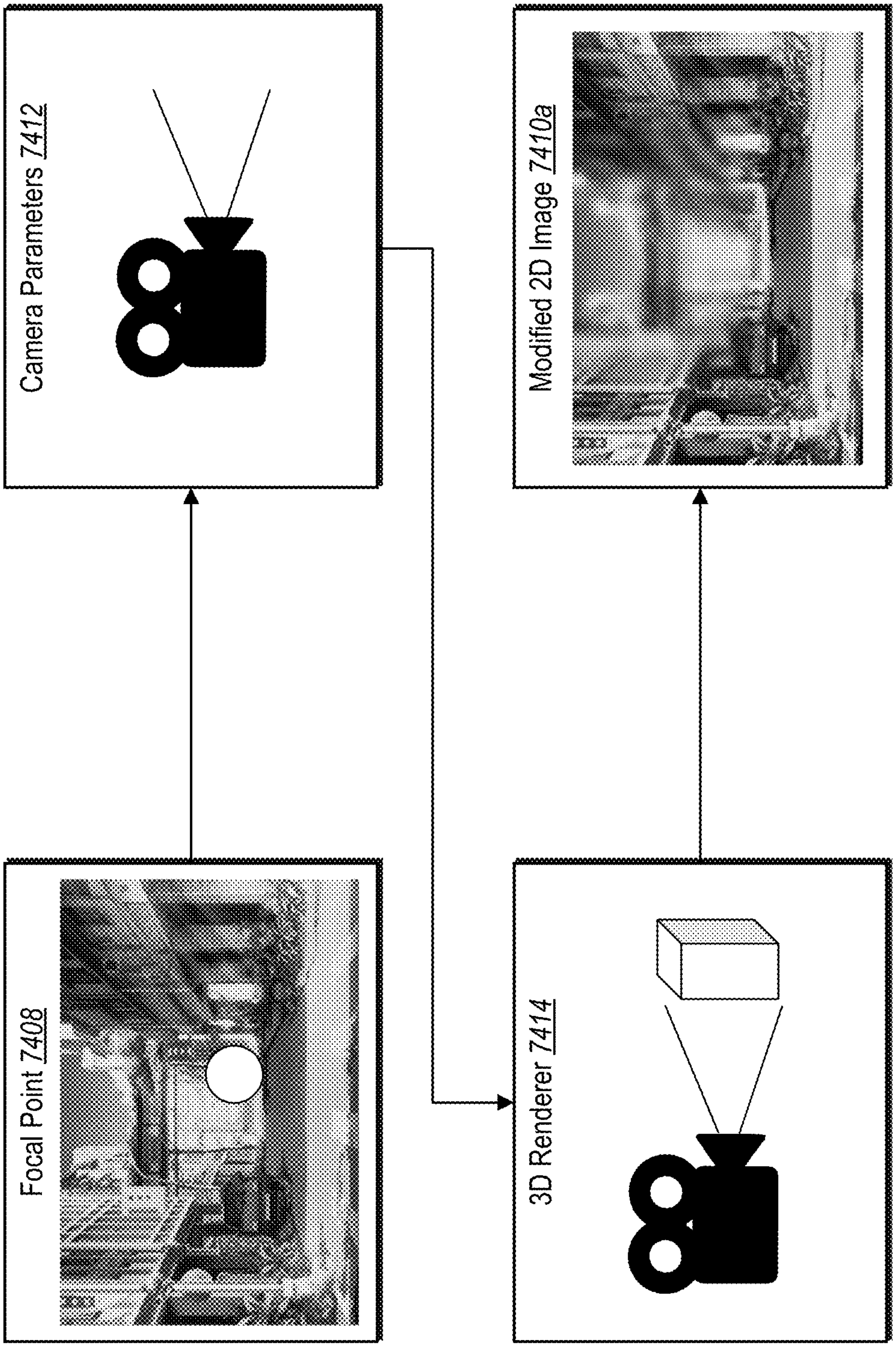
FIG. 74B illustrates a diagram of the scene-based image editing system modifying camera parameters for modifying blur of a two-dimensional image via a three-dimensional renderer in accordance with one or more embodiments.
Figure 74C:
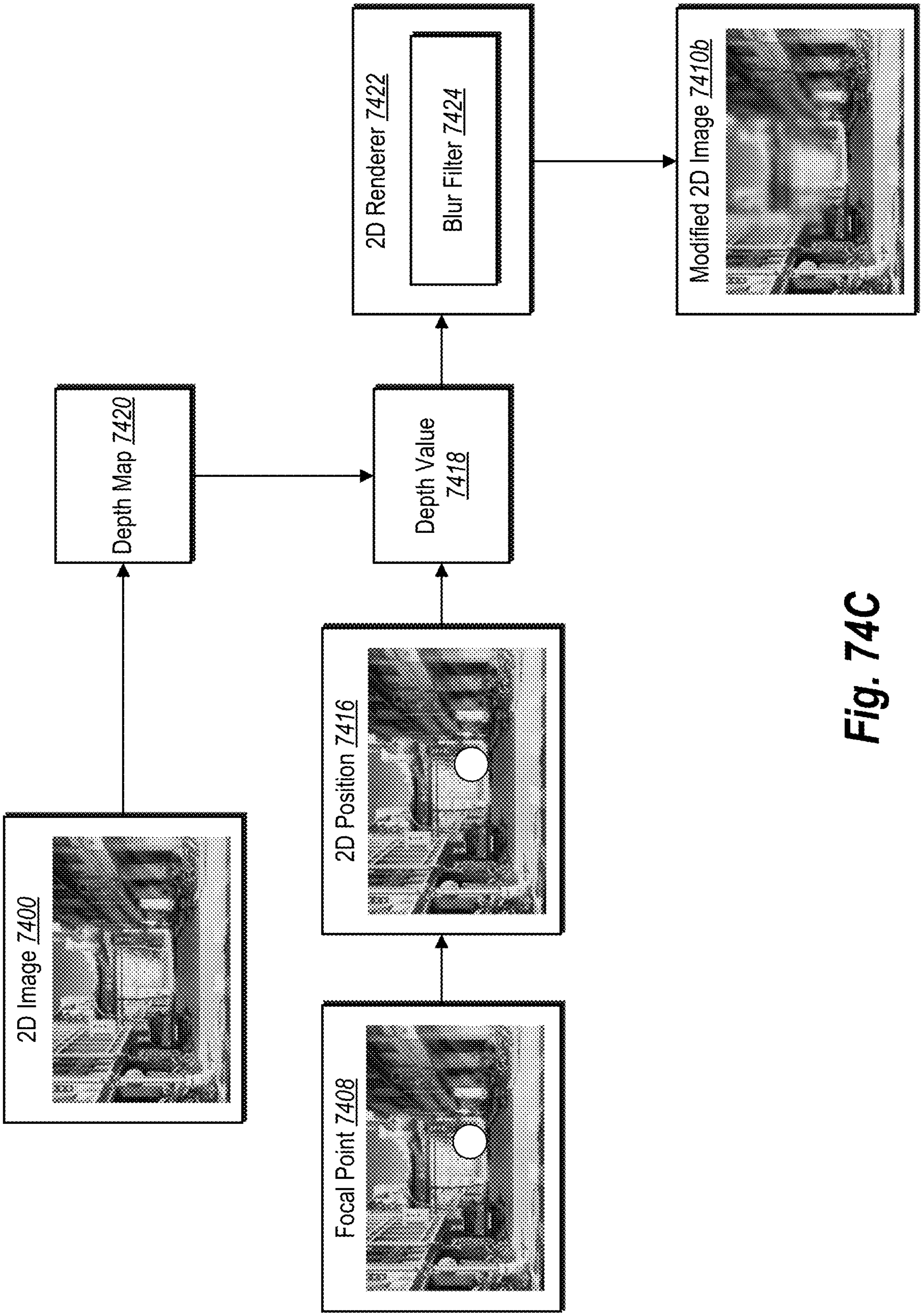
FIG. 74C illustrates a diagram of the scene-based image editing system modifying blur of a two-dimensional image according to depth values in a depth map via a two-dimensional renderer in accordance with one or more embodiments.

FIGS. 74A-74C illustrate diagrams of the scene-based image editing system 106 modifying a two-dimensional image via graphical user interface tools customizing a focal point for the two-dimensional image. Specifically, FIG. 74A illustrates the scene-based image editing system 106 generating a partially blurred two-dimensional image in response to modifying a focal point for the two-dimensional image based on an input element. FIG. 74B illustrates the scene-based image editing system 106 modifying a two-dimensional image according to a customized focus via three-dimensional rendering. FIG. 74C illustrates the scene-based image editing system 106 modifying a two-dimensional image according to a customized focus via two-dimensional rendering.

As mentioned, FIG. 74A illustrates the scene-based image editing system 106 modifying a two-dimensional image 7400 according to a customized focal point. In one or more embodiments, the scene-based image editing system 106 generates a three-dimensional representation 7402 of the two-dimensional image 7400. For instance, the scene-based image editing system 106 utilizes one or more neural networks to generate the three-dimensional representation 7402. To illustrate, the scene-based image editing system 106 utilizes the neural networks to estimate depth values of the two-dimensional image 7400. In some embodiments, the scene-based image editing system 106 generates the three-dimensional representation 7402 by generating one or more three-dimensional meshes corresponding to one or more objects in the two-dimensional image 7400 according to the estimated depth values.

According to one or more embodiments, the scene-based image editing system 106 determines an input element 7404 in connection with the two-dimensional image 7400 and the three-dimensional representation 7402. Specifically, the scene-based image editing system 106 determines the input element 7404 based on a user input via a graphical user interface (e.g., via a mouse/touch input) and/or based on a three-dimensional representation of the user input. More specifically, the scene-based image editing system 106 determines the input element relative to the three-dimensional representation 7402.

To illustrate, the scene-based image editing system 106 determines a two-dimensional position or movement of a user input relative to an image space of the two-dimensional image 7400. In particular, the scene-based image editing system 106 detects an input (e.g., via a graphical user interface) to indicate a specific point in the image space of the two-dimensional image 7400. The scene-based image editing system 106 determines the input element 7404 at the indicated point in the image space relative to the three-dimensional space of the three-dimensional representation 7402. Alternatively, the scene-based image editing system 106 detects an input to move the input element 7404 within the three-dimensional representation 7402 in a direction corresponding to the input.

In one or more embodiments, the scene-based image editing system 106 determines the input element 7404 by generating a three-dimensional object within a three-dimensional space including the three-dimensional representation 7402. Specifically, the scene-based image editing system 106 generates a three-dimensional object within the three-dimensional space in connection with a focal point of the two-dimensional image 7400. For example, the scene-based image editing system 106 generates the three-dimensional object (e.g., an orb, a cube, a plane, a point) in the three-dimensional representation 7402 in response to an initial input or request to set or modify a focal point of the two-dimensional image 7400. In additional embodiments, the scene-based image editing system 106 modifies a position of the three-dimensional object in the three-dimensional representation 7402 based on a position of the input element 7404.

In some embodiments, the scene-based image editing system 106 determines a three-dimensional position 7406 based on the input element 7404. In particular, the scene-based image editing system 106 determines a three-dimensional coordinate corresponding to the position of the input element 7404 relative to the three-dimensional representation 7402. For instance, the scene-based image editing system 106 determines the three-dimensional position 7406 based on a center point of a three-dimensional object corresponding to the input element 7404 within the three-dimensional representation 7402. In additional embodiments, the scene-based image editing system 106 determines the three-dimensional position 7406 based on a projection of a two-dimensional coordinate of the input element 7404 (e.g., corresponding to a cursor or other input via a graphical user interface) to the three-dimensional space of the three-dimensional representation 7402.

As illustrated in FIG. 74A, in response to determining the three-dimensional position 7406 corresponding to the input element 7404, the scene-based image editing system 106 determines a focal point 7408 for the two-dimensional image 7400. Specifically, the scene-based image editing system 106 determines the focal point 7408 within the three-dimensional space of the three-dimensional representation 7402 based on the three-dimensional position 7406. For example, the scene-based image editing system 106 determines the focal point 7408 based on the three-dimensional position 7406 and a camera position of a camera corresponding to the two-dimensional image 7400. To illustrate, the scene-based image editing system 106 utilizes a distance between the three-dimensional position 7406 and the camera position to determine the focal point 7408 for the camera.

In one or more embodiments, the scene-based image editing system 106 generates a modified two-dimensional image 7410 based on the focal point 7408. In particular, the scene-based image editing system 106 generates the modified two-dimensional image 7410 by blurring one or more portions of the two-dimensional image 7400 according to the focal point 7408. For instance, the scene-based image editing system 106 blurs portions of the two-dimensional image 7400 based on depth distances between the focal point 7408 and the portions according to the camera position of the two-dimensional image 7400. Additionally, in some embodiments, the scene-based image editing system 106 utilizes one or more blur preferences to determine blur strength, blur distance, etc., for generating the modified two-dimensional image 7410.

As mentioned, in some embodiments, the scene-based image editing system 106 determines movement of the input element 7404 within the three-dimensional space of the three-dimensional representation 7402. For example, the scene-based image editing system 106 detects movement of the input element 7404 from a first position to a second position relative to the three-dimensional representation 7402. Accordingly, the scene-based image editing system 106 detects the movement from the first position to the second position and updates the focal point 7408 from the first position to the second position. The scene-based image editing system 106 generates an updated modified two-dimensional image based on the new focal point.

In additional embodiments, the scene-based image editing system 106 continuously updates a graphical user interface to display continuously modified two-dimensional images in response to a range of movement of the input element 7404. Specifically, the scene-based image editing system 106 determines movement of the focal point 7408 based on the range of movement of the input element 7404. The scene-based image editing system 106 further generates a plurality of different modified two-dimensional images with different blurring based on the moving focal point. In some embodiments, the scene-based image editing system 106 generates an animation blurring different portions of the two-dimensional image based on the range of movement of the input element 7404 and the focal point 7408.

FIG. 74B illustrates the scene-based image editing system 106 utilizing a customized focus to modify a blur of a two-dimensional image via three-dimensional rendering of a scene. In one or more embodiments, as described above, the scene-based image editing system 106 determines the focal point 7408 of the two-dimensional image 7400 of FIG. 74A based on an input element relative to a three-dimensional representation. For example, the scene-based image editing system 106 determines the focal point 7408 for use in configuring a camera within a three-dimensional space including the three-dimensional representation.

According to one or more embodiments, the scene-based image editing system 106 utilizes the focal point 7408 to determine camera parameters 7412 of the camera. In particular, the scene-based image editing system 106 sets a focal length of the camera according to the indicated focal point 7408. To illustrate, the scene-based image editing system 106 determines the focal length based on a distance between the camera and the three-dimensional position of the focal point in three-dimensional space. In additional embodiments, the scene-based image editing system 106 determines additional camera parameters in connection with the focal point 7408 such as, but not limited to, a field-of-view, a camera angle, or a lens radius.

Furthermore, in one or more embodiments, the scene-based image editing system 106 utilizes a three-dimensional renderer 7414 to generate a modified two-dimensional image 7410*a*. Specifically, the scene-based image editing system 106 utilizes the three-dimensional renderer 7414 with the camera parameters 7412 to render the modified two-dimensional image 7410*a* according to the three-dimensional representation of the scene of the two-dimensional image 7400 of FIG. 74A. For example, the scene-based image editing system 106 utilizes the three-dimensional renderer 7414 to utilize ray-tracing or other three-dimensional rendering process to render a two-dimensional image from the three-dimensional representation.

By modifying the camera parameters 7412 based on the focal point 7408 for use by the three-dimensional renderer 7414, the scene-based image editing system 106 generates the modified two-dimensional image 7410*a* to include realistic focus blur. To illustrate, the three-dimensional renderer 7414 utilizes the differences in depth values of portions of the three-dimensional representation to determine blurring of portions of the modified two-dimensional image 7410*a* in connection with the camera parameters 7412. Accordingly, in response to a modification of the focal point 7408, the scene-based image editing system 106 updates the camera parameters 7412 and re-renders a two-dimensional image with updated focus blur. Utilizing the three-dimensional renderer 7414 allows the scene-based image editing system 106 to provide smooth/continuous blurring of portions of a scene of a two-dimensional image in connection with changes to a focal point relative to a three-dimensional representation of the two-dimensional image.

In additional embodiments, the scene-based image editing system 106 utilizes two-dimensional rendering processes to generate modified two-dimensional images with customized focus. For example, FIG. 74C illustrates the scene-based image editing system 106 blurring a two-dimensional image via a customized focal point and estimated depth values of content in the two-dimensional image. In one or more embodiments, the scene-based image editing system 106 utilizes the two-dimensional rendering process to modify blur values of portions of a two-dimensional image according to a three-dimensional understanding of the two-dimensional image.

According to one or more embodiments, the scene-based image editing system 106 utilizes the focal point 7408 of the two-dimensional image 7400 to determine a two-dimensional position 7416 in an image space of the two-dimensional image 7400. Specifically, the scene-based image editing system 106 utilizes a three-dimensional position of the focal point 7408 within a three-dimensional representation of the two-dimensional image 7400 to determine the two-dimensional position 7416. For instance, the scene-based image editing system 106 utilizes a mapping between the three-dimensional space and the image space (e.g., a UV mapping or other projection mapping) to determine the two-dimensional position.

As illustrated in FIG. 74C, the scene-based image editing system 106 also determines a depth value 7418 corresponding to the two-dimensional position 7416 of the focal point 7408. In one or more embodiments, the scene-based image editing system 106 determines the depth value 7418 from a depth map 7420 of the two-dimensional image 7400. In particular, the scene-based image editing system 106 generates the depth map 7420 in connection with generating a three-dimensional representation of the two-dimensional image 7400. To illustrate, the scene-based image editing system 106 generates a depth value for each pixel in the two-dimensional image 7400 according to detected positions of one or more objects in the two-dimensional image 7400 and stores the depth values of all pixels within the depth map 7420 (e.g., in a matrix or a vector). The scene-based image editing system 106 extracts the depth value 7418 from the depth map 7420 for a pixel corresponding to the two-dimensional position 7416.

According to one or more embodiments, the scene-based image editing system 106 utilizes the depth value 7418 corresponding to the focal point 7408 to determine blurring in the two-dimensional image 7400. As illustrated in FIG. 74C, the scene-based image editing system 106 utilizes a two-dimensional renderer 7422 to apply a blur filter 7424 based on the focal point 7408. For example, the scene-based image editing system 106 determines the blur filter 7424 based on depth values in the depth map 7420 and the depth value 7418 of the focal point 7408. To illustrate, the scene-based image editing system 106 determines blur values for a plurality of pixels in the two-dimensional image 7400 based on differences in the depth values of the pixels relative to the depth value 7418 of the focal point 7408. As an example, the scene-based image editing system 106 determines the blur filter 7424 according to various camera parameters indicating strength of blur, blur distance, etc., and applies the blur filter 7424 to pixels in the two-dimensional image 7400 according to the depth distances to generate the modified two-dimensional image 7410*b*.

In one or more embodiments, the scene-based image editing system 106 further updates the modified two-dimensional image 7410*b* in response to modifying the focal point 7408. To illustrate, in response to modifying the focal point 7408 from the two-dimensional position 7416 to an additional two-dimensional position, the scene-based image editing system 106 utilizes the two-dimensional image 7400 to generate an additional modified two-dimensional image. Specifically, the scene-based image editing system 106 determines the additional two-dimensional position based on a new three-dimensional position of the focal point 7408 within the three-dimensional space including the three-dimensional representation of the two-dimensional image 7400. For instance, the scene-based image editing system 106 determines an updated blur filter based on the depth map 7420 and a depth value of a pixel corresponding to the updated focal point. The scene-based image editing system 106 utilizes the two-dimensional renderer 7422 to generate the updated two-dimensional image utilizing the updated blur filter.

Figure 75A:
FIGS. 75A-75E illustrate graphical user interfaces for modifying a focal point of a two-dimensional image via an input element in accordance with one or more embodiments.

FIGS. 75A-75E illustrate graphical user interfaces of a client device for customizing a focal point in a two-dimensional image. In particular, as illustrated in FIG. 75A, the client device displays a two-dimensional image 7500 for editing within a client application. For example, the client application includes an image editing application for editing digital images via a variety of editing operations. To illustrate, the client device provides tools for editing two-dimensional images via three-dimensional representations of the two-dimensional images (e.g., three-dimensional meshes generated for the two-dimensional images).

In one or more embodiments, the client device displays the two-dimensional image 7500 for modifying a focal point for the two-dimensional image 7500. For example, the scene-based image editing system 106 determines an intent to set or move a focal point associated with the two-dimensional image 7500. To illustrate, the client device detects an input to indicate a position of a focal point in connection with a selected tool within the client application. Alternatively, the client device automatically infers the intent to indicate a position of a focal point based on contextual information within the client application, such as a user interaction with a portion of the two-dimensional image 7500 within the graphical user interface.

Figure 75B:
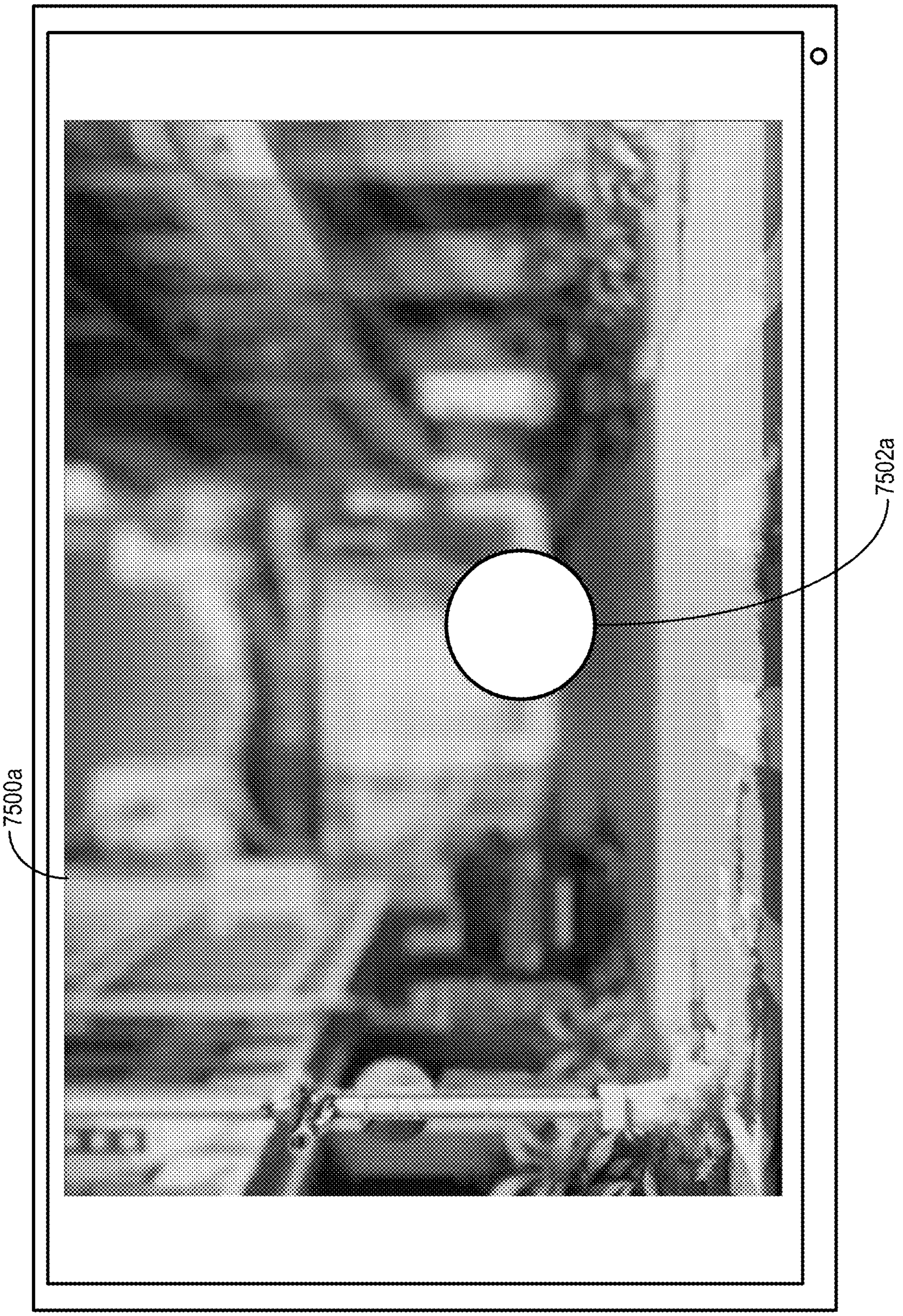

In connection with determining a focal point for the two-dimensional image 7500, in at least some embodiments, the scene-based image editing system 106 determines an input element via the graphical user interface. Specifically, as mentioned previously, the scene-based image editing system 106 determines the input element according to a position of an input via the graphical user interface relative to the two-dimensional image 7500. FIG. 75B illustrates a graphical user interface of a modified two-dimensional image 7500*a* corresponding to a position of an input element 7502*a*. For example, as illustrated, the client device displays the input element 7502*a* at a position within the modified two-dimensional image 7500*a* corresponding to a three-dimensional position in a three-dimensional space corresponding to a three-dimensional representation of the modified two-dimensional image 7500*a*. To illustrate, the client device detects one or more inputs indicating the position of the input element 7502*a* within the three-dimensional space.

According to one or more embodiments, the scene-based image editing system 106 generates a three-dimensional object corresponding to (or otherwise representing) the input element 7502*a* within the three-dimensional space. In particular, as illustrated, the scene-based image editing system 106 generates an orb of a predetermined size and inserts the orb into the three-dimensional space including the three-dimensional position at a specific location. For instance, the scene-based image editing system 106 inserts the orb into the three-dimensional space at a default location or at a selected location in connection with setting a focal point for the modified two-dimensional image 7500*a*. Additionally, the scene-based image editing system 106 displays the input element 7502*a* as a two-dimensional representation of the orb based on the position of the orb in the three-dimensional space.

In response to determining a location of the input element 7502*a* (and the corresponding three-dimensional object) within the three-dimensional space, the scene-based image editing system 106 determines the focal point for the modified two-dimensional image 7500*a*. The scene-based image editing system 106 generates one or more portions of the modified two-dimensional image 7500*a* with focus blur according to the location of the input element 7502*a*. More specifically, the client device displays the modified two-dimensional image 7500*a* including the one or more blurred portions within the graphical user interface in connection with the position of the input element 7502*a*.

Although FIG. 75B illustrates that the client device displays the input element 7502*a*, in alternative embodiments, the client device hides the input element 7502*a* from view within the graphical user interface. For example, the scene-based image editing system 106 can hide the input element 7502*a* from obscuring one or more portions of the modified two-dimensional image 7500*a*. Additionally, in some embodiments, the scene-based image editing system 106 displays only a portion of the input element 7502*a*. In some embodiments, the scene-based image editing system 106 displays only a cursor or input location corresponding to an input device for the client device. To illustrate, the scene-based image editing system 106 displays the modified two-dimensional image 7500*a* without displaying the input element 7502*a*.

Figure 75C:
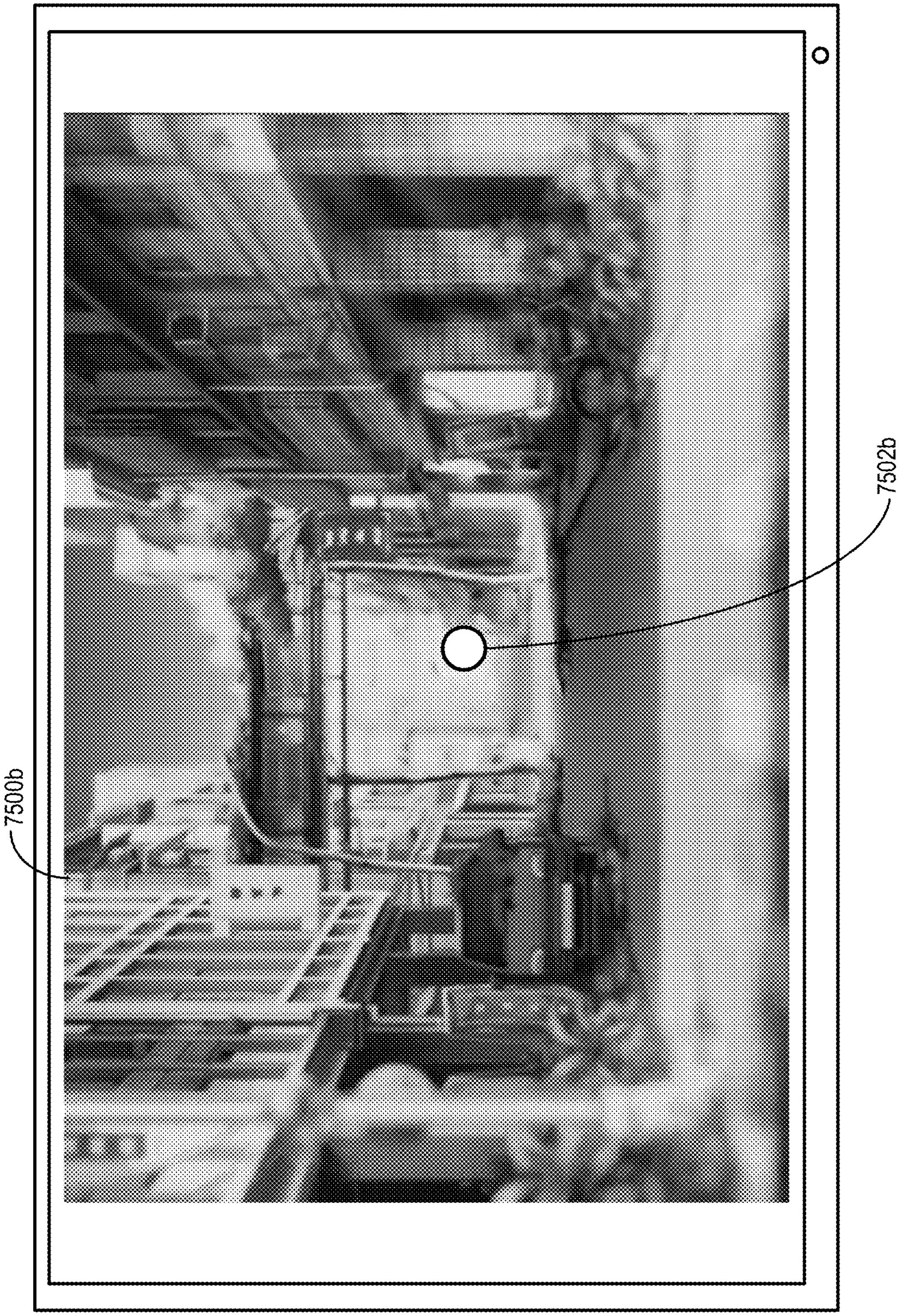

In one or more embodiments, the scene-based image editing system 106 further modifies a two-dimensional image based on a change of position of an input element. FIG. 75C illustrates the client device displaying a modified two-dimensional image 7500*b* based on an updated position of an input element 7502*b*. In particular, the scene-based image editing system 106 modifies a position of the input element 7502*b* in response to a user input moving the input element 7502*b* from a first position to a second position. To illustrate, the scene-based image editing system 106 modifies a position of the input element 7502*a* of FIG. 75B to a position of the input element 7502*b* of FIG. 75C in response to an input via the graphical user interface of the client device.

According to one or more embodiments, as illustrated, the scene-based image editing system 106 modifies blurring of one or more portions of the modified two-dimensional image 7500*b* based on the updated position of the input element 7502*b*. Specifically, the scene-based image editing system 106 determines movement of the input element 7502*b* from a first position to a second position. The scene-based image editing system 106 determines the one or more portions and blurring values of the one or more portions based on the updated position of the input element 7502*b*.

Furthermore, in one or more embodiments, the client device displays blurring transitions between positions of input elements. For instance, as the scene-based image editing system 106 detects movement of an input element from a first position (e.g., the position of the input element 7502*a* of FIG. 75B) to a second position (e.g., the position of the input element 7502*b* of FIG. 75C), the scene-based image editing system generates a plurality of modified two-dimensional images according to the movement. The client device displays each of the modified two-dimensional images within the client application to provide a continuous transition (e.g., animation) of the blurring effects within the scene. In alternative embodiments, the client device updates the displayed two-dimensional image from the first position to the second position without displaying any intermediate transitions. In some embodiments, the client device displays intermediate transitions based on predetermined time or distance thresholds associated with movement of the input element.

Figure 75D:
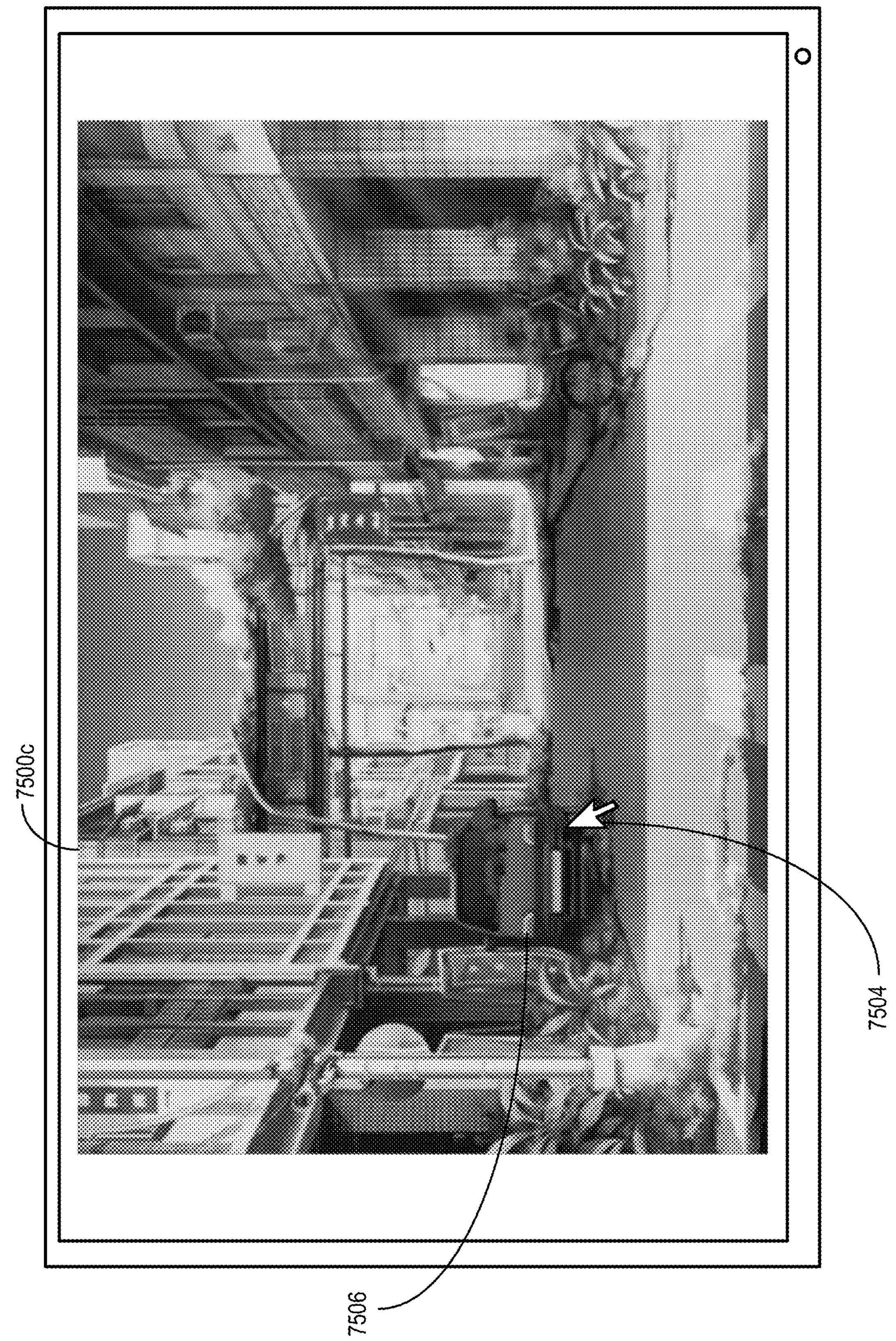

In at least some embodiments, the scene-based image editing system 106 modifies a focus of a two-dimensional image in response to an input element indicating a specific portion of the two-dimensional image. In particular, FIG. 75D illustrates a client device displaying a two-dimensional image 7500*c* with a focal point determined based on an input element 7504 including a cursor. For example, the client device utilizes an input device (e.g., a mouse device, trackpad device, or touchscreen device) that indicates a position of the input element 7504 within a graphical user interface. To illustrate, in response to the input element 7504 indicating a selected object 7506, the scene-based image editing system 106 generates a modified two-dimensional image by determining a focal point based on a position of the selected object 7506.

In one or more embodiments, the scene-based image editing system 106 determines the focal point within a three-dimensional representation of the two-dimensional image 7500*c* based on the position of the input element 7504. Specifically, the scene-based image editing system 106 determines that the position of the input element 7504 corresponds to a point within the three-dimensional representation. For example, the scene-based image editing system 106 determines the focal point based on a vertex of the selected object 7506 corresponding to the position of the input element 7504. Alternatively, the scene-based image editing system 106 determines the focal point based on a center (e.g., a centroid) of a three-dimensional mesh corresponding to the selected object 7506.

Figure 75E:
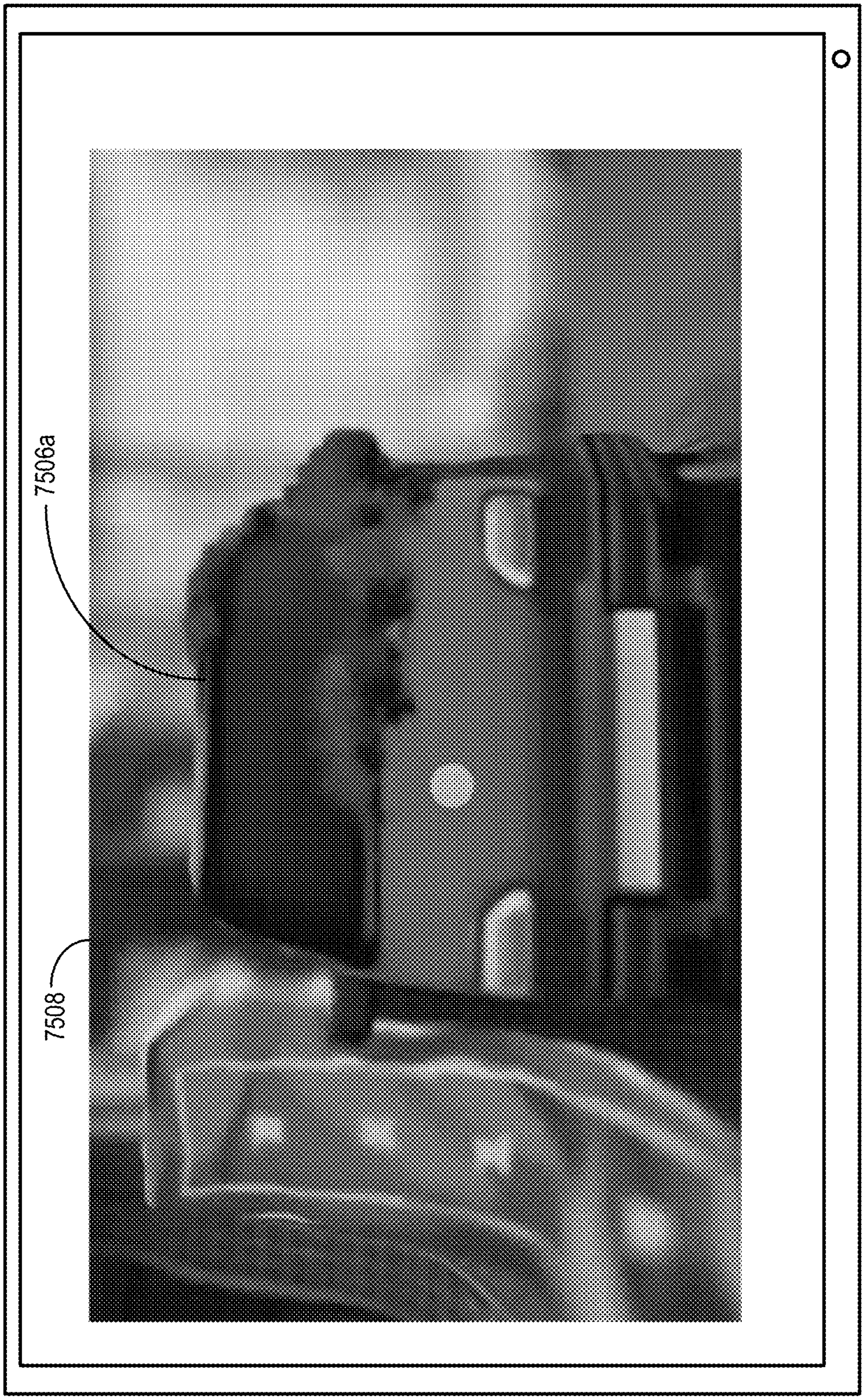

In response to determining the focal point of the two-dimensional image 7500*c* in connection with the selected object 7506, the scene-based image editing system 106 generates a modified two-dimensional image based on the indicated focal point. In one or more embodiments, the scene-based image editing system 106 utilizes the focal point to further modify the two-dimensional image 7500*c*. In particular, the scene-based image editing system 106 modifies the two-dimensional image 7500*c* by zooming in on the selected object 7506. For example, FIG. 75E illustrates the client device displaying a zoomed two-dimensional image 7508 according to a selected object 7506*a*.

More specifically, in response to an indication of the selected object 7506, the scene-based image editing system 106 generates the zoomed two-dimensional image 7508 by modifying the focal point of the two-dimensional image 7500*c* of FIG. 75D and one or more camera parameters. For instance, as illustrated in FIG. 75E, the scene-based image editing system 106 generates the zoomed two-dimensional image 7508 by modifying a camera position from an original position of the two-dimensional image to an updated position corresponding to the selected object 7506*a*. To illustrate, the scene-based image editing system 106 determines a boundary of the selected object 7506*a* and moves the camera position within the three-dimensional space including the three-dimensional representation of the two-dimensional image to zoom in on the selected object 7506*a* while capturing the boundary of the selected object 7506*a*. In some embodiments, the scene-based image editing system 106 determines the camera position based on a predetermined distance from the focal point in the three-dimensional space.

In additional embodiments, the scene-based image editing system 106 further modifies one or more additional parameters of the camera within the three-dimensional space. For example, the scene-based image editing system 106 modifies a field of view, a focal length, or other parameter of the camera based on the updated position of the camera and the focal point. Thus, in one or more embodiments, the scene-based image editing system 106 generates the zoomed two-dimensional image 7508 based on the new focal point and the updated parameters of the camera.

Figure 76A:
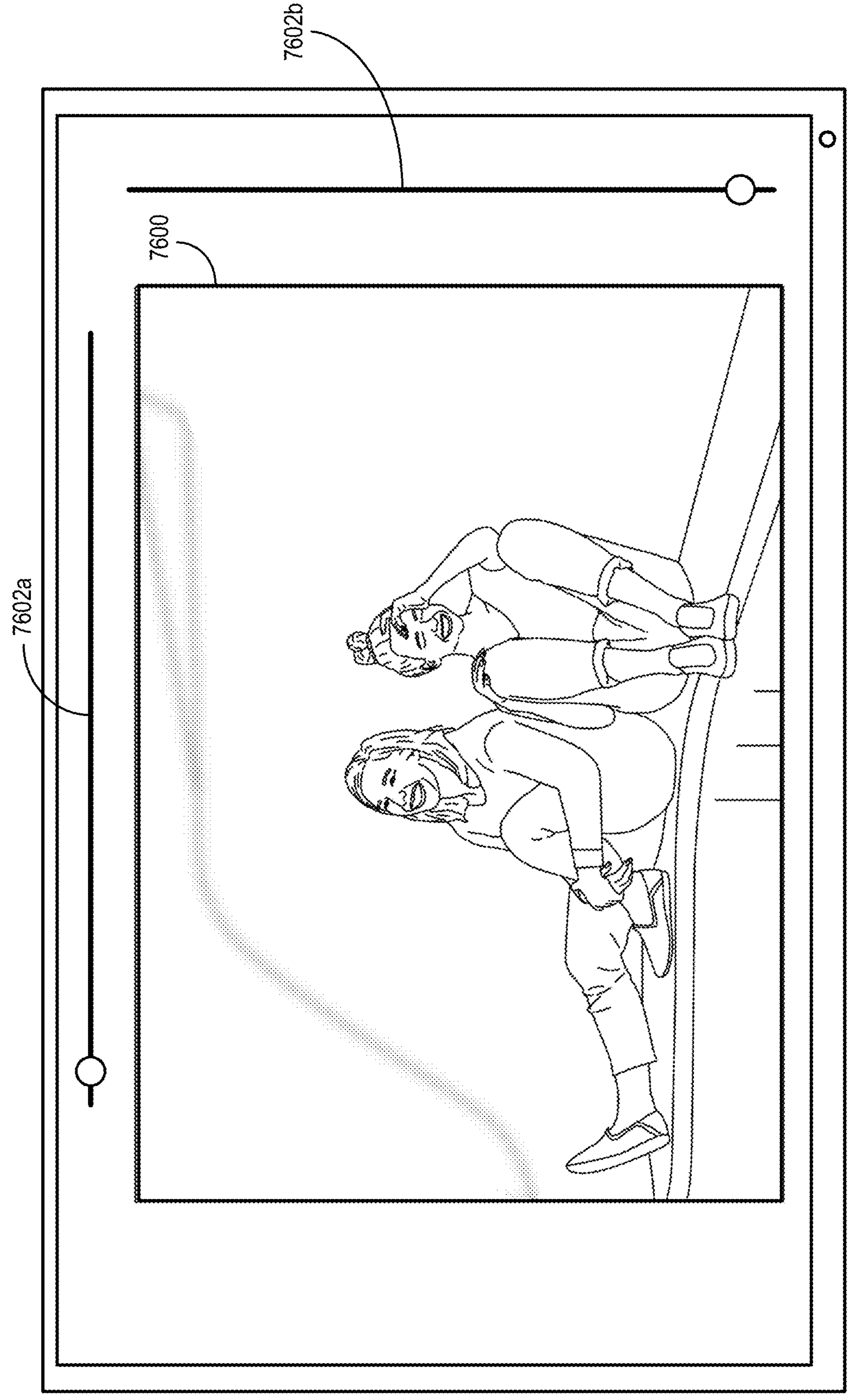
FIGS. 76A-76B illustrate graphical user interfaces for modifying a focal point of a two-dimensional image via various input elements in accordance with one or more embodiments.
Figure 76B:
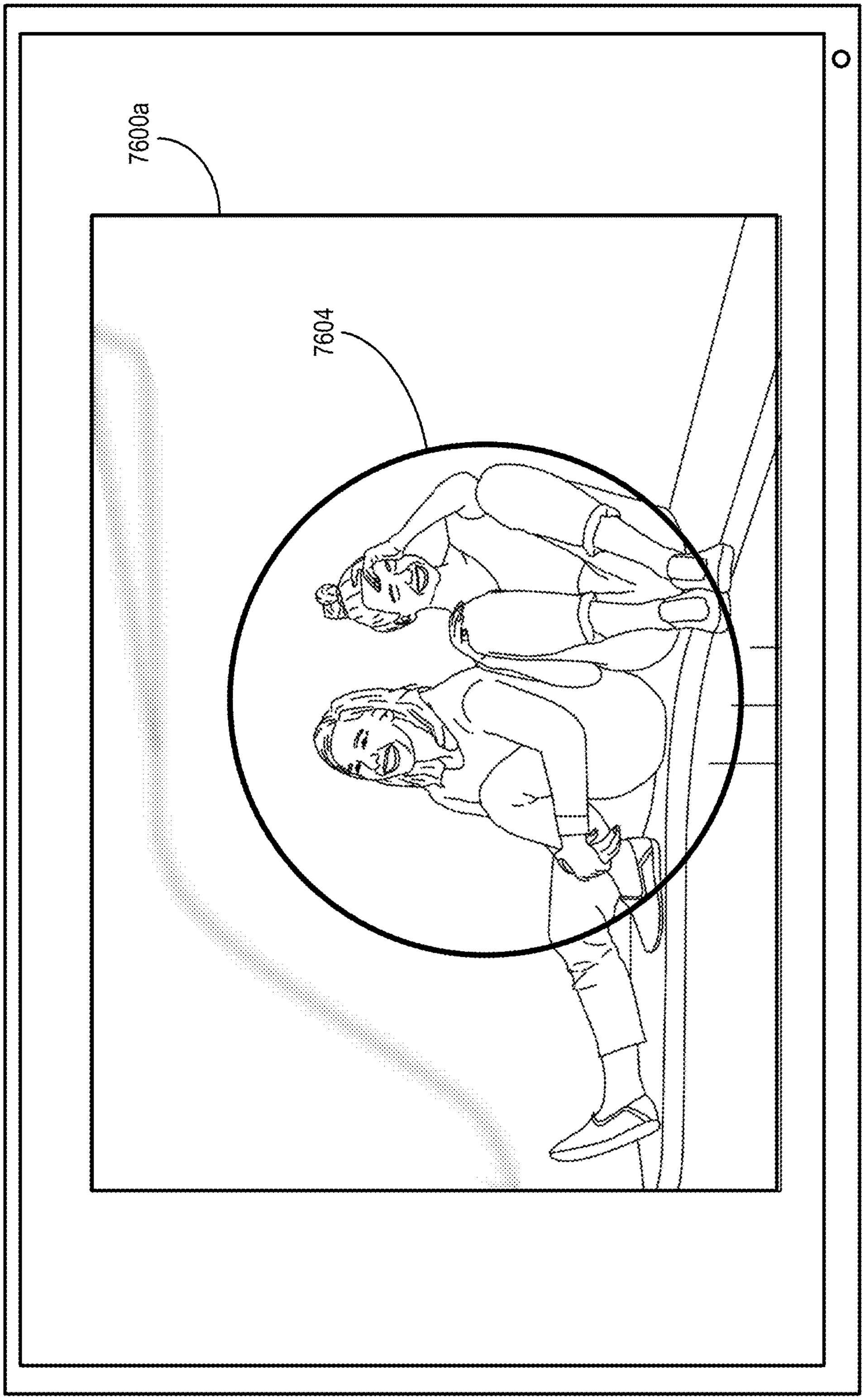

In one or more embodiments, the scene-based image editing system 102 provides a variety of input elements for indicating a focal point for a two-dimensional image. Specifically, FIGS. 76A-76B illustrate graphical user interfaces of client devices for indicating a focal point within a two-dimensional image. For instance, FIG. 76A illustrates a modified two-dimensional image 7600 within a graphical user interface including a plurality of sliders to indicate a focal point for the modified two-dimensional image 7600. To illustrate, a first slider 7602*a* indicates a horizontal position of the focal point and a second slider 7602*b* indicates a vertical position of the focal point. Alternatively, the second slider 7602*b* indicates a depth position of the focal point instead of a vertical position.

FIG. 76B illustrates a modified two-dimensional image 7600*a* within a graphical user interface of a client device including a region selector 7604 to indicate a focal point for the modified two-dimensional image 7600*a*. Specifically, the scene-based image editing system 106 determines a position of the region selector 7604 within the modified two-dimensional image 7600*a* based on a portion of the modified two-dimensional image 7600*a* within the region selector 7604. To illustrate, the scene-based image editing system 106 determines the portion in response to determining that the portion takes up a majority of the area within the region selector 7604. Alternatively, the scene-based image editing system 106 determines the portion in response to the region selector 7604 performing a selection operation that "paints" the portion (e.g., marks pixels corresponding to the portion) within the region selector 7604 according to a depth of the portion. The scene-based image editing system 106 generates the modified two-dimensional image 7600*a* by setting the focal point according to the indicated portion.

Figure 77A:
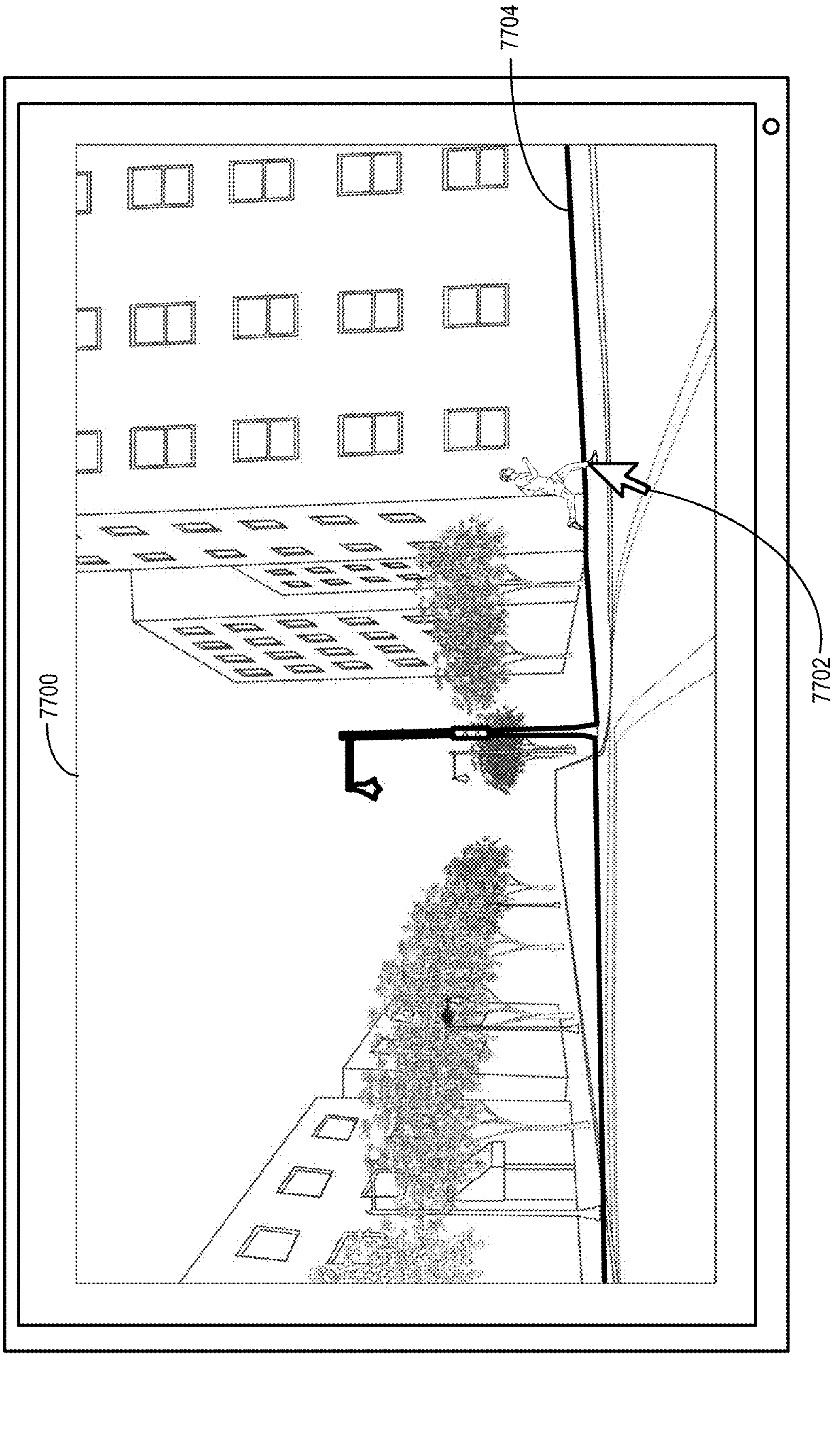
FIGS. 77A-77C illustrate graphical user interfaces for selecting portions of a two-dimensional image according to depth values in accordance with one or more embodiments.
Figure 77B:
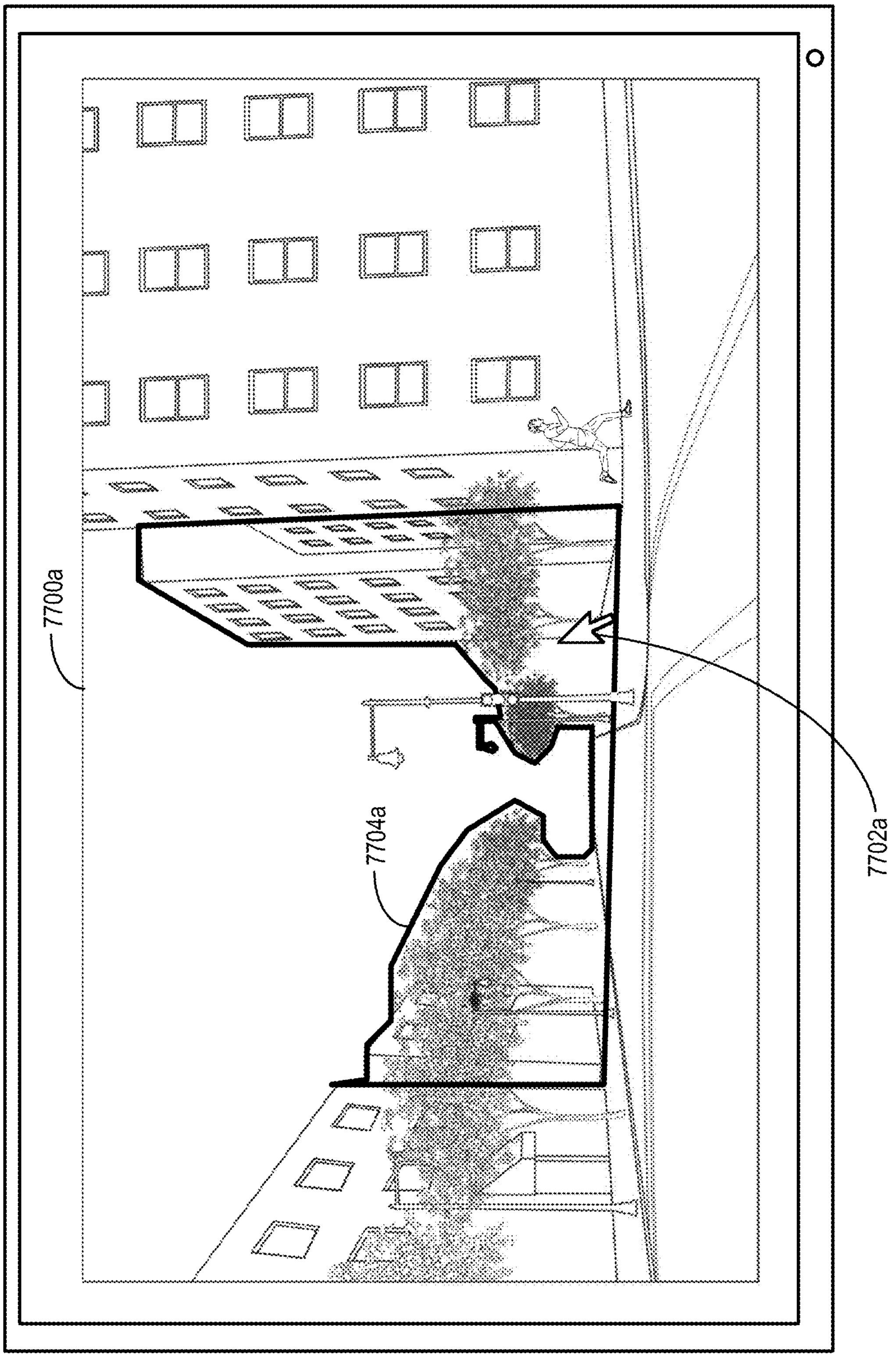
Figure 77C:
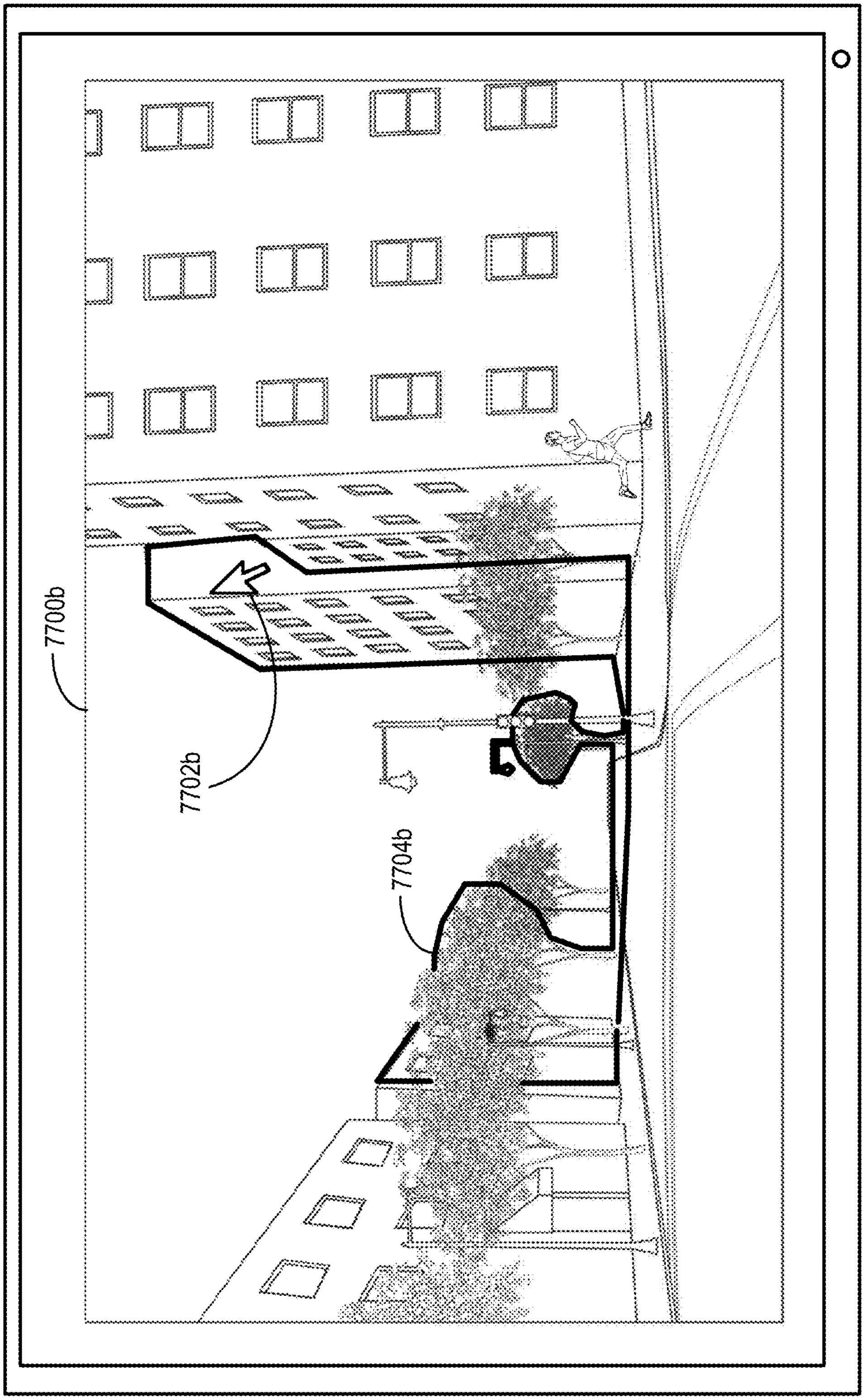

In additional embodiments, the scene-based image editing system 106 provides tools for performing additional operations within a two-dimensional image according to depth information of a three-dimensional representation of the two-dimensional image. For example, in some embodiments, the scene-based image editing system 106 provides tools for selecting a region within a two-dimensional image based on three-dimensional depth values from the three-dimensional representation of the two-dimensional image. FIGS. 77A-77C illustrate graphical user interfaces of a client device for selecting different regions of a two-dimensional image based on three-dimensional depth values and an input element.

FIG. 77A illustrates a graphical user interface for selecting a portion of a two-dimensional image 7700 via a position of an input element 7702 within the graphical user interface. In particular, the scene-based image editing system 106 determines a first portion 7704 of the two-dimensional image 7700 by converting the position of the input element 7702 to a three-dimensional position within a three-dimensional space corresponding to a three-dimensional representation of the two-dimensional image 7700. Additionally, the scene-based image editing system 106 determines the first portion 7704 based on a three-dimensional depth of the three-dimensional position and corresponding three-dimensional depths of one or more other portions of the three-dimensional representation. Thus, as illustrated, the client device displays a selection of the first portion of the two-dimensional image 770 including portions of the three-dimensional representation having similar depth values as the three-dimensional position of the input element 7702.

FIG. 77B illustrates a graphical user interface for selecting a second portion 7704*a* of a two-dimensional image 7700*a*. Specifically, in response to determining that an input element 7702*a* moves to a new position within the graphical user interface, the scene-based image editing system 106 determines an updated three-dimensional position relative to the three-dimensional representation of the two-dimensional image 7700*a*. The scene-based image editing system 106 also determines depth values for one or more portions of the three-dimensional representation similar to the depth value of the updated three-dimensional position of the input element 7702*a*. Accordingly, the client device displays the second portion 7704*a* selected in response to the updated position of the input element 7702*a*. As illustrated, moving the input element 7702*a* to a new position relative to the two-dimensional image 7700*a* changes a selected portion of the two-dimensional image 7700*a* according to the corresponding depth values.

In additional embodiments, the scene-based image editing system 106 provides options for customizing a selection size based on depth of content in a two-dimensional image. For example, the scene-based image editing system 106 provides selectable options indicating a range of depth values for selecting based on an input element. Alternatively, the scene-based image editing system 106 modifies the range of depth values based on one or more additional inputs, such as in response to a pinch or a pinch out motion via a touch-screen input, a scroll input via a mouse input, or other type of input.

In particular, FIG. 77C illustrates a graphical user interface including a two-dimensional image 7700*b* with a third portion 7704*b* selected based on an input element 7702*b*. To illustrate, in response to modifying the range of depth values via a parameter associated with the input element 7702*b*, the scene-based image editing system 106 shrinks or grows a size of the selected region within the two-dimensional image 7700*b*. Thus, as illustrated, the third portion 7704*b* has a smaller selection range of depth values than the second portion 7704*a* of FIG. 77B.

Upon selecting a portion of a digital image, the scene-based image editing system 106 can also modify the digital image. For instance, although not illustrated in FIGS. 77A-77C, the scene-based image editing system can segment, remove, replace, infill, or otherwise modify (e.g., change color, change shading, or resize) a portion of the digital image selected based on the approaches described herein. To illustrate, the scene-based image editing system 106 can apply any localized image modification to a portion of content of a two-dimensional image based on an identified focal point corresponding to a three-dimensional position of an input element. In one or more embodiments, the scene-based image editing system 106 applies an image filter (e.g., a color filter, a lighting filter, or a blur filter) to a portion of a two-dimensional image at a depth corresponding to the input element. In additional embodiments, the scene-based image editing system 106 can modify or transform an object or a portion of an object positioned at a depth corresponding to the input element, such as by resizing or warping the object or portion of the object.

Figure 78A:
FIGS. 78A-78C illustrate graphical user interfaces for selecting objects of a two-dimensional image according to depth values in accordance with one or more embodiments.
Figure 78B:
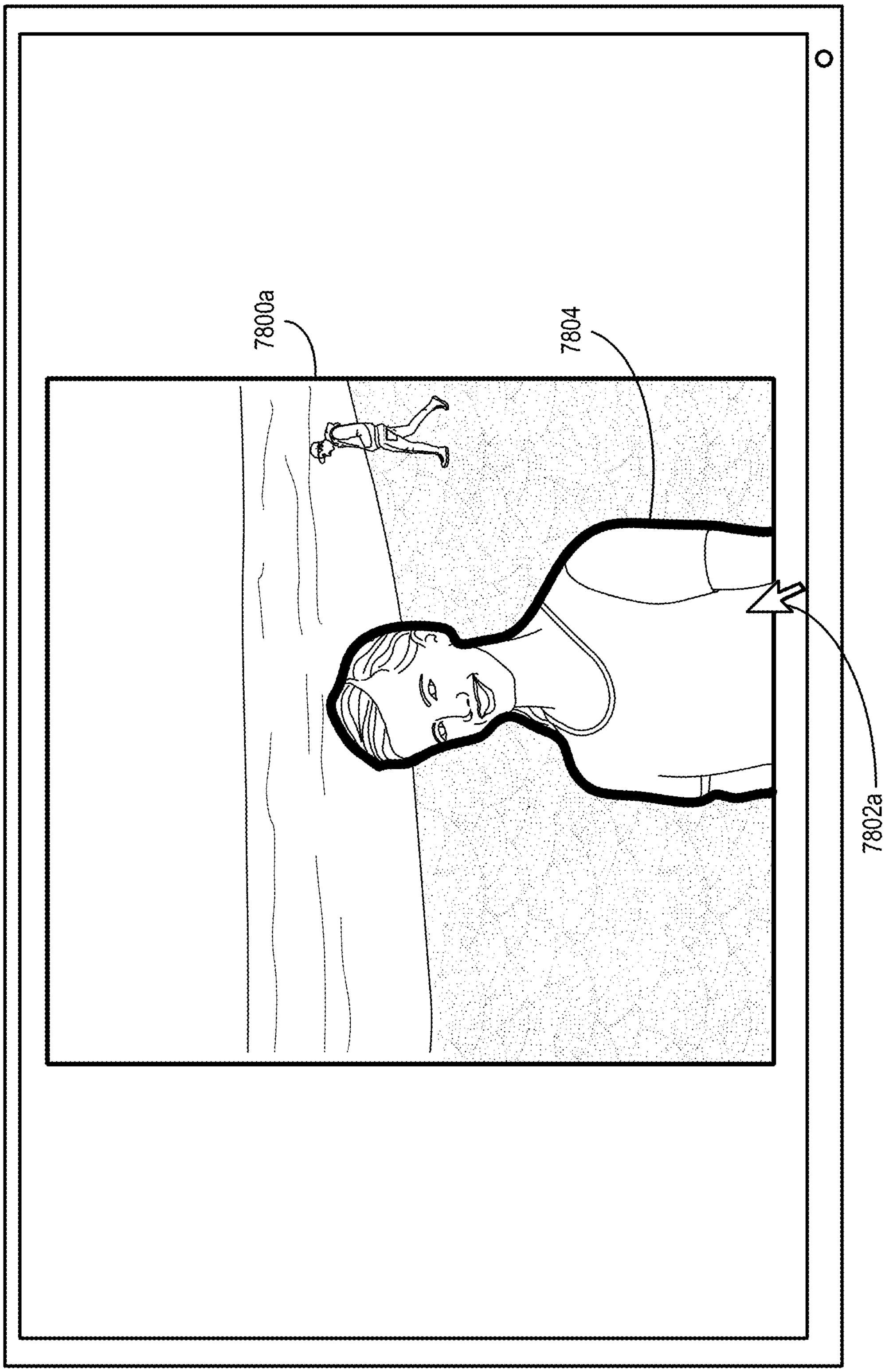
Figure 78C:
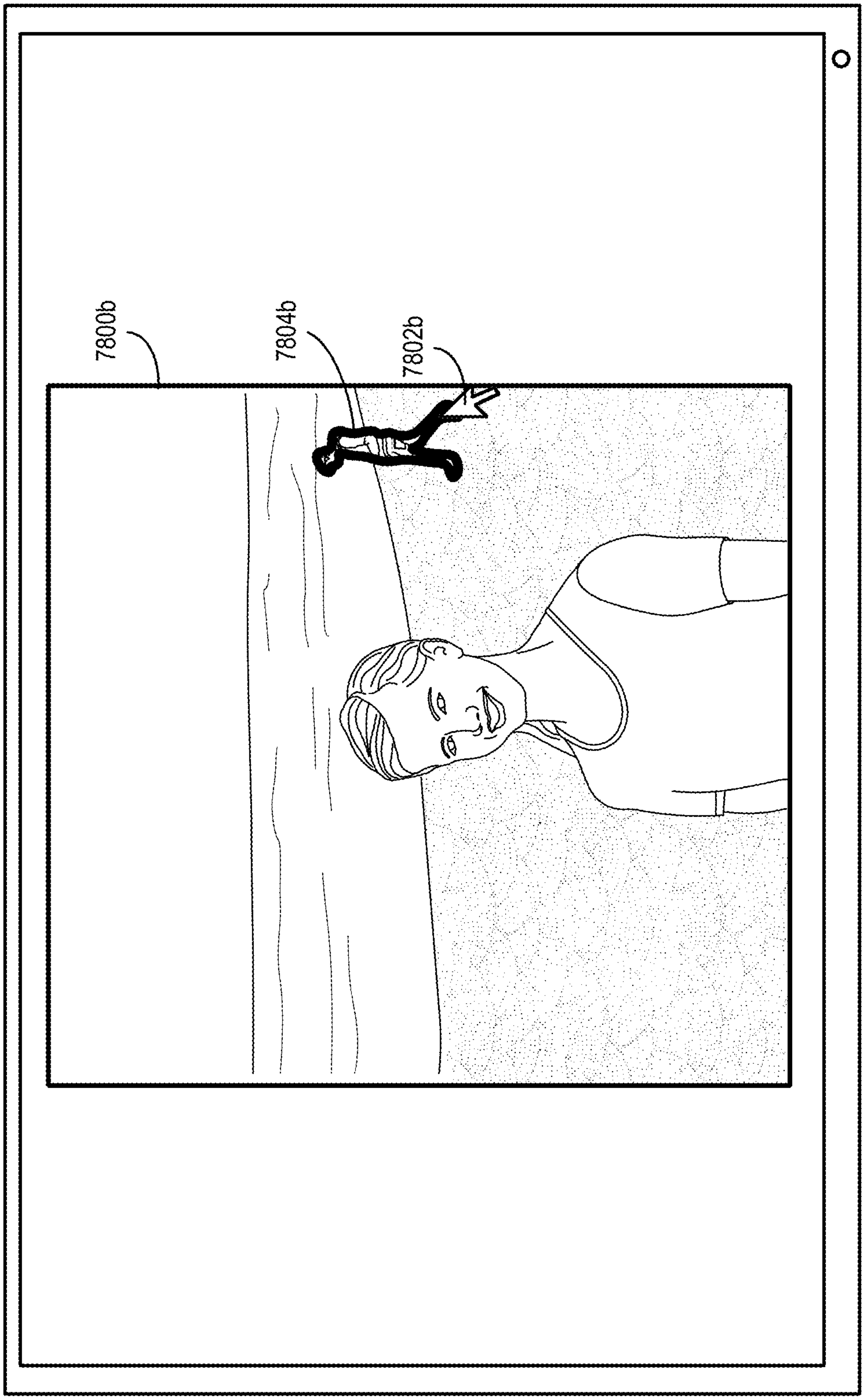

In one or more embodiments, the scene-based image editing system 106 also provides tools for selecting specific objects detected within a two-dimensional image based on depth values. FIGS. 78A-78C illustrate graphical user interfaces of a client device for selecting individual objects based on depths within a three-dimensional representation of a two-dimensional image. For example, FIG. 78A illustrates a two-dimensional image 7800 including a plurality of objects (e.g., people) in a two-dimensional scene. In connection with generating a three-dimensional representation of the two-dimensional image 7800, the scene-based image editing system 106 also determines three-dimensional depths of separate objects in the three-dimensional representation.

FIG. 78B illustrates that the scene-based image editing system 106 selects or highlights a portion of a two-dimensional image 7800*a* in response to an input (e.g., via an input element 7802*a*). To illustrate, in response to determining a position of the input element 7802*a*, the scene-based image editing system 106 selects a first object 7804 within the two-dimensional image 7800*a* based on a depth of a three-dimensional mesh corresponding to the first object 7804 for highlighting within the graphical user interface of the client device. In some embodiments, the scene-based image editing system 106 selects the first object 7804 in response to the input element 7802*a* being positioned at a determined depth corresponding to the first object 7804. Alternatively, the scene-based image editing system 106 selects the first object 7804 based on a position of the input element 7802*a* within the graphical user interface. For example, moving the input element 7802*a* within the graphical user interface in a specific direction causes the scene-based image editing system 106 to change a depth of the input element 7802*a*, thereby changing a selected object within the two-dimensional image 7800*a*.

As an example, FIG. 78B illustrates a two-dimensional image 7800*b* in response to moving an input element 7802*b* to a new position within the graphical user interface. To illustrate, in response to moving the input element 7802*b*, the scene-based image editing system 106 determines a second object 7804*b* corresponding to the depth of the input element 7802*b* and selects the second object 7804*b*. Thus, moving the input element 7802*b* in a specific direction (e.g., left-to-right or bottom-to-top) within the graphical user interface causes the scene-based image editing system 106 to cycle through objects within the two-dimensional image 7800*b* based on depth values of the objects (e.g., closest-to-farthest) relative to a camera position. In some embodiments, although FIGS. 78B and 78C illustrate input elements at different positions, the scene-based image editing system 106 modifies a selection depth without displaying an input element within the graphical user interface.

Although FIGS. 77A-77C and FIGS. 78A-78B and the corresponding description indicate that the scene-based image editing system 106 can modify two-dimensional images via reconstructed three-dimensional representations of the two-dimensional images, the scene-based image editing system 106 can also apply modifications to two-dimensional images via corresponding depth maps. In particular, as described in FIG. 74C, the scene-based image editing system 106 can generate depth maps for two-dimensional images to apply localized image modifications to the two-dimensional images according to focal points indicated by input elements. For example, the scene-based image editing system 106 can utilize depth values of a depth map of a two-dimensional image to select one or more portions of the two-dimensional image and then apply one or more image filters or image transformations to the selected portion(s) of the two-dimensional image. Thus, the scene-based image editing system 106 can modify colors, lighting, resizing, warping, blurring, pixelation, or other filters/transformations to a portion of a two-dimensional image selected based on a detected depth corresponding to an input element within the two-dimensional image.

Figure 79:
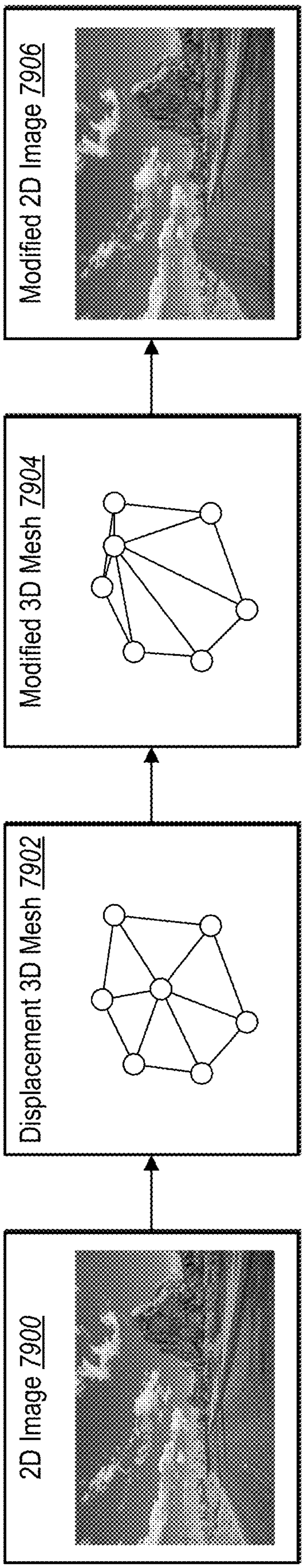
FIG. 79 illustrates a diagram of an overview of the depth displacement system modifying a two-dimensional image based on a three-dimensional mesh representing the two-dimensional image in accordance with one or more implementations.

As mentioned, the scene-based image editing system 106 generates three-dimensional meshes for editing two-dimensional images. FIG. 79 illustrates an overview of the scene-based image editing system 106 editing a two-dimensional image via modifications to a corresponding three-dimensional mesh in a three-dimensional environment. Specifically, FIG. 79 illustrates that the depth displacement system generates a three-dimensional mesh to represent content of a two-dimensional image in a three-dimensional space. FIG. 79 further illustrates that the scene-based image editing system 106 utilizes the three-dimensional mesh to modify the two-dimensional image.

In one or more embodiments, as illustrated in FIG. 79, the scene-based image editing system 106 identifies a two-dimensional image 7900. In one or more embodiments, the two-dimensional image 7900 includes a raster image. For example, the two-dimensional image 7900 includes a digital photograph of a scene including one or more objects in one or more positions relative to a viewpoint (e.g., based on a camera position) associated with the two-dimensional image 7900. In additional embodiments, the two-dimensional image 7900 includes a drawn image (e.g., a digital representation of a hand drawn image or a digital image generated via a computing device) including a plurality of objects with relative depths.

According to one or more embodiments, the scene-based image editing system 106 generates a displacement three-dimensional mesh 7902 representing the two-dimensional image 7900. Specifically, the scene-based image editing system 106 utilizes a plurality of neural networks to generate the displacement three-dimensional mesh 7902 including a plurality of vertices and faces that form a geometry representing objects from the two-dimensional image 7900. For instance, the scene-based image editing system 106 generates the displacement three-dimensional mesh 7902 to represent depth information and displacement information (e.g., relative positioning of objects) from the two-dimensional image 7900 in three-dimensional space. FIGS. 80-85 and the corresponding description provide additional detail with respect to generating an adaptive three-dimensional mesh for a two-dimensional image. In alternative embodiments, the scene-based image editing system 106 generates a displacement three-dimensional mesh for a two-dimensional image based on estimated pixel depth values and estimated camera parameters—e.g., by determining a position of each vertex of a tessellation corresponding to objects in the two-dimensional image according to the estimated pixel depth values and estimated camera parameters.

In one or more embodiments, a neural network includes a computer representation that is tuned (e.g., trained) based on inputs to approximate unknown functions. For instance, a neural network includes one or more layers or artificial neurons that approximate unknown functions by analyzing known data at different levels of abstraction. In some embodiments, a neural network includes one or more neural network layers including, but not limited to, a convolutional neural network, a recurrent neural network (e.g., an LSTM), a graph neural network, or a deep learning model. In one or more embodiments, the scene-based image editing system 106 utilizes one or more neural networks including, but is not limited to, a semantic neural network, an object detection neural network, a density estimation neural network, a depth estimation neural network, a camera parameter estimation.

In additional embodiments, the scene-based image editing system 106 determines a modified three-dimensional mesh 7904 in response to a displacement input. For example, in response to a displacement input to modify the two-dimensional image 7900, the scene-based image editing system 106 modifies the displacement three-dimensional mesh 7902 to generate the modified three-dimensional mesh 7904. Accordingly, the modified three-dimensional mesh 7904 includes one or more modified portions based on the displacement input. FIGS. 9-19B and the corresponding description provide additional detail with respect to modifying a three-dimensional mesh based on a displacement input.

FIG. 79 also illustrates that the scene-based image editing system 106 generates a modified two-dimensional image 7906 based on the modified three-dimensional mesh 7904. In particular, the scene-based image editing system 106 generates the modified two-dimensional image 7906 to include modified portions of the modified three-dimensional mesh 7904. To illustrate, the scene-based image editing system 106 utilizes a mapping of the two-dimensional image 7900 to the displacement three-dimensional mesh 7902 to reconstruct the modified two-dimensional image 7906 based on the modified three-dimensional mesh 7904.

Figure 80:
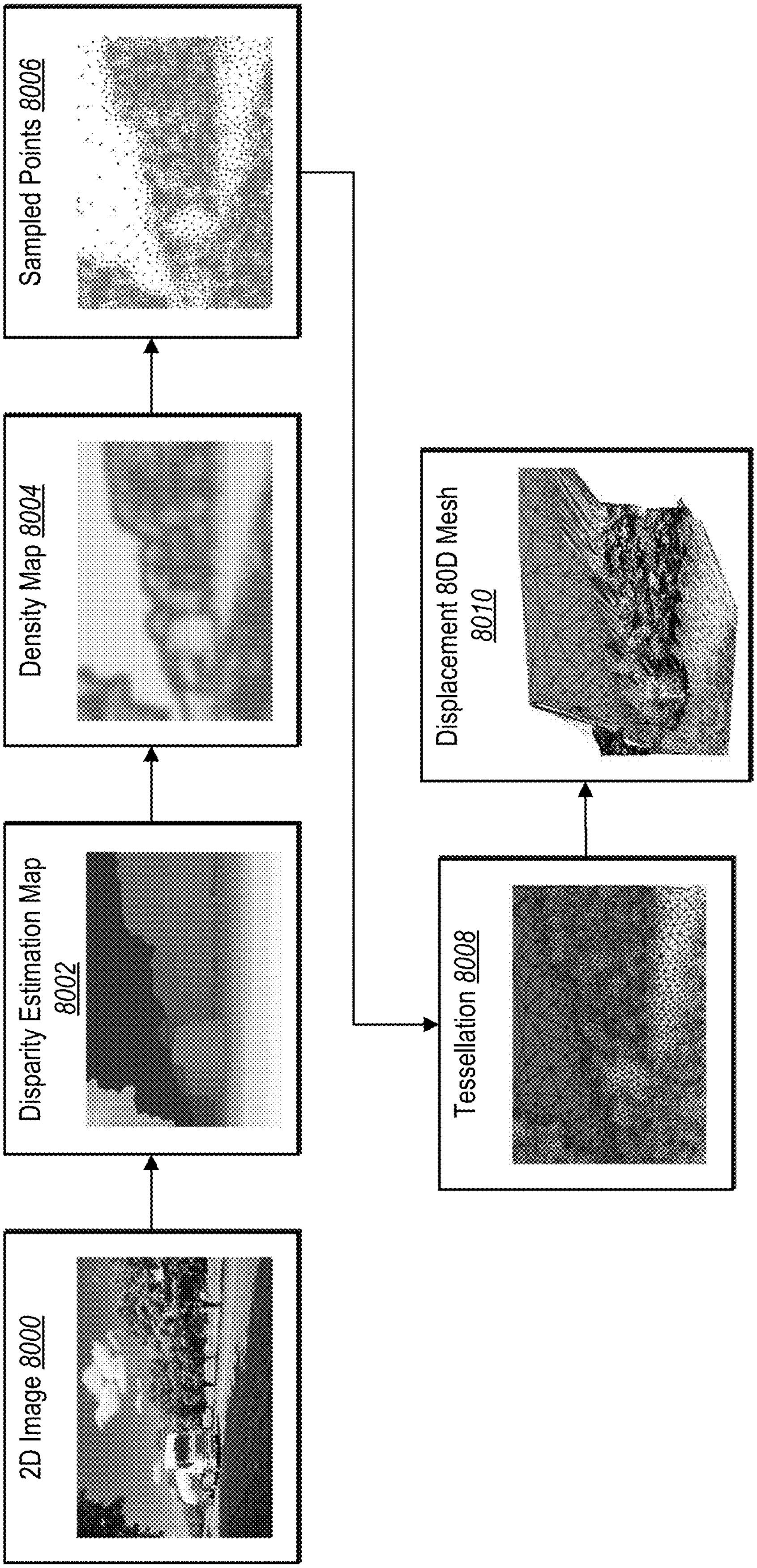
FIG. 80 illustrates a diagram of an overview of the depth displacement system generating a displacement three-dimensional mesh representing a two-dimensional image in accordance with one or more implementations.

FIG. 80 illustrates a diagram of the scene-based image editing system 106 generating a three-dimensional mesh that includes depth displacement information from a two-dimensional image. Specifically, the scene-based image editing system 106 generates the three-dimensional mesh by extracting depth information associated with objects in a two-dimensional image 8000. Additionally, the scene-based image editing system 106 extracts displacement information indicating relative positioning of the objects in the two-dimensional image 8000 (e.g., according to estimated camera parameters associated with a viewpoint of the two-dimensional image 8000). As illustrated in FIG. 80, the scene-based image editing system 106 utilizes the depth information and displacement information to generate a three-dimensional mesh representing the two-dimensional image 8000.

In one or more embodiments, the scene-based image editing system 106 determines a disparity estimation map 8002 based on the two-dimensional image 8000. For example, the scene-based image editing system 106 utilizes one or more neural networks to determine disparity estimation values corresponding to the pixels in the two-dimensional image 8000. To illustrate, the scene-based image editing system 106 utilizes a disparity estimation neural network (or other depth estimation neural network) to estimate depth values corresponding to pixels of the two-dimensional image 8000. More specifically, the depth values indicate a relative distance from a camera viewpoint associated with an image for each pixel in the image. In one or more embodiments, the depth values include (or are based on) disparity estimation values for the pixels of the scene-based image editing system 106.

In particular, the scene-based image editing system 106 utilizes the neural network(s) to estimate the depth value for each pixel according to objects within the two-dimensional image 8000 given the placement of each object in a scene (e.g., how far in the foreground/background each pixel is positioned). The scene-based image editing system 106 can utilize a variety of depth estimation models to estimate a depth value for each pixel. For example, in one or more embodiments, the scene-based image editing system 106 utilizes a depth estimation neural network as described in U.S. application Ser. No. 17/186,436, filed Feb. 26, 2021, titled "GENERATING DEPTH IMAGES UTILIZING A MACHINE-LEARNING MODEL BUILT FROM MIXED DIGITAL IMAGE SOURCES AND MULTIPLE LOSS FUNCTION SETS," which is herein incorporated by reference in its entirety. The scene-based image editing system 106 alternatively utilizes one or more other neural networks to estimate depth values associated with the pixels of the two-dimensional image 8000.

As illustrated in FIG. 80, in one or more embodiments, the scene-based image editing system 106 also determines a density map 8004 based on the disparity estimation map 8002. In particular, the scene-based image editing system 106 utilizes a set of filters to extract the density map 8004 from the disparity estimation map 8002. For example, the scene-based image editing system 106 utilizes the set of filters to determine a change in the change in depth (e.g., the second derivative) of the disparity estimation map 8002 to determine the instantaneous rate of change in depth at each pixel of the two-dimensional image 8000. Accordingly, the density map 8004 includes information indicating the density of detail in the two-dimensional image 8000, with the highest density of information typically being at edges of objects and other regions where the depth changes the fastest and lower density of information in planar regions without significant detail (e.g., a sky or road).

FIG. 80 also illustrates that the scene-based image editing system 106 determines sampled points 8006 for the two-dimensional image 8000 based on the density map 8004. For instance, the scene-based image editing system 106 determines a set of points to sample in connection with the two-dimensional image 8000 based on the density values in the density map 8004. To illustrate, the scene-based image editing system 106 utilizes a sampling model that samples a higher density of points in higher density locations indicated by the density map 8004 (e.g., samples using a probability function that reflects point density). The scene-based image editing system 106 thus samples a higher number of points in locations where the two-dimensional image 8000 includes the greatest amount of depth information.

In response to determining the sampled points 8006, the scene-based image editing system 106 generates a tessellation 8008. Specifically, the scene-based image editing system 106 generates an initial three-dimensional mesh based on the sampled points 8006. For example, the scene-based image editing system 106 utilizes Delaunay triangulation to generate the tessellation 8008 according to Voronoi cells corresponding to the sampled points 8006. Thus, the scene-based image editing system 106 generates a flat three-dimensional mesh including vertices and faces with greater density at portions with a higher density of sampled points.

As illustrated in FIG. 80, the scene-based image editing system 106 also generates a displacement three-dimensional mesh 8010 based on the tessellation 8008 for the two-dimensional image 8000. In particular, the scene-based image editing system 106 utilizes one or more neural networks to determine a perspective or viewpoint associated with the two-dimensional image 8000. The scene-based image editing system 106 generates the displacement three-dimensional mesh 8010 by incorporating depth displacement information indicating relative position of objects in the two-dimensional image 8000 according to the perspective/viewpoint extracted from the two-dimensional image 8000. Thus, the scene-based image editing system 106 converts the flat three-dimensional mesh into a displacement three-dimensional mesh by modifying positions of vertices in the mesh.

Figure 81:
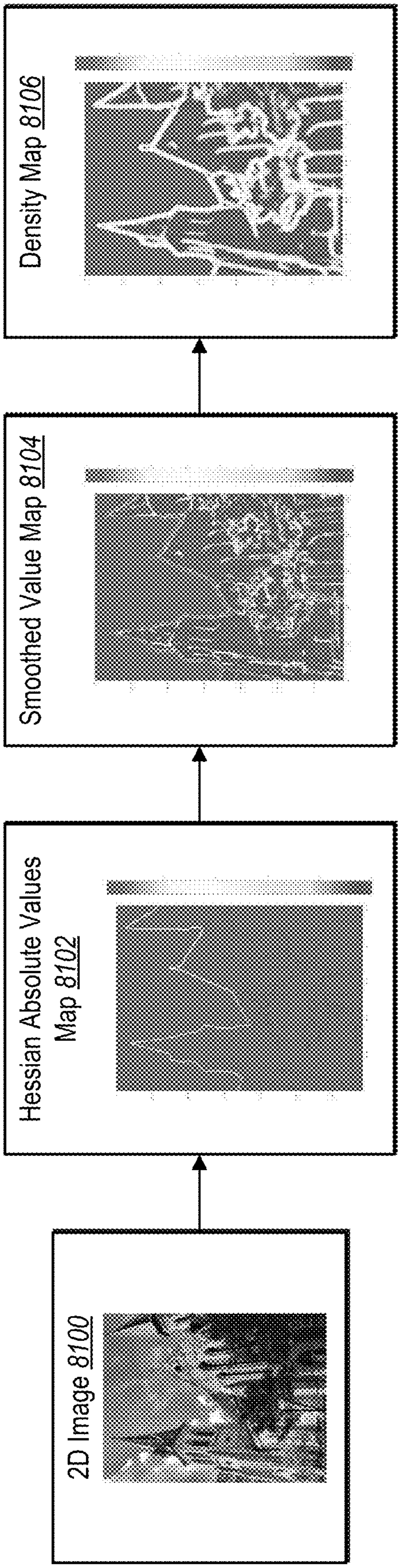
FIG. 81 illustrates a diagram of the depth displacement system determining density values of a two-dimensional image in accordance with one or more implementations.

FIG. 81 illustrates additional detail associated with determining a density map associated with a two-dimensional image. Specifically, FIG. 81 illustrates that the scene-based image editing system 106 applies a plurality of filters in connection with depth values extracted from a two-dimensional image 8100. For instance, the scene-based image editing system 106 applies the filters to a disparity estimation map associated with the two-dimensional image 8100. Alternatively, the scene-based image editing system 106 applies the filters to other depth values associated with the two-dimensional image 8100.

As illustrated in FIG. 81, the scene-based image editing system 106 utilizes a first filter to determine a Hessian absolute value map 8102 based on the disparity estimation map of the two-dimensional image 8100. In particular, the scene-based image editing system 106 utilizes a filter to generate a Hessian matrix based on the disparity estimation values. For example, the scene-based image editing system 106 generates the Hessian absolute value map 8102 from the Hessian matrix indicating a second derivative of the disparity estimation values indicating the change in change (e.g., the rate of change) in depth information from the two-dimensional image 8100. To illustrate, the scene-based image editing system 106 generates the Hessian absolute value map 8102 by determining absolute values of the diagonals of the Hessian matrix.

Furthermore, as illustrated in FIG. 81, the scene-based image editing system 106 applies a second filter to the Hessian absolute value map 8102 to determine a smoothed value map 8104. For instance, the scene-based image editing system 106 modifies the absolute values in the Hessian absolute value map 8102 by smoothing the absolute values. To illustrate, the scene-based image editing system 106 utilizes a convolution operation to generate the smoothed value map 8104 including smoothed values from the Hessian absolute value map 8102. In some embodiments, by smoothing the values from the Hessian absolute value map 8102, the scene-based image editing system 106 removes noise that may be introduced by determining the Hessian matrix.

In one or more embodiments, the scene-based image editing system 106 further modifies the smoothed value map 8104 to determine a density map 8106. In particular, as illustrated in FIG. 81, the scene-based image editing system 106 generates the density map 8106 by truncating (or clipping) the values in the smoothed value map 8104 according to a predetermined threshold. For example, the scene-based image editing system 106 clips the values in the smoothed value map 8104 to a predetermined proportion of a standard deviation of values (e.g., to 0.5 times the standard deviation). By truncating the values, the scene-based image editing system 106 prevents large local changes in disparity from dominating the density of values in the density map 8106.

According to one or more embodiments, as illustrated, the density map 8106 includes higher density values at object boundaries of the two-dimensional image 8100 and lower density values within the object boundaries. Additionally, the density map 8106 includes high density values for pixels within objects indicating sharp transitions in depth (e.g., at edges of windows of the buildings of FIG. 81), while limiting density values at other areas without sharp transitions in depth (e.g., between individual leaves or clusters of leaves in the trees of FIG. 81). The scene-based image editing system 106 thus generates the density map 8106 to indicate regions of the two-dimensional image 8100 for sampling points so that the sampled points indicate regions according to the rate of change of transition of depth information.

In one or more embodiments, the scene-based image editing system 106 utilizes a plurality of filters with customizable parameters to determine the density map 8106. For example, the filters may include parameters that provide manually customizable density regions, such as edges of an image, to provide higher sampling of points at the indicated regions. In one or more additional embodiments, the scene-based image editing system 106 customizes the clipping threshold to include regions with higher or lower density of information, as may serve a particular implementation.

Figure 82:
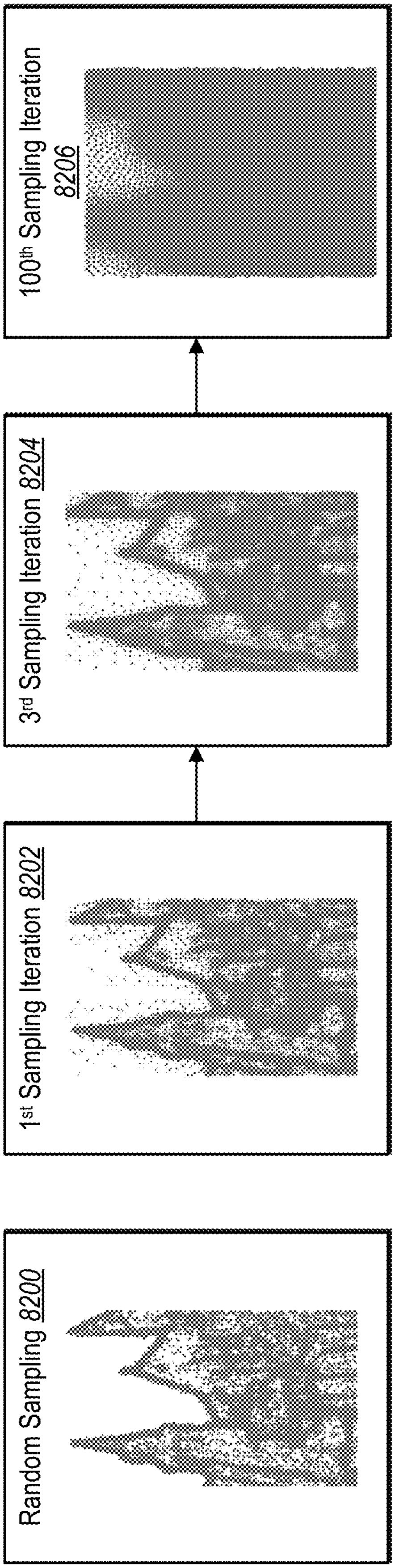
FIG. 82 illustrates a diagram of the depth displacement system determining sampling points for a two-dimensional image in one or more sampling iterations in accordance with one or more implementations.

In one or more embodiments, the scene-based image editing system 106 samples points for a two-dimensional image based on density values corresponding to pixels in the two-dimensional image. Specifically, as illustrated in FIG. 82, the depth displacement system samples points according to the density values to sample greater numbers of points in dense regions and fewer numbers of points in lower density regions. According to one or more embodiments, the scene-based image editing system 106 utilizes a sampling model that determines a random sampling 8200 according to the density values in the density map (e.g., by utilizing the density map as a probability distribution for sampling). To illustrate, the scene-based image editing system 106 randomly samples a plurality of points utilizing the density map, resulting in randomly sampled points with higher density of sampled points in the high density regions of the two-dimensional image.

In one or more alternative embodiments, the scene-based image editing system 106 utilizes a sampling model that utilizes the density map as a probability distribution in an iterative sampling process. In particular, rather than randomly sampling points according to the density values, the scene-based image editing system 106 utilizes a sampling model that provides iterative movement of the samples towards positions that result in more uniform/better formed triangulation in a three-dimensional mesh generated based on the sampled points. For instance, the scene-based image editing system 106 utilizes a sampling model with a relaxation model to iteratively move sampled points toward the center of corresponding Voronoi cells in connection with Delaunay triangulation. To illustrate, the scene-based image editing system 106 utilizes a sampling model with Voronoi iteration/relaxation (e.g., "Lloyd's algorithm") that generates a centroidal Voronoi tessellation in which a seed point for each Voronoi cell/region is also its centroid. More specifically, the scene-based image editing system 106 repeatedly moves each sampled point for a corresponding Voronoi cell toward the center of mass of the corresponding Voronoi cell.

Accordingly, in one or more embodiments, the scene-based image editing system 106 determines a first sampling iteration 8202 including a plurality of sampled points according to a density map of a two-dimensional image. Additionally, in one or more embodiments, the scene-based image editing system 106 performs a plurality of iterations to further improve the regularity of the sampling according to the density map for the two-dimensional image. FIG. 82 also illustrates that the scene-based image editing system 106 determines a third sampling iteration 8204 including a plurality of sampled points after three sampling iterations. A three-dimensional mesh generated from the third sampling iteration 8204 includes more vertices and planes based on points sampled according to the density map.

FIG. 82 further illustrates a 100th sampling iteration 8206 after 100 sampling iterations. As shown, continuing to perform sampling iterations after a certain point may reduce the connection between the sampled points (and resulting three-dimensional mesh) and the density map. Thus, in one or more embodiments, the scene-based image editing system 106 determines a number of iterations based on a distance of the sampled points from the density map. Furthermore, in some embodiments, the scene-based image editing system 106 determines the number of iterations based on a resource/time budget or the resolution of the two-dimensional image. To illustrate, the scene-based image editing system 106 determines that two or three iterations provide a plurality of sampled points that result in a three-dimensional mesh that preserves the boundaries of the objects of the two-dimensional image while remaining consistent with the density map.

In one or more embodiments, the scene-based image editing system 106 also utilizes image-aware sampling to ensure that the scene-based image editing system 106 samples all portions of a two-dimensional image for generating a three-dimensional mesh. For example, the scene-based image editing system 106 accounts for portions with very little or no detail at the edges or corners of a two-dimensional image to ensure that the resulting three-dimensional mesh includes the edges/corners in the three-dimensional mesh. To illustrate, the scene-based image editing system 106 provides instructions to a sampling model to sample at least some points along edges of the two-dimensional image based on the dimensions/coordinates of the two-dimensional image (e.g., by adding density to the image borders). Alternatively, the scene-based image editing system 106 provides a tool for a user to manually indicate points for sampling during generation of a three-dimensional mesh representing a two-dimensional image.

Figure 83:
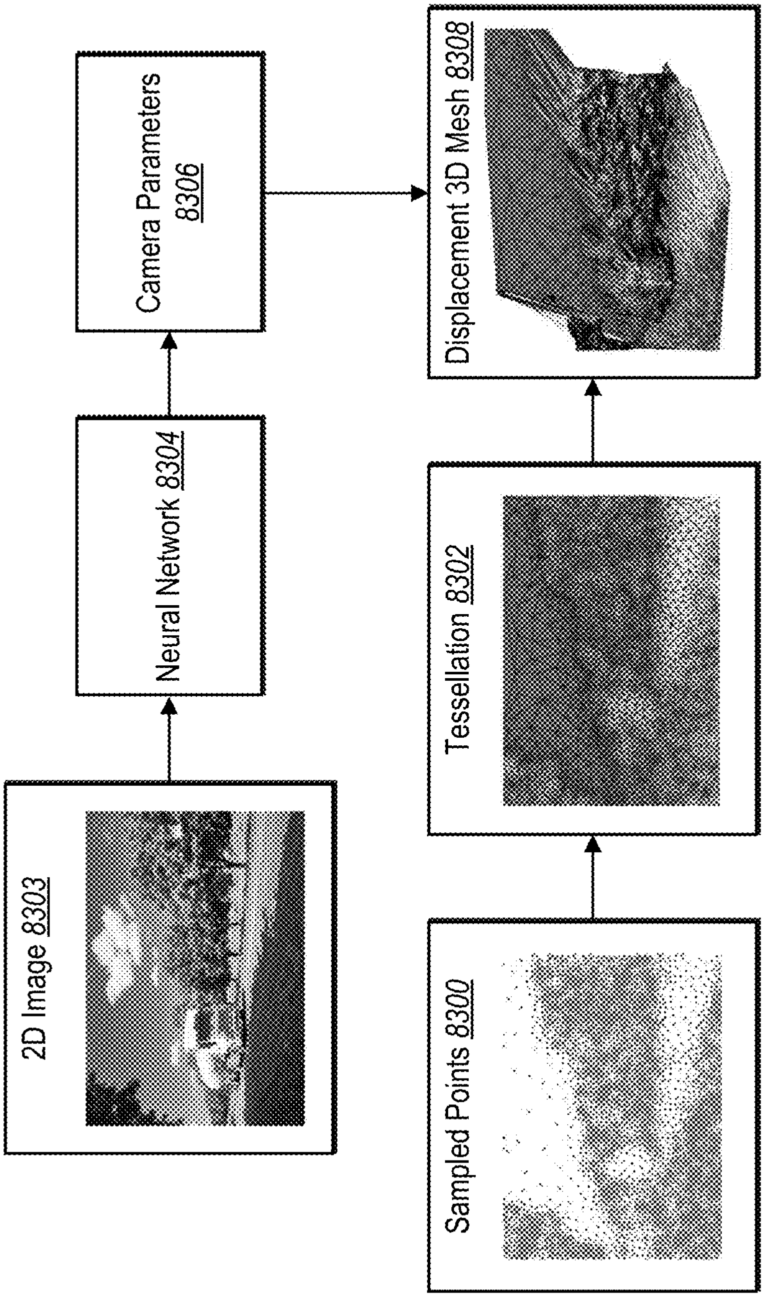
FIG. 83 illustrates a diagram of the depth displacement system generating a displacement three-dimensional mesh based on sampled points of a two-dimensional image in accordance with one or more implementations.

FIG. 83 illustrates the scene-based image editing system 106 generating a three-dimensional mesh including depth displacement information for content of a two-dimensional image. In particular, FIG. 83 illustrates that the scene-based image editing system 106 determines sampled points 8300 (e.g., as described in FIG. 82). Furthermore, FIG. 83 illustrates that the scene-based image editing system 106 generates a tessellation 8302 based on the sampled points 8300. To illustrate, the scene-based image editing system 106 determines the sampled points 8300 and generates the tessellation 8302 in an iterative process utilizing Voronoi relaxation and Delaunay triangulation.

In one or more embodiments, the scene-based image editing system 106 modifies the tessellation 8302, which includes a flat mesh of vertices and faces, to include displacement information based on a viewpoint in a two-dimensional image. For instance, the scene-based image editing system 106 determines a perspective associated with the two-dimensional image 8303 (e.g., based on a camera that captured the two-dimensional image). By determining a viewpoint of the scene-based image editing system 106 and determining displacement, the scene-based image editing system 106 incorporates depth information into a three-dimensional mesh representing the two-dimensional image.

According to one or more embodiments, the scene-based image editing system 106 utilizes a neural network 8304 to estimate camera parameters 8306 associated with the viewpoint based on the two-dimensional image 8303. For example, the scene-based image editing system 106 utilizes a camera parameter estimation neural network to generate an estimated position, an estimated direction, and/or an estimated focal length associated with the two-dimensional image 8303. To illustrate, the scene-based image editing system 106 utilizes a neural network as described in U.S. Pat. No. 11,094,083, filed Jan. 25, 2019, titled "UTILIZING A CRITICAL EDGE DETECTION NEURAL NETWORK AND A GEOMETRIC MODEL TO DETERMINE CAMERA PARAMETERS FROM A SINGLE DIGITAL IMAGE," which is herein incorporated by reference in its entirety. In additional embodiments, the scene-based image editing system 106 extracts one or more camera parameters from metadata associated with the two-dimensional image 8303.

As illustrated in FIG. 83, the scene-based image editing system 106 utilizes the camera parameters 8306 to generate the displacement three-dimensional mesh 8308. In particular, the scene-based image editing system 106 utilizes the camera parameters 8306 to estimate positions of vertices from the tessellation 8302 according to the depth values of corresponding pixels of the two-dimensional image in connection with the position of the camera, the focal length of the camera, and/or the direction of the camera. To illustrate, the scene-based image editing system 106 modifies three-dimensional positions of a plurality of vertices and faces in three-dimensional space based on the relative positioning of the objects in the two-dimensional image.

Furthermore, in one or more embodiments, the scene-based image editing system 106 utilizes additional information to further modify a three-dimensional mesh of a two-dimensional image. Specifically, the scene-based image editing system 106 utilizes additional information from the two-dimensional image to determine positions of vertices in the three-dimensional mesh. For example, as illustrated in FIGS. 84A-84B, the scene-based image editing system 106 utilizes additional edge information to modify a three-dimensional mesh of a two-dimensional image.

Figure 84B:
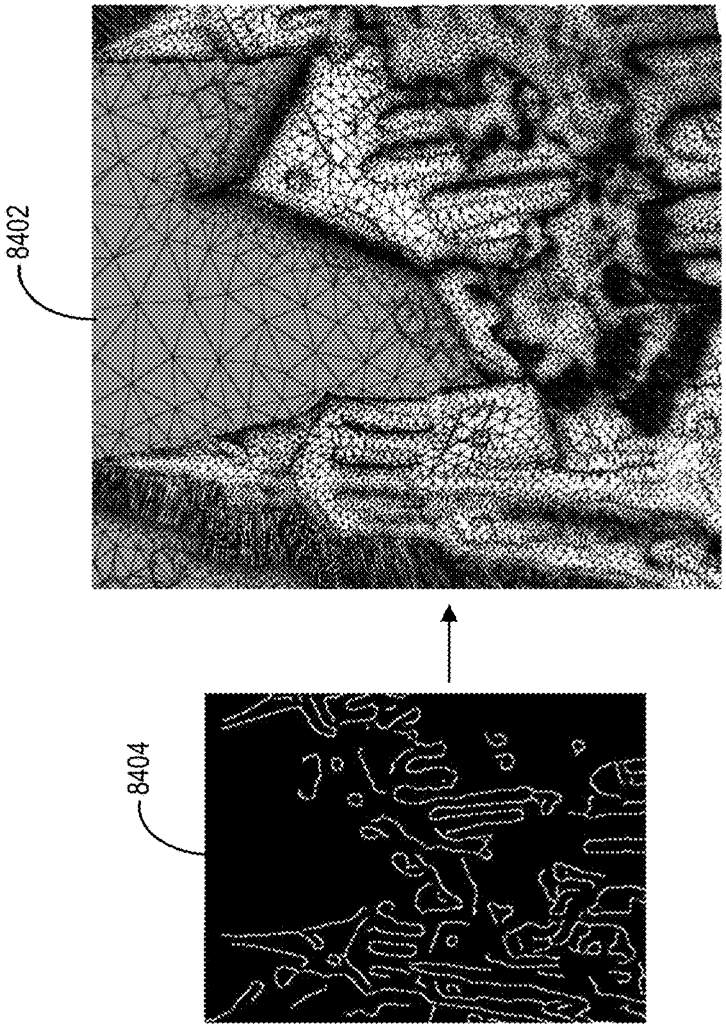
FIGS. 84A-84B illustrate a plurality of different displacement three-dimensional meshes for a two-dimensional image in accordance with one or more implementations.
Figure 84A:
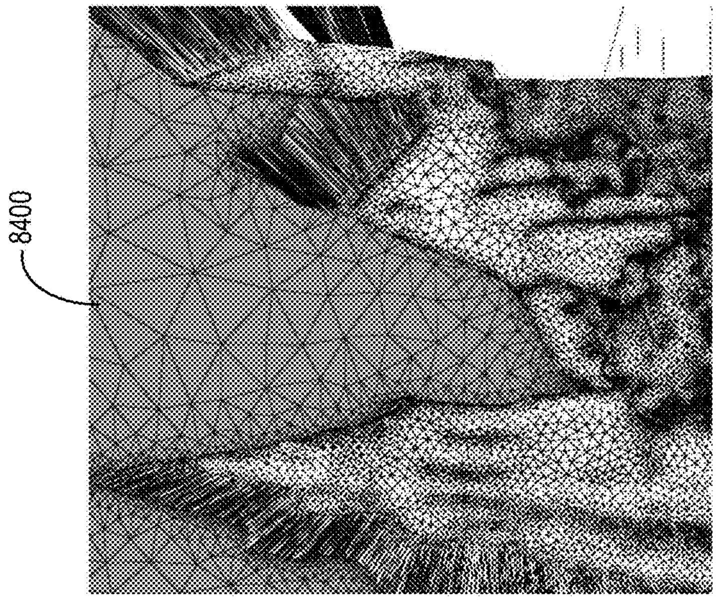

For example, FIG. 84A illustrates that the scene-based image editing system 106 generates a displacement three-dimensional mesh 8400 for a two-dimensional image utilizing the process as described above in relation to FIG. 83. As illustrated, the displacement three-dimensional mesh 8400 includes displacement information based on a viewpoint of the two-dimensional image, which can result in long/deformed portions of the three-dimensional mesh at edges of objects. To illustrate, certain edges of objects in the displacement three-dimensional mesh 8400 may lack detail due to having insufficient polygons to accurately represent the detail.

In one or more embodiments, the scene-based image editing system 106 adds additional detail to a three-dimensional mesh (e.g., via additional vertices and faces). For instance, the scene-based image editing system 106 utilizes color values (e.g., RGB values) from a two-dimensional image into a neural network that generates a displacement three-dimensional mesh based on depth values and/or camera parameters. Specifically, the scene-based image editing system 106 utilizes the color values to further increase the density of polygons at edges of the three-dimensional mesh to reduce artifacts and/or to remove long polygons. FIG. 84B illustrates that the scene-based image editing system 106 generates an additional displacement three-dimensional mesh 8402 based on the additional information. As shown, the additional information allows the scene-based image editing system 106 to provide a higher quality displacement three-dimensional mesh with more accurate details at the edges of the objects.

As illustrated in FIG. 84B, the scene-based image editing system 106 utilizes an edge map 8404 including additional information about the edges within a two-dimensional image. For example, the edge map 8404 includes edges based on an initial edge detection process that highlights specific edges that may not correspond to high density areas. To illustrate, the scene-based image editing system 106 determines a filter that mimics a human drawing of edges in the two-dimensional image, utilizes a neural network to automatically detect certain edges, a canny edge detector model to detect edges, semantic segmentation, or user input to determine corners/edges of a room, edges of a flat object such as a paper, or another object for identifying additional edges to sample during the mesh generation process. By utilizing the edge map 8404 to guide displacement of vertices in the additional displacement three-dimensional mesh 8402, the scene-based image editing system 106 provides more accurate edge details in the additional displacement three-dimensional mesh 8402 via additional vertices at the indicated edges. In additional embodiments, the scene-based image editing system 106 further performs an edge detection operation on a disparity estimation map corresponding to a two-dimensional image for determining sampling locations in a two-dimensional image. Such a process allows the scene-based image editing system 106 to arbitrarily add additional detail into the additional displacement three-dimensional mesh 8402 according to the additional information provided in connection with generating the additional displacement three-dimensional mesh 8402.

Figure 85:
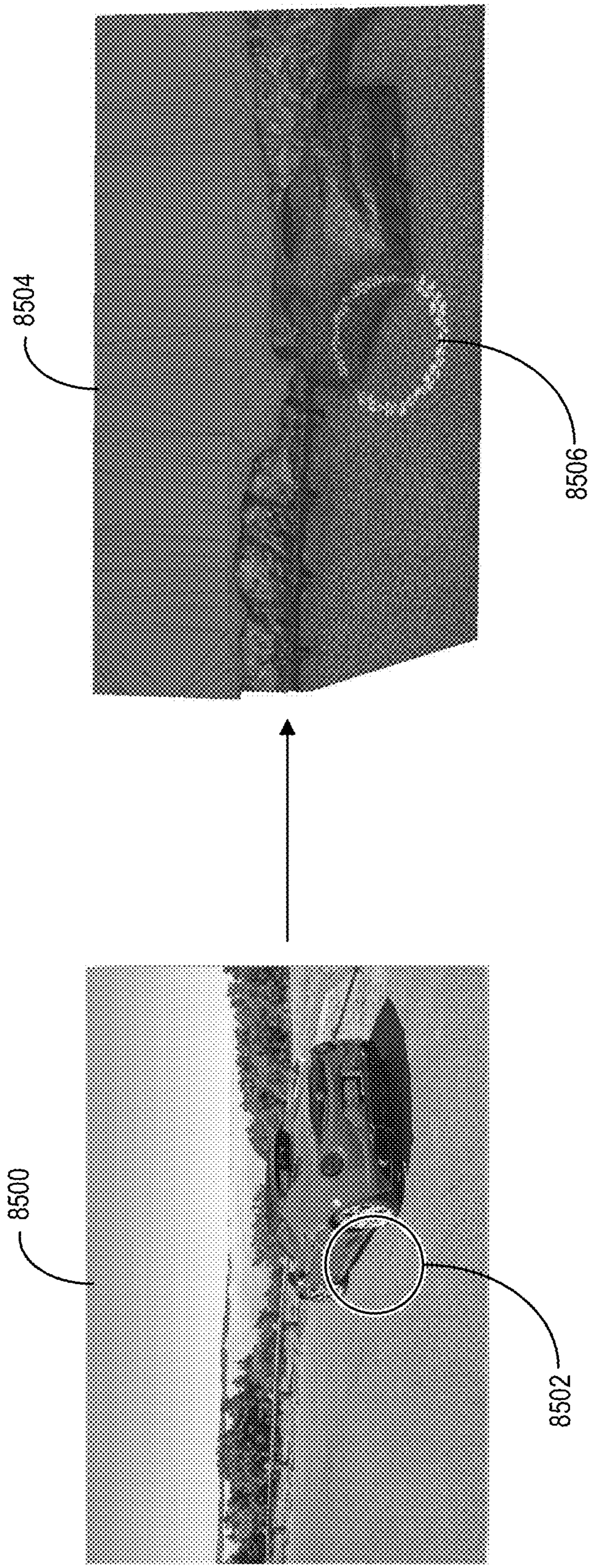
FIG. 85 illustrates the depth displacement system generating a displacement three-dimensional mesh for a two-dimensional image based on an additional input in accordance with one or more implementations.

FIG. 85 also illustrates that the scene-based image editing system 106 provides additional detail for generating a displacement three-dimensional mesh for a two-dimensional image. For instance, the scene-based image editing system 106 provides one or more tools for a user to indicate additional information to add to a three-dimensional mesh representing the two-dimensional image. In particular, FIG. 85 illustrates a two-dimensional image 8500 including an image of a car parked on a road against a scenic overlook.

FIG. 85 further illustrates that a user input has indicated a circle 8502 on the two-dimensional image 8500 for adding additional information into a displacement three-dimensional mesh 8504 representing the two-dimensional image 8500. To illustrate, in response to the user input indicating the circle 8502 on the two-dimensional image 8500, the scene-based image editing system 106 adds the circle into the displacement three-dimensional mesh 8504. For example, the scene-based image editing system 106 adds additional vertices/faces into the displacement three-dimensional mesh 8504 at a location 8506 of the displacement three-dimensional mesh 8504 corresponding to the circle 8502.

By adding additional information into the displacement three-dimensional mesh 8504, the scene-based image editing system 106 provides additional flexibility in modifying the two-dimensional image 8500. For instance, because the scene-based image editing system 106 added the additional vertices/faces into the displacement three-dimensional mesh 8504 at the location 8506, the scene-based image editing system 106 provides the ability to modify the selected portion without compromising the integrity of the surrounding portions of the displacement three-dimensional mesh 8504. To illustrate, in response to a request to delete the portion of the two-dimensional image 8500 within the circle 8502, the scene-based image editing system 106 removes the corresponding portion of the displacement three-dimensional mesh 8504 at the location 8506 of the displacement three-dimensional mesh 8504. The scene-based image editing system 106 also provides additional options, such as deforming the portion within the circle 8502 without compromising the geometry of the portions of the displacement three-dimensional mesh 8504 outside the location 8506 or texturing the portion within the circle 8502 separately from other portions of the two-dimensional image 8500.

Figure 86:
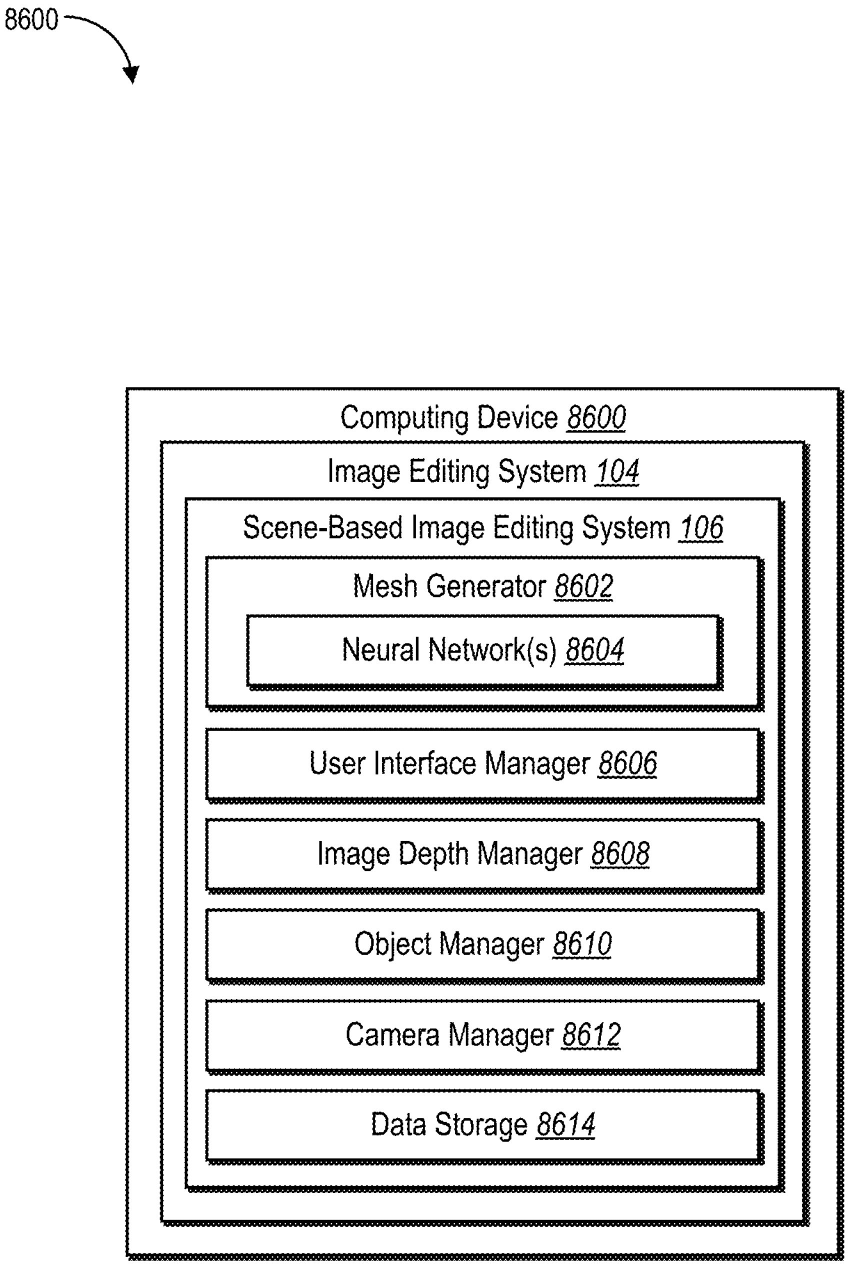
FIG. 86 illustrates an example schematic diagram of a scene-based image editing system in accordance with one or more embodiments.

Turning to FIG. 86, additional detail will now be provided regarding various components and capabilities of the scene-based image editing system 106. In particular, FIG. 86 shows the scene-based image editing system 106 implemented by the computing device 8600 (e.g., the server(s) 102 and/or one of the client devices 110*a*-110*n*). Additionally, the scene-based image editing system 106 is also part of the image editing system 104. As shown, in one or more embodiments, the scene-based image editing system 106 includes, but is not limited to, a mesh generator 8602 including neural network(s) 8604, a user interface manager 8606, an image depth manager 8608, an object manager 8610, a camera manager 8612, and a data storage 8614.

As illustrated in FIG. 86, the scene-based image editing system 106 includes the mesh generator 8602 to generate three-dimensional meshes from two-dimensional images. For example, the mesh generator 8602 utilizes the neural network(s) 8604 to estimate depth values for pixels of a two-dimensional image and one or more filters to determine a density map based on the estimated depth values. Additionally, the mesh generator 8602 samples points based on the density map and generates a tessellation based on the sampled points. The mesh generator 8602 further generates (e.g., utilizing the neural network(s) 8604) a displacement three-dimensional mesh by modifying positions of vertices in the tessellation to incorporate depth and displacement information into a three-dimensional mesh representing the two-dimensional image.

The scene-based image editing system 106 also includes the user interface manager 8606 to manage user interactions in connection with modifying two-dimensional images via various tools. For example, the user interface manager 8606 detects positions of inputs (e.g., input elements) relative to a two-dimensional image and translates the positions into a three-dimensional space associated with a corresponding three-dimensional mesh. The user interface manager 8606 also converts changes made to a three-dimensional mesh back to a corresponding two-dimensional image for display within a graphical user interface. In additional embodiments, the user interface manager 8606 displays user interface content in connection with editing two-dimensional images, such as planar surfaces.

According to one or more embodiments, the scene-based image editing system 106 utilizes the image depth manager 8608 to determine and utilize depth information associated with scenes of two-dimensional images to modify the two-dimensional images. For example, the image depth manager 8608 determines three-dimensional positions and/or three-dimensional depths corresponding to inputs (e.g. input elements) and/or content within a three-dimensional space. In additional embodiments, the image depth manager 8608 generates depth maps for two-dimensional images utilizing three-dimensional representations and/or depth estimation operations. The image depth manager 8608 utilizes the depth information to modify two-dimensional images according to the determined positions/depths.

The scene-based image editing system 106 utilizes the object manager 8610 to manage objects in two-dimensional images and three-dimensional representations of the two-dimensional images. For instance, the object manager 8610 generates or otherwise determines three-dimensional meshes corresponding to objects in three-dimensional space relative to two-dimensional images. The object manager 8610 communicates with the image depth manager 8608 to perform operations on the objects according to object depths. The object manager 8610 also provides object information to one or more other components of the scene-based image editing system 106.

In one or more embodiments, the scene-based image editing system 106 utilizes the camera manager 8612 to manage camera parameters associated with two-dimensional images. Specifically, the camera manager 8612 estimates camera parameters for cameras capturing two-dimensional images. The camera manager 8612 also manages camera parameters for cameras in three-dimensional space corresponding to three-dimensional representations of the two-dimensional images. The camera manager 8612 manages parameters such as focal points, focal lengths, positions, rotations, etc., of cameras in three-dimensional space for rendering modified two-dimensional images.

Additionally, as shown in FIG. 86, the scene-based image editing system 106 includes data storage 8614. In particular, data storage 8614 includes data associated with modifying two-dimensional images according to three-dimensional representations of the two-dimensional images. For example, the data storage 8614 includes neural networks for generating three-dimensional representations of two-dimensional images. The data storage 8614 also stores the three-dimensional representations. The data storage 8614 also stores information such as depth values, camera parameters, parameters of input elements, objects, or other information that the scene-based image editing system 106 utilizes to modify two-dimensional images according to three-dimensional characteristics of the content of the two-dimensional images.

Each of the components of the scene-based image editing system 106 of FIG. 86 optionally includes software, hardware, or both. For example, the components include one or more instructions stored on a computer-readable storage medium and executable by processors of one or more computing devices, such as a client device or server device. When executed by the one or more processors, the computer-executable instructions of the scene-based image editing system 106 cause the computing device(s) to perform the methods described herein. Alternatively, the components include hardware, such as a special-purpose processing device to perform a certain function or group of functions. Alternatively, the components of the scene-based image editing system 106 include a combination of computer-executable instructions and hardware.

Furthermore, the components of the scene-based image editing system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the scene-based image editing system 106 may be implemented as a stand-alone application, such as a desktop or mobile application. Furthermore, the components of the scene-based image editing system 106 may be implemented as one or more web-based applications hosted on a remote server. Alternatively, or additionally, the components of the scene-based image editing system 106 may be implemented in a suite of mobile device applications or "apps." For example, in one or more embodiments, the scene-based image editing system 106 comprises or operates in connection with digital software applications such as ADOBE® PHOTOSHOP® or ADOBE® ILLUSTRATOR®. The foregoing are either registered trademarks or trademarks of Adobe Inc. in the United States and/or other countries.

Figure 87:
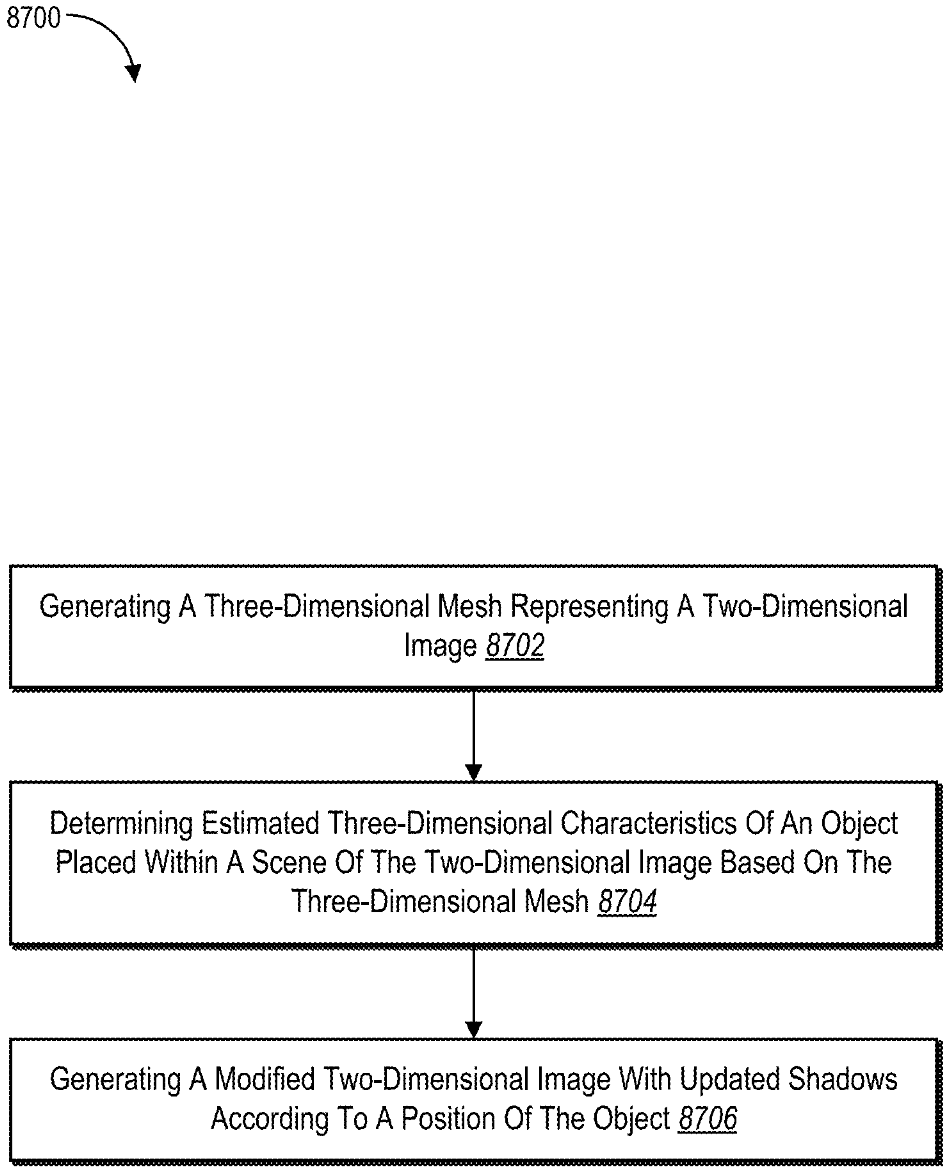
FIG. 87 illustrates a flowchart for a series of acts for modifying shadows in two-dimensional images based on three-dimensional characteristics of the two-dimensional images in accordance with one or more embodiments.

Turning now to FIG. 87, this figure shows a flowchart of a series of acts 8700 of modifying shadows in two-dimensional images based on three-dimensional characteristics of the two-dimensional images. While FIG. 87 illustrates acts according to one embodiment, alternative embodiments may omit, add to, reorder, and/or modify any of the acts shown in FIG. 87. The acts of FIG. 87 are part of a method. Alternatively, a non-transitory computer readable medium comprises instructions, that when executed by one or more processors, cause the one or more processors to perform the acts of FIG. 87. In still further embodiments, a system includes a processor or server configured to perform the acts of FIG. 87.

As shown, the series of acts 8700 includes an act 8702 of generating a three-dimensional mesh representing a two-dimensional image. Furthermore, the series of acts 8700 includes an act 8704 of determining estimated three-dimensional characteristics of an object placed within a scene of the two-dimensional image based on the three-dimensional mesh. The series of acts 8700 also includes an act 8706 of generating a modified two-dimensional image with updated shadows according to a position of the object.

In one or more embodiments, the series of acts 8700 includes determining, by at least one processor, estimated three-dimensional characteristics of one or more background objects in a scene of a two-dimensional image. The series of acts 8700 includes determining, by the at least one processor, a request to place an object at a selected position within the scene of the two-dimensional image. The series of acts 8700 also includes generating, by the at least one processor, a modified two-dimensional image comprising one or more updated shadows according to the selected position of the object and the estimated three-dimensional characteristics of the one or more background objects.

In one or more embodiments, the series of acts 8700 includes generating, utilizing one or more neural networks, a three-dimensional mesh for the two-dimensional image based on pixel depth values corresponding to one or more foreground objects and the one or more background objects of the scene of the two-dimensional image and estimated camera parameters of a camera position corresponding to the two-dimensional image.

In one or more embodiments, the series of acts 8700 includes generating an object segmentation map for one or more foreground objects and the one or more background objects of the scene of the two-dimensional image. The series of acts 8700 includes generating a plurality of separate three-dimensional meshes for the one or more foreground objects and the one or more background objects according to the object segmentation map.

According to one or more embodiments, the series of acts 8700 includes determining that the request comprises moving the object from a first position in the two-dimensional image to a second position in the two-dimensional image. The series of acts 8700 includes generating, according to a shape of the object, a proxy three-dimensional mesh at a three-dimensional position corresponding to the selected position within the scene of the two-dimensional. The series of acts 8700 also includes removing, from the two-dimensional image, a first shadow corresponding to the object at the first position in the two-dimensional image. Additionally, the series of acts 8700 includes generating, utilizing the proxy three-dimensional mesh, a second shadow corresponding to the object at the second position in the two-dimensional image.

In some embodiments, the series of acts 8700 includes determining a symmetric axis corresponding to the object according to features of a visible portion of the object within the two-dimensional image. The series of acts 8700 also includes generating, based on the symmetric axis, a three-dimensional mesh comprising a first three-dimensional portion corresponding to the visible portion of the object and a mirrored three-dimensional portion of the first three-dimensional portion corresponding to a non-visible portion of the object.

In one or more embodiments, the series of acts 8700 includes determining that the object corresponds to a predetermined subset of objects. Additionally, the series of acts 8700 includes generating, utilizing a machine-learning model trained for the predetermined subset of objects, a three-dimensional mesh representing the object.

In at least some embodiments, the series of acts 8700 includes determining one or more shadow maps for the object at the selected position according to a three-dimensional mesh representing the object and one or more additional three-dimensional meshes representing the one or more background objects. The series of acts 8700 includes generating the modified two-dimensional image comprising a rendered shadow of the object at the selected position based on the one or more shadow maps, estimated camera parameters of the two-dimensional image, and estimated lighting parameters of the two-dimensional image.

In one or more embodiments, the series of acts 8700 includes generating, utilizing one or more neural networks, a three-dimensional mesh for the two-dimensional image based on pixel depth values corresponding to one or more background objects in a scene of the two-dimensional image. The series of acts 8700 also includes determining, based on the three-dimensional mesh of the two-dimensional image and in response to a request to place an object at a selected position within the scene of the two-dimensional image, estimated three-dimensional characteristics of the object relative to the one or more background objects. The series of acts 8700 further includes generating a modified two-dimensional image comprising one or more updated shadows according to the selected position of the object and the estimated three-dimensional characteristics of the object relative to the one or more background objects.

According to one or more embodiments, the series of acts 8700 includes determining an object segmentation for the one or more background objects in the scene of the two-dimensional image. The series of acts 8700 includes generating one or more three-dimensional meshes representing the one or more background objects within a three-dimensional space. The series of acts 8700 also includes generating a three-dimensional mesh representing the object within the three-dimensional space.

In one or more embodiments, the series of acts 8700 includes determining a three-dimensional position based on the selected position within the scene of the two-dimensional image. The series of acts 8700 includes placing the three-dimensional mesh representing the object within the three-dimensional space at the three-dimensional position.

In one or more embodiments, the series of acts 8700 includes determining that the object comprises a foreground object in the two-dimensional image. Additionally, the series of acts 8700 includes generating a proxy three-dimensional mesh representing the object and hidden from view within a graphical user interface displaying the two-dimensional image.

The series of acts 8700 includes determining, based on features of the object in the two-dimensional image, a symmetric axis of the object. In one or more embodiments, the series of acts 8700 includes generating the proxy three-dimensional mesh representing the object by mirroring a partial three-dimensional mesh corresponding to a visible portion of the object across the symmetric axis.

In one or more embodiments, the series of acts 8700 includes determining a portion of a three-dimensional mesh at a three-dimensional position in three-dimensional space corresponding to an initial position of the object in the two-dimensional image. The series of acts 8700 includes generating, utilizing a smoothing model, a replacement three-dimensional mesh portion at the three-dimensional position according to estimated depth values for a region adjacent to the portion of the three-dimensional mesh in the three-dimensional space. The series of acts 8700 further includes generating, utilizing a neural network, an inpainted region in the modified two-dimensional image according to background features corresponding to the initial position of the object in the two-dimensional image.

In at least some embodiments, the series of acts 8700 includes determining that the request comprises moving the object from a first position within the scene of the two-dimensional image to a second position within the scene of the two-dimensional image. Furthermore, the series of acts 8700 includes generating the modified two-dimensional image by moving the object from the first position within the scene of the two-dimensional image to the second position within the scene of the two-dimensional image. The series of acts 8700 includes generating the modified two-dimensional image by removing, from the two-dimensional image, a first shadow corresponding to the object at the first position. The series of acts 8700 includes generating the modified two-dimensional image by generating, for display within the modified two-dimensional image, a second shadow corresponding to the object at the second position according to the estimated three-dimensional characteristics of the object relative to the one or more background objects.

In one or more embodiments, the series of acts 8700 includes determining estimated three-dimensional characteristics of one or more background objects in a scene of a two-dimensional image. The series of acts 8700 also includes determining, in response to an input interacting with the two-dimensional image within a graphical user interface of a display device, a request to place an object at a selected position within the scene of the two-dimensional image. Additionally, the series of acts 8700 includes generating, for display within the graphical user interface in response to the request, a modified two-dimensional image comprising one or more updated shadows according to the selected position of the object and the estimated three-dimensional characteristics of the one or more background objects.

According to one or more embodiments, the series of acts 8700 includes determining, based on pixel depth values of the two-dimensional image, an object segmentation map for scene of the two-dimensional image comprising a segmentation for the object and one or more additional segmentations for the one or more background objects. Additionally, the series of acts 8700 includes generating, based on the segmentation for the object, a foreground three-dimensional mesh corresponding to the object. The series of acts 8700 also includes generating, based on the one or more additional segmentations for the one or more background objects, one or more background three-dimensional meshes corresponding to the one or more background objects.

In one or more embodiments, the series of acts 8700 includes determining the estimated three-dimensional characteristics of the object relative to the one or more background objects comprises generating a proxy three-dimensional mesh corresponding to the object. The series of acts 8700 also includes generating the modified two-dimensional image comprises generating a shadow for rendering within the modified two-dimensional image based on the proxy three-dimensional mesh corresponding to the object.

The series of acts 8700 further includes determining that the request comprises moving the object from a first position within the scene of the two-dimensional image to a second position within the scene of the two-dimensional image. Additionally, the series of acts 8700 includes generating the modified two-dimensional image by removing a first shadow of the object at the first position, and generating, utilizing a proxy three-dimensional mesh representing the object, a second shadow of the object at the second position according to the estimated three-dimensional characteristics of the one or more background objects.

Figure 88:
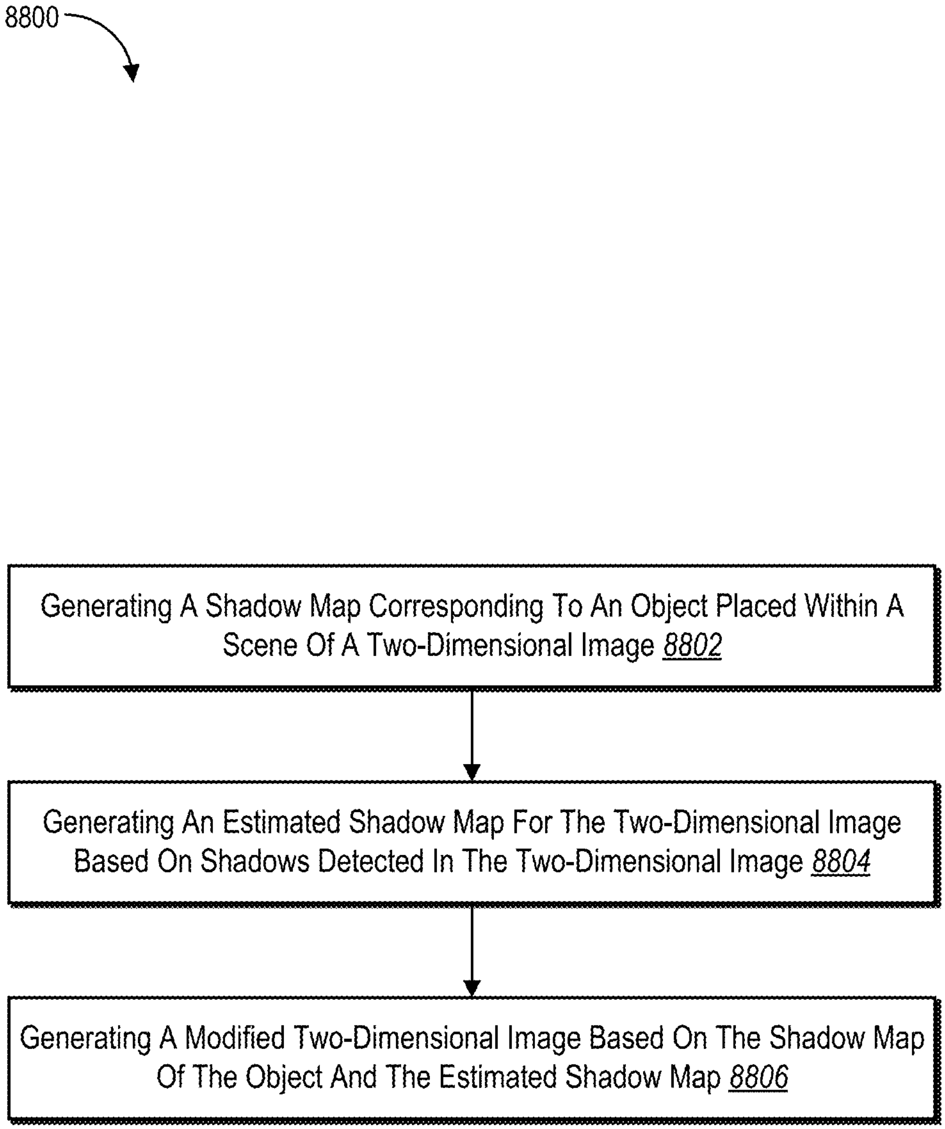
FIG. 88 illustrates a flowchart for a series of acts for modifying shadows in two-dimensional images utilizing a plurality of shadow maps for objects of the two-dimensional images in accordance with one or more embodiments.

Turning now to FIG. 88, this figure shows a flowchart of a series of acts 8800 of modifying shadows in two-dimensional images utilizing a plurality of shadow maps for objects of the two-dimensional images. While FIG. 88 illustrates acts according to one embodiment, alternative embodiments may omit, add to, reorder, and/or modify any of the acts shown in FIG. 88. The acts of FIG. 88 are part of a method. Alternatively, a non-transitory computer readable medium comprises instructions, that when executed by one or more processors, cause the one or more processors to perform the acts of FIG. 88. In still further embodiments, a system includes a processor or server configured to perform the acts of FIG. 88.

As shown, the series of acts 8800 includes an act 8802 of generating a shadow map corresponding to an object placed within a scene of a two-dimensional image. Furthermore, the series of acts 8800 includes an act 8804 of generating an estimated shadow map for the two-dimensional image based on shadows detected in the two-dimensional image. The series of acts 8800 also includes an act 8806 of generating a modified two-dimensional image based on the shadow map of the object and the estimated shadow map.

In one or more embodiments, the series of acts 8800 includes generating, by at least one processor in response to a request to place an object at a selected position within a scene of a two-dimensional image, a shadow map corresponding to the object according to three-dimensional characteristics of the object. In one or more embodiments, the series of acts 8800 includes generating, by the at least one processor, an estimated shadow map for the two-dimensional image based on one or more shadows detected in the two-dimensional image and estimated camera parameters of the two-dimensional image. According to one or more embodiments, the series of acts 8800 includes generating, by the at least one processor in connection with placing the object at the selected position, a modified two-dimensional image based on the shadow map corresponding to the object and the estimated shadow map of the two-dimensional image.

In some embodiments, the series of acts 8800 includes placing a three-dimensional mesh corresponding to the object at a three-dimensional position within a three-dimensional space corresponding to the selected position within the scene of the two-dimensional image. The series of acts 8800 includes determining the shadow map corresponding to the object based on the three-dimensional position of the three-dimensional mesh in the three-dimensional space.

The series of acts 8800 includes determining that the request comprises moving the object from a first position within the scene of the two-dimensional image to a second position within the scene of the two-dimensional image. The series of acts 8800 also includes generating a proxy three-dimensional mesh representing the object according to features of the object extracted from the two-dimensional image.

In some embodiments, the series of acts 8800 includes generating the shadow map based on an estimated camera position of the two-dimensional image, estimated lighting parameters of the two-dimensional image, and the proxy three-dimensional mesh at the three-dimensional position within the three-dimensional space.

The series of acts 8800 includes determining that the request comprises importing the object into the two-dimensional image for placing at the selected position. The series of acts 8800 also includes placing an imported three-dimensional mesh representing the object into the two-dimensional image at the three-dimensional position within the three-dimensional space. The series of acts 8800 also includes generating the shadow map based on an estimated camera position of the two-dimensional image and the imported three-dimensional mesh representing the object at the three-dimensional position within the three-dimensional space.

In one or more embodiments, the series of acts 8800 includes determining an additional object corresponding to the two-dimensional image. The series of acts 8800 also includes generating, in response to the additional object being a different object type than the object, an additional shadow map corresponding to the additional object according to three-dimensional characteristics of the additional object. Additionally, the series of acts 8800 includes generating the modified two-dimensional image based on the shadow map corresponding to the object, the estimated shadow map of the two-dimensional image, and the additional shadow map corresponding to the additional object.

According to one or more embodiments, the series of acts 8800 includes determining, based on the estimated camera parameters of the two-dimensional image, a relative positioning of the object and one or more additional objects corresponding to the two-dimensional image according to the three-dimensional characteristics of the object and estimated three-dimensional characteristics of the one or more additional objects. The series of acts 8800 also includes merging the shadow map of the object and the estimated shadow map of the two-dimensional image based on the relative positioning of the object and the one or more additional objects.

In some examples, the series of acts 8800 includes generating, on the object within the modified two-dimensional image, at least a partial shadow from the one or more additional objects in the two-dimensional image or from a scene shadow detected in the scene of the two-dimensional image according to the relative positioning of the object and the one or more additional objects corresponding to the two-dimensional image.

In one or more embodiments, the series of acts 8800 includes generating, in response to a request to place an object at a selected position within a scene of the two-dimensional image, a first shadow map comprising a first shadow type corresponding to the object according to three-dimensional characteristics of the object at the selected position. In one or more embodiments, the series of acts 8800 includes generating a second shadow map comprising a second shadow type corresponding to the two-dimensional image according to one or more shadows detected in the two-dimensional image and estimated camera parameters of the two-dimensional image. In some embodiments, the series of acts 8800 includes generating a modified two-dimensional image comprising the object at the selected position by merging the first shadow map and the second shadow map in connection with the estimated camera parameters of the two-dimensional image.

In at least some embodiments, the series of acts 8800 includes determining that the object corresponds to an object type comprising a set of object characteristics. For example, the series of acts 8800 includes generating the modified two-dimensional image comprising one or more shadows according to the set of object characteristics of the object type.

In some embodiments, the series of acts 8800 includes generating a proxy three-dimensional mesh for the object in response to determining that the request comprises moving the object from a first position within the scene of the two-dimensional image to a second position within the scene of the two-dimensional image. The series of acts 8800 includes generating the first shadow map based on the proxy three-dimensional mesh and an estimated camera position of the two-dimensional image.

According to one or more embodiments, the series of acts 8800 includes determining, based on the second shadow map of the two-dimensional image and a three-dimensional position of the object, that a shadow portion from the scene of the two-dimensional image is cast on the object. The series of acts 8800 includes generating the modified two-dimensional image comprising the shadow portion from the scene of the two-dimensional image on the object at the selected position.

In one or more embodiments, the series of acts 8800 includes inserting an imported three-dimensional mesh for the object in response to determining that the request comprises inserting the object into the two-dimensional image at the selected position. The series of acts 8800 includes generating the first shadow map based on the imported three-dimensional mesh and an estimated camera position of the two-dimensional image.

In some embodiments, the series of acts 8800 includes determining that the first shadow type comprises a proxy shadow type in connection with a proxy-three-dimensional mesh representing the object. The series of acts 8800 includes determining that the second shadow type comprises a scene shadow type in connection with one or more objects casting one or more shadows within the scene of the two-dimensional image.

The series of acts 8800 includes generating a third shadow map comprising a third shadow type corresponding to an additional object according to three-dimensional characteristics of the additional object, the third shadow type comprising a different shadow type than the first shadow type and the second shadow type. The series of acts 8800 also includes generating the modified two-dimensional image by merging the third shadow map with the first shadow map and the second shadow map.

According to one or more embodiments, the series of acts 8800 includes generating, in response to a request to place a foreground object at a selected position within a scene of a two-dimensional image, a foreground shadow map corresponding to the foreground object according to three-dimensional characteristics of the foreground object. In some embodiments, the series of acts 8800 includes generating a background shadow map for the two-dimensional image based on one or more shadows detected in a background of the two-dimensional image and estimated camera parameters of the two-dimensional image. Additionally, the series of acts 8800 includes generating, in connection with placing the foreground object at the selected position, a modified two-dimensional image by merging the foreground shadow map and the background shadow map.

In some embodiments, the series of acts 8800 includes determining that the request comprises moving the foreground object from a first position within the scene of the two-dimensional image to a second position within the scene of the two-dimensional image. The series of acts 8800 includes generating, based on the request, a proxy three-dimensional mesh representing the foreground object according to features of the foreground object in the two-dimensional image. Additionally, the series of acts 8800 includes generating the foreground shadow map based on a proxy shadow corresponding to the proxy three-dimensional mesh and an estimated camera position of the two-dimensional image.

The series of acts 8800 includes generating a pixel depth map corresponding to pixels of the two-dimensional image. The series of acts 8800 also includes generating the background shadow map based on the one or more shadows detected in the background of the two-dimensional image, the pixel depth map, and the estimated camera parameters of the two-dimensional image.

In one or more embodiments, the series of acts 8800 includes determining a position of a particular object relative to the foreground object and the background of the two-dimensional image based on a three-dimensional representation of the scene of the two-dimensional image. The series of acts 8800 also includes determining, based on the position of the particular object relative to the foreground object and the background, that a shadow of the foreground object or the one or more shadows detected in the background cover a portion of the particular object utilizing the foreground shadow map and the background shadow map.

Figure 89:
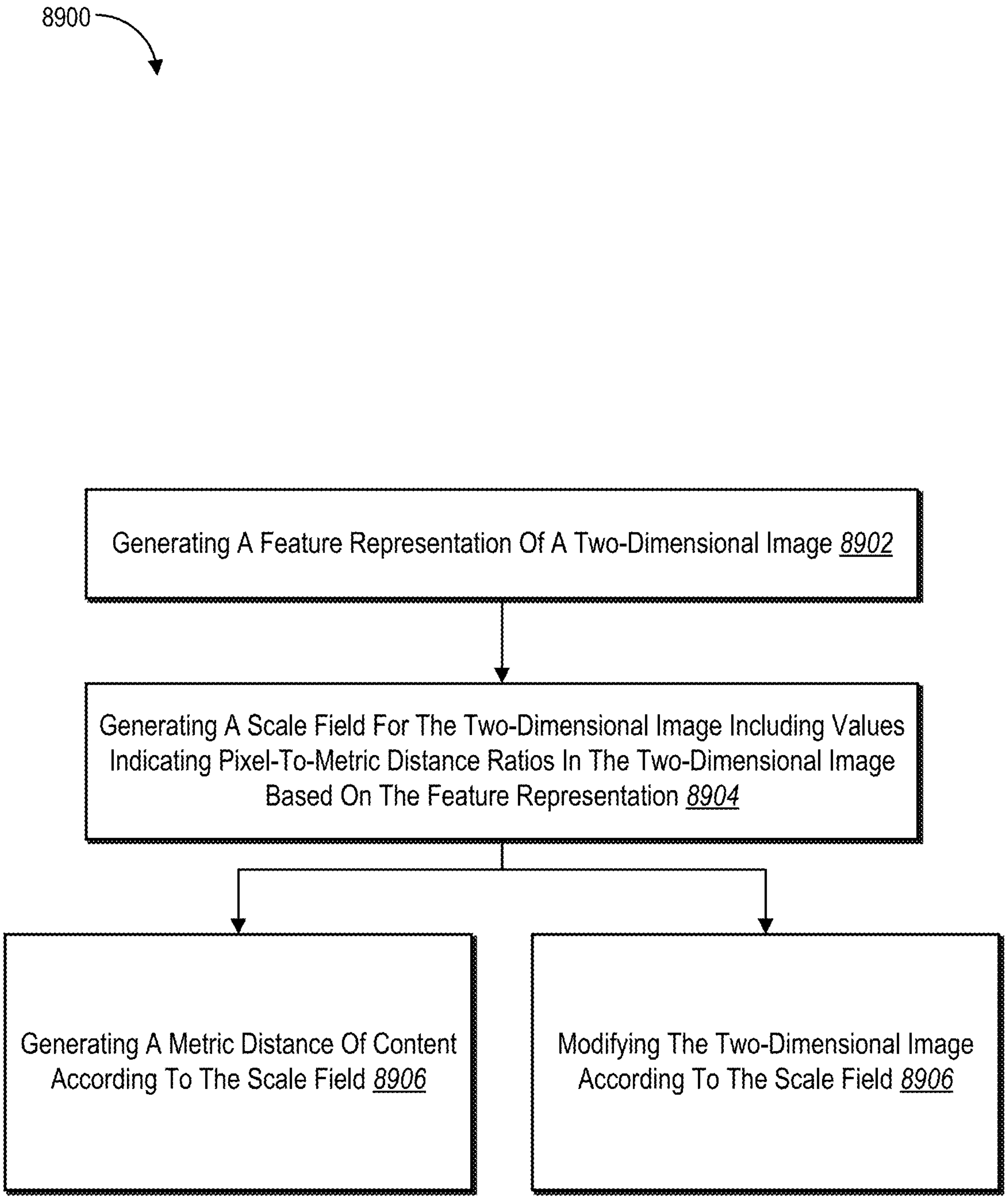
FIG. 89 illustrates a flowchart for a series of acts for generating scale fields indicating pixel-to-metric distance ratios of two-dimensional images in accordance with one or more embodiments.

Turning now to FIG. 89, this figure shows a flowchart of a series of acts 8900 of generating scale fields indicating pixel-to-metric distance ratios of two-dimensional images. While FIG. 89 illustrates acts according to one embodiment, alternative embodiments may omit, add to, reorder, and/or modify any of the acts shown in FIG. 89. The acts of FIG. 89 are part of a method. Alternatively, a non-transitory computer readable medium comprises instructions, that when executed by one or more processors, cause the one or more processors to perform the acts of FIG. 89. In still further embodiments, a system includes a processor or server configured to perform the acts of FIG. 89.

As shown, the series of acts 8900 includes an act 8902 of generating a feature representation of a two-dimensional image. Furthermore, the series of acts 8900 includes an act 8904 of generating a scale field for the two-dimensional image including values indicating pixel-to-metric distance ratios in the two-dimensional image based on the feature representation. The series of acts 8900 also includes an act 8906 of generating a metric distance of content according to the scale field. Alternatively, the series of acts 8900 includes an act 8908 of modifying the two-dimensional image according to the scale field.

In one or more embodiments, the series of acts 8900 includes generating, utilizing one or more neural networks, a feature representation of a two-dimensional image. In some embodiments, the series of acts 8900 includes generating, utilizing the one or more neural networks and based on the feature representation, a scale field for the two-dimensional image comprising a plurality of values indicating ratios of pixel distances in the two-dimensional image to metric distances in a three-dimensional space corresponding to the two-dimensional image. In additional embodiments, the series of acts 8900 includes performing at least one of generating a metric distance of content portrayed in the two-dimensional image according to the scale field of the two-dimensional image, or modifying, by the at least one processor, the two-dimensional image according to the scale field of the two-dimensional image.

In some embodiments, the series of acts 8900 includes generating, utilizing the one or more neural networks and based on the feature representation, a plurality of ground-to-horizon vectors in the three-dimensional space according to a horizon line of the two-dimensional image in the three-dimensional space. In additional embodiments, the series of acts 8900 includes generating a ground-to-horizon vector indicating a distance and a direction from a three-dimensional point corresponding to a pixel of the two-dimensional image to the horizon line in the three-dimensional space.

According to one or more embodiments, the series of acts 8900 includes generating, for a pixel of the two-dimensional image, a ratio indicating a ratio of pixel distance in the two-dimensional image to a corresponding three-dimensional distance in the three-dimensional space relative to a camera height of the two-dimensional image.

In at least some embodiments, the series of acts 8900 includes determining a pixel distance between a first pixel corresponding to the content and a second pixel corresponding to the content. The series of acts 8900 includes generating the metric distance based on the pixel distance and the ratios of pixel distances in the two-dimensional image to metric distances in the three-dimensional space.

The series of acts 8900 includes determining a value of the scale field corresponding to the first pixel. Additionally, the series of acts 8900 includes converting the value of the scale field corresponding to the first pixel to the metric distance based on the pixel distance between the first pixel and the second pixel.

In additional embodiments, the series of acts 8900 includes determining a pixel position of an object placed within the two-dimensional image, and determining a scale of the object based on the pixel position and the scale field. The series of acts 8900 includes determining an initial size of the object, and inserting the object at the pixel position with a modified size based on a ratio indicated by a value from the scale field at the pixel position of the object.

In one or more embodiments, the series of acts 8900 includes generating, for a two-dimensional image, estimated depth values for a plurality of pixels of the two-dimensional image projected to a corresponding three-dimensional space. The series of acts 8900 further includes determining, for the two-dimensional image, a horizon line according to an estimated camera height of the two-dimensional image. The series of acts 8900 also includes generating, for the two-dimensional image, a ground-truth scale field based on a plurality of ground-to-horizon vectors in the corresponding three-dimensional space according to the estimated depth values for the plurality of pixels and the horizon line. Additionally, the series of acts 8900 includes modifying parameters of the one or more neural networks based on the ground-truth scale field of the two-dimensional image.

According to one or more embodiments, the series of acts 8900 includes generating, for a two-dimensional image of a plurality of two-dimensional images, estimated depth values for a plurality of pixels of the two-dimensional image projected to a three-dimensional space. The series of acts 8900 further includes generating, for the two-dimensional image, a scale field comprising a plurality of values indicating ratios of ground-to-horizon vector lengths in the three-dimensional space relative to pixel distances for the plurality of pixels of the two-dimensional image according to a horizon line of the two-dimensional image. Additionally, the series of acts 8900 includes modifying parameters of one or more neural networks based on the scale field of the two-dimensional image.

In one or more embodiments, the series of acts 8900 includes projecting the plurality of pixels of the two-dimensional image to the three-dimensional space utilizing one or more neural networks. The series of acts 8900 also includes determining the horizon line in the three-dimensional space based on a camera height of the two-dimensional image. Additionally, the series of acts 8900 includes generating, based on the estimated depth values, a plurality of ground-to-horizon vectors representing a plurality of metric distances between ground points corresponding to the plurality of pixels of the two-dimensional image and the horizon line in the three-dimensional space.

According to one or more embodiments, the series of acts 8900 includes determining a pixel distance between a first pixel of the plurality of pixels and a second pixel corresponding the horizon line of the two-dimensional image. The series of acts 8900 also includes generating, for the first pixel, a value representing a ratio between the pixel distance and a camera height corresponding to the two-dimensional image.

In some embodiments, the series of acts 8900 includes generating, utilizing the one or more neural networks, an estimated scale field for the two-dimensional image. The series of acts 8900 also includes determining a loss based on the scale field of the two-dimensional image and the estimated scale field of the two-dimensional image. The series of acts 8900 further includes modifying the parameters of the one or more neural networks based on the loss.

In one or more embodiments, the series of acts 8900 includes generating, utilizing the one or more neural networks, a feature representation of an additional two-dimensional image. The series of acts 8900 further includes generating, utilizing the one or more neural networks, an additional scale field for the additional two-dimensional image. In one or more embodiments, the series of acts 8900 includes modifying the additional two-dimensional image by placing an object within the additional two-dimensional image with an object size based on the additional scale field of the additional two-dimensional image. In some embodiments, the series of acts 8900 includes determining a metric distance of content portrayed in the additional two-dimensional image according to the additional scale field of the additional two-dimensional image.

According to one or more embodiments, the series of acts 8900 includes generating, utilizing one or more neural networks comprising parameters learned from a plurality of digital images with annotated horizon lines and ground-to-horizon vectors, a feature representation of a two-dimensional image. The series of acts 8900 also includes generating, utilizing the one or more neural networks and based on the feature representation, a scale field for the two-dimensional image comprising a plurality of values indicating ratios of pixel distances relative to a camera height of the two-dimensional image. In some embodiments, the series of acts 8900 includes performing at least one of generating a metric distance of an object portrayed in the two-dimensional image according to the scale field of the two-dimensional image, or modifying the two-dimensional image according to the scale field of the two-dimensional image.

In one or more embodiments, the series of acts 8900 includes generating, for a pixel of the two-dimensional image, a value representing a ratio between a pixel distance from the pixel to a horizon line of the two-dimensional image and a camera height of the two-dimensional image.

The series of acts 8900 also includes determining a pixel corresponding to the location of the two-dimensional image. The series of acts 8900 also includes determining a scaled size of the object based on a value from the scale field for the pixel corresponding to the location of the two-dimensional image. The series of acts 8900 further includes inserting the object at the location of the two-dimensional image according to the scaled size of the object.

Figure 90:
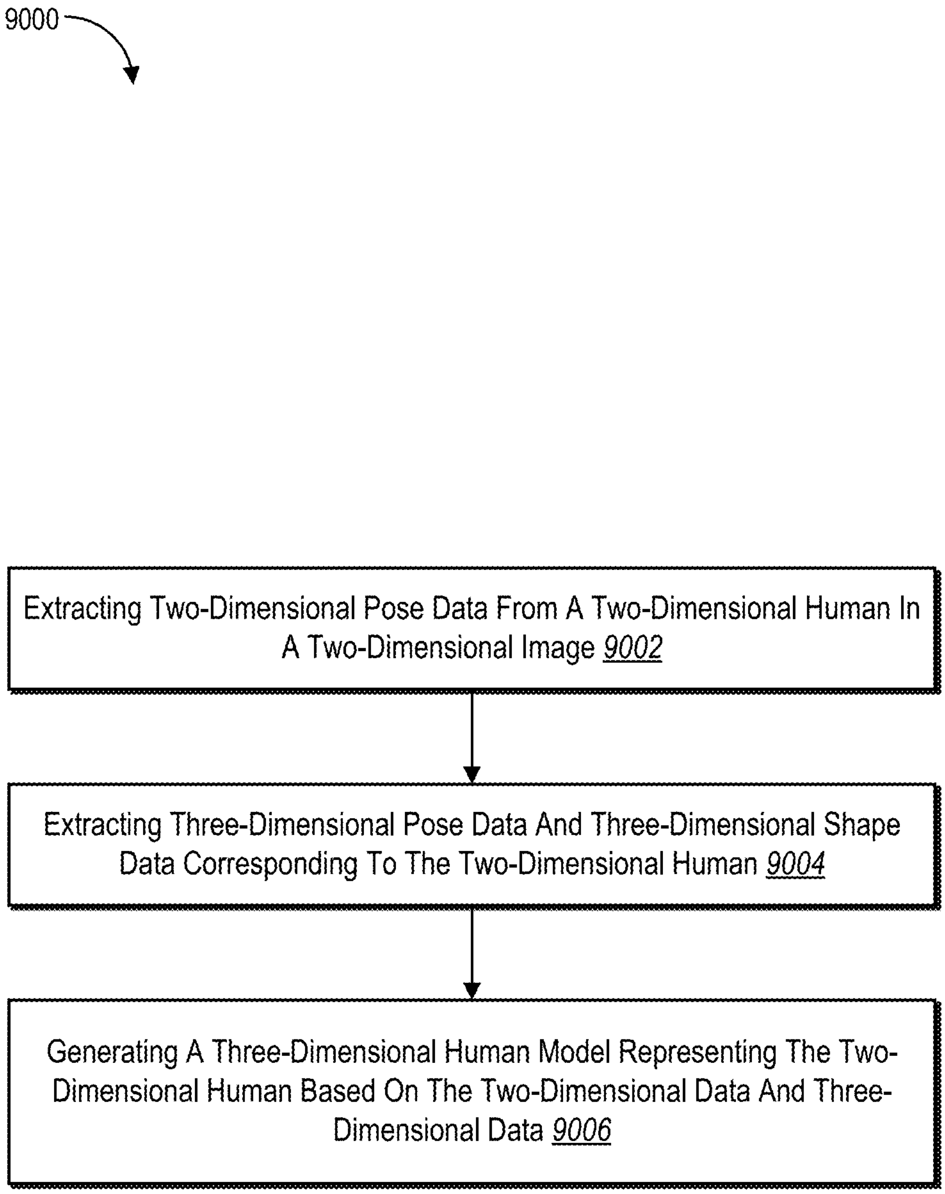
FIG. 90 illustrates a flowchart for a series of acts for generating three-dimensional human models of two-dimensional humans in a two-dimensional image in accordance with one or more embodiments.

Turning now to FIG. 90, this figure shows a flowchart of a series of acts 9000 of generating three-dimensional human models of two-dimensional humans in a two-dimensional image. While FIG. 90 illustrates acts according to one embodiment, alternative embodiments may omit, add to, reorder, and/or modify any of the acts shown in FIG. 90. The acts of FIG. 90 are part of a method. Alternatively, a non-transitory computer readable medium comprises instructions, that when executed by one or more processors, cause the one or more processors to perform the acts of FIG. 90. In still further embodiments, a system includes a processor or server configured to perform the acts of FIG. 90.

As shown, the series of acts 9000 includes an act 9002 of extracting two-dimensional pose data from a two-dimensional human in a two-dimensional image. Furthermore, the series of acts 9000 includes an act 9004 of extracting three-dimensional pose data and three-dimensional shape data corresponding to the two-dimensional human. The series of acts 9000 also includes an act 9006 of generating a three-dimensional human model representing the two-dimensional human based on the two-dimensional data and three-dimensional data.

In one or more embodiments, the series of acts 9000 includes extracting, utilizing one or more neural networks, two-dimensional pose data from a two-dimensional human extracted from a two-dimensional image. In some embodiments, the series of acts 9000 includes extracting, utilizing the one or more neural networks, three-dimensional pose data and three-dimensional shape data corresponding to the two-dimensional human extracted from the two-dimensional image. In further embodiments, the series of acts 9000 includes generating, within a three-dimensional space corresponding to the two-dimensional image, a three-dimensional human model representing the two-dimensional human by combining the two-dimensional pose data with the three-dimensional pose data and the three-dimensional shape data.

According to one or more embodiments, the series of acts 9000 includes extracting, utilizing a first neural network, the two-dimensional pose data comprising a two-dimensional skeleton with two-dimensional bones and annotations indicating one or more portions of the two-dimensional skeleton. The series of acts 9000 also includes extracting, utilizing a second neural network, the three-dimensional pose data comprising a three-dimensional skeleton with three-dimensional bones and the three-dimensional shape data comprising a three-dimensional mesh according to the two-dimensional human. The series of acts 9000 also includes extracting, utilizing a third neural network for hand-specific bounding boxes, three-dimensional hand pose data corresponding to one or more hands of the two-dimensional human.

In one or more embodiments, the series of acts 9000 includes iteratively adjusting one or more bones in the three-dimensional pose data according to one or more corresponding bones in the two-dimensional pose data. In additional embodiments, the series of acts 9000 includes iteratively connecting one or more hand skeletons with three-dimensional hand pose data to a body skeleton with three-dimensional body pose data.

In some embodiments, the series of acts 9000 includes generating, in response to an indication to modify a pose of the two-dimensional human within the two-dimensional image, a modified three-dimensional human model with modified three-dimensional pose data. The series of acts 9000 includes generating a modified two-dimensional image comprising a modified two-dimensional human based on the modified three-dimensional human model.

The series of acts 9000 includes determining, in response to the three-dimensional human model comprising the modified three-dimensional pose data, an interaction between the modified three-dimensional human model and an additional three-dimensional model within the three-dimensional space corresponding to the two-dimensional image. The series of acts 9000 also includes generating the modified two-dimensional image comprising the modified two-dimensional human according to the interaction between the modified three-dimensional human model and the additional three-dimensional model.

In at least some embodiments, the series of acts 9000 includes generating a cropped image corresponding to a boundary of the two-dimensional human in the two-dimensional image. The series of acts 9000 includes extracting the two-dimensional pose data from the cropped image utilizing the one or more neural networks.

In one or more embodiments, the series of acts 9000 includes extracting, utilizing one or more neural networks, two-dimensional pose data corresponding to a two-dimensional skeleton for a two-dimensional human extracted from the two-dimensional image. In some embodiments, the series of acts 9000 includes extracting, utilizing the one or more neural networks, three-dimensional pose data and three-dimensional shape data corresponding to a three-dimensional skeleton for the two-dimensional human extracted from the two-dimensional image. The series of acts 9000 also includes generating, within a three-dimensional space corresponding to the two-dimensional image, a three-dimensional human model representing the two-dimensional human by refining the three-dimensional skeleton of the three-dimensional pose data according to the two-dimensional skeleton of the two-dimensional pose data and the three-dimensional shape data.

In one or more embodiments, the series of acts 9000 includes extracting the two-dimensional pose data from the two-dimensional image utilizing a first neural network of the one or more neural networks. The series of acts 9000 also includes extracting the three-dimensional pose data and the three-dimensional shape data utilizing a second neural network of the one or more neural networks.

In some embodiments, the series of acts 9000 includes generating a body bounding box corresponding to a body portion of the two-dimensional human. The series of acts 9000 includes extracting, utilizing a neural network, three-dimensional pose data corresponding to the body portion of the two-dimensional human according to the body bounding box.

In some embodiments, the series of acts 9000 includes generating one or more hand bounding boxes corresponding to one or more hands of the two-dimensional human. The series of acts 9000 also includes extracting, utilizing an additional neural network, additional three-dimensional pose data corresponding to the one or more hands of the two-dimensional human according to the one or more hand bounding boxes.

In one or more embodiments, the series of acts 9000 includes combining the three-dimensional pose data corresponding to the body portion of the two-dimensional human with the additional three-dimensional pose data corresponding to the one or more hands of the two-dimensional human. The series of acts 9000 includes iteratively modifying positions of bones in the three-dimensional skeleton based on positions of bones in the two-dimensional skeleton.

In one or more embodiments, the series of acts 9000 includes modifying a pose of the three-dimensional human model within the three-dimensional space. The series of acts 9000 also includes generating a modified pose of the two-dimensional human within the two-dimensional image according to the pose of the three-dimensional human model in the three-dimensional space. The series of acts 9000 further includes generating, utilizing the one or more neural networks, the modified two-dimensional image comprising a modified two-dimensional human according to the modified pose of the two-dimensional human and a camera position associated with the two-dimensional image.

According to one or more embodiments, the series of acts 9000 includes extracting, utilizing one or more neural networks, two-dimensional pose data from a two-dimensional human extracted from a two-dimensional image. The series of acts 9000 includes extracting, utilizing the one or more neural networks, three-dimensional pose data and three-dimensional shape data corresponding to the two-dimensional human extracted from the two-dimensional image. Additionally, the series of acts 9000 includes generating, within a three-dimensional space corresponding to the two-dimensional image, a three-dimensional human model representing the two-dimensional human by combining the two-dimensional pose data with the three-dimensional pose data and the three-dimensional shape data.

In one or more embodiments, the series of acts 9000 includes extracting the two-dimensional pose data comprises extracting a two-dimensional skeleton from a cropped portion of the two-dimensional image utilizing a first neural network of the one or more neural networks. The series of acts 9000 includes extracting the three-dimensional pose data comprises extracting a three-dimensional skeleton from the cropped portion of the two-dimensional image utilizing a second neural network of the one or more neural networks.

In at least some embodiments, the series of acts 9000 includes extracting a first three-dimensional skeleton corresponding to a first portion of the two-dimensional human utilizing a first neural network. In one or more embodiments, the series of acts 9000 includes extracting a second three-dimensional skeleton corresponding to a second portion of the two-dimensional human comprising a hand utilizing a second neural network.

In one or more embodiments, the series of acts 9000 includes iteratively modifying positions of bones of the second three-dimensional skeleton according to positions of bones of the first three-dimensional skeleton within the three-dimensional space to merge the first three-dimensional skeleton and the second three-dimensional skeleton. The series of acts 9000 includes iteratively modifying positions of bones in the first three-dimensional skeleton according to positions of bones of a two-dimensional skeleton from the two-dimensional pose data.

Figure 91:
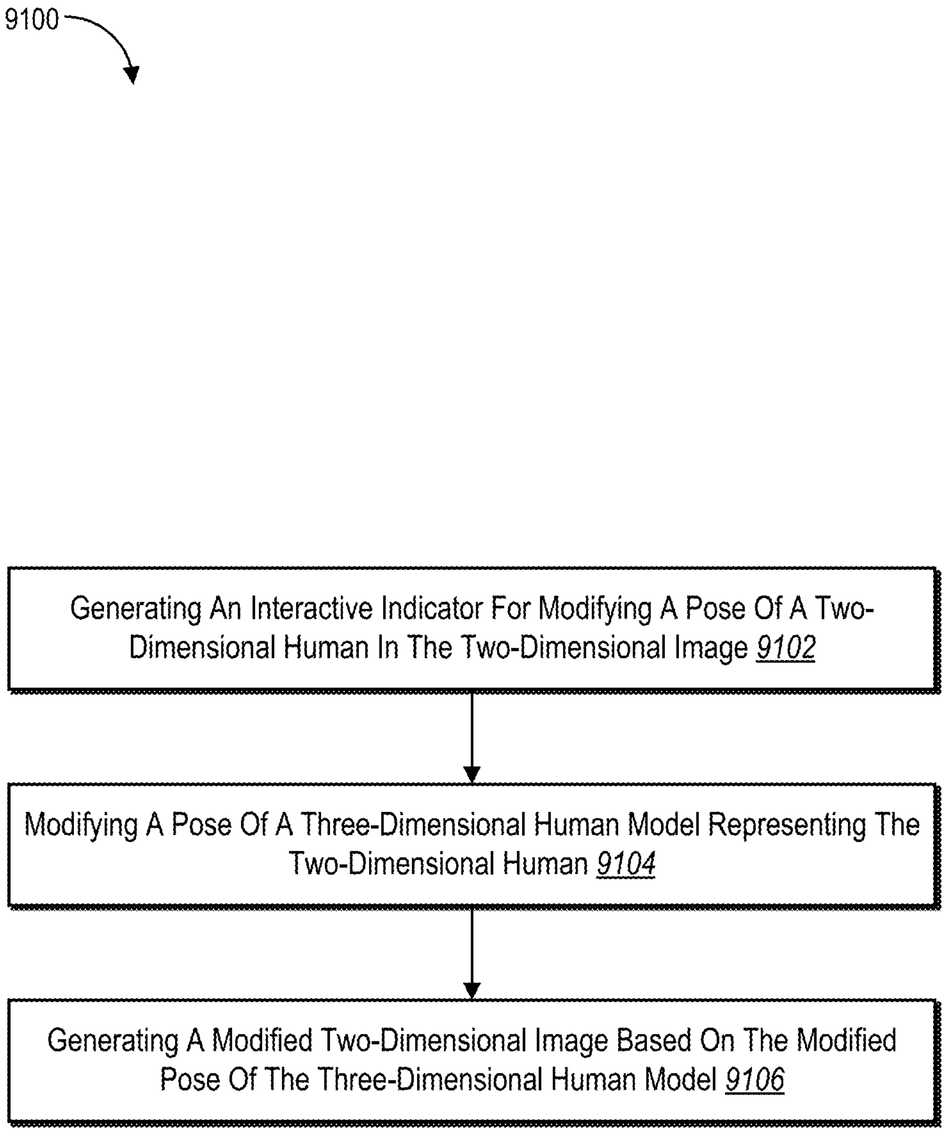
FIG. 91 illustrates a flowchart for a series of acts for modifying two-dimensional images based on modifying poses of three-dimensional human models representing two-dimensional humans of the two-dimensional images in accordance with one or more embodiments.

Turning now to FIG. 91, this figure shows a flowchart of a series of acts 9100 of modifying two-dimensional images based on modifying poses of three-dimensional human models representing two-dimensional humans of the two-dimensional images. While FIG. 91 illustrates acts according to one embodiment, alternative embodiments may omit, add to, reorder, and/or modify any of the acts shown in FIG. 91. The acts of FIG. 91 are part of a method. Alternatively, a non-transitory computer readable medium comprises instructions, that when executed by one or more processors, cause the one or more processors to perform the acts of FIG. 91. In still further embodiments, a system includes a processor or server configured to perform the acts of FIG. 91.

As shown, the series of acts 9100 includes an act 9102 of generating an interactive indicator for modifying a pose of a two-dimensional human in the two-dimensional image. Furthermore, the series of acts 9100 includes an act 9104 of modifying a pose of a three-dimensional human model representing the two-dimensional human. The series of acts 9100 also includes an act 9106 of generating a modified two-dimensional image based on the modified pose of the three-dimensional human model.

In one or more embodiments, the series of acts 9100 includes generating, for display within a graphical user interface of a client device, an interactive indicator with a two-dimensional image in connection with modifying a pose of a two-dimensional human in the two-dimensional image. In some embodiments, the series of acts 9100 includes modifying, in response to an interaction with the interactive indicator, a pose of a three-dimensional human model representing the two-dimensional human. In at least some embodiments, the series of acts 9100 includes generating a modified two-dimensional image comprising a modified two-dimensional human in the two-dimensional image according to the pose of the three-dimensional human model.

According to one or more embodiments, the series of acts 9100 includes generating, utilizing one or more neural networks, the three-dimensional human model within a three-dimensional space according to the two-dimensional human in the two-dimensional image. The series of acts 9100 includes generating the interactive indicator in response to generating the three-dimensional human model within the three-dimensional space.

In one or more embodiments, the series of acts 9100 includes determining, utilizing the one or more neural networks, a camera position corresponding to the two-dimensional image. The series of acts 9100 includes inserting the three-dimensional human model at a location within the three-dimensional space based on the camera position corresponding to the two-dimensional image. Additionally, the series of acts 9100 includes providing the three-dimensional human model for display within the graphical user interface of the client device with the two-dimensional image.

According to one or more embodiments, the series of acts 9100 includes extracting, utilizing one or more neural networks, two-dimensional pose data from the two-dimensional human in the two-dimensional image. The series of acts 9100 includes extracting, utilizing the one or more neural networks, three-dimensional pose data from the two-dimensional human in the two-dimensional image. The series of acts 9100 also includes generating, at the location within the three-dimensional space, the three-dimensional human model based on the two-dimensional pose data and the three-dimensional pose data.

In one or more embodiments, the series of acts 9100 includes providing the three-dimensional human model as an overlay within the graphical user interface of the client device based on a position of the two-dimensional human in the two-dimensional image.

In some embodiments, the series of acts 9100 includes determining an initial pose of the three-dimensional human model based on the pose of the two-dimensional human in the two-dimensional image. The series of acts 9100 includes modifying the pose of the three-dimensional human model based on the initial pose of the three-dimensional human model and the interaction with the interactive indicator.

In one or more embodiments, the series of acts 9100 includes determining a range of motion of one or more portions of the three-dimensional human model according to the initial pose of the three-dimensional human model and a target pose of the three-dimensional human model. Additionally, the series of acts 9100 includes providing, for display within the graphical user interface of the client device in connection with the interaction with the interactive indicator, a corresponding range of motion of one or more corresponding portions of the two-dimensional human.

In some embodiments, the series of acts 9100 includes generating the modified two-dimensional human based on the pose of the three-dimensional human model and an initial texture of the two-dimensional human. In one or more embodiments, the series of acts 9100 includes generating the modified two-dimensional image comprising the modified two-dimensional human.

Furthermore, the series of acts 9100 includes determining, within a three-dimensional space and based on the pose of the three-dimensional human model, an interaction between the three-dimensional human model and a three-dimensional object corresponding to a two-dimensional object in the two-dimensional image. The series of acts 9100 further includes generating the modified two-dimensional image representing an interaction between the modified two-dimensional human and the two-dimensional object according to the interaction between the three-dimensional human model and the three-dimensional object.

In one or more embodiments, the series of acts 9100 includes generating, for display within a graphical user interface of a client device, a three-dimensional human model representing a two-dimensional human of the two-dimensional image in a three-dimensional space. The series of acts 9100 includes generating, for display within the graphical user interface of the client device, an interactive indicator in connection with modifying a pose of the three-dimensional human model representing the two-dimensional human in the two-dimensional image. Additionally, the series of acts 9100 includes modifying, in response to an interaction with the interactive indicator, a pose of a three-dimensional human model representing the two-dimensional human in the three-dimensional space. The series of acts 9100 also includes generating a modified two-dimensional image comprising a modified two-dimensional human in the two-dimensional image according to the pose of the three-dimensional human model.

In one or more embodiments, the series of acts 9100 includes generating, utilizing a plurality of neural networks, the three-dimensional human model within the three-dimensional space according to a position of the two-dimensional human within a scene of the two-dimensional image. The series of acts 9100 includes generating the interactive indicator comprising one or more controls for modifying one or more portions of the three-dimensional human model within the three-dimensional space.

Additionally, the series of acts 9100 includes modifying the pose of the three-dimensional human model by modifying, in response to the interaction with the interactive indicator, a pose of a portion of the three-dimensional human model according to the one or more controls. The series of acts 9100 includes modifying, within the graphical user interface of the client device, a pose of a portion of the two-dimensional human corresponding to the portion of the three-dimensional human model in connection with the interaction with the interactive indicator.

According to one or more embodiments, the series of acts 9100 includes determining a motion constraint associated with a portion of the three-dimensional human model based on a pose prior corresponding to the portion of the three-dimensional human model. The series of acts 9100 includes modifying the portion of the three-dimensional human model according to the motion constraint.

In one or more embodiments, the series of acts 9100 includes determining an initial texture corresponding to the three-dimensional human model based on the two-dimensional human of the two-dimensional image. The series of acts 9100 includes generating, utilizing a neural network, the modified two-dimensional image according to the pose of the three-dimensional human model and the initial texture corresponding to the three-dimensional human model.

In some embodiments, the series of acts 9100 includes determining a background region of the two-dimensional image obscured by the two-dimensional human according to an initial pose of the two-dimensional human. The series of acts 9100 further includes generating, for display within the graphical user interface of the client device in connection with modifying the pose of the two-dimensional human, an inpainted region for the background region of the two-dimensional image.

According to some embodiments, the series of acts 9100 includes determining, in response to an additional interaction with an additional interactive indicator, a modified shape of the three-dimensional human model within the three-dimensional space. Additionally, the series of acts 9100 includes generating the modified two-dimensional image comprising the modified two-dimensional human in the two-dimensional image according to the pose of the three-dimensional human model and the modified shape of the three-dimensional human model.

In some embodiments, the series of acts 9100 includes generating, for display within a graphical user interface of a client device, an interactive indicator with a two-dimensional image in connection with modifying a pose of a two-dimensional human in the two-dimensional image. The series of acts 9100 also includes modifying, in response to an interaction with the interactive indicator, a pose of a three-dimensional human model representing the two-dimensional human. Additionally, the series of acts 9100 includes generating a modified two-dimensional image comprising a modified two-dimensional human in the two-dimensional image according to the pose of the three-dimensional human model.

In at least some embodiments, the series of acts 9100 includes generating, utilizing a plurality of neural networks, the three-dimensional human model within a three-dimensional space according to a three-dimensional pose and a three-dimensional shape extracted from the two-dimensional human in the two-dimensional image. The series of acts 9100 also includes generating the interactive indicator in response to generating the three-dimensional human model within the three-dimensional space.

In some embodiments, the series of acts 9100 includes modifying the pose of the three-dimensional human model comprises determining, in response to the interaction with the interactive indicator, a request to change an initial pose of the three-dimensional human model to a target pose of the three-dimensional human model. The series of acts 9100 further includes generating the modified two-dimensional image comprises modifying a pose of the two-dimensional human based on the initial pose of the three-dimensional human model and the target pose of the three-dimensional human model.

In one or more embodiments, the series of acts 9100 includes generating, utilizing a plurality of neural networks, the three-dimensional human model based on an initial pose of the two-dimensional human in the two-dimensional image. The series of acts 9100 includes providing, for display within the graphical user interface of the client device, the three-dimensional human model and the interactive indicator as an overlay in the two-dimensional image at a position corresponding to the two-dimensional human in the two-dimensional image.

Figure 92:
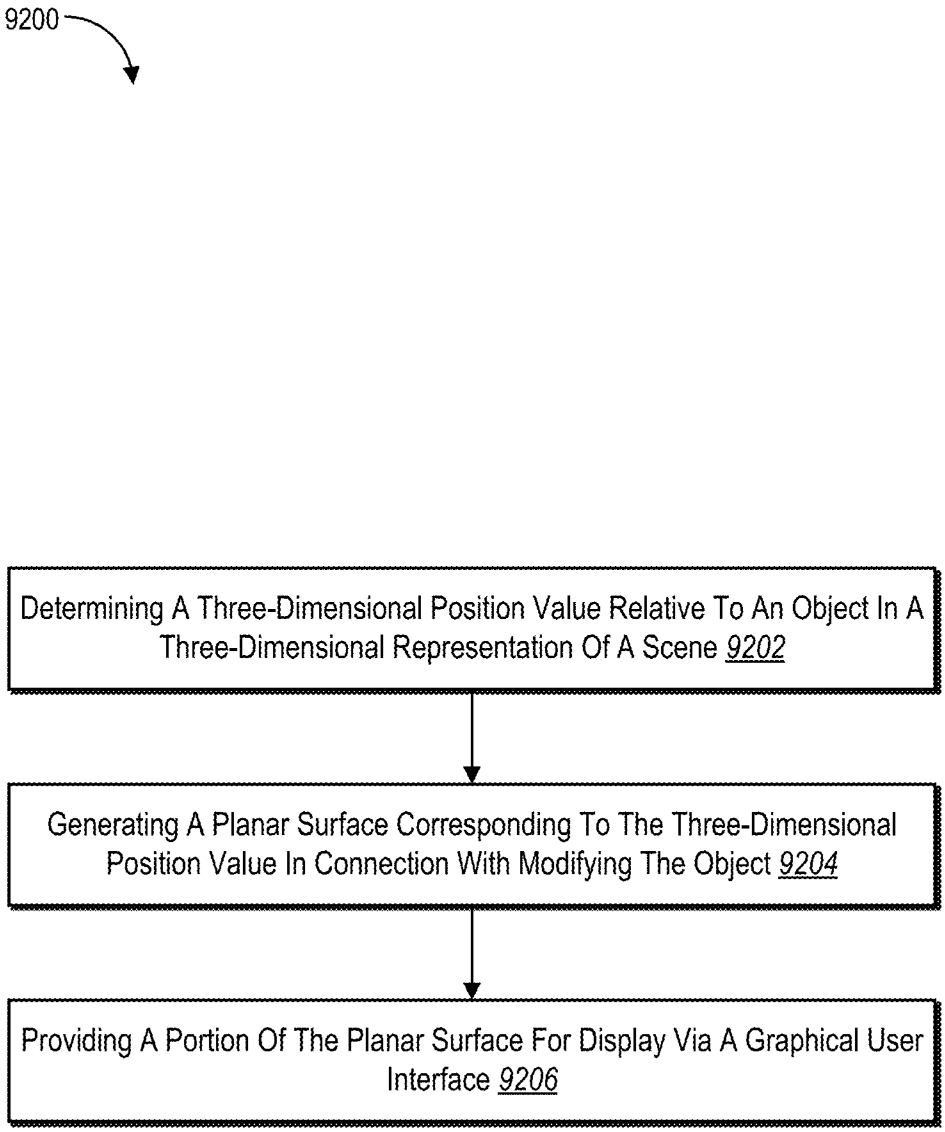
FIG. 92 illustrates a flowchart for a series of acts for generating planar surfaces for transforming objects in two-dimensional images based on three-dimensional representations of the two-dimensional images in accordance with one or more embodiments.

Turning now to FIG. 92, this figure shows a flowchart of a series of acts 9200 of generating planar surfaces for transforming objects in two-dimensional images based on three-dimensional representations of the two-dimensional images. While FIG. 92 illustrates acts according to one embodiment, alternative embodiments may omit, add to, reorder, and/or modify any of the acts shown in FIG. 92. The acts of FIG. 92 are part of a method. Alternatively, a non-transitory computer readable medium comprises instructions, that when executed by one or more processors, cause the one or more processors to perform the acts of FIG. 92. In still further embodiments, a system includes a processor or server configured to perform the acts of FIG. 92.

As shown, the series of acts 9200 includes an act 9202 of determining a three-dimensional position value relative to an object in a three-dimensional representation of a scene. Furthermore, the series of acts 9200 includes an act 9204 of generating a planar surface corresponding to the three-dimensional position value in connection with modifying the object. The series of acts 9200 also includes an act 9206 of providing a portion of the planar surface for display via a graphical user interface.

In one or more embodiments, the series of acts 9200 includes determining a three-dimensional position value relative to a portion of an object of one or more objects of a three-dimensional representation of a scene on one or more axes within a three-dimensional space. In some embodiments, the series of acts 9200 includes generating, in connection with modifying the object within the three-dimensional space, a planar surface corresponding to the three-dimensional position value relative to the portion of the object on the one or more axes within the three-dimensional space. According to one or more embodiments, the series of acts 9200 includes providing a portion of the planar surface for display via a graphical user interface of a client device.

In some embodiments, the series of acts 9200 includes generating the planar surface on the one or more axes within the three-dimensional space in response to a selection of the object via the graphical user interface.

According to one or more embodiments, the series of acts 9200 includes generating a partially transparent texture for the portion of the planar surface for display within the graphical user interface of the client device.

In one or more embodiments, the series of acts 9200 includes detecting a movement of the object from a first position to a second position within the three-dimensional space. The series of acts 9200 also includes modifying a position of the planar surface from the first position to the second position in response to the movement of the object.

In some embodiments, the series of acts 9200 includes determining, in response to a selection of the object via the graphical user interface, the portion of the object according to a position of the object on the one or more axes within the three-dimensional space.

In one or more embodiments, the series of acts 9200 includes modifying a visual characteristic of the portion of the planar surface in response to detecting a change in a position of the object relative to the planar surface along an axis of the one or more axes.

According to one or more embodiments, the series of acts 9200 includes providing, for display within the graphical user interface, an option to snap a position of the object to a nearest surface along an axis of the one or more axes within the three-dimensional space. The series of acts 9200 includes moving the object to a position adjacent to the nearest surface along the axis of the one or more axes within the three-dimensional space in response to a selection of the option. The series of acts 9200 also includes modifying a position of the planar surface or a texture of the planar surface in response to moving the object to the position adjacent to the nearest surface.

In one or more embodiments, the series of acts 9200 includes determining a size or a shape of the planar surface for display via the graphical user interface based on the object.

In some embodiments, the series of acts 9200 includes determining that a distance between the object and an additional object within the three-dimensional space is below a threshold distance. The series of acts 9200 includes generating, for display via the graphical user interface of the client device, an additional planar surface corresponding to a surface of the additional object in response to the distance between the object and the additional object being below the threshold distance. The series of acts 9200 also includes determining a size of a visible portion of the additional planar surface according to the distance between the object and the additional object.

In one or more embodiments, the series of acts 9200 includes determining, within a three-dimensional space, a three-dimensional representation of a scene of a two-dimensional image comprising one or more objects. The series of acts 9200 also includes determining a three-dimensional position value relative to a portion of an object of the one or more objects in the three-dimensional representation of the scene on one or more axes within the three-dimensional space. Additionally, the series of acts 9200 includes generating, in connection with modifying a position of the object within the three-dimensional space, a planar surface corresponding to the three-dimensional position value relative to the portion of the object on the one or more axes within the three-dimensional space. In some embodiments, the series of acts 9200 includes provide a portion of the planar surface for display via a graphical user interface of a client device.

According to one or more embodiments, the series of acts 9200 includes generating, utilizing one or more neural networks, one or more foreground three-dimensional meshes representing one or more foreground objects in the two-dimensional image. The series of acts 9200 also includes generating, utilizing the one or more neural networks, a background three-dimensional mesh representing a background in the two-dimensional image.

In one or more embodiments, the series of acts 9200 includes determining, within the three-dimensional space, an input comprising a selection of the object and an indication to move the object within the three-dimensional space. The series of acts 9200 includes modifying the position of the object and a position of the portion of the planar surface within the three-dimensional space in response to the input.

In some embodiments, the series of acts 9200 includes determining, within the three-dimensional space, an input comprising a selection of the planar surface and an indication to move the planar surface within the three-dimensional space. The series of acts 9200 includes modifying the position of the object and a position of the portion of the planar surface within the three-dimensional space in response to the input.

In some embodiments, the series of acts 9200 includes determining a horizon line corresponding to the scene of the two-dimensional image based on a camera position of the two-dimensional image. The series of acts 9200 also includes providing the portion of the planar surface for display according to a distance from a position of the planar surface to the horizon line.

In one or more embodiments, the series of acts 9200 includes providing the portion of the planar surface for display with a first texture. The series of acts 9200 further includes providing, in response to an input to modify the position of the object within the three-dimensional space, the portion of the planar surface for display with a second texture different than the first texture.

The series of acts 9200 includes generating, at the portion of the planar surface, an object platform indicating a position of the object relative to one or more planar axes corresponding to the planar surface, the object platform comprising a different texture than one or more additional portions of the planar surface. The series of acts 9200 also includes modifying a position of the object platform along the planar surface in response to modifying the position of the object along the one or more planar axes corresponding to the planar surface.

In at least some embodiments, the series of acts 9200 includes determining a three-dimensional position value relative to a portion of an object of one or more objects of a three-dimensional representation of a scene on one or more axes within a three-dimensional space. The series of acts 9200 also includes generating, in connection with modifying a position of the object within the three-dimensional space, a planar surface corresponding to the three-dimensional position value relative to the portion of the object on the one or more axes within the three-dimensional space. The series of acts 9200 further includes modifying a portion of the planar surface within a graphical user interface of a client device in response to modifying the position of the object within the three-dimensional space.

In one or more embodiments, the series of acts 9200 includes determining the three-dimensional position value relative to the portion of the object comprises determining a lowest three-dimensional position value of the object along a vertical axis within the three-dimensional space. The series of acts 9200 also includes generating the planar surface comprises generating the planar surface along horizontal axes perpendicular to the vertical axis at the lowest three-dimensional position value of the object along the vertical axis.

In some embodiments, the series of acts 9200 includes detecting a change in the position of the object along an axis of the one or more axes. The series of acts 9200 further includes modifying a position of the portion of the planar surface according to the change in the position of the object along the axis of the one or more axes.

Figure 93:
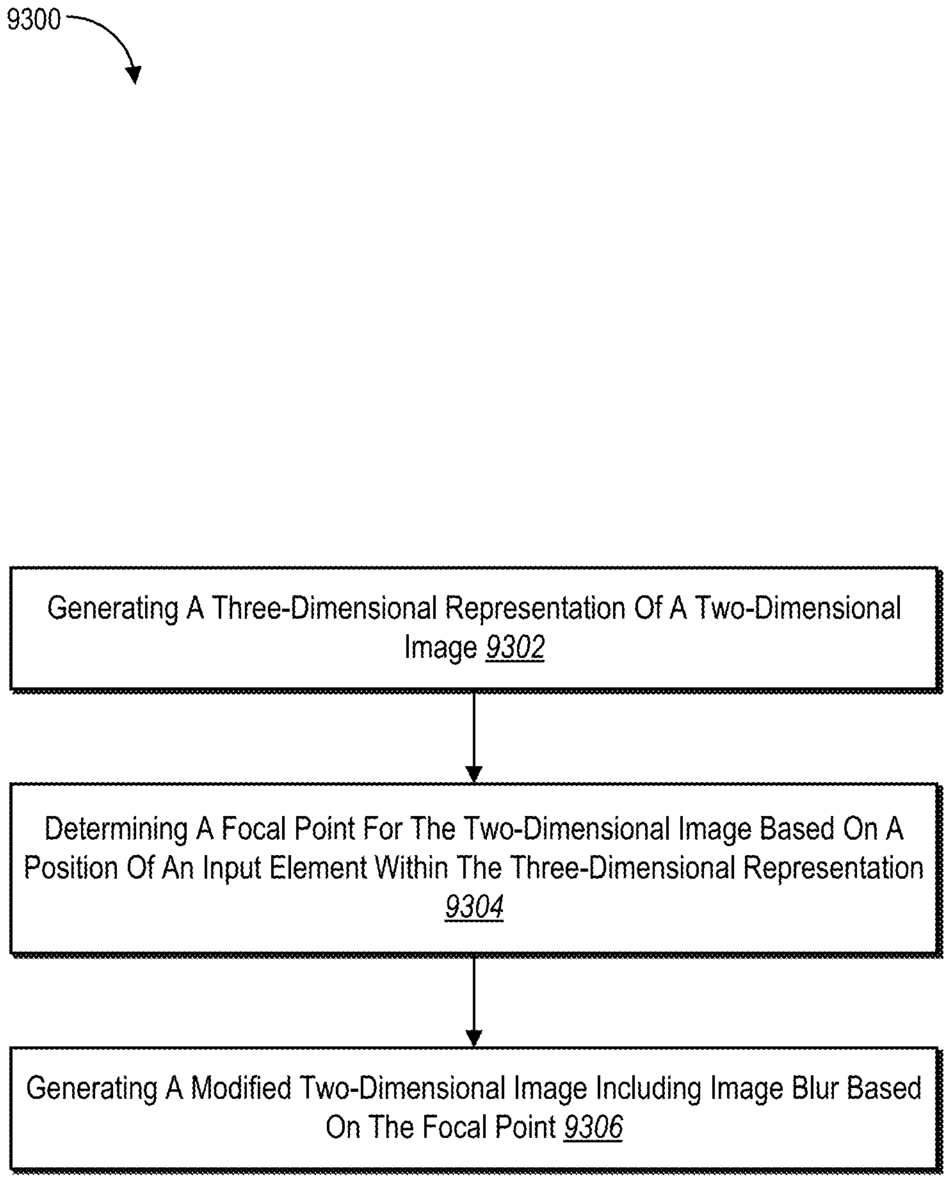
FIG. 93 illustrates a flowchart for a series of acts for modifying focal points of two-dimensional images based on three-dimensional representations of the two-dimensional images in accordance with one or more embodiments.

Turning now to FIG. 93, this figure shows a flowchart of a series of acts 9300 of modifying focal points of two-dimensional images based on three-dimensional representations of the two-dimensional images in accordance with one or more embodiments. While FIG. 93 illustrates acts according to one embodiment, alternative embodiments may omit, add to, reorder, and/or modify any of the acts shown in FIG. 93. The acts of FIG. 93 are part of a method. Alternatively, a non-transitory computer readable medium comprises instructions, that when executed by one or more processors, cause the one or more processors to perform the acts of FIG. 93. In still further embodiments, a system includes a processor or server configured to perform the acts of FIG. 93.

As shown, the series of acts 9300 includes an act 9302 of generating a three-dimensional representation of a two-dimensional image. Furthermore, the series of acts 9300 includes an act 9304 of determining a focal point for the two-dimensional image based on a position of an input element within the three-dimensional representation. The series of acts 9300 also includes an act 9306 of generating a modified two-dimensional image including image blur based on the focal point.

In one or more embodiments, the series of acts 9300 includes generating, by at least one processor, a three-dimensional representation of a two-dimensional image comprising one or more objects. According to one or more embodiments, the series of acts 9300 includes determining, by the at least one processor, a focal point for the two-dimensional image based on a three-dimensional position of an input element within the three-dimensional representation of the two-dimensional image according to a camera position of the two-dimensional image. In some embodiments, the series of acts 9300 includes generating, by the at least one processor, a modified two-dimensional image comprising image blur based on the focal point corresponding to the three-dimensional position of the input element.

In at least some embodiments, the series of acts 9300 includes generating, utilizing one or more neural networks, one or more foreground three-dimensional meshes corresponding to one or more foreground objects in the two-dimensional image. The series of acts 9300 includes generating, utilizing the one or more neural networks, a background three-dimensional mesh corresponding to one or more background objects in the two-dimensional image.

In some embodiments, the series of acts 9300 includes generating, in response to an input via a graphical user interface displaying the two-dimensional image, the input element comprising a three-dimensional object within a three-dimensional space comprising the three-dimensional representation. The series of acts 9300 further includes determining the focal point based on a three-dimensional coordinate of the three-dimensional object within the three-dimensional space.

In one or more embodiments, the series of acts 9300 includes receiving an input to modify the three-dimensional coordinate of the three-dimensional object within the three-dimensional space. The series of acts 9300 includes determining a modified three-dimensional coordinate and a modified size of the three-dimensional object within the three-dimensional space in response to the input. Additionally, the series of acts 9300 includes updating the focal point based on the modified three-dimensional coordinate of the three-dimensional object.

According to one or more embodiments, the series of acts 9300 includes determining, within an image space, a two-dimensional coordinate corresponding to an input via a graphical user interface. For example, the series of acts 9300 includes determining the three-dimensional position by converting, based on a depth map corresponding to the two-dimensional image, the two-dimensional coordinate in the image space to a three-dimensional coordinate within a three-dimensional space comprising the three-dimensional representation.

In some embodiments, the series of acts 9300 includes determining, based on a depth map of the two-dimensional image, a depth value of an identified pixel of the two-dimensional image according to the three-dimensional position of the input element. For example, the series of acts 9300 includes blurring, utilizing a blur filter, pixels in one or more portions of the two-dimensional image based on differences between the depth value of the identified pixel and depth values of the pixels in the one or more portions of the two-dimensional image.

In one or more embodiments, the series of acts 9300 includes determining a three-dimensional depth based on the three-dimensional position of the input element and a position of a virtual camera within a three-dimensional space comprising the three-dimensional representation. The series of acts 9300 further includes modifying camera parameters of the virtual camera according to the three-dimensional depth.

According to one or more embodiments, the series of acts 9300 includes determining a portion of the two-dimensional image corresponding to the three-dimensional position of the input element. Additionally, the series of acts 9300 includes generating the modified two-dimensional image zoomed in on the portion of the two-dimensional image by modifying a camera position of a camera within a three-dimensional space comprising the three-dimensional representation according to the portion of the two-dimensional image.

In one or more embodiments, the series of acts 9300 includes determining a range of movement of the input element from a first three-dimensional position to a second three-dimensional position within a three-dimensional space comprising the three-dimensional representation. Furthermore, the series of acts 9300 includes generating, for display within a graphical user interface, an animation blurring different portions of the two-dimensional image based on the range of movement of the input element from the first three-dimensional position to the second three-dimensional position.

In one or more embodiments, the series of acts 9300 includes generating a three-dimensional representation of a two-dimensional image comprising one or more objects. The series of acts 9300 includes determining a three-dimensional position within a three-dimensional space comprising the three-dimensional representation of the two-dimensional image according to an input element within a graphical user interface. Additionally, the series of acts 9300 includes determining a focal point for the two-dimensional image based on the three-dimensional position within the three-dimensional space by determining a depth associated with the three-dimensional position. The series of acts 9300 also includes generating a modified two-dimensional image by modifying an image blur of one or more portions of the two-dimensional image based on the focal point.

In some embodiments, the series of acts 9300 includes generating, utilizing one or more neural networks one or more three-dimensional meshes corresponding to one or more foreground objects or one or more background objects of the two-dimensional image.

In one or more embodiments, the series of acts 9300 includes determining position of the input element within an image space of the two-dimensional image. Additionally, the series of acts 9300 includes determining the three-dimensional position within the three-dimensional space comprising the three-dimensional representation based on a mapping between the image space and the three-dimensional space.

For example, the series of acts 9300 includes determining, according to an input via a graphical user interface displaying the two-dimensional image, a modified position of the input element within the image space of the two-dimensional image. The series of acts 9300 also includes modifying a size of the input element and the three-dimensional position within the three-dimensional space in response the modified position of the input element.

According to one or more embodiments, the series of acts 9300 includes determining the depth associated with the three-dimensional position by determining a distance between the three-dimensional position and a camera position corresponding to a camera within the three-dimensional space. The series of acts 9300 also includes generating the modified two-dimensional image by modifying camera parameters corresponding to the camera within the three-dimensional space based on the distance between the three-dimensional position and the camera position.

In one or more embodiments, the series of acts 9300 includes determining the focal point of the two-dimensional image by determining a pixel corresponding to the three-dimensional position within the three-dimensional space, and determining the depth associated with the three-dimensional position based on a depth value of the pixel corresponding to the three-dimensional position from a depth map of the two-dimensional image. Additionally, the series of acts 9300 includes generating the modified two-dimensional image by applying a blur filter to additional pixels in the two-dimensional image based on differences in depth values of the additional pixels relative to the depth value of the pixel.

In some embodiments, the series of acts 9300 includes determining a movement of the input element from the three-dimensional position within the three-dimensional space to an additional three-dimensional position within the three-dimensional space. Additionally, the series of acts 9300 includes modifying, within a graphical user interface, blur values of pixels in the two-dimensional image while the input element moves from the three-dimensional position to the additional three-dimensional position according to a first three-dimensional depth of the three-dimensional position and a second three-dimensional depth of the additional three-dimensional position.

In at least some embodiments, the series of acts 9300 includes generating a three-dimensional representation of a two-dimensional image comprising one or more objects. Additionally, the series of acts 9300 includes determining a focal point for the two-dimensional image based on a three-dimensional position of an input element within the three-dimensional representation of the two-dimensional image according to a camera position of the two-dimensional image. In some embodiments, the series of acts 9300 includes generating a modified two-dimensional image comprising a localized image modification based on the focal point corresponding to the three-dimensional position of the input element. For example, generating the modified two-dimensional image includes applying an image blur to content of the two-dimensional image according to the three-dimensional position of the input element.

In one or more embodiments, the series of acts 9300 includes generating the three-dimensional representation comprises generating one or more three-dimensional meshes corresponding to the one or more objects in the two-dimensional image. The series of acts 9300 can also include determining the focal point comprises determining that the three-dimensional position of the input element corresponds to a three-dimensional depth of a three-dimensional mesh of the one or more three-dimensional meshes.

According to one or more embodiments, the series of acts 9300 includes determining, based on the three-dimensional depth of the three-dimensional mesh of the one or more three-dimensional meshes, camera parameters for a camera within a three-dimensional space comprising the three-dimensional representation. The series of acts 9300 also includes generating, utilizing a three-dimensional renderer, the modified two-dimensional image according to the camera parameters.

In at least some embodiments, the series of acts 9300 includes generating the input element comprising a three-dimensional object within a three-dimensional space comprising the three-dimensional representation of the two-dimensional image. The series of acts 9300 further includes determining the focal point based on a three-dimensional coordinate of the three-dimensional object within the three-dimensional space.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 94:
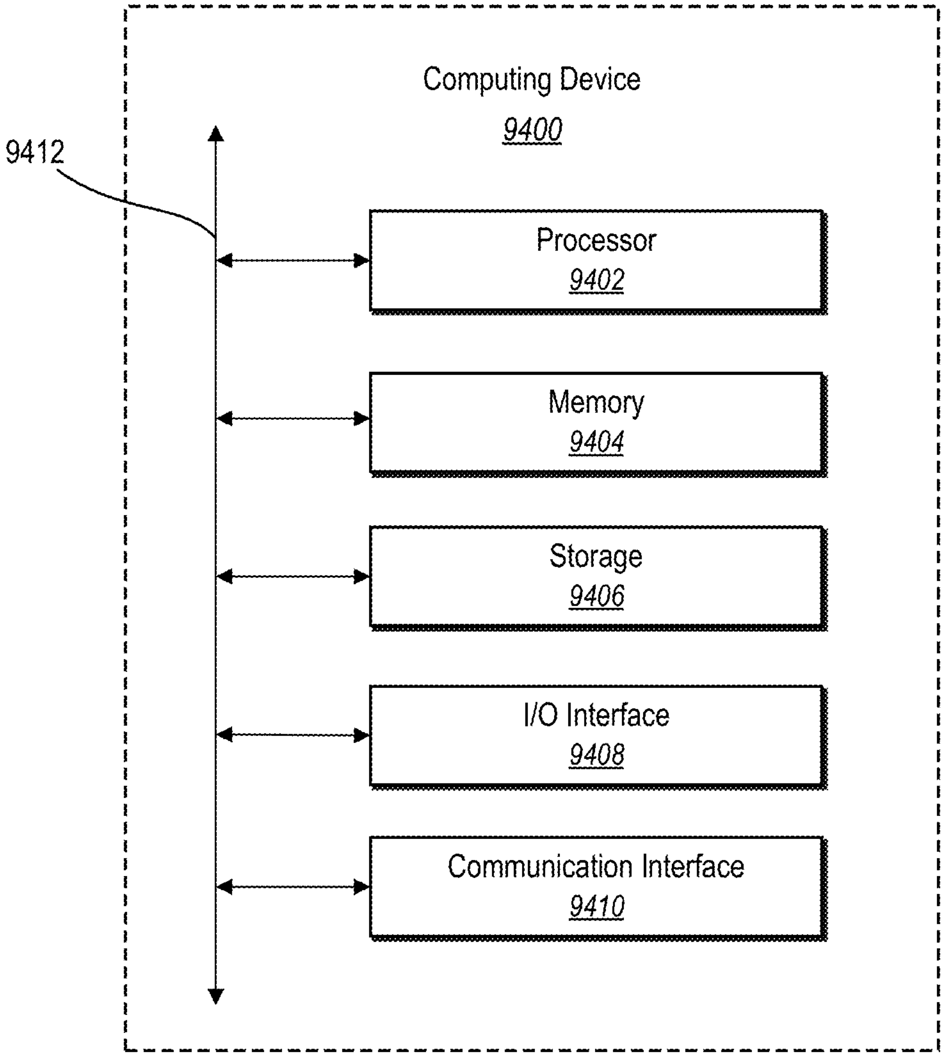
FIG. 94 illustrates a block diagram of an exemplary computing device in accordance with one or more embodiments.

FIG. 94 illustrates a block diagram of an example computing device 9400 that may be configured to perform one or more of the processes described above. One will appreciate that one or more computing devices, such as the computing device 9400 may represent the computing devices described above (e.g., the server(s) 102 and/or the client devices 110*a*-110*n*). In one or more embodiments, the computing device 9400 may be a mobile device (e.g., a mobile telephone, a smartphone, a PDA, a tablet, a laptop, a camera, a tracker, a watch, a wearable device). In some embodiments, the computing device 9400 may be a non-mobile device (e.g., a desktop computer or another type of client device). Further, the computing device 9400 may be a server device that includes cloud-based processing and storage capabilities.

As shown in FIG. 94, the computing device 9400 can include one or more processor(s) 9402, memory 9404, a storage device 9406, input/output interfaces 9408 (or "I/O interfaces 9408"), and a communication interface 9410, which may be communicatively coupled by way of a communication infrastructure (e.g., bus 9412). While the computing device 9400 is shown in FIG. 94, the components illustrated in FIG. 94 are not intended to be limiting. Additional or alternative components may be used in other embodiments. Furthermore, in certain embodiments, the computing device 9400 includes fewer components than those shown in FIG. 94. Components of the computing device 9400 shown in FIG. 94 will now be described in additional detail.

In particular embodiments, the processor(s) 9402 includes hardware for executing instructions, such as those making up a computer program. As an example, and not by way of limitation, to execute instructions, the processor(s) 9402 may retrieve (or fetch) the instructions from an internal register, an internal cache, memory 9404, or a storage device 9406 and decode and execute them.

The computing device 9400 includes memory 9404, which is coupled to the processor(s) 9402. The memory 9404 may be used for storing data, metadata, and programs for execution by the processor(s). The memory 9404 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 9404 may be internal or distributed memory.

The computing device 9400 includes a storage device 9406 including storage for storing data or instructions. As an example, and not by way of limitation, the storage device 9406 can include a non-transitory storage medium described above. The storage device 9406 may include a hard disk drive (HDD), flash memory, a Universal Serial Bus (USB) drive or a combination these or other storage devices.

As shown, the computing device 9400 includes one or more I/O interfaces 9408, which are provided to allow a user to provide input to (such as user strokes), receive output from, and otherwise transfer data to and from the computing device 9400. These I/O interfaces 9408 may include a mouse, keypad or a keyboard, a touch screen, camera, optical scanner, network interface, modem, other known I/O devices or a combination of such I/O interfaces 9408. The touch screen may be activated with a stylus or a finger.

The I/O interfaces 9408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 9408 are configured to provide graphical data to a display for presentation to a user. The graphical data may be representative of one or more graphical user interfaces and/or any other graphical content as may serve a particular implementation.

The computing device 9400 can further include a communication interface 9410. The communication interface 9410 can include hardware, software, or both. The communication interface 9410 provides one or more interfaces for communication (such as, for example, packet-based communication) between the computing device and one or more other computing devices or one or more networks. As an example, and not by way of limitation, communication interface 9410 may include a network interface controller (NIC) or network adapter for communicating with an Ethernet or other wire-based network or a wireless NIC (WNIC) or wireless adapter for communicating with a wireless network, such as a WI-FI. The computing device 9400 can further include a bus 9412. The bus 9412 can include hardware, software, or both that connects components of computing device 9400 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

generating, by at least one processor utilizing one or more neural networks, a feature representation of a two-dimensional image;

generating, by the at least one processor utilizing the one or more neural networks and based on the feature representation, a scale field for the two-dimensional image comprising pixel-to-metric ratios between:

pixel distances from pixels to a horizon line in the two-dimensional image; and metric distances from corresponding three-dimensional points to a three-dimensional horizon line in a three-dimensional space corresponding to the two-dimensional image; and performing at least one of:

generating, by the at least one processor, a metric distance of content portrayed in the two-dimensional image utilizing the pixel-to-metric ratios of the scale field of the two-dimensional image; or modifying, by the at least one processor, the two-dimensional image utilizing the pixel-to-metric ratios of the scale field of the two-dimensional image.

2. The computer-implemented method of claim 1, further comprising generating, utilizing the one or more neural networks and based on the feature representation, a plurality of ground-to-horizon vectors in the three-dimensional space according to the horizon line of the two-dimensional image projected into the three-dimensional space.

3. The computer-implemented method of claim 2, wherein generating the plurality of ground-to-horizon vectors comprises generating a ground-to-horizon vector indicating a distance and a direction from a three-dimensional point corresponding to a pixel of the two-dimensional image to the three-dimensional horizon line in the three-dimensional space.

4. The computer-implemented method of claim 1, wherein generating the scale field for the two-dimensional image comprises generating, for a pixel of the two-dimensional image, a pixel-to-metric ratio between a pixel distance in the two-dimensional image and a corresponding three-dimensional distance in the three-dimensional space relative to a camera height of the two-dimensional image.

5. The computer-implemented method of claim 1, wherein generating the metric distance of the content portrayed in the two-dimensional image comprises:

determining a pixel distance between a first pixel corresponding to the content and a second pixel corresponding to the content; and generating the metric distance based on the pixel distance and the pixel-to-metric ratios between the pixel distances in the two-dimensional image and the metric distances in the three-dimensional space.

6. The computer-implemented method of claim 5, wherein generating the metric distance of the content portrayed in the two-dimensional image comprises:

determining a value of the scale field corresponding to the first pixel; and converting the value of the scale field corresponding to the first pixel to the metric distance based on the pixel distance between the first pixel and the second pixel.

7. The computer-implemented method of claim 1, wherein modifying the two-dimensional image comprises:

determining a pixel position of an object placed within the two-dimensional image; and determining a scale of the object based on the pixel position and the scale field.

8. The computer-implemented method of claim 7, wherein determining the scale of the object comprises:

determining an initial size of the object; and inserting the object at the pixel position with a modified size based on a ratio indicated by a value from the scale field at the pixel position of the object.

9. The computer-implemented method of claim 1, further comprising learning parameters of the one or more neural networks by:

generating, for an additional two-dimensional image, estimated depth values for a plurality of pixels of the additional two-dimensional image projected to a corresponding three-dimensional space;

determining, for the additional two-dimensional image, an additional horizon line according to an estimated camera height of the additional two-dimensional image;

generating, for the additional two-dimensional image, a ground-truth scale field based on a plurality of ground-to-horizon vectors in the corresponding three-dimensional space according to the estimated depth values for the plurality of pixels and the additional horizon line; and modifying parameters of the one or more neural networks based on the ground-truth scale field of the additional two-dimensional image.

10. A non-transitory computer readable medium storing executable instructions which, when executed by a processing device, cause the processing device to perform operations comprising:

generating, utilizing one or more neural networks comprising parameters learned from a plurality of digital images with annotated horizon lines and ground-to-horizon vectors, a feature representation of a two-dimensional image;

generating, utilizing the one or more neural networks and based on the feature representation, a scale field for the two-dimensional image comprising a plurality of values indicating ratios of pixel distances relative to a camera height of the two-dimensional image; and performing at least one of:

generating a metric distance of an object portrayed in the two-dimensional image according to the scale field of the two-dimensional image; or modifying the two-dimensional image according to the scale field of the two-dimensional image.

11. The non-transitory computer readable medium of claim 10, wherein generating the scale field comprises generating, for a pixel of the two-dimensional image, a value representing a ratio between a pixel distance from the pixel to a horizon line of the two-dimensional image and a camera height of the two-dimensional image.

12. The non-transitory computer readable medium of claim 10, wherein modifying the two-dimensional image comprises inserting an object at a location of the two-dimensional image by:

determining a pixel corresponding to the location of the two-dimensional image;

determining a scaled size of the object based on a value from the scale field for the pixel corresponding to the location of the two-dimensional image; and inserting the object at the location of the two-dimensional image according to the scaled size of the object.

13. A system comprising:

one or more memory devices comprising a two-dimensional image; and one or more processors configured to cause the system to:

generate, utilizing one or more neural networks, a feature representation of the two-dimensional image;

generate, utilizing the one or more neural networks and based on the feature representation, a scale field for the two-dimensional image comprising pixel-to-metric ratios between:

pixel distances from pixels to a horizon line in the two-dimensional image; and metric distances from corresponding three-dimensional points to a three-dimensional horizon line in a three-dimensional space corresponding to the two-dimensional image; and perform at least one of:

generating a metric distance of content portrayed in the two-dimensional image utilizing the pixel-to-metric ratios of the scale field of the two-dimensional image; or modifying the two-dimensional image utilizing the pixel-to-metric ratios of the scale field of the two-dimensional image.

14. The system of claim 13, wherein the one or more processors are further configured to cause the system to generate, utilizing the one or more neural networks and based on the feature representation, a plurality of ground-to-horizon vectors in the three-dimensional space according to the horizon line of the two-dimensional image projected into the three-dimensional space.

15. The system of claim 14, wherein the one or more processors are further configured to cause the system to generate the plurality of ground-to-horizon vectors by generating a ground-to-horizon vector indicating a distance and a direction from a three-dimensional point corresponding to a pixel of the two-dimensional image to the three-dimensional horizon line in the three-dimensional space.

16. The system of claim 13, wherein the one or more processors are further configured to cause the system to generate the scale field for the two-dimensional image by generating, for a pixel of the two-dimensional image, a pixel-to-metric ratio between a pixel distance in the two-dimensional image and a corresponding three-dimensional distance in the three-dimensional space relative to a camera height of the two-dimensional image.

17. The system of claim 13, wherein the one or more processors are further configured to cause the system to generate the metric distance of the content portrayed in the two-dimensional image by:

determining a pixel distance between a first pixel corresponding to the content and a second pixel corresponding to the content; and generating the metric distance based on the pixel distance and the pixel-to-metric ratios between the pixel distances in the two-dimensional image and the metric distances in the three-dimensional space.

18. The system of claim 17, wherein the one or more processors are further configured to cause the system to generate the metric distance of the content portrayed in the two-dimensional image by:

determining a value of the scale field corresponding to the first pixel; and converting the value of the scale field corresponding to the first pixel to the metric distance based on the pixel distance between the first pixel and the second pixel.

19. The system of claim 13, wherein the one or more processors are further configured to cause the system to modify the two-dimensional image by:

determining a pixel position of an object placed within the two-dimensional image; and determining a scale of the object based on the pixel position and the scale field.

20. The system of claim 19, wherein the one or more processors are further configured to cause the system to determine the scale of the object by:

determining an initial size of the object; and inserting the object at the pixel position with a modified size based on a ratio indicated by a value from the scale field at the pixel position of the object.

* * * * *